United States Patent [19]
Kavanagh et al.

[11] Patent Number: 5,838,965
[45] Date of Patent: Nov. 17, 1998

[54] OBJECT ORIENTED DATABASE MANAGEMENT SYSTEM

[75] Inventors: Thomas S. Kavanagh; Christopher W. Beall, both of Boulder; William C. Heiny, Arvada; John D. Motycka, Evergreen; Samuel S. Pendleton, Louisville; Thomas D. Smallwood, Lafayette; Brooke E. Terpening, Golden; Kenneth A. Traut, Boulder, all of Colo.

[73] Assignee: CADIS, Inc., Boulder, Colo.

[21] Appl. No.: 339,481

[22] Filed: Nov. 10, 1994

[51] Int. Cl.⁶ .................................................. G06F 17/30
[52] U.S. Cl. .................................................. 395/614
[58] Field of Search ..................................... 395/614, 600

[56] References Cited

U.S. PATENT DOCUMENTS

| | | | |
|---|---|---|---|
| 3,343,133 | 9/1967 | Dirks | 340/172.5 |
| 4,318,184 | 3/1982 | Millett et al. | 364/900 |
| 4,879,648 | 11/1989 | Cochran et al. | 364/300 |
| 4,887,206 | 12/1989 | Natarajan | 364/401 |
| 4,918,602 | 4/1990 | Bone et al. | 364/401 |
| 4,930,071 | 5/1990 | Tou et al. | 364/300 |
| 4,984,155 | 1/1991 | Geier et al. | 364/401 |
| 5,021,992 | 6/1991 | Kondo | 364/900 |
| 5,109,337 | 4/1992 | Ferriter et al. | 364/401 |
| 5,133,075 | 7/1992 | Risch | 395/800 |
| 5,146,404 | 9/1992 | Calloway et al. | 364/401 |
| 5,191,534 | 3/1993 | Orr et al. | 364/468 |
| 5,206,949 | 4/1993 | Cochran et al. | 395/600 |
| 5,210,868 | 5/1993 | Shimada et al. | 395/600 |
| 5,241,624 | 8/1993 | Torres | 395/129 |
| 5,257,365 | 10/1993 | Powers et al. | 395/600 |
| 5,260,866 | 11/1993 | Lisinki et al. | 364/401 |
| 5,283,865 | 2/1994 | Johnson | 395/161 |
| 5,291,583 | 3/1994 | Bapat | 395/500 |

(List continued on next page.)

OTHER PUBLICATIONS

International Search Report, International Application No. PCT/US95/15028 dated Apr. 22, 1996.

*Primary Examiner*—Wayne Amsbury
*Attorney, Agent, or Firm*—Baker & Botts, L.L.P.

[57] ABSTRACT

A database management system is disclosed having an object oriented representation of information describing characteristics of instances organized in a hierarchical structure that may be logically represented as a tree structure. The hierarchical structure includes a parent-child/class-subclass structure. The internal representation of an instance is dependent upon information that is locally available from a class to which that instance belongs plus inherited attributes from a parent class. A class is represented as a class object having a handle. The class object has a parent handle associated with it that identifies the parent class of the class object. The class object has a subclass list associated with it that identifies the handles of the classes that are subclasses of the class object. The class object has an attribute list associated with it that includes a list of handles which may be used to identify the attributes of the class object. A class object also includes a subtree instance count which represents the total number of instances that belong to that class object plus the total number of instances that are present in all of the descendants of the class object, i.e., the total number of instances that are present in that branch of the hierarchical tree structure. A graphical user interface is provided in which the hierarchical tree structure is displayed in a window showing classification structure, and a class or instance can be selected by clicking on the graphical representation of the class in the window showing classification structure. Attributes of the selected class or instance are simultaneously displayed in a window showing attribute information, which includes fields to the right of each attribute in which search criteria for that attribute may be entered. The subtree instance count is also displayed simultaneously to provide feedback to the user as to how many instances satisfy the current query, in order to facilitate guided iterative queries of the database.

47 Claims, 204 Drawing Sheets

U.S. PATENT DOCUMENTS

| | | | |
|---|---|---|---|
| 5,335,346 | 8/1994 | Fabbio | 395/600 |
| 5,379,430 | 1/1995 | Nguyen | 395/603 |
| 5,418,942 | 5/1995 | Krawchuck et al. | 395/600 |
| 5,418,961 | 5/1995 | Segal et al. | 395/700 |
| 5,423,038 | 6/1995 | Davis | 395/650 |
| 5,434,791 | 7/1995 | Koko et al. | 364/468.03 |
| 5,446,842 | 8/1995 | Schaeffer et al. | 395/200.01 |
| 5,448,726 | 9/1995 | Cramsie et al. | 395/600 |
| 5,542,078 | 7/1996 | Martel et al. | 395/600 |
| 5,546,577 | 8/1996 | Marlin et al. | 395/614 |

| Match Component | Component | Matched? |
|---|---|---|
| Base Number | 2901 | |
| Prefix | LM | No |
| Suffix | B | Yes |
| Manufacturer | AMD | No |
| # of Classes Found | 1 | Yes |

FIG. 87

| | |
|---|---|
| import [-u user] [ -p password ] -d kdbname [-P] [-U] [-X] [-M] [-v] [-r] import_file | |
| -u | use user name 'username' when doing login, if none given login id is used |
| -p | use specified password with login, |
| -d | the logical database name to connect to |
| -P | turn on progress statistics |
| -U | don't import a parameter unless the instance is unique with respect to the search keys |
| -X | don't import a parameter unless there are no matching instances. Must be used in conjunction with -M. |
| -M | if a match is not found, make a new instance |
| -v | turn on verbose mode |
| -r | remove the matched instances from the knowledge base |
| import_file | name of the file containing the import info. |

FIG. 125

```
simp [-u user] [ -p password ] -d kdbname -o outfile
[-f] [-P] [-U] [-v] [-n] import_file import_map
```

| | |
|---|---|
| -u | use user name 'user name' when doing login, if none given login id is used |
| -p | use specified password with login |
| -d | the logical database name to connect to |
| -f | the field to match on. |
| -P | turn on progress statistics |
| -v | turn on verbose mode |
| -o | output file for instances not imported |
| -n | no mapfile - use defining class in import file as import class |
| import_file | name of the file containing the import info. |
| import_map | name of the file containing the map information |

FIG. 126

| Match Component | Component | Matched? |
|---|---|---|
| Base Number | 2901 | |
| Prefix | | Yes |
| Suffix | A | No |
| Manufacturer | Intel | Yes |
| # of Classes Found | 1 | Yes |

FIG. 131

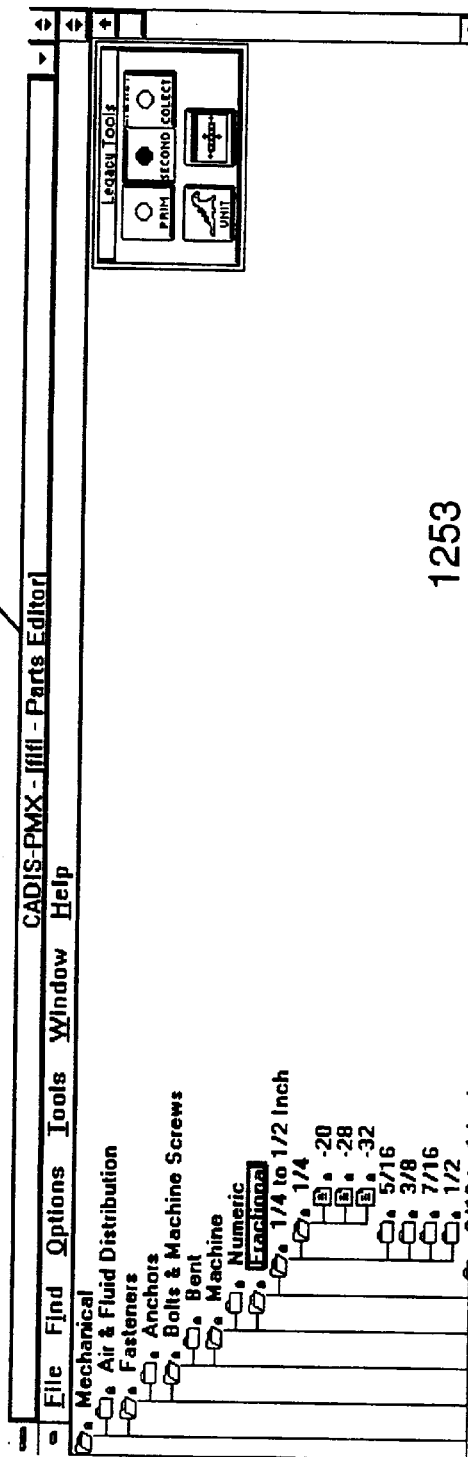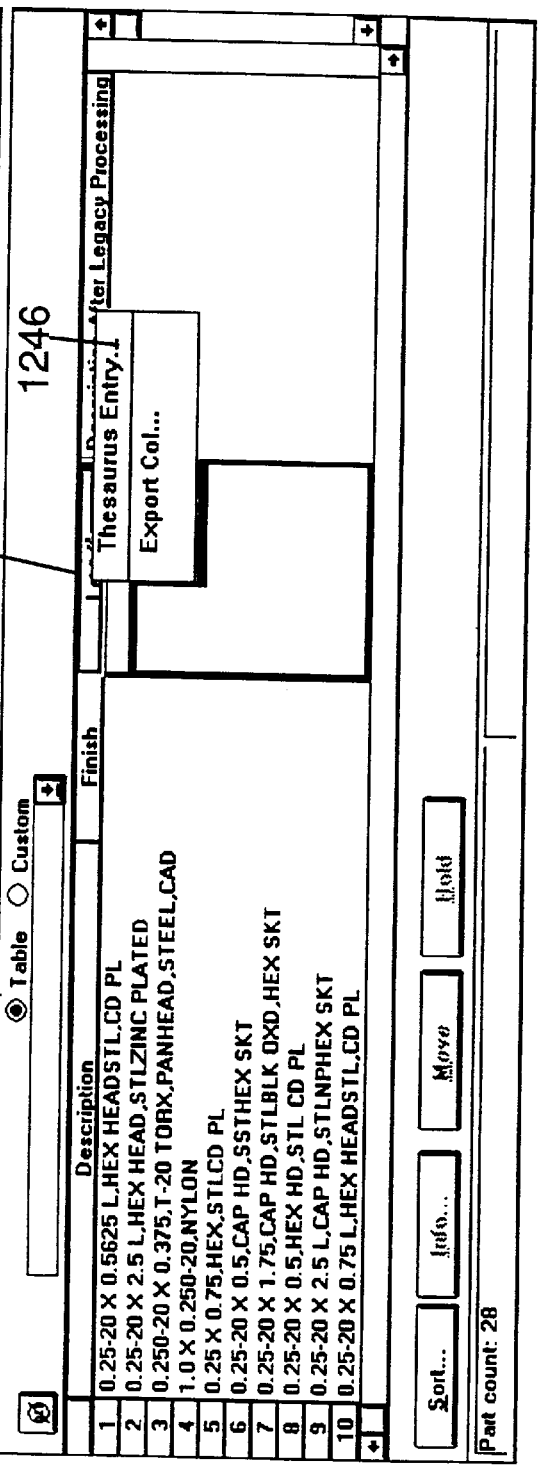
Fig. 190

Fig. 196

OBJECT ORIENTED DATABASE MANAGEMENT SYSTEM

BACKGROUND OF THE INVENTION

The present invention relates to an object oriented database management system that is optimized for fast reads of the data, and is particularly suited for applications where extensive updating is not necessary. The database is structured so that when an item does not have a value, nothing is stored. Therefore, memory space is not wasted storing null values, and search speed is improved because no time is consumed searching such null fields.

While various features of the present invention may be advantageously used in other applications, the invention is described herein with reference to the problem of managing parts and components in a manufacturing operation. The invention is particularly useful for solving problems in parts management which have existed for a long time.

Often, the competitive success of a manufacturing company may largely depend upon the company's ability to bring products to market faster. The rewards for an enterprise that is able to achieve this objective may be considerable. The penalty for failing to achieve this objective can be the loss of a customer or even an entire market. In a typical company, re-engineering or redesigning the parts selection process may significantly improve the operations of the company and achieve major gains in bringing products to market faster. In addition, significant cost savings may be achieved.

Design engineering has been the focal point in the competitive drive to get products to market quicker, at reduced cost, and with improved quality. Companies are continually striving to make the design engineer more efficient. This quest for efficiency translates into providing more effective tools for the design activity thereby making the design activity a larger portion of the design day.

The culmination of every design cycle in a manufacturing company is the parts selection process that will result in a completed bill of materials. Design engineers typically have to specify and select dozens of components that will satisfy their design requirements. In every case, the design engineer will be presented with a choice that collectively can have a major strategic impact on the firm. The implicit choice that each design engineer faces when specifying and selecting every part is the question of whether he or she can re-use an existing part, or whether he or she needs to release a new part.

Depending on the design engineer's answer to this deceptively simple question, the company may be required to support a new part at considerable cost. Market research has shown that design engineers in large companies find it easier to add a new part, even if an exact match or acceptable substitute already exists, because it takes too much time and trouble to look up parts to determine whether an existing part would be suitable. However, releasing even one new part is time consuming and expensive. FIG. 1 summarizes the typical process that a manufacturing company goes through prior to releasing a new part.

If an existing approved part can be used in a design, the design engineer has more time for design, the expensive process of releasing a new part is avoided, and the value of the prior part release process will be maximized. However, what is required is a quick and easy way to locate parts for use. When a part is quickly found and used, not only does the designer benefit, but the design engineering department, procurement, manufacturing, field service, and every other group downstream from the design engineer will benefit as well. Typically though, after spending too much valuable design time looking for a released part and not finding it, the design engineer simply specifies another new part.

The reason the designer often has difficulty finding parts is because most systems which reference parts do so by part number. The designer knows the functional attributes, geometric description, and other characteristics of what is required, but rarely knows the part number from which the correct part can be identified. Efforts to address this problem in the past have made part descriptions available through key-words; but oftentimes the descriptions are not standardized and are usually limited to a bare bones description due to restricted field lengths. In the past, accurate access by design engineers to released parts information has usually been inadequate.

Because of the need to use existing parts, ad-hoc crutches have been developed by many organizations. These include intelligent part numbering systems, crib-sheets, "where used" systems derived from bill of materials, group technology, CAD drawing management systems, and occasionally description driven RDBMS applications. These solutions are ad-hoc because:

1. These crutches are not complete solutions; they often lead to the circumvention of the existing part selection and release process in order to get the job done.
2. They are based on tools that are designed for other primary tasks and are typically inefficient or are misused in this application.
3. The organization develops and applies resources not directly related to the focus of the business.
4. Too many people become part selection experts on their current design focus only, limiting mobility of personnel to new projects.
5. There are no tools that measure the frequency of finding a suitable part, or provide any measure of redundancy between the newly released parts with those already available for use.
6. Inevitably these attempts to develop a complete system are unsatisfactory and are abandoned.

There is an additional reason why these past attempts to address this problem cannot be characterized as complete solutions. They do not adequately address the company's entire pool of released parts. This parts pool typically has characteristics that hinder comprehensive management and which have stifled full corrective action by any existing system. Such characteristics include the fact that the data tends to be widely scattered across the company, and among many different systems. Most parts are poorly described, and some parts can never be found because of description inconsistencies. There are many similar parts—parts that are different, but which would satisfy the same design criteria if the parts could be identified. The pool of parts almost never shrinks. Typically, no matter how big it is today, it will be bigger tomorrow.

In the past, ad-hoc solutions invariably attempted to address the problem by utilizing key-word search tools. Searches on user specified key-words are part of many relational database applications. A key-word query on a relational database typically causes the database to search a specific table for some text-string. These applications may support wild cards, the option for case sensitivity, or other functions associated with the key-word match. However, given the inconsistencies in typical part descriptions noted above, key-word approaches have been severely limited in their effectiveness. In a database that supports key-word searches, a question is posed in terms of key-words and answers are returned, but it is never known if all possible answers are returned. In a parts management system, it is critical to find all items and all related or similar items in a database. Otherwise, there can be no assurance that a suitable part does not already exist in the company's database, and the cost of creating a new part to add to the existing database may be incurred unnecessarily when the system fails to find suitable existing parts.

The example shown in Table 1 highlights the limitation of a key-word based part retrieval system. The four entries shown in Table 1 represent examples of typical entries in a parts database. An elementary key-word search on the term 'cam follower bearing' would likely return with only one part found, #0002. A sophisticated system might return with three partial matches, finding some of the terms in #0001, #0002, and #0003. It is unlikely that a system would know that 'track roller' is a synonym for 'cam follower.' Also, roller and needle are sometimes synonyms. A search involving 'inch' would only find a match in the first listed part. Finally, while the last two parts imply they are bearings, the descriptions do not explicitly identify them as such.

TABLE 1

| Part # | Description |
|---|---|
| 0001 | Bearing, cam follower, roller, 1.0 inch |
| 0002 | Cam follower bearing, needle, 1.0" |
| 0003 | Cam follower, 1.0", roller |
| 0004 | Track roller, 1.0" |

Problems have arisen in the past because it is not uncommon for various to be specified differently in typical part descriptions. For example, some may have temperature characteristics specified in degrees Centigrade, while may be specified in Fahrenheit. Also, one screw may have a length that is expressed as 1 inch. Another screw may have a length expressed as 2.5 centimeters. Both crews may be acceptable substitutes for the same design requirement. However, prior database management tools have not been able to satisfactorily deal with units in a way which would allow both parts to be found in response to a for existing parts having a range of lengths that included both 1 inch and 2.5 centimeters.

The standard relational database management systems (RDBMS) model is unsatisfactory for developing a parts management solution. Internally developed corporate systems have inevitably been built on a standard RDBMS technology and, in general, have not been satisfactory to the end-user.

In an effort to deal with these problems, some companies have developed a dollar cost estimate of the release process, and have provided a mechanism to charge it back to the design engineering group. The rationale behind such an approach is that the design engineer is the only person who can influence the outcome one way or another. By choosing to specify a new part, the design engineer commits the company to a series of process steps, such as those shown in FIG. 1, that subsequently result in time and cost that must be incurred by the corporation. However, such efforts have been less than satisfactory, and serve to demonstrate the need for a quicker and easier system for looking up parts to determine whether an existing part would be suitable.

It would be desirable to entirely eliminate triggering the process depicted in FIG. 1 by avoiding the release of a new part whenever possible. In the past, design engineers have not been provided with the needed tools to specify and select parts that have already been released. There has been a need to provide an approach which would allow a company to avoid duplicating process costs (in time and effort) that have been incurred earlier in releasing a part, if an existing part is an exact match to the design requirements or an acceptable substitute.

A company's pool of existing parts data is potentially a valuable asset, but its effective value is discounted by the above-described characteristics which inhibit the data from being a useful and readily available resource of prior company knowledge and investment. Therefore, any solution that can affordably transform this pool of existing parts data into a useful information resource would be of great value to a company. However, effective tools to manage it have not been available in the past.

SUMMARY OF THE INVENTION

The present invention, in its preferred embodiment, may include a retriever means, a knowledge base client means, and a knowledge base server means. A legacy means is preferably included to facilitate organization of an existing legacy database into a schema for use in connection with the present invention. In a preferred embodiment, the knowledge base server means includes a dynamic class manager means, a connection manager means, a query manager means, a handle manager means, a units manager means, a database manager means, and a file manager means. A preferred system also includes a registry server means and license manager means to control unauthorized user access to the system.

The present invention may be used to provide a part management system which has a number of advantageous features. A system in accordance with the present invention provides a tool for design engineers which enables them to intuitively, definitively, and virtually instantaneously find a released part that is either an exact match or an acceptable substitute for the design requirements, if such a part exists. Duplicate parts can be eliminated, and inventory carrying costs reduced as well.

Through the use of an object oriented knowledge base, the present invention can make access to part data intuitive, instantaneous, definitive, and can encompass all parts. The present system can transform a company's poorly managed pool of existing parts data into a valued corporate asset. It can provide ongoing consistency and control to the specification, release, and subsequent retrieval of all parts information.

Part classes, sub-classes, part characteristics such as shape, material, and dimensions, among others, fit very well within the object oriented environment of the present invention. Parts are treated as objects within a parts family or "schema".

The present invention uses attribute searches, which offer decided advantages over generic key-word searches. The incomplete search problems associated with key-word matching which are described above with reference to Table 1 may be solved when the same data is restructured as parametric attributes. A parametric attribute description consists of (1) reducing all terminology to some standard form, (2) describing each term as some value of an attribute related to an object or subclass, and (3) ordering the set of attributes of the object. In this case, cam follower bearings are classified under subclass of bearings called "mounted bearings". This is illustrated in Table 2. Described this way, the parts are easily related, and appear to correspond to the same part. This would not be apparent from a key-word search.

TABLE 2

| Part # | Object | Mounting Type | Element Type | Outside Diameter (inches) |
|---|---|---|---|---|
| 0001 | mounted bearing | cam follower | roller | 1.0 |
| 0002 | mounted bearing | cam follower | roller | 1.0 |
| 0003 | mounted bearing | cam follower | roller | 1.0 |
| 0004 | mounted bearing | cam follower | roller | 1.0 |

In the present invention, users search a parts database by selecting attributes that describe a part. Selection consists of sifting from general to detailed part attributes. All possible questions are linked to the attributes; the user merely selects from the enumerated possibilities. This sifting mechanism has the effect of masking unwanted parts. The intent is to leave parts that exactly fit the search criteria, but not eliminate any parts that might fit.

The present invention is an effective, on-going part specification, description, and retrieval system. Parts are found by describing them using their relevant attributes. Attributes can be both parametric (length, capacitance, etc.) and nonparametric (cost, preferred, etc.). The description process is intuitive to the occasional user and does not require specialized computer expertise. Needed parts may be found virtually instantly. This level of performance encourages widespread usage of the system. The response time is essentially independent of the size of the database searched and of the number of users at any point in time.

A system in accordance with the present invention provides definitive access to the data. If a needed part exists, the user will be able to find it. If a part does not exist, the user will know that too with certainty, so that a new part can be released with confidence. The system is capable of retrieving all parts fitting the description criteria completely, as well as all parts that closely match or satisfy a subset of the criteria. The system facilitates the selection of parts based on preferred attributes. Examples of preferred attributes include: "standard" values (which encourage design standardization), low field failure rates (which ensures reliability), low unit cost, and preferred suppliers.

The present system can affordably transform a company's pool of existing parts legacy data into usable information. The present system enables a design engineer to painlessly create and edit descriptions of parts based on critical engineering attributes. All part descriptions may be standardized in terms of content and format as a function of the type of part. The descriptions are independent of arbitrary and pre-determined field length limitations, and are able to automatically accommodate the varying field length requirements of different part types. The system is flexible in that it may be easily modified to accommodate major changes triggered by internal or external realities. This includes addition and deletion of entire part families, new product lines, corporate consolidations, mergers, and acquisitions.

The present system provides unit measure convertibility. The user is able to specify a part in his or her unit-of-measure of choice. The system provides rules governing the conversion of units-of-measure of parts. For some part families convertibility of units is allowed and required, for others, convertibility is prohibited; the system knows what rules apply to which part families.

The present system provides an open system environment with connectivity to any other application or system across the enterprise. Enterprise-wide desktop access to all parts information is provided. Part information on newly specified parts is instantly available throughout the corporation. The elimination of the information time lag between engineering and other departments involved in parts management fosters concurrent engineering practices. The system also provides management and control functions associated with the release of parts into the system.

The present system enables design engineers, and other users, to locate parts by describing them in terms of parametric and non-parametric attributes. It supports dynamic management (additions, deletions, and manipulations) of part families and attributes to accommodate both standard and proprietary parts. It provides on-going structure, consistency, and control in the management of the part specification and description process. It also includes the company's existing (legacy) parts in the on-going system.

Further features and advantages of the present invention will be appreciated in connection with the drawings and the following detailed description of a presently preferred embodiment.

BRIEF DESCRIPTION OF THE DRAWINGS

FIG. 87 depicts match logic in genic.

FIG. 120 is a flow chart depicting the addition of values to a table.

FIG. 121 is a picture of the automatic values dialog in the table editor in the schema editor.

FIG. 122 is a flow chart of the process for adding labels in the table editor.

FIG. 123 is a picture of the automatic labeling dialog in the table editor in the schema editor.

FIG. 124 represents the process flow chart for the user changing the rows and columns of a table.

FIG. 125 shows the command line parameters for import.

FIG. 126 shows the command line parameters for simp.

FIG. 127 is a flow chart for the user deleting an attribute in the schema editor.

FIG. 128 is a picture of a screen in the schema editor with a class selected for attribute editing when the class has no locally defined attributes.

FIG. 129 is another picture of a screen in the schema editor with a class selected for attribute editing when the class has attributes available for editing.

FIG. 130 show the confirmation dialog that appears in the schema editor when deleting an attribute.

FIG. 131 is an example of match criteria in genic.

Figure 132:
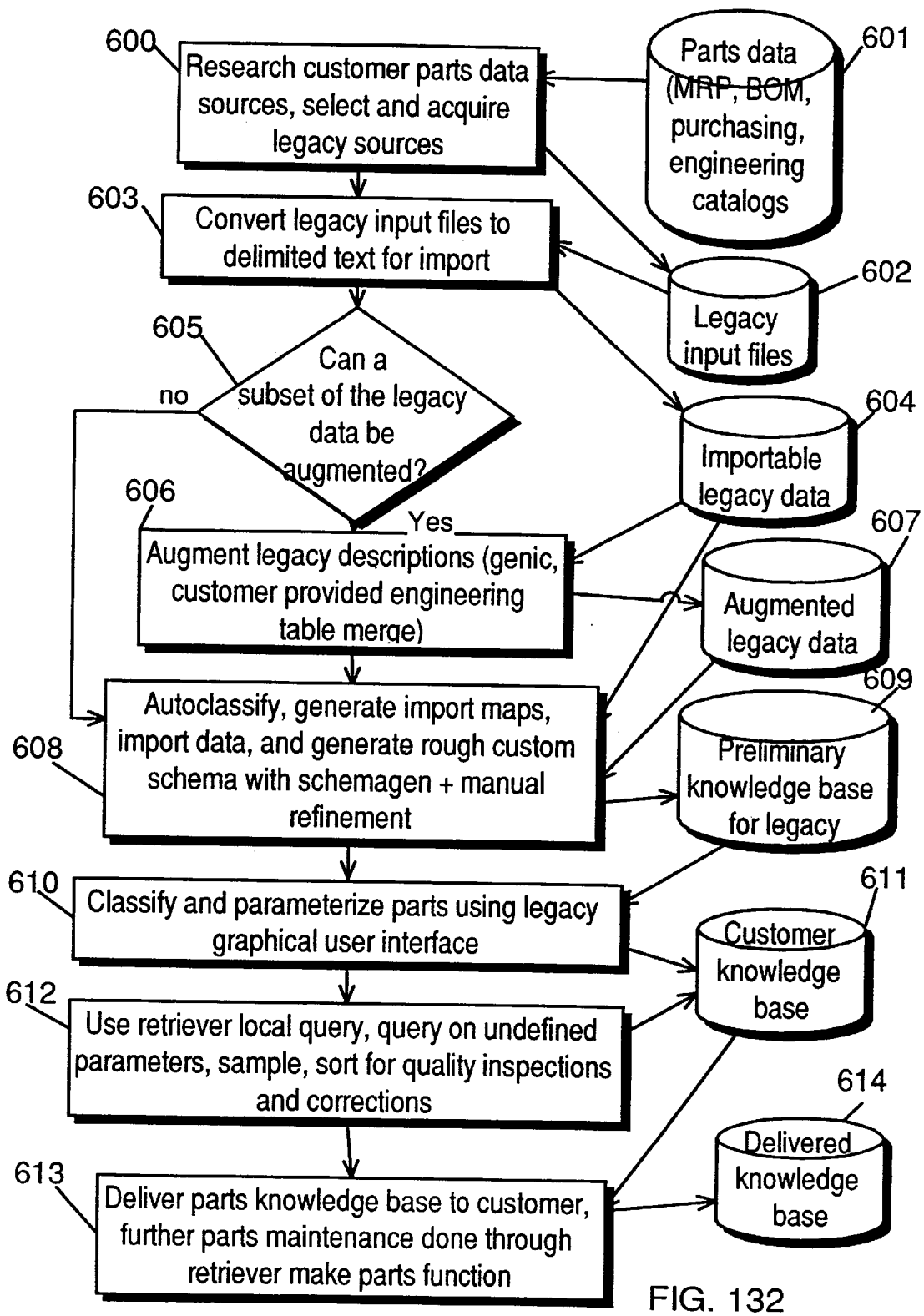

FIG. 132 is a flow chart depicting the process for legacy processing.

Figure 133:
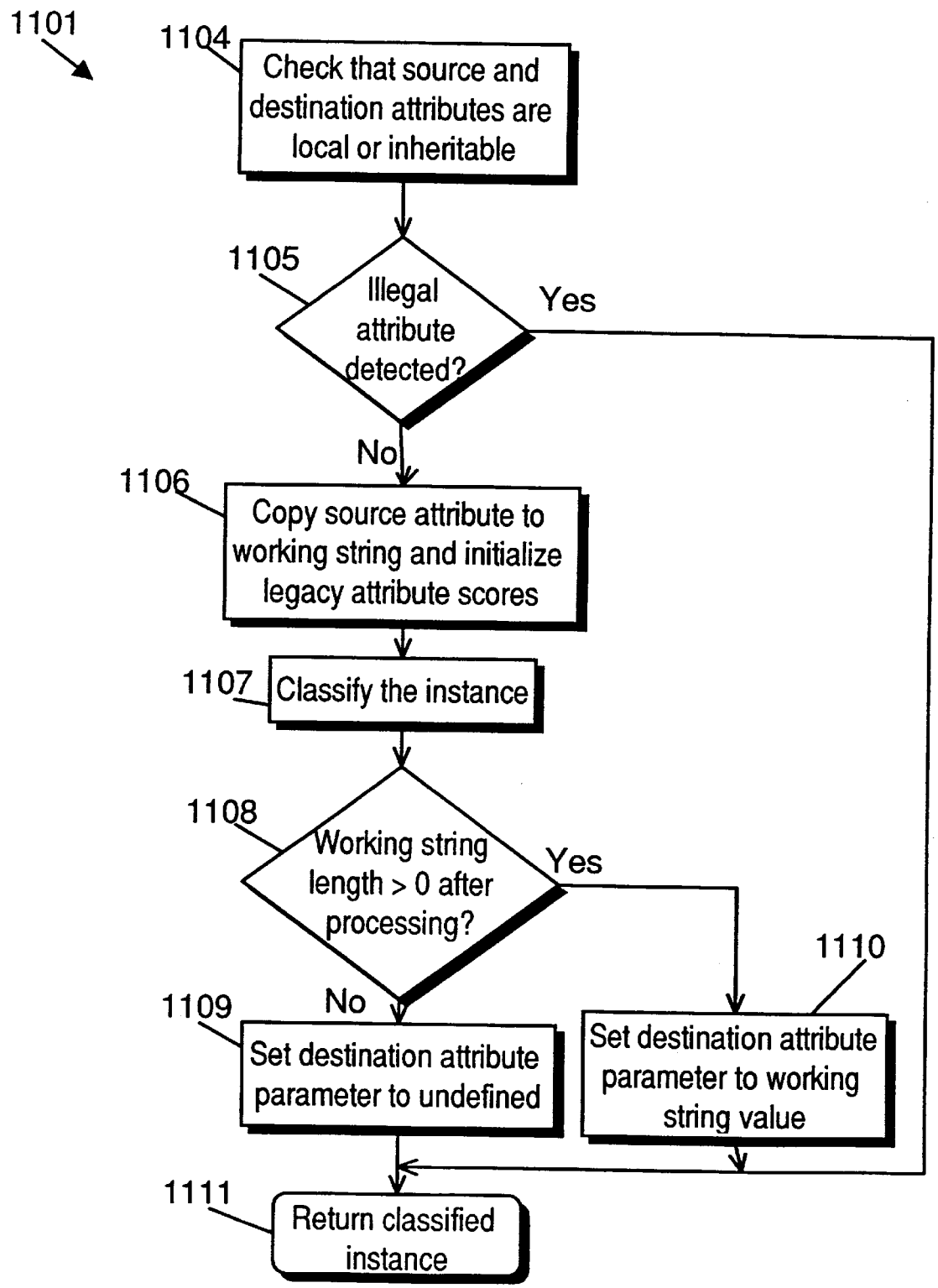

FIG. 133 is a flow chart depicting automatic part classification function of the legacy manager.

Figure 134:
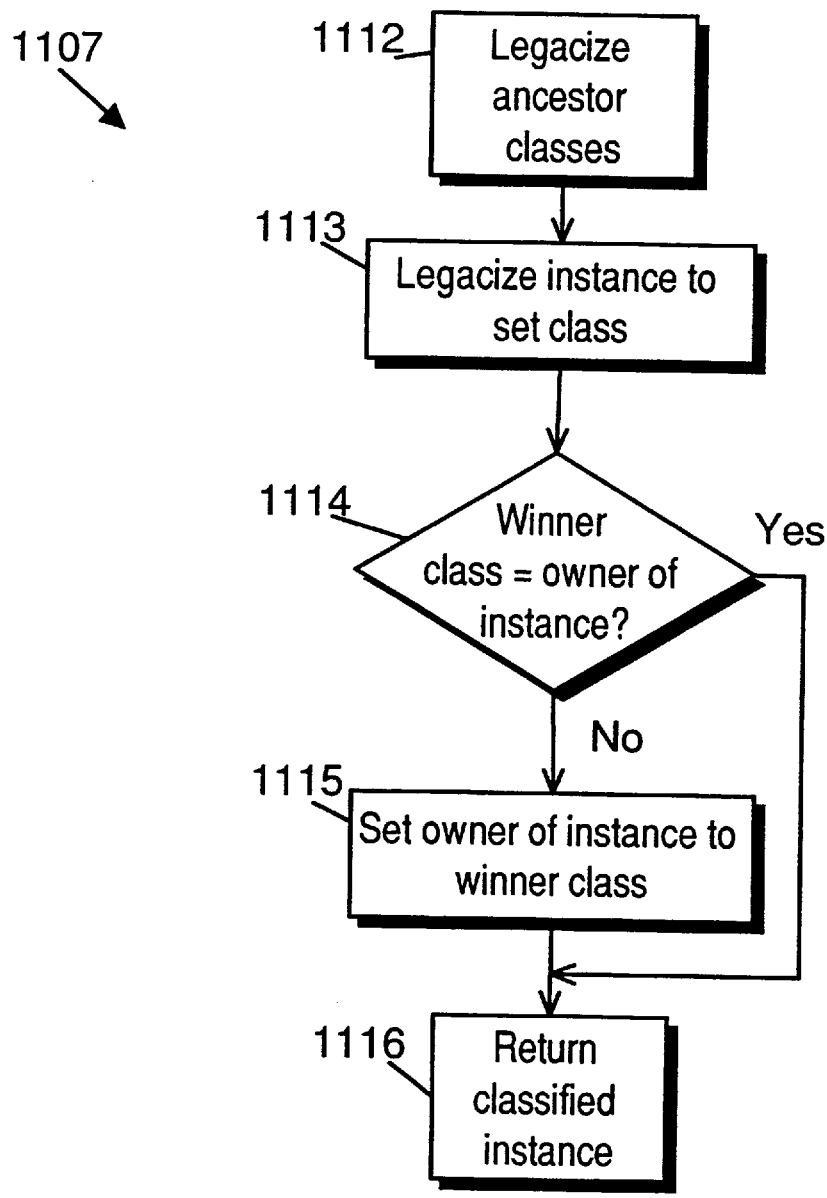

FIG. 134 is a flow chart depicting the method for classifying a part in the legacy process.

Figure 135:
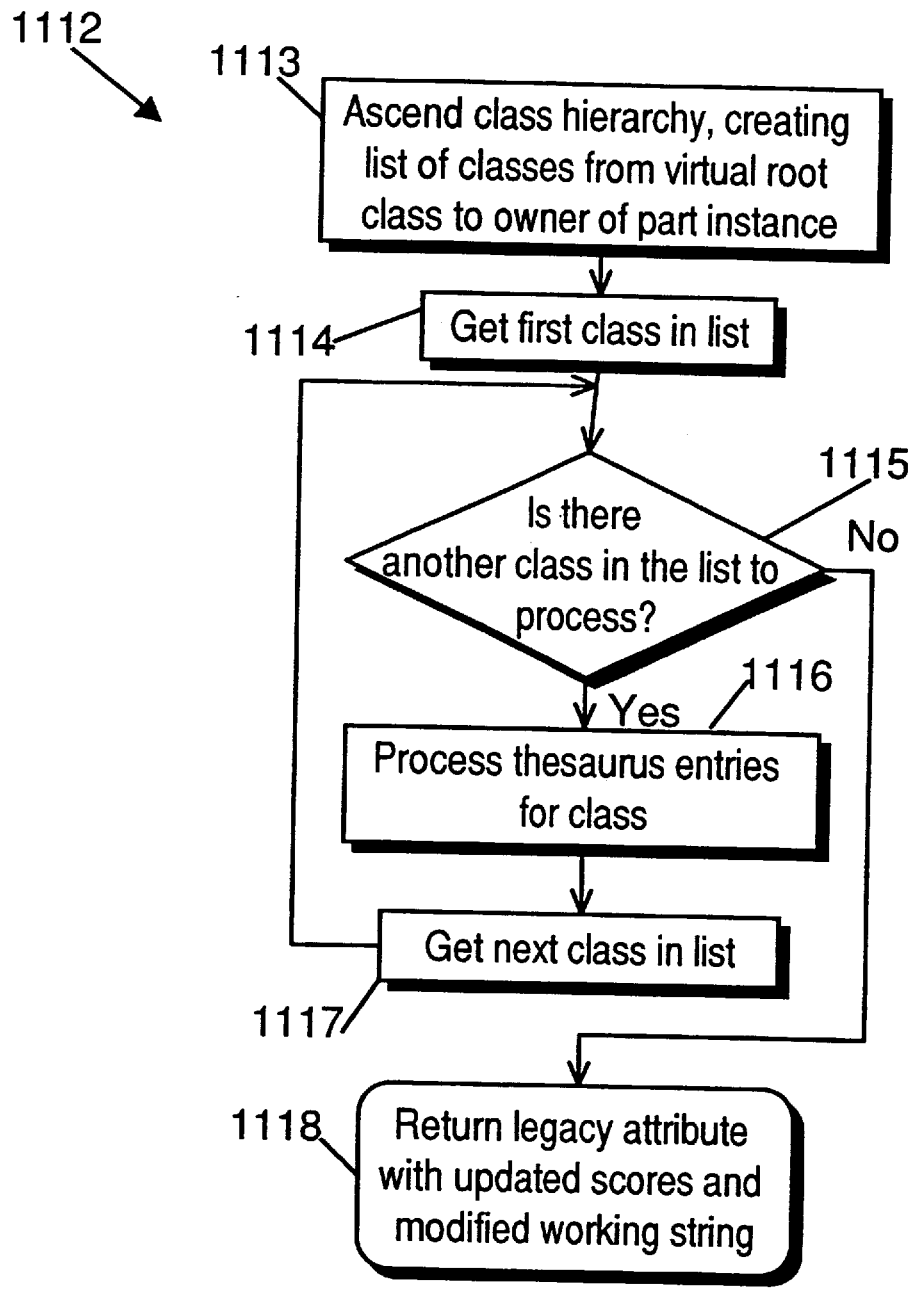

FIG. 135 is a flow chart depicting legacizing ancestor parts.

Figure 136:
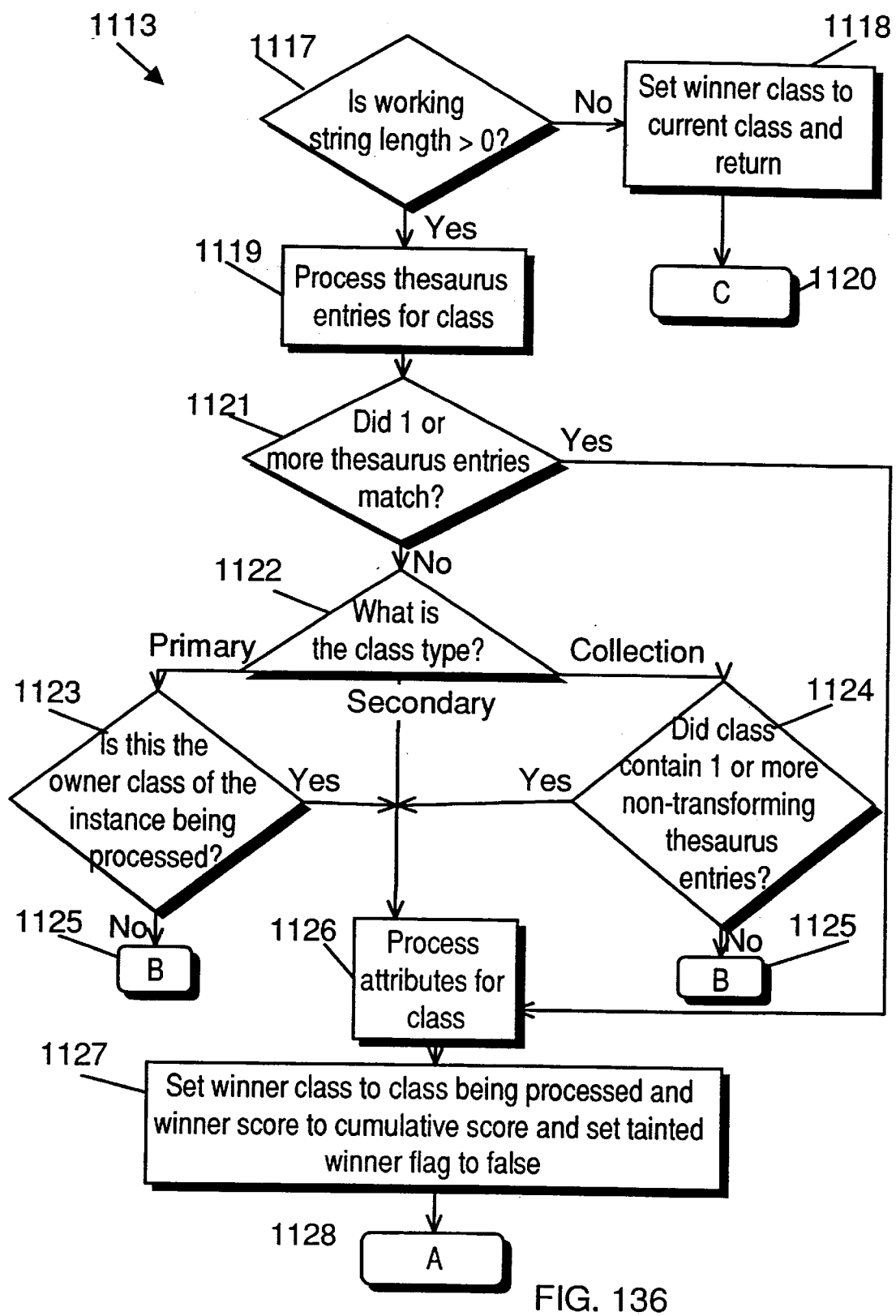

FIG. 136 is a flow chart depicting the method for legacizing an instance.

Figure 137:
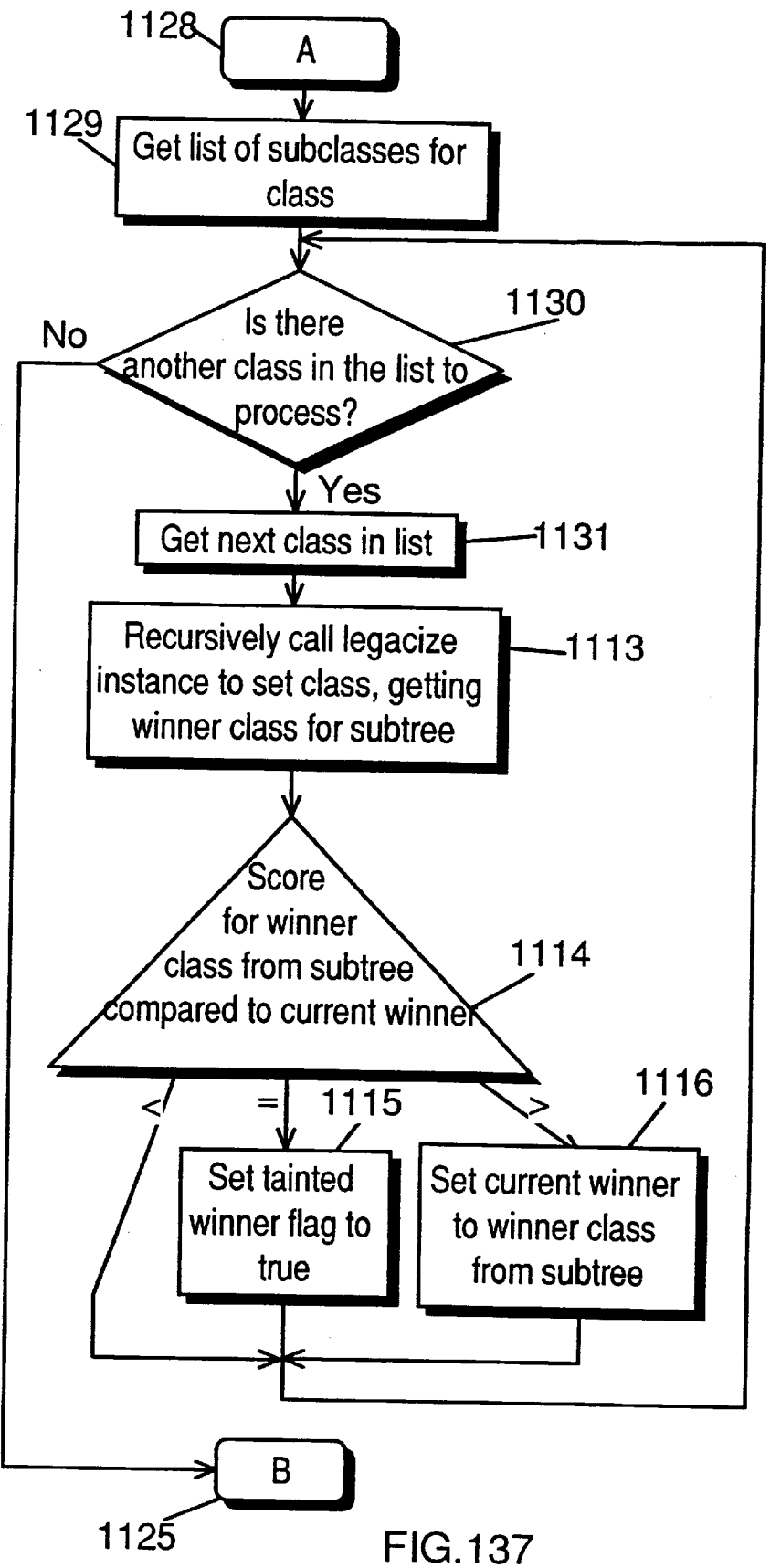

FIG. 137 is a continuation of the flow chart in FIG. 136.

Figure 138:
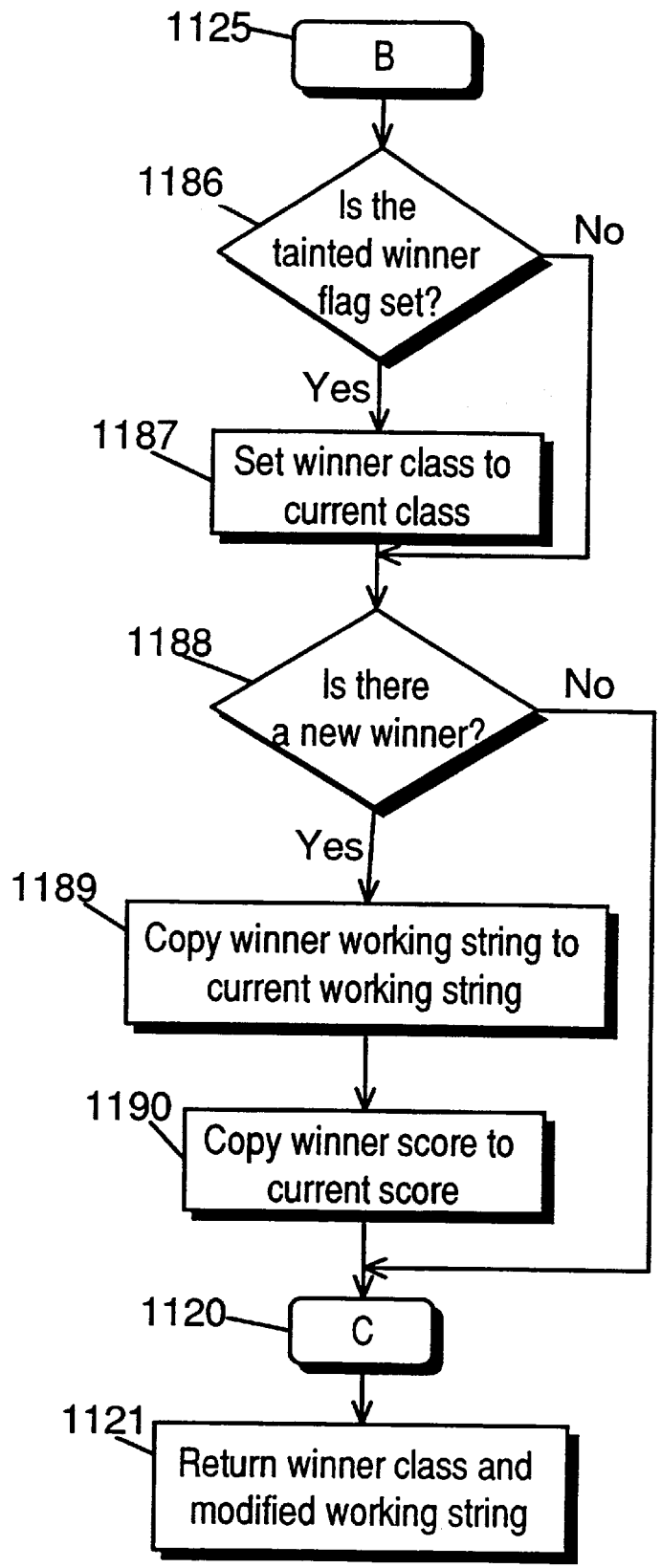

FIG. 138 is a continuation of the flow chart in FIG. 137.

Figure 139:
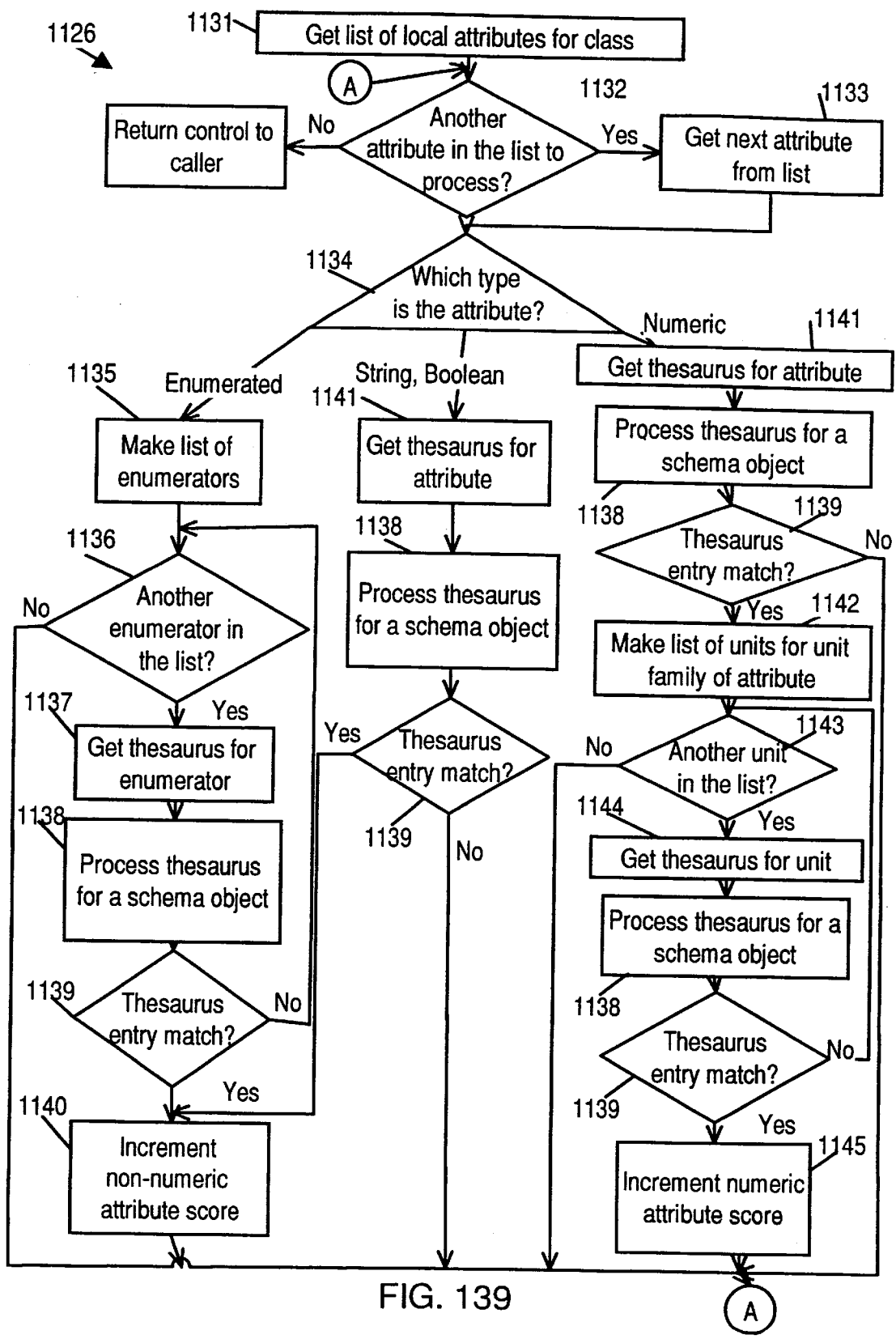

FIG. 139 is a flow chart depicting processing the attributes for a class for classification.

Figure 140:
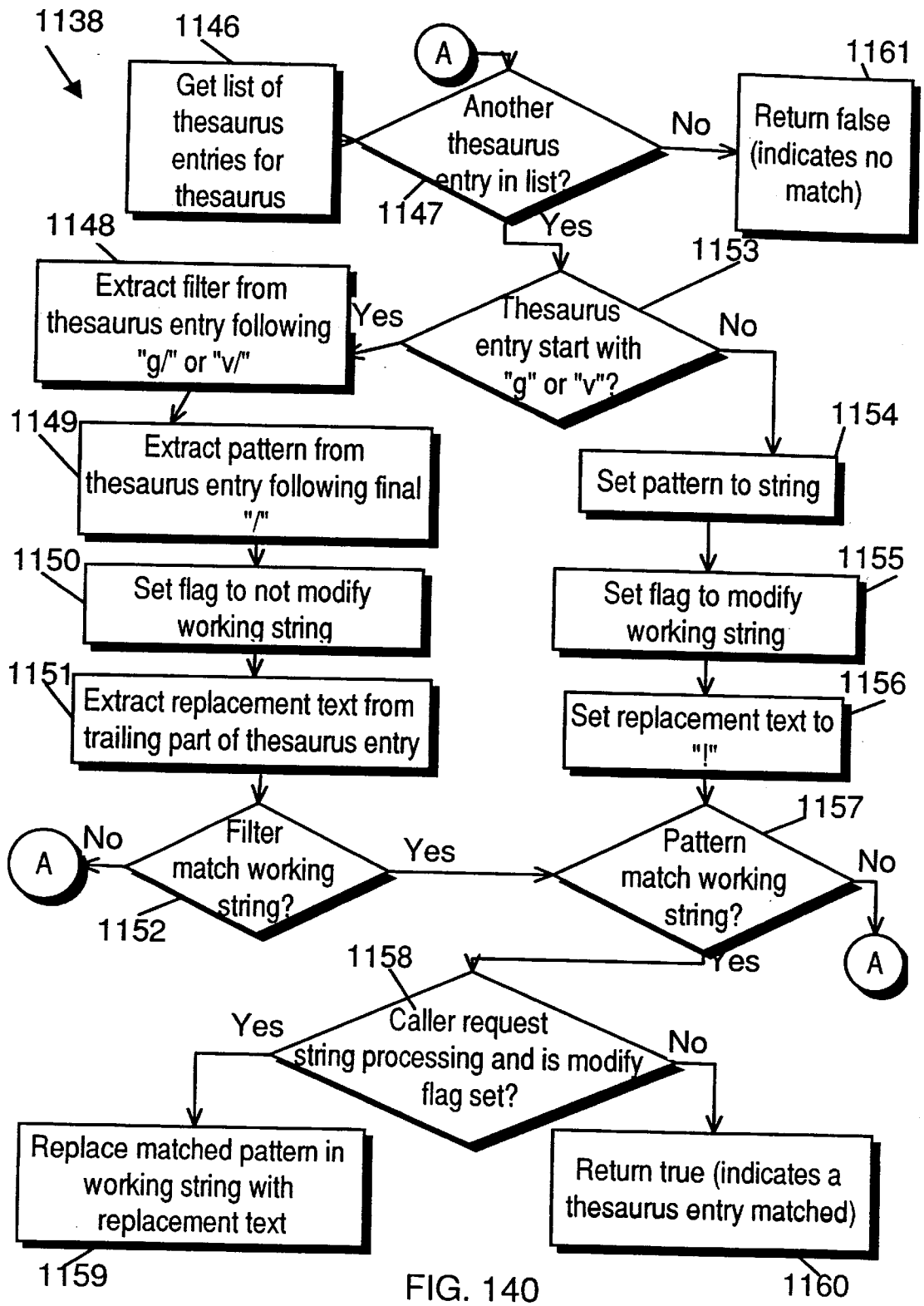

FIG. 140 is a flow chart depicting processing a thesaurus for a schema object.

Figure 141:
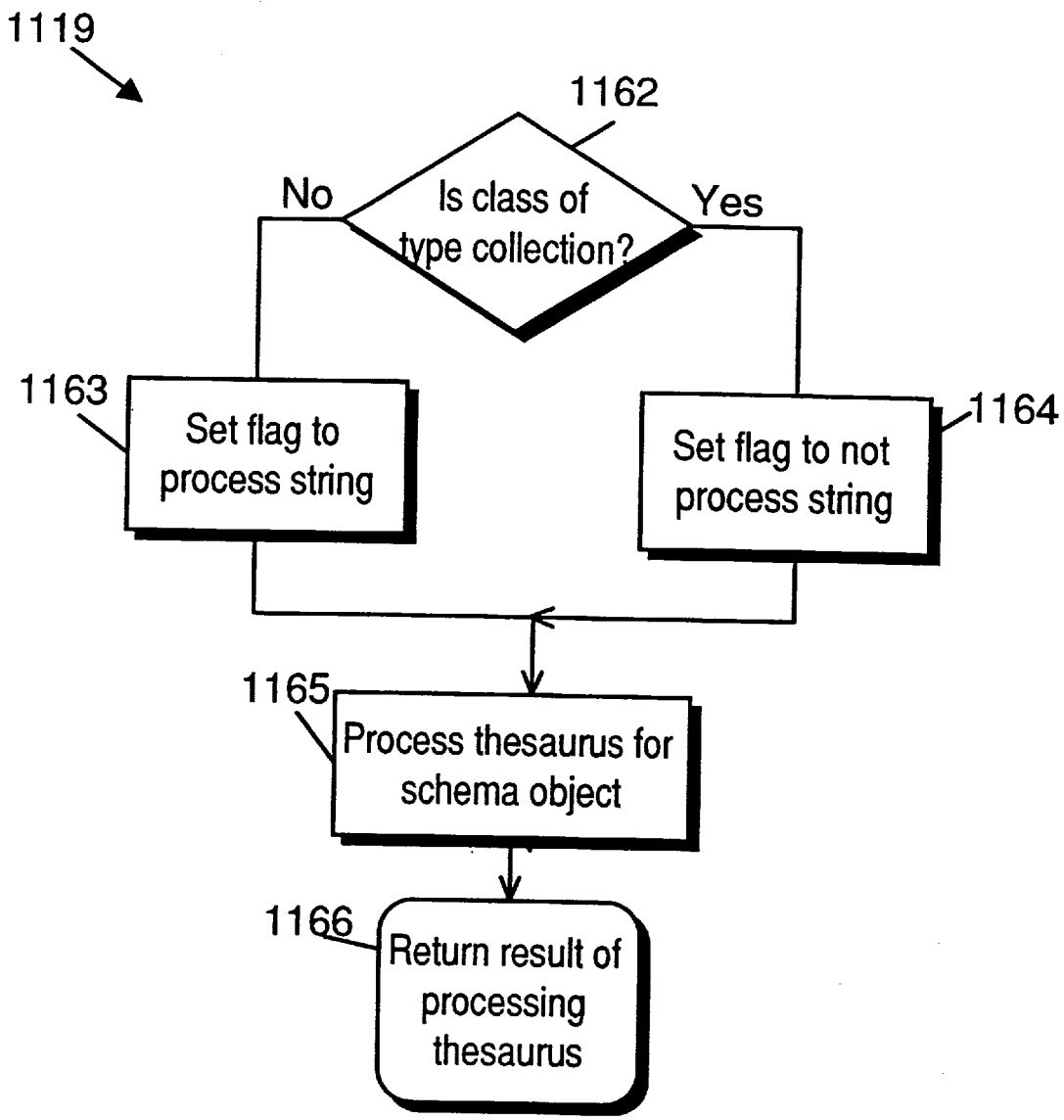

FIG. 141 is a flow chart depicting legacizing a class thesaurus.

Figure 142:
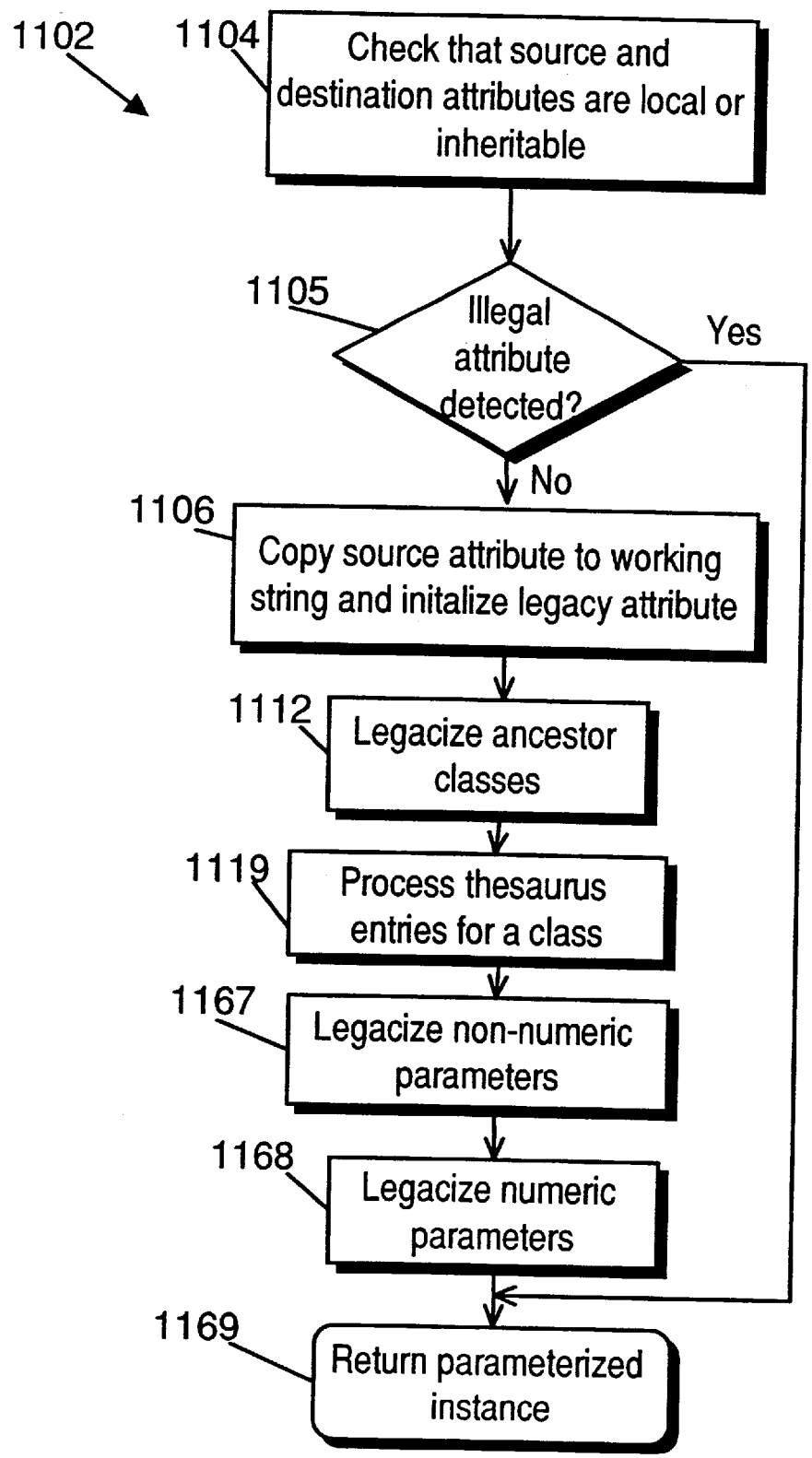

FIG. 142 is a flow chart depicting parameterizing a part instance.

Figure 143:
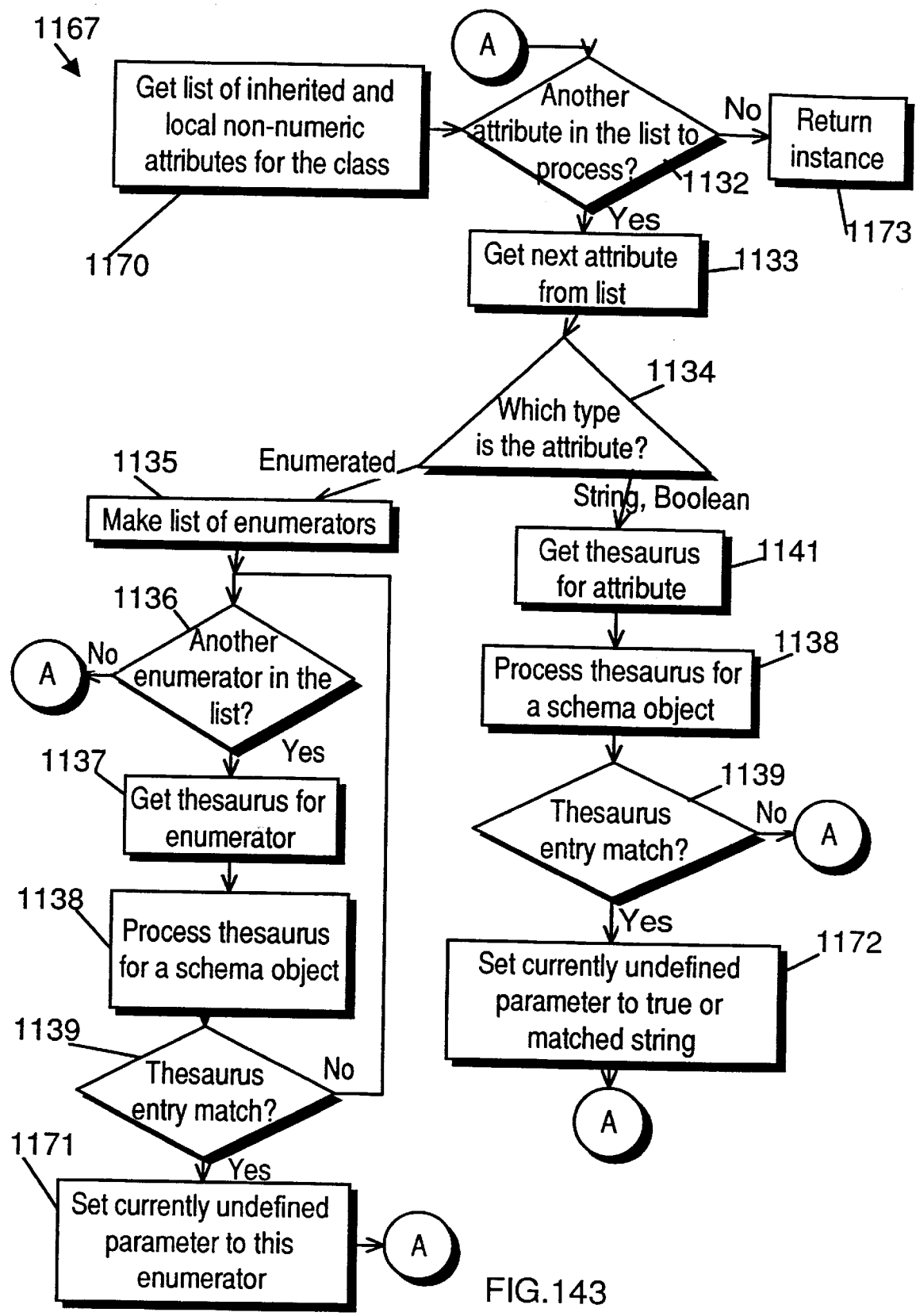

FIG. 143 is a flow chart depicting legacizing non-numeric attributes for a class.

Figure 144:
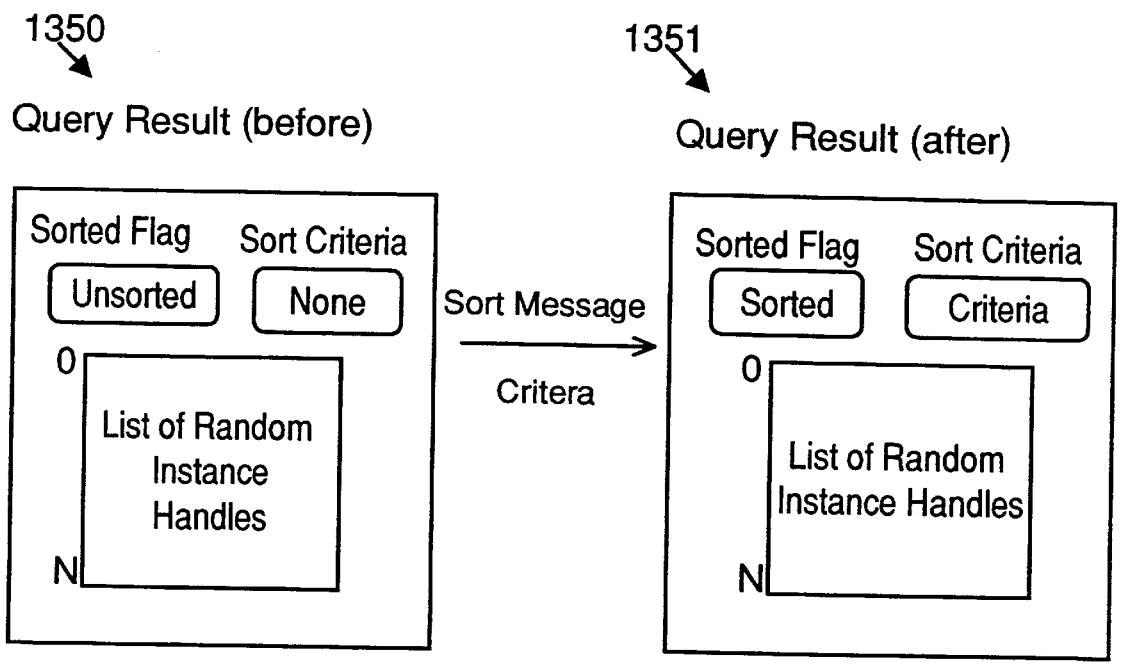

FIG. 144 is a diagram depicting the state of a query result before and after processing a sort request.

Figure 145:
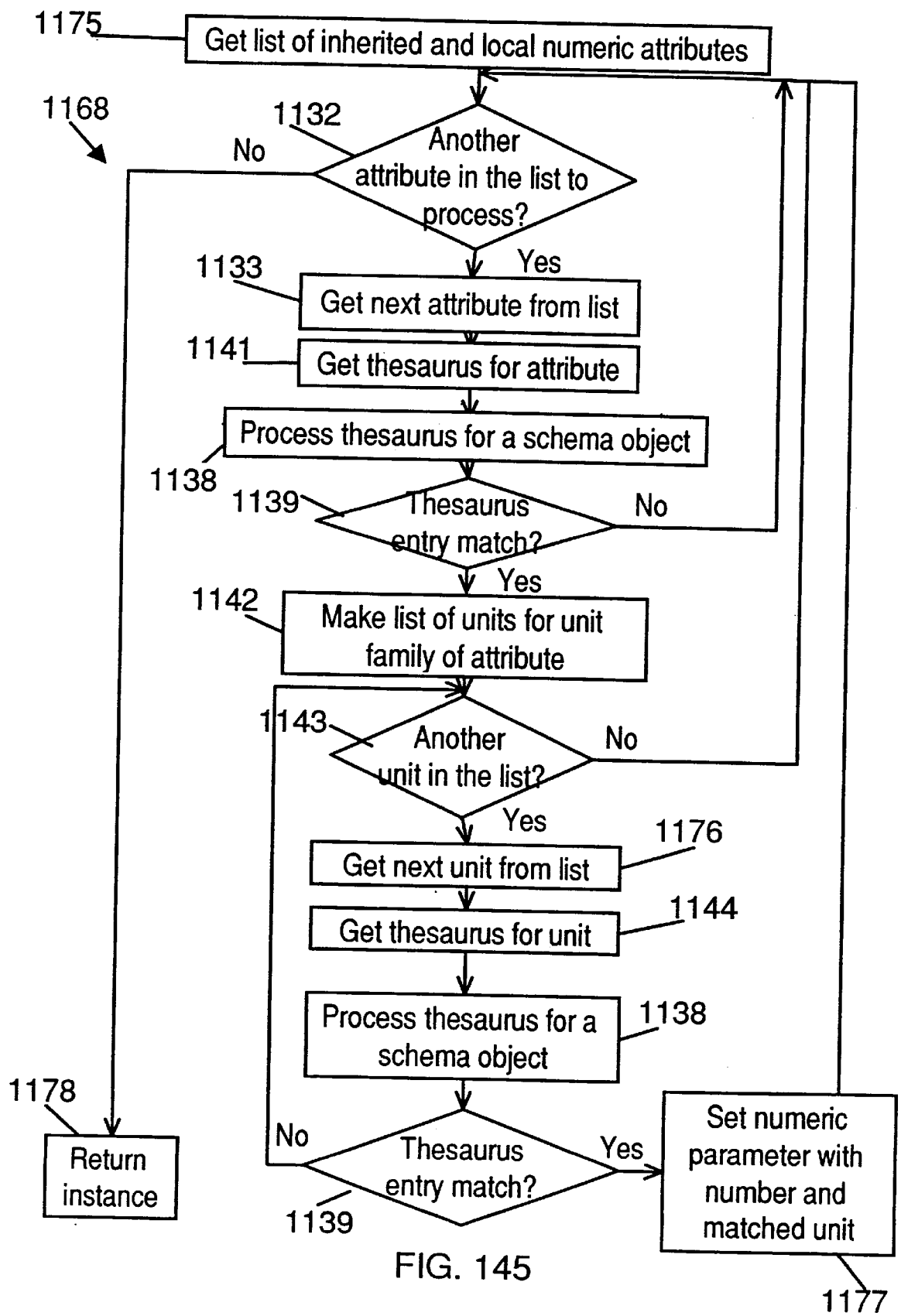

FIG. 145 is a flowchart showing the legacy internal process for a numeric attribute.

Figure 146:
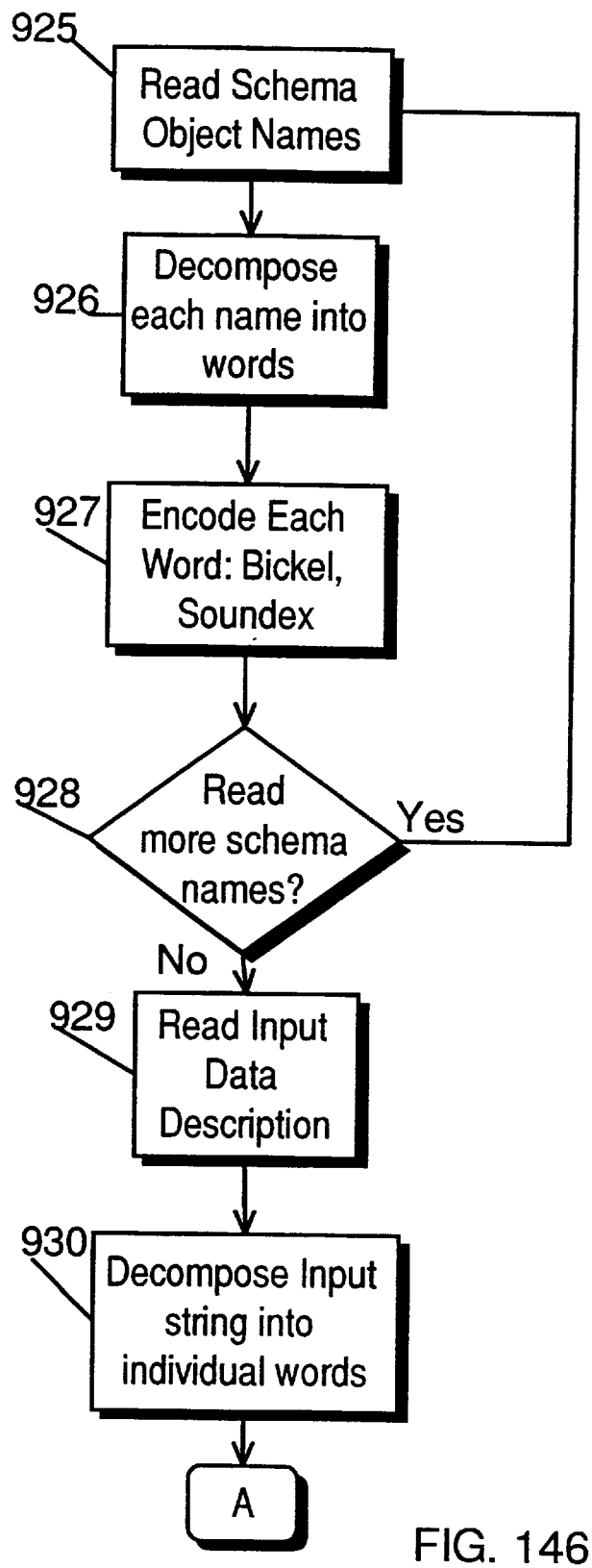

FIG. 146 is a flow chart depicting the internal working of the classifier.

Figure 147:
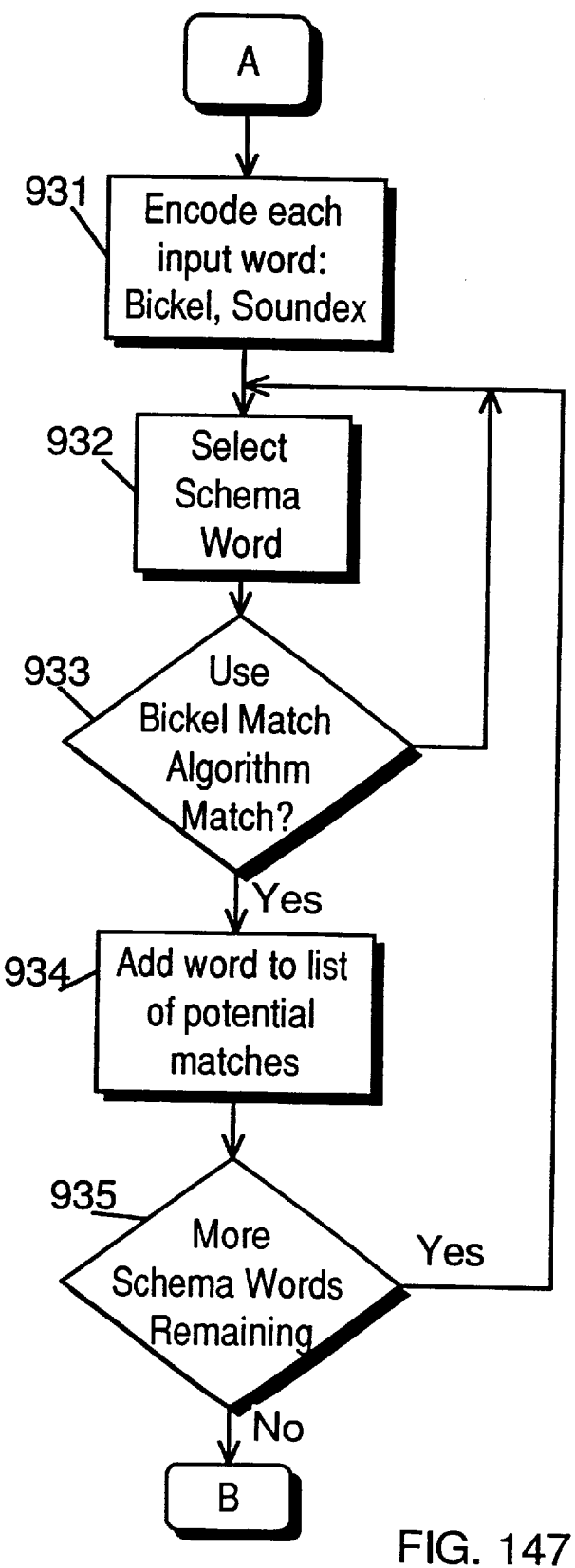

FIG. 147 is a continuation of the flow chart in FIG. 146.

Figure 148:
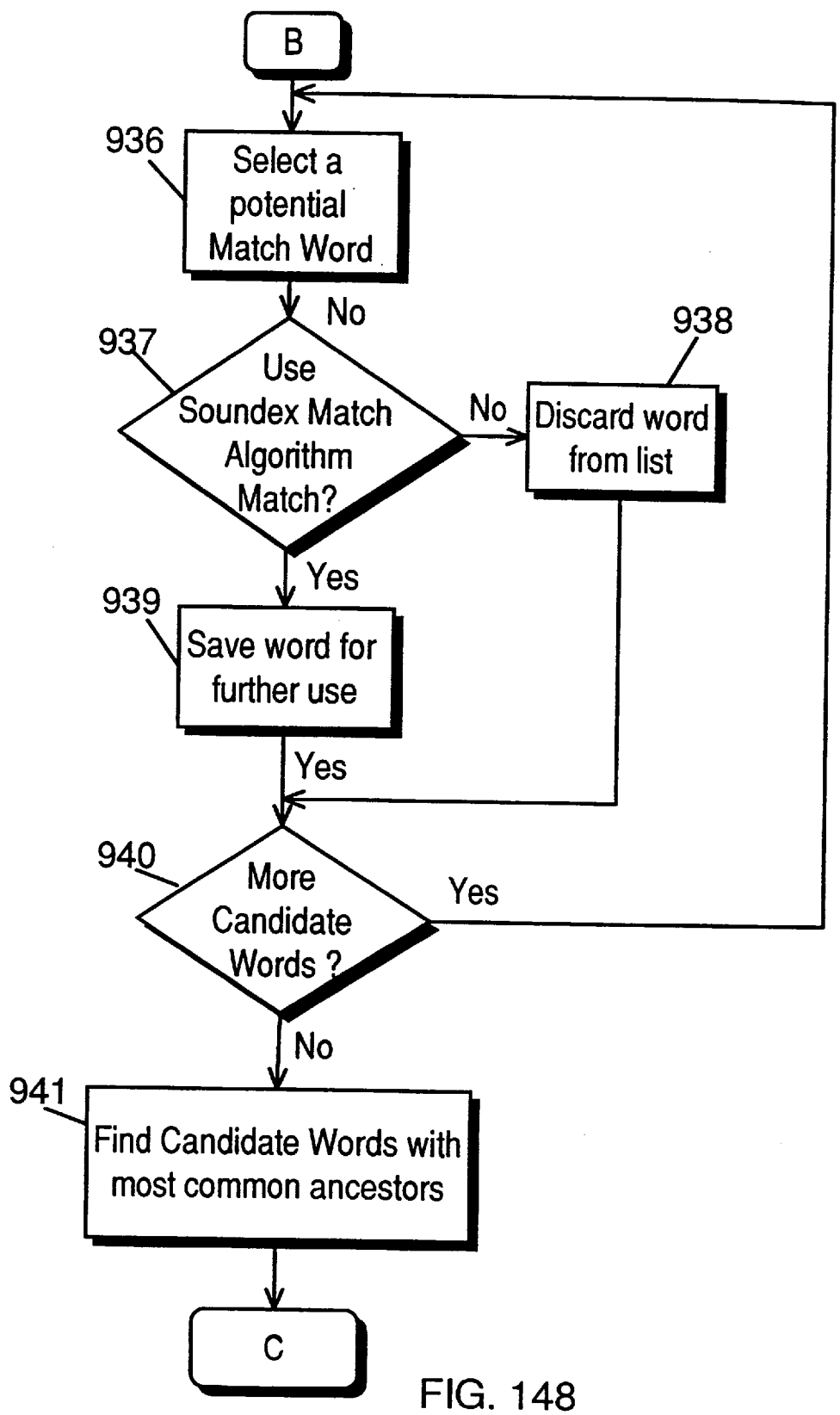

FIG. 148 is a continuation of the flow chart in FIG. 147.

Figure 149:
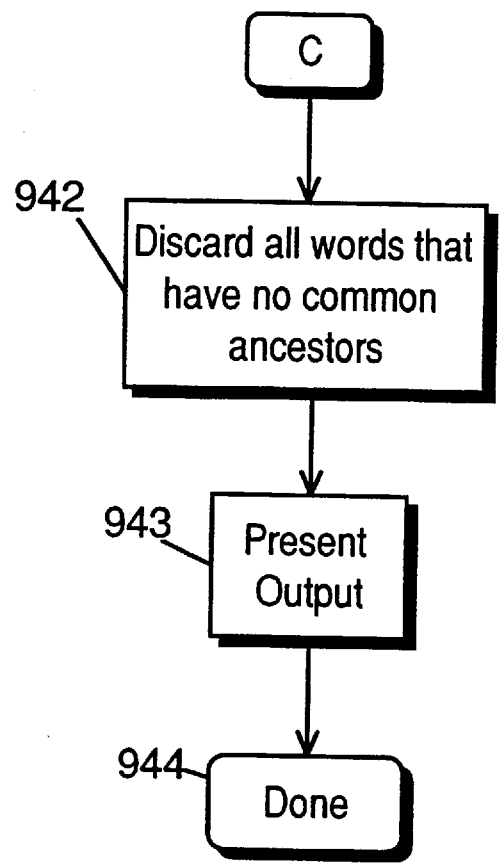

FIG. 149 is a continuation of the flow chart in FIG. 148.

Figure 150:
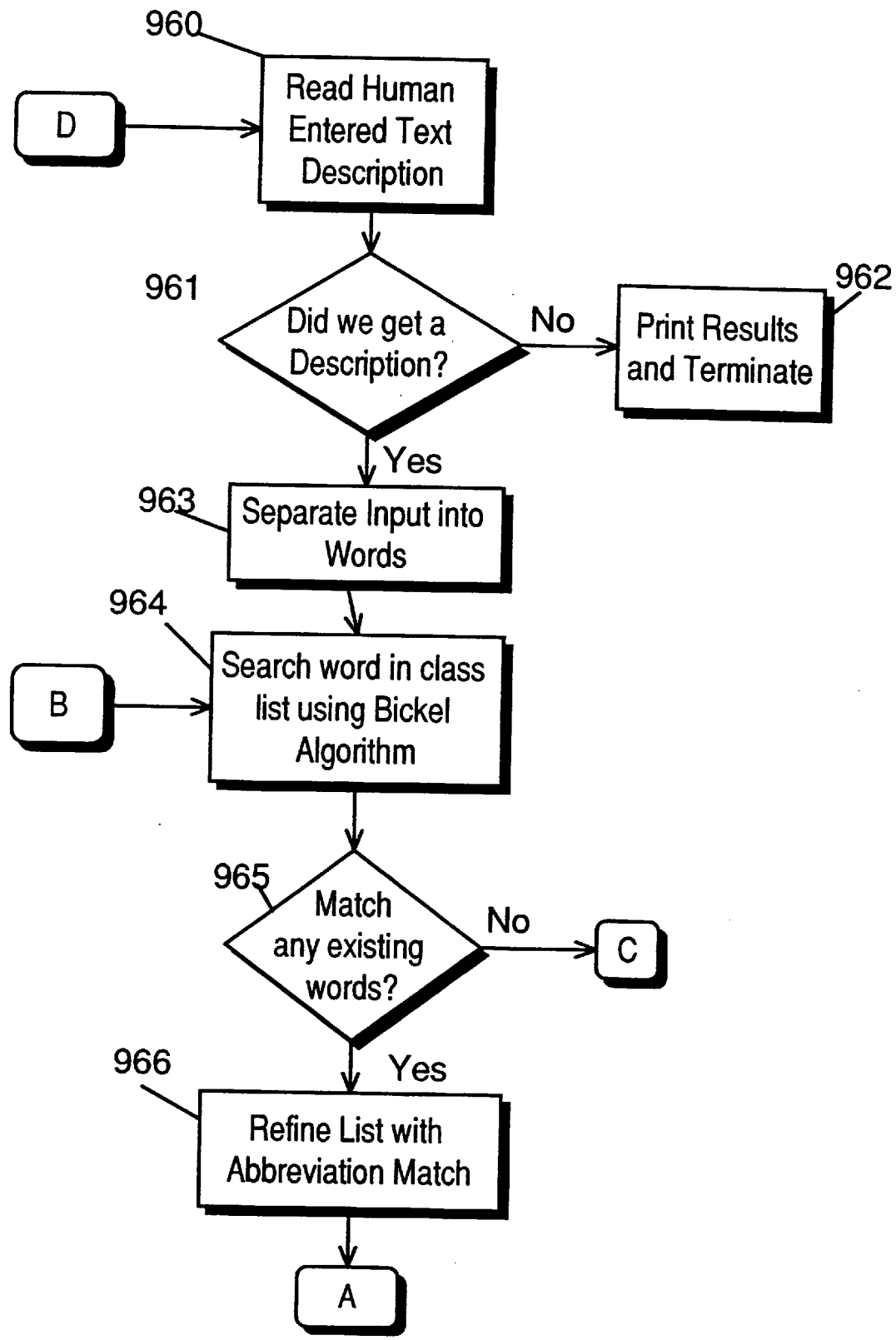

FIG. 150 is a flow chart depicting the internal working of the schema generator.

Figure 151:
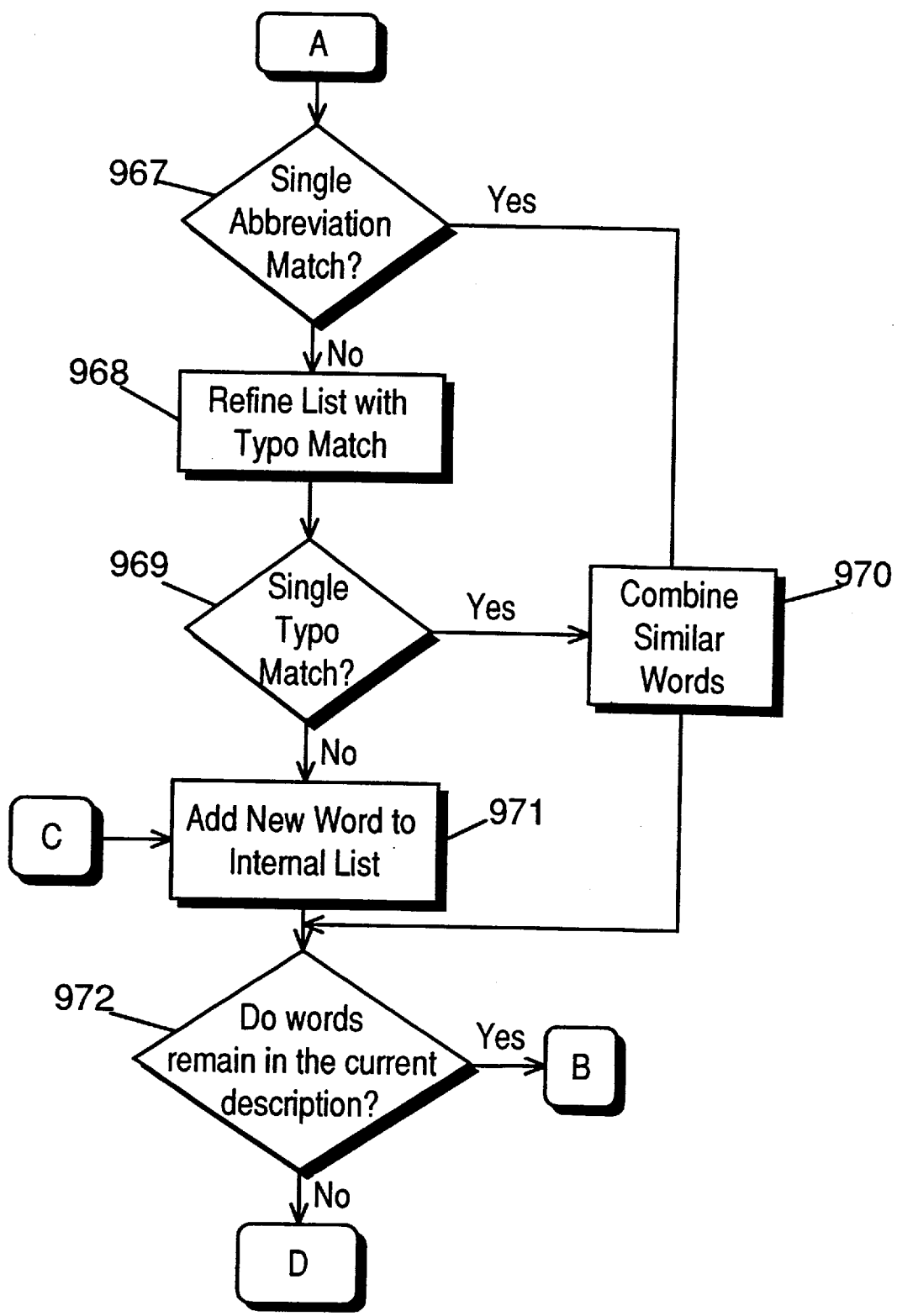

FIG. 151 is a continuation of FIG. 150.

Figure 152:
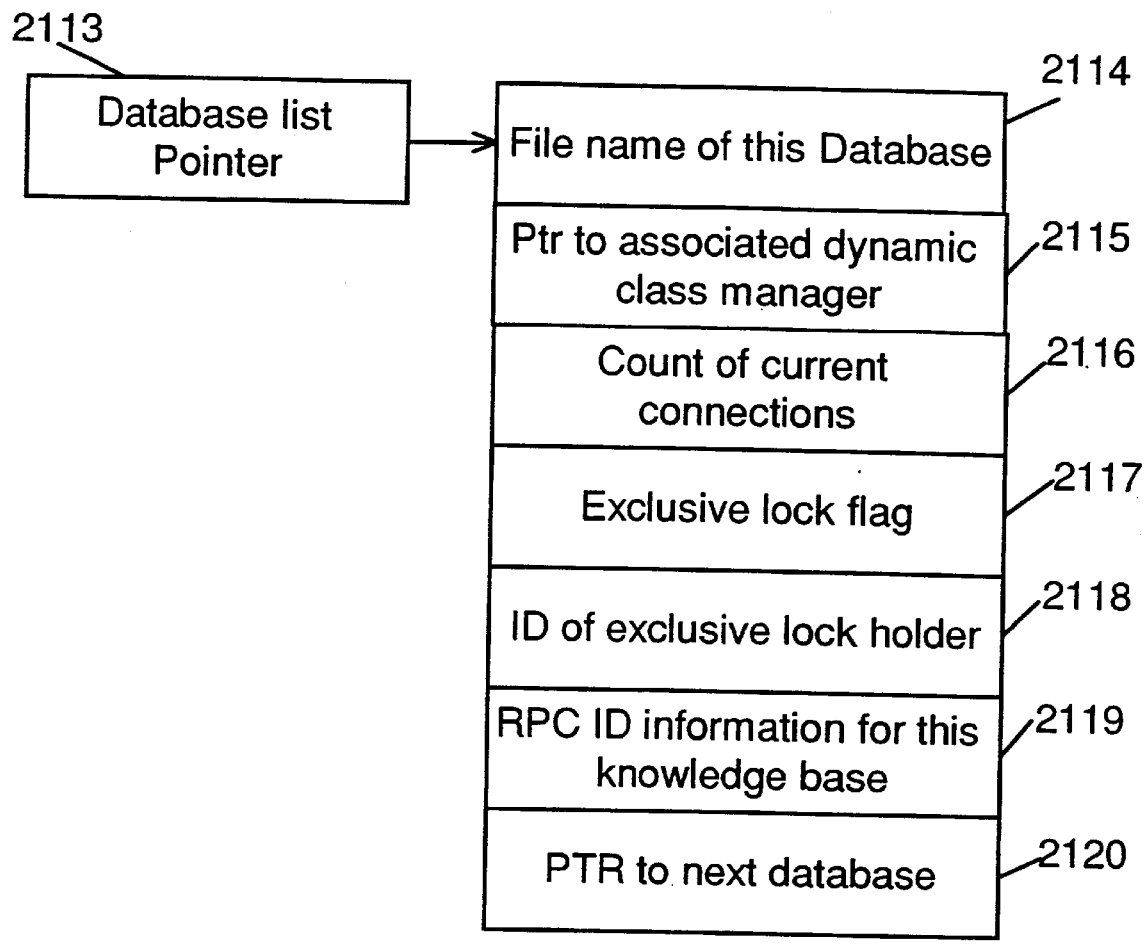

FIG. 152 is a depiction of data structures in the database manager in the dynamic class manager.

Figure 153:
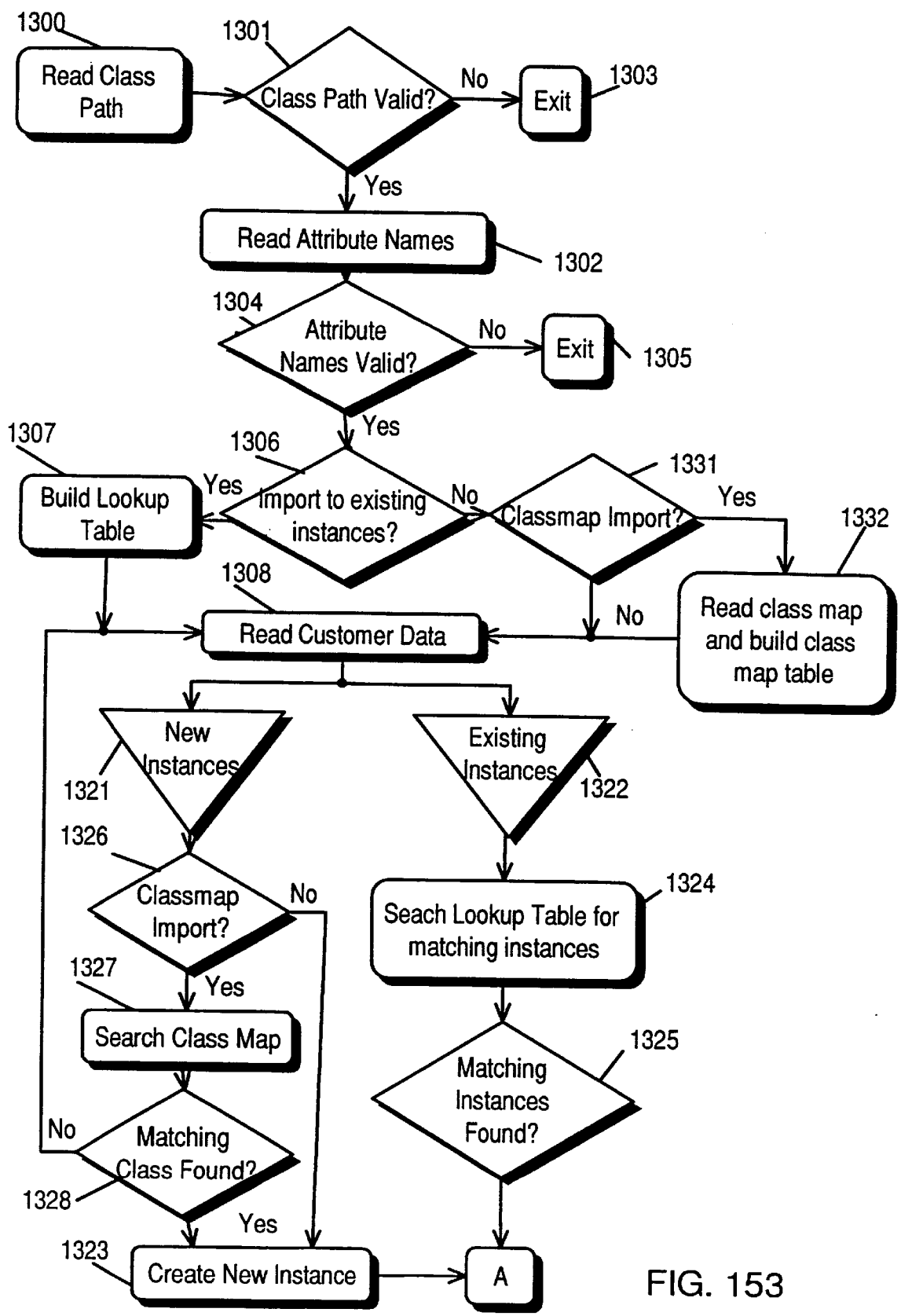

FIG. 153 is a flow chart of the internal processes of an import.

Figure 154:
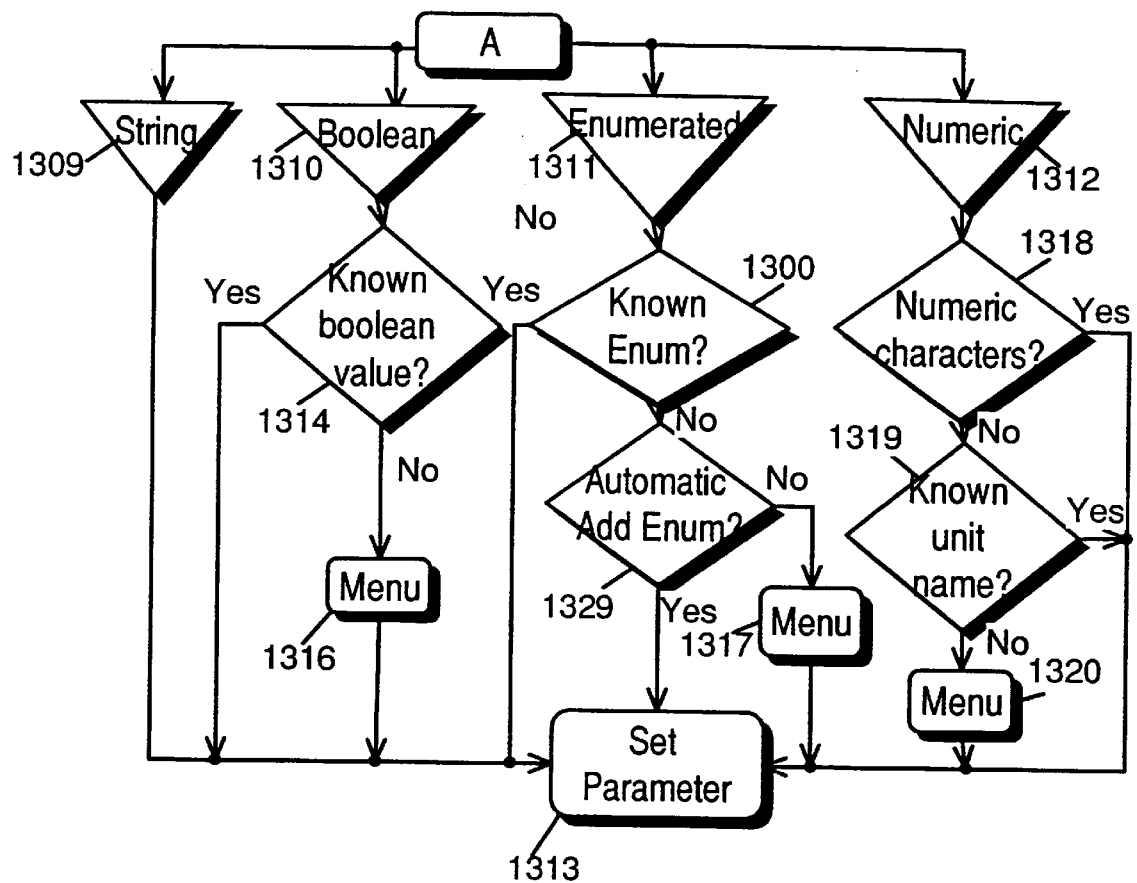

FIG. 154 is a continuation of FIG. 153.

Figure 155:
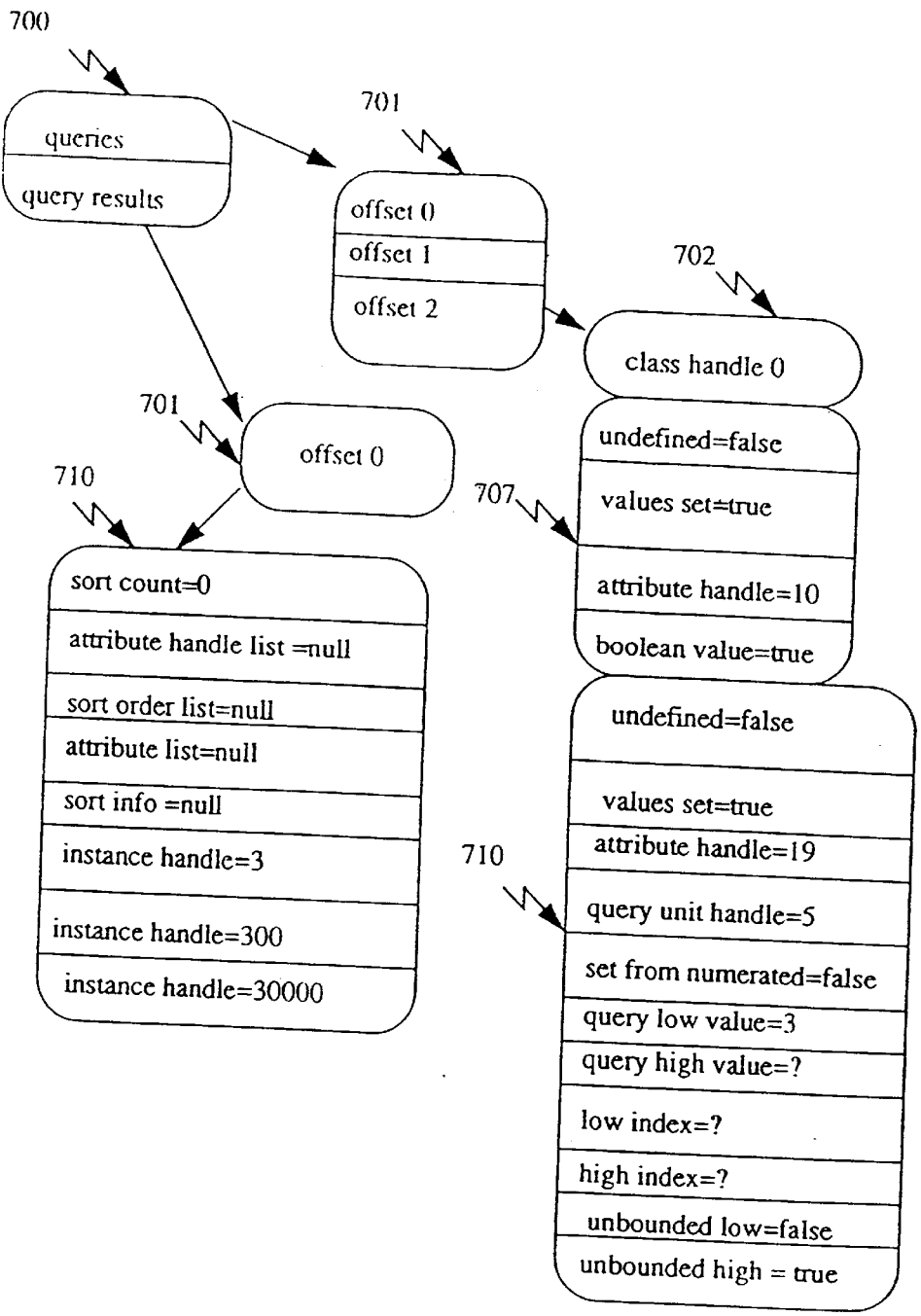

FIG. 155 depicts the data structures in the query manager after applying a query.

Figure 156:
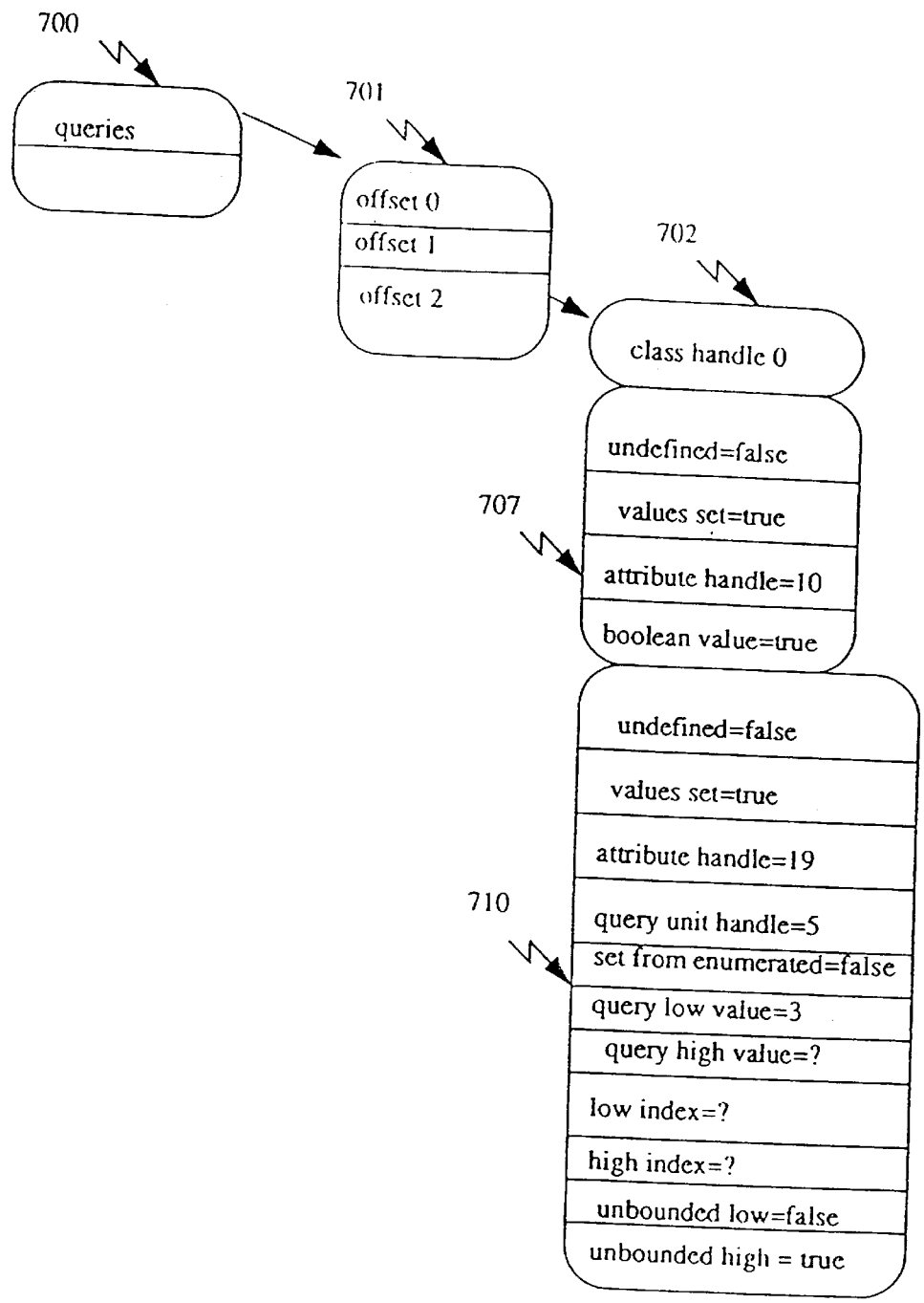

FIG. 156 depicts the data structures in the query manager after setting a numeric query selector.

Figure 157:
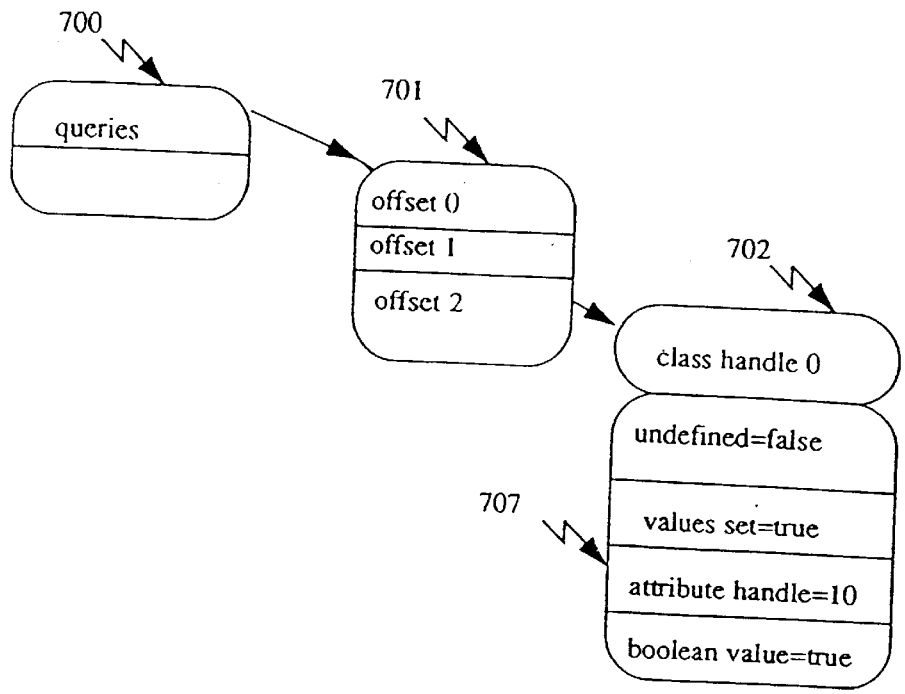

FIG. 157 depicts the data structures in the query manager after setting a boolean query selector.

Figure 158:
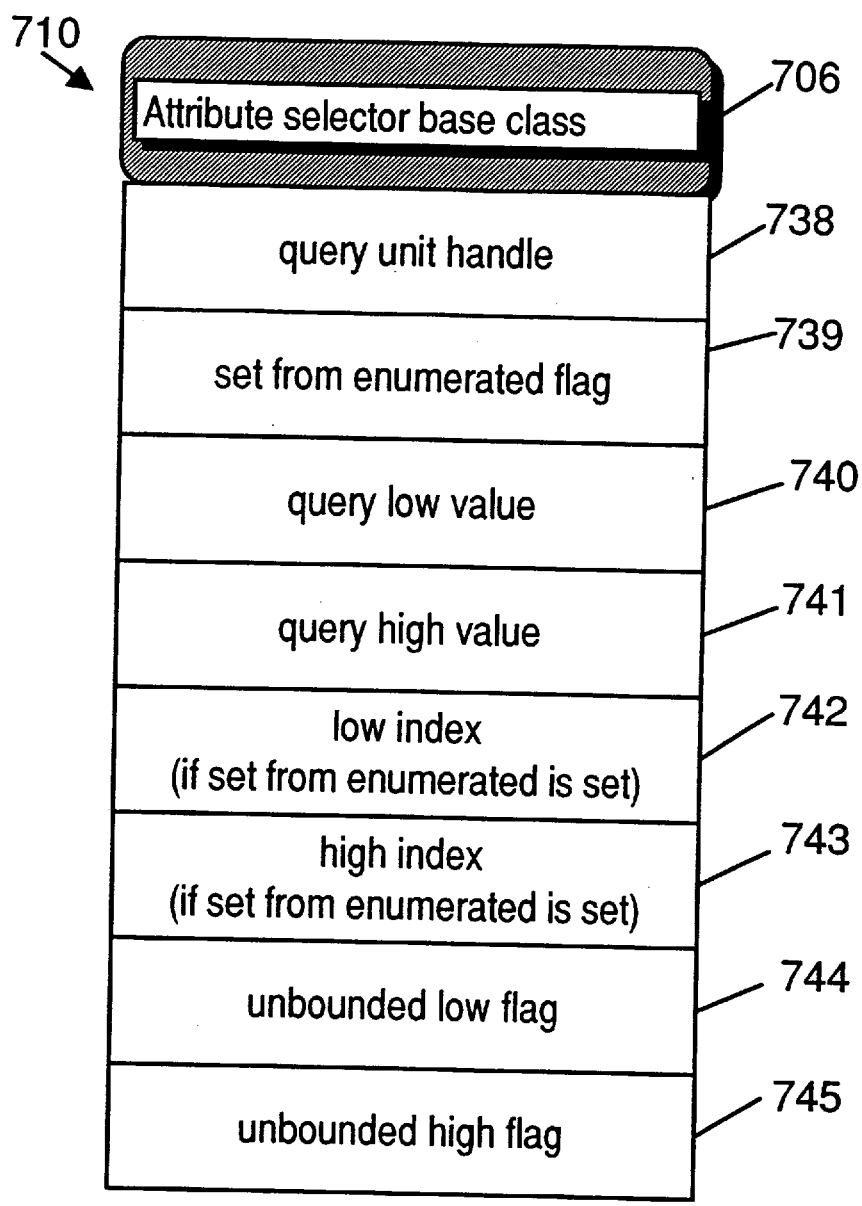

FIG. 158 shows a numeric query selector class in the query manager.

Figure 159:
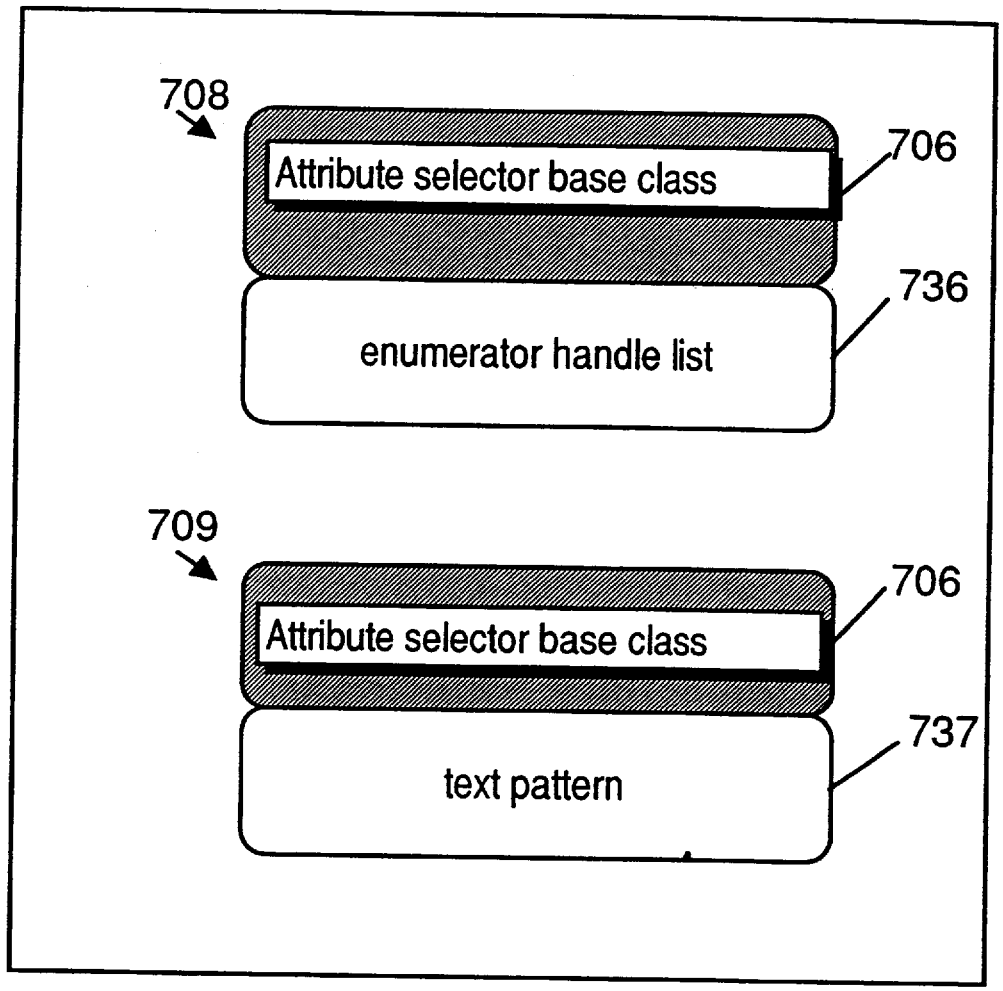

FIG. 159 shows an enumerated query selector class and a string query selector class in the query manager.

Figure 160:
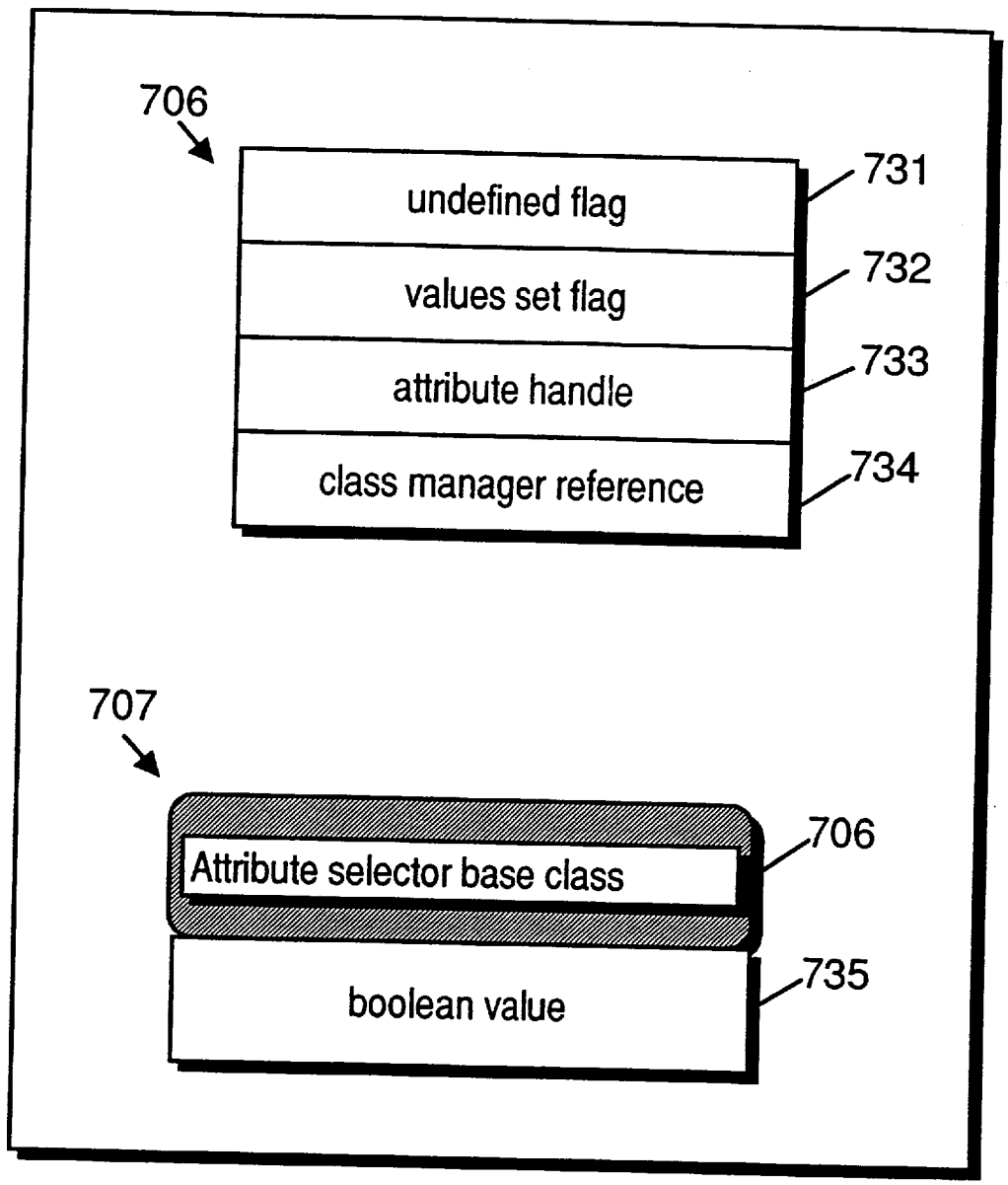

FIG. 160 shows the base query or class and the boolean selector class in the query manager.

Figure 161:
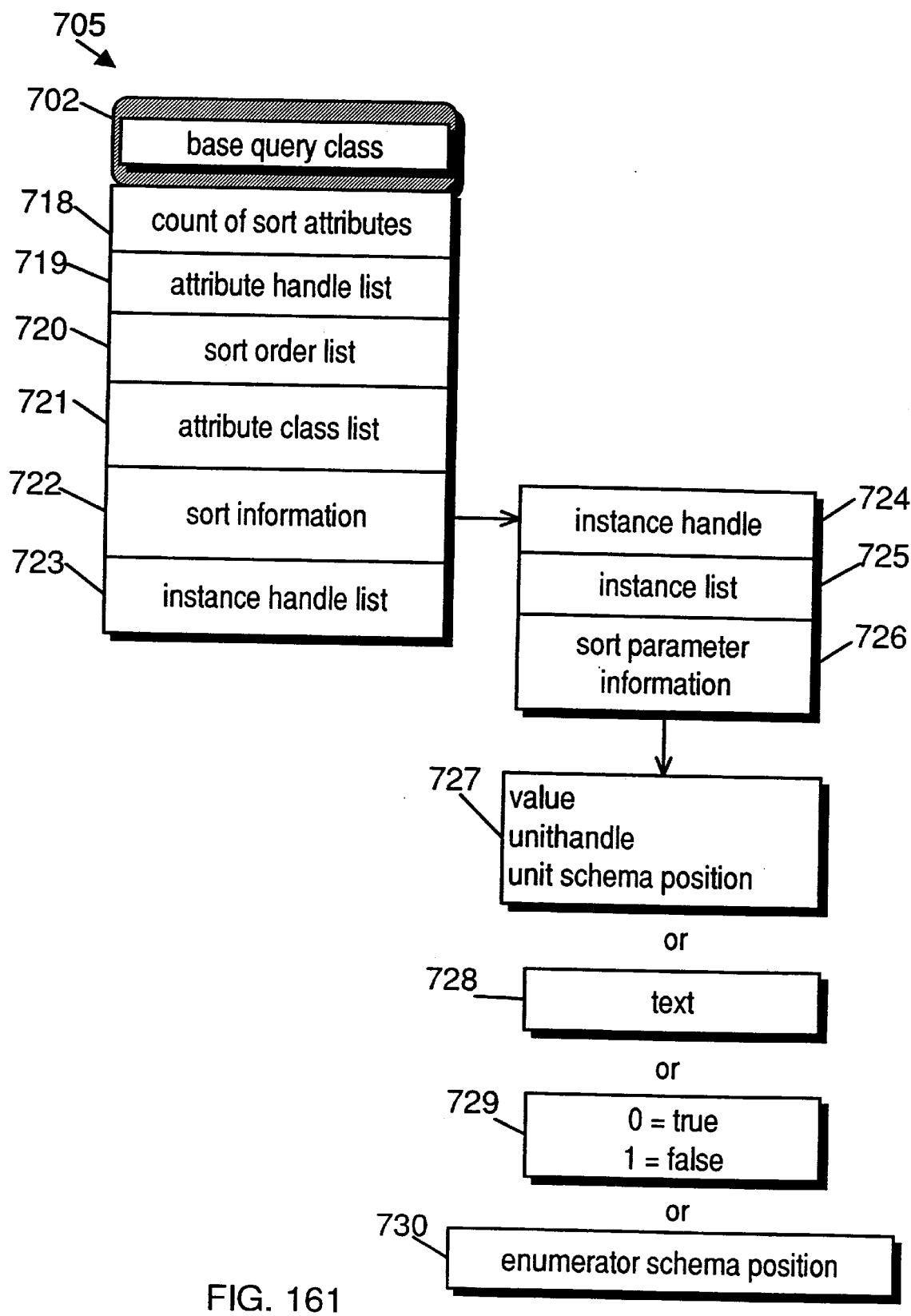

FIG. 161 depicts a query result class in the query manager.

Figure 162:
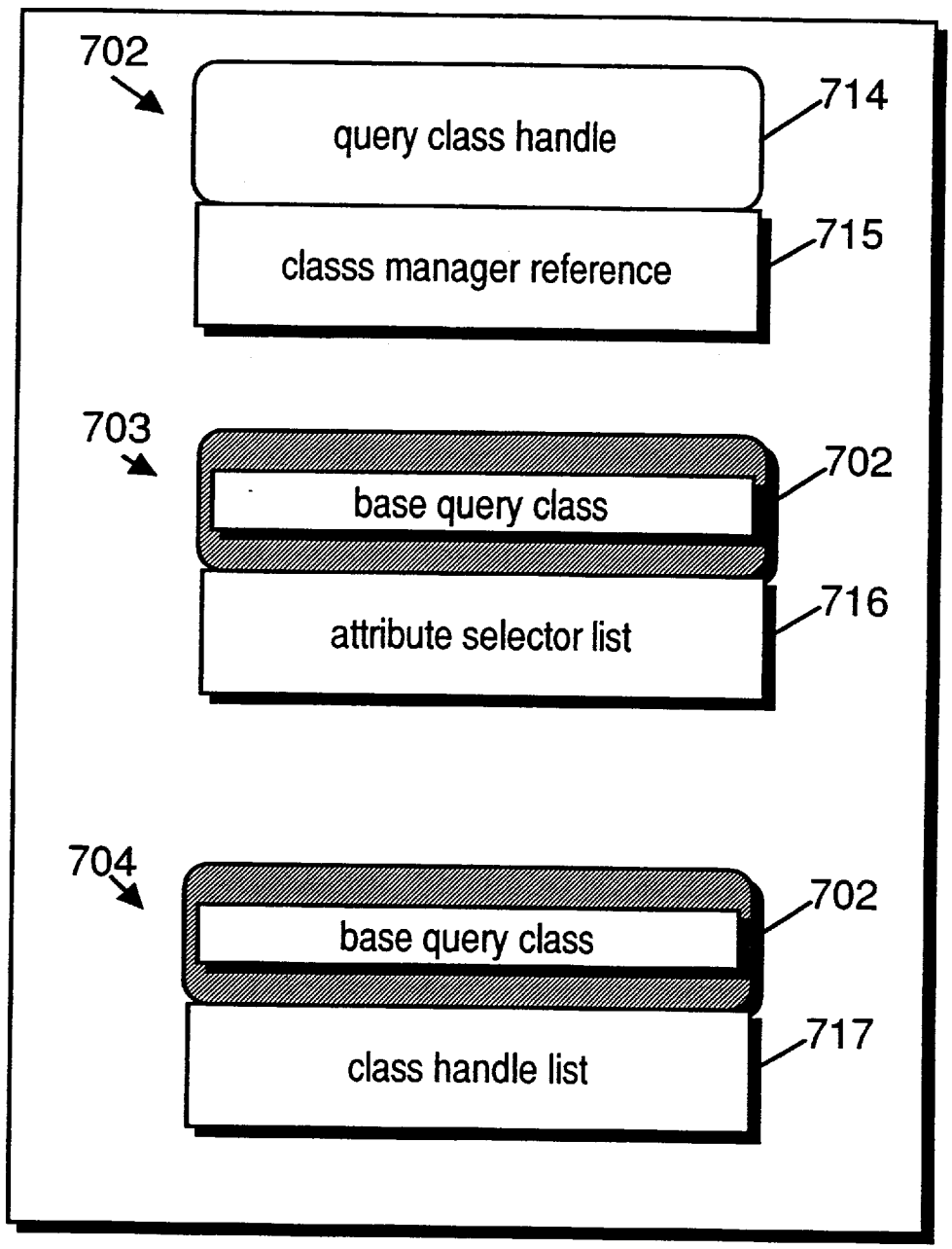

FIG. 162 depicts the base query class, the query class, and the search result class in the query manager.

Figure 163:
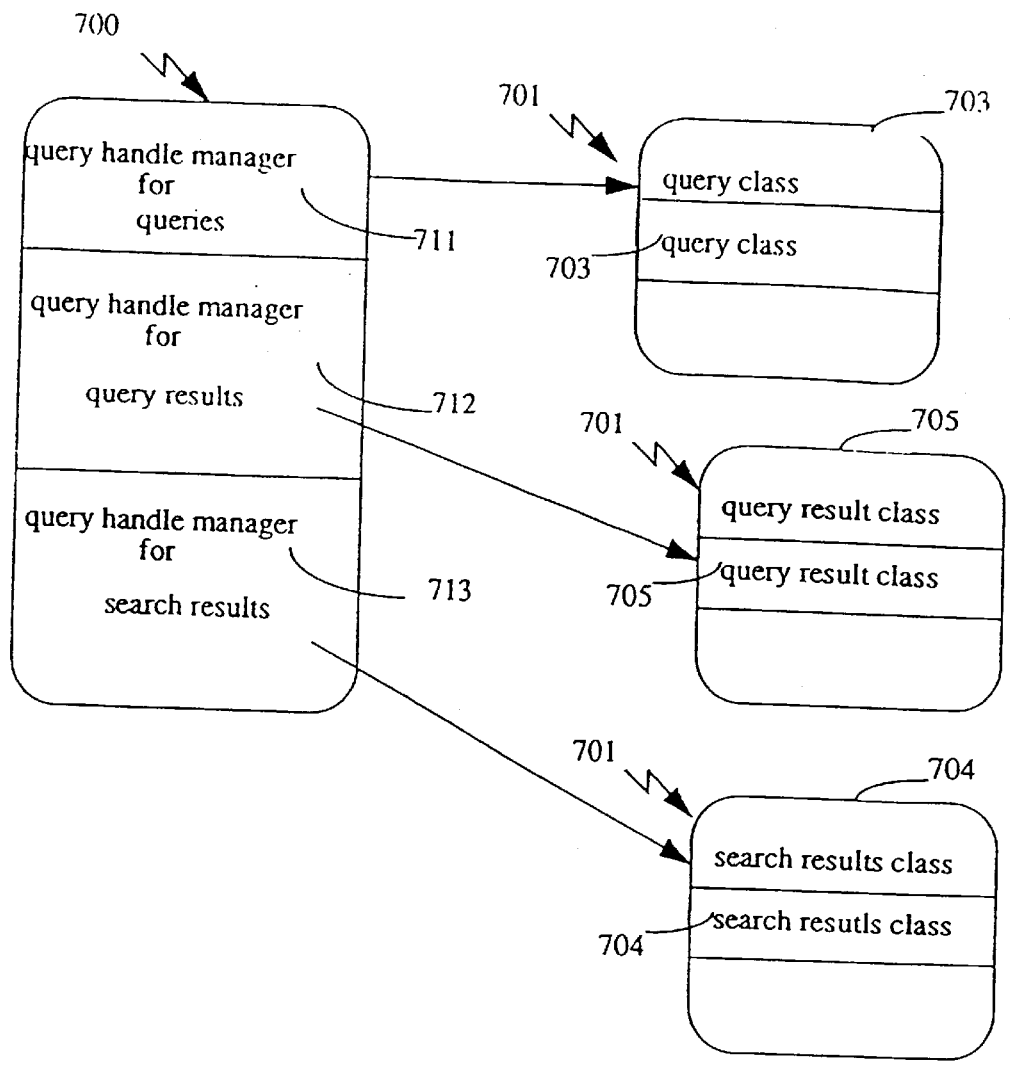

FIG. 163 represents the query manager class and the query handle manager class that are the main data structures in the query manager.

Figure 164:
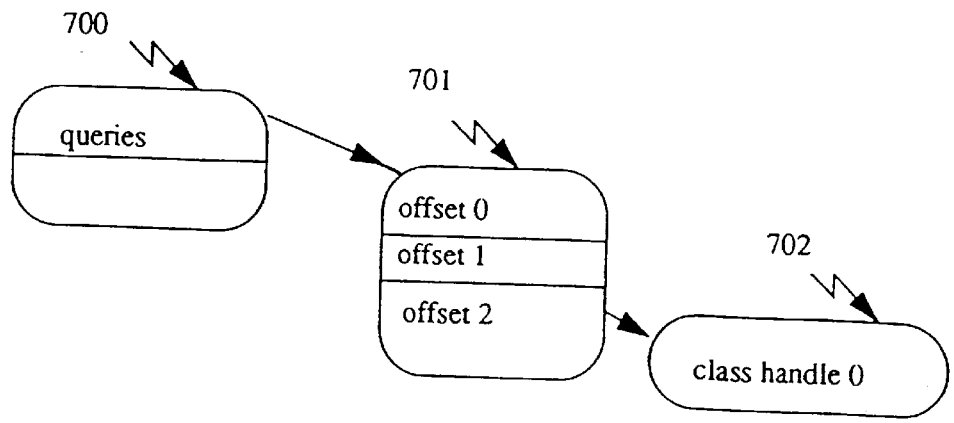

FIG. 164 shows the classes that are created in the query manager after a query is created.

Figure 165:
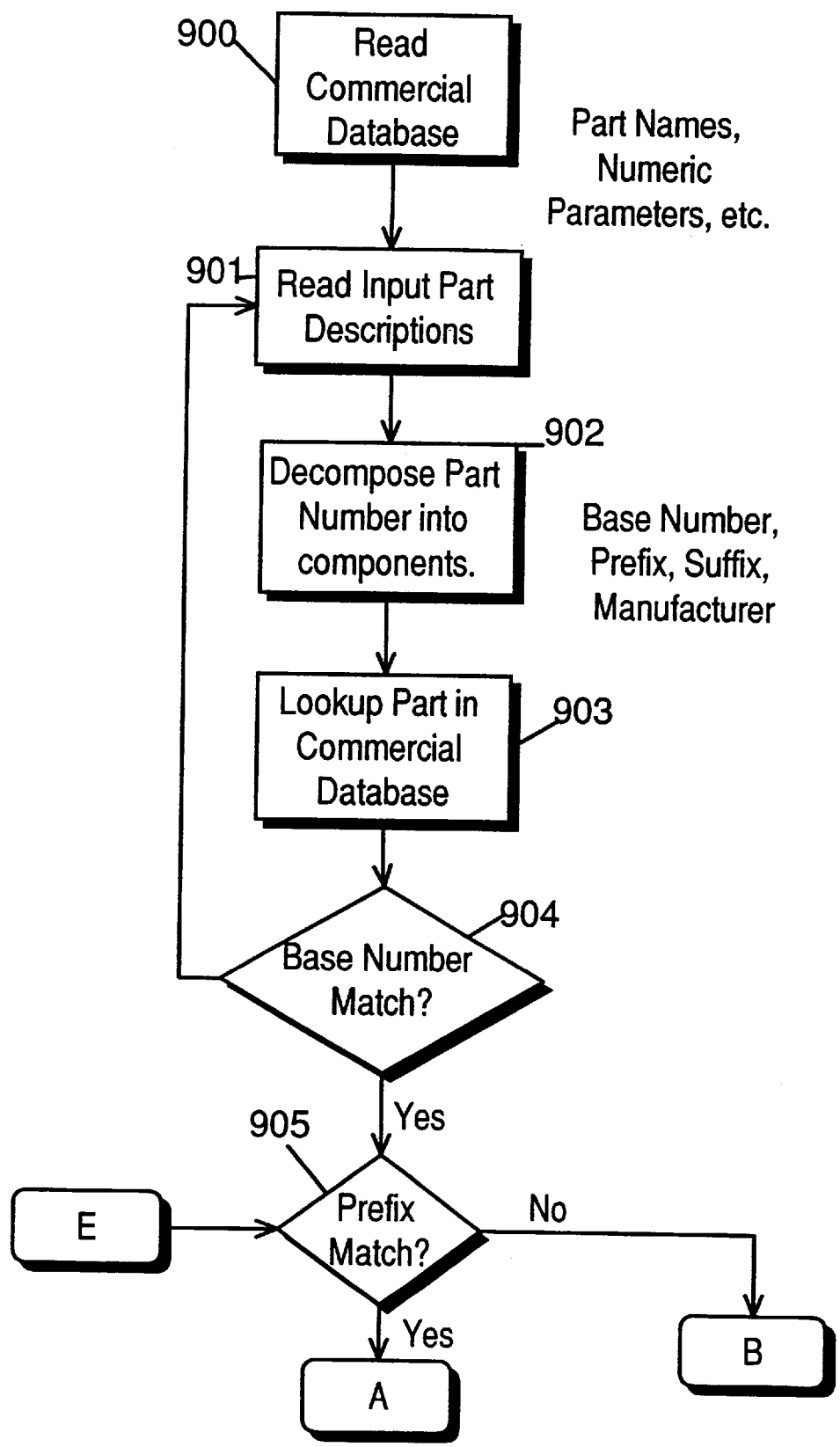

FIG. 165 is a flow chart that depicts stages of processing in genic.

Figure 166:
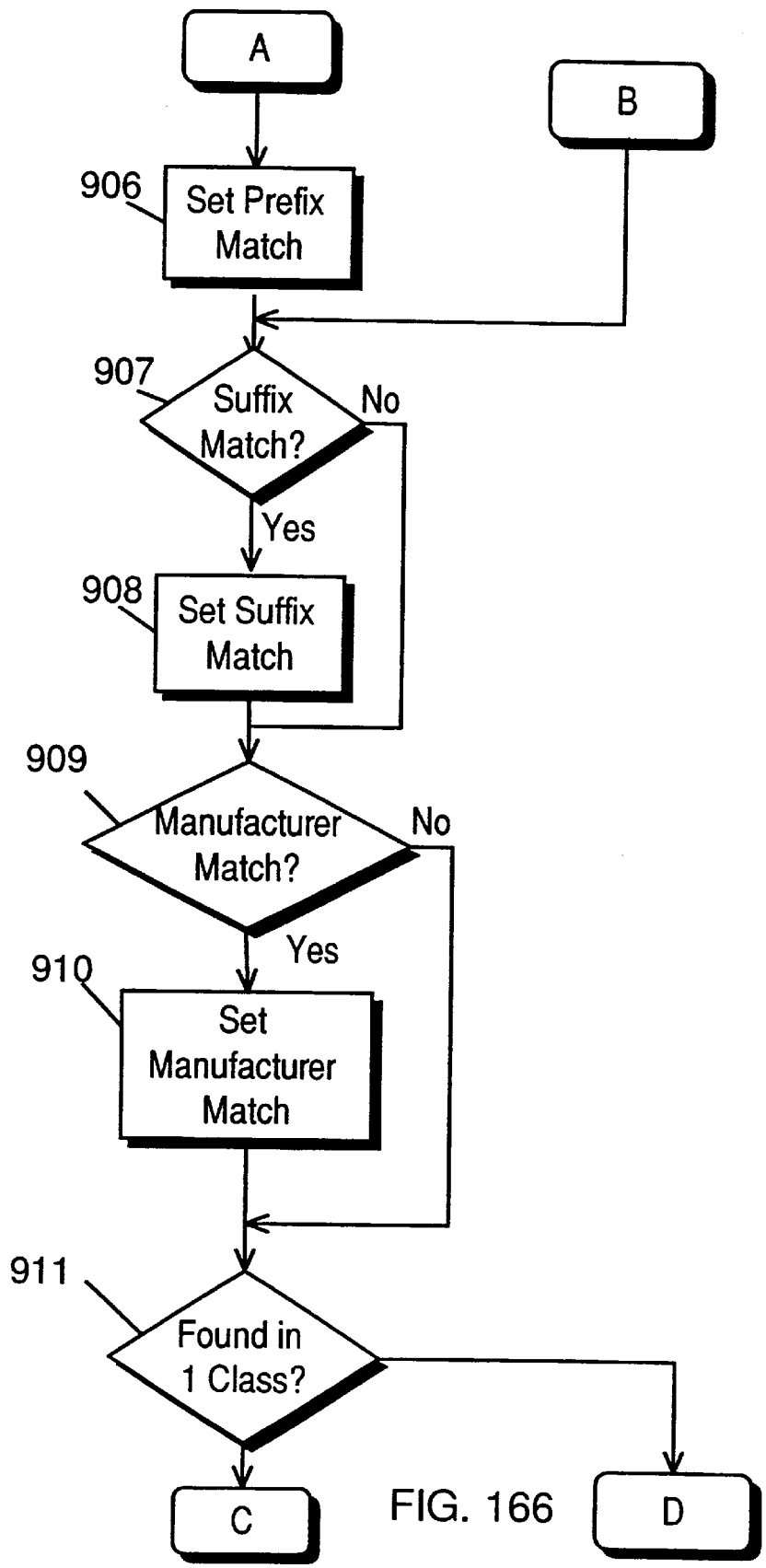

FIG. 166 is a continuation of the flow chart of FIG. 165.

Figure 167:
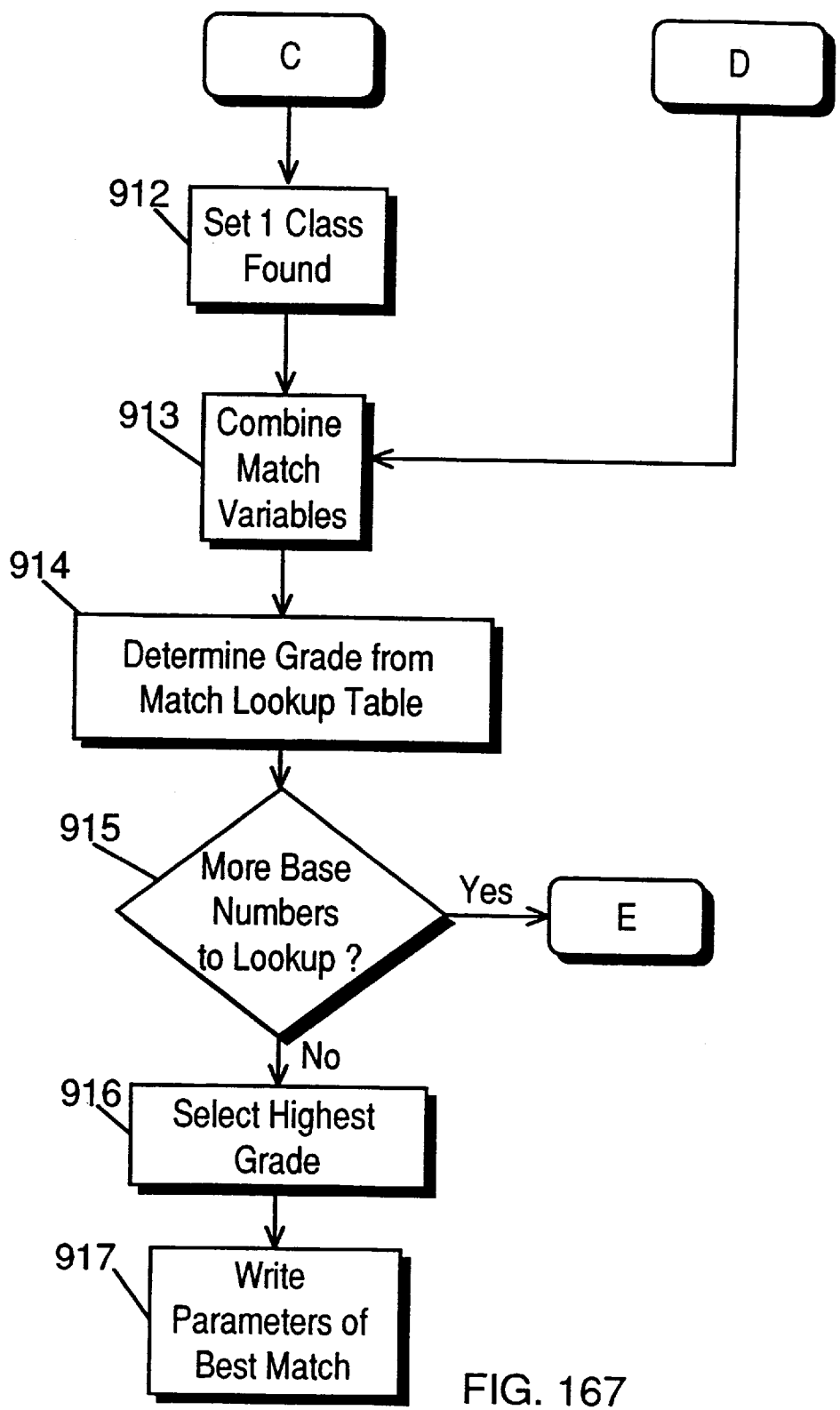

FIG. 167 is a continuation of the flow chart of FIG. 166.

Figure 168:
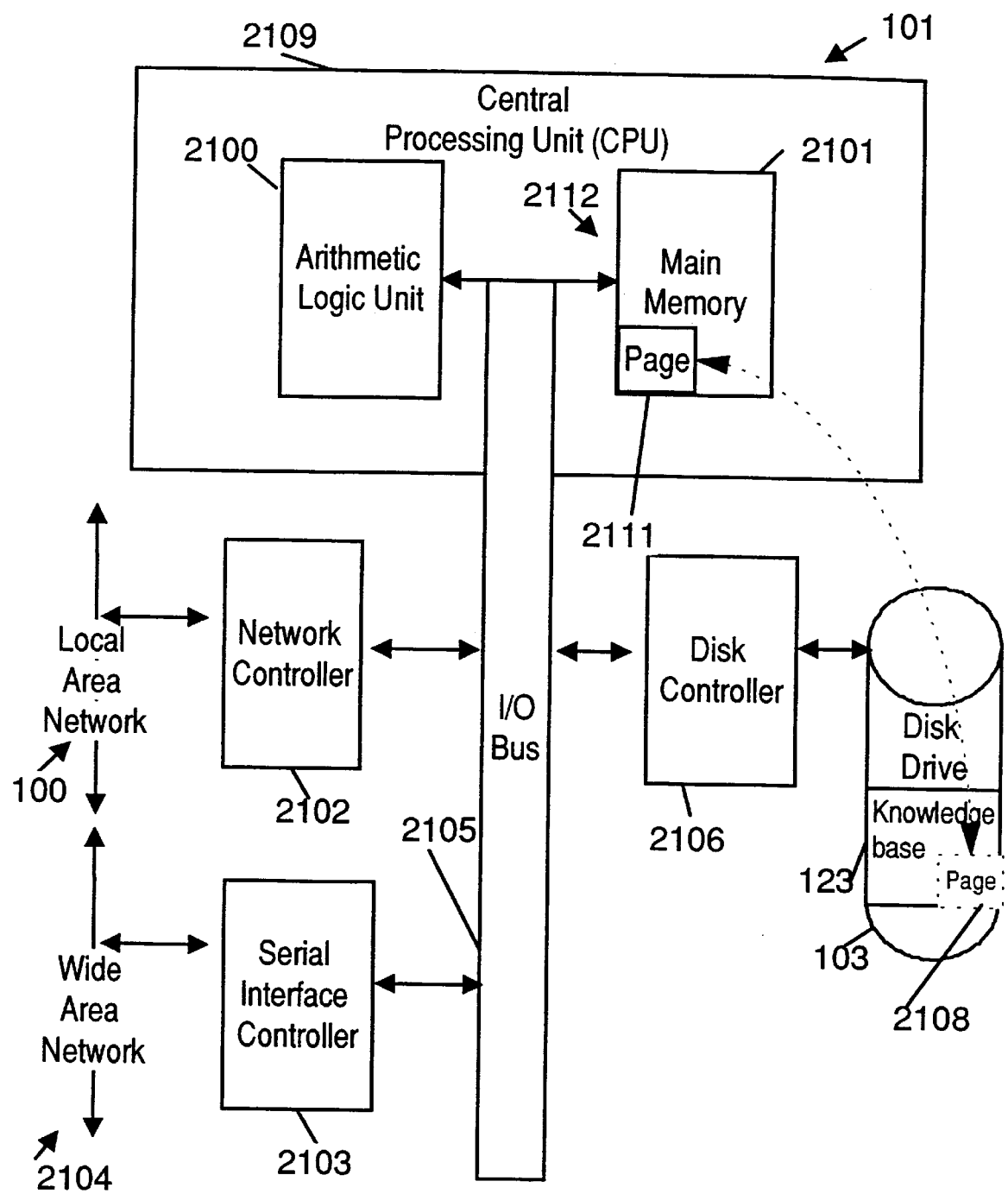

FIG. 168 is a depiction of a typical server architecture for the invention.

Figure 169:
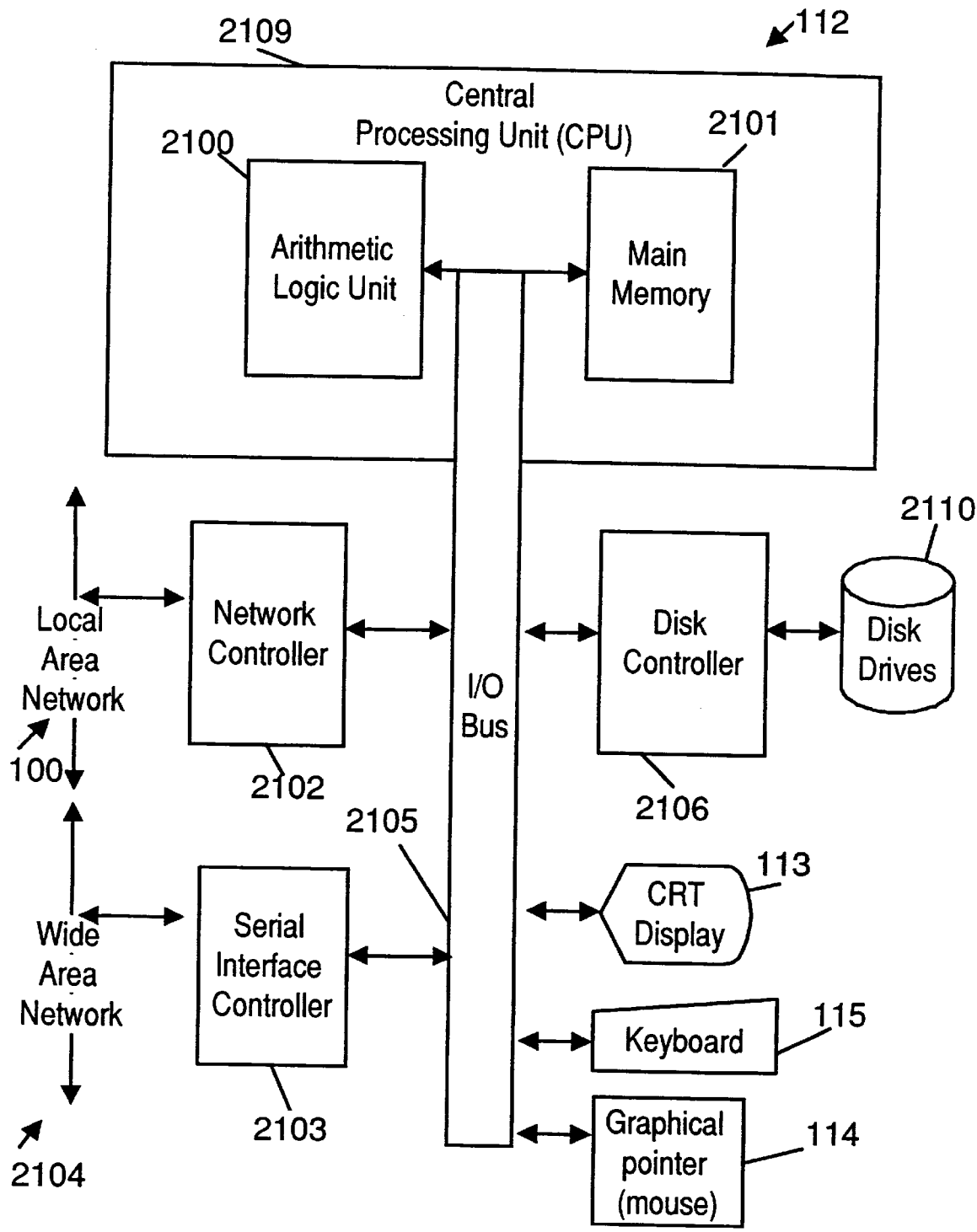

FIG. 169 is a depiction of a typical client architecture for the invention

Figure 170:
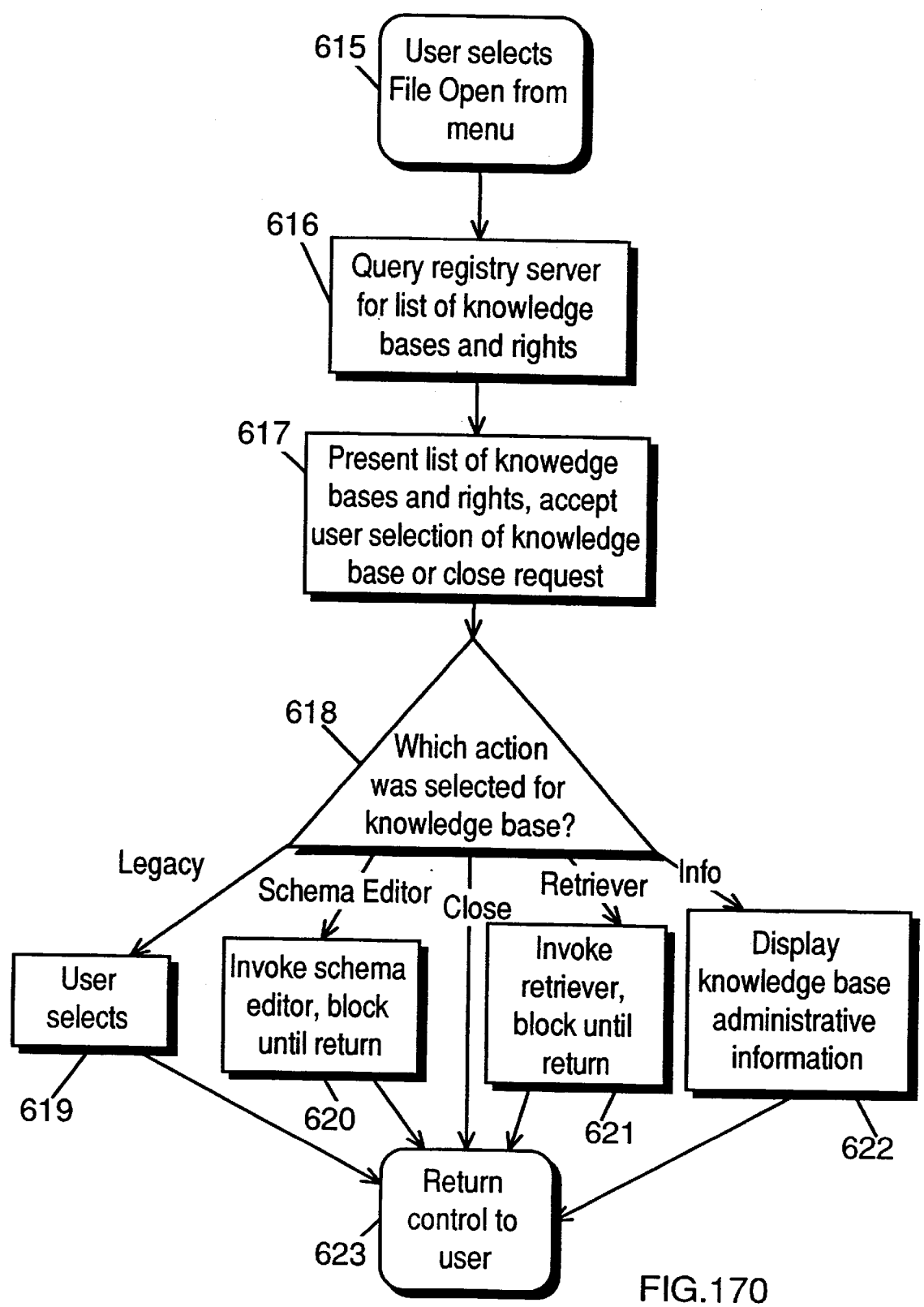

FIG. 170 depicts the process flow chart for the legacy knowledge base open screen.

Figure 171:
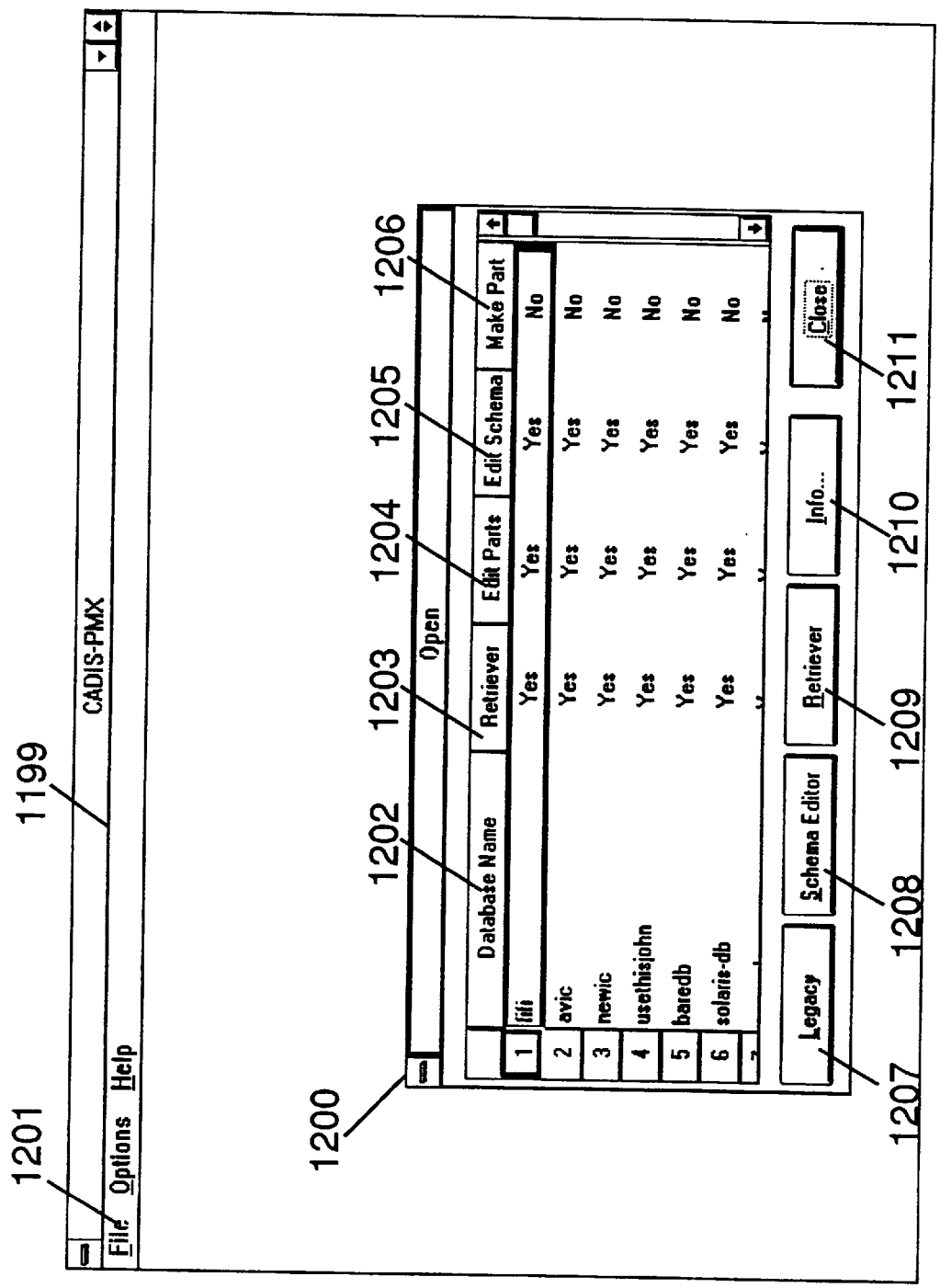

FIG. 171 shows the legacy knowledge base open dialog.

Figure 172:
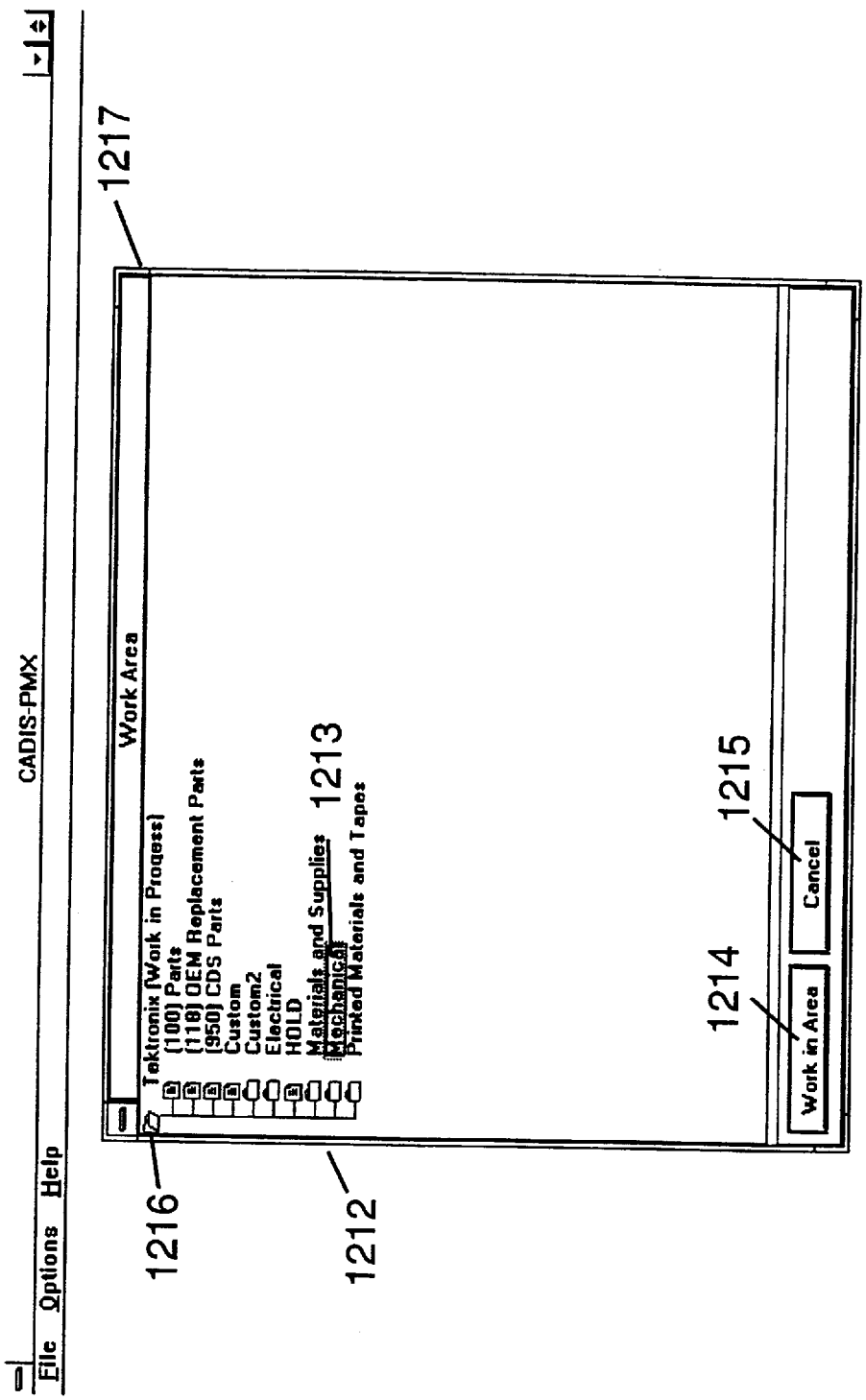

FIG. 172 shows the screen that appears when the legacy application is invoked.

Figure 173:
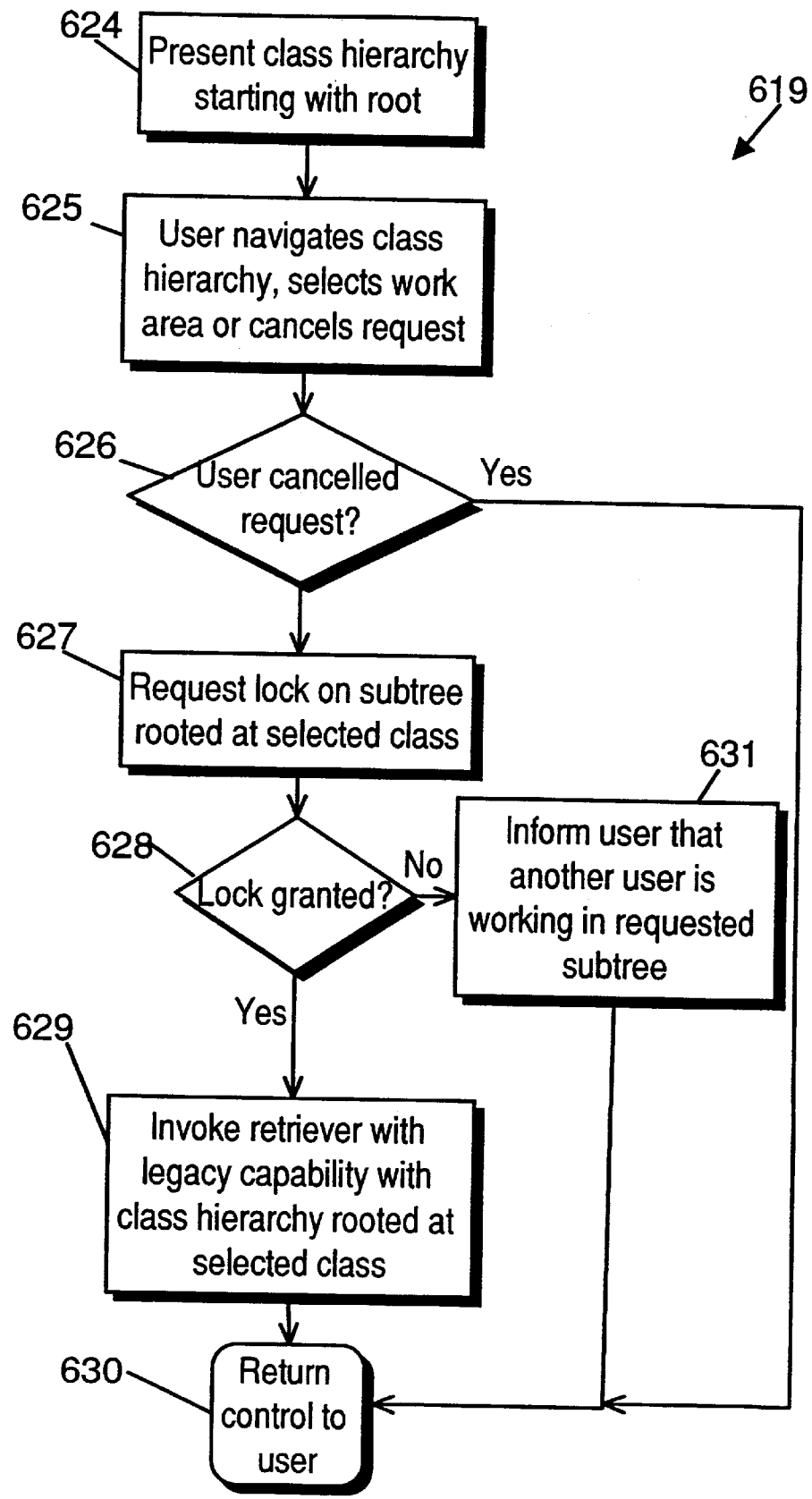

FIG. 173 is the flow chart for the process after the legacy work area is selected.

Figure 174:
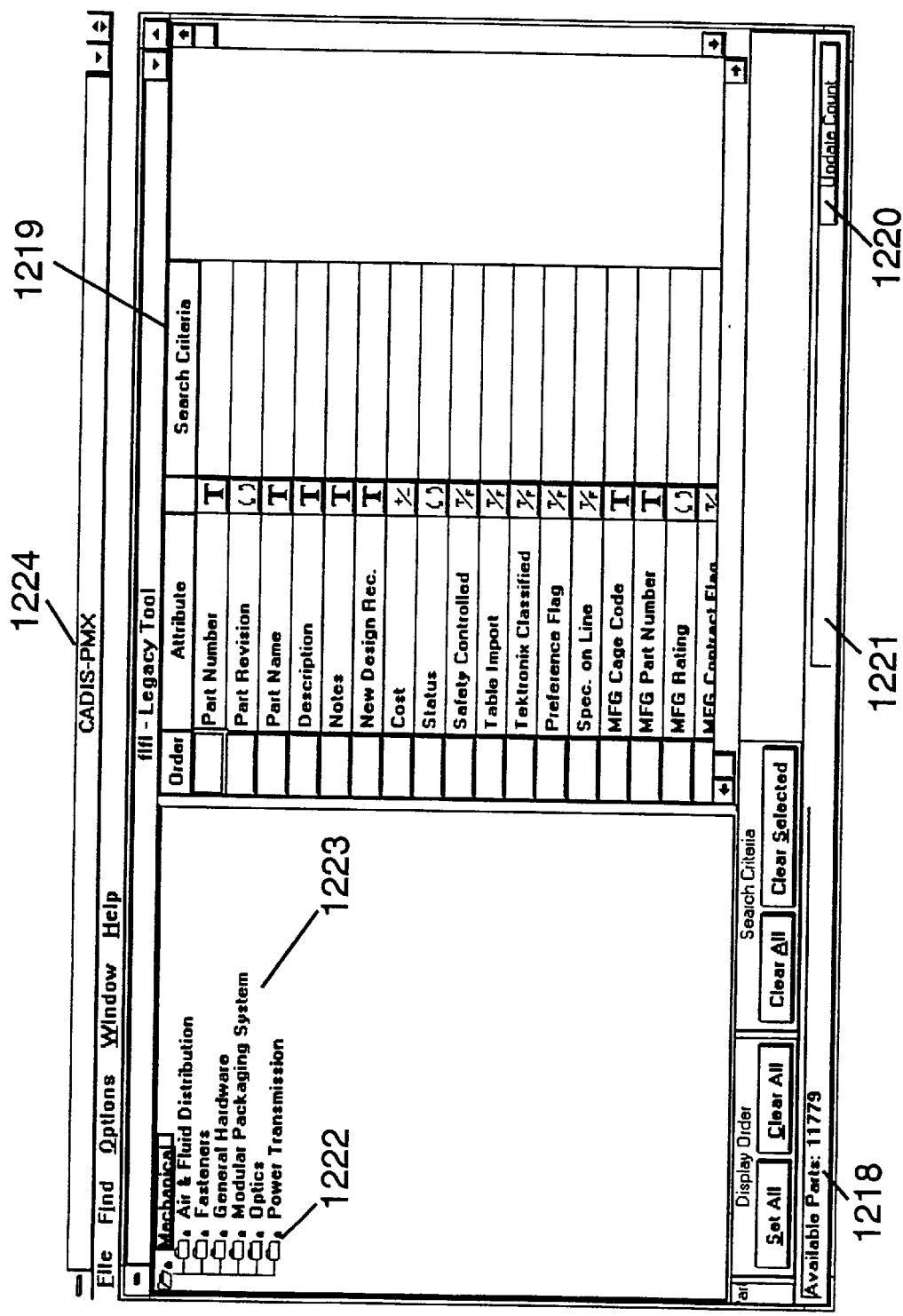

FIG. 174 is the main legacy screen.

Figure 175:
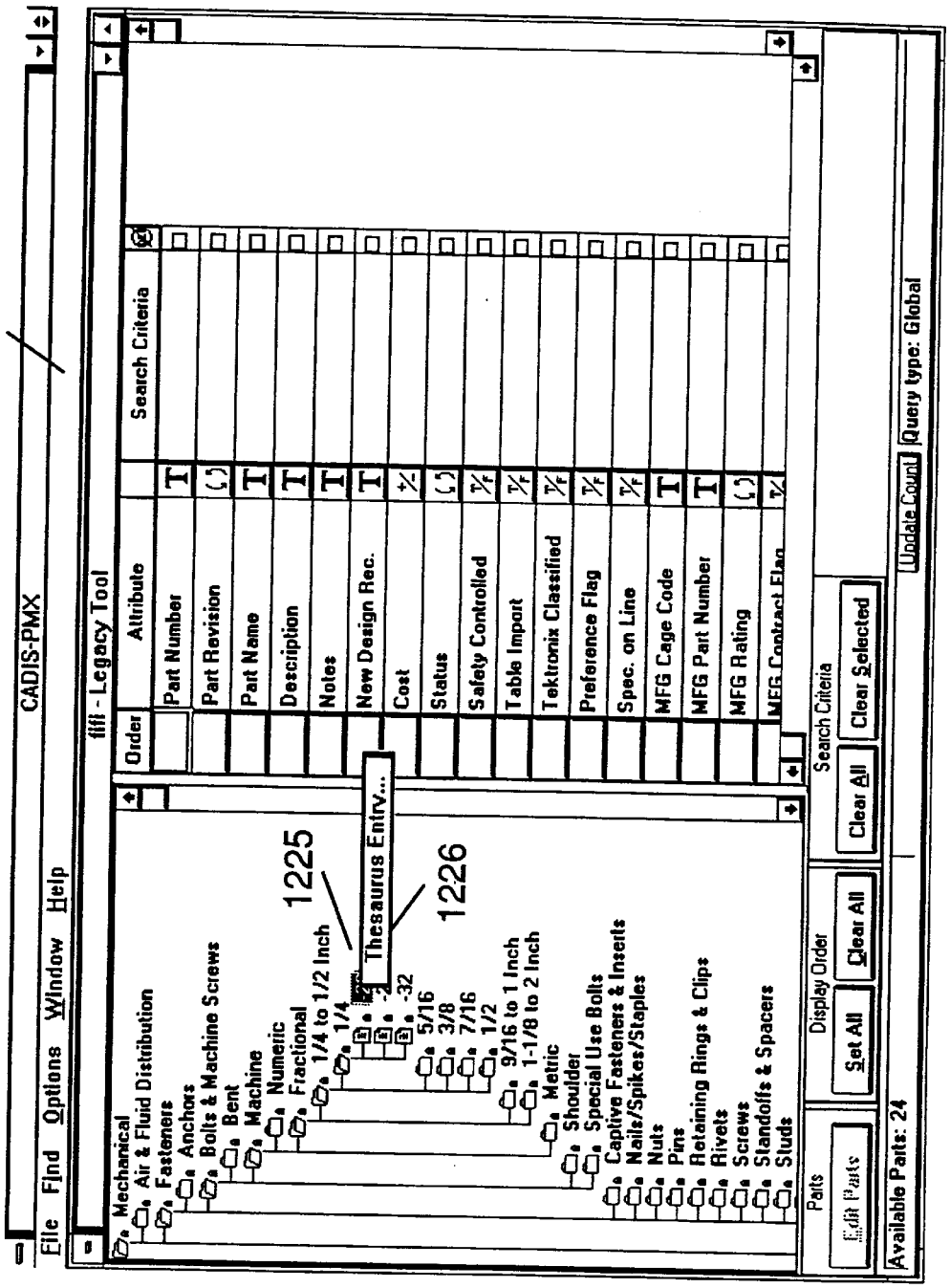

FIG. 175 depicts screen after the selection of a class for thesaurus editing.

Figure 176:
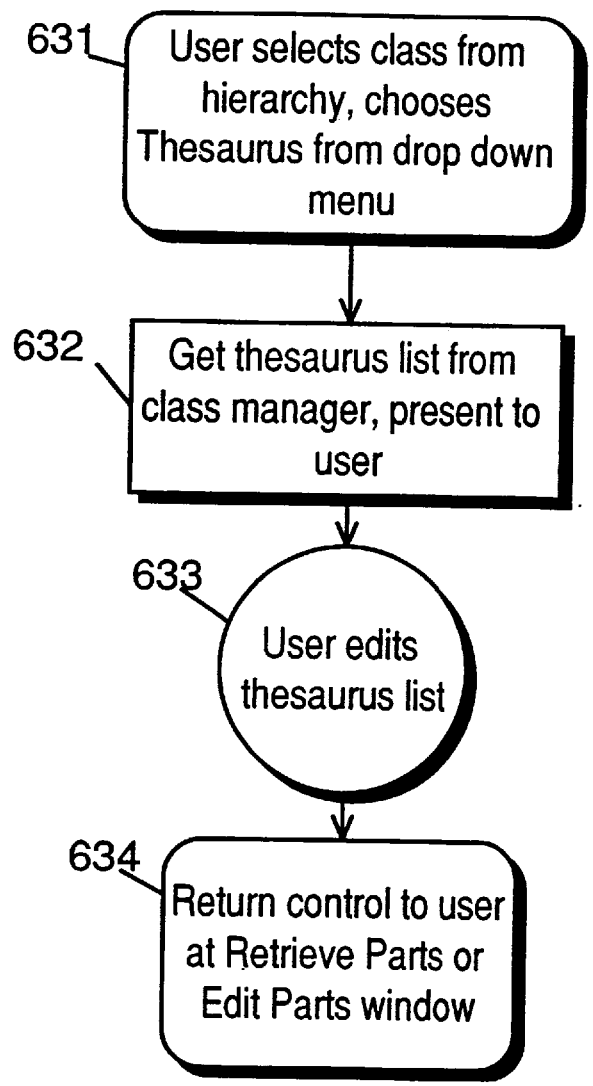

FIG. 176 is the flow chart of invoking a dialog for thesaurus editing.

Figure 177:
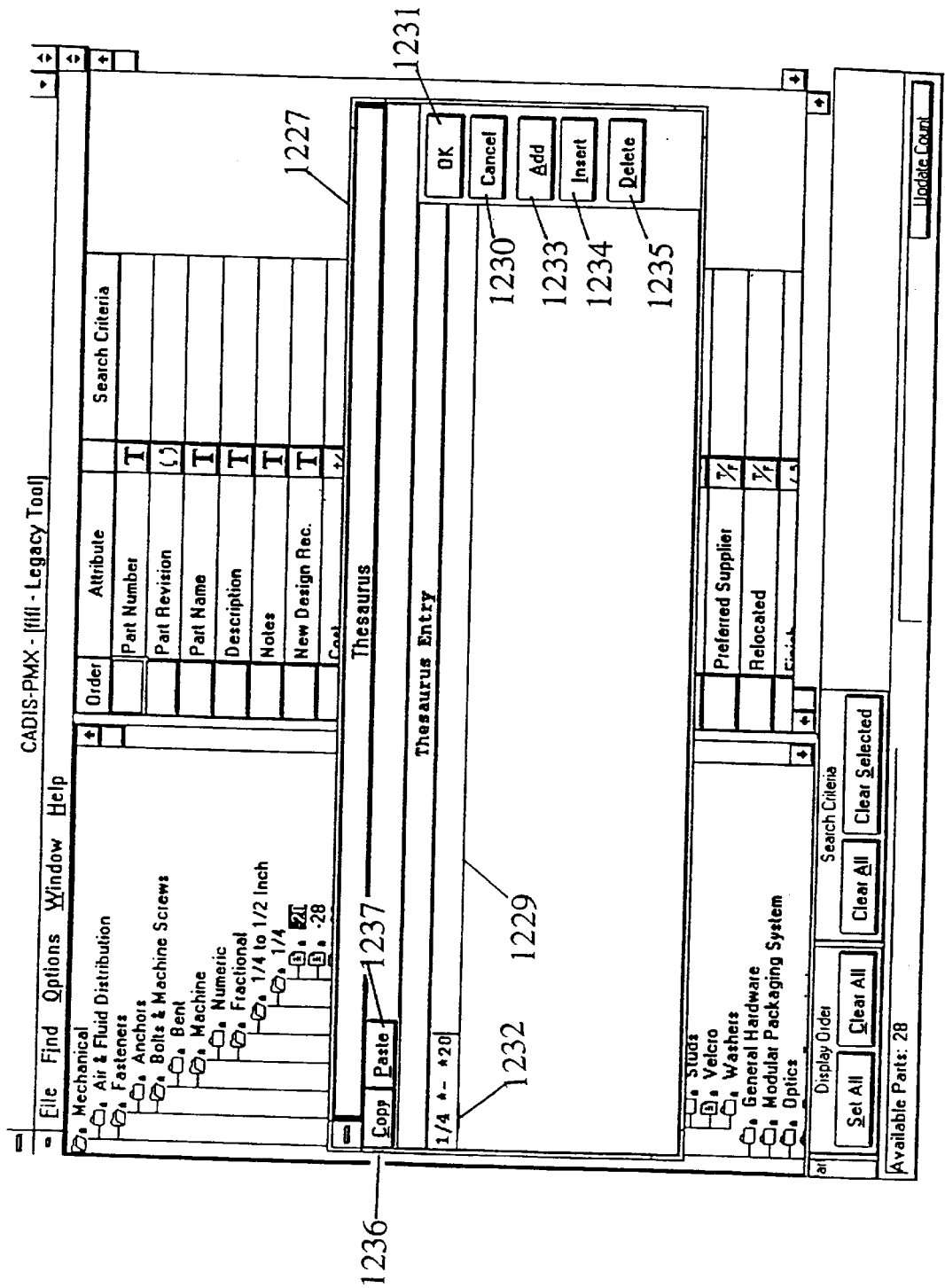

FIG. 177 show the thesaurus editing dialog for a class.

Figure 178:
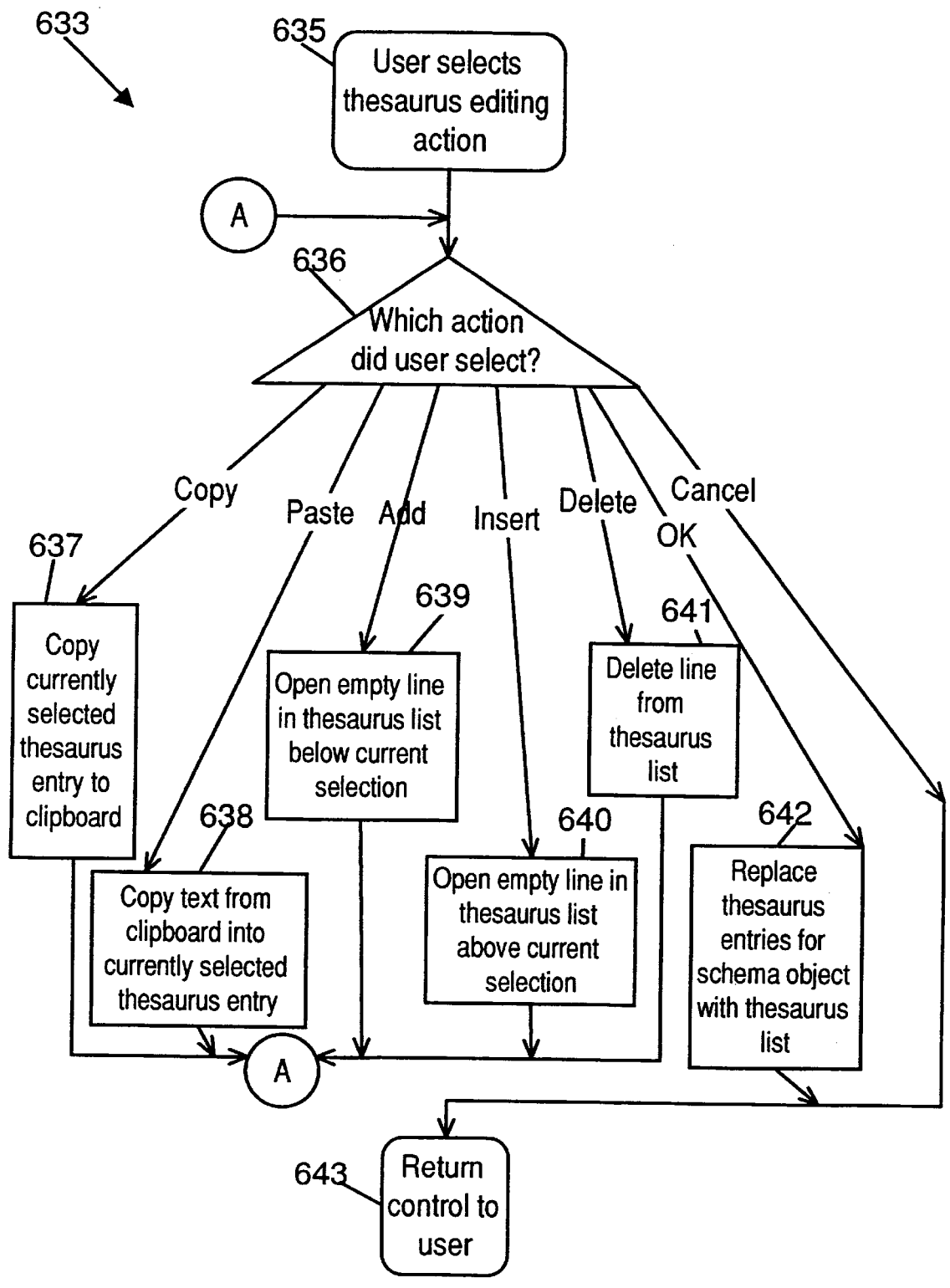

FIG. 178 depicts the process flow for the thesaurus editing dialog in FIG. 177.

Figure 179:
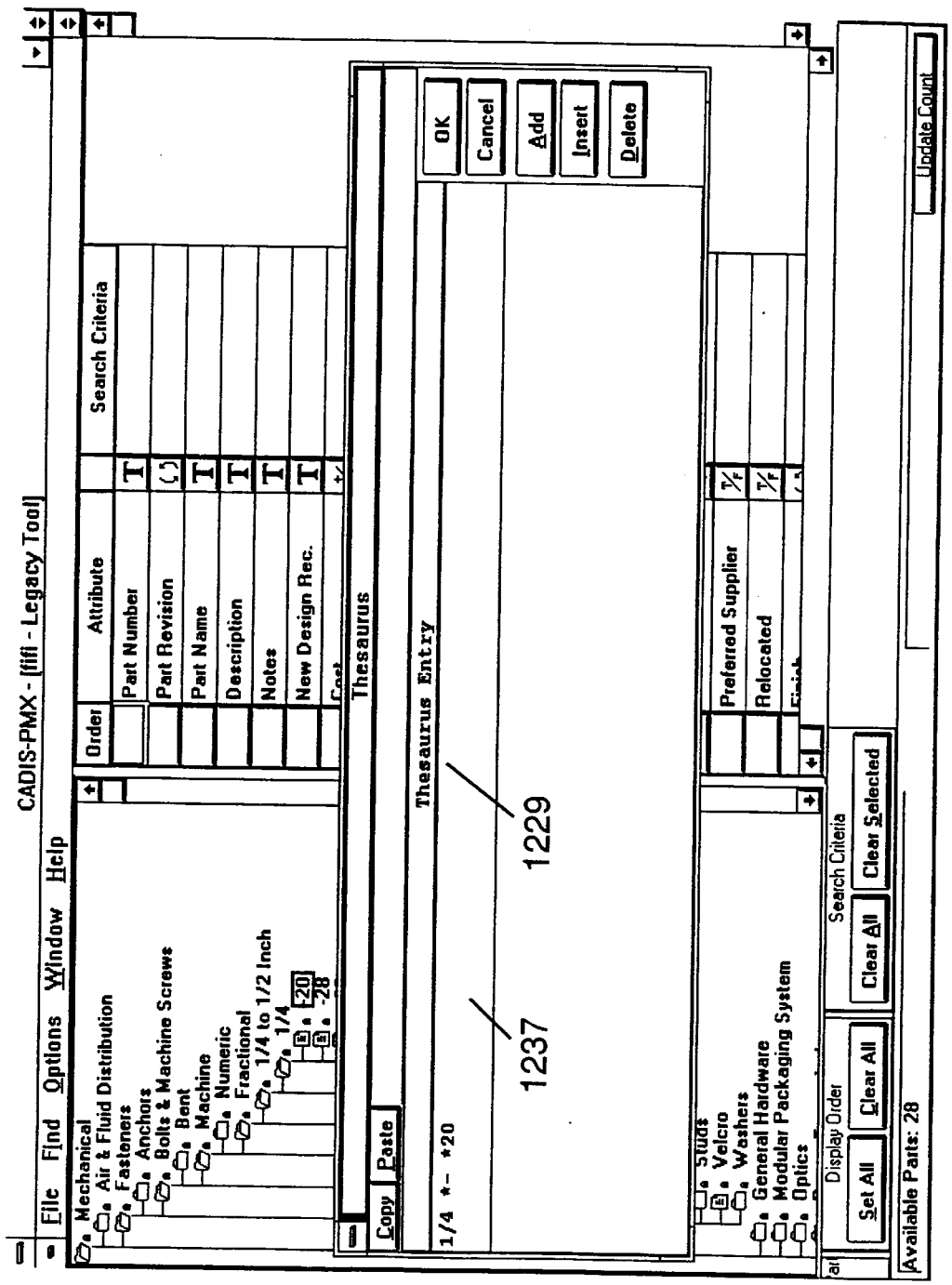

FIG. 179 shows the thesaurus editing dialog after adding a new entry.

Figure 180:
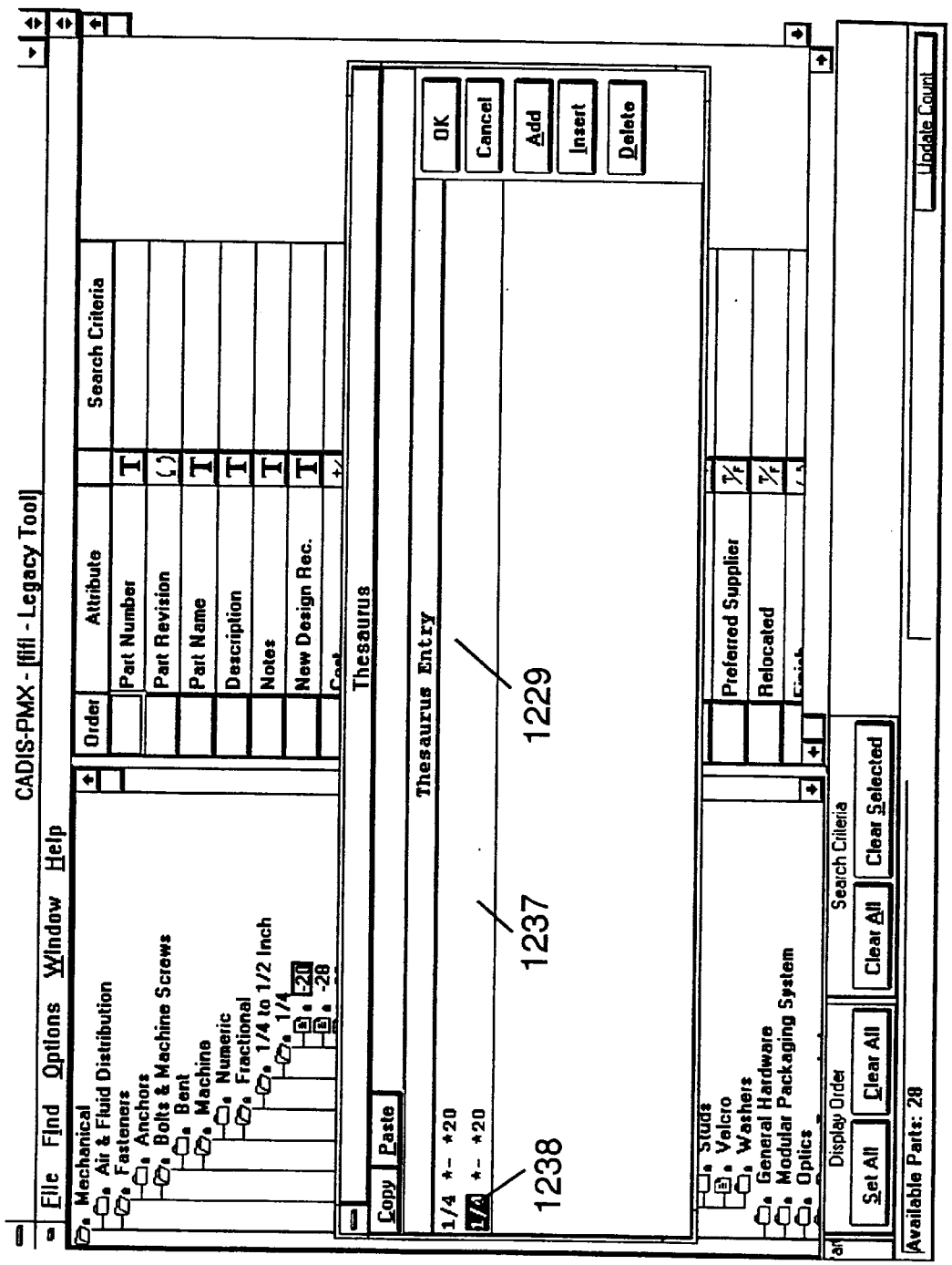

FIG. 180 shows text entered in a thesaurus entry.

Figure 181:
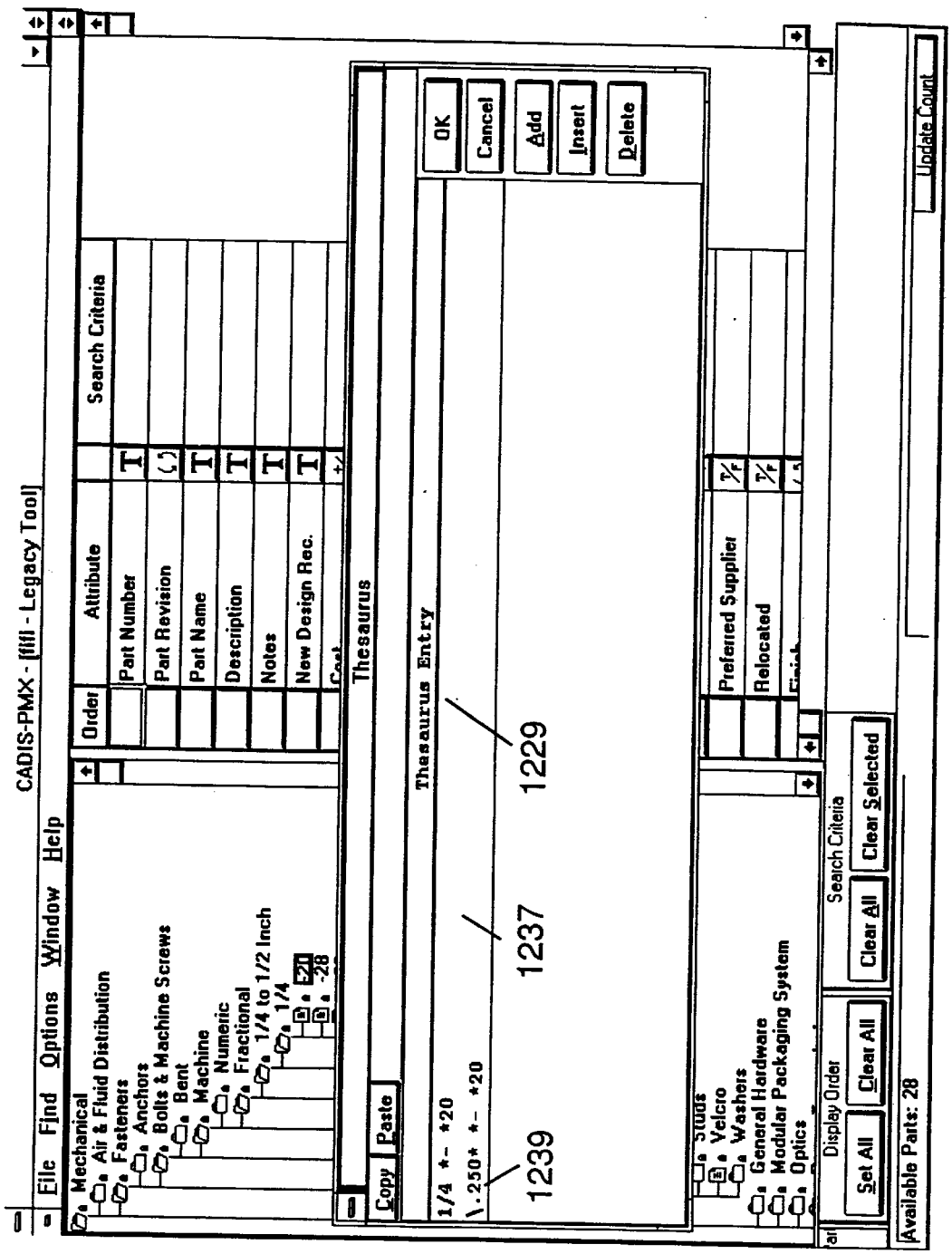

FIG. 181 shows a regular expression in a thesaurus entry.

Figure 182:
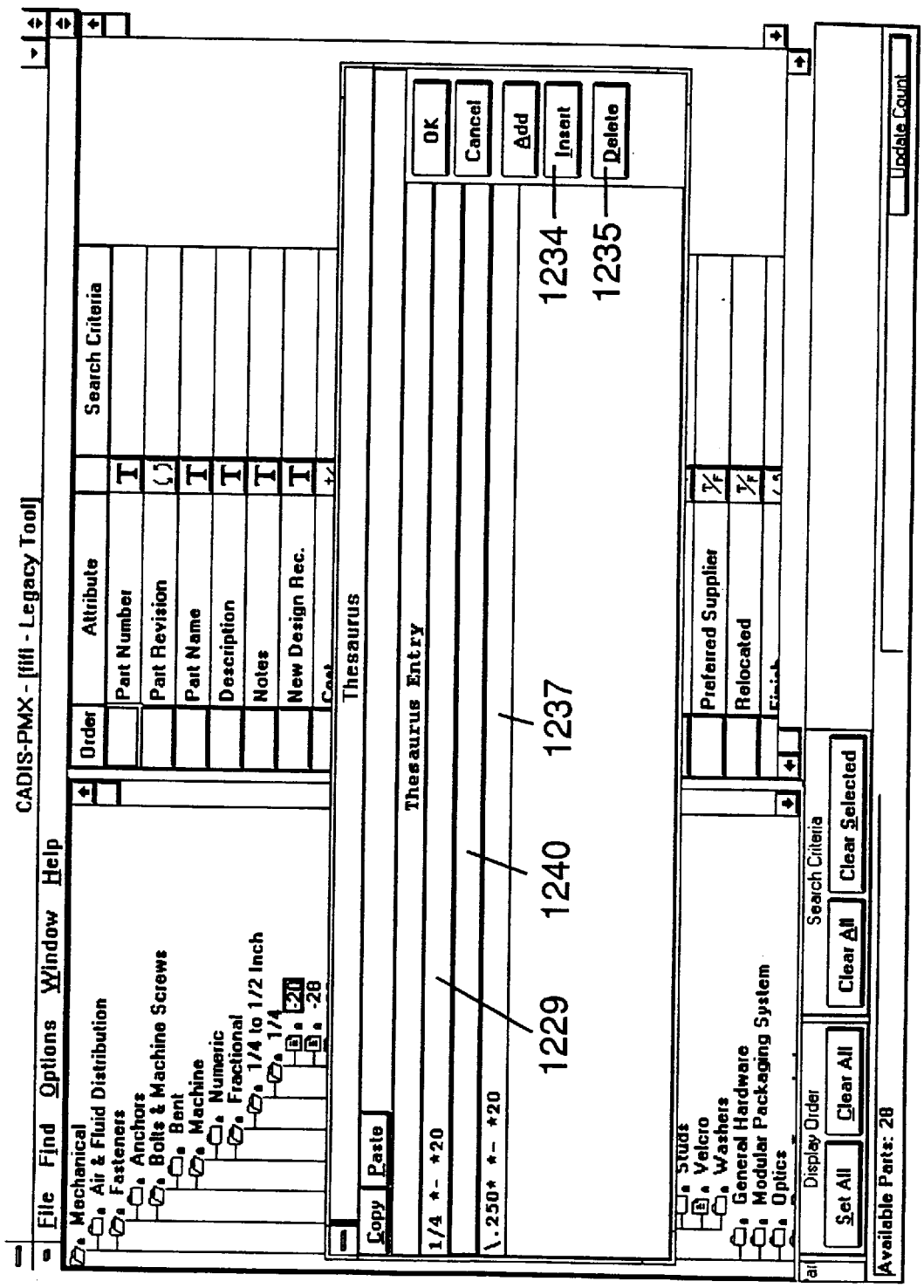

FIG. 182 shows the result of inserting a new thesaurus entry.

Figure 183:
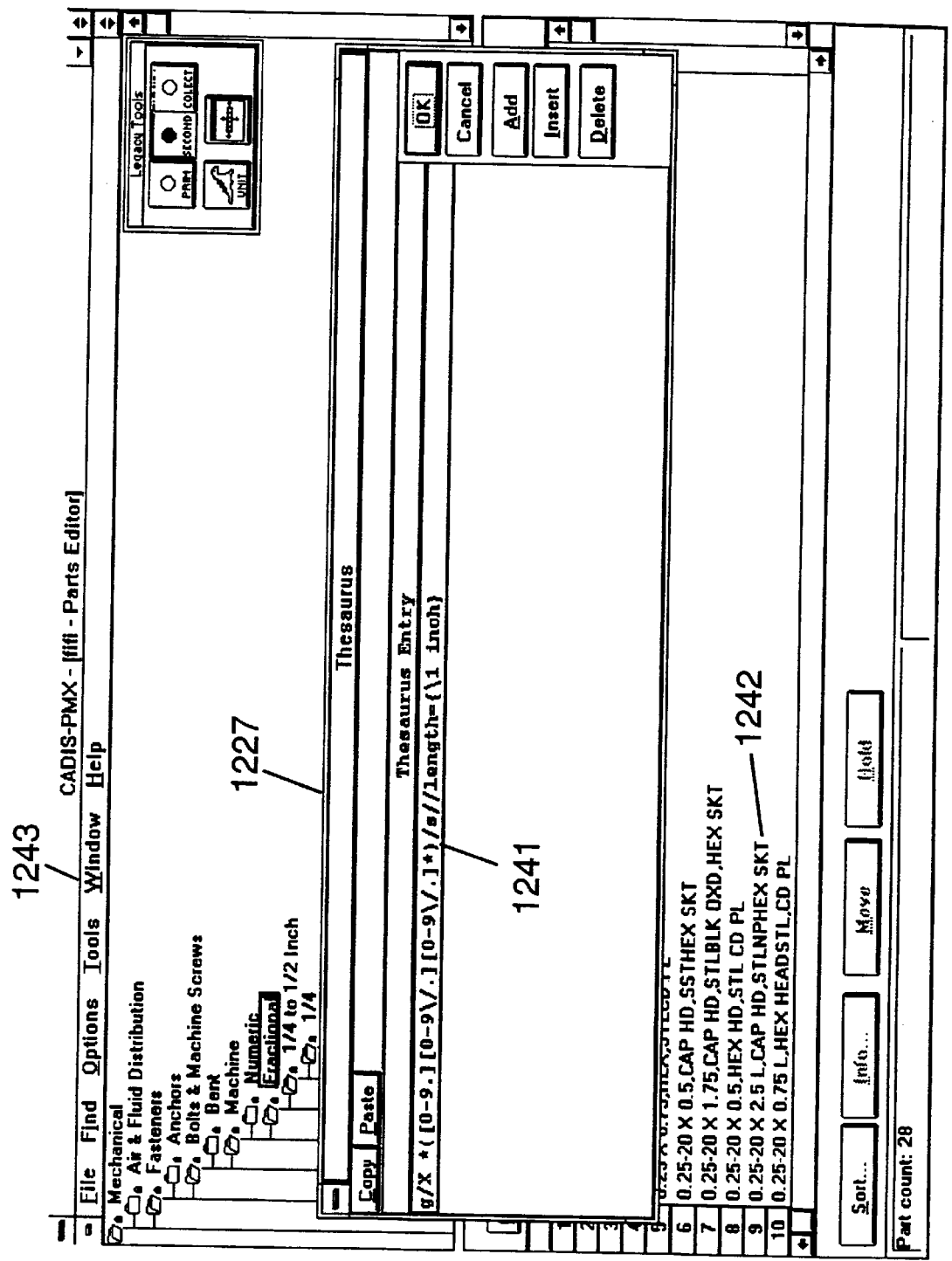

FIG. 183 shows a complex regular expression in the thesaurus entry.

Figure 184:
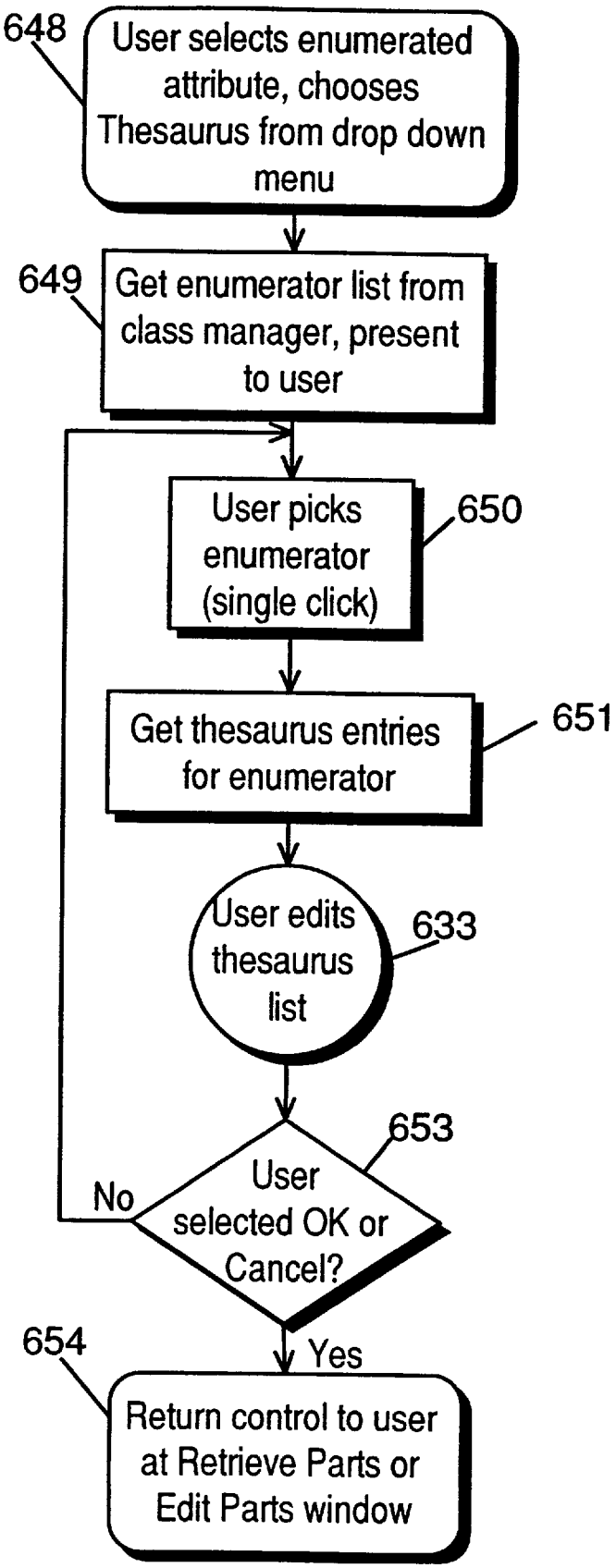

FIG. 184 depicts the flow chart for invoking the thesaurus editor for an enumerated attribute.

Figure 185:
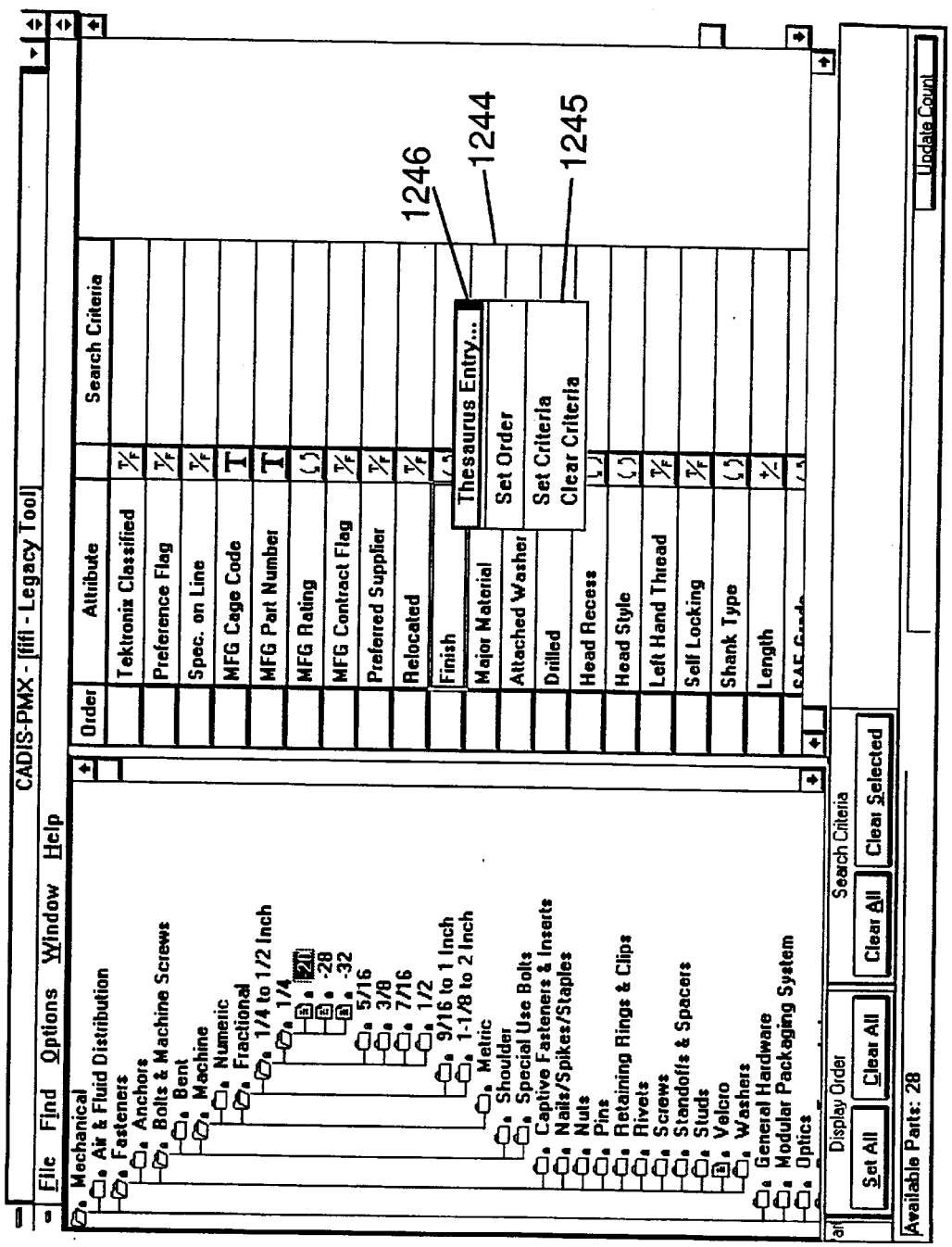

FIG. 185 depicts a display screen showing the procedure for bringing up a thesaurus editor for an enumerated attribute from the parts specification window.

Figure 186:
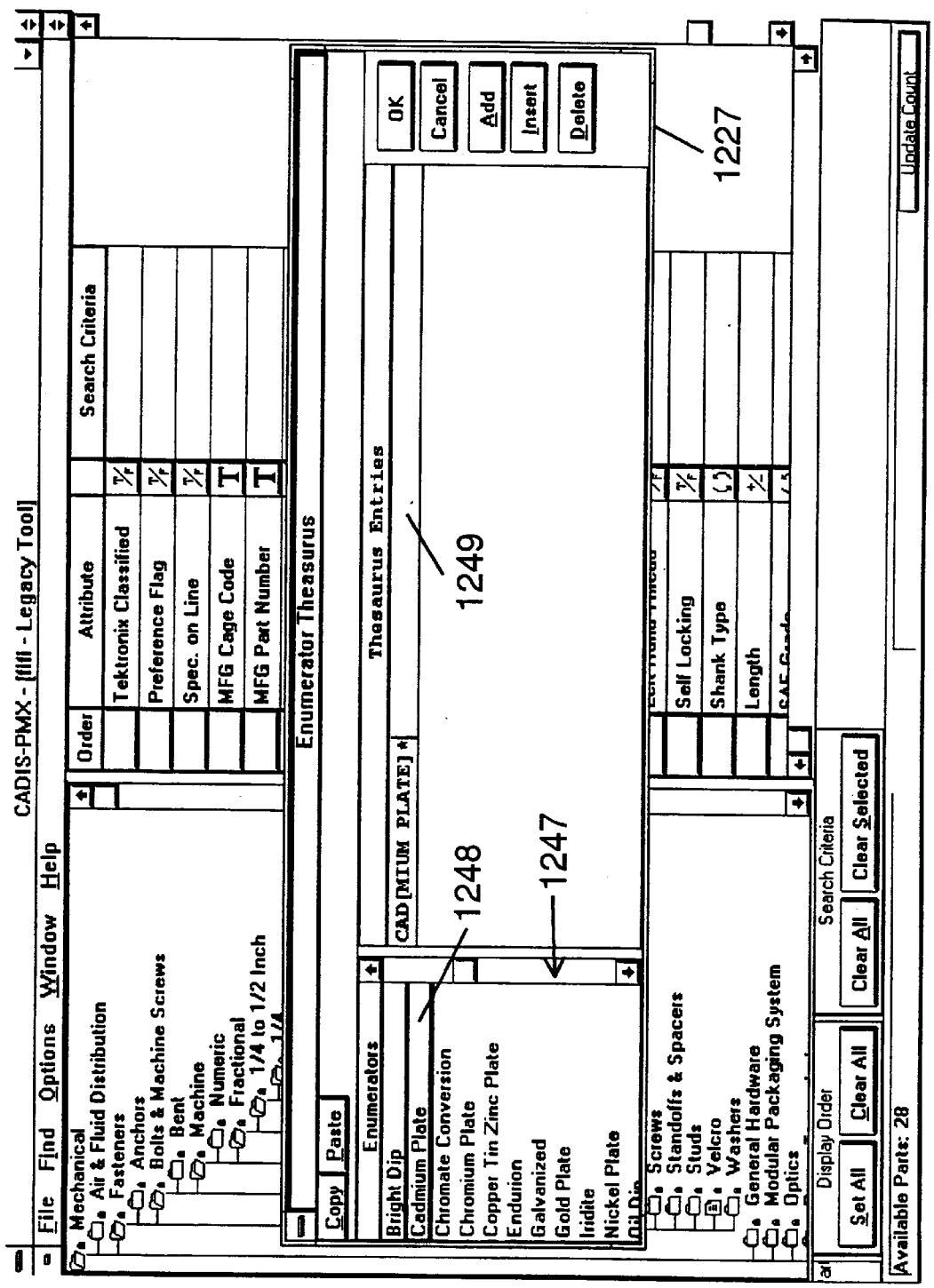

FIG. 186 depicts a display screen showing editing an enumerator thesaurus from the parts specification window.

Figure 187:
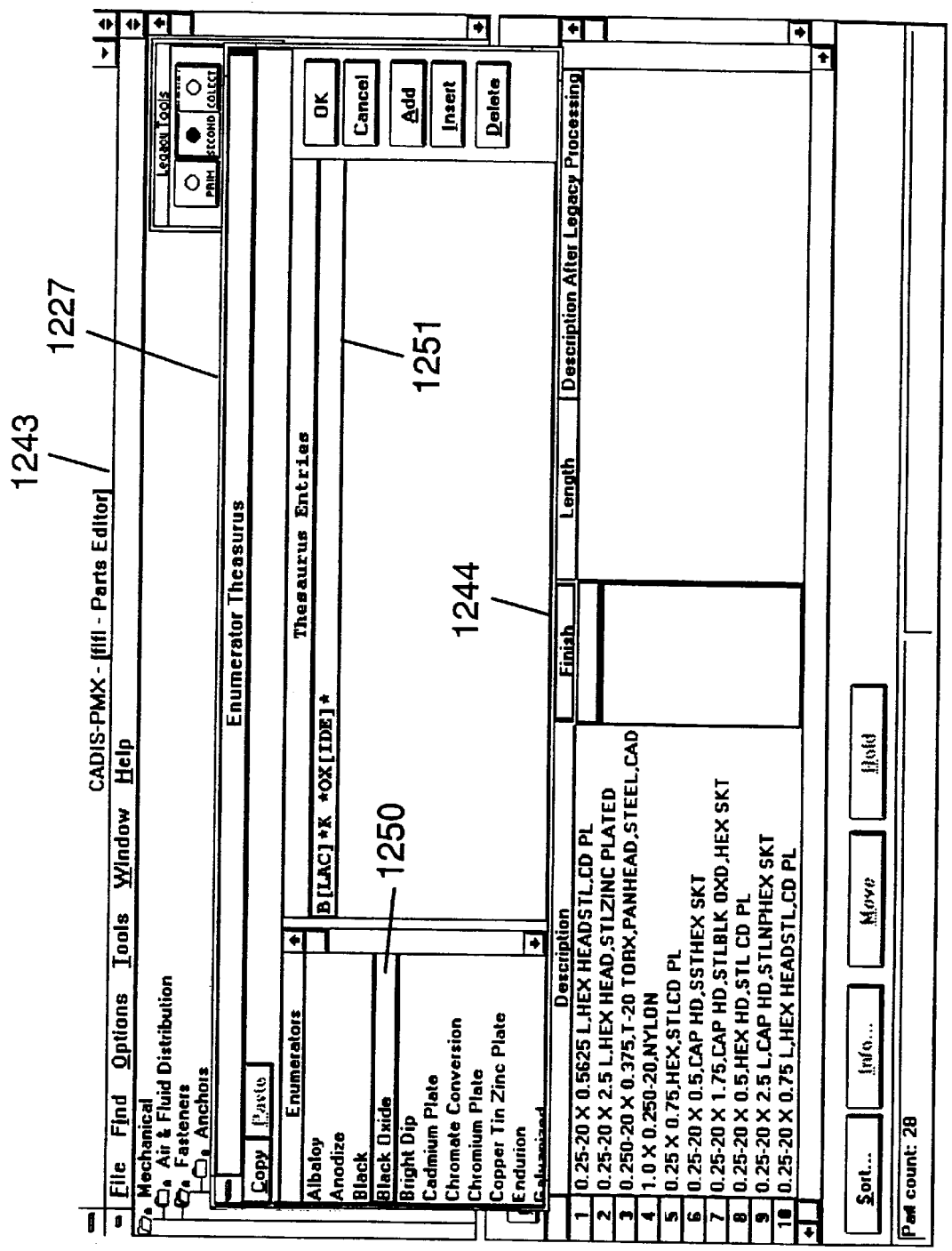

FIG. 187 depicts a display screen showing editing an enumerator thesaurus from the edit parts window.

Figure 188:
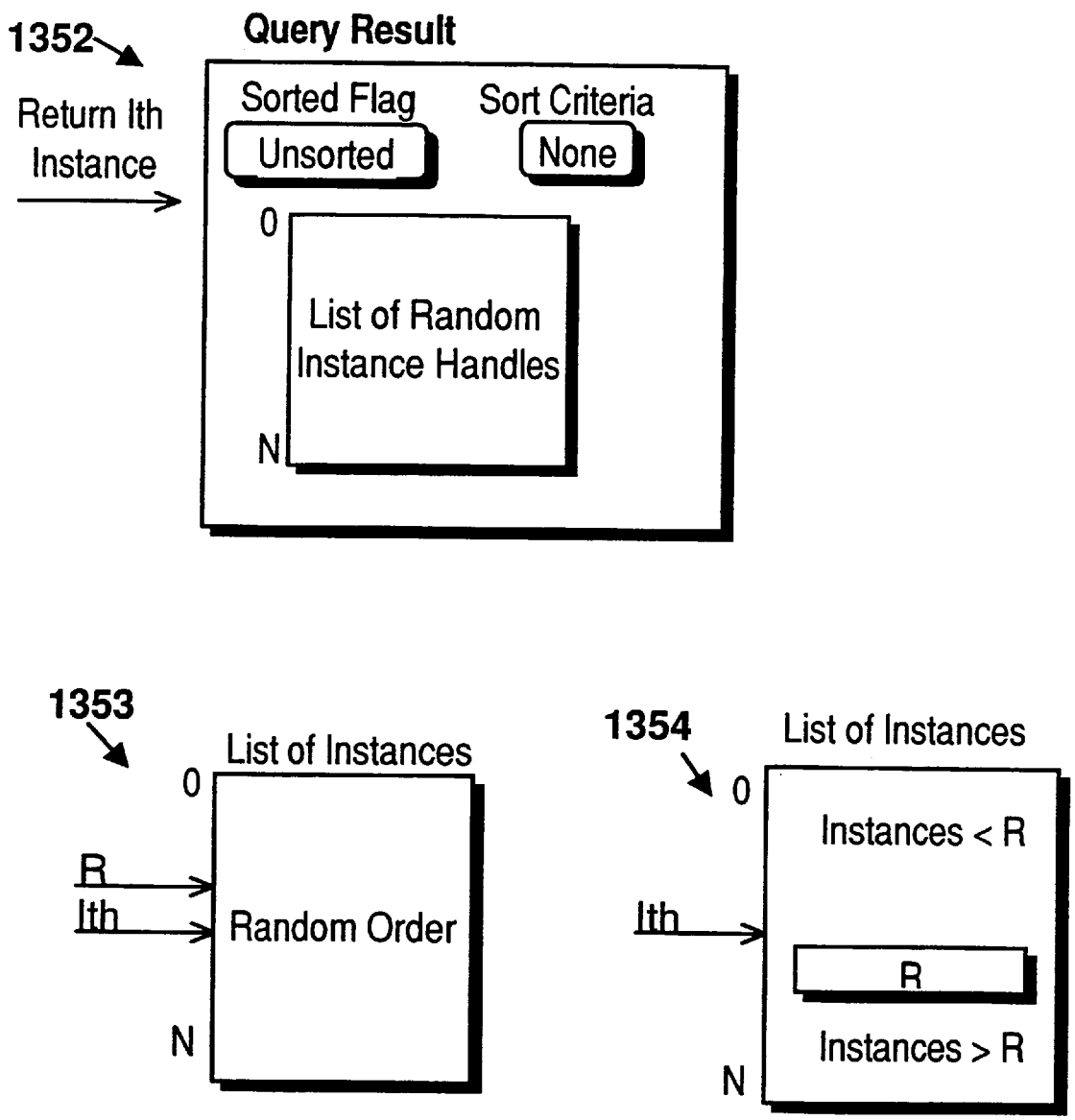

FIG. 188 is a diagram depicting the state of a query result before and after processing a request to retrieve an instance from a sorted query result.

Figure 189:
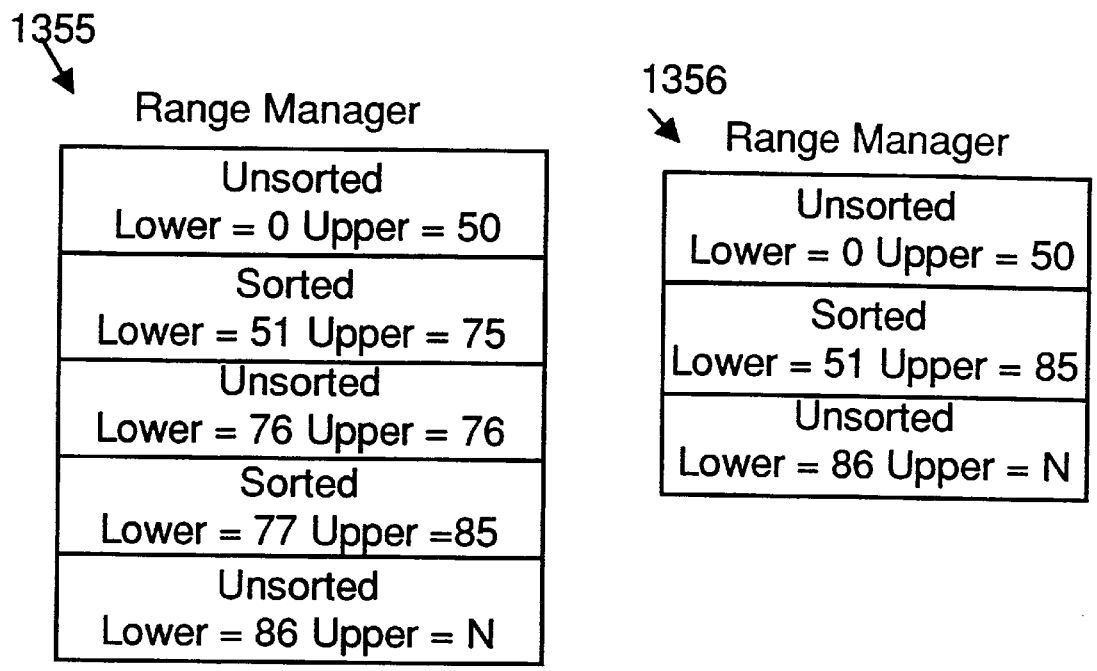

FIG. 189 depicts the management of sorted ranges within a sorted query result.

FIG. 190 depicts a display screen showing the procedure of bring up a numeric attribute thesaurus editor from the edit parts window.

Figure 191:
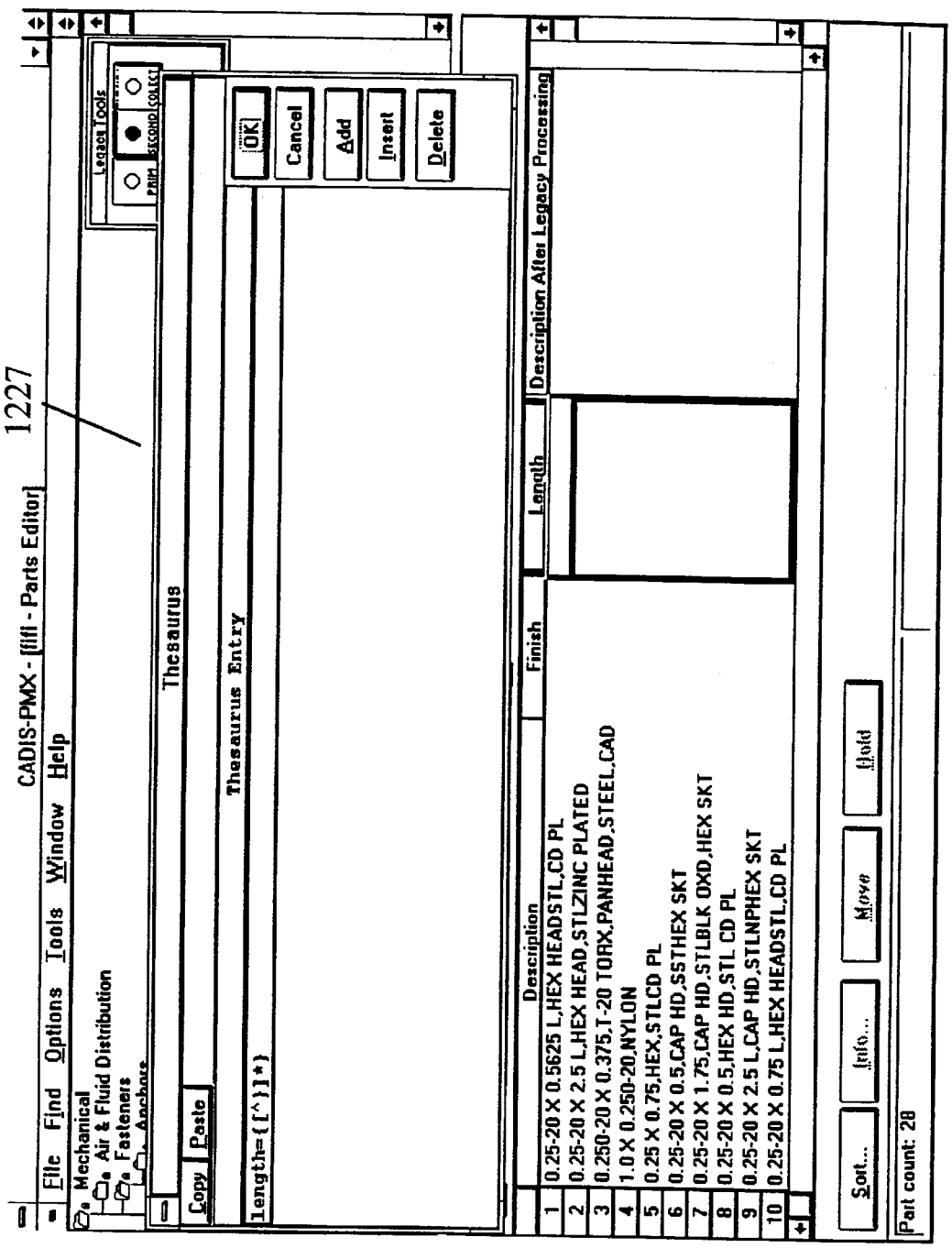

FIG. 191 depicts a display screen showing the procedure for editing a numeric attribute thesaurus from the edit parts window.

Figure 192:
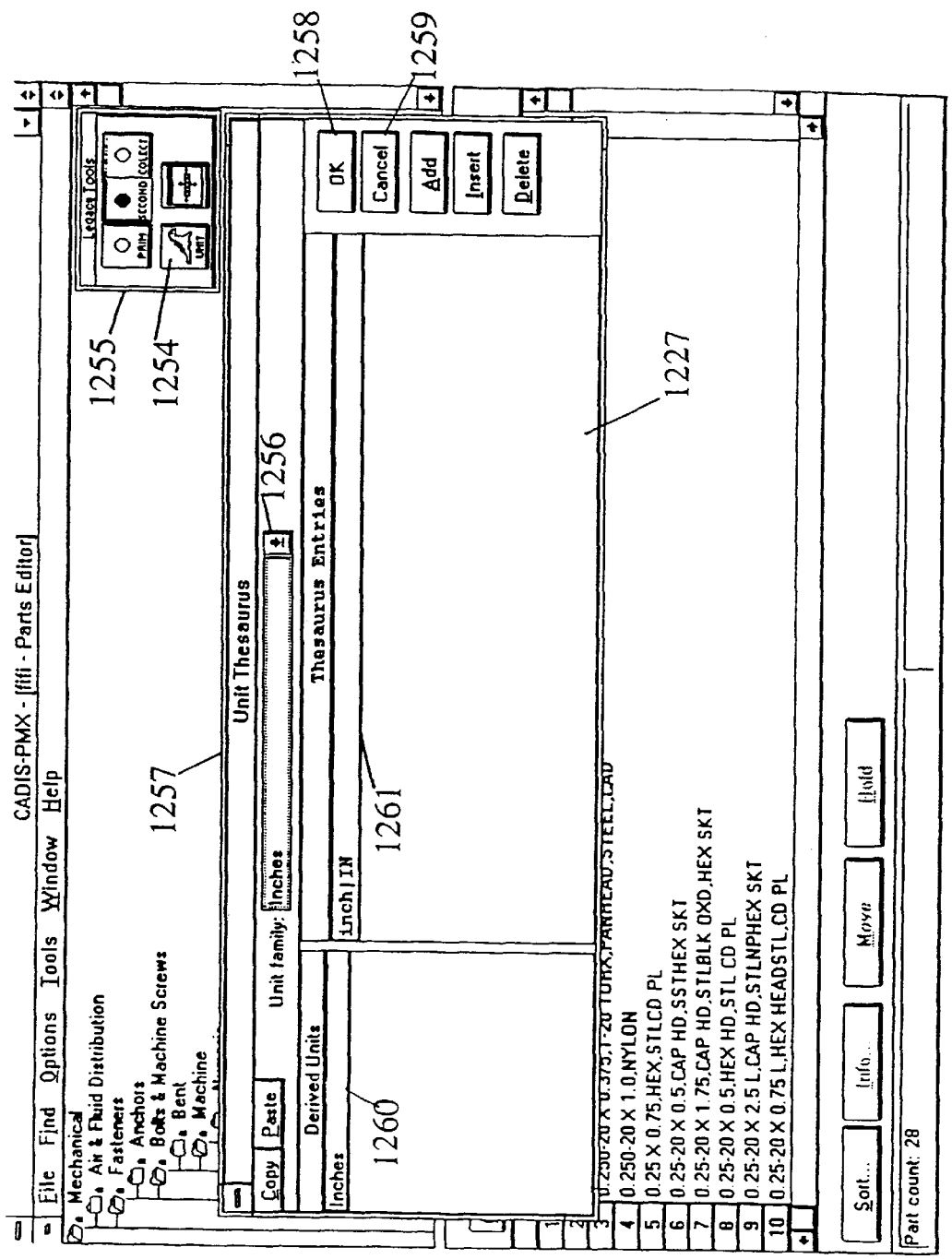

FIG. 192 depicts a display screen showing the procedure for editing a unit thesaurus.

Figure 193:
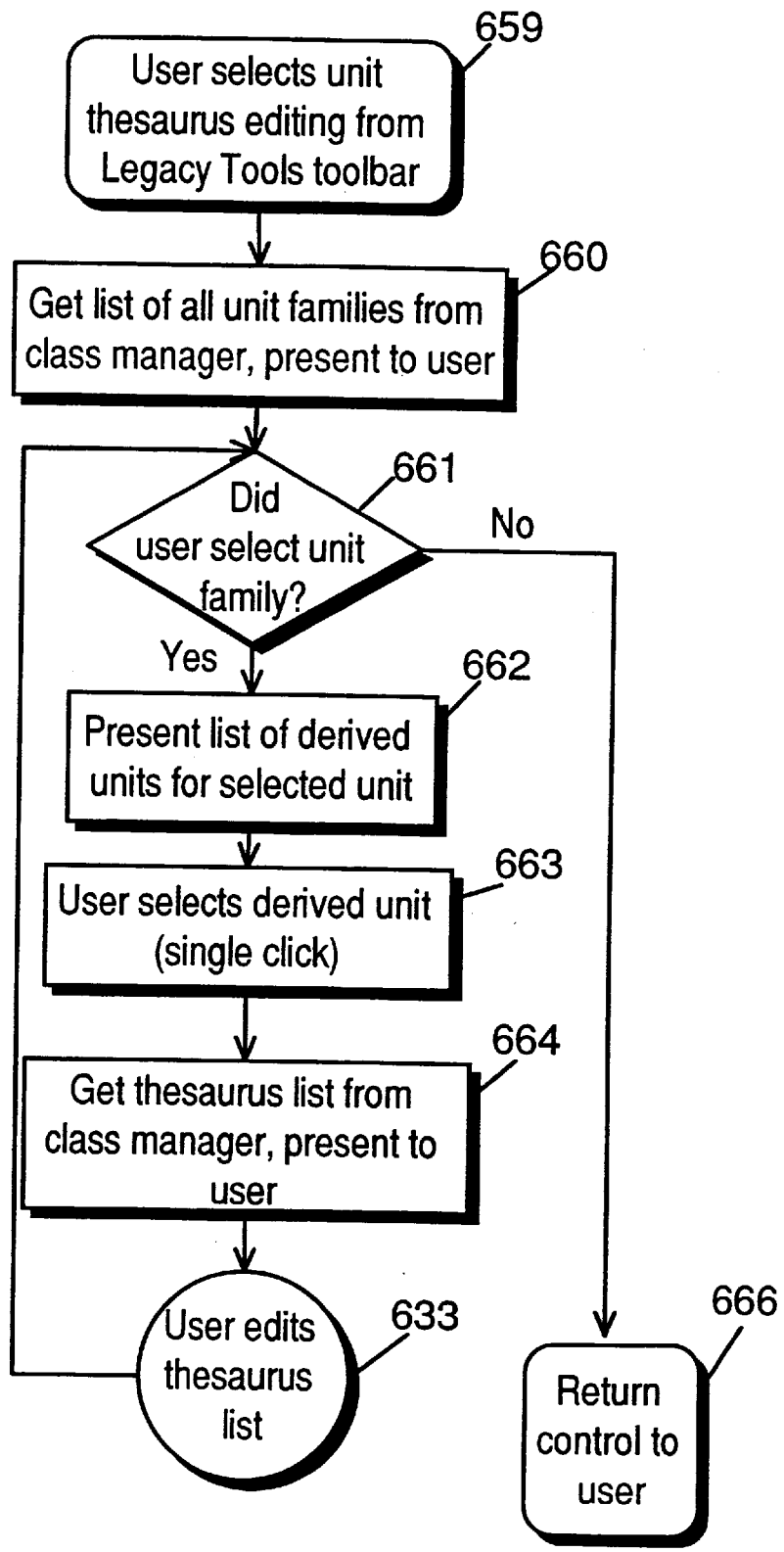

FIG. 193 depicts a flow chart for editing a unit thesaurus.

Figure 194:
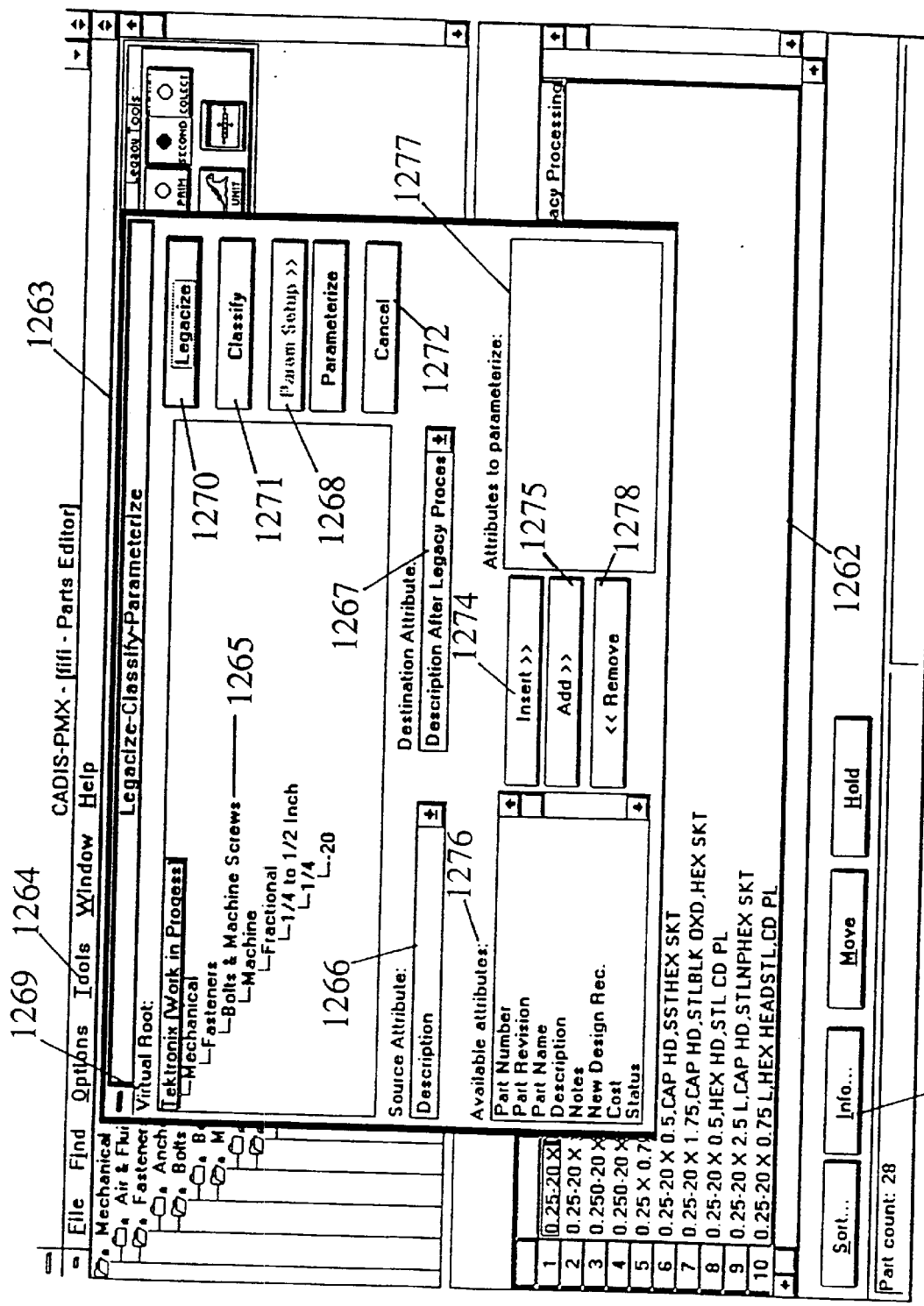

FIG. 194 depicts a display screen showing the procedure for setting up legacy processing for selected parts.

Figure 195:
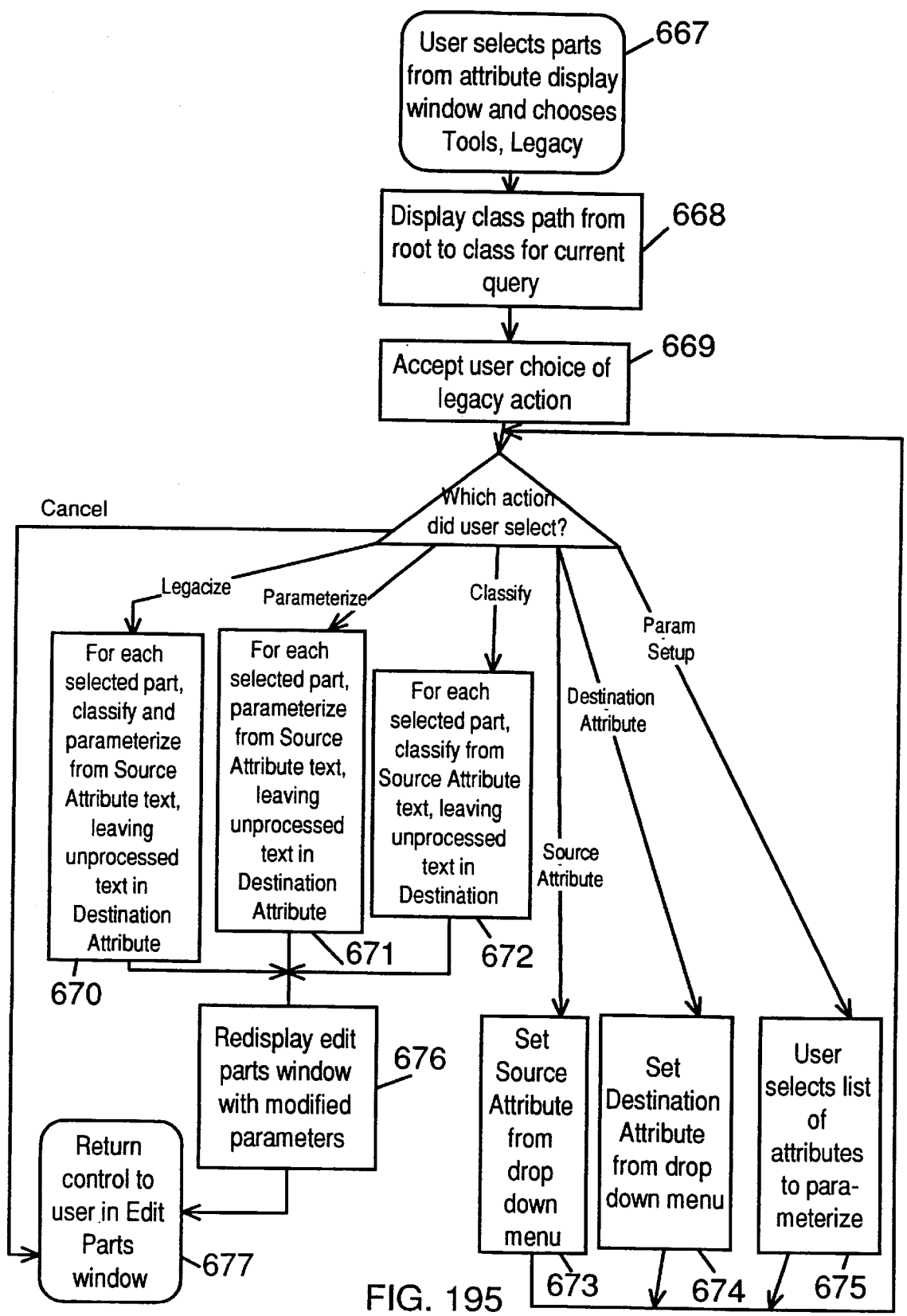

FIG. 195 depicts a flow chart for setting up legacy processing for selected parts.

Figure 196:
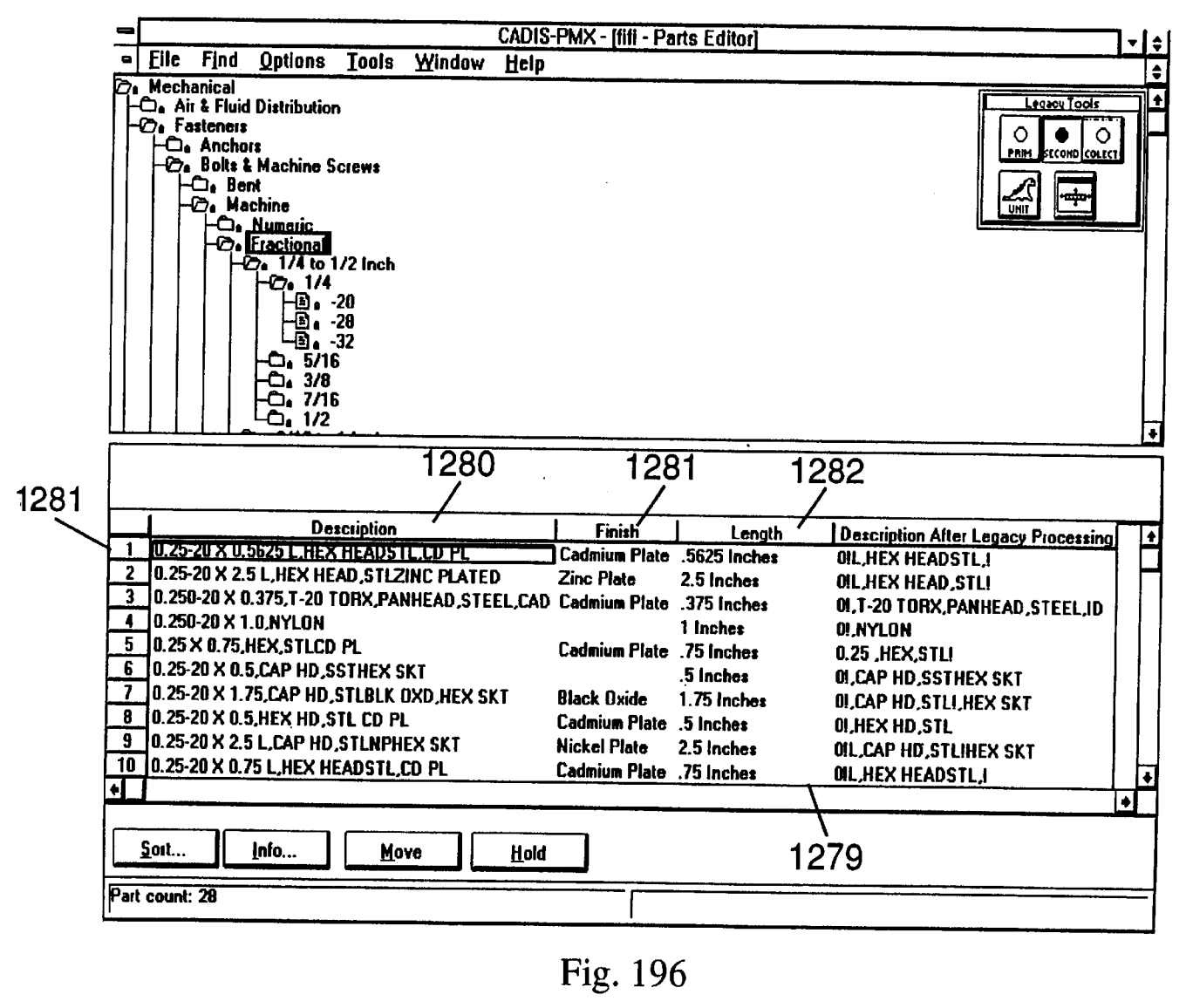

FIG. 196 depicts a display screen showing the result of legacizing selected parts.

Figure 197:
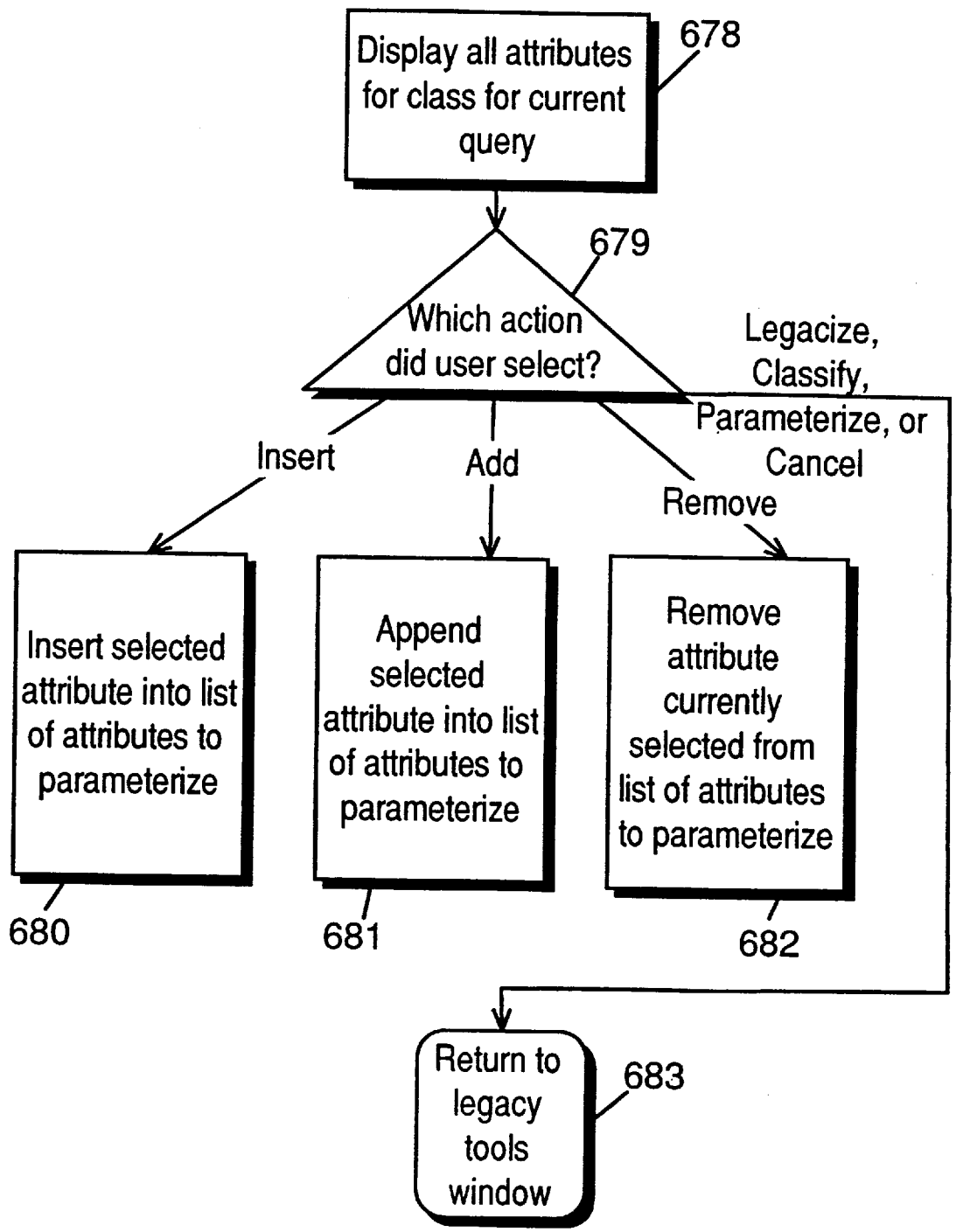

FIG. 197 depicts a flow chart for editing the list of attributes to parameterize.

Figure 198:
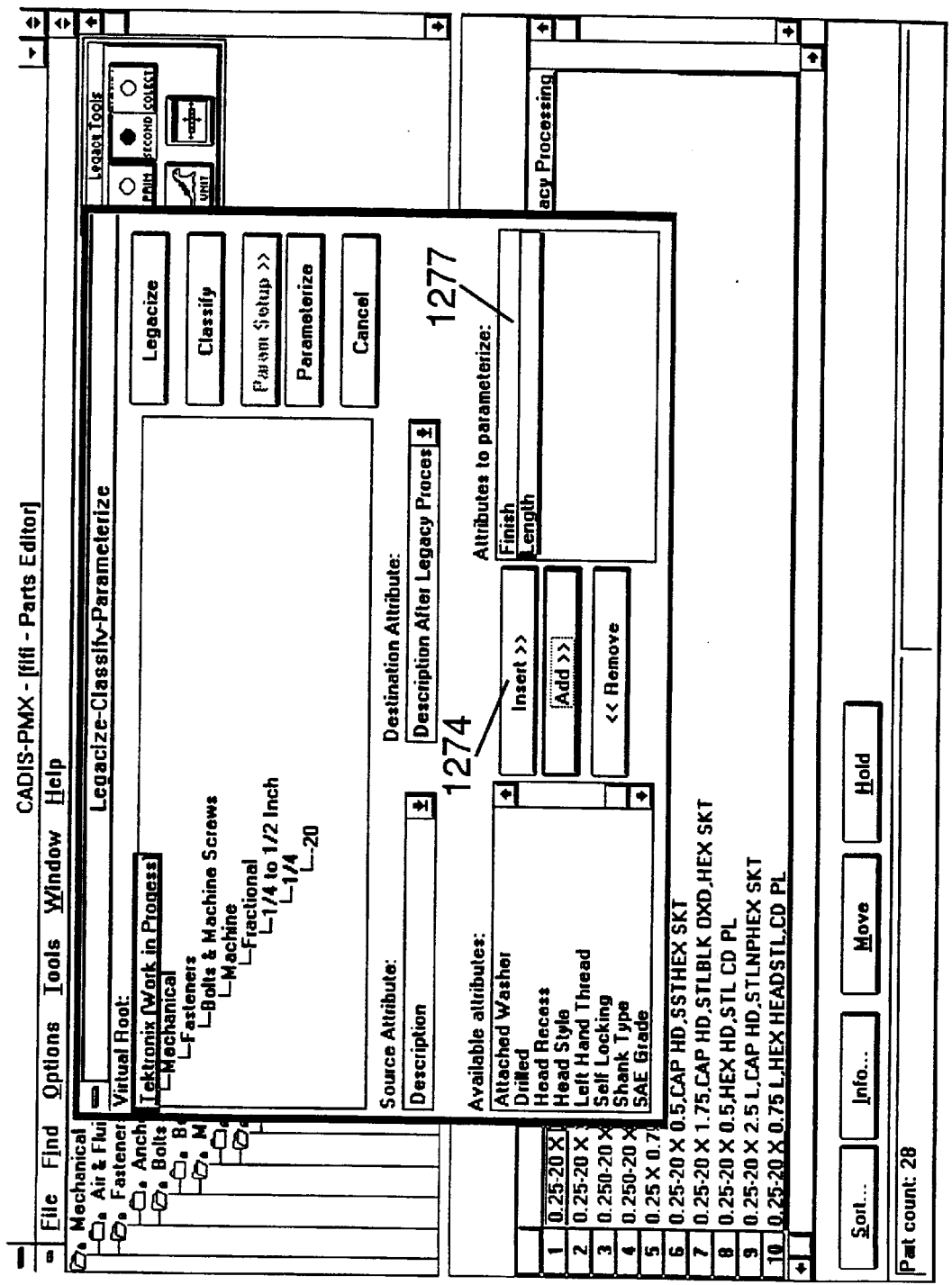

FIG. 198 depicts a display screen showing the procedure for editing a list of attributes to parameterize.

Figure 199:
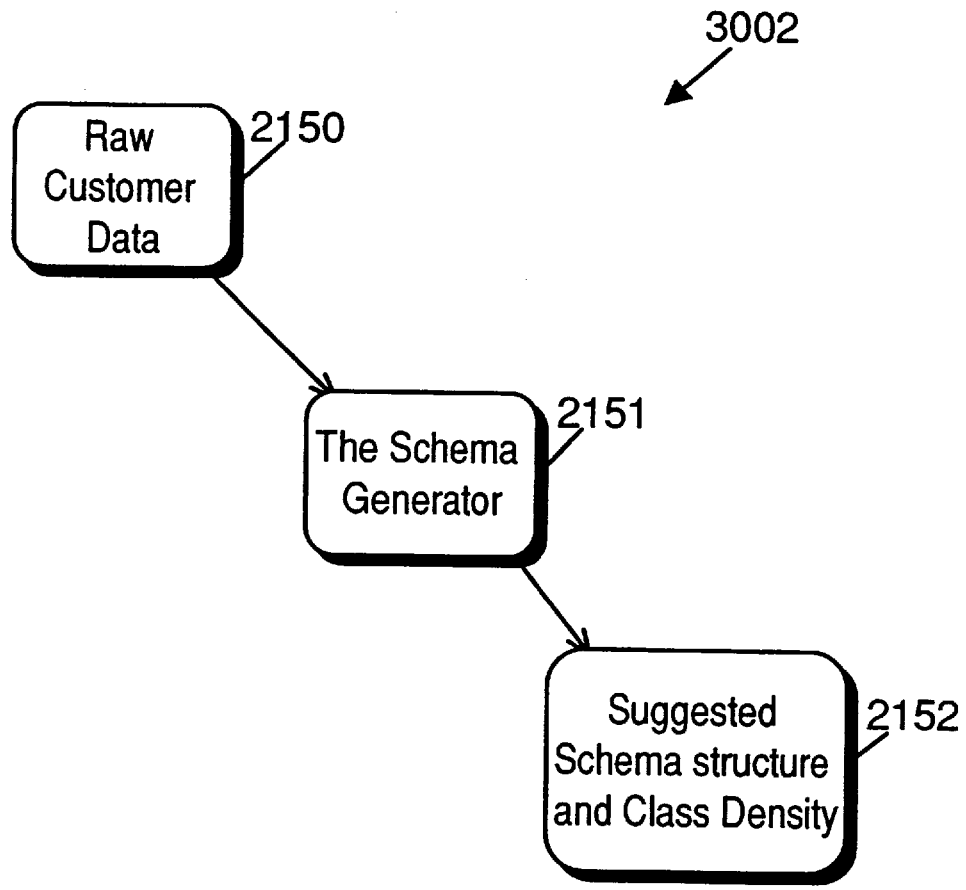

FIG. 199 depicts a flow chart for generating customer schema from customer data.

Figure 200:
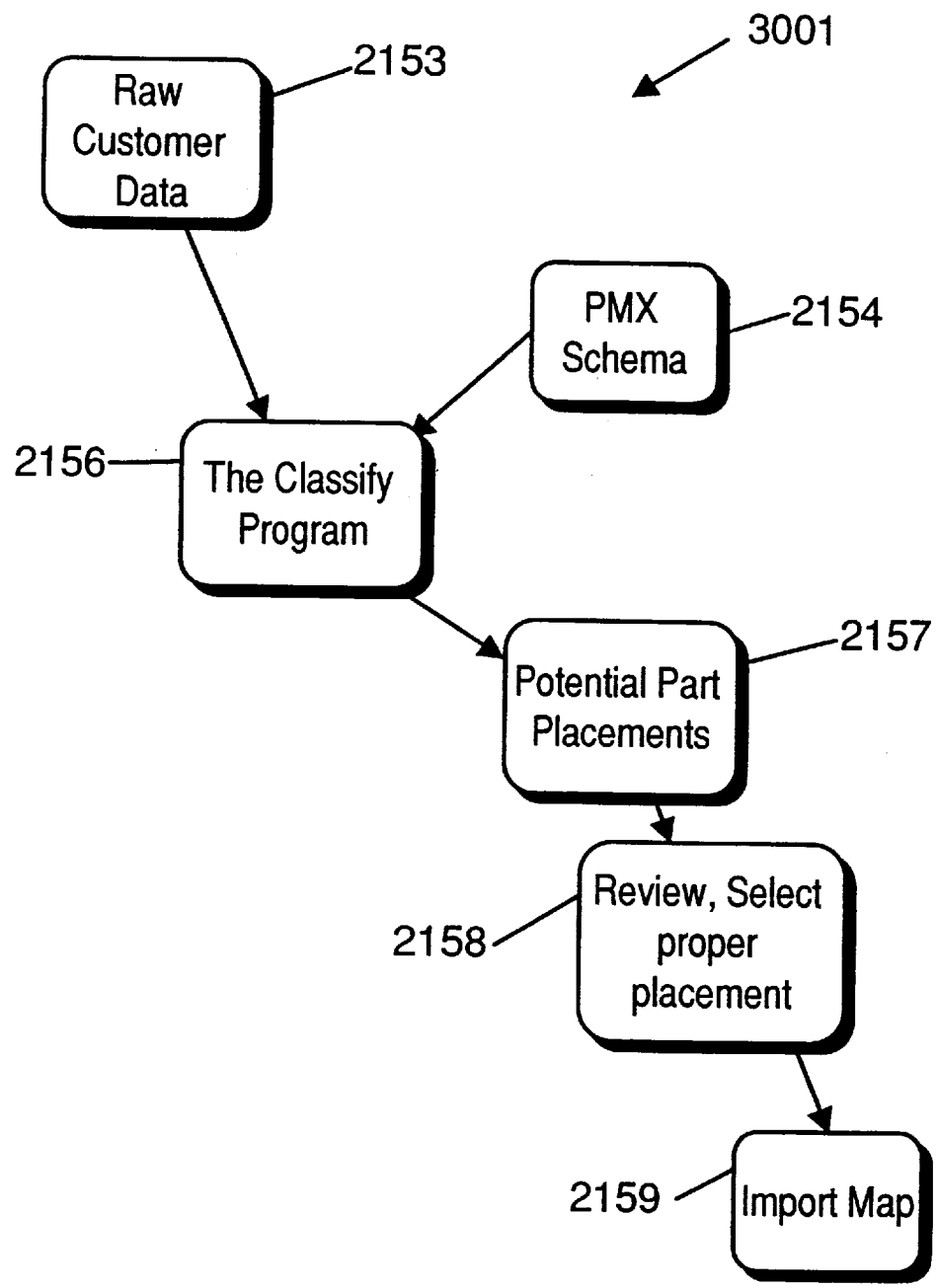

FIG. 200 depicts a flow chart for initially classifying customer data and generating an import map.

Figure 201:
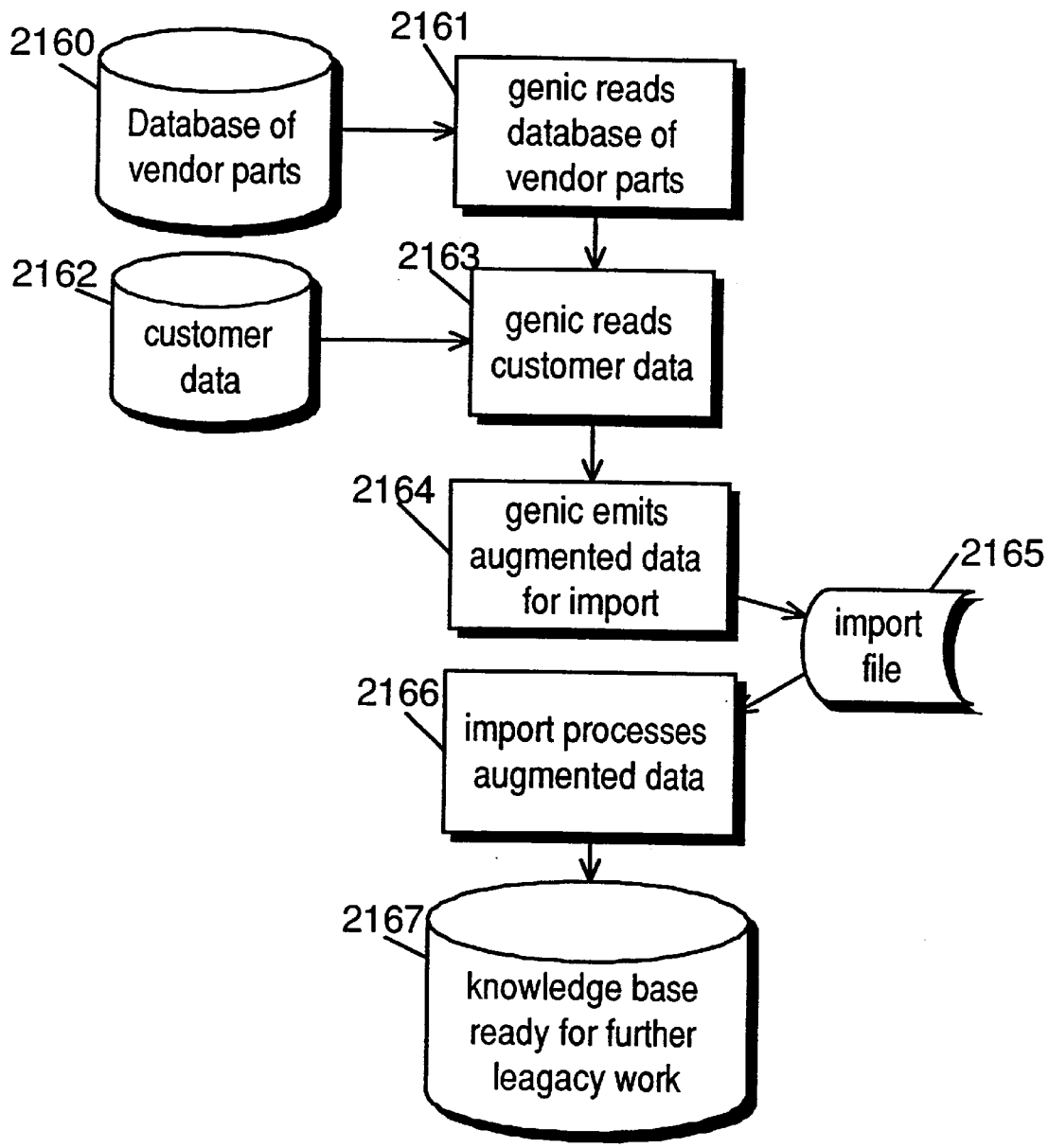

FIG. 201 depicts a flow chart for augmenting customer data from a database of vendor parts.

Figure 202:
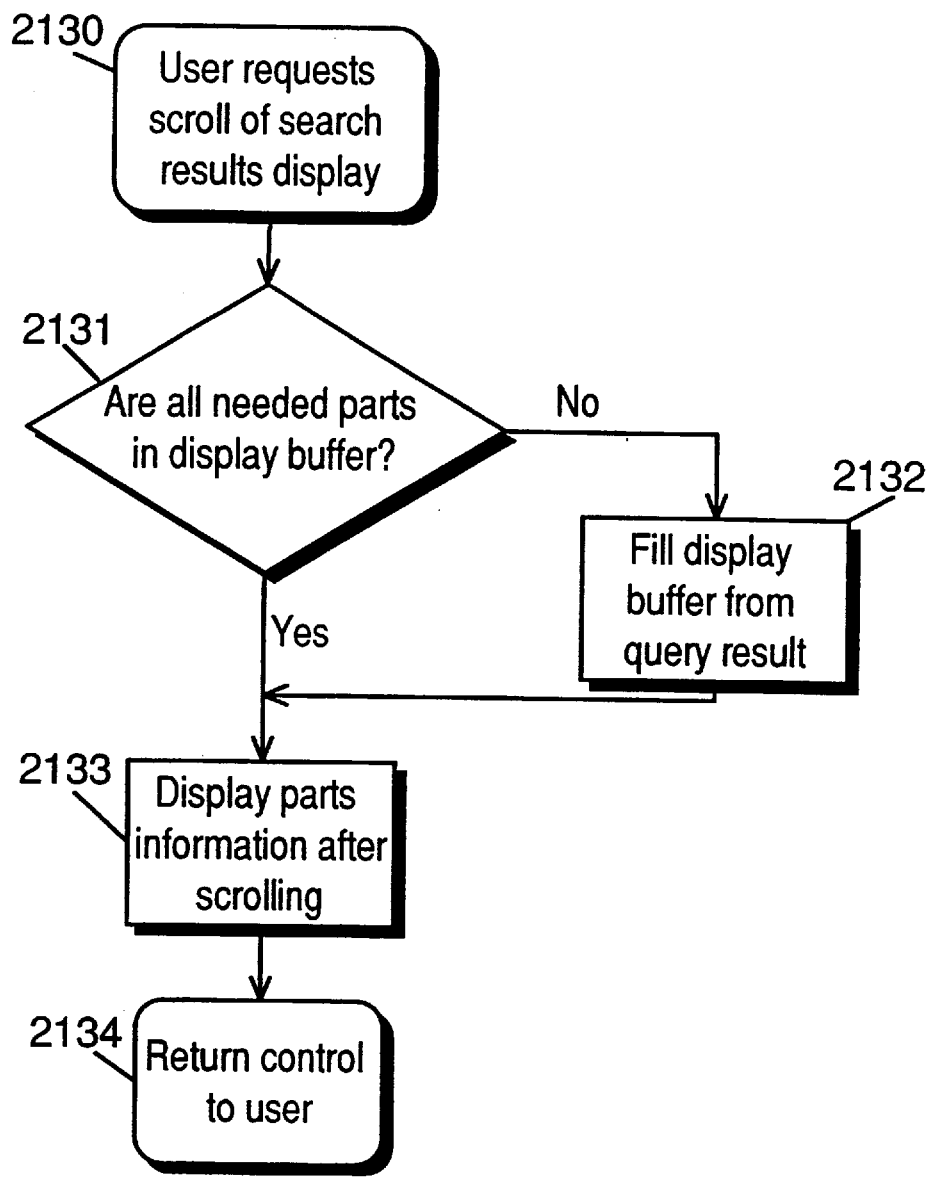

FIG. 202 depicts a flow chart for buffering query result to optimize network performance.

Figure 203:
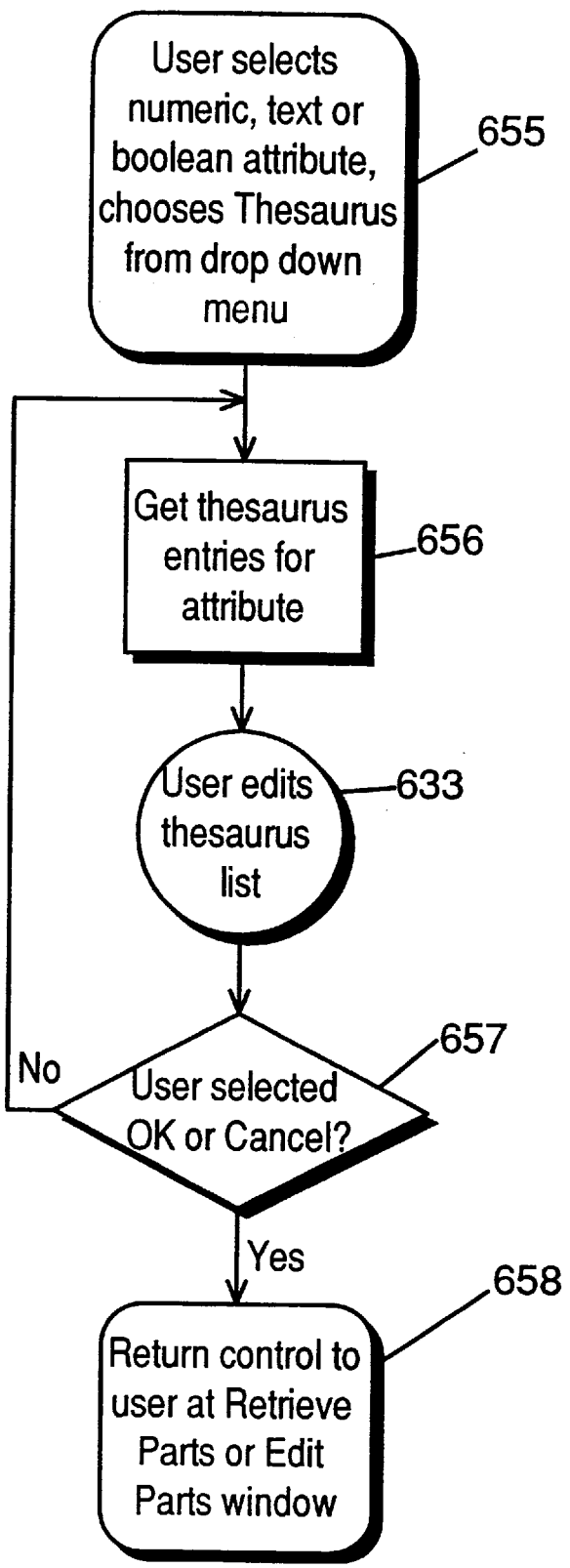

FIG. 203 depicts editing a non-enumerated thesaurus.

DETAILED DESCRIPTION OF A PREFERRED EMBODIMENT

Figure 1:
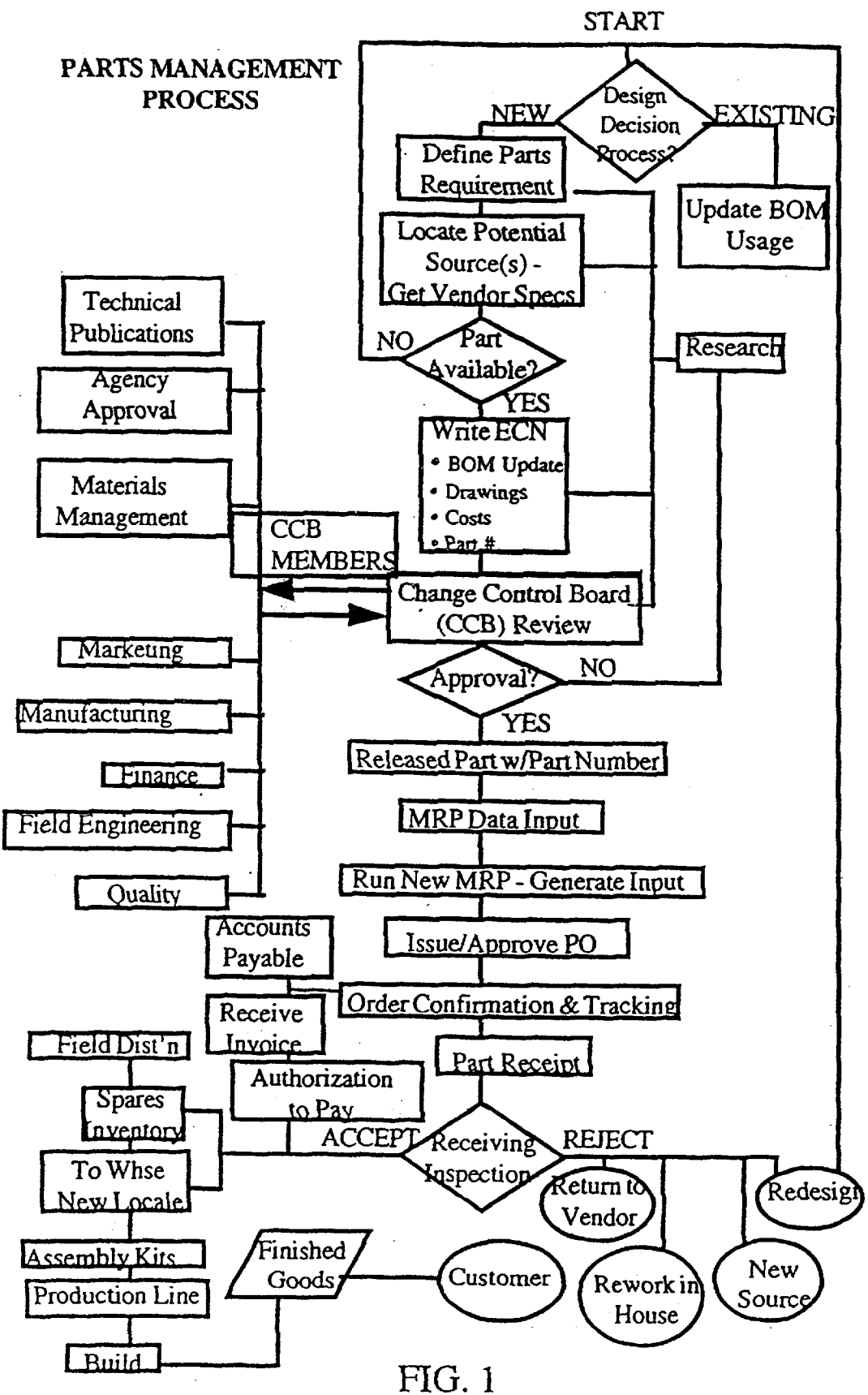
FIG. 1 is a flow chart depicting a typical conventional parts management process.
Figure 2:
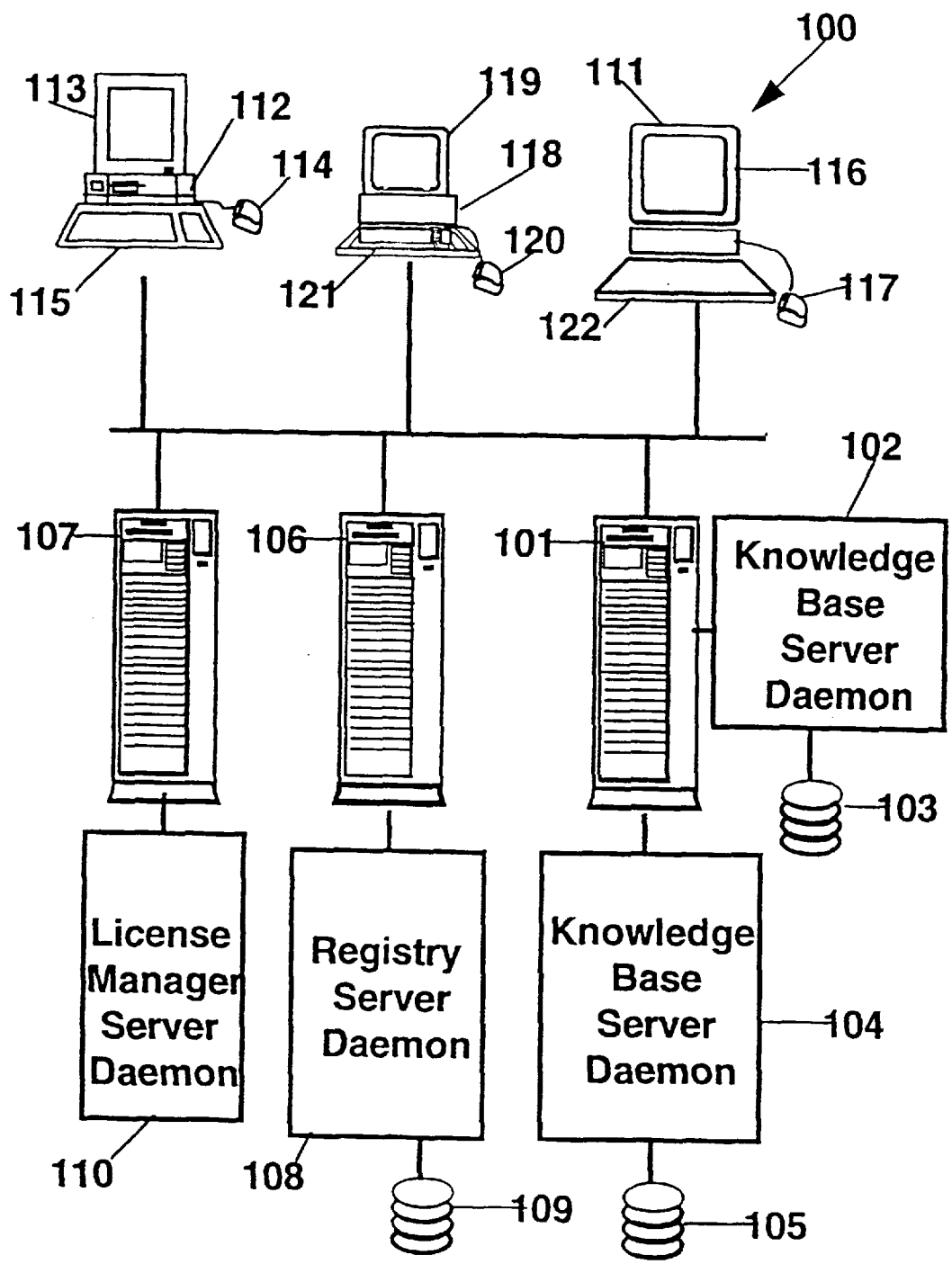
FIG. 2 is a diagram of a typical network environment that is suitable for use in connection with the present invention.

The present invention can advantageously be used in a network environment. A number of configurations are possible, and only one example will be described herein. It should be understood that the present description is illustrative, and the invention is not limited to the particular example or configuration described herein. An overview of a suitable network environment is depicted in FIG. 2.

The network 100 includes a first UNIX server host 101. One or more knowledge bases 123 are installed on the first UNIX server host 101. In the illustrated example, a first knowledge base server daemon 102 runs on the first UNIX server host 101. Data may be physically stored on a first disk drive 103 which is sometimes referred to as secondary storage. More than one knowledge base server 102 may exist on the system 100. For example, a second knowledge base server daemon 104 may be provided. Similarly, data may be physically stored on a second disk drive 105. The first UNIX server host 101 may communicate over a network with a second UNIX server host 106 and a third UNIX server host 107. In this example, a registry server daemon 108 is installed on the second UNIX server host 106. The registry server daemon 108 could run on the same UNIX server host 101 as the knowledge base server daemons 102 and 104. Certain files containing information used by the registry server 108 may be physically stored on a third disk drive 109. The registry server 108 is used to administer user access to features and access to knowledge bases. The registry server 108 also allows a system administrator to set up different user profiles for different types of users. For example, there may be some users who only need access permission to retrieve parts from a knowledge base 123. Other users may need access permission to add parts, or edit existing parts. The registry server 108 provides a convenient way to specify and control user access to specific functions. The registry server 108 describes the knowledge bases in use, the users that are allowed to use the system, and the access rights that each user has to the listed knowledge bases.

A licensed manager server daemon 110 is installed on the third UNIX server host 107. The license manager server 110 controls the number of licenses available to any authorized user on the network 100. The license manager 110 uses "floating" licenses. For example, when 20 licenses are available through the license manager 110, any 20 users of the network can use these licenses concurrently.

Before a knowledge base server 102 can be started, the license manager server 110 and the registry server 108 must be running. In order for the registry server daemon 108 to continue to run, it must be able to obtain a license from the license manager server 110. If the registry server 108 can not contact the license manager server 110, it will exit. Therefore, the license manager server 110 should be started first. The registry server 108 should be started second. The knowledge base server 102 should be started thereafter.

Users may access data available through the knowledge base server daemon 102 or the knowledge base server daemon 104 using a suitable workstation 111 connected to the network 100. For example, a Sun Microsystems SPARCstation 111, preferably running X11R5/Motif v1.2 software. Alternatively, a SPARC compatible workstation may be used. In addition, a Hewlett Packard series 700 workstation running Motif v1.2 with X11R5 will also give satisfactory results. In the illustrated example, the Sun Microsystems SPARCstation 111 runs a SunOS 4.1.x operating system. A Hewlett Packard series 700 platform preferably includes HP-UX 9.0.x software.

In addition, a user can access the network 100 using an IBM PC compatible computer 112 running Microsoft Windows v3.1. In the illustrated example, the IBM PC compatible computer 112 can be a 386, 486, or Pentium based machine. The IBM PC compatible computer 112 includes a display 113, a mouse 114, and a keyboard 115. The display 113 is preferably a VGA or SVGA CRT 113. In the illustrated example, the IBM PC compatible computer 112 runs MS-DOS 5.0 or later disk operating system, MS-DOS 6.2 being preferred. The IBM PC compatible computer 112 also must have Winsock 1.1 compliant TCP/IP software. A windows client using an IBM PC compatible computer 112 will employ RPC calls via TCP/IP to communicate with the knowledge base server 102. The IBM PC compatible computer 112 should have sufficient available disk space for software installation. In the illustrated example, the IBM PC compatible computer 112 should also have at least 4 megabytes of RAM memory; 16 megabytes of memory is preferred.

The Sun Microsystems SPARCstation 111 similarly has a display 116, a mouse 117, and a keyboard 122.

The illustrated network 100 shown in FIG. 2 also supports an X Windows client which employs a computer 118, which has a display 119, a mouse 120, and a keyboard 121. A user can access this system using X Windows in a proper emulation mode interfacing with the workstation 111.

In the example shown in FIG. 2, each of the server hosts 101, 106 and 107 may be a Sun Microsystems SPARCstation (or a SPARC compatible), or a Hewlett Packard series 700 computer. In a presently preferred embodiment, a single UNIX system on the network may be designated to run the knowledge base server daemon 102, the registry server daemon 108, and the license manager server daemon 110. This implementation may provide ease of administration. For best performance, the software and knowledge bases embodying the present invention should reside on a single server host 101 local disk drive 103. However, a knowledge base 123 for example may reside on a remote disk drive 109.

Additional information is disclosed in the System Administration and Installation Manual, the entirety of which is incorporated herein by reference.

In the present example, the network environment includes an operating system with a file system, supports virtual memory, employs UDP/TCP/IP protocol, and provides ONC/RPC (open network computing/remote procedure call) services. Additional information concerning virtual memory is disclosed in Leffler, S. J.; McKusick, M. K.; Karels, M. J. and Quarterman, J. S., "The Design and Implementation of the 4.3BSD UNIX Operating System," (1989), published by the Addison-Wesley Publishing Co., the entirety of which is incorporated herein by reference. Additional information is disclosed in Bach, M. J., "The Design of the UNIX Operating System," (1986), published by Prentice-Hall, Inc., the entirety of which is incorporated herein by reference. Additional information concerning ONC/RPC services is disclosed in Bloomer, J., "Power Programming With RPC," published by O'Reilly & Associates, Inc., the entirety of which is incorporated herein by reference. In addition, it is useful if the network environment supports multi-processing and multi-tasking.

The present system supports interactive editing by the user. Users are able to change the parts schema by adding and deleting part attributes, and are able to add whole sections to the schema to support their custom parts. In addition to schema editing, parts in the database may be repositioned within the schema hierarchy, as well as being modified, added, and deleted.

The present invention provides an object oriented tool set that (1) supports dynamic class management, (2) supports a database having a large number of parts (e.g., in excess of several hundred thousand parts), (3) has performance sufficient to support interactive retrieval of parts by hundreds of users, and (4) understands and automatically manages the translation across different units of measure. This system may be referred to as a knowledge base management system.

The present knowledge base management system enables a user to locate "objects" by describing them in terms of their attributes. In a parts management application, these objects are parts, but it could be any other item described by a collection of attributes. Applications are created by subject matter experts—not computer programmers. The sophistication of the application is tied to the development of the subject based schema, not to computer program development.

The present invention may be better understood in connection with the following description of the overall architecture of a presently preferred embodiment.

I. Overall Architecture

Figure 3:
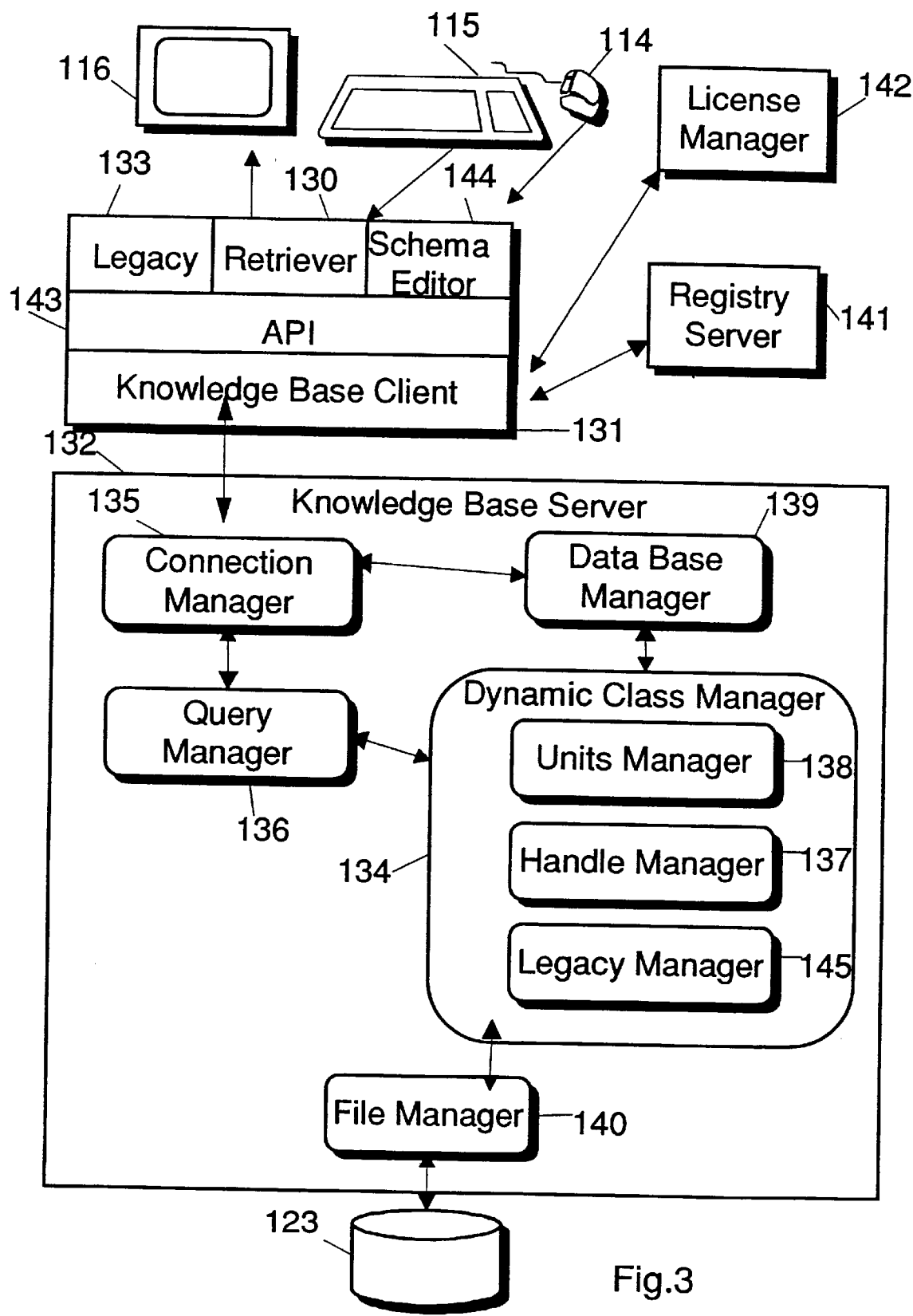
FIG. 3 is a block diagram depicting an overall architecture for a system according to the present invention.

Turning now to FIG. 3, presently preferred embodiment may include a retriever 130, a knowledge base client 131, and a knowledge base server 132. A legacy manager 133 is preferably included to facilitate organization of an existing legacy database into a schema for use in connection with the present invention. In a preferred embodiment, the knowledge base server 132 includes a dynamic class manager 134, a connection manager 135, a query manager 136, a handle manager 137, a units manager 138, a database manager 139, and a file manager 140. A preferred system also includes a registry server 141 and license manager 142 to control unauthorized user access to the system. A schema editor 144 is preferably provided to modify or customize the schema. An application programming interface or API 143 is also provided in the illustrated environment.

A knowledge base 123 is a database containing information, and is stored on a disk drive 103. The knowledge base 123 in the present example comprises three files: the schema file, the variable data file, and the instance file. A schema is a collection of classes, attributes, units, and unit families and their relationships.

In the present example, the executable for the knowledge base server 132 is pmxdbd. Each pmxdbd server provides access to one knowledge base 123. Therefore, the UNIX server host 101 must run one pmxdbd process for each knowledge base 123. For example, in a system having three knowledge bases, the UNIX ps command would show three pmxdbd servers running.

Unlike an RDBMS based application, with the present knowledge base management system solution, complexity, and thus response time, does not increase exponentially with size and number of relationships. Knowledge is not tied to the quantity of software code. Schema can be dynamically updated without recompiling the application. Data and schema are interactively user modifiable. A query is equivalent to finding corresponding indices, not computing RDBMS table joins. Database size is reduced. A knowledge base management system database 123 in accordance with the present invention is typically about $1/10$ the size of an equivalent RDBMS database.

Figure 4A:
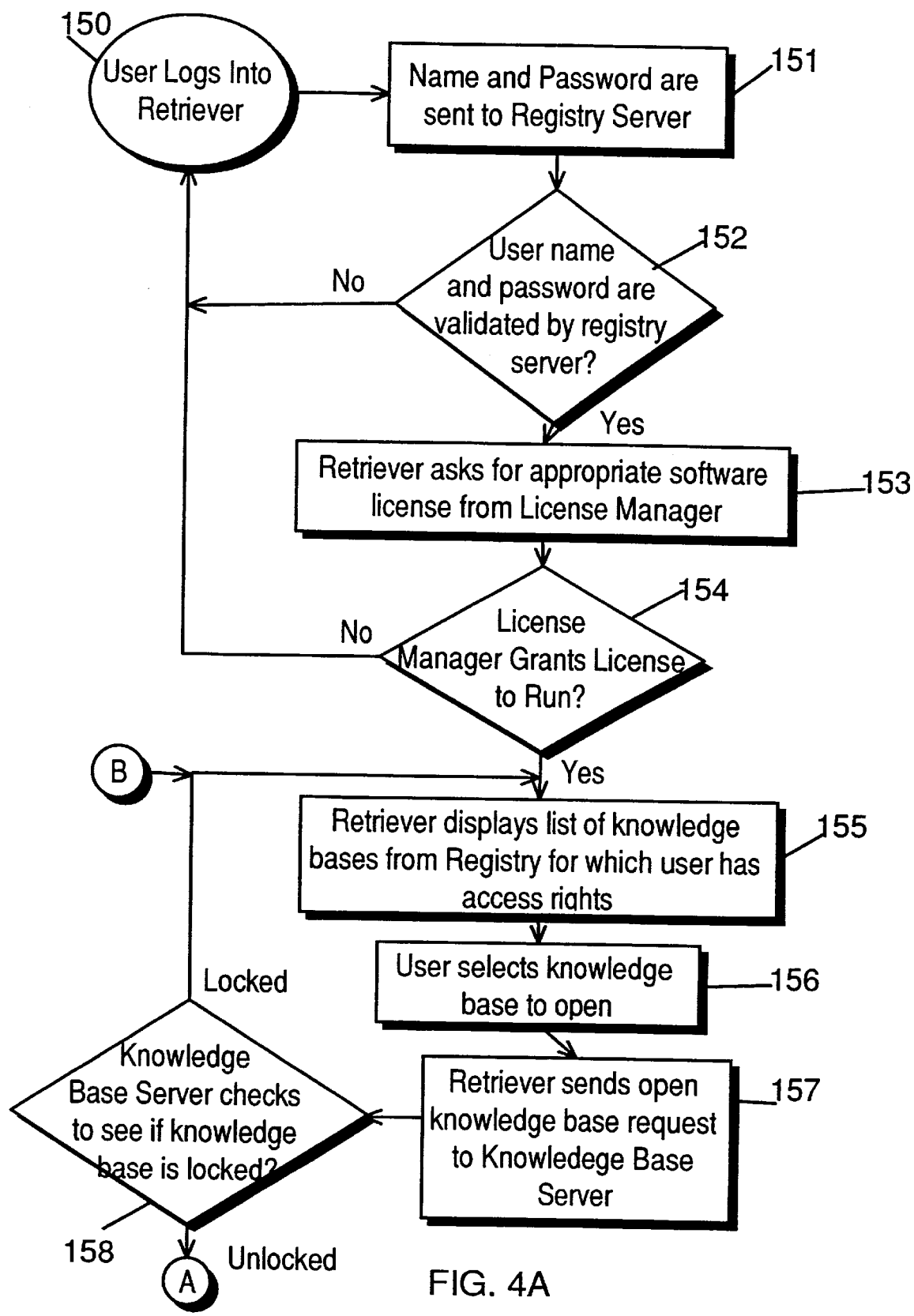
FIGS. 4A and 4B represent a flow chart showing a log in procedure for accessing the system.
Figure 4B:
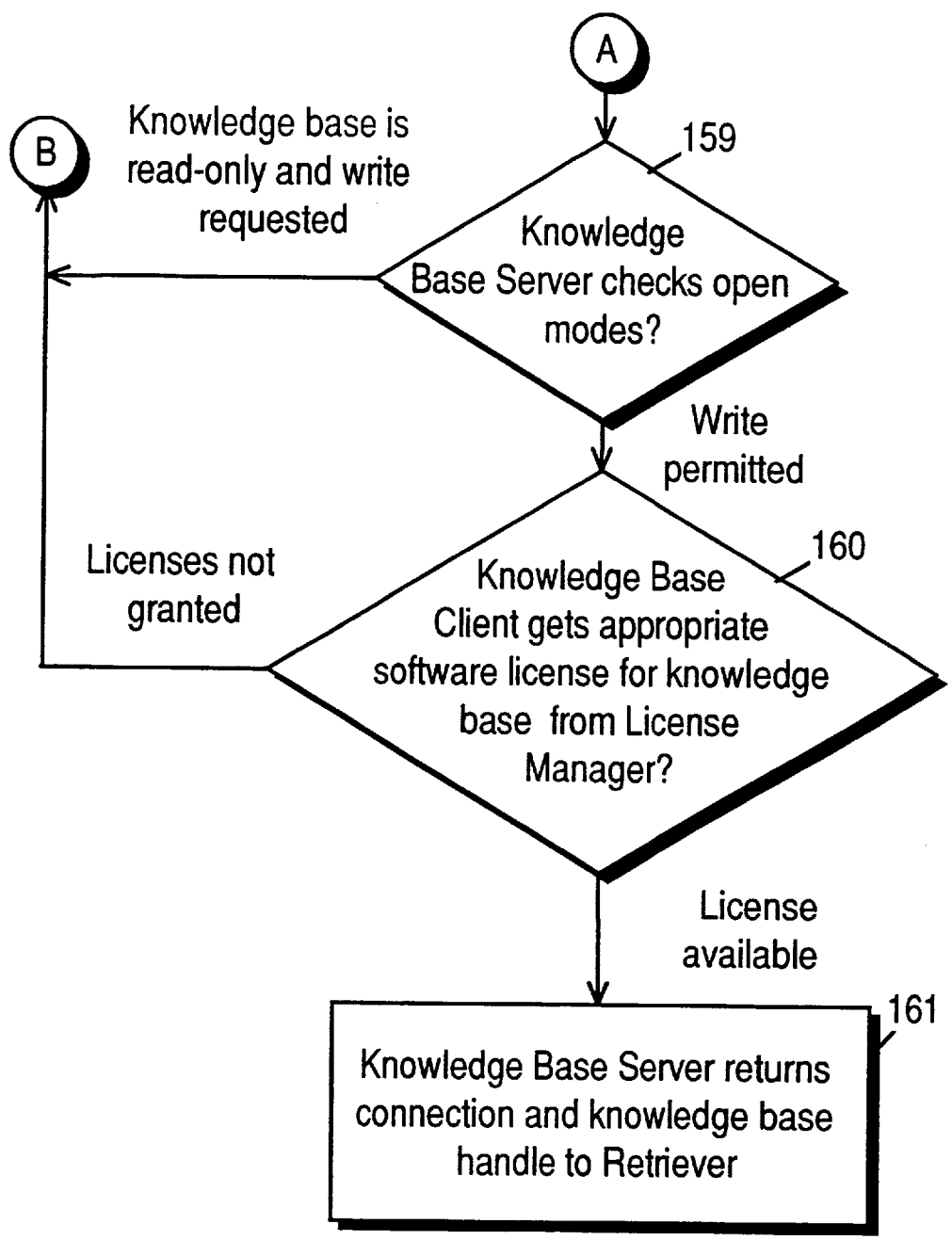

The steps for logging into the system are shown in the flowcharts depicted in FIG. 4A and FIG. 4B.

A login procedure is initiated by a user logging into the retriever 130, as depicted in step 150 in FIG. 4A. The user's name and password are sent to the registry server 141, as shown in 151. In step 152, the user name and password are validated by the registry server 141. If the user name and password are not valid, the flow returns to step 150 and the user must try again. If the name and password are valid, the flow continues to step 153 in which the retriever 130 asks for an appropriate software license from the license manager 142.

In step 154, the license manager 142 determines whether or not a license is available for the user. If a license is not available, flow returns to step 150 shown in FIG. 4A. If the license is available, license manager 142 grants a license to run and flow continues to step 155. The retriever 130 will display on the display 116 a list of knowledge bases 123 which are available. The list of knowledge bases is obtained from the registry server 141. The registry server 141 will only return a list of knowledge bases for which the user has access rights. In step 156, the user may then select a knowledge base 123 to open.

In step 157, the retriever 130 will send an open knowledge base request to the knowledge base server 132. In step 158, the knowledge base server checks to see if the requested knowledge base 123 is locked. There are times, for example when an input administrator is performing extensive input into a knowledge base 123, when it is desirable to lock a knowledge base 123 and temporarily prevent any other user from accessing it. Instances when a knowledge base 123 is locked are typically those in which one person needs to have exclusive access to the knowledge base 123. If the knowledge base 123 is locked, flow returns to step 155 in which the retriever 130 again displays on the display 116 a list of knowledge bases from the registry server 141 for which the user has access rights. The user will also receive a message notifying the user that the knowledge base 123 that the user initially attempted to open is locked.

If the requested knowledge base 123 is not locked, flow continues to step 159 in FIG. 4B, and the knowledge base server 132 checks to determine which open modes are valid for this user or knowledge base 123. For example, if the knowledge base 123 is read only, and the user has attempted to access it in a mode in which a write operation to the knowledge base 123 has been requested, flow returns to step 155 in FIG. 4A and the user receives a message on the display 116.

In this example, if the requested open mode is available that particular knowledge base 123 for that particular user, flow continues to step 160 shown in FIG. 4B. The knowledge base server 132 attempts to get the appropriate software license from the license manager 142. If a license is not granted, flow returns to step 155 shown in FIG. 4A. If a license is available, flow continues to step 161 shown in FIG. 4B. In that event, the knowledge base server 132 will return connection and a knowledge base handle to the retriever 130. The user will then have successfully logged on to the network 100 and will have access to the requested knowledge base server 102.

FIG. 168 shows the major components of a computer hardware configuration 101 providing the computational and communications environment for a knowledge base server 132. This configuration consists of a central processing unit or CPU 2109 which includes an arithmetic logical unit 2100 which fetches and executes program instructions from main memory 2101. The programs are stored on a disk drive 103, access to which is provided through a disk controller 2106. The knowledge base files 123 are also stored on disk drive 103 and accessed through virtual memory addresses 2112 in main memory 2101, through which, when required, a page 2111 of contiguous data in a disk file 2108 is copied into main memory 2101. The preferred embodiment of the present invention uses virtual memory 2112 for this knowledge base management system. The knowledge base server 132 interacts with the client API 143 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

FIG. 169 shows the major components of a computer hardware configuration 112 providing the computational and communications environment for a retriever 130, schema editor 144, a graphical user interface component of legacy 133, and an API 143. This configuration consists of a central processing unit or CPU 2109 which includes an arithmetic logical unit 2100 which fetches and executes program instructions from main memory 2101. The programs are stored on one or more disk drives 2110, access to which is provided through a disk controller 2106. The user interacts with the system through the keyboard 115 and mouse or similar graphical pointer 114 with the graphical user interface displayed on the CRT display 113. The API 143 communicates with the knowledge base server 132 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

Additional information is set forth in CADIS-PMX API Reference Guide, Version 2.0 (August 1994), the entirety of which is hereby incorporated by reference.

A. Retriever

The retriever 130 is an application that provides a graphical interface for finding and managing parts. The retriever 130 communicates with the knowledge base client 131 using the API 143. The retriever 130 provides an object oriented graphical user interface. A user interacts with the retriever 130 providing input through a keyboard 115 and a mouse 114. The retriever displays information on the display 116.

Figure 5:
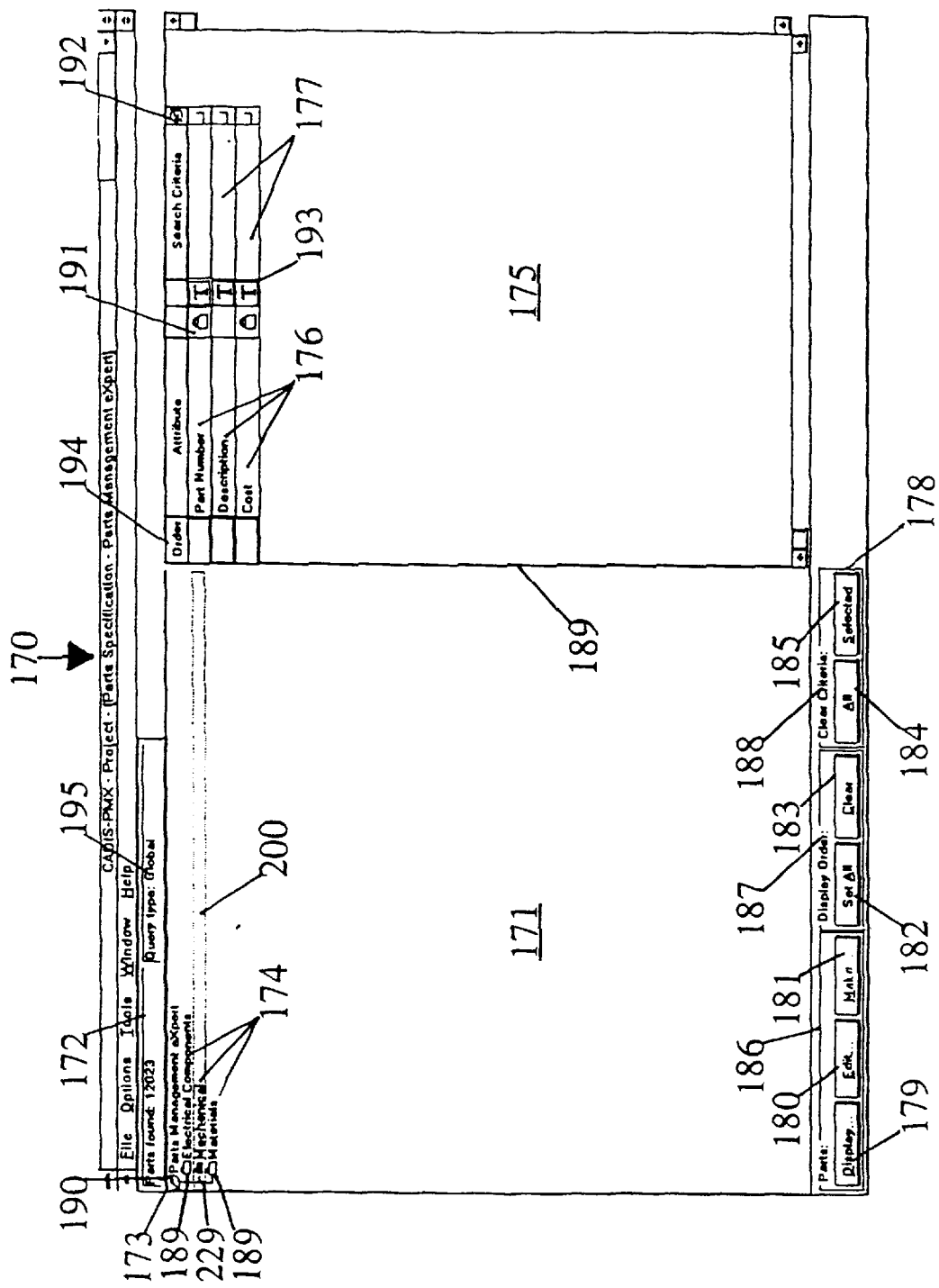
FIG. 5 depicts an initial display screen showing the part specification window.

FIG. 5 depicts a typical display that appears on the screen of the display 116 after a user successfully logs on to the system. The particular example described herein is described in a Windows environment, it being understood that the invention is not limited to implementation in Windows. Those skilled in the art are familiar with windows techniques and instructions, including how to click, double click, drag, point and select with a mouse 114. Additional information may be obtained from the Microsoft Window's User's Guide (1992), available from Microsoft Corporation, One Microsoft Way, Redmond, Wash., 98052-6399, part number 21669.

When a user first opens a knowledge base 123, a part specification window 170 appears, as shown in FIG. 5. Initially, the left hand portion of the screen 171 displays the parts found 172, which in this instance is the total number of parts found in the knowledge base 123. Also displayed on the left-hand portion of the screen 171 is the root class 173 and the root subclasses 174. In the illustrated examples, the root subclasses 174 are electrical components, mechanical (i.e., mechanical components), and materials. The root class 173 is the upper most class that has no parent. In this example, it is the name of the knowledge base 123, or the very beginning of the schema. A subclass 174 is a class that has a parent. When a class is chosen, any subclasses that belong to that class will appear on the display 171. Subclasses are the children of the parents. For example, the parent of the mechanical subclass 174 is the root class 173, and the mechanical subclass 174 is a child of the parent root class 173. In the example shown in FIG. 5, there are three subclasses.

The right hand portion of the screen 175 displays root attributes 176. In the illustrated example, the attributes are part number, description, and cost. Attributes 176 are the characteristics of a class or subclass 174.

Specific attribute values may be entered to locate a part as search criteria 177. Command buttons 178 are displayed in the part specification window 170. When command name is dimmed, the command is not available at the current time. In the example shown in FIG. 5, display button 179 will, when activated, display a list of the parts matching the current specification at that point in the search. An edit button 180 and a make button 181 are also shown in FIG. 5. These command buttons are only shown if the user is authorized to edit attribute values and has access rights to make a new part, respectively. When activated, the edit button 180 causes a parts editor window to be displayed which allows the user to edit attribute values. When the make button 181 is activated, it allows a user to add a part to the knowledge base 123. These three buttons appear in the parts area 186 of the command buttons 178. A display order area 187 has a set all command button 182 and a clear command button 183. When the set all button 182 is activated, it sends a sequential display order to each attribute. This order is used to arrange the attributes display in a search results window. When the clear button 183 is activated, it causes the display order numbers to be removed from all of the attributes.

A clear criteria area 188 includes an all button 184 and a selected button 185. When the all button 184 is activated, it causes all values to be cleared from the search criteria fields 177. When the selected button 185 is activated, it causes the value to be cleared from the selected search criteria fields 177.

The left-hand portion of the screen 171 is separated from the right-hand portion of the screen 175 by a split bar 189. A user may drag the split bar 189 to the left or right to change the size of the left hand portion of the screen 171 and the right-hand portion of the screen 175.

Icons are displayed in the part specification window 170 to provide information to the user. Closed folder icons 189 are used to represent the classes that have subclasses. An open folder icon 190 is used to represent opened classes 173 and subclasses. A protected icon 191 indicates an attribute for which the user cannot enter values when making a part. An undefined icon 192 indicates a column which, if selected by a user, will be used to search for parts that do not have any value for the selected attribute 176. Also shown in FIG. 5 is a text icon 193 associated with each of the attributes entitled "part number", "description", and "cost". The text icon 193 is used to indicate attributes 176 that have values consisting of a string of characters. For example, a written description is an attribute 176 of a part that is a text attribute. An order column 194 is used to indicate the sequence, from left to right, in which attributes 176 will appear when a search results window 299 is displayed. When applicable, a "1" in this column will indicate the attribute 176 that will be displayed on the far left of the search results window, a "2" in this column will indicate the attribute 176 that is displayed next, and so forth from left to right.

The part specification window 170 also contains a query type indicator 195. This only appears for users who have access rights for editing parts. This indicates the type of query that the user is performing, i.e., whether it is global or local. In the example illustrated in FIG. 5, the query type has defaulted to global.

When the user needs to locate a part, the user generally knows the characteristics or attributes 176 of the part, but the user may not know the part number. By knowing the attributes 176, the user can easily locate the part in the knowledge base. A user locates parts in the knowledge base by specifying the type of part the user wants to find. The user specifies a part by selecting the part's class 173 and subclasses 174 and by entering attribute search criteria 177.

Figure 6:
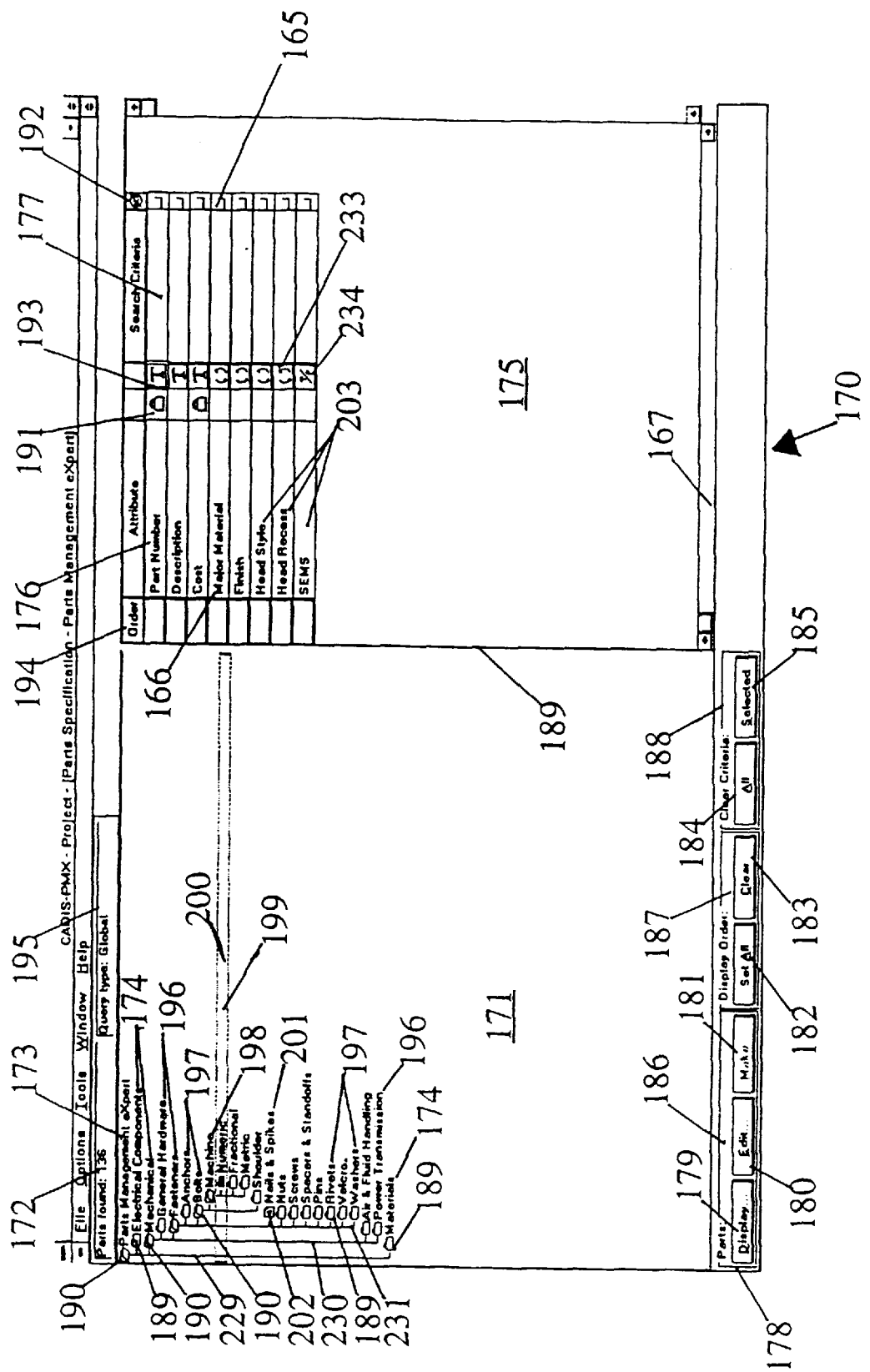
FIG. 6 depicts an example of the part specification window during a search.

The first step in specifying the part the user wants to locate is to open the class 173 the part belongs to. When the user opens a class such as the mechanical class 174 shown in FIG. 5, the user sees the next level of the hierarchy, i.e., subclasses 196 shown in FIG. 6. The closed folder icon 189 next to the mechanical subclass 174 shown in FIG. 5 is replaced by an open folder icon 190 shown in FIG. 6. The next step in specifying a part is to open the next subclass 196 the part belongs to, in this example the fasteners subclass 196. When the user opens one of the subclass folders 196, the user sees the next level of subclasses 197, as shown in FIG. 6. The user continues specifying a part by opening another level of subclass 197, such as the bolts subclass 197 shown in FIG. 6, and so forth through lower levels of subclasses 198 and 199, until the user reaches a class that has no more subclasses, which is called a leaf class 201. A leaf class is identified with a page icon 202. An open class 199 will be displayed with a line 232 forming a subtree connecting the subclasses 204 of the class 199. More specifically, line 232 connects the open folder icon 190 for the class 199 with the closed folder icons 189 of the subclasses 204. The line 232 extends vertically down from the open folder icon 198 to the level of the last subclass 204, as horizontal branches connecting the vertical line 232 with closed folder icons 189 for the subclasses 204.

At every subclass level the number of parts found at that level is displayed as parts found 172. The parts found number 172 indicates the number of parts located within the current subclass 199, including its subclasses and leaf classes (see FIG. 6). This instant feedback to the user greatly facilitates a search.

Figure 7:
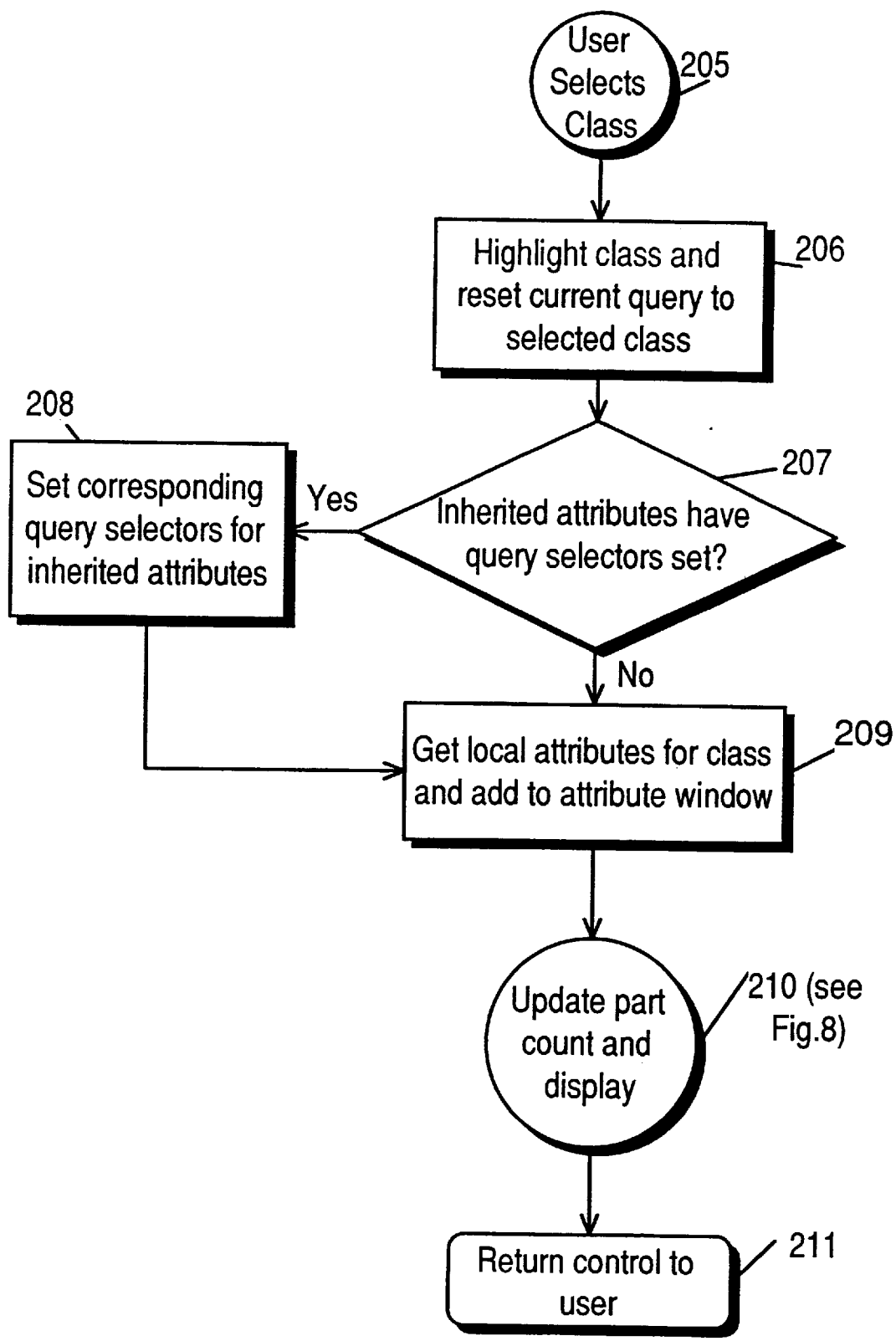
FIG. 7 is a flow chart for selecting a class.

The steps followed by the retriever 130 are depicted in FIG. 7. The user selects a class in step 205. In step 206, the selected class is displayed in a highlighted representation 200 (see FIG. 5). The retriever 130 resets the current query to the selected class in step 206.

Referring to FIG. 7, in step 207 of the flow the retriever 130 determines whether inherited attributes 176 have query selectors 177 set. If query selectors are set, the flow proceeds to step 208, and the retriever 130 sets corresponding query selectors for inherited attributes 176. Flow then proceeds to step 209. In step 207, if inherited attributes do not have any query selectors set, the flow proceeds directly to step 209.

In step 209, the retriever 130 gets local attributes 203 for the class 199 and adds them to the display in the right hand portion 175 of the part specification window 170, which may be referred to as the attribute window 175.

Flow proceeds to step 210 where the retriever 130 updates the part count and displays that information as parts found 172. Flow then proceeds to step 211 where control is returned to the user and the system waits for another command.

Figure 8:
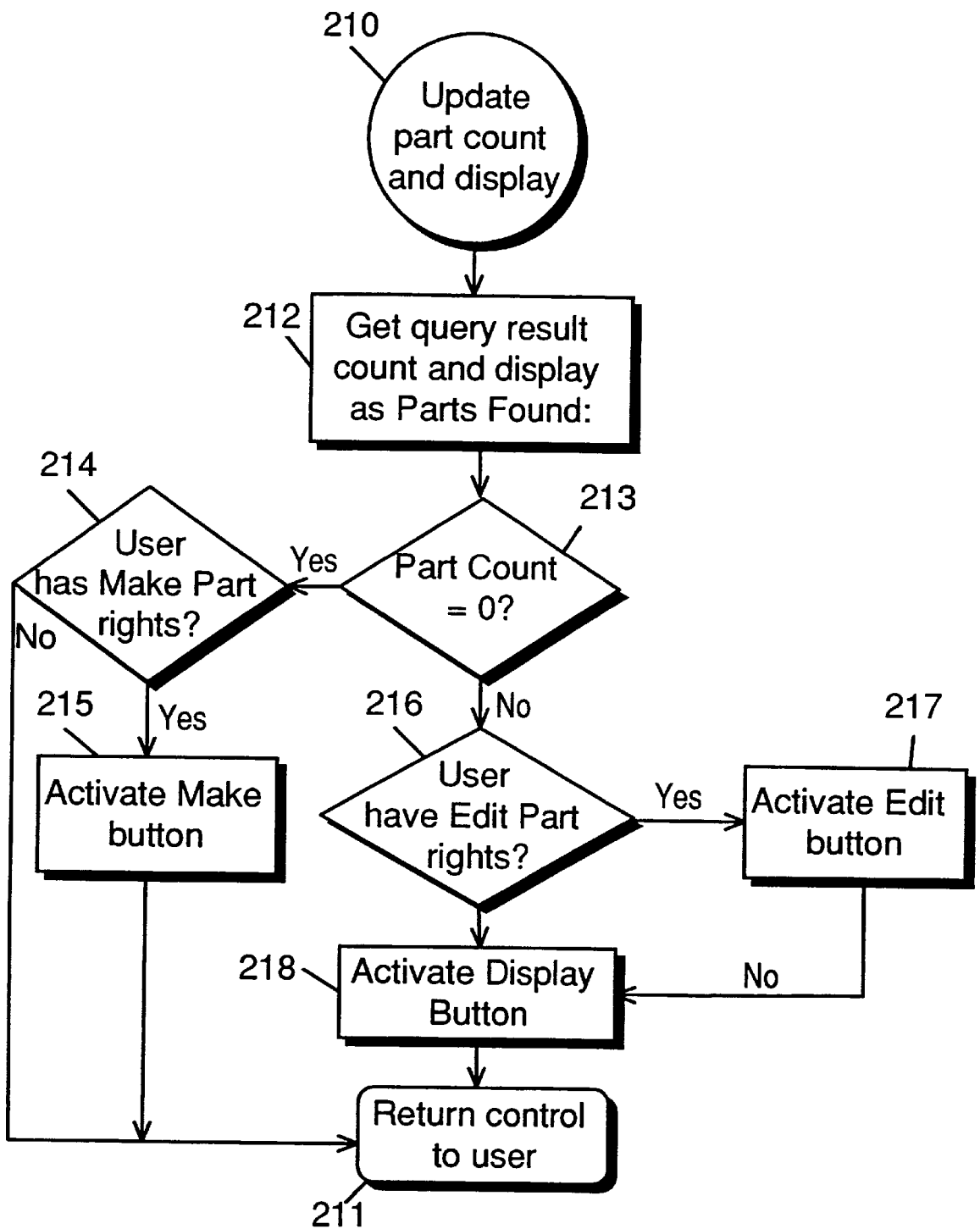
FIG. 8 is a flow chart depicting the procedure for updating the part count and display.

The procedure 210 for updating the part count and display is shown in more detail in FIG. 8. In order to update the part count and display, the retriever 130 gets a value representative of the query result count and displays it as parts found 172. This is shown in step 212 of FIG. 8.

The retriever 130 then checks to determine whether the part count is zero, which is performed in step 213. If the part count is zero, the retriever 130 checks to determine whether this particular user has access rights to add a new part to the knowledge base. This occurs in step 214. If the user does not have such access rights, the flow proceeds to step 211 and returns control to the user. If the user does have such access rights, the retriever 130 then activates the make button 181. Up until this point in time, the make button 181 had been dimmed because that procedure was not available. In a preferred embodiment, a user is not allowed to add a new part to the knowledge base unless the user has access rights which permit him or her to do so. Activation of the make button occurs in step 215 of the flow chart illustrated in FIG. 8.

If the part count is not equal to zero, flow transfers to step 216 in which the retriever 130 checks to determine whether the user has access rights to edit parts. If the user does have such access rights, the retriever 130 proceeds to step 217 in the flow and activates the edit button 180. The flow then proceeds to step 218, where the retriever 130 activates the display button 179. In step 216, if the user does not have access rights to edit parts, the flow proceeds directly to step 218. After the display button is activated in step 218, the flow proceeds to step 211 where control is returned to the user.

Figure 9:
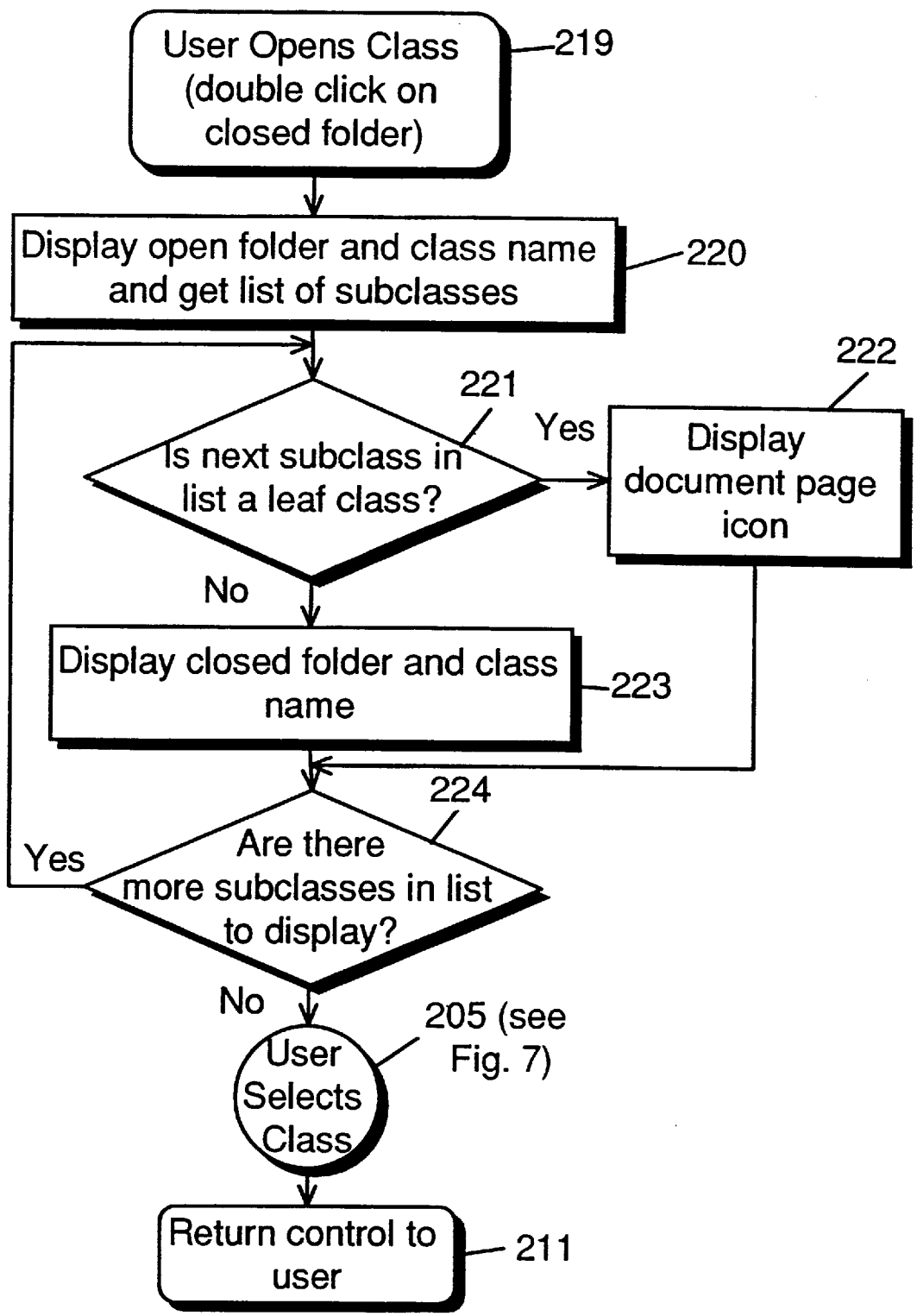
FIG. 9 is a flow chart depicting the procedure for opening a class.

FIG. 9 depicts steps performed by the retriever 130 to open a class. In order to open a class such as the fasteners class 196 shown in FIG. 6, the user positions the cursor to point to the closed folder 189 immediately next to the class and double clicks. As shown in FIG. 9, the retriever 130 then changes the display of a closed folder 189 and replaces it with an open folder icon 190 in step 220. The retriever gets a list of the subclasses 197.

In step 221, the retriever 130 proceeds through the list of subclasses and determines whether the next subclass in the list is a leaf class 201. If it is, flow proceeds to step 222 in FIG. 9 and a page icon 202 is displayed for that subclass 201. Control will then proceed to step 224.

In step 221, if the next subclass in the list is not a leaf class, flow proceeds to step 223 where the retriever 130 displays a closed folder icon 189 and the class name for the subclass 197. Flow then proceeds to step 224.

In step 224, the retriever 130 checks to determine whether there are any more subclasses 197 in the list to display. If there are, flow proceeds back to step 221. If there are not, flow proceeds to step 205.

Figure 10:
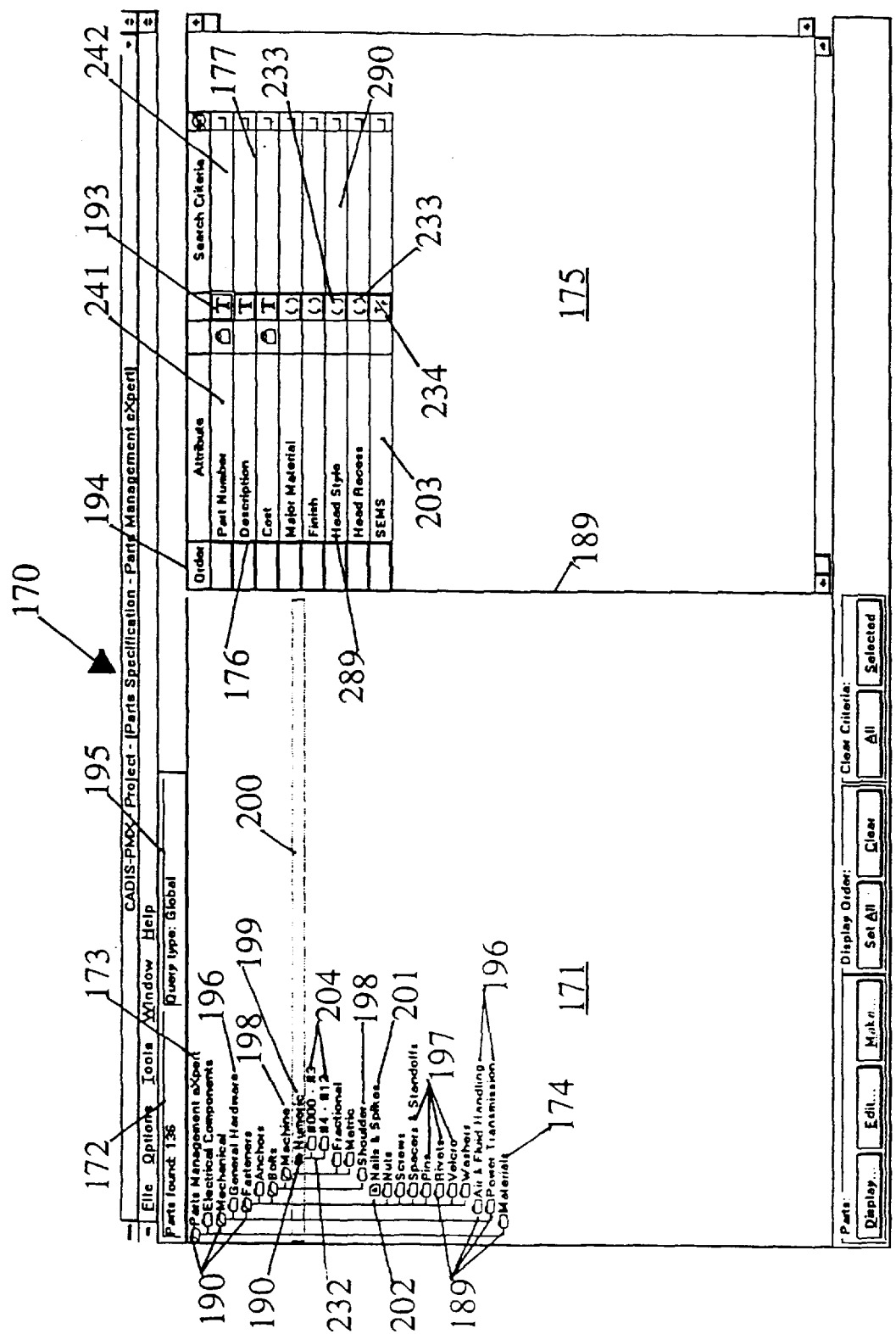
FIG. 10 depicts a display screen showing information displayed in the part specification window.
Figure 11:
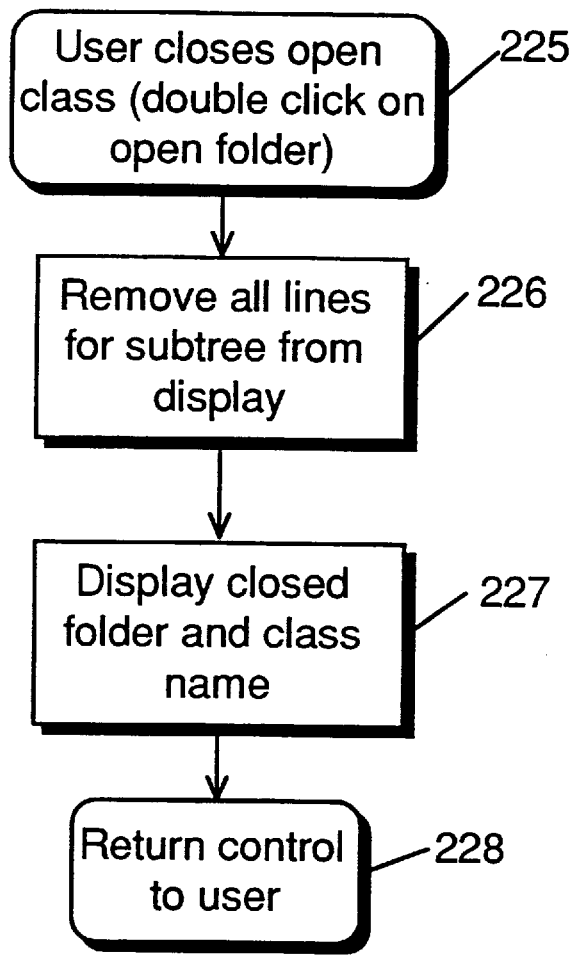
FIG. 11 is a flow chart depicting the procedure for closing an open class.

The procedure followed by the retriever 130 to close and open class 199 (see FIG. 10) is depicted in FIG. 11. In step 225, the user double clicks on the open folder icon 190 associated with the class 199 that is to be closed. Flow then proceeds to step 226 in FIG. 11. In step 226, the retriever 130 removes all lines for the subtree 232 from the display 171. The names of the subclasses 204 and the closed folder icons 189 associated with them will also be removed from the display 171. The representation of the tree structure will then be collapsed to eliminate the space formerly occupied by the subclasses 204.

The flow then proceeds to step 227, in which the open folder 190 next to the parent class 199 is replaced with a closed folder icon 189. The flow then proceeds to step 228 in FIG. 11, and control is returned to the user.

The changes to the part specification window 170 which occur when a user closes an open class may be better appreciated by comparing FIG. 10 with FIG. 6. Starting with FIG. 10, if the user closes the numeric class 199, the subtree line 232 and the subclasses 204 will be removed from the display, and the open folder icon 190 associated with the numeric class 199 will be replaced with a closed folder icon 189. The display 171 will be updated to appear as depicted in FIG. 6.

Attributes 203 that may have a value taken from a set of pre-defined values are referred to as enumerated attributes. For example, the head style attribute 203 under bolts is taken from a set of pre-defined values because the head style for a bolt can only be one type taken from a finite list of possible head styles. Enumerated attributes such as head style 203 are identified with an associated enumerated icon 233.

Attributes 203 that have values of either true or false are Boolean attributes. For example, a bolt can have an attribute 203 used to indicate whether or not it is a self locking bolt. If the bolt is self locking, this attribute value is true. If the bolt is not self locking, this attribute value is false. Boolean attributes have a Boolean attribute icon 234 associated with them.

Attributes 236 that have values that are numeric and have an associated unit of measurement are called numeric attributes. For example, the length of a bolt 236 is a numeric attribute. Numeric attributes 236 have a numeric attribute icon 235 associated with them.

The user may further specify the part by entering attribute search criteria 177. Each class and subclass has an associated set of attributes 176. Attributes 176 are the characteristics of a part, such as the material the part is made from, its length, or finish. As the user opens additional subclasses 196, 197, 198 and 199, the attributes 203 specifically associated with those subclasses 196, 197, 198 and 199 appear. These attributes 203 are the local attributes of the open class/subclass 199 and are appended to the existing attributes 176, which are the inherited attributes. By entering attribute search criteria 177, the user can narrow down the number of parts the user needs to check for applicability.

Figure 12:
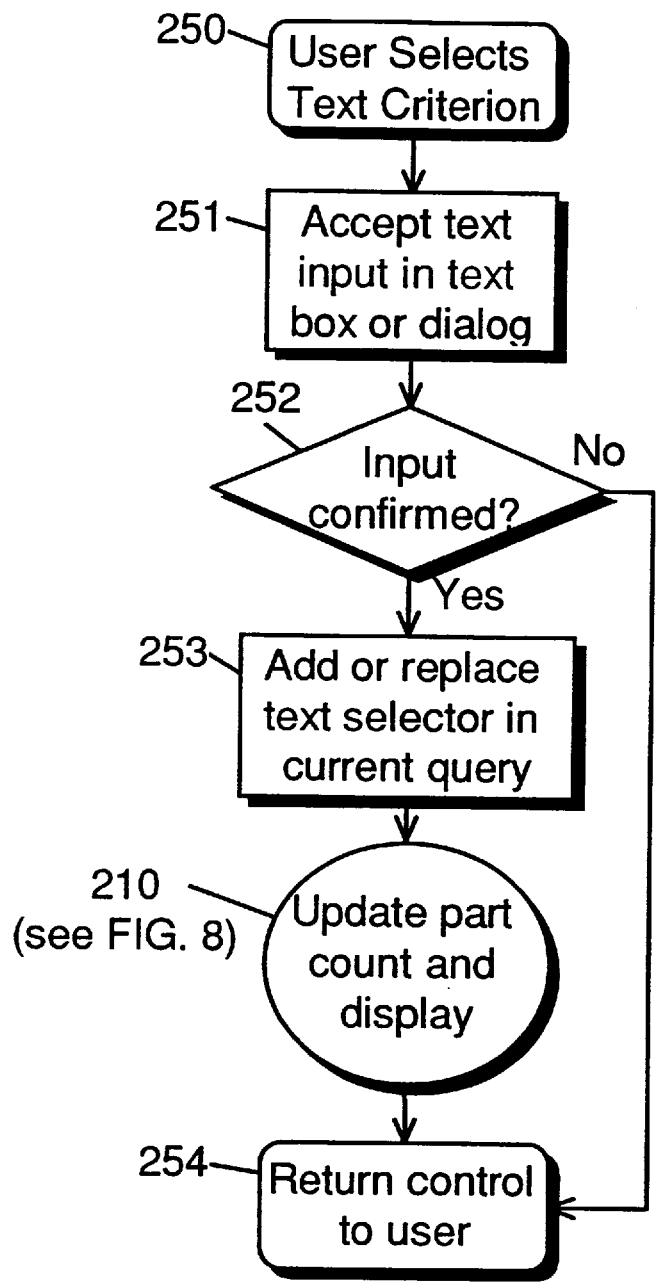
FIG. 12 is a flow chart depicting the procedure for selecting text search criteria.

Referring to FIG. 12, there may be many parts in the selected subclass or leaf class 240, and it is desirable to further specify a part by entering search criteria 177. When a user enters search criteria 177, the retriever 130 immediately performs a search to locate only the parts that have all of the specified attribute values 176, 203. There are four types of attributes: (1) enumerated, (2) numeric, (3) text, and (4) Boolean. The retriever 130 has different procedures for entering and clearing the search criteria for each type of attribute.

Figure 13:
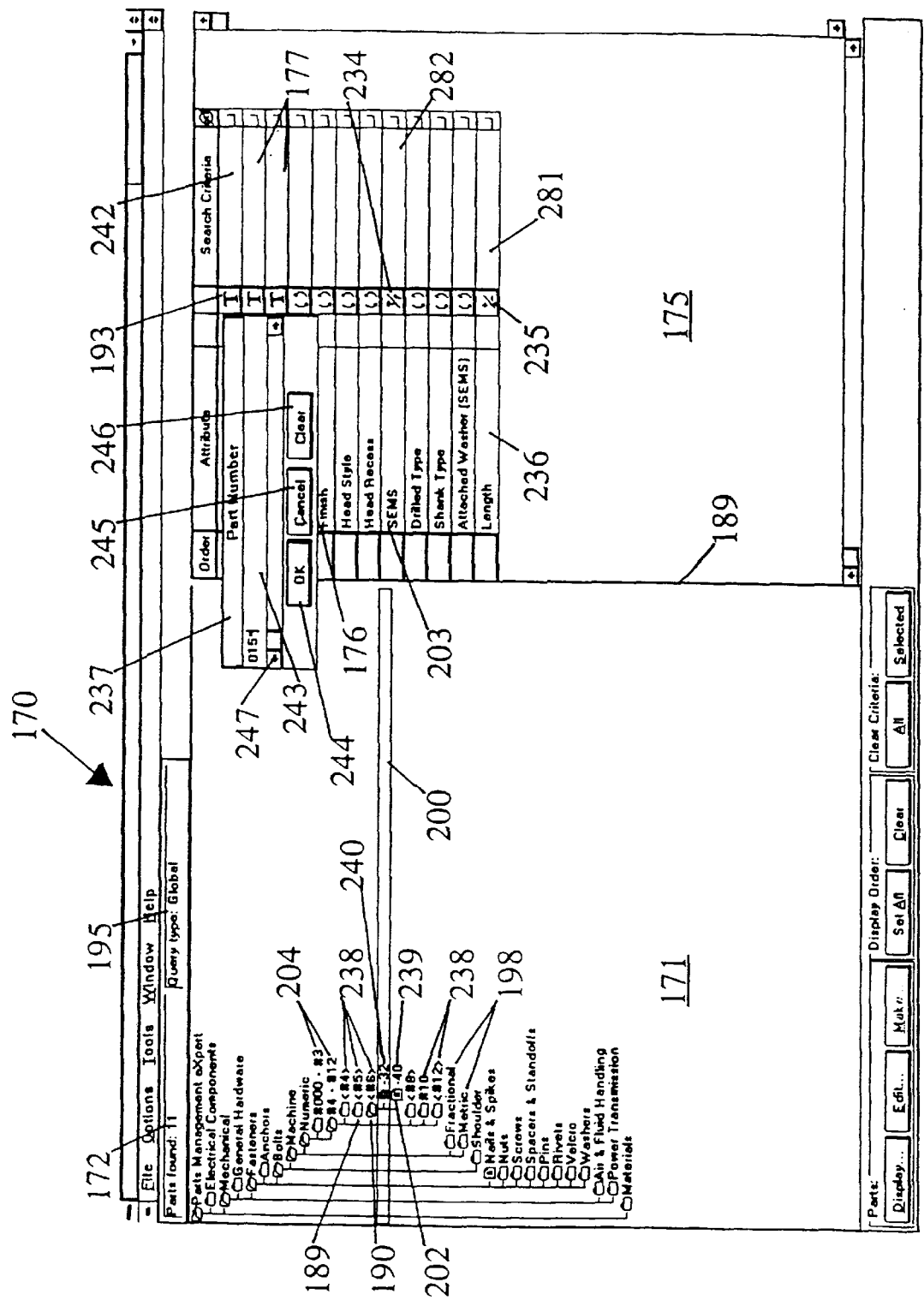
FIG. 13 depicts a display screen showing information displayed in the part specification window.

A procedure for entering text attribute search criteria 177 is shown in FIG. 12. In step 250, the user selects the text attribute. For example, a user could enter search criteria 242 for the part number attribute 241. To do so, the user would click on the text attribute icon 193 associated with the part number attribute 241. The retriever 130 then pops up a text search criteria dialog box 237, as shown in FIG. 13. The retriever 130 positions the cursor at the left most position the data entry field 243 of the text search criteria dialog box 237. Referring to FIG. 12, the retriever 130 then proceeds to step 251 in order to accept text input entered in the data entry field 243.

The retriever 130 allows for the use of special characters as part of the search criteria 242. An asterisk matches any number of characters. For example, it may be desirable to locate all parts containing the abbreviation "pf" (for picofarads) anywhere in the selected part number text attribute 241. To accomplish this, a user could type *pf* in the text data entry field 243. In the example illustrated in FIG. 13, typing 015* in the data entry field 243 will cause the retriever 130 to search for any part number beginning with the digits 015 regardless of how many additional characters or numbers follow in the part number. A question mark matches any single character. For example, to locate all parts with descriptions containing fractional sizes, i.e., ⅛, ¼, ½, etc., a user could type ?/?. Finally, occasions may arise when it is desirable to search for a part containing the special character * or the special character ? in the text. By typing | immediately before either special character * or ?, the retriever 130 will recognize the following special character as a regular character.

The text attribute search criteria 242 is case insensitive. A search will match a character regardless of whether it is upper case or lower case. The case of the letters typed by the user in the text data entry field 243 is disregarded when the search is looking for matching attribute values.

The user remains in control until user's input in the text data entry field 243 is confirmed. User may confirm such input by clicking on an OK button 244 in the text search criteria dialog box 237, or by pressing the enter key on the keyboard 115.

This may be better understood in connection with the following discussion of an example of the classes and subclasses a user may open to specify and locate a particular bolt.

A cancel button 245 is provided in the text search criteria dialog box 237 to enable a user to abort the text search. If the cancel button 245 is activated, the retriever 130 returns to the state that existed just prior to the user's selection of the associated text attribute icon 193. Any input entered in the text data entry field 243 will be ignored.

A clear button 246 is provided in the text search criteria dialog box 237. If this button is activated, the retriever 130 will clear any entry in the text data entry field 243. The dialog box 237 will remain in position, and the retriever 130 will continue to wait for the confirmation of input from the user.

If the user enters characters in the text data entry field 243 and activates the OK button 244, flow continues to step 253 shown in FIG. 12. The retriever 130 will add a text selector to the current query if none currently existed for the associated attribute 241. If a pre-existing text selector is present, the retriever 130 will replace it in the current query. The search will then be performed including this text attribute search criteria 242, and the retriever 130 will proceed to step 210 shown in FIG. 12.

The text data entered by the user in the entry field 243 will be displayed in the search criteria field 242 in the right hand portion 175 of the part specification window 170. The parts count 172 will be updated as shown in FIG. 13 to reflect the results of the search.

If the length of the text data that is entered by the user exceeds the size of the data entry field 243, scroll buttons 247 may be used in the manner known to those skilled in the art to view text that may fall outside the field of view 243.

Figure 14:
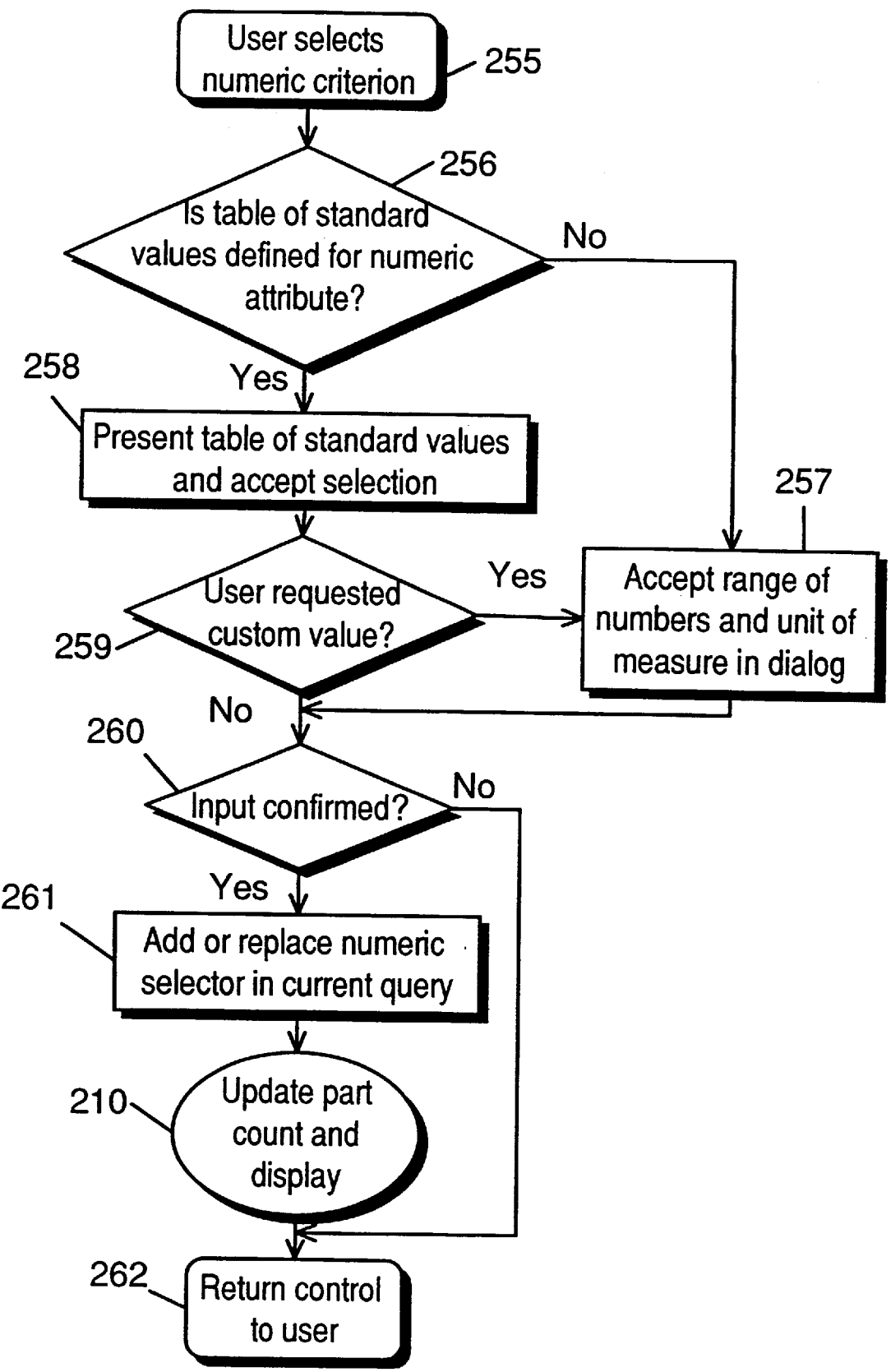
FIG. 14 is a flow chart depicting the procedure for selecting numeric search criteria.

Numeric attributes such as the length attribute 236 shown in FIG. 13 may be selected as a search criteria 177. Referring to FIG. 14, a user selects a numeric attribute such as the numeric attribute length 236 shown in FIG. 13 by clicking on its associated numeric attribute icon 235. Referring to FIG. 14, this is represented by step 255 in the flow chart.

Figure 15:
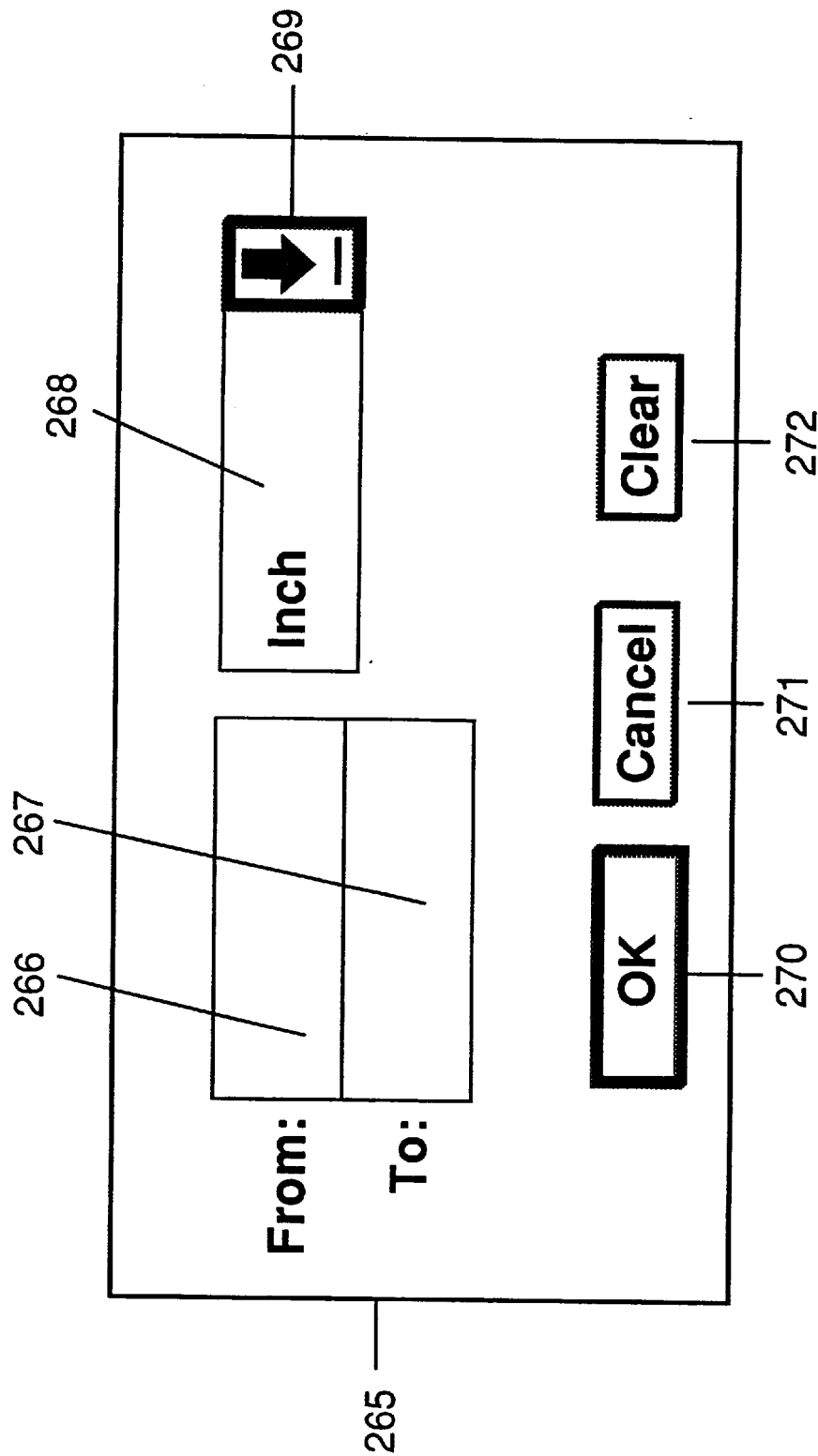
FIG. 15 depicts a custom numeric dialog box.

The retriever 130 then proceeds to step 256 to determine if a table of standard values has been defined for the selected numeric attribute 236. If no table of standard values has been defined, the retriever 130 proceeds to step 257. A custom numeric dialog box 265 shown in FIG. 15 will appear. Custom numeric dialog box 265 allows entry of a range of numeric values. A "from" numeric input field 266 is provided in the custom numeric dialog box 265. A "to" numeric input field 267 is also provided in the custom numeric dialog box 265. When a user types the "from" value, it is automatically copied to the "to" value field 267. If a user wants to search for only one value using the default unit of measure 268, the user may confirm the input having the same value in both the "from" input field 266 and the "to" input field 267 by clicking the OK command button 270, thus proceeding to step 260 shown in FIG. 14.

In step 257, a user may select a different unit of measure other than the default unit of measure 268. The default unit of measure is displayed in the custom numeric dialog box together with a button 269 which, when actuated, produces a drop down list box containing a list of other available units of measure. Thus, a different unit of measure may be selected from the drop down list box.

The custom numeric dialog box 265 includes a cancel button 271 and a clear button 272 which operate in a manner known to those skilled in the art. The custom numeric dialog box 265 also includes an OK button 270 described previously. A user's input is confirmed in step 260 shown in FIG. 14 when the user clicks the OK button 270 or presses the enter key on the keyboard 115 when the OK button 270 is highlighted.

Figure 16:
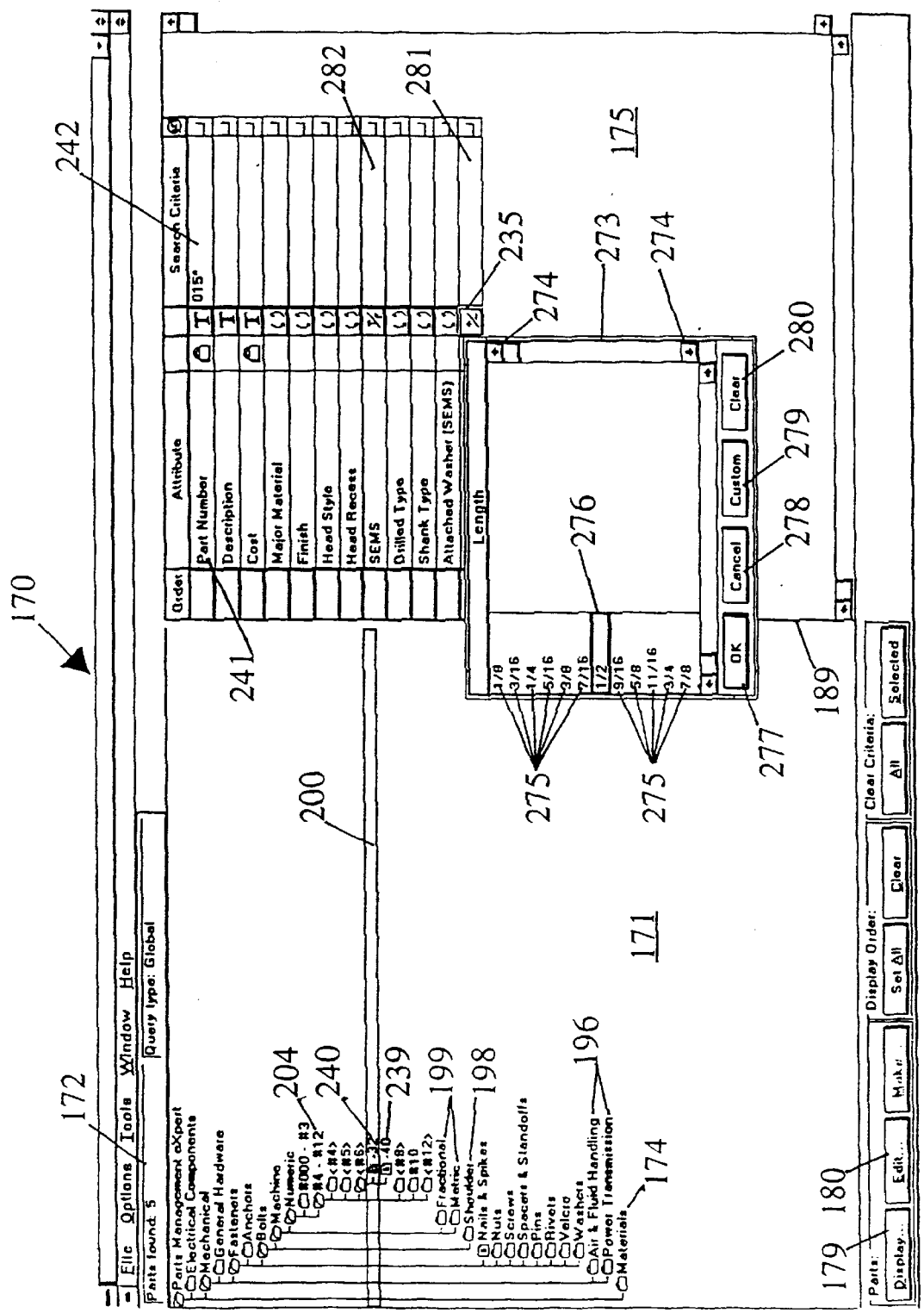
FIG. 16 depicts a display screen showing information displayed in the part specification window.

Referring to FIG. 14, in step 256 if a table of standard values is defined for the numeric attribute 236, the user is presented with a table of standard values 273 (see FIG. 16) in step 258. Referring to FIG. 16, if the list of standard values that are defined for the numeric attribute 236 exceeds the number that can be displayed in the pop up window 273 for the table of standard values, scroll buttons 274 may be used in a manner known to those skilled in the art to view values which are not currently displayed in the table of standard values window 273. A plurality of standard values 275 which are defined for the numeric attribute 236 are displayed in the table of standard values window 273, as shown in FIG. 16. The currently selected standard value 276 is displayed in a highlighted manner.

The table of standard values window 273 includes an OK button 277. The retriever 130 will accept the highlighted standard value 276 when the user actuates the OK button 277. The table of standard values window 273 also includes a cancel button 278 and a clear button 280 which operate in a manner known to those skilled in the art.

The table of standard values window 273 includes a custom button 279. If the user does not find a standard value 275 on the list which is the same as the numeric value that is required, the user may actuate the custom button 279. In FIG. 14, the retriever 130 checks for actuation of the custom button in step 259. If the custom button is actuated, flow proceeds from step 259 to step 257. The user is then presented with the custom numeric dialog box 265 shown in FIG. 15. The user may then enter the desired numeric value in the manner previously described with reference to step 257 in FIG. 14.

In step 260, when the user confirms the input by actuating the OK button 277 or by pressing the enter key on the keyboard 115, flow proceeds from step 260 to step 261. The retriever 130 will add or replace the numeric selector in the current query, depending upon whether the numeric attribute 236 was present in the previous query. The retriever 130 will then proceed to step 210 and update the parts count 172 and update the display 170. The table of standard values window 273 will disappear when the user's input is confirmed, for example, by actuating the OK button 277. In step 262, the retriever 130 then returns control to the user and awaits another command. The selected numeric value will be displayed in the numeric search criteria field 281.

Figure 17:
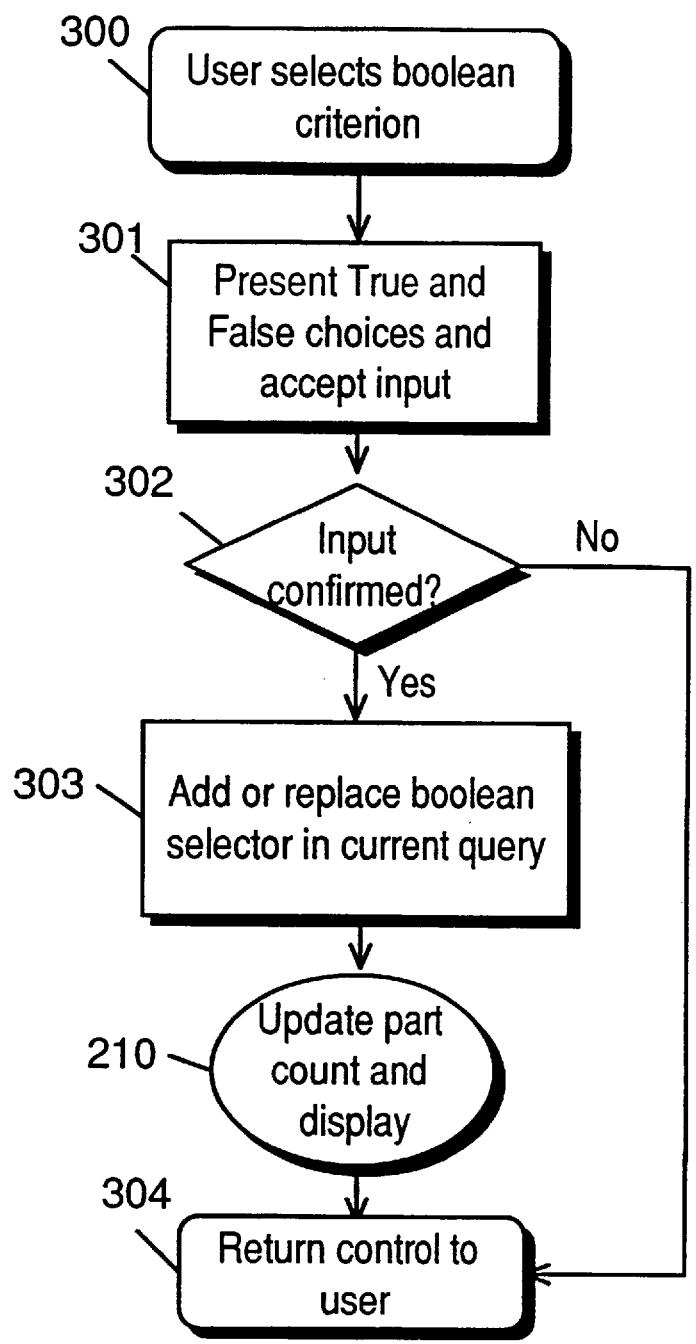
FIG. 17 is a flow chart depicting the procedure for selecting boolean search criteria.

The procedure for entering search criteria 282 for a Boolean attribute 203 shown in FIG. 17. The user selects a Boolean attribute 203 that uses a search criteria 177 by clicking on the Boolean attribute icon 234.

Figure 18:
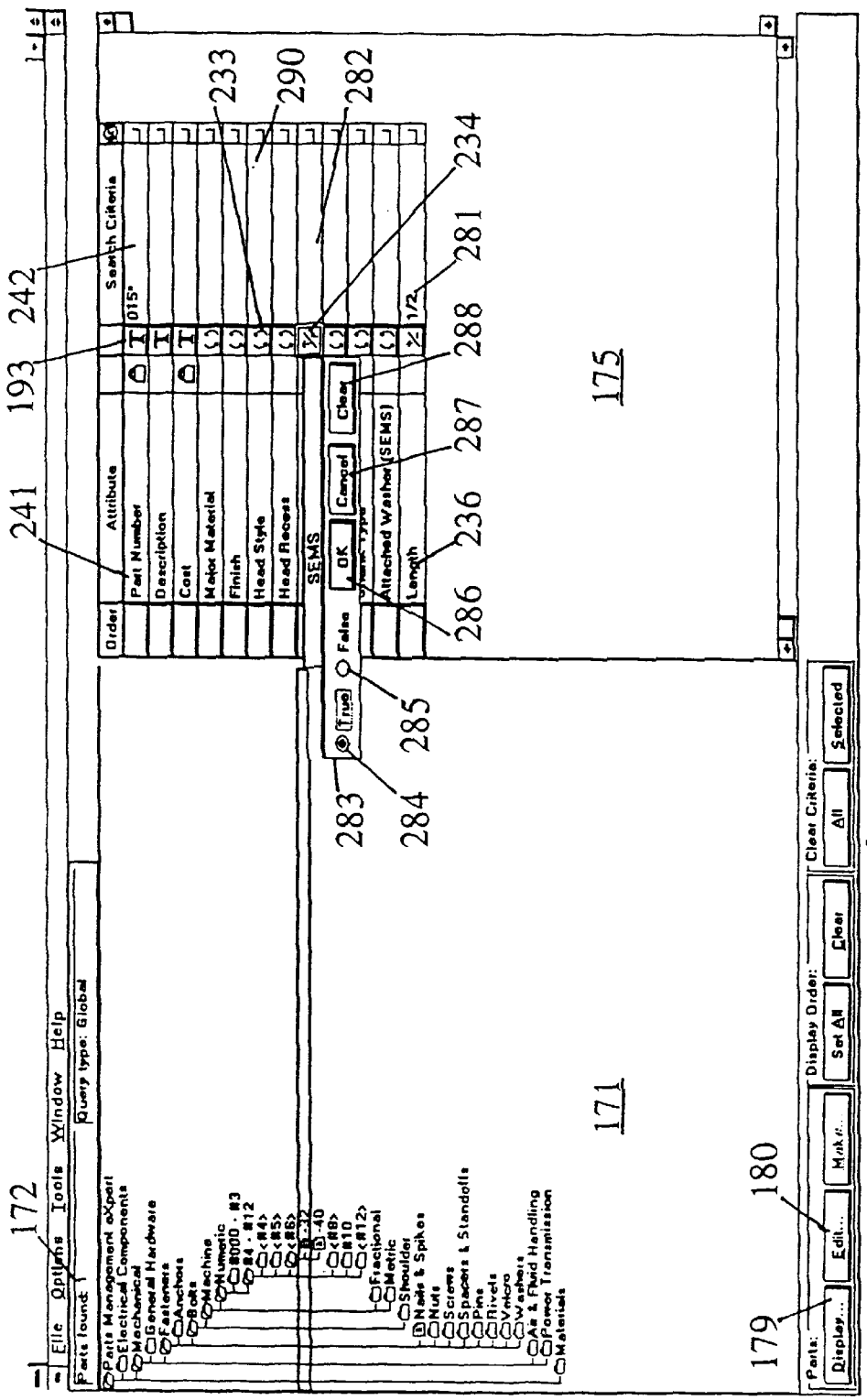
FIG. 18 depicts a display screen showing information displayed in the part specification window.

Referring to FIG. 17, the retriever 130 then proceeds to step 301. A Boolean dialog box 283 pops up to present true and false choices to the user. The Boolean dialog box 283, shown in FIG. 18, includes a true option button 284 and a false option button 285. As is typical in a windows operating environment, these option buttons are mutually exclusive. The user may select either a true or a false search criteria 282 by clicking on the true option button 284 or the false option button 285, respectively.

The Boolean dialog box 283 includes an OK button 286. The user confirms the input in step 302 shown in FIG. 17 by actuating the OK button 286.

The Boolean dialog box 283 also includes a cancel button 287 and a clear button 288, which function in a manner known to those skilled in the art.

When the user confirms the desired Boolean search criteria 282 by actuating the OK button 286, the retriever 130 proceeds to step 303 in FIG. 17 and adds or replaces an appropriate Boolean selector in the current query. As explained above, a Boolean selector will be added if no such selector existed in the previous query. A Boolean selector will be replaced if a Boolean selector appeared for this attribute 203 in the previous query. Flow then proceeds to step 210 in FIG. 17. The Boolean dialog box 283 disappears, and the selected search criteria is displayed in the appropriate search criteria field 282 in the right hand portion 175 of the part specification window 170. The display of parts found 172 will also be updated.

Figure 19:
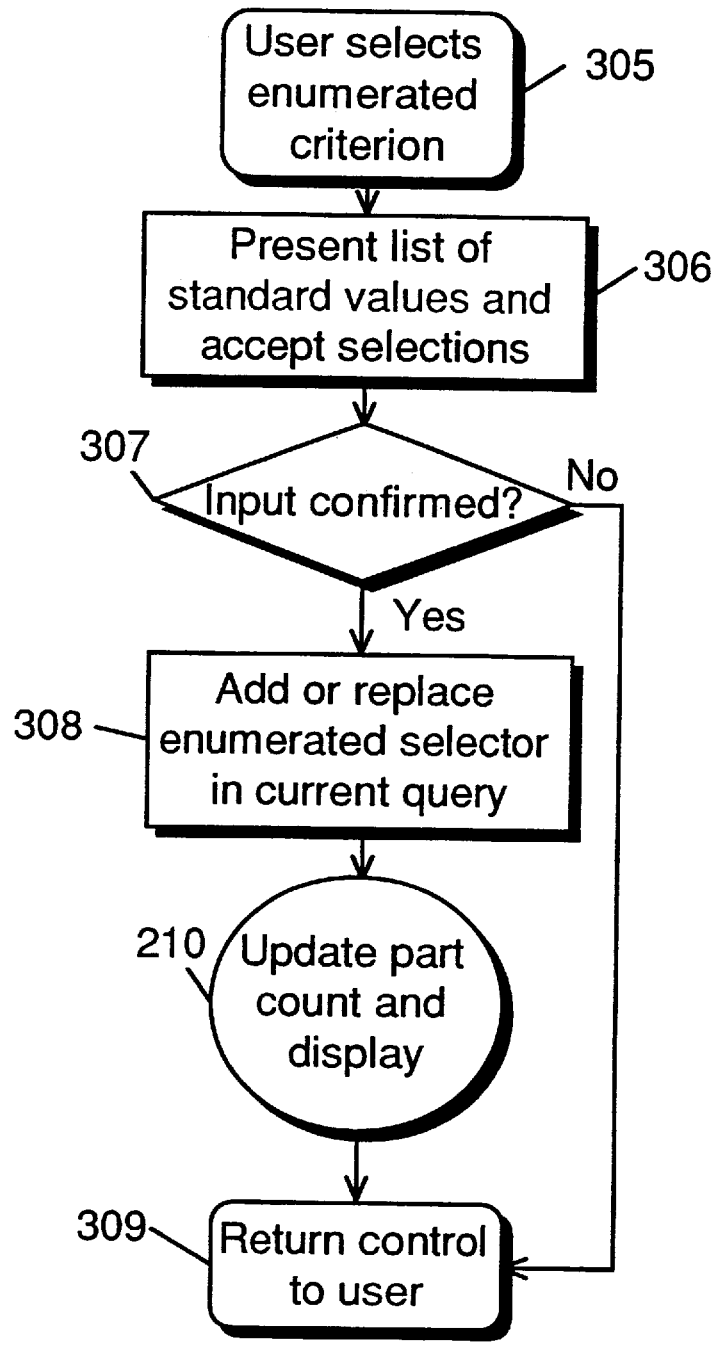
FIG. 19 is a flow chart depicting the procedure for selecting enumerated search criteria.
Figure 20:
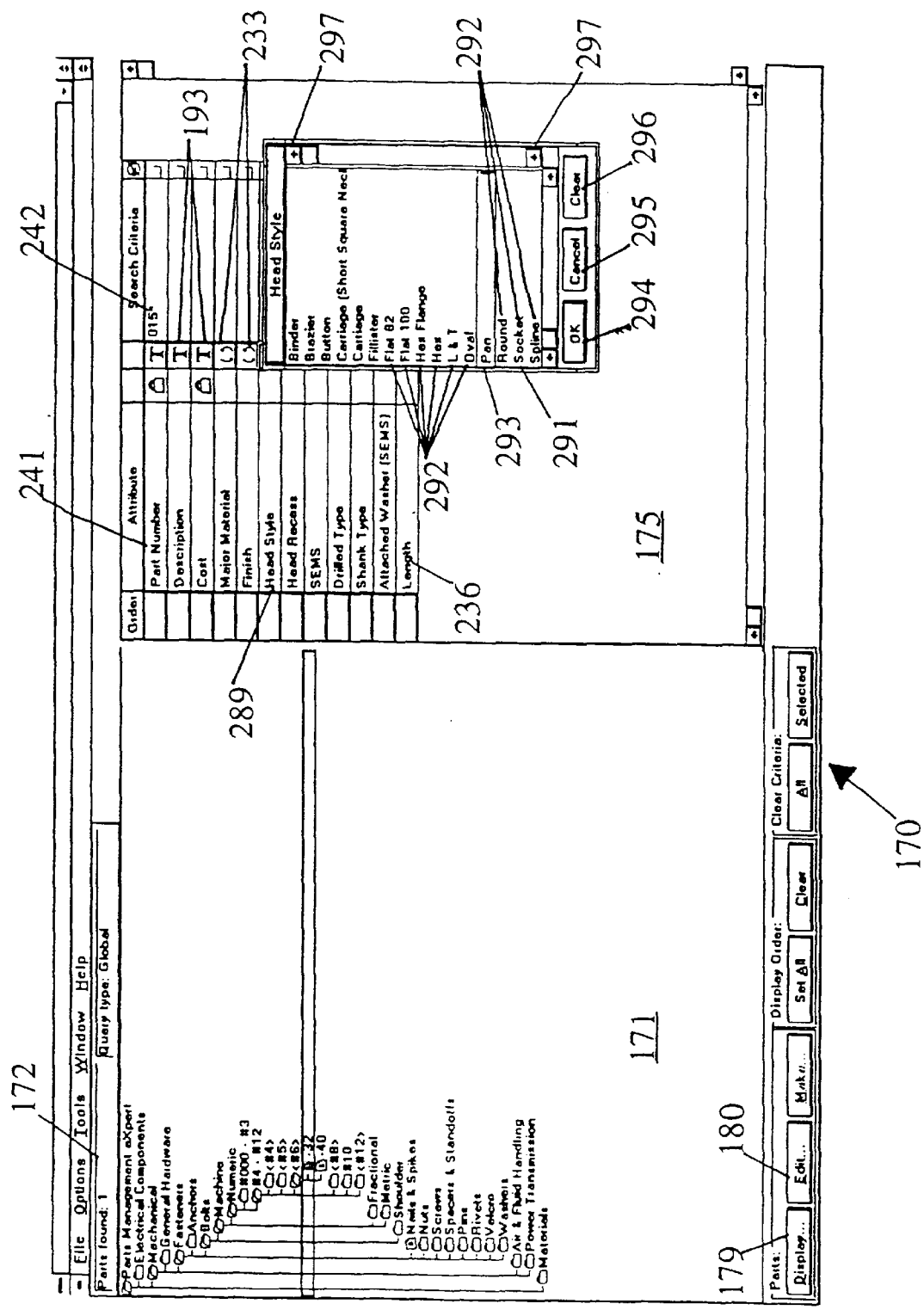
FIG. 20 depicts a display screen showing information displayed in the part specification window.

Referring to FIG. 19, a user may select an enumerated attribute 289 by clicking on an enumerated attribute icon 233. This is accomplished in step 305 depicted in FIG. 19. The retriever 130 then displays an enumerated attribute dialog box 291, as shown in FIG. 20. The enumerated attribute dialog box 291 presents a list of valid values the particular attribute 289 may have. The selected value is displayed as a highlighted entry 293. A user may select multiple values 292 for the search criteria 290. When multiple values 292 are selected, the retriever 130 treats them as an "or" logic condition for the search criteria 290. In other words, the search will retrieve parts that have any one of the enumerated values 292 which are selected.

The dialog box 291 includes a clear button 296. The user may deselect all of the selected values 293 and start over. This is convenient when multiple values 292 have been selected. The user may abort this operation by actuating a cancel button 295 provided by the dialog box 291. This will transfer flow from step 307 to step 309 shown in FIG. 19.

When the user is satisfied with the selected enumerated values 293, the user can confirm the input by actuating an OK button 294 provided in the dialog box 291. Referring to FIG. 19, flow proceeds from step 307 to step 308 when this occurs. The retriever 130 will add or replace the selected enumerated values 292 in the current search query, depending upon whether pre-existing values for this attribute have been selected in a previous query. The retriever 130 will then proceed to step 210 shown in FIG. 19 and update the display. The enumerated attribute dialog box 291 will disappear. The selected search criteria 293 appear in the search criteria display field 290. The display of parts found 172 will also be updated. The retriever 130 will then proceed to step 309 shown in FIG. 19, and return control to the user awaiting another command.

Referring to FIG. 20, the enumerated attribute dialog box 291 also includes scroll buttons 297 which operate in a manner known to those skilled in the art.

Figure 21:
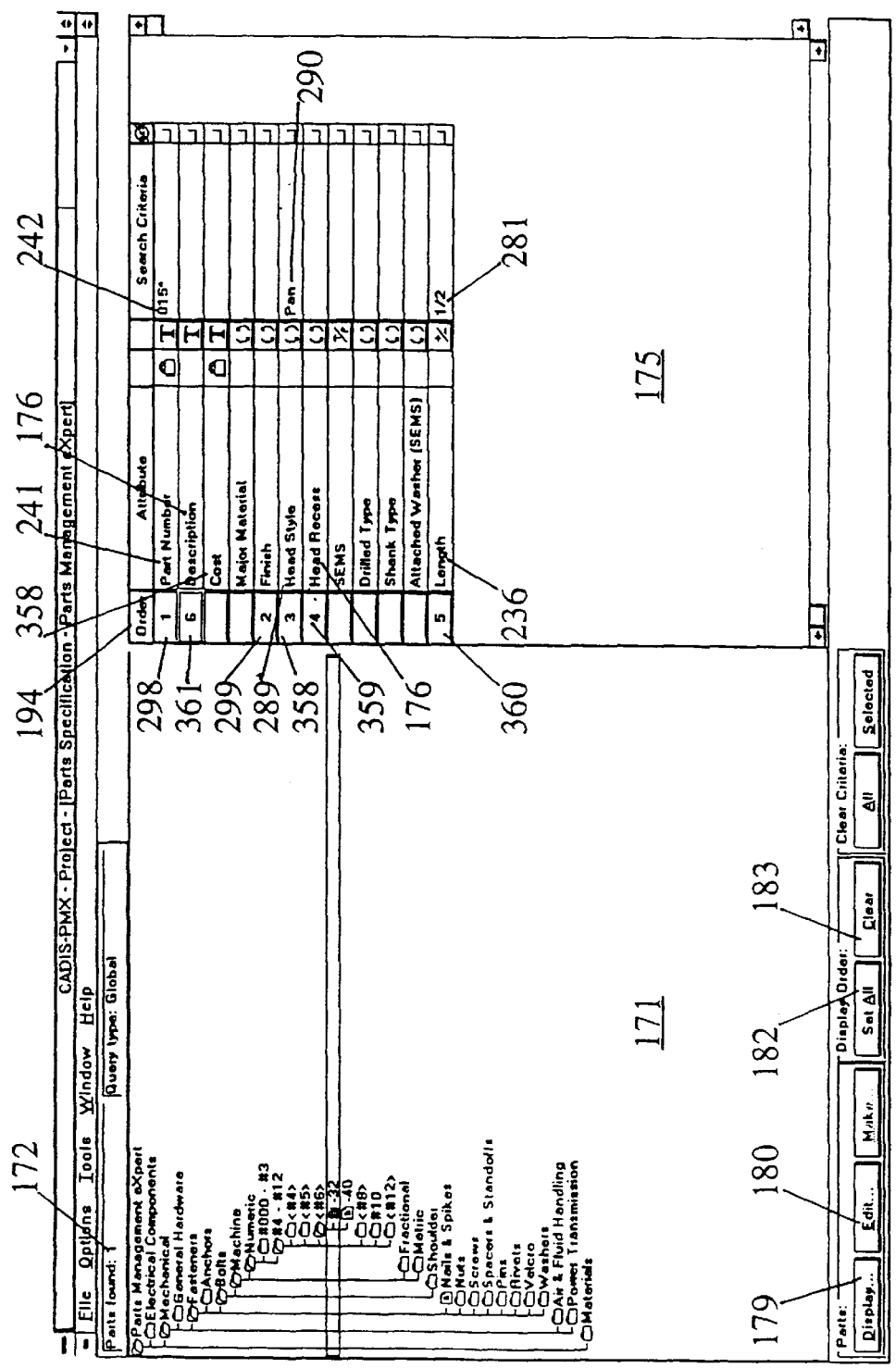
FIG. 21 depicts a display screen showing information displayed in the part specification window.

FIG. 21 depicts an updated display of the part specification window 170. In the illustrated example, the text attribute search criteria 242 is displayed in the search criteria display field associated with the part number attribute 241. The enumerated attribute search criteria 290 is displayed in the search criteria field associated with the enumerated attribute "head style" 289. The numeric search criteria 281 is displayed in the search criteria display field associated with the numeric attribute for length 236. The updated parts found display 172 reveals that the search has succeeded in locating a single part that has the desired attributes.

Figure 22:
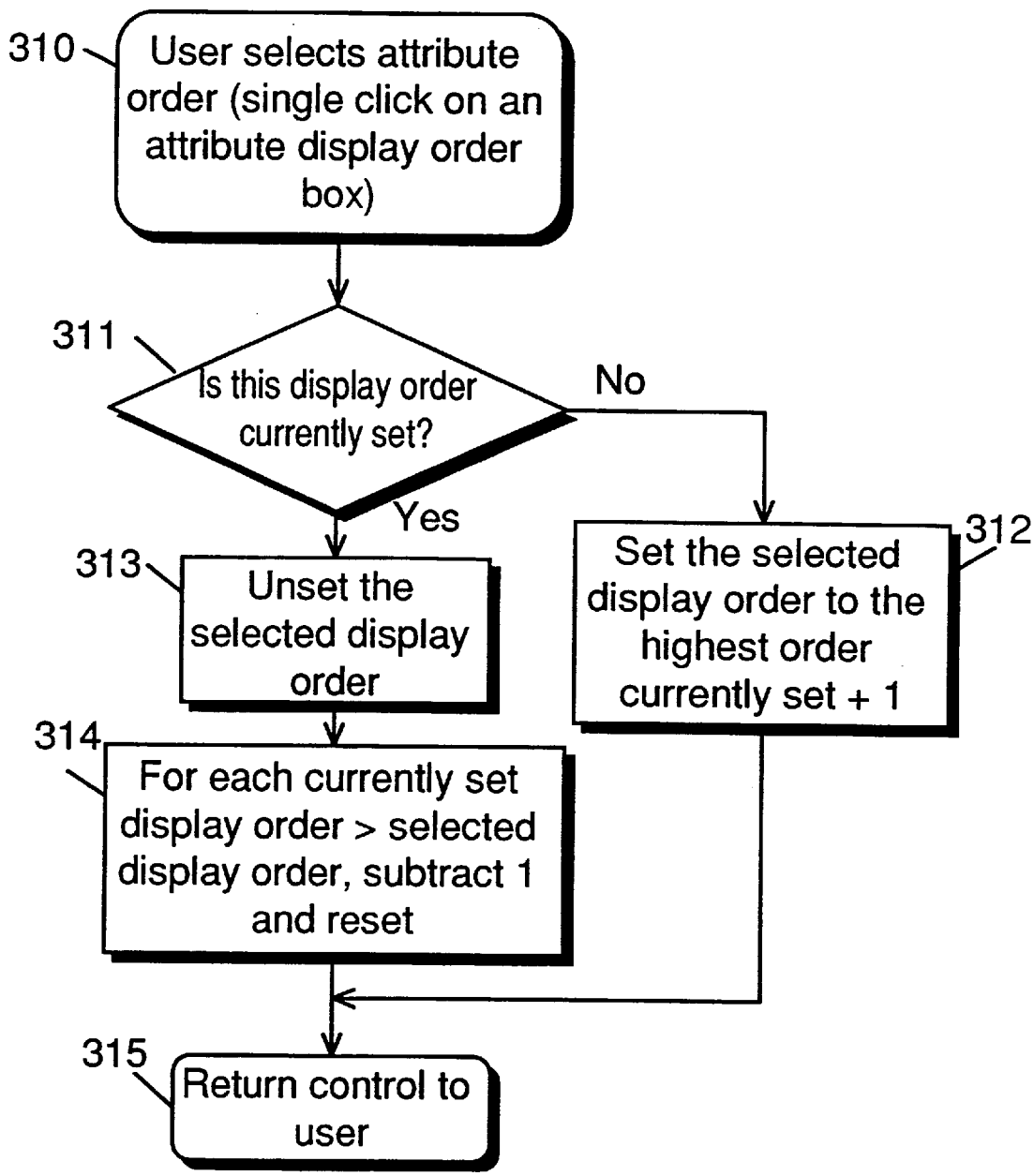
FIG. 22 is a flow chart depicting the procedure for selecting attribute order for display.

A flow chart of the procedure employed by the retriever 130 to determine the order in which the search results are to be displayed is depicted in FIG. 22. The procedure starts with step 310 in which the user is allowed to select the order in which the display results are to be sorted according to the attributes of the parts located in the search. The display may be sorted according to attributes 176 which were not selected as search criteria, as well as attributes 241, 289, and 236 which were. Selection is accomplished by clicking on buttons 298 in the order column 194 to correspond to the desired attribute 241. The first order button 298 that is clicked will be the first attribute 241 with respect to which the search results will be sorted for display. A "1" appears on the display of the order button 298 which is clicked first. Similarly, the second order button 299 which is clicked will be the second criteria from which the search results are sorted, and a "2" appears on the display of the button 299.

When a user clicks on an order button 298 as shown in FIG. 21, the retriever 130 proceeds to step 311 in the flow chart illustrated in FIG. 22. The retriever 130 checks to determine whether the requested order button 298 is already set, i.e., already has a number on the order button 298. If it is not, flow proceeds to step 312 and the retriever 130 sets the order button 298 to the highest order currently set plus one. That is, if the user clicked order button 357 shown in FIG. 21, the display order for that cost attribute 358 is not currently set. In this example, the highest order currently set is "6". Thus, in step 312 the order button 357 would be set to "7", because that is one more that the highest order currently set (i.e., 6+1=7). A "7" would then be displayed on order button 357. The flow then proceeds to step 315. Referring again to step 311 shown in FIG. 22, if the display order is currently set for a particular order button 299, the flow proceeds to step 313 and the selected display order is unset. In other words, the display button 299 may be toggled off. Flow then proceeds to step 314, and each of the order buttons 361, 358, 359, and 360 currently set which have a number greater than the number of the order button 299 that was toggled off, will be decremented by one and reset. In the example illustrated in FIG. 21, if the user clicks on the order button 299 (which currently displays a "2"), that order button 299 will be reset (it will appear blank like order button 357). In addition, the remaining order buttons 358, 359, 360 and 361 which have a currently set display order greater than order button 299 (i.e., greater than "2"), will be decremented by one. Order button 358 will be changed from "3" to "2", order button 359 will be changed from "4" to "3", and so forth. Order button 298 will not be changed, because its display order is "1" and is not greater than the display order of order button 299 which was reset. Flow then proceeds to step 315 and control is returned to the user.

Figure 23:
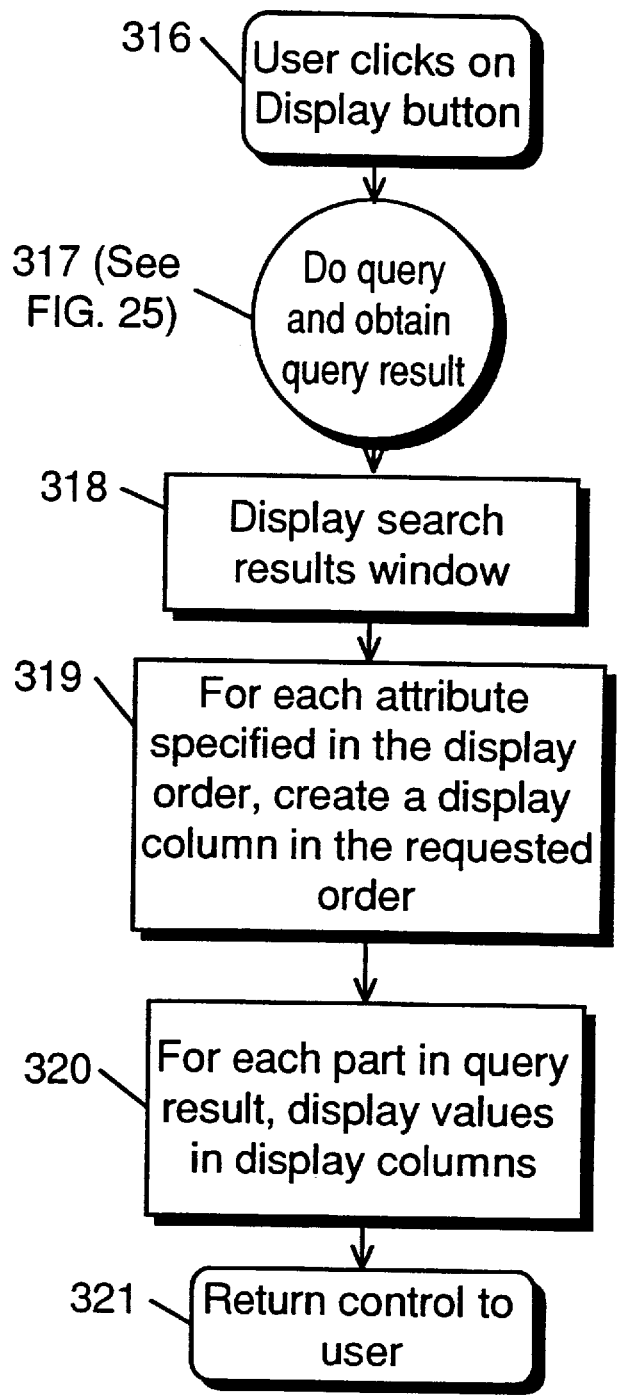
FIG. 23 is a flow chart depicting the procedure for displaying search results.

The procedure for requesting display of search results is depicted in FIG. 23. The procedure is initiated in step 316 when the user clicks on the display button 179. The procedure then moves to step 317 shown in FIG. 23. In this step, the system does a query and obtains the query result. This step is shown in more detail in FIG. 25. After the query result is obtained, the procedure then moves to step 318 and displays a search results window 299, an example of which is shown in FIG. 24.

Referring again to FIG. 23, the next step in the procedure is step 319. For each attribute specified in the display order 194 (as a result of the user clicking the associated display order buttons 298, 299, etc.) a display column is created. The display columns are created left to right in the order specified by the order buttons 194. The procedure then moves to step 320, and for each part in the query result, the attribute values for the specified attributes are displayed in the respective display columns. Control is then returned to the user in step 321 and the retriever 130 waits for another command.

Figure 25:
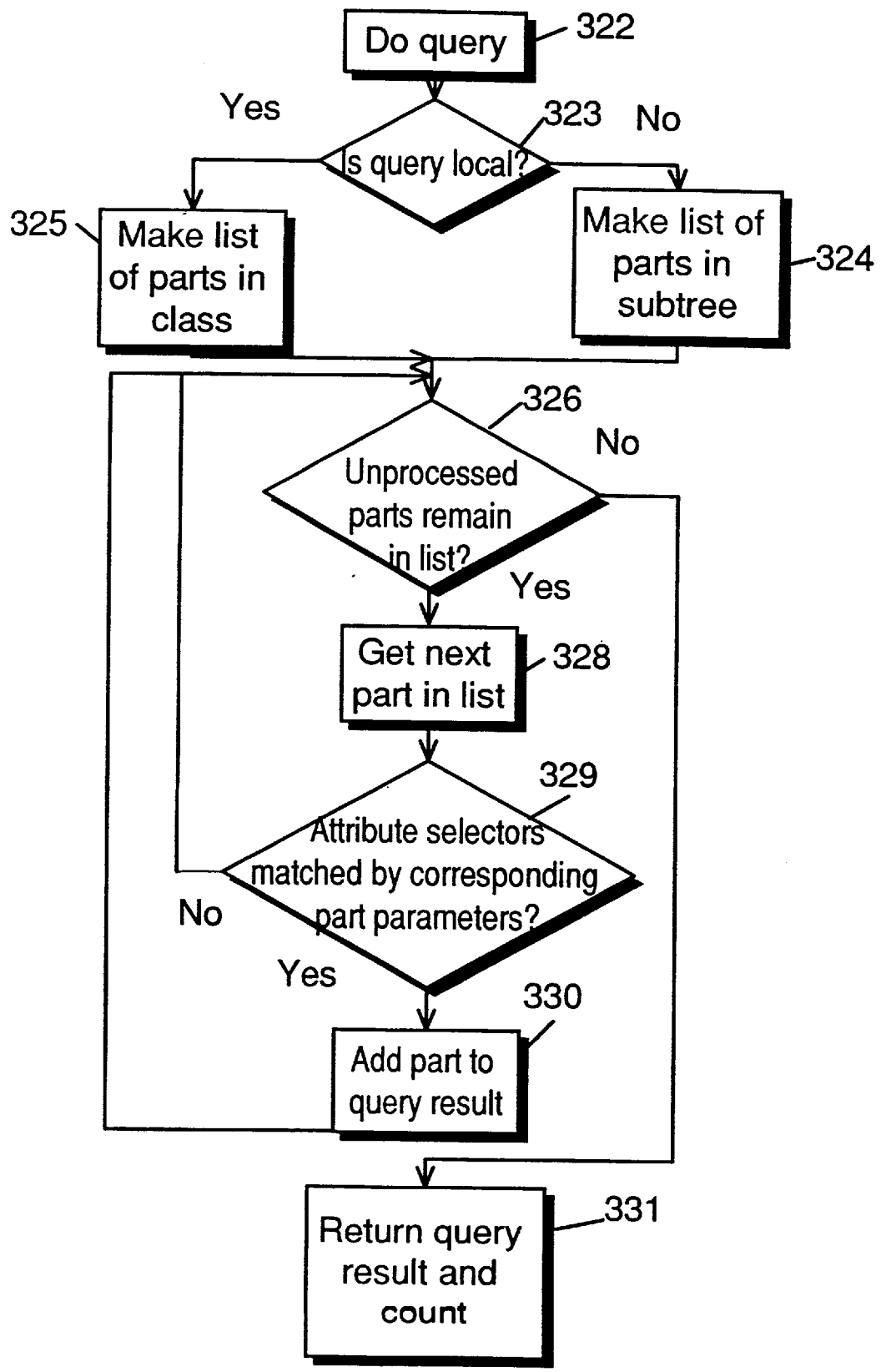
FIG. 25 is a flow chart depicting the procedure for doing a query.

Referring to FIG. 25, the procedure for doing a query is illustrated in more detail. The procedure starts at step 322. The system first determines in step 323 whether the query is a local query or a global query. If the query is a local one, the retriever 130 makes a list of parts in the selected class, as indicated in step 325. If the query is not a local one, the retriever 130 makes a list of all of the parts included in the selected subtree, as indicated in step 324. In either event, the system then proceeds to step 326 to determine whether unprocessed parts remain in the list. If the answer is yes, the flow proceeds to step 328 and the system gets the next part in the list. The procedure then goes to step 329 to determine whether all attribute selectors are matched by corresponding part parameters. If the answer is no, the procedure loops back to step 326. If the answer is yes, the procedure goes to step 330. The part is added to the query result in step 330, and the flow loops back to step 326. Referring back to step 326, if no unprocessed parts remain in the list, the procedure then proceeds to step 331 and returns the query result and part count.

Figure 24:
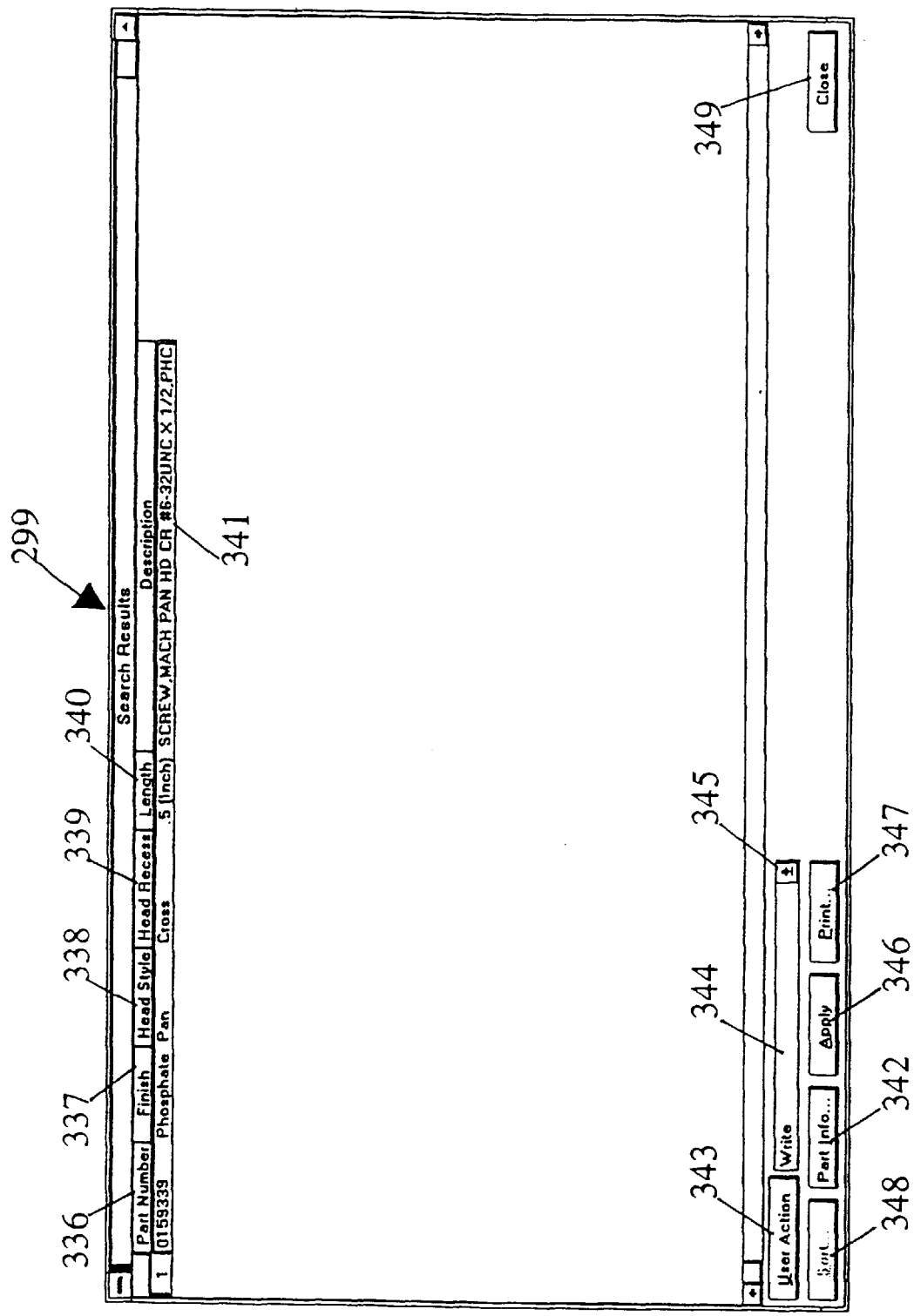
FIG. 24 depicts a display screen showing information displayed in the search results window.

Referring to FIG. 24, the search results window 299 displays the selected attributes for the parts found in the search. The part number attribute 336 appears in the left most column because the order button 298 was selected first in this example. The finish attribute 337 appears second, because the finish button 299 was selected second. Similarly, the head-style attribute 338, the head recess attribute 339, the length attribute 340, and the description attribute 341 are displayed in the order indicated by the order buttons 194. In the illustrated example, the search had narrowed down the parts found 172 to a single part. If more than one part had been obtained in the search results, the remaining parts would be displayed in additional rows in the search results display window 299, and the display would be sorted according to attributes in the order indicated by the order button 194.

A significant performance optimization of this invention concerns the management of a query result to optimize use of network resources, thereby allowing effective access to a knowledge base server 132 through a wide area network 2103, which typically has significantly lower transmission speeds and data throughput than a local area network 100. This is accomplished as shown in the flowchart in FIG. 202. In response to a user request to scroll the scrolled list 352 in step 2130 in either direction, buffers containing part information in the direction being scrolled is examined in test 2131 to determine if the scroll request results in a need for part information not currently in the buffer. If it does, then the buffer is refilled with sufficient part information from the query result to allow for scrolling of one additional display page of information without requesting additional information from the knowledge base server 132. After scrolling the display, parts information is displayed from the display buffer in step 2132 and control is returned to the user in step 2133. In this way, the network transmission cost that would have been incurred if the entire query result were transmitted to the server initially is avoided, significantly improving response time to the point where a wide area network 2103 provides a practical alternative to a local area network 100. This optimization also reduces overall network traffic and removes the need for any limits on the number of parts that may be displayed in a query result as are typically found in query systems.

Figure 26:
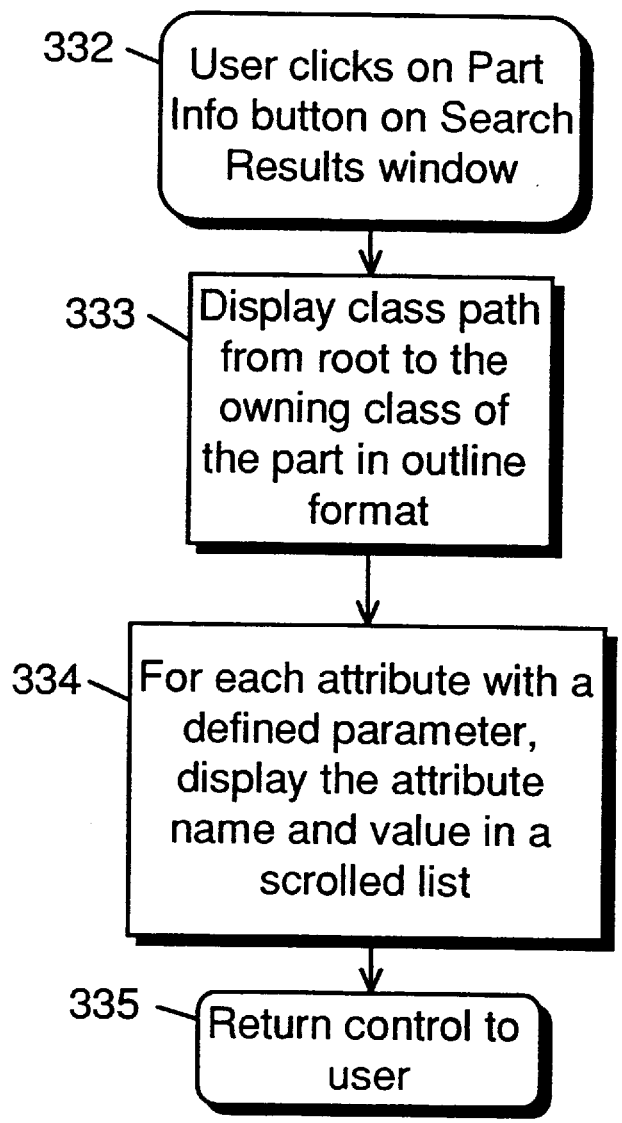
FIG. 26 is a flow chart depicting the procedure for displaying part information.

Referring to FIG. 24, the search results window 299 includes a part info button 342. The procedure initiated by actuation of the part info button 342 is shown in FIG. 26. In step 332, the user clicks on the part info button 342. The system proceeds to step 333 to produce a display of a class path in outline format 350 from the root class 173 to the owning class 240 of the part, as shown in part information display window 351 in FIG. 27. Referring to FIG. 26, the procedure flow proceeds to step 334 and produces a display of a scrolled list 352 containing attribute names 353 and values 354.

Figure 27:
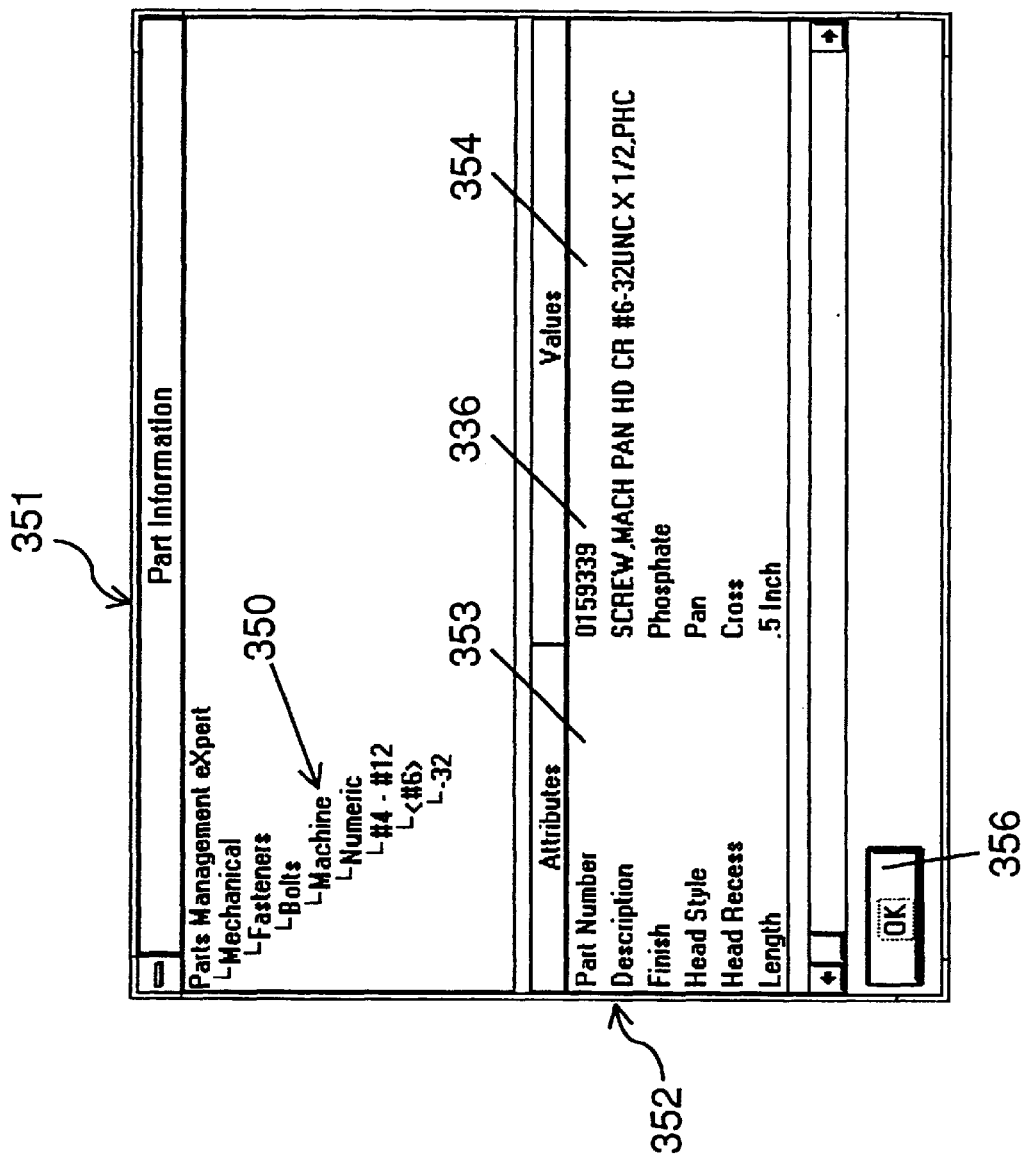
FIG. 27 depicts a display screen showing information displayed in the part information window.

FIG. 27 depicts the part information window 351. The attribute name 353 and values 354 for those attributes are displayed in a scrolled list 352. The part information window 351 shown in FIG. 27 may be closed by actuating the OK command button 356. Referring to FIG. 26, the procedure then goes to step 335 and control is returned to the user.

The search results window 299 includes a user action command button 343. This user action button 343 is used to launch other user applications or software programs. This provides transparent access to other applications directly from the system. The user action command button 343 becomes active when a part in the search results window 299 is selected by clicking on the row number for that part, and a user action is associated with that part.

For example, it may be desirable to see an actual part drawing for a selected part. A CAD or viewer application may be selected from a pull-down list 344 of applications by clicking on button 345 and then clicking on the desired application included in the pull-down list 344. The desired user application is first selected, and then the user action command button 343 is actuated to cause the application to start and the designated file to open. User actions may be defined by the system administrator.

Figure 28:
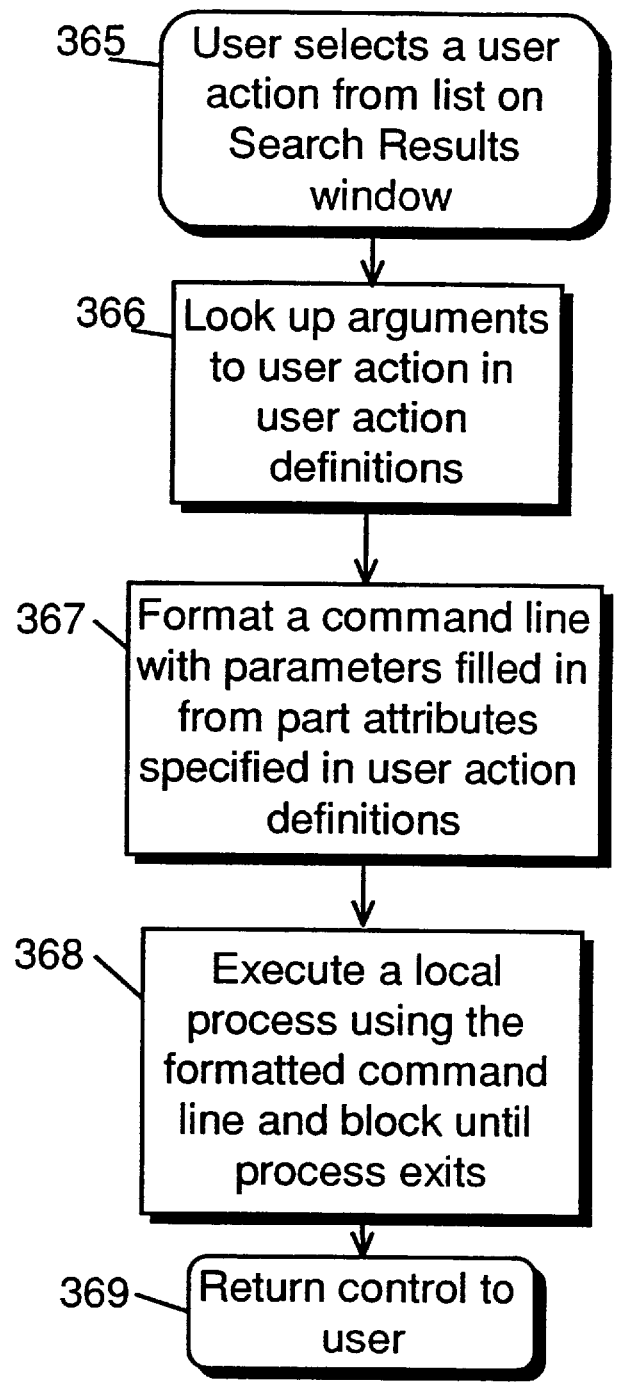
FIG. 28 is a flow chart depicting the procedure for launching a user action.

FIG. 28 depicts a flow chart for the procedure used to launch a user action. In step 365, the user selects a user action from a list 344 on the search results window 299. The flow then proceeds to step 366, and the system looks up arguments to the user action by checking associated user action definitions.

In step 367, the system formats a command line with parameters filled in from part attributes 336, 337, and 340 specified in user action definitions. In step 368, a local process is executed using the formatted command line and block until the user action is completed and the process exits. Finally, in step 369, control is returned to the user.

Figure 29:
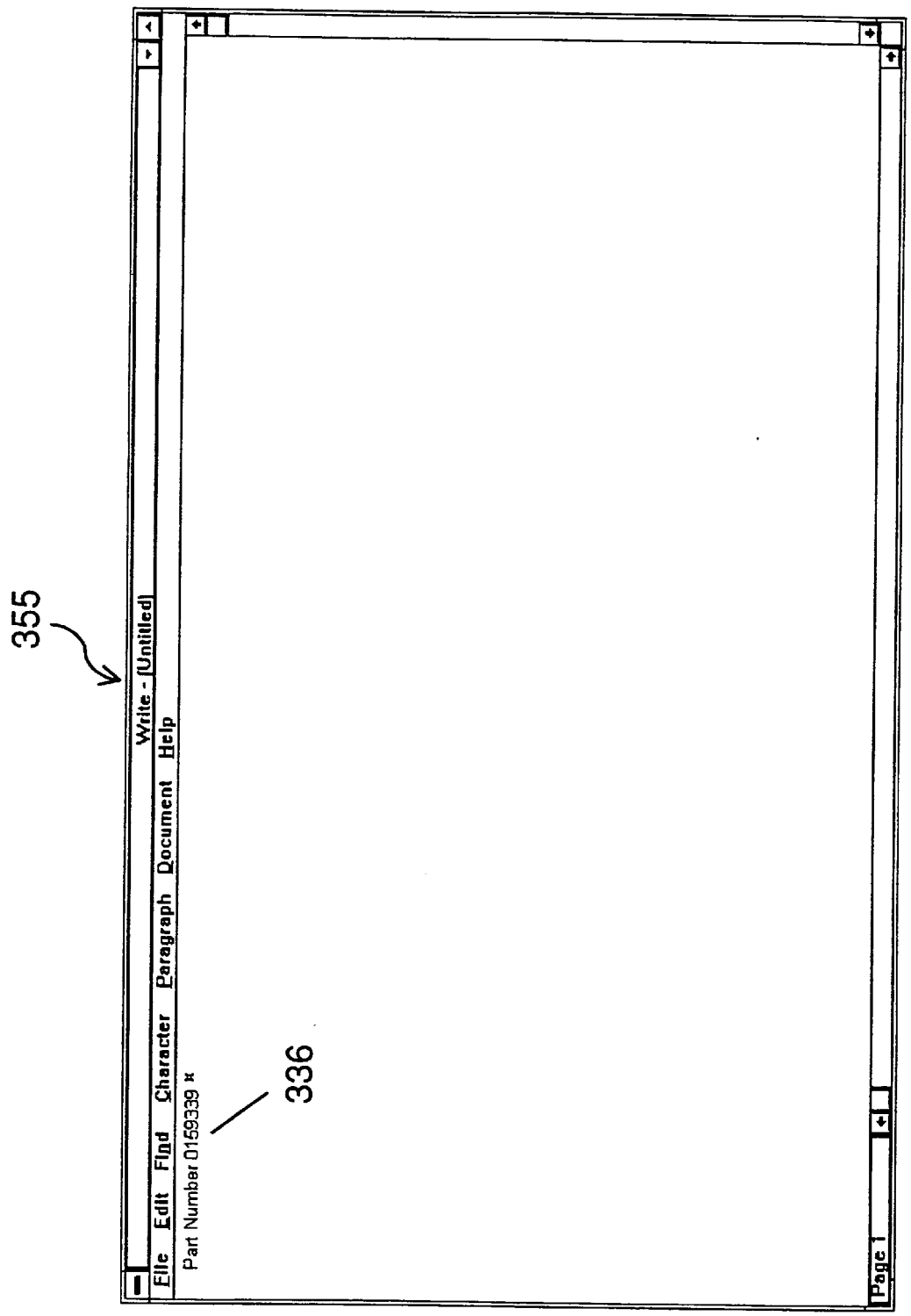
FIG. 29 depicts a display screen showing an example of a user action launched by the procedure depicted in FIG. 28.

In the example illustrated in FIG. 24, the Microsoft Windows Write program 344 has been selected. When the user actuates the user action button 343, the Write program 344 starts. In this example, the part number 336 is passed to the Write program 344. FIG. 29 shows the user action display screen 355 when the write program 344 starts, where the part number information 336 was passed to the Write program.

The search results window 299 includes a sort command button 348. In the illustrated example, this button 348 is dimmed because only one part is displayed. When a plurality of parts are displayed in the search results window 299, the sort command button 348 may be actuated to re-sort the displayed information differently.

The search results window includes a print command button 347. Actuating this button 347 causes a hard copy print out of the parts to be generated. This is convenient, for example, when the user wants to do some additional research on the parts.

Figure 31:
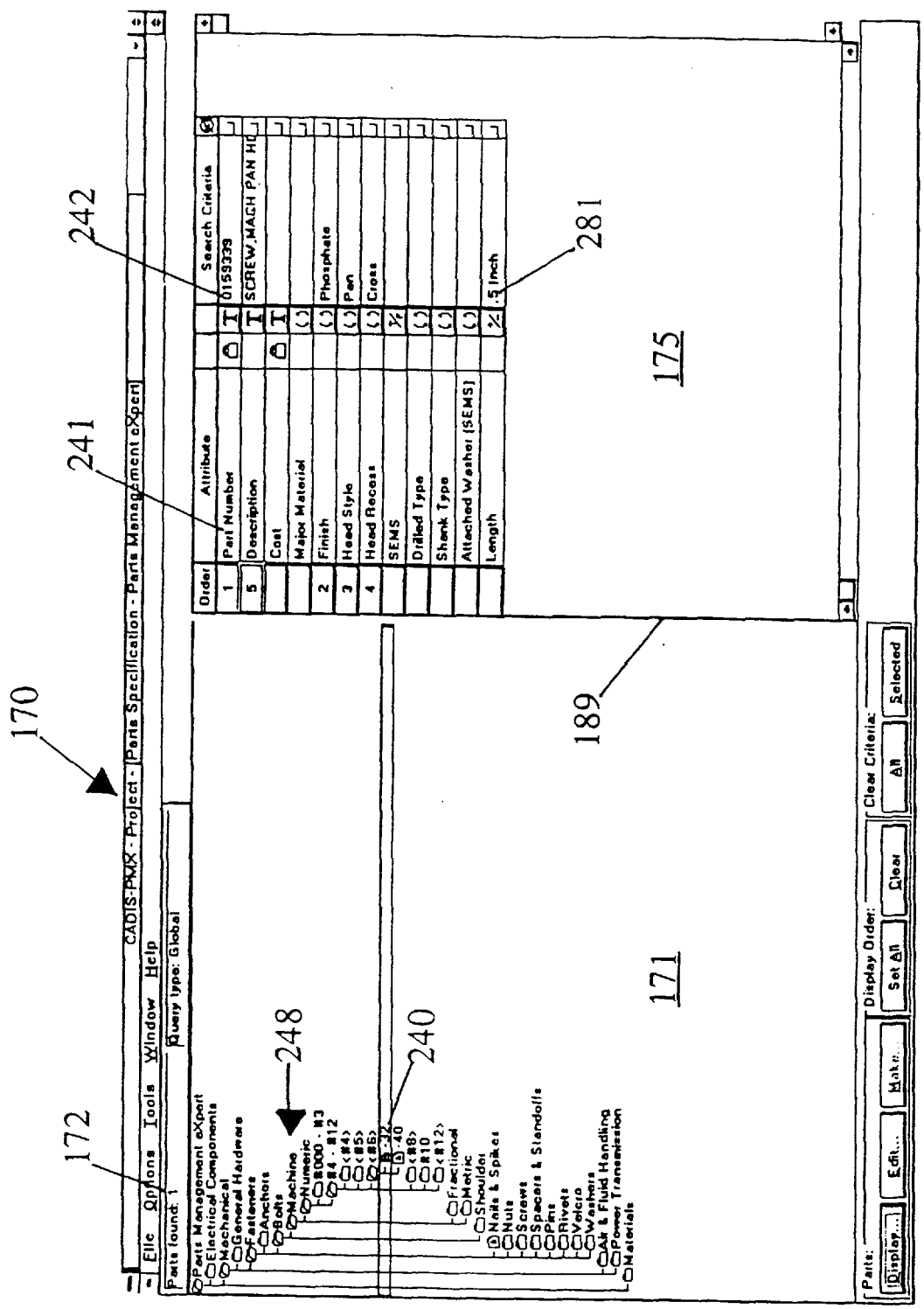
FIG. 31 depicts a display screen showing information displayed in the part specification window.

The search results window 299 includes an apply command button 346. This button 346 is used to copy the attribute values for the selected part to the search criteria fields 177 in the part specification window 170. After the values are copied, the search results window 299 closes. The results of actuating the apply command button 346 are shown in FIG. 31. This may be conveniently used, for example, to conduct another query in which one of the parameters is relaxed.

Figure 30:
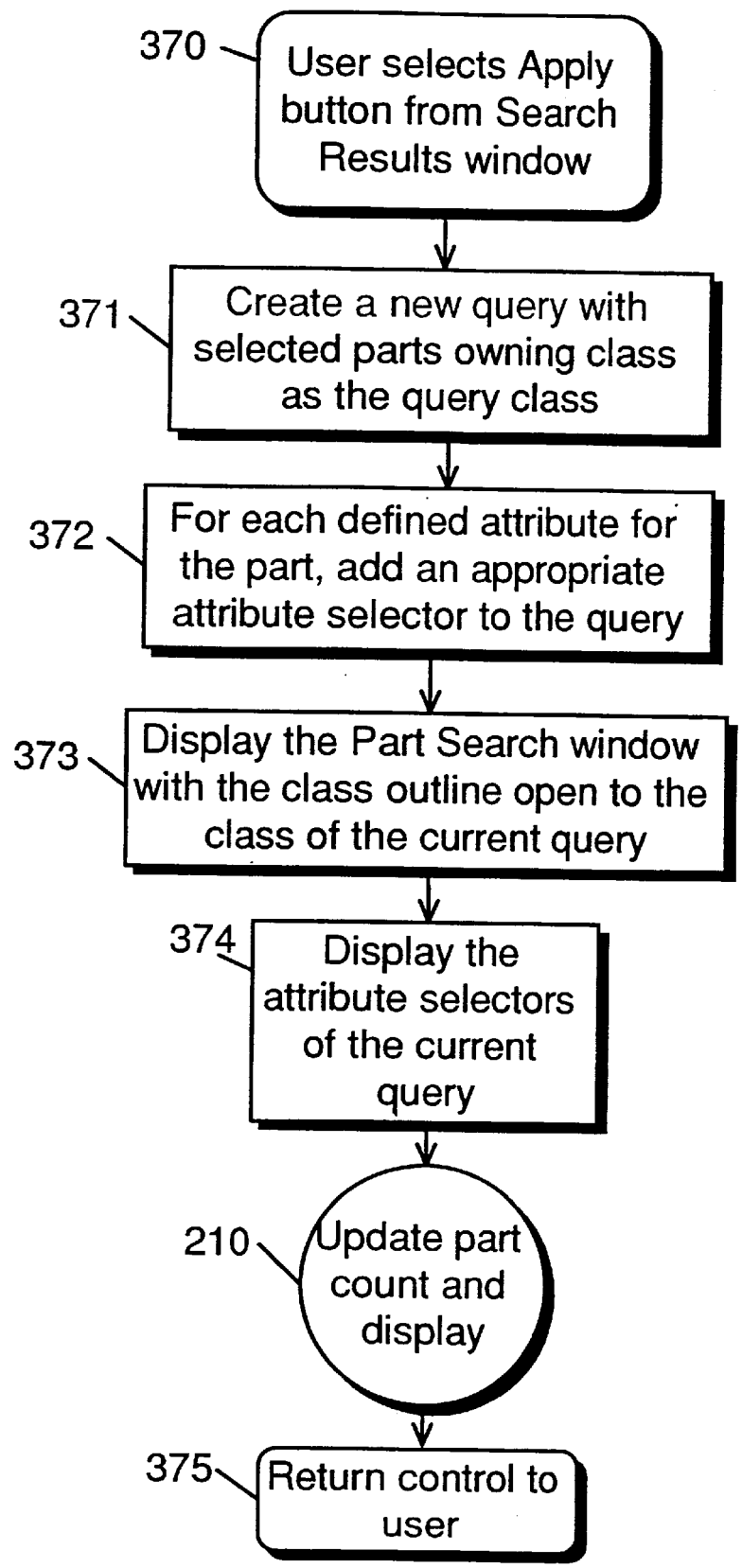
FIG. 30 is a flow chart depicting the procedure followed when the user actuates the apply button.

The procedure executed when the apply command button 346 is actuated is shown in FIG. 30. The procedure starts at step 370 when the user actuates the apply command button 346. Step 371 is then executed, and a new query is created with the selected parts owning class as the query class. In step 372, an appropriate attribute selector is added to the query for each defined attribute for the part.

The part specification window 170 is displayed in step 373 with the class outline 248 open to the class 240 of the current query. Then in step 374 the attribute selectors 242, 281, etc., are displayed for the current query. The system then updates the part count 172 and the display 170. Control is returned to the user in step 375.

Alternatively, the search results window 299 may be closed by actuating close button 349.

Figure 32:
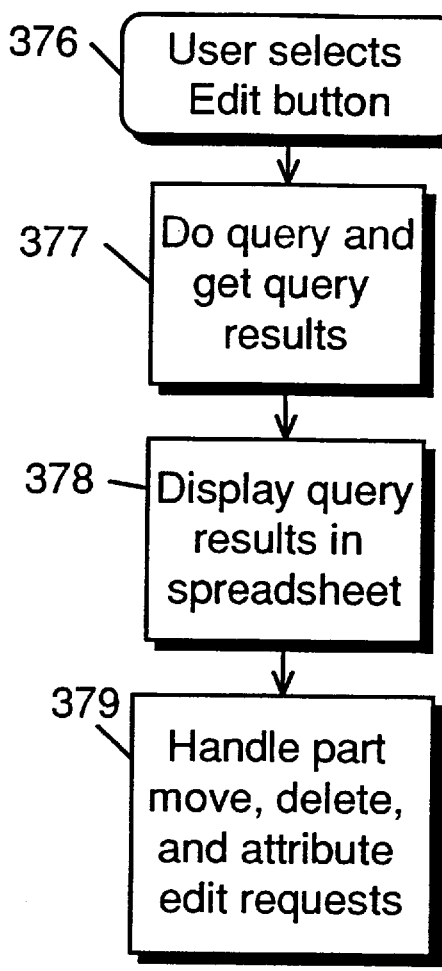
FIG. 32 is a flow chart depicting the procedure followed when the user actuates the edit button.

A user who has the necessary access rights may edit parts information in the knowledge base by actuating the edit command button 180. The procedure that is executed is shown in FIG. 32. Step 376 is executed when the edit button 180 is selected. In step 377, a query is performed based upon the current search criteria 177 and the retriever 130 gets the query results. The query results are then displayed in a spreadsheet format in step 378.

In step 379, the system then handles part move, delete, and attribute edit requests.

Figure 33:
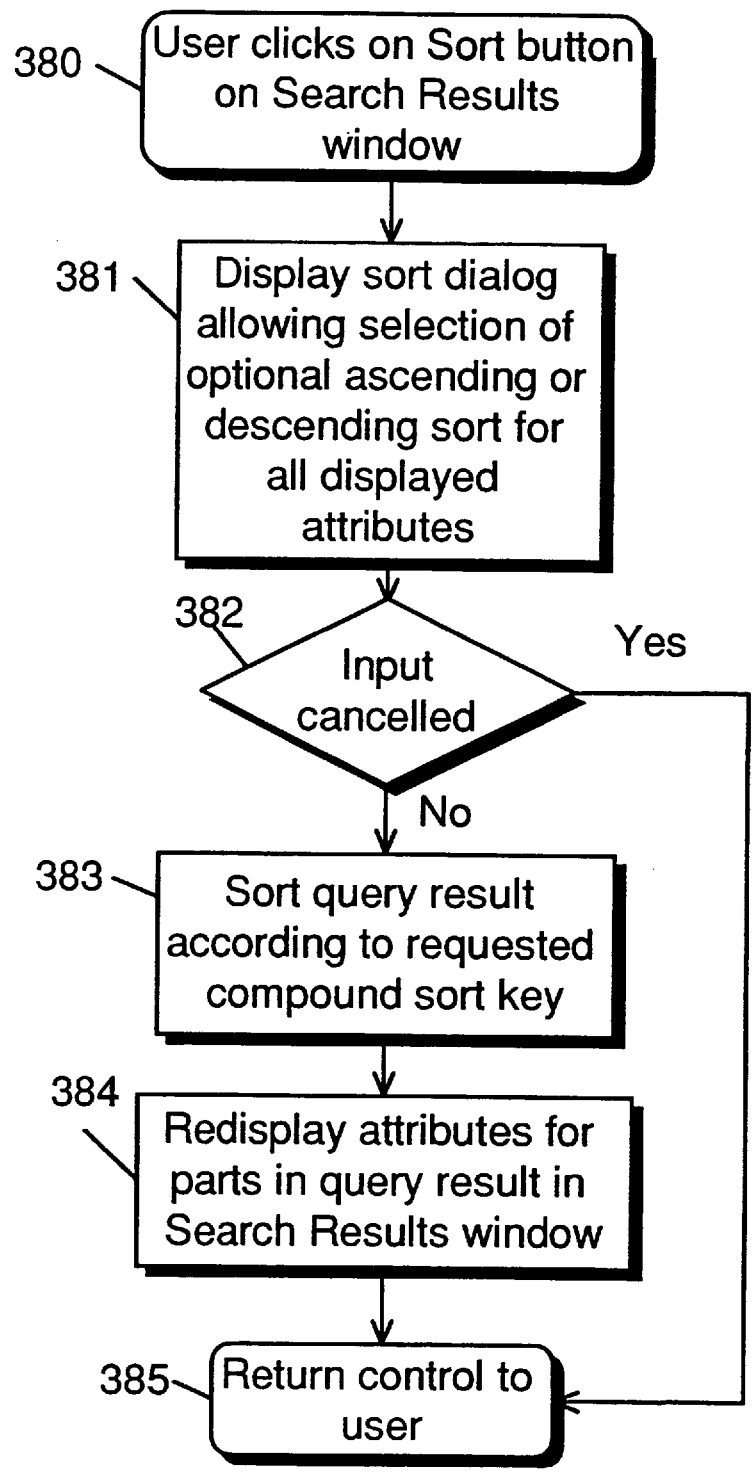
FIG. 33 is a flow chart depicting the procedure followed when the user actuates the sort button.

The sort procedure executed when the user actuates the sort button 348 in the search results window 299 is depicted in the flow chart of FIG. 33. Step 380 is performed when the user clicks on the sort button 348. The system then displays a sort dialog box 386, as described in step 381.

Figure 34:
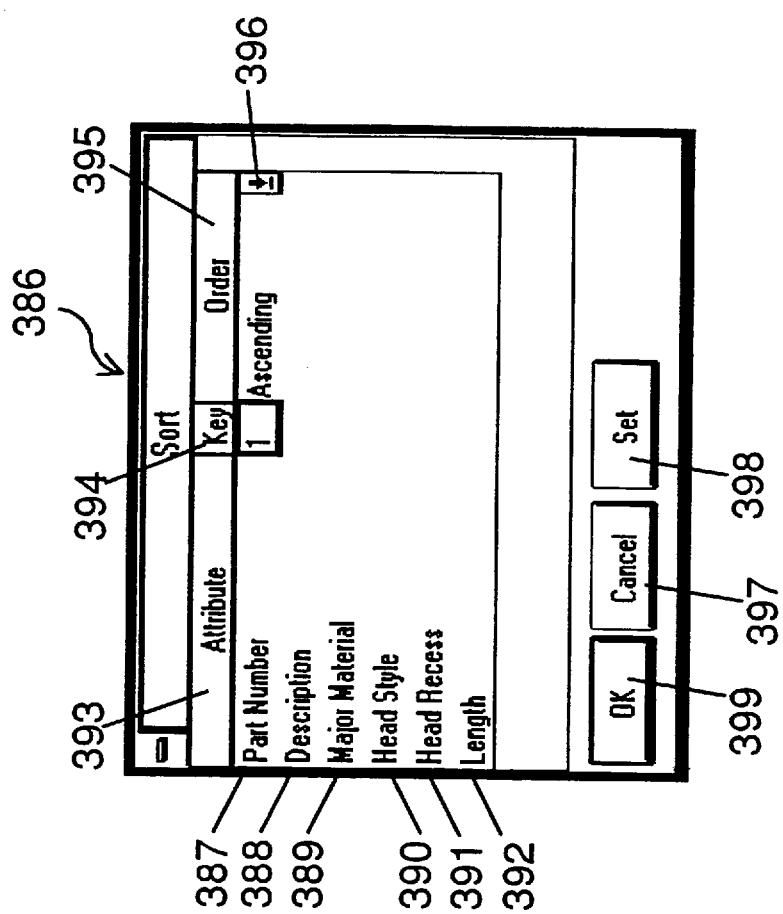
FIG. 34 depicts a display screen showing information displayed in the sort dialog box.

An example of a sort dialog box 386 is shown in FIG. 34. Attributes 387 through 392 are displayed in an attribute column 393 in accordance with step 381 of FIG. 33. The dialog box 386 also includes a sort key column 394 and a sort order column 395. The sort order column contains pull-down menus actuated by appropriate buttons 396 (only one of which is shown) which allow the user to select ascending order or descending order for each attribute 387–392. This is described in step 381 shown in FIG. 33.

The sort procedure allows a user to reorganize the list of parts in an alphanumeric or numeric sequence. The user can sort the list of parts in ascending or descending order based upon one or more of the attribute values 387–392. The sort key 394 identifies which attribute 387–392 the user wants to sort by first, which attribute the user wants to sort by second, which attribute the user wants to sort by third, and so on.

For example, if the user has a list of parts and the user wants to obtain a sorted listing of these parts according to one of the attributes 392, the user selects that attribute 392 as the first sort key. The user may select a second attribute 389 to sort on when the first attribute 392 has duplicate values. In the example shown in Table 3, the length attribute 392 was the first key and the order was ascending. The major material attribute 389 was not selected as a sort key.

TABLE 3

| Length    | Major Material |
|-----------|----------------|
| .5 (Inch) | Phosphate      |
| .5 (Inch) | Zinc           |
| .5 (Inch) | Phosphate      |
| .75 (Inch)| Phosphate      |
| .75 (Inch)| Zinc           |
| .75 (Inch)| Phosphate      |

Notice that in the example shown in Table 3, there are duplicate values in the length column and because of this, the values in the materials column are random. If the user wants these values to be sorted in conjunction with the first key, the user would select the major material attribute 389 as the second sort key. In this example, for both attributes 392 and 389 the user would use the default sort order, which is ascending. The example shown in Table 4 is the result when using this type of sort.

TABLE 4

| Length    | Major Material |
|-----------|----------------|
| .5 (Inch) | Phosphate      |
| .5 (Inch) | Phosphate      |
| .5 (Inch) | Zinc           |
| .75 (Inch)| Phosphate      |
| .75 (Inch)| Phosphate      |
| .75 (Inch)| Zinc           |

Selecting ascending as the sort order causes the order of the attribute values to be sorted in a manner which depends on the type of attributes where enumerated attributes are sorted, the enumerated attributes with a value of "undefined" are listed first, then the remainder of the values are listed in the same order as they appear in the schema. When text attributes are sorted, the text attributes with a value of "undefined" are listed first, then the values that are numeric, and then the text is sorted in ASCII sequence. When numeric attributes are sorted, the numeric attributes with a value of "undefined" are listed first, then the values that are numeric based upon the unit of measurement. When boolean attributes are sorted, the boolean attributes with a value of "undefined" are listed first, then the attributes with a true value, and then the attributes with a false value.

Selecting descending as the sort order causes the order of the attribute values to be reversed.

To establish the sort order the user wishes to use, the user should choose the sort command button 348, then from the sort dialog box 386, select the attribute 392 the user wants to sort first, then choose the set command button 398. Choosing the set command button 398 sets the key 394 and the sort order 395 for the attribute 392. Double-clicking in the key field 394 of the attribute 392 sets both the sort key 394 and the sort order 395.

To clear the key 394 and sort order 395, the user may select the attribute 392 that the user wants cleared, then choose the set command button 398. The key 394 and sort order 395 for the selected attribute 392 will then clear. As shown in step 382 in FIG. 33, the user can cancel the input by actuating the cancel command button 397. If the user does so, flow will jump to step 385 and control will be returned to the user.

After selecting all the attributes 387–392 with respect to which the user wants to sort, the user may actuate the OK command button 399. This results in flow going to step 383 in FIG. 33. In step 383, the query result is sorted according to the requested compound sort key. In accordance with step 384, the sort dialog box 386 will close and the search results window 299 will reappear with the parts information sorted according to the user's selections. Then in step 385, control will be returned to the user.

The user may be required to edit the parts in the user's knowledge base whenever the user has additional data to further classify a part, there is a duplicate part, or if the user needs to move parts from one class to another class.

The edit command button only appears in the parts specification window when the user has access rights for this feature. The system administrator is responsible for setting access rights to this feature. There are two features that will assist the user in locating parts that need editing. One is searching for parts that have undefined attributes. The other is using the local query command to find parts that have not been fully classified.

From a parts editor window 1019, the user can edit the attribute values, move parts from one class to another, and delete parts.

In order to edit parts, the user follows the same procedures that the user uses for specifying a part. In addition to specifying parts with specific attribute values 1056, the user can also locate the parts that do not have values (undefined) for a specific attribute 1060. To locate parts with undefined attribute values, the user selects the undefined check box 165 for the specific attribute 166. See FIG. 6. When the undefined check box 165 contains a check mark, it is selected, indicating that the user is searching for parts that do not have that attribute 166 defined.

The user would use undefined if the user is editing the data in the user's knowledge base and the user wants to locate attributes 166 that are currently undefined 1060 so the user can research those parts and update the knowledge base to include the appropriate values.

If the user selects a specific attribute value and also selects "undefined", the user sets up an "or" condition as part of the user's search criteria. In this example, the system locates parts with the specific value and the parts that do not have a value for that attribute. The undefined check box 165 is positioned to the right of the search criteria field 177. The user may need to use the horizontal scroll bar to move the check box 165 into view.

Once the user has specified the part by selecting the class 174 and subclasses 196, 197, 198, and 199, entered the attribute search criteria 177, and set the display order 194, the user can choose the edit command button 180.

Figure 35:
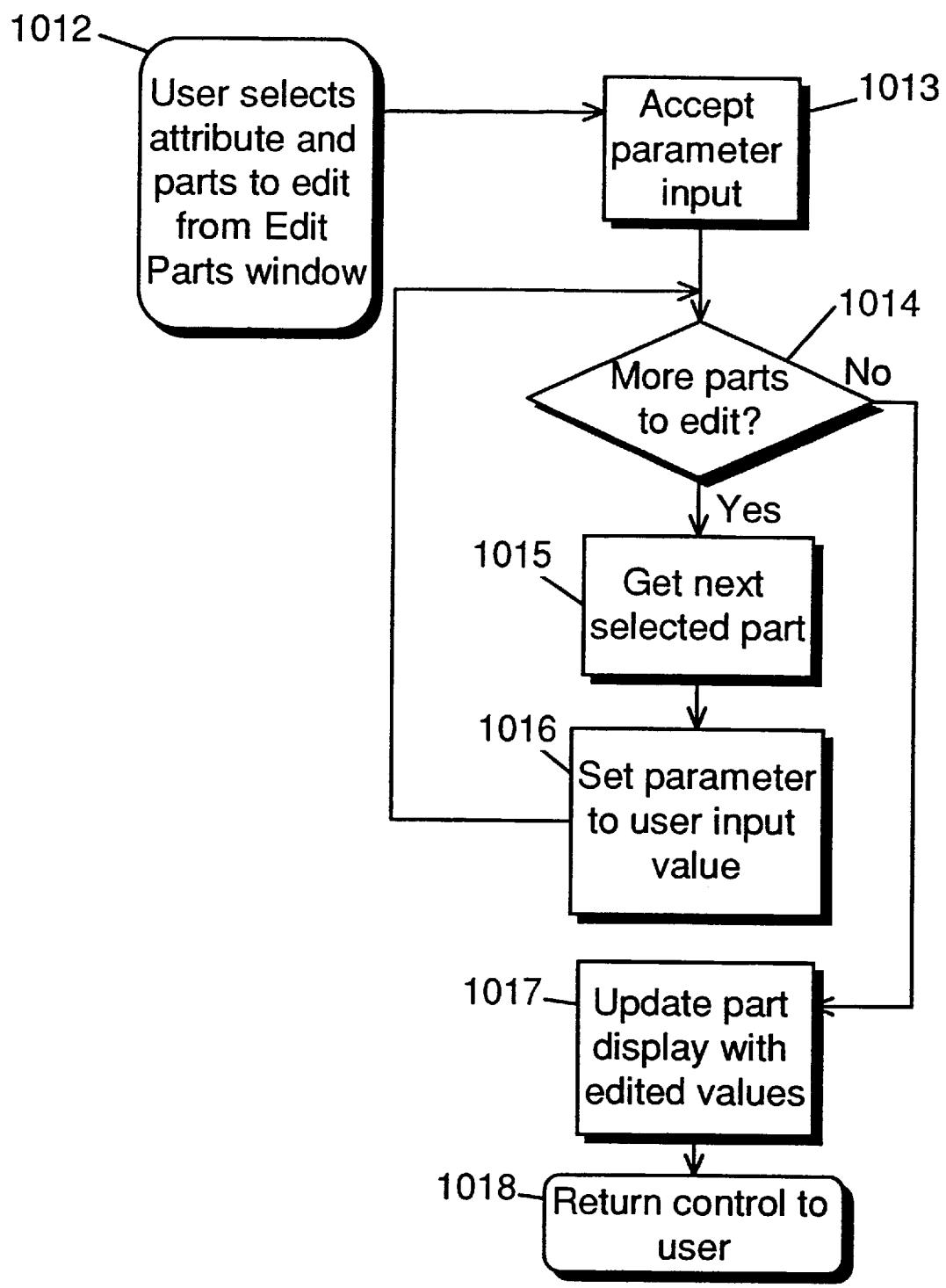
FIG. 35 is a flow chart depicting procedures followed when a user edits parts.
Figure 36:
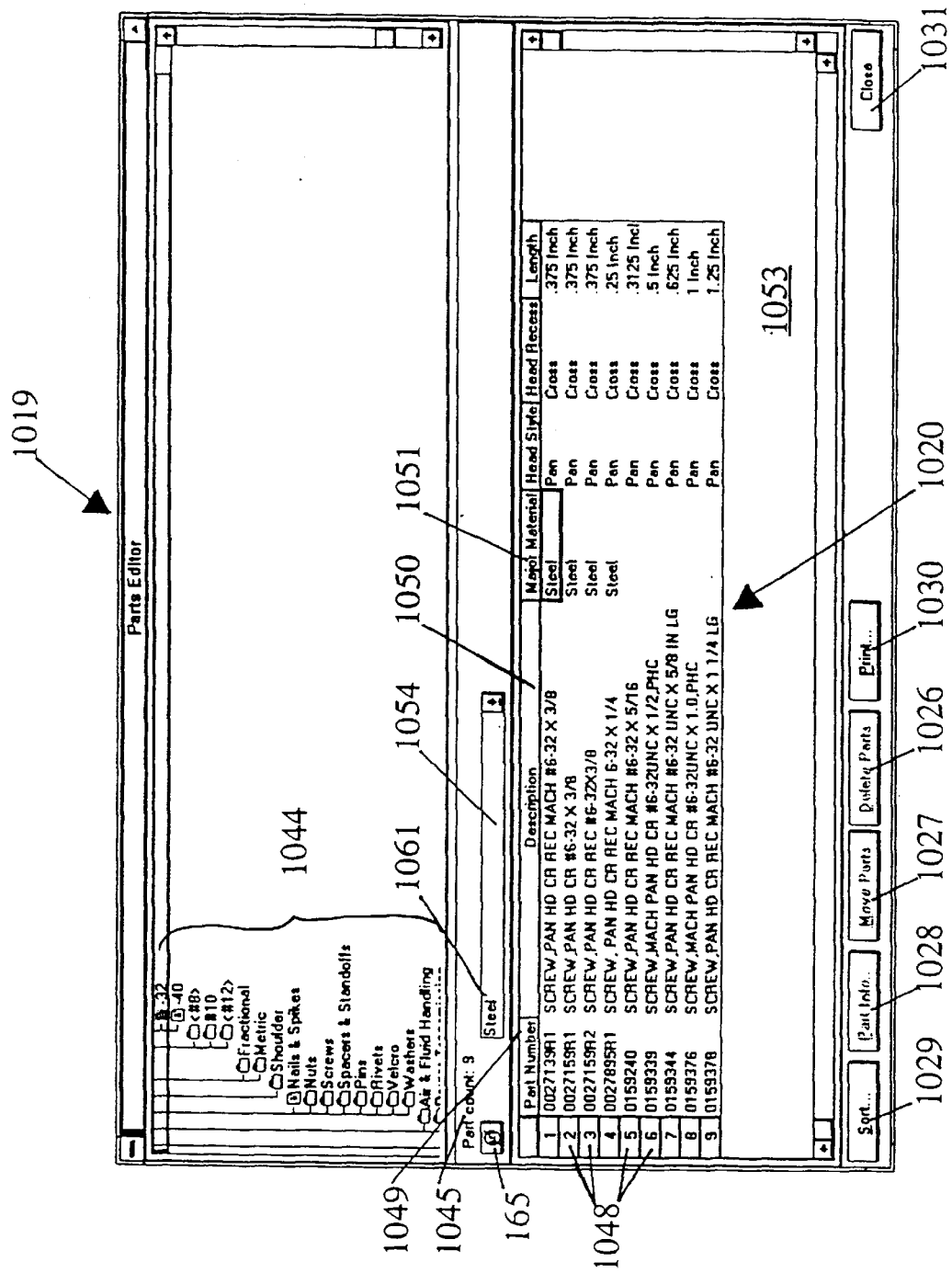
FIG. 36 depicts a display screen showing information displayed in the parts editor window.
Figure 37:
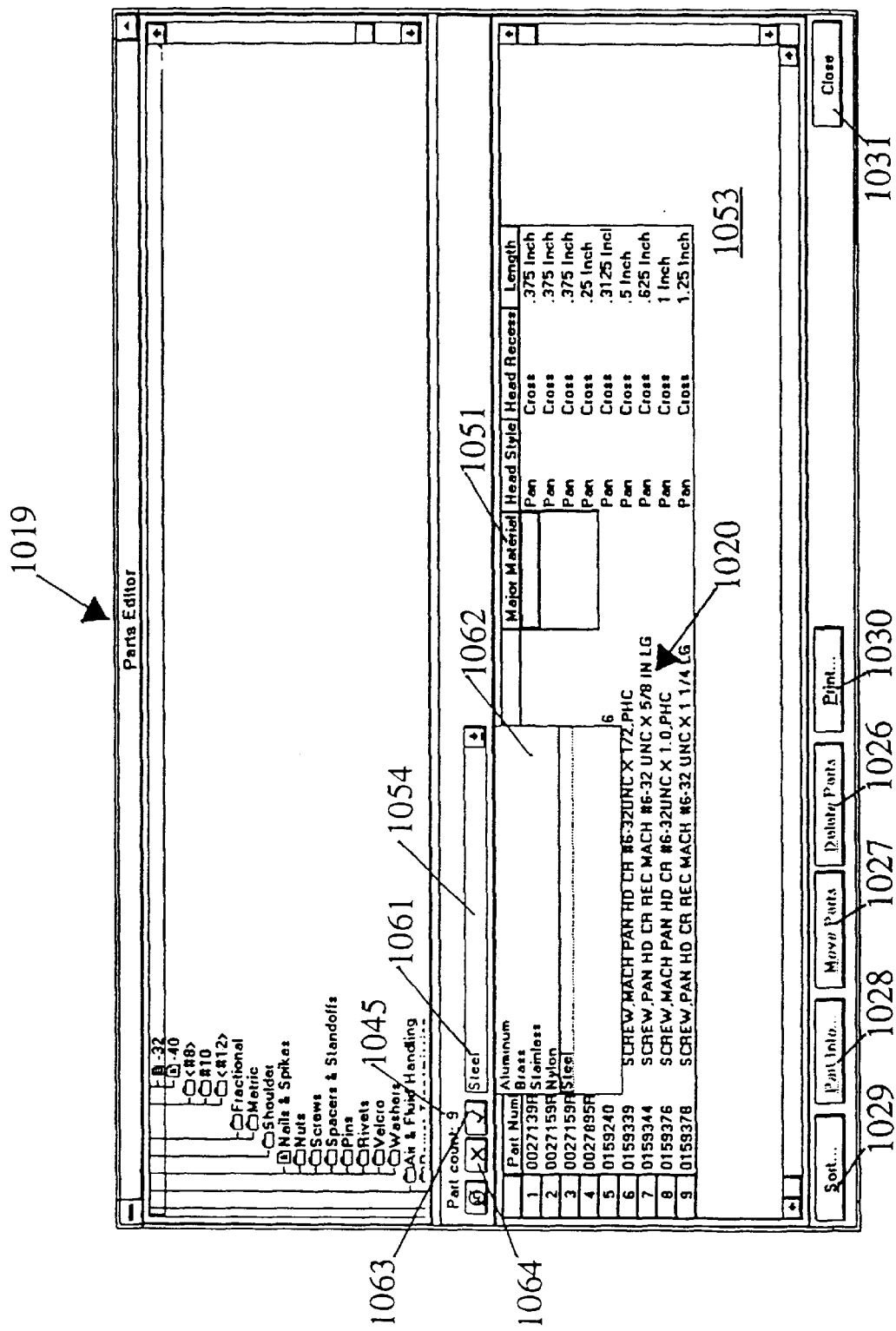
FIG. 37 depicts a display screen showing information displayed in the parts editor window.

FIG. 35 depicts a flow chart showing the procedure followed when a user edits parts. Referring, for example, to FIG. 21, a user who has access rights to edit parts may actuate the edit button 180 and bring up the parts editor window 1019 shown in FIG. 36. The first step 1012 shown in FIG. 35 involves the user selection of attributes and parts to edit from the parts editor window 1019. A user may enter new or revised values 1061 for attributes 1051, and the system will accept parameter input in step 1013. If the attribute is an enumerated attribute 1051, a pull down list 1062 will be presented to the user with available choices, as shown in FIG. 37. In step 1014 of FIG. 35, a determination is made as to whether there are more parts to edit. If there are no more parts to edit, flow proceeds to step 1017. The system updates the part display 1020 and the parts editor window 1019 with edited values 1061. The system then proceeds to step 1018 and returns control to the user.

In step 1014, if more parts remain to be edited, flow proceeds to step 1015, and the system gets the next selected part. In step 1016, the system sets the next selected parts parameter to the user input value 1061. Control then loops back to step 1014.

Figure 38:
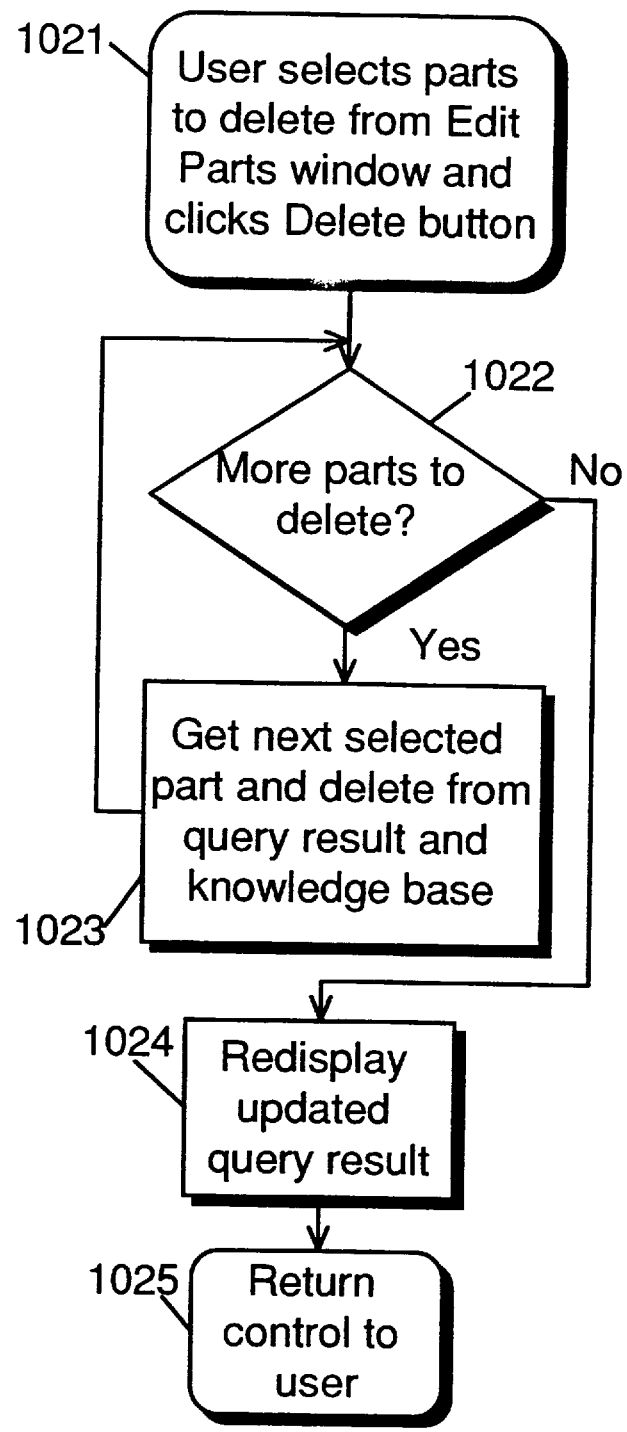
FIG. 38 is a flow chart depicting procedures followed when a user deletes parts.

FIG. 38 depicts a procedure for deleting parts. In step 1021, the user selects parts to delete from the edit parts window 1019. The user then clicks a delete parts command button 1026. In step 1022, a determination is made as to whether any more parts remain to be deleted. If the answer is yes, flow proceeds to step 1023 in which the system gets the next selected part and deletes it from the query result and the knowledge base. Flow then loops back to step 1022. When there are no more parts to delete, flow proceeds to step 1024, and the system redisplays the updated query result in the part editor window 1019. Flow then proceeds to step 1025, and control is returned to the user.

Figure 39:
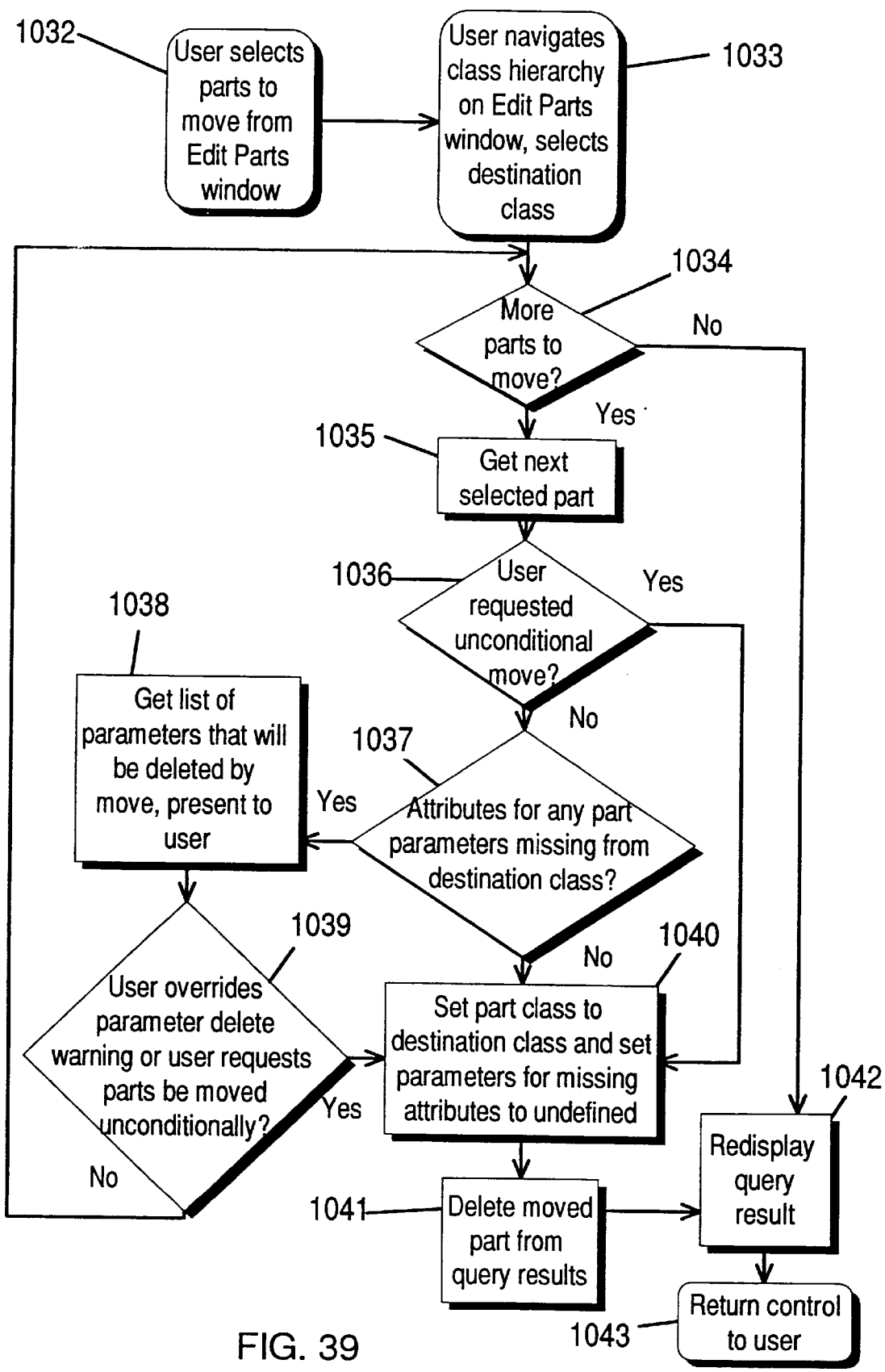
FIG. 39 is a flow chart depicting procedures followed when a user moves parts.

FIG. 39 depicts a flow chart for a procedure for moving parts. The procedure may be initiated by the user selecting parts to move from the parts editor window 1019 as shown in step 1032. Alternatively, the user may initiate the procedure as in step 1033 by navigating the class hierarchy on the parts editor window 1019 and selecting a destination class. The user may actuate a move parts command button 1027, which is illustrated for example in FIG. 40.

Referring to FIG. 39, the procedure proceeds to step 1034 and a determination is made as to whether there are more parts to move. If there are no more parts to move, flow transfers to step 1042 and the system redisplays the query result in the parts editor window 1019. The flow then proceeds to step 1043, and control is returned to the user.

Returning to step 1034 in FIG. 39, if a determination is made that there are more parts to move, flow proceeds to step 1035 and the system gets the next selected part. In step 1036 a determination is made as to whether the user has requested an unconditional move. If the answer is yes, flow jumps to step 1040. The system then sets the part class to the destination class selected by the user. Any parameters or missing attributes are set to undefined. Flow proceeds to step 1041, and the system deletes the moved part from the query results. Flow proceeds to step 1042 where the system redisplays the query result in the parts editor window 1019.

In step 1036, if the user has not requested an unconditional move, flow proceeds to step 1037 where a determination is made as to whether attributes for any part parameters are missing from the destination class. If the answer is no, flow proceeds to step 1040 and continues as described above.

If a determination is made in step 1037 that there are attributes for part parameters which are missing from the destination class, flow transfers to step 1038. The system gets a list of parameters that will be deleted by the move and presents them to the user by displaying them on the display 116. Flow then proceeds to step 1039. If the user then overrides the warning that parameters will be deleted, or requests that the parts be moved unconditionally, flow transfers to step 1040 and proceeds as described above. If the user does not wish to override the parameter deletion warning or does not request that the parts be moved unconditionally, flow loops back to step 1034.

Figure 40:
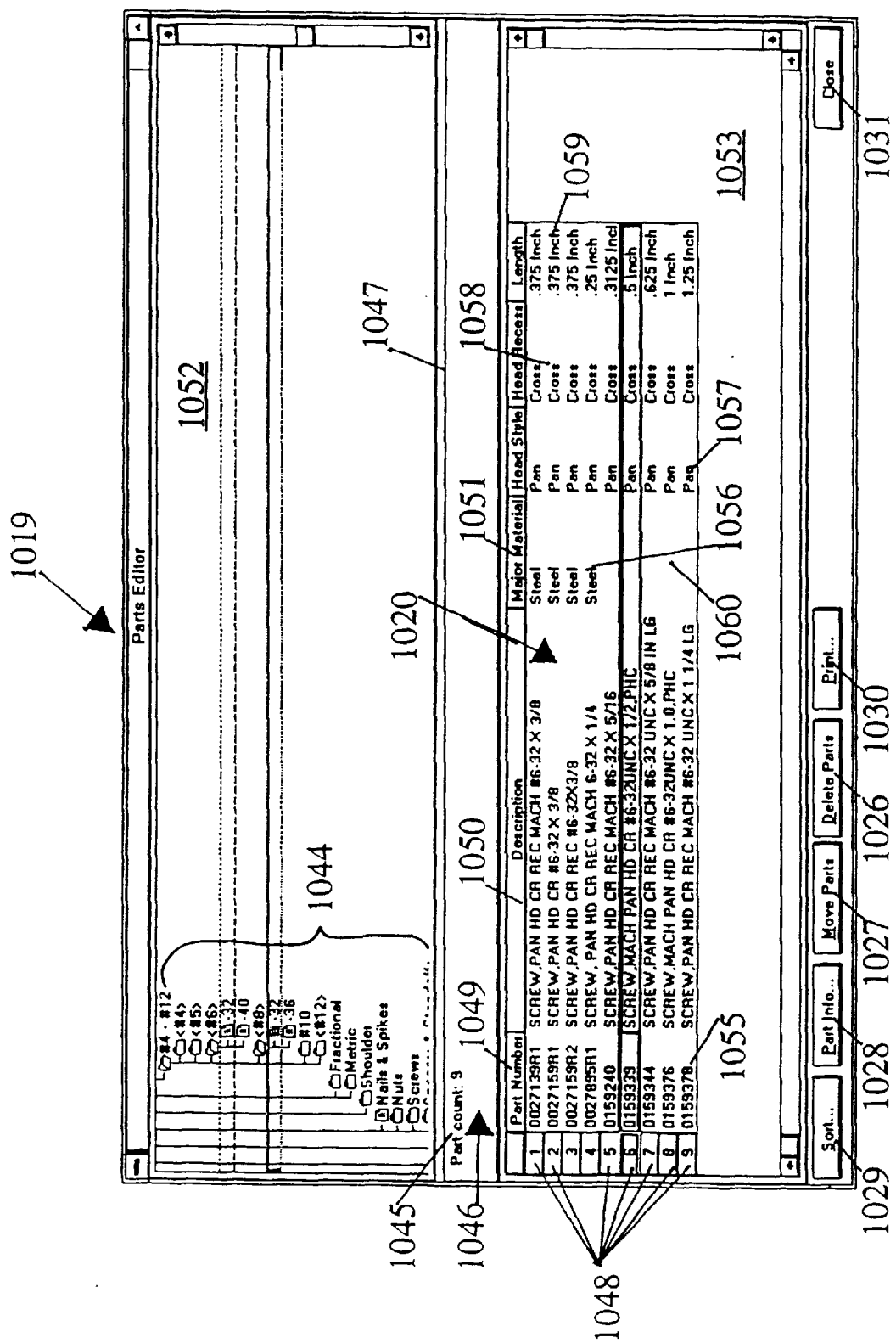
FIG. 40 depicts a display screen showing information displayed in the parts editor window.

The process of editing parts may be further understood in connection with a description of the parts editor window 1019 (shown in FIG. 40). Once the user has specified a part by selecting a class 174 and subclasses 196, 197, 198 and 199, entered the attribute search criteria 177, and set the display order 194, the user can edit the parts by choosing the edit command button 180. Choosing this command 180 causes the parts editor window 1019 to appear. The top area 1052 of the parts editor window 1019 contains the class tree 1044, showing highlighting the navigation path and class definition of the parts the user is editing. The bottom area 1053 of the window 1019 contains the parts 1020 the user has selected to edit. The parts appear in a table 1020 that is similar to tables that are used in spreadsheet applications. The part attributes 1049, 1050, 1051, etc., and attribute values 1055, 1056, 1057, etc., appear in the display order, from left to right, that the user previously established in the part specification window 170. To use a value, the user clicks an enter box 1063. To cancel a new value, the user clicks a cancel box 1064.

The top area 1052 of the parts editor window 1019 contains the class definition 1044, which comprises the class tree showing the navigation path and class definition of the parts selected for editing. The window 1019 has a horizontal split bar 1047 that splits the window into two sections 1052 and 1053. The user can move the split bar 1047 up or down so the user can see more of one section 1052 or the other 1053. The parts editor window 1019 includes an area referred to as the editing area 1046. After selecting an attribute value 1051, a text box or list box 1054 appears in this editing area 1046 so the user can make changes (see FIG. 36). Each part appears as a row 1048 in the table 1020, and each row 1048 of the table 1020 is numbered. The user may use the row number to select a part that the user needs information on or that the user wants to move or delete. The attributes 1049, 1050, 1051, etc., are the column headings, and the attribute values are the rows.

Referring to FIG. 40, a sort command button 1029 may be actuated to rearrange the parts according to a sort order that the user may enter. A part info command button 1028 may be actuated to display all of the part information (the class definition and all attributes) for a selected part. A print command button 1030 may be actuated to print the list of parts. A delete command button 1026 becomes active after the user selects a part, and can be used to remove obsolete parts from the user's knowledge base. A close command button 1031 may be actuated to close the parts editor window 1019 and return focus to the part specification window 1070.

In order to make a part, a user follows the same procedures the user uses to specify a part. If the user specifies a part that results in zero parts found 172 and an acceptable substitute does not exist, the user can add a new part to the knowledge base.

After determining that the user is going to enter a new part in the knowledge base, the user must fully specify the part. In a preferred embodiment, a complete part specification is defined as selecting the class up to the leaf class 201 and entering values for all the required attributes 203. In a preferred embodiment, if the user does not select a leaf class 201 or enter the required attributes 203, the user cannot add the part. When making parts, a preferred procedure is for the user to enter as many attribute values 203 as the user can in order to give the part as complete a specification as possible.

Some attributes are required before a part can be added. Required attributes have a required icon 263 immediately to the left of the attribute icon. Before choosing the make command 181, the user must enter an attribute value for each required attribute. In addition, a user cannot enter any attribute values for protected attributes. Protected attributes have a protected icon 191 immediately to the left of the attribute icon. Once the user has selected the leaf class 201 and entered all required attributes, the user can choose the make command button 181. Choosing the make command 181 causes the part to be added to the user's knowledge base and the parts found 172 to be updated to show a part count of 1.

Additional disclosure is contained in the CADIS-PMX User's Guide-Windows, Version 2.0 (August 1994) C, the entirety of which is incorporated herein by reference. Although the above description has been with reference to a Windows client 112, the system is not so limited. Additional disclosure is contained in the CADIS-PMX User's Guide—Motif, Version 2.0 (August 1994), the entirely of which is incorporated herein by reference.

B. Knowledge Base Client

The knowledge base client 131 is a set of C++ libraries that provide knowledge base services to a client application 130, 133, and 144 through the API 143. The services may be either local or result in remote procedure calls to the knowledge base server 132. For client applications which run under Windows, the knowledge base client consists of one or more Windows Dynamic Link Libraries (DLL) which use the WinSock DLL to provide network access to the knowledge base server 132 and the registry server 141.

C. Knowledge Base Server

The knowledge base server 132 is a UNIX server process that manages knowledge base 103 access, retrieval and updates. A knowledge base server 132 may manage one or more knowledge bases 103 and 105.

1. Dynamic Class Manager

The dynamic class manager 134 is a software subsystem in the knowledge base server 132 that manages schema and data. The dynamic class manager 134 provides the ability to store class, attribute, unit and instance information that can be modified dynamically. The dynamic class manager 134 consists of C++ libraries and classes and provides operations for "legacizing" and for accessing, creating, deleting, and modifying classes, attributes, instances, parameters, unit families, units and meta-attributes at run-time.

The capabilities of the dynamic class manager 134 are accessed by a user programmer through a set of functions provided by the API 143.

The dynamic class manager 134 knowledge base, hereafter sometimes referred to as "the knowledge base," is a collection of classes, attributes, units, instances with parameter values, and relationships among these objects. In the dynamic class manager 134, a class defines a separate type of object. Classes have defined attributes. The attributes have some type, and serve to define the characteristics of an object. A class can be derived from another class. In this case, the class inherits attributes from its ancestors. A knowledge base contains instances of classes. The attribute values defined by an instance are parameters.

Another way to describe the concept of classes, attributes, instances, and parameters is to use a dog as an example. The word "dog" is the analog of a class. Dog describes a group of similar things that have a set of characteristics, or attributes. The attributes of a dog are things like color, breed, and name. The class and attributes do not describe any particular dog, but provide the facility to describe one. An instance of a dog has parameters that give values to the attributes: for example, a dog whose color is beige, of the breed golden retriever, and whose name is Sandy.

Classes can have relationships. The class "dog" is part of the larger class, "mammal". The class "mammal" is less specific than "dog". It conveys less information about the object "dog", but everything about "mammal" also applies to "dog". "Dog" is clearly a subset of "mammal", and this relationship is a subclass. "Dog" is a subclass of the class "mammal". The subclass "dog" could be further subclassed into classes like big "dogs", little "dogs", etc. The concept subclass implies a parent relationship between the two classes. "Mammal" is a parent and "dog" is a subclass. The terminology "dog" is derived from "mammal" is also used to describe the relationship.

The subclass "dog" inherits attributes from its parent class. The attribute color could be part of the "mammal" class, since all "mammals" have a color. The "dog" class inherits the attribute color from its parent.

The root class is special, it has no parent. It is the class from which all classes begin their derivation. In illustrations set forth herein, graphs have been drawn to illustrate a class hierarchy, and the root class is placed at the top of those drawings. Subclasses branch out from the root class into ever widening paths that make the graph look like an upside down tree. The entire group of classes is a tree, and the special class that has no parent, though it is at the top, is the root.

One of the available attribute types supported by the dynamic class manager 134 is a numeric type. Numeric attributes are used to describe measurable quantities in the real world. Such measurements do not consist of just a numeric value; they also have some associated units. The dynamic class manager 134, in conjunction with the units manager 138, maintains information about different types of units that can be used with numeric attributes. The dynamic class manager 134 (using the units manager 138) can also perform conversions among units where such conversion makes sense. The units that the system understands are grouped into various unit families. These unit families and the units they define, can be changed at run time. The dynamic class manager 134 also comprises a dynamic units manager 138.

The word "schema" refers to the layout of classes, attributes, units, and unit families. A knowledge base with no instances is a schema. This may be better understood in connection with the following more detailed description of the various objects managed by the dynamic class manager 134.

A class is the most fundamental object in the schema in accordance with the present invention. A class is a collection of related objects. In the present example, a class may have eight or nine components. A class is a schema object. As explained above, the schema is the collection of classes, attributes, units, and unit families and their relationships. Every class has exactly one parent from which it is derived, except for the root class 173. The root class 173 is the one class that has no parent. The root class 173 has another special characteristic in that it can never be deleted. The consequence of a class being derived from its parent means that the class has all of the properties of its parent. These properties are referred to as attributes. Attributes are inherited from the parent class.

A class may have zero or more subclasses. A class is a parent of each of its subclasses. A subclass is a class that has a parent, so the root class 173 is not a subclass. The subclasses of a parent class have some defined order. The order is persistent, meaning that the dynamic class manager 134 preserves the order even across closes and reopens of the knowledge base.

A class has a set of descendants that is comprised of all of its subclasses, all of the subclasses' subclasses, and so on. A class that has zero subclasses or an empty set of descendants is called a leaf class 201. A subtree is the set composed of a class and all of its descendants. The subtree is said to be rooted at the class. A subclass also has a set of ancestors, which is the set composed of the parent, its parent's parent, and so on including the root class 173. Classes that have the same parent are sometimes referred to as siblings.

Following a subclass to its parent is sometimes referred to as going up the tree. Moving from a parent to one of its subclasses is sometimes referred to as going down the tree. Therefore, the root class 173 of the schema is the furthest up at the top of the tree, and the objects furthest down at the bottom of the tree are typically leaf classes 201.

A class has a name which is the text identifying a class, subclass, or leaf class, and is an ASCII character string. The present invention uses class handles for references to a class, which are further described in connection with the operation of the handle manager 137. In the example shown in FIG. 5, there are three subclasses.

Figure 41:
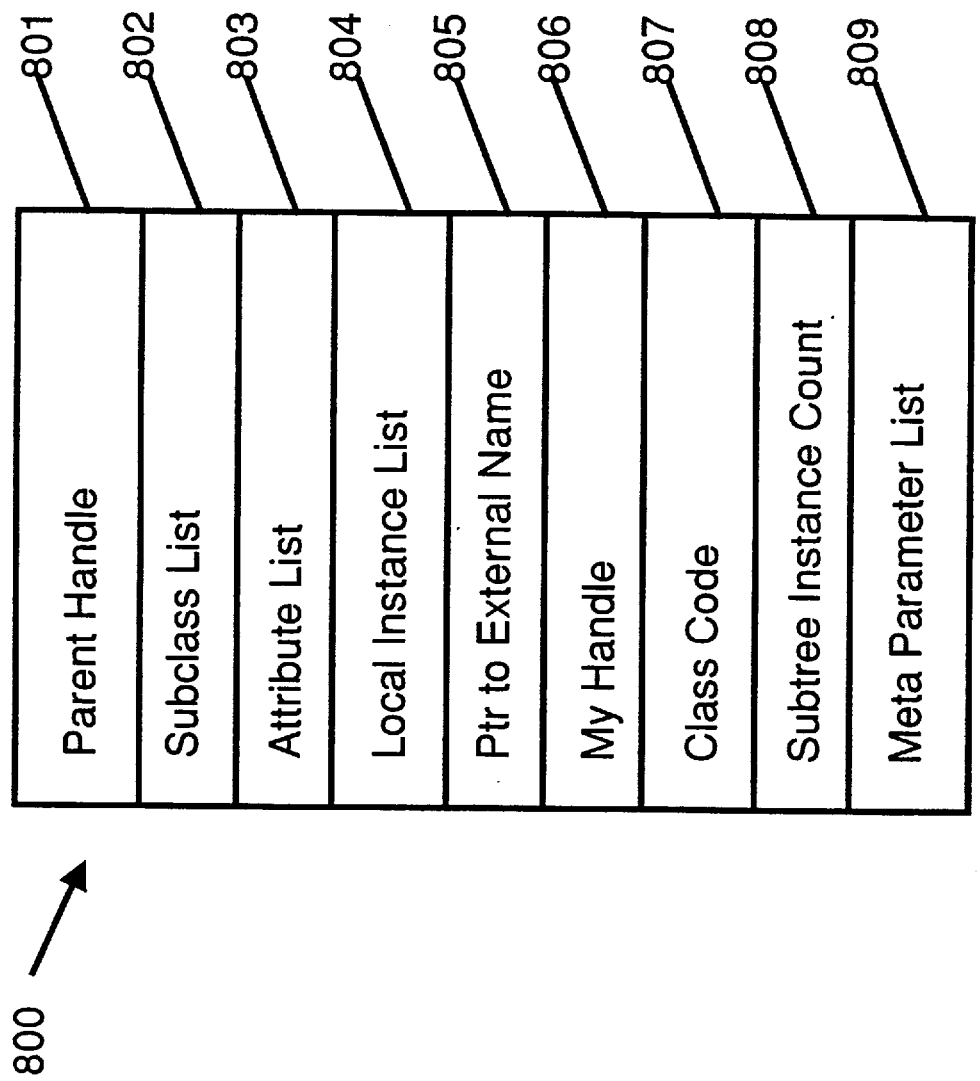
FIG. 41 shows the internal object representation for a class.

FIG. 41 shows the internal object representation for a class 800. In the present schema, a class has a parent handle 801. Every class object 800 includes stored information representing the handle of its parent class, except in the special case of the root class 173, which has no parent. A null is stored in this location in that case. A handle is a reference to an object. The parent handle information 801 is used by the handle manager 137 to identify the stored class object which is the parent class for the class 800.

The class object 800 includes a subclass list 802. The subclass list 802 is an array of handles which may be used by the handle manager 137 to identify those class objects which are subclasses of the class 800. In the internal representation provided in the present invention, lists can grow without bounds and are dynamic. The storage space available is not fixed.

This provides flexibility and power to the database structure, because the class object 800 may have an extremely large number of subclasses in a large database without substantial degradation in performance.

The class object 800 includes an attribute list 803. The attribute list 803 is a list of handles. The handle manager 137 may use the information stored in the attribute list 103 to identify the attributes possessed by class object 800.

The class object 800 also includes a local instance list 804, which is a handle list. Field 805 shown in FIG. 41 is a pointer to storage location of the class name, i.e., the text identifying the class.

Field 806 is used to store the handle for the class 800. The field 807 stores an indication of the class code, i.e., whether it is primary, secondary, or a collection.

The class object 800 also includes a subtree instance count 808. The subtree instance count 808 is a numeric indication of the total number of items or instances present in all of the descendants of the class 800 i.e., the total number of instances in class 800, all of the class 800's subclasses, all of the subclasses' subclasses, and so on. Referring, for example, to FIG. 10, the instance count 808 is used to generate the parts found 172 field which is displayed on the part management window 170. Thus, when a user is navigating through the tree structure of a knowledge base, as a user selects and opens subclasses, the user can be immediately informed of the number of parts found 172 at any location on the tree by retrieving the subtree instance count 808 for the current class and passing that information to the retriever 130. The subtree instance count 808 is kept up to date whenever the knowledge base is modified, so it is not necessary while a user is navigating through the tree structure of the database to perform a real time computation of parts found 172.

Referring again to FIG. 41, the class object 800 also preferably includes a metaparameter list 809. The metaparameter list 809 is a string list, and may be used as a pointer to strings containing linking information, for example, the name of a file that contains a graphical display of the type of parts represented by the class 800, thesaurus information used for legacizing data, or other legacizing information.

Figure 42:
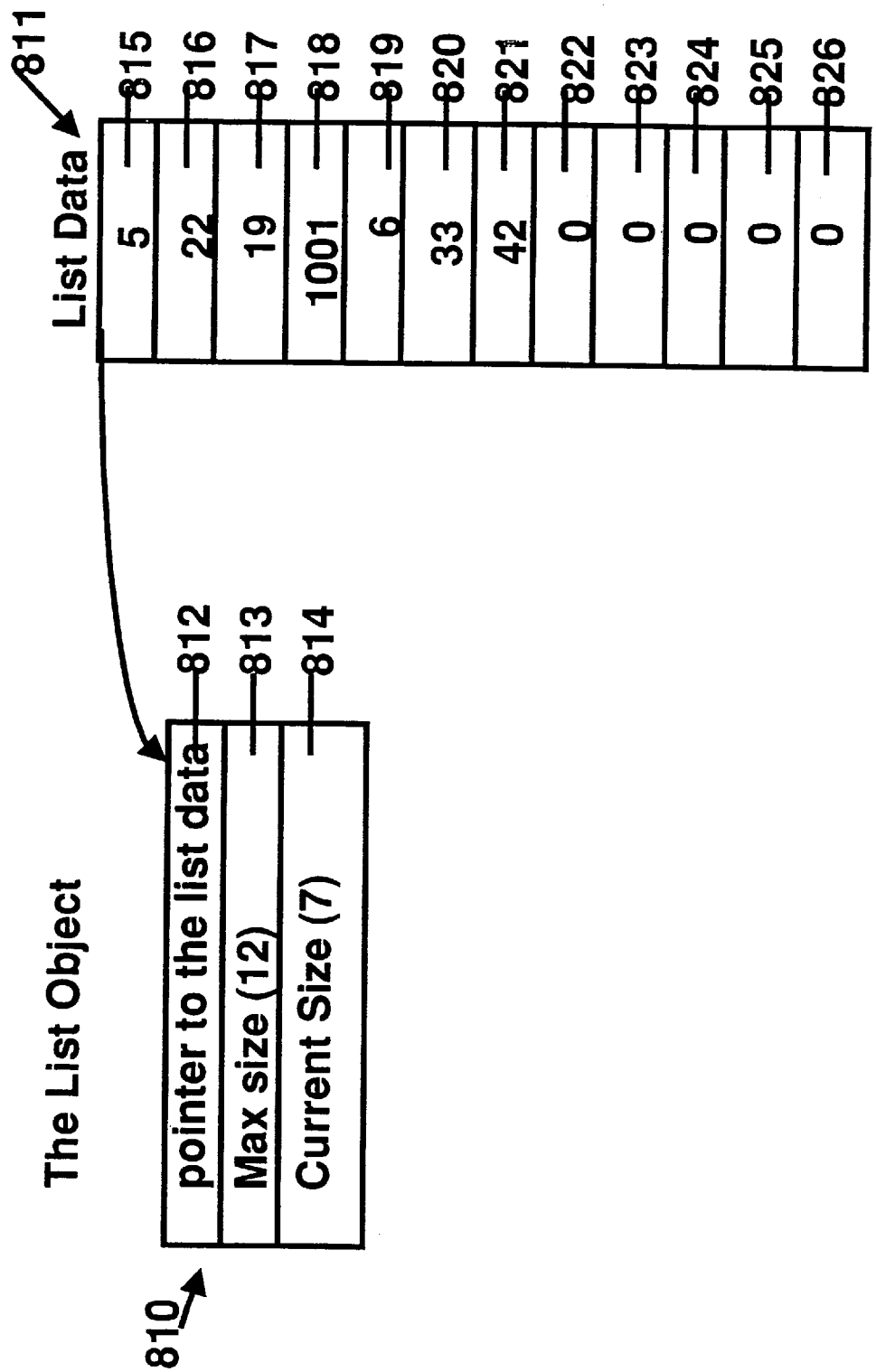
FIG. 42 depicts a generic list.

FIG. 42 depicts an example of a generic list 810. The class manager 134 uses lists of handles, lists of floating point values, lists of pointers to character strings, etc. whenever a variable amount of data can be associated with an object. Examples of lists would be items 802, 803, 804 and 809. The list 810 depicts a list of simple integers.

A list object 810 includes a pointer 812 which points to the beginning 815 of the list data 811. A list object 810 also includes a field 813 indicating the currently allocated size for the list data 811. The list object 810 also includes a field 814 containing information indicating the amount of list data 811 currently in use.

The list data 811 contains the actual list of values. The first item 815 in the list in this example contains the value "5". Similarly, in this example list items 816, 817, 819, 820 and 821 contain additional values. List items 822, 823, 824, 825 and 826 in this example are not currently in use and are set to zero. In this illustrated example, the currently allocated size 813 of the list is twelve. The amount in use 814 of the list is seven, meaning that the first seven items in the list are valid.

Figure 43:
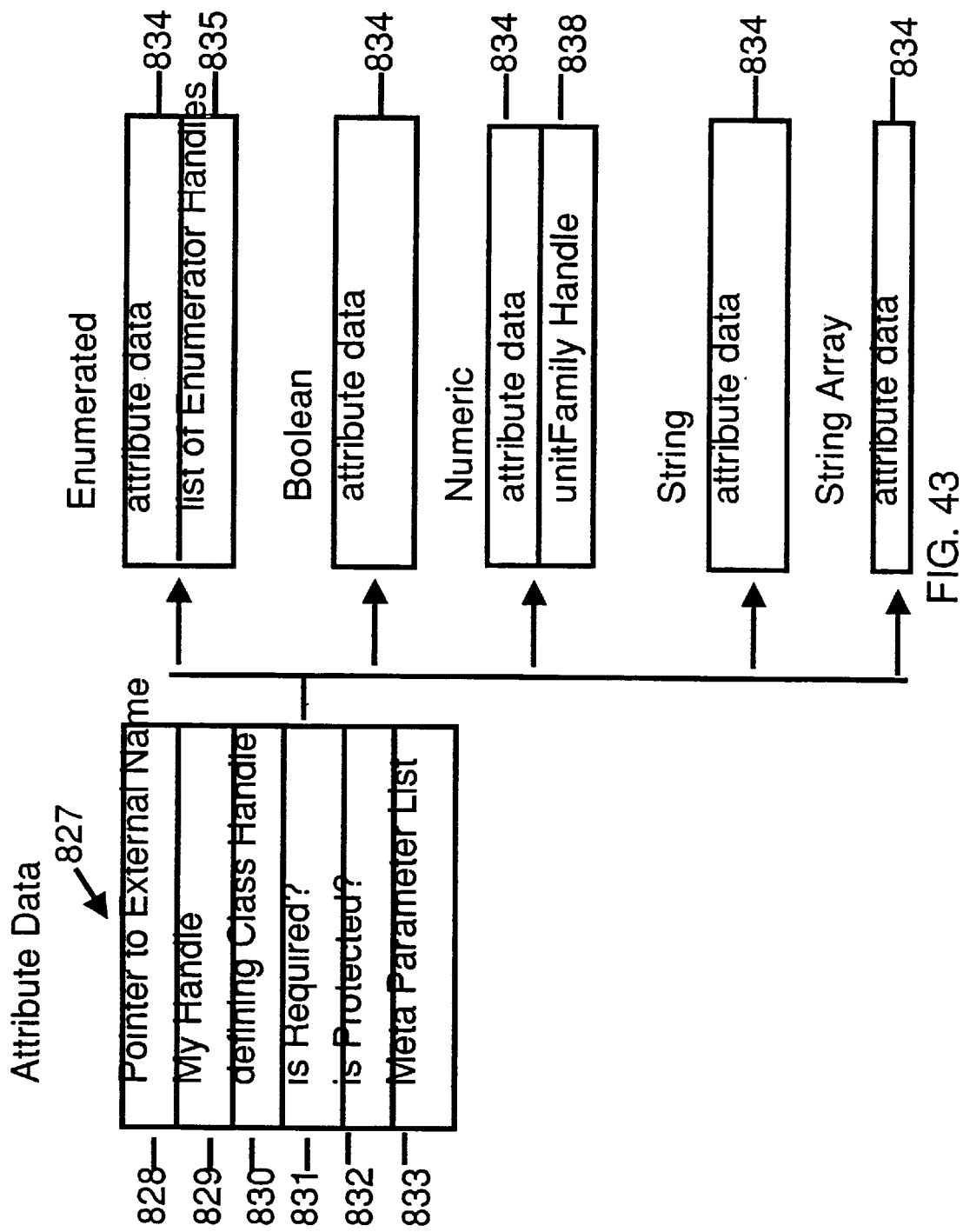
FIG. 43 illustrates the data structure for attribute data.

FIG. 43 illustrates the data structure for attribute data 827.

An attribute object 827 contains at least six fields in the illustrated embodiment. A first field 828 contains a pointer to an external name comprising an ASCII character string that is the name for the attribute. The attribute object 827 also contains a field 829 containing the handle for this attribute object 827. The attribute object 827 also contains a field 830 which contains the handle of the class that defines this attribute 827. The fourth field 831 is a Boolean indication of whether this attribute is a required attribute for the defining class. A fifth field 832 contains a Boolean field indicating whether this attribute is protected. For example, in FIG. 6 the "part number" attribute 176 is protected. This is indicated by the protected icon 191. In the data structure of the attribute object 827 shown in FIG. 43, this information is stored in field 832. The attribute object 827 also contains a field 833 which is a metaparameter list.

Enumerated attributes include fields 828–833, indicated collectively as attribute data 834, plus a field 835 which is a list of enumerator handles.

In the case of a Boolean attribute, only fields 828–833 are used, which are again indicated collectively in FIG. 43 as attribute data 834.

Numeric attributes include fields 828–833, indicated collectively as attribute data 834, plus a field 838 which contains the handle of the unit family for this numeric attribute.

In the case of a string attribute, and in the case of a string array attribute, only the attribute data 834 comprising fields 828–833 is included.

One example of the use of these data structures by the dynamic class manager 134 is the procedure of a user selecting a class by clicking on the closed folder icon 189 associated with the class (see FIG. 7). When a class is opened, the dynamic class manager 134 will check the class object 800 and retrieve the attribute list 803. The handles stored in the attribute list 803 will be passed to the handle manager 137. The handle manager 137 will return the virtual memory address for each attribute 827 of the class. The dynamic class manager 134 may then use the pointer 828 to the external name of an attribute object 827 to retrieve the character string text for the external name for the attribute. That ASCII text information can then be passed through the API 143 so that it may eventually be provided to the retriever 130 for display to a user on the display 116.

Figure 44:
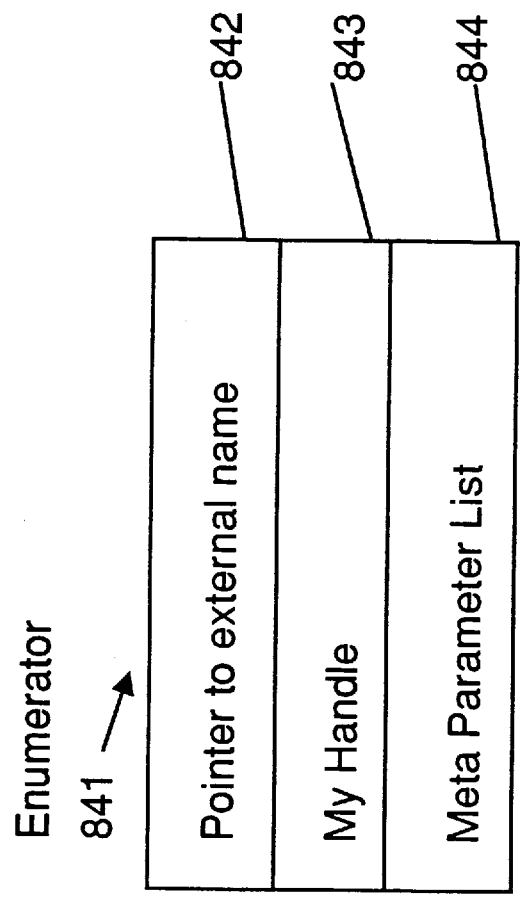
FIG. 44 illustrates the data structure for an enumerator object.

FIG. 44 illustrates the data structure for an enumerator object 841. An enumerator object 841 may comprise three fields. A first field 842 contains a pointer to the external name for the enumerator object 841. A second field 843 contains the handle for the enumerator object 841. A third field 844 may contain a metaparameter list. Handles are used to link from other objects to the enumerator object 841. An advantage of this structure is the ability to easily modify a knowledge base if it becomes desirable to change the external name of an object. Such a change need only be performed once to the ASCII character string that is used to represent the external name. All other objects merely contain a handle which can be used by the handle manager 137 to provide the dynamic class manager 134 with the actual external name.

Figure 45:
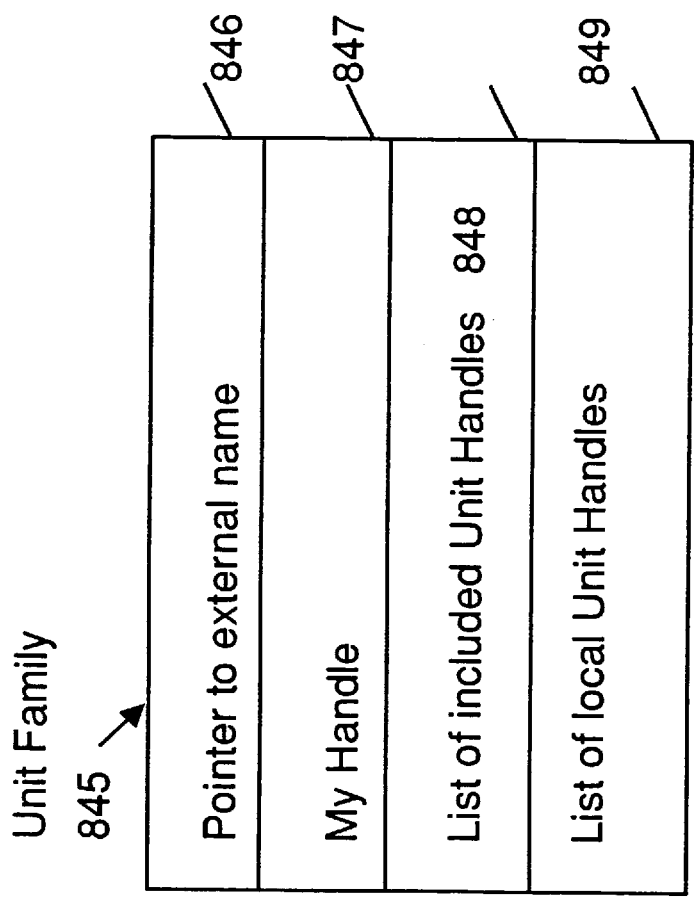
FIG. 45 illustrates the data structure for a unit family.

FIG. 45 depicts the data structure for a unit family object 845. In the example illustrated in FIG. 45, the unit family object 845 has four fields. The first field is a pointer to the external name 846 for the unit family object. The second field 847 contains the handle for this unit family object 845. The third field 848 is a list of unit family handles of unit families which are included in the unit family 845. The field 849 contains a list of handles for local units.

A unit is a system of measurement for a numeric parameter. A unit family is a collection of units that may be used for a numeric attribute. A unit family handle is a reference to a unit family. A unit family name is the ASCII text that identifies a unit family. A unit handle is a reference to a unit. A unit name is the ASCII text that identifies a unit. Local units are units that are defined in this unit family 845.

Figure 46:
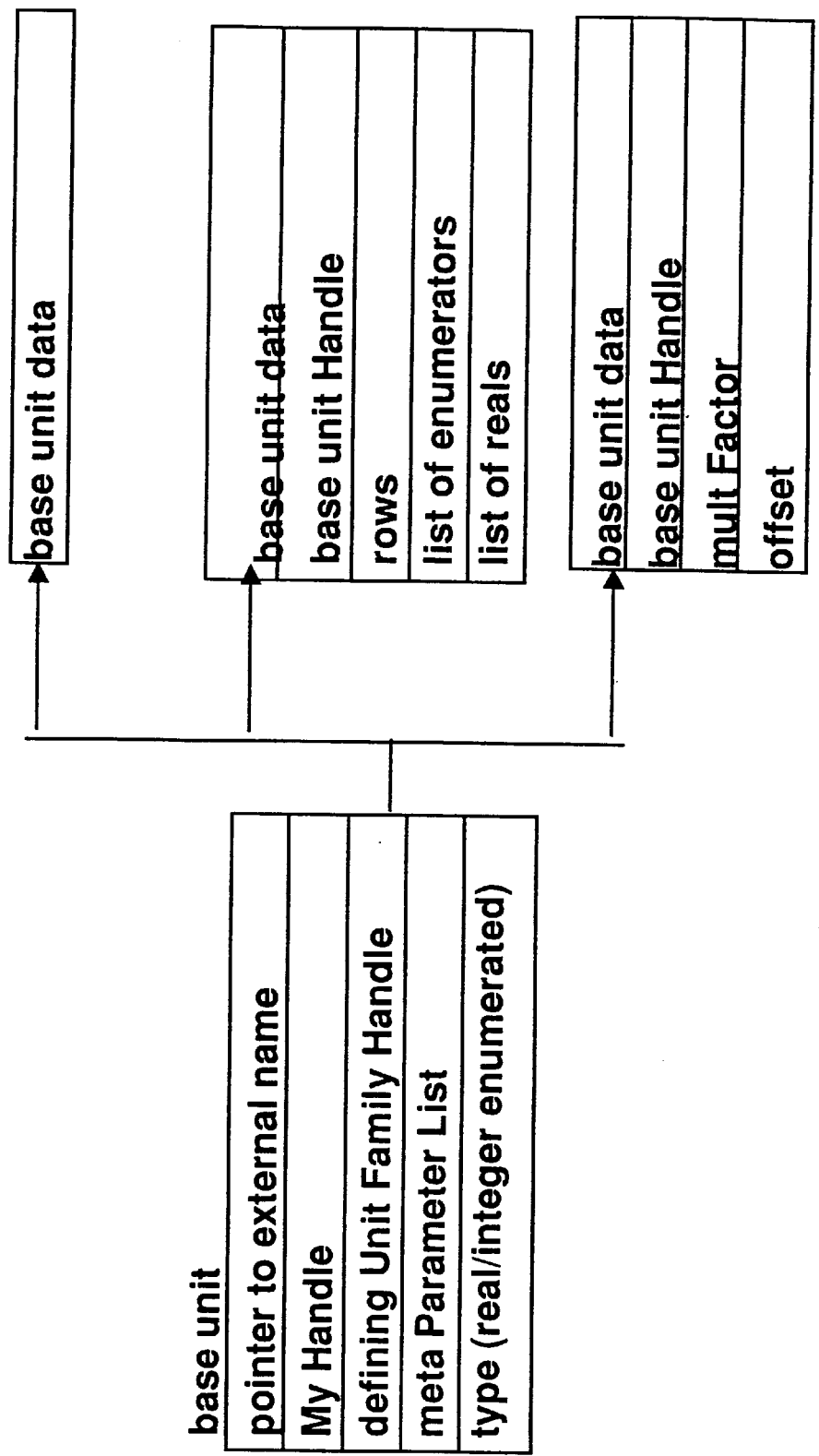
FIG. 46 depicts the data structure for units.

FIG. 46 depicts the data structure for units. A unit object 850 may comprise five data fields 851–855. The first field 851 is a pointer to the external name for the unit. The handle for the unit object 850 is stored in the second field 852. The third field 853 contains the handle for the defining unit family. The fourth field 854 is a metaparameter list. The last field 855 contains an indication of the type of unit (e.g., real, integer or enumerated table). These five fields 851–855 comprise the base unit data 856.

If the unit object 850 is a base unit, then no additional data is required. This is represented by item 862 in FIG. 46. If the unit object 850 is an enumerated derived unit 867, it will contain the base unit data 856, which includes fields 851–855. An enumerated derived unit 867 will also include a field 858 which provides the handle for the base unit. Another field 856 provides information on how many rows are present in the enumerated list. The field 860 provides the list of enumerators which typically comprises ASCII character strings. The field 861 provides a list of corresponding values for the list of enumerators in field 860.

If the unit object 850 is a real derived unit 866, it will include the base unit data 856 which comprises fields 851–855. In addition, it will include a field 863 in which is stored the handle for the base unit. A second additional field 864 will contain a multiplication factor used to derive the real derived unit 866. A third additional field 865 will provide an offset, if any, which must be added or subtracted to the base unit in order to derive the real derived unit 866. For example, if the base unit 850 is degrees centigrade, and the real derived unit 866 is degrees Fahrenheit, the multiplication factor 864 would be 9/5 and the offset 865 would be 32 degrees.

Figure 47:
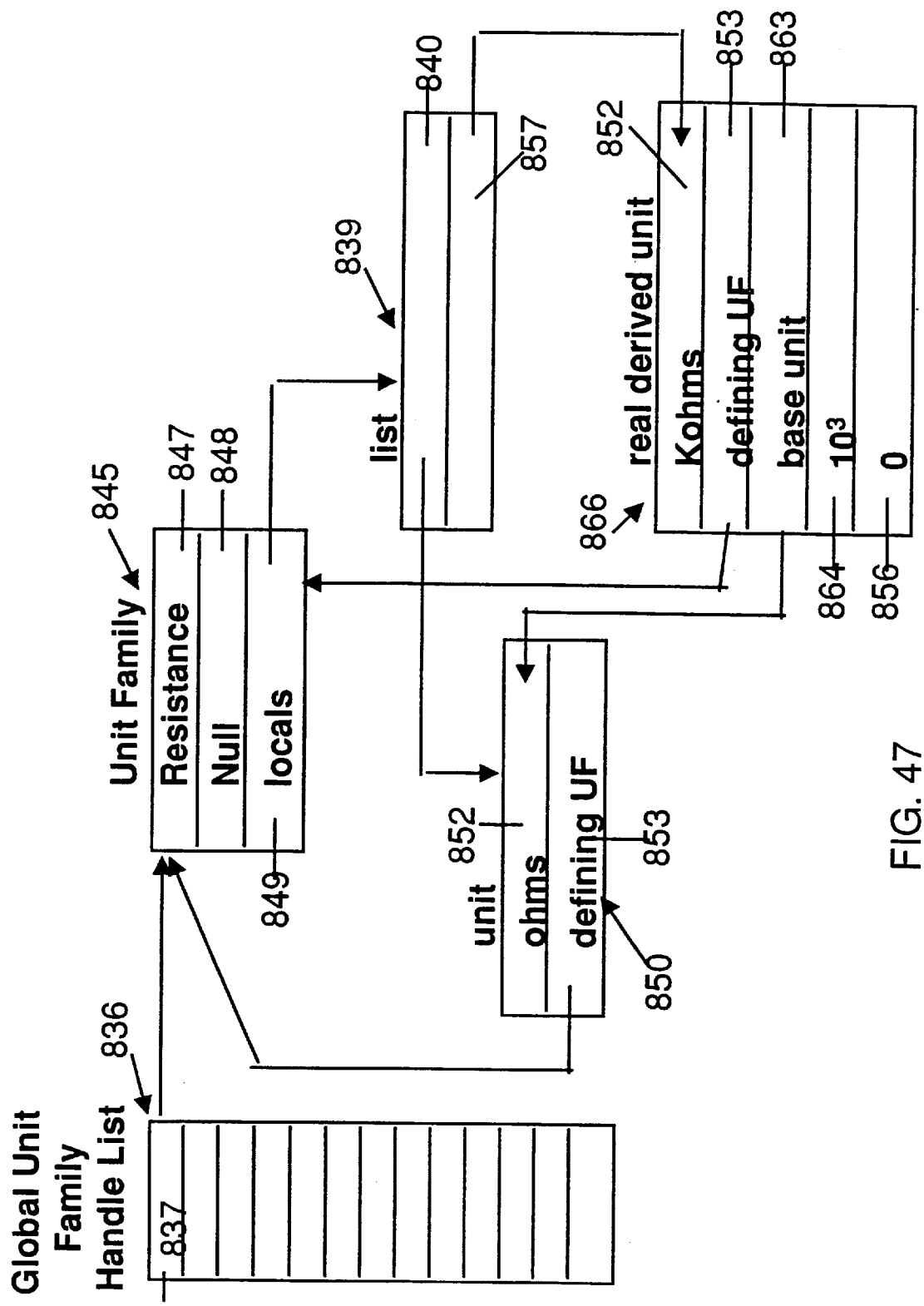
FIG. 47 depicts the data structures for a unit families.

FIG. 47 depicts the data structures for a unit families.

The dynamic class manager 134 maintains a single global unit family handle list 836. One element 837 in that list is the handle for unit family 845. For simplification, an arrow has been drawn directly from the handle 837 to the unit family 845. In actual practice, the handle 837 from the list 836 is provided to the handle manager 137, and the handle manager 137 provides the address in virtual memory for the unit family 845. It should be understood therefore that the handle manager 137 is involved in linking handles to the objects associated with the handles. With the understanding that such linkage to the handle manager 137 occurs in every instance where a handle is used to refer to an object, further reference to the handle manager 137 in this description may be omitted for purposes of simplification. In addition, data fields and or data members that are unnecessary for purposes of this description have been omitted from FIG. 47. In the example illustrated in FIG. 47, the list of included unit family handles 848 is empty. The actual list of local unit handles 839 is pointed to by list object 849 in the unit family object 845. By going to the list of local unit handles 839, the dynamic class manager 134 can lookup the desired unit object. For example, item 857 in the list 839 is a handle which refers to real derived unit 866. In this example, the unit family 845 is "resistance", and the real derived unit 866 is "kohms". The real derived unit 866 has the handle of the base unit stored in field 863. The handle stored in field 863 is used to lookup the base unit 850, whose name 852 in this instance is "ohms". The real derived unit object 866 contains a multiplication factor 864, which in this example is 1,000. The offset 865 is zero. Thus, the units manager 138 will use the multiplication factor 864 to convert the derived unit "kohms" 850 to the base unit "ohms" 866 by multiplying by 1,000.

The real derived unit object 866 contains a handle 853 for the defining unit family 845. The unit object 850 also contains a field 853 containing the handle for the unit family 845.

Figure 48:
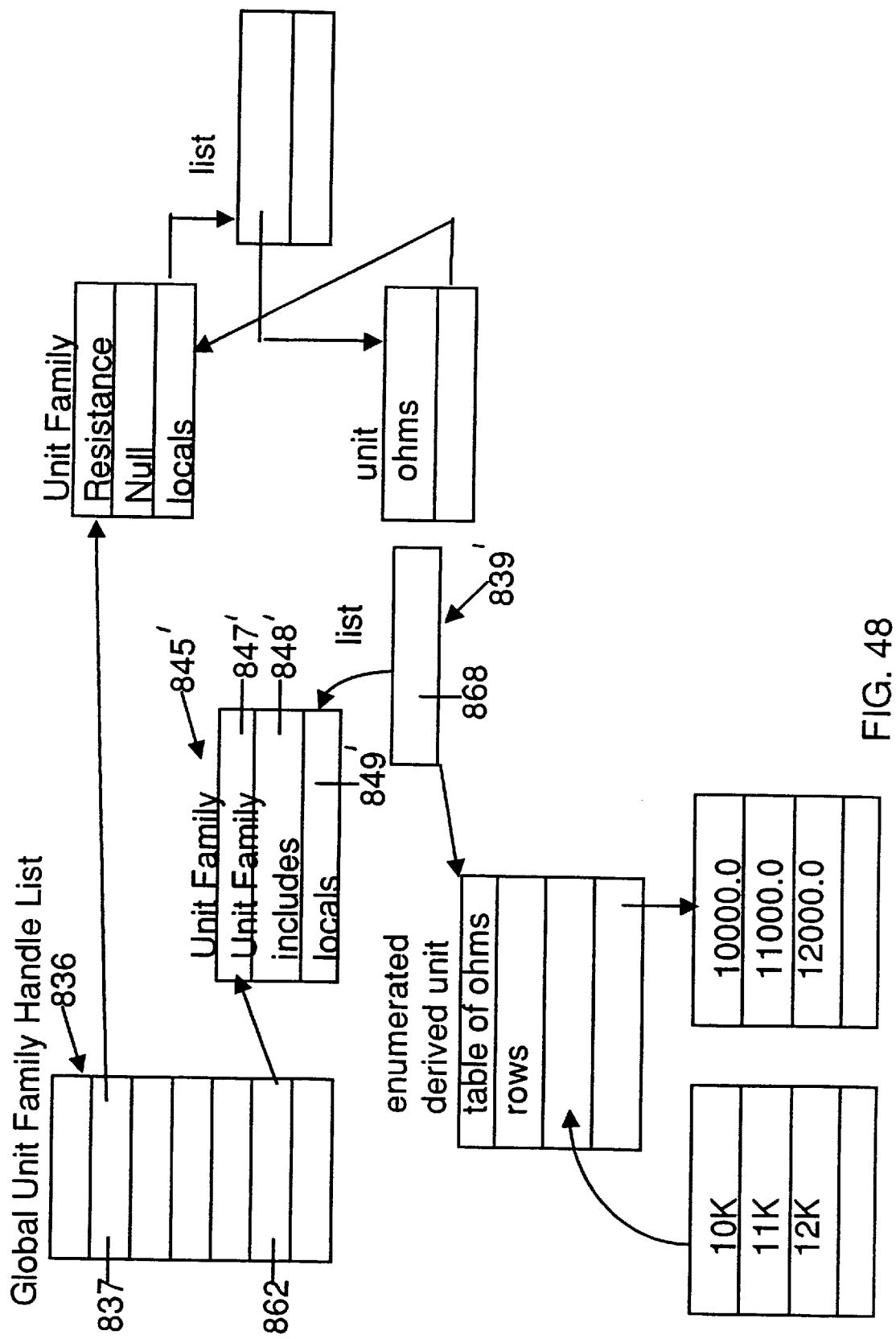
FIG. 48 shows the data structure for an enumerated derived unit.

FIG. 48 shows the data structure for an enumerated derived unit. A global unit family handle list 836 may contain an item 837 in the list which is the handle for unit family 845 as described with reference to FIG. 47. However, in this example, the global unit family handle list 836 also contains an item in the list 862 which is the handle for a second unit family 845'. The second until family 845' has a name 847'. The list of included unit handles 848' in this example has the handle for unit family 845. The unit family object 845', includes a data field 849' which points to a list of local unit handles 839'. The list 839' includes an item 868 in the list which is the handle for an enumerated derived unit object 867. In this example, the name of the enumerated derived unit object 867 is "table of ohms" 852. Field 859 contains information on the number of rows which are included in this enumerated derived unit object 867. Field 860 points to the list of enumerators 869 which lists the values that may be selected by the user from an enumerated list, in this example, "10k", "11k", "12k", etc. The list 869 contains strings of ASCII characters. In the enumerated derived unit object 867, the field 861 contains a pointer to the list of real numeric data values 870. There is a one to one correspondence between the items in the list 869 and the numeric values in the list 870. In the illustrated example, the list 870 contains the actual numeric values 10000; 11000; 12000; etc. Because these values represent ohms in this example, they correspond to "10k", "11k", "12k", etc., ohms. Of course, the enumerated derived unit object 867 contains a field 858 which has the handle for the base unit object 850, which in this case has the name 852 of "ohms".

FIG. 48 depicts the data structure that is used by the dynamic class manager 134 to provide information to the retriever 130 necessary to display a table of standard values window 273 as shown in FIG. 16. In FIG. 16, the plurality of standard values 275 comprise a display of the ASCII characters contained in list 869 shown in FIG. 48. When one of the values 275 is selected by the user, the units manager 138 provides the dynamic class manager 134 with the corresponding numeric value taken from list 870 shown in FIG. 48.

Figure 49:
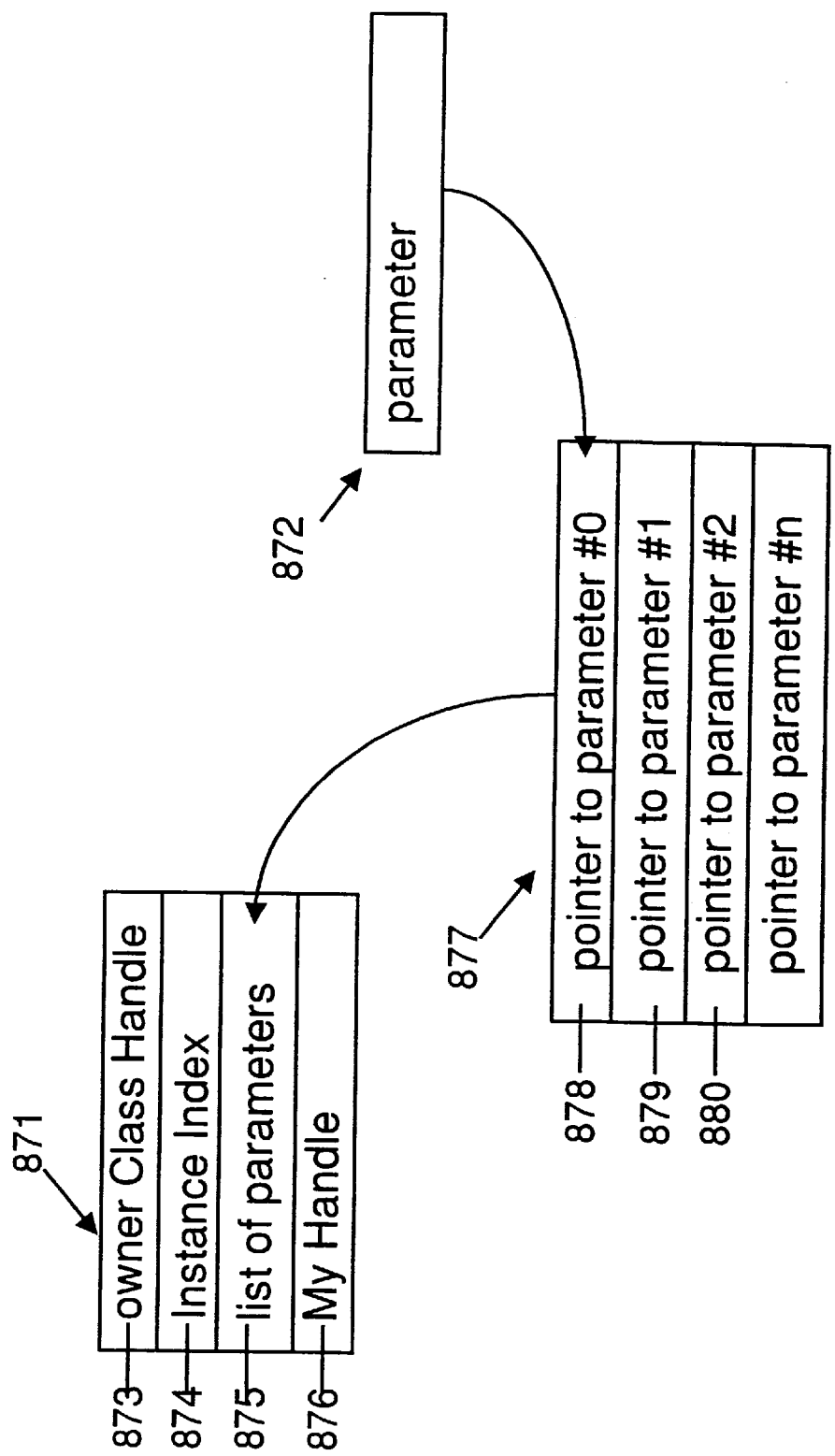
FIG. 49 depicts the data structure for an instance and associated parameters.

FIG. 49 depicts the data structure for an instance 871 and associated parameters 872. An instance object 871 may contain four fields 873–876. The first field 873 is the handle for the owner class of this instance. The second field 874 may give the ordinal location of this instance's handle in the instance list 804 of its owning class. The third field 875 is a list of parameters, which points to the values contained in 877. The fourth field 876 is the handle for the instance object 871. The list of parameters 877 contains a plurality of pointers to parameters for the various attributes associated with this instance object 871. In the example illustrated in FIG. 49, the list 877 contains three entries 878, 879 and 880. Additional elements of the list 877 have been omitted for clarity. The pointer 878 in list 877 points to information concerning the associated parameter 872. The data structure for the parameter 872 is illustrated in more detail in FIG. 50.

Figure 50:
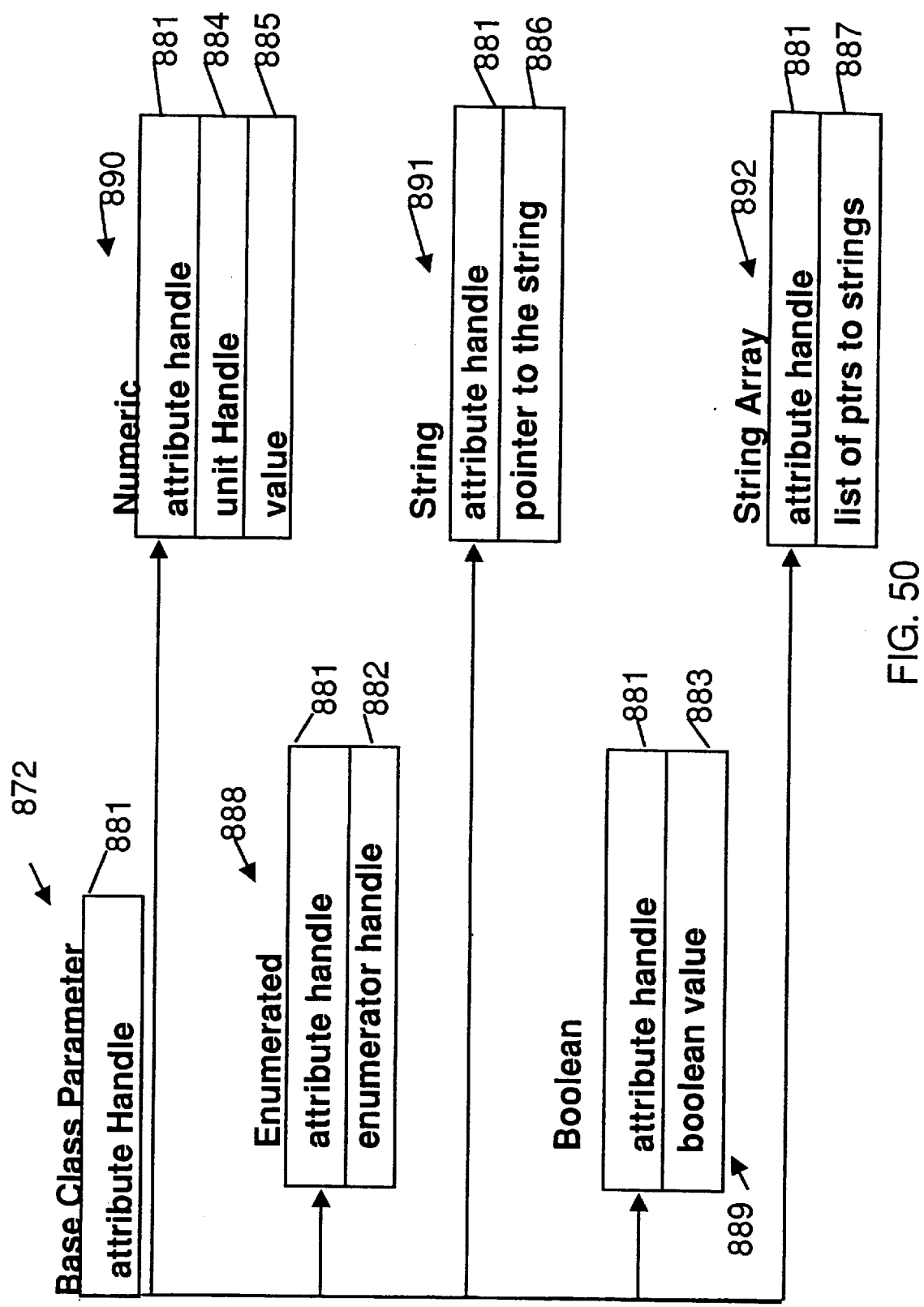
FIG. 50 depicts the data structure for a parameter.

FIG. 50 shows the data structure for five different types of parameters: enumerated, Boolean, numeric, string and string array. Each of the parameter objects 872 has an attribute handle 881. An enumerated object 888 has an attribute handle 881 and an enumerator handle 882. A Boolean object 889 has an attribute handle 881 and a Boolean value 883. A numeric parameter object 890 has an attribute handle 881, a unit handle 884 and a value 885. For example, if the numeric parameter is 10 ohms, the unit handle 884 would be the handle for the ohms unit, and the value 885 would be 10. A string parameter 891 contains a field for the attribute handle 881 and a pointer 886 to an ASCII character string. A string array parameter 892 contains an attribute handle 881 and a field 887 that points to a list of pointers to string arrays.

Figure 51:
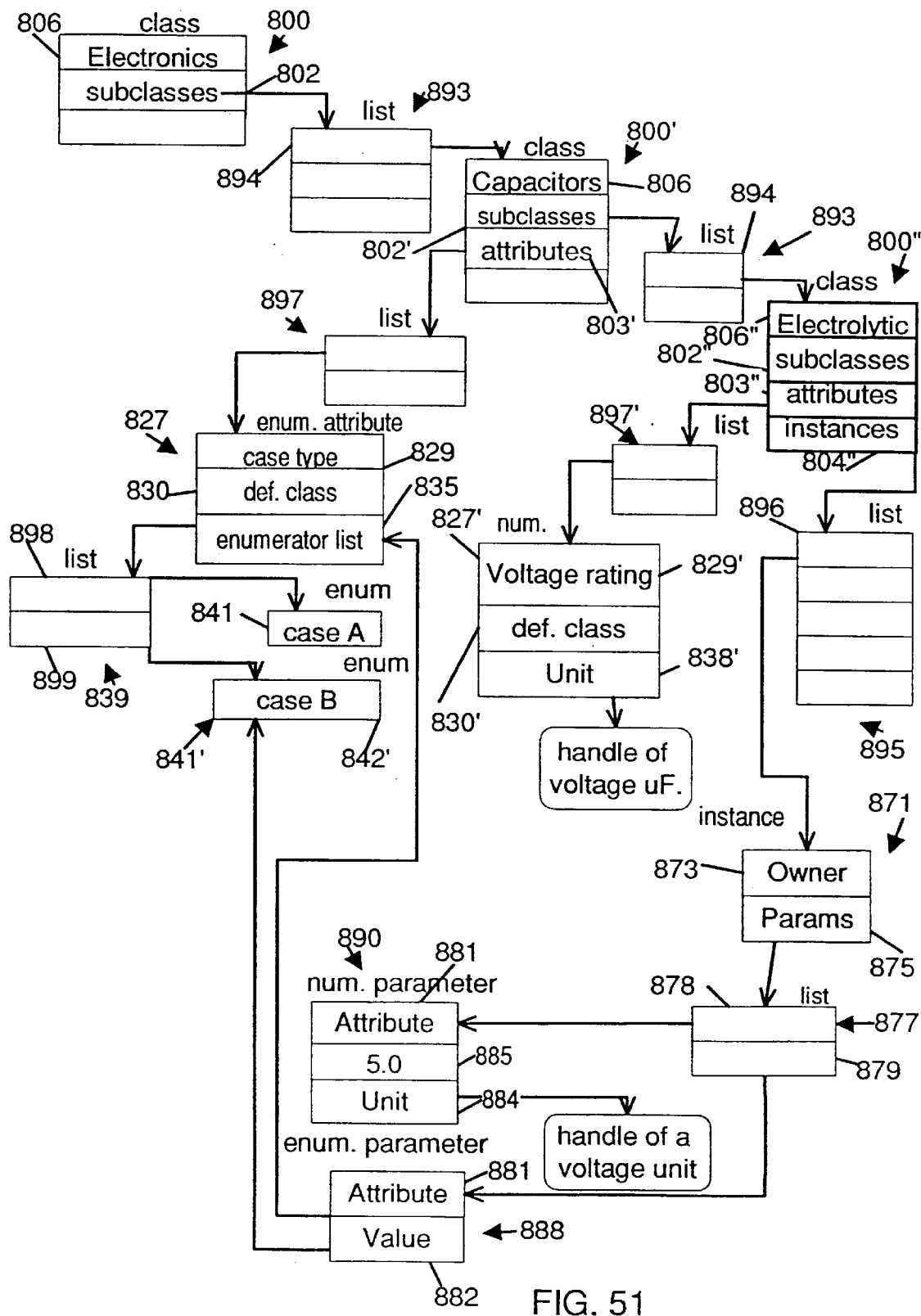
FIG. 51 is an example of a schema with instances.

FIG. 51 is an example of a schema with instances. The example has a class named "electronics", which has a subclass 800' named "capacitors". The capacitors subclass 800' has an attribute 827 called "case type". There are two possible types of cases in this example, which are referred to as "case A" and "case B". The subclass capacitors 800' has a subclass 800' named "electrolytic". The electrolytic subclass 800' has an attribute 827' called "voltage rating", and one instance 871' is provided that has parameters 890 and 888 of 5 volts and a type B case, respectively. Most objects and lists are shown incomplete in order to simplify the illustration, it being understood that like reference numerals refer to the same objects described in connection with FIGS. 41–50.

In FIG. 51, the class object 800 has a name 806, which in this case is "electronics". The class object 800 has a field 802 which points to a list of subclasses 893. The list 893 has a first entry 894 which is the handle for the subclass 800'. In this case, the name 806' of the subclass 800' is capacitors. Of course, all references to schema objects actually use handles (not shown in FIG. 51) and actually go through the handle manager 137 and handle table. This is not shown in FIG. 51 in order to simplify the diagram.

The subclass 800' capacitor has a field 802' which points to a list of subclasses 893'. The list 893' has an entry 894' which is the handle for subclass 800". The name 806" for subclass 800" is electrolytic. The subclass 800" has a null entry in the field 802" which would normally contain a pointer to a list of subclasses, if any. In this example, the subclass 800" does not have any subclasses.

Returning to the capacitors subclass 800", field 803 contains a pointer to a list of attributes 897. The list 897 contains the handle for the enumerated attribute 827 called "case type". Field 830 of the enumerated attribute object 827 contains the handle of the defining class 800' called capacitors. The enumerated attribute object 827 contains a pointer 835 which points to a list 839 of handles for enumerators. In this example, the list 839 contains a handle 898 for the enumerator 841. The enumerator 841 contains a pointer 842 to the external name for this enumerator, which may be an ASCII string for "case A". Similarly, item 899 in the list 839 points to enumerator 841' associated with case B.

Returning now to subclass 800" named electrolytic, the pointer 803" points to a list 897' of attributes, and one of the fields in the list 897' contains the handle for numeric attribute 827' which is "voltage rating". The numeric attribute 827' contains a field 830' which contains the handle of the defining class which in this example is the class 800" named electrolytic. The numeric attribute object 827' also contains a field 838' which contains the handle of the voltage unit family (not shown).

Returning to the electrolytic class 800", a field 804" contains a pointer to a list 895 of handles of instances. Item 896 in the list 895 contains the handle associated with instance 871. Instance 871 contains a field 873 which contains the handle of the owning class, which in this case is the electrolytic class 800". The instance data object 871 also contains a field 875 which points to a list of parameters 877. The list 877 contains a pointer 878 which points to the numeric parameter 890. The numeric parameter 890 contains a field 881 which contains the handle of the attribute 827' (voltage rating). The numeric parameter object 890 also contains a field 884 which has the handle of the units, which in this case is "volts". For simplicity, the unit object is not shown. The numeric parameter object 890 contains a field 885 which contains the value 5.0. In this instance, the electrolytic capacitor is rated at 5.0 volts.

The parameter list 877 contains a pointer 879 which points to the enumerated parameter 888. The enumerated parameter object 888 contains a field 881' which contains the handle of the attribute, which in this instance is case type. The enumerated parameter object 888 also contains a field 882 which is the handle for the enumerator 841". In this example, the electrolytic capacitor rated at 5.0 volts has a type case B.

The data structure described herein has significant advantages. Referring to FIG. 51, it is easy to change a name or description in this data structure. Consider an example where the database may contain 1,000 instances of capacitors with a type B case. If the type B case is discontinued, or the name changed to "reenforced", the only change that would need to be made would be to replace a single ASCII string representing the name for that case type. All 1,000 instances in the database simply contain a handle that the handle manager 137 associates with that ASCII text string. No other changes need to be made in the database.

Another advantage of the data structure in accordance with the present invention is that if a primary value is undefined, nothing is stored. Thus there is no wasted space.

Another advantage of the database structure is that algorithms do not have to be changed based upon location in the tree structure. All algorithms work the same regardless of location in the tree structure. The only special case is the root class. For example, the algorithm for adding an instance to the database is the same no matter where in the tree structure you are located. This makes dynamic changes to the schema very easy. A class or an entire branch of the tree structure can be moved from one location to another simply by changing lists of handles. It is not necessary to run a convert program. Everything is self contained. A class object 800 contains the handle of its parent 801 and thus knows who it's parent is. The class object 800 also contains a pointer 802 to a list of its subclasses, so it knows who its children are.

In the present database structure, it is possible to delete instances quickly. An instance can be deleted by taking the last item in the list of instances 804 and moving it to the position of the instance being deleted. In other words, the handle of the last instance would be written over the handle of the instance being deleted, and the number of items in the list would be decremented by one. The instance index field 874 for an instance object 871 may be used to facilitate fast deletions.

In a preferred embodiment, the value of parameters are always stored in base units. The objects in fields described do not necessarily occupy a word of memory. In a preferred embodiment, all parameters of a particular type are stored contiguously. This improves the speed of searches. For example, the case type 841' described with reference to FIG. 51 would be stored contiguously with all the other parameters for case type. The numeric parameter of 5.0 volts would be stored in a different physical location in memory contiguous with other numeric volt parameters.

As described above, providing a class object structure 800 with a field 808 providing the subtree instance count for that class allows the system to virtually instantly display a parts count 172 to provide the user instantaneous feedback during the tree traversal steps of the users search. The process of finding a part essentially amounts to discarding the thousands of parts that do not have the attributes desired and narrowing the search down to a small number that do. This is accomplished by navigating to the correct class from the root of the classification hierarchy. During this phase, the parts found indication 172 can be updated using the data structure field 808 indicating the subtree instance count. This provides significant response time advantages compared to actually counting the available instances at each step. The user has immediate feedback indicating the number of parts available in the selected tree. The combination of providing an object oriented hierarchical tree structure together with search criteria based upon any desired combination of attributes, while providing instantaneous feedback on the number of instances corresponding to the current search criteria and class provides significant advantages over data base management schemes that have been attempted in the past.

An important function of the dynamic class manager 134 is the ability to modify the database structure during operation. The database structure is known as the schema. The schema of the object oriented database is structured using classes. The classes contain attributes. The attributes may contain enumerators, and unit families. The ability to add, move and delete these items is important to the dynamic operation of the database.

Figure 65:
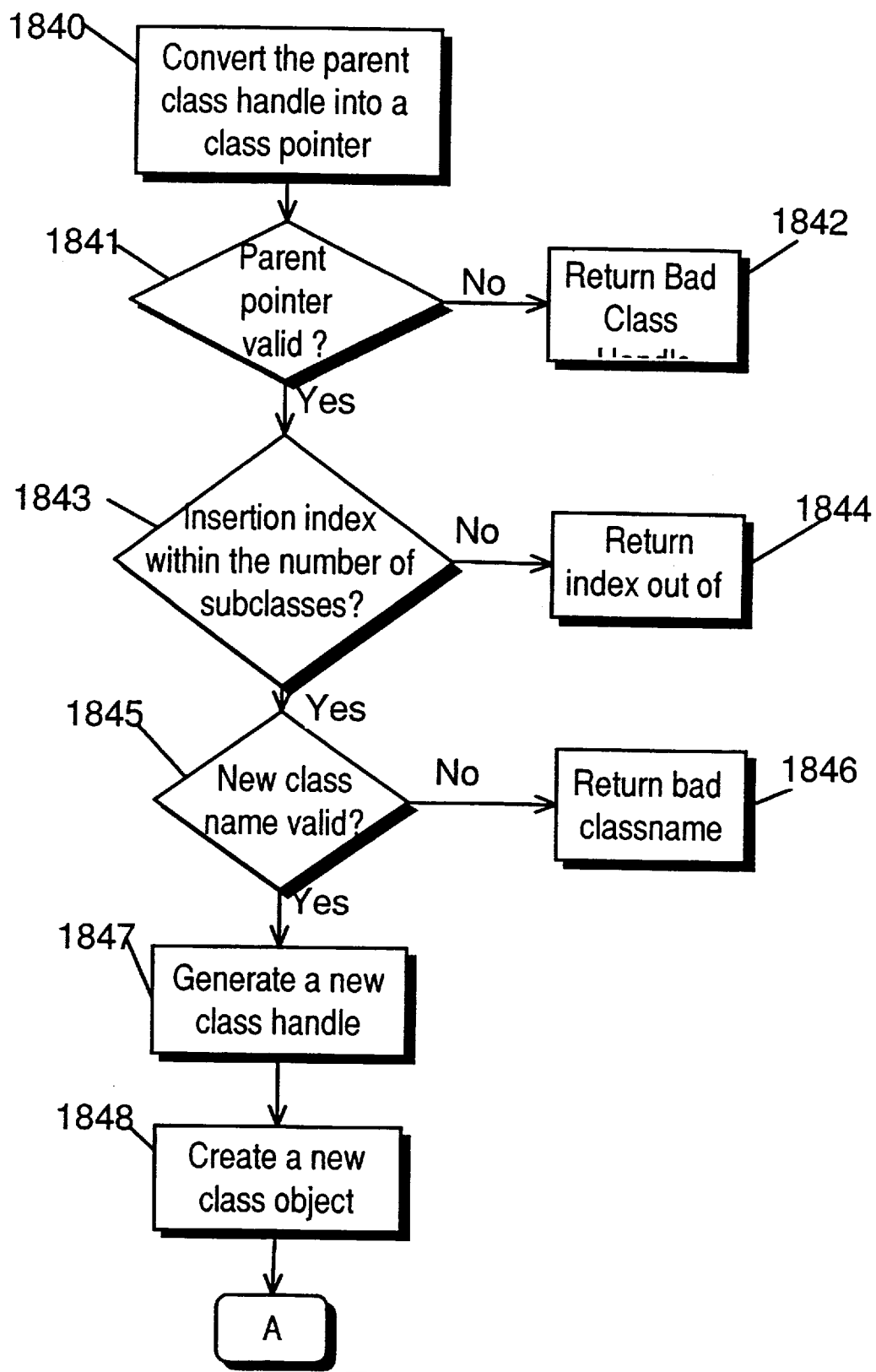
FIG. 65 is a flow chart depicting how to add a class to the schema.
Figure 66:
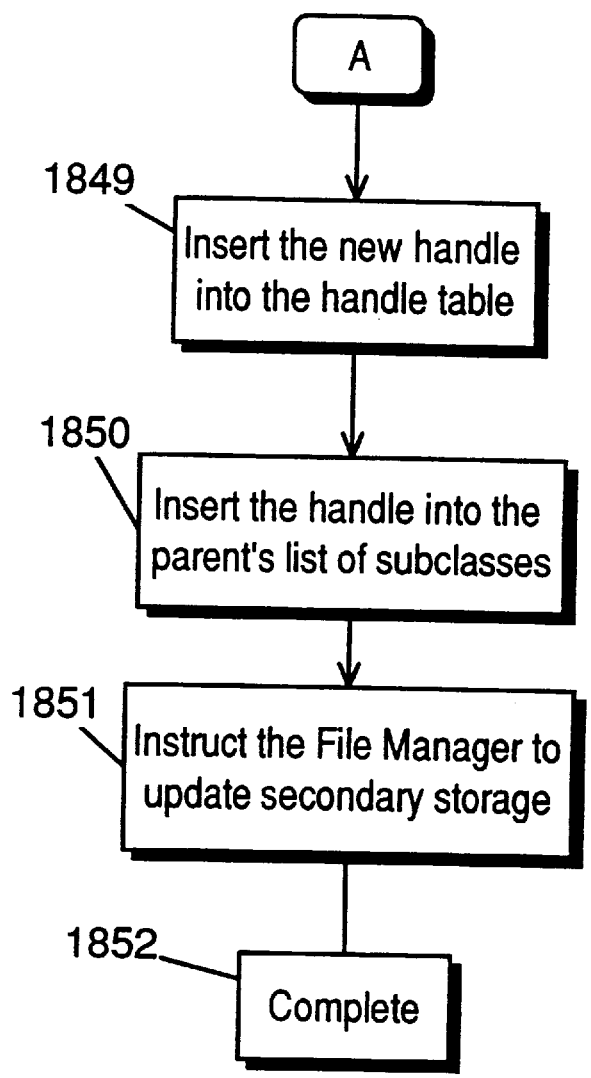
FIG. 66 is a continuation of the flow chart in FIG. 65.

To add a class to the schema, three items must be known: the class name, the parent of the new class, and the location within the list of subclasses to insert the new class. FIG. 65 illustrates this operation. The first step 1840 converts the handle of the parent class into an actual class pointer. The parent pointer must be immediately tested in step 1841 prior to its use. If the pointer proves to be invalid, then the operation terminates at step 1842. If the pointer is valid, the insertion index is tested in step 1843. If it proves to be invalid, the operation is terminated in step 1844. Finally, the name of the class must be tested in step 1845 to determine if it fits the guidelines of valid class names. If the class name fails, then the operation terminates in step 1846. When step 1845 accepts the class name, the new class can be created. A new handle is created in step 1847 first, and then the new class is created in internal memory in step 1848. The new handle is inserted into the table of class handles in step 1849 of FIG. 66, followed by the handle being added to the parents list of subclass handles in step 1850. The last operation is to cause the file manager 140 to add the new class to the indicated parent on the secondary storage device 103.

Figure 67:
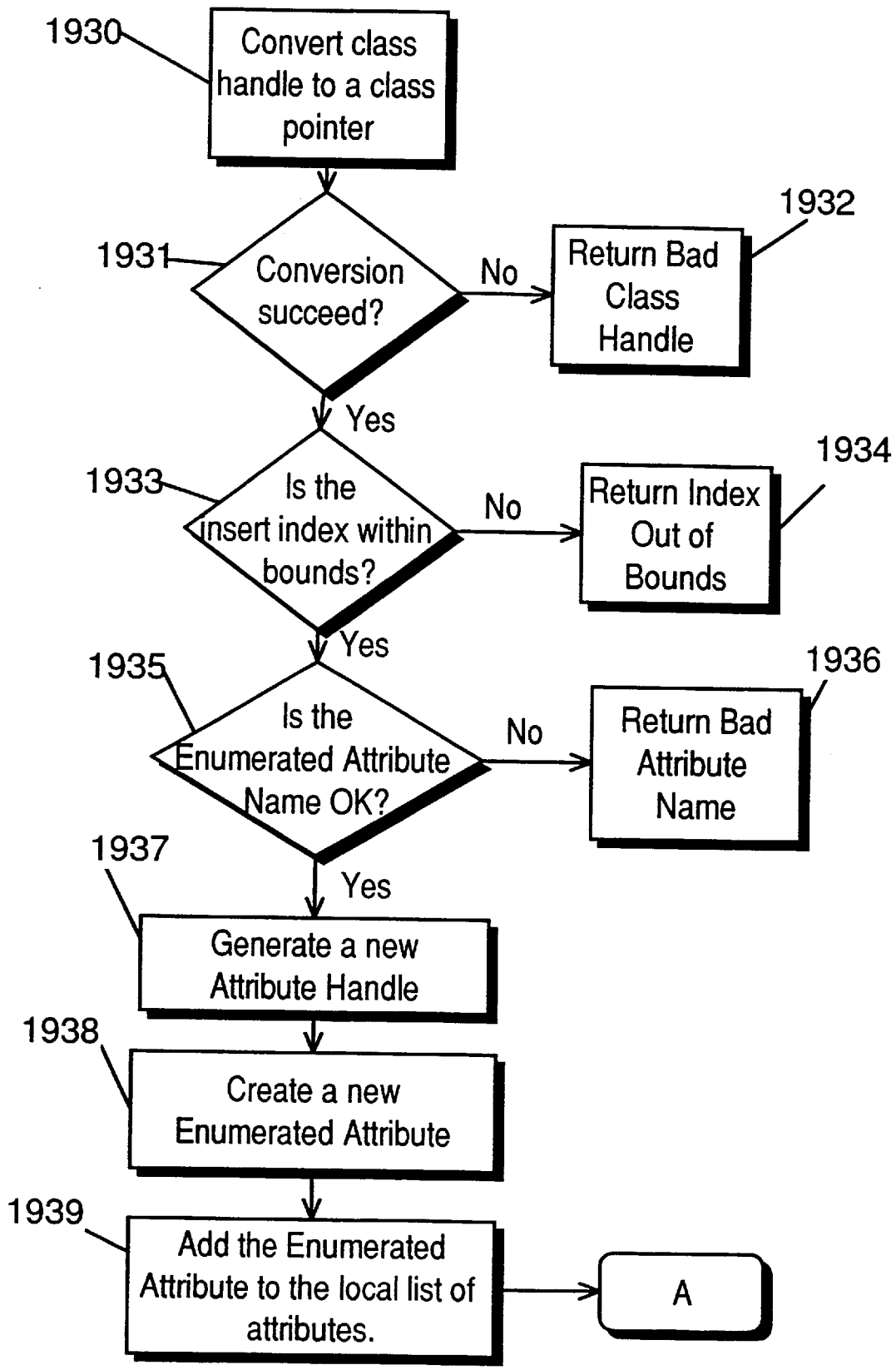
FIG. 67 is a flow chart depicting the addition of enumerated attributes.
Figure 68:
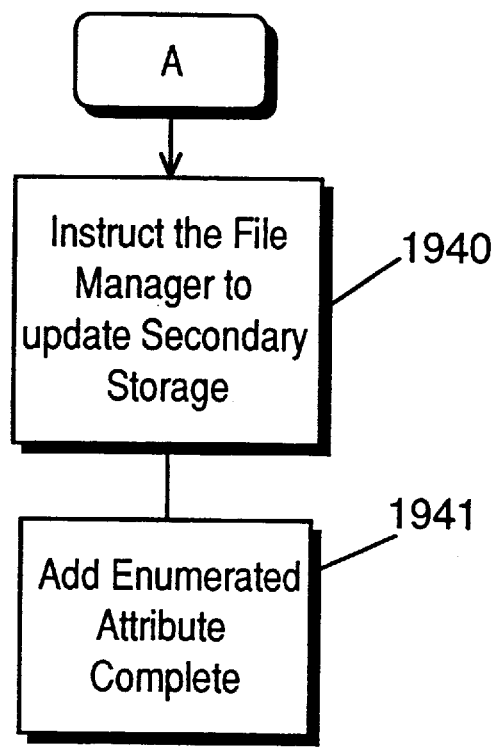
FIG. 68 is a continuation of the flow chart in FIG. 67.

To add an attribute to a class, three items must be known: the class handle of the owning class, the location in which to insert the new attribute, and the name of the attribute. FIG. 67 illustrates the adding of attributes. The first step 1930 is to convert the class handle into a class pointer, followed by the testing of that class pointer in 1931 to determine if it is a valid class pointer. If not, the procedure terminates in 1932. If the class pointer is determined to be valid, then the insertion index is validated in 1933. If the index fails the validation test, then the procedure terminates in 1934. If the validation of the index succeeds, then the operation continues in 1935 where the name of the attribute is tested. If the attribute name fails, then the operation terminates in 1936. If the name of an enumerated attribute is accepted in 1935, then the attribute can be created. Step 1937 creates a new handle for the attribute. Then the new attribute is created in step 1938. The new attribute handle is then added to the list of attributes local to the owning class in 1939. The last step is 1940 of FIG. 68 to cause the file manager 140 to update secondary storage 103 with the new attribute. The operation is complete in step 1941.

Figure 69:
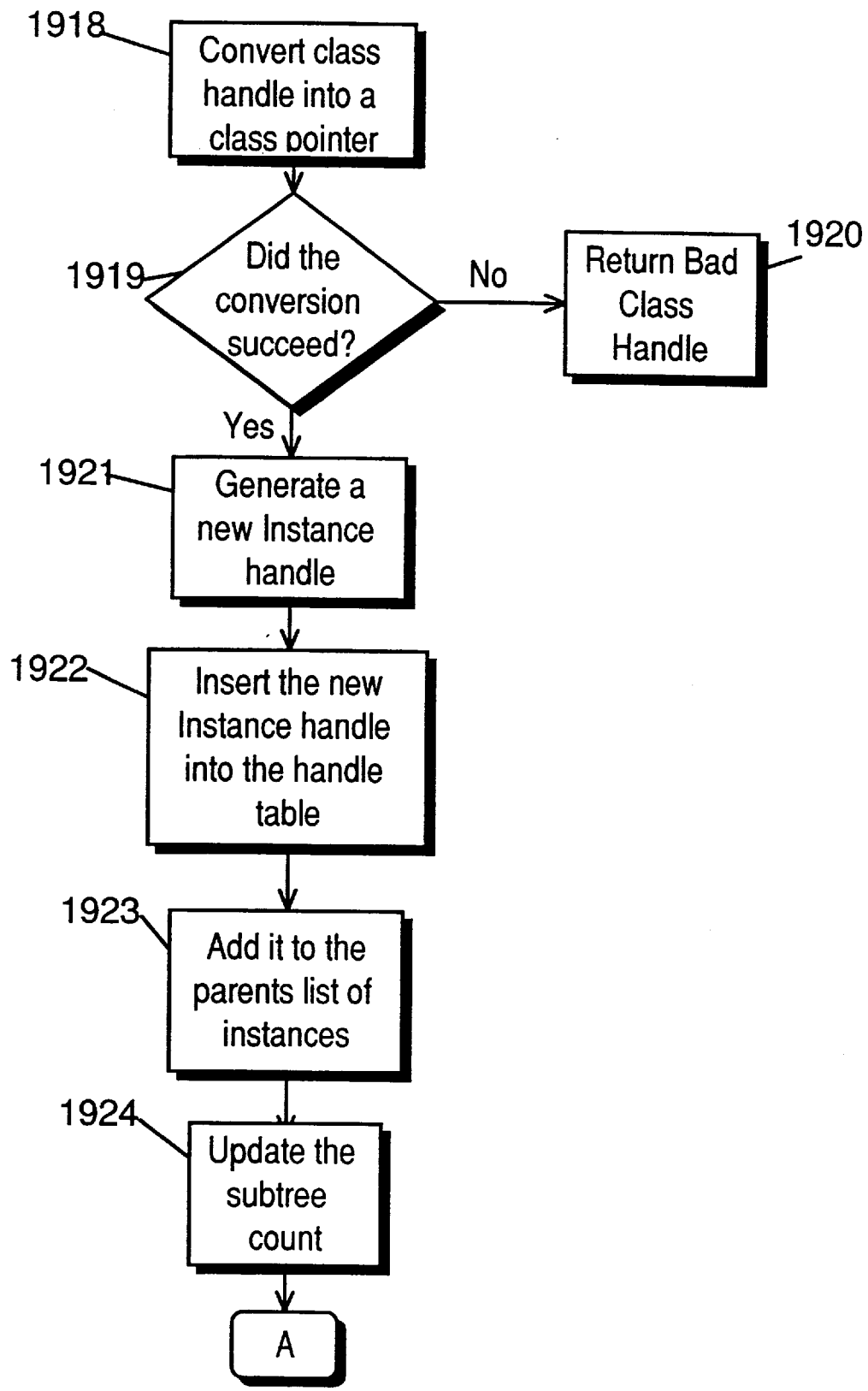
FIG. 69 is a flow chart depicting the addition of an instance.
Figure 70:
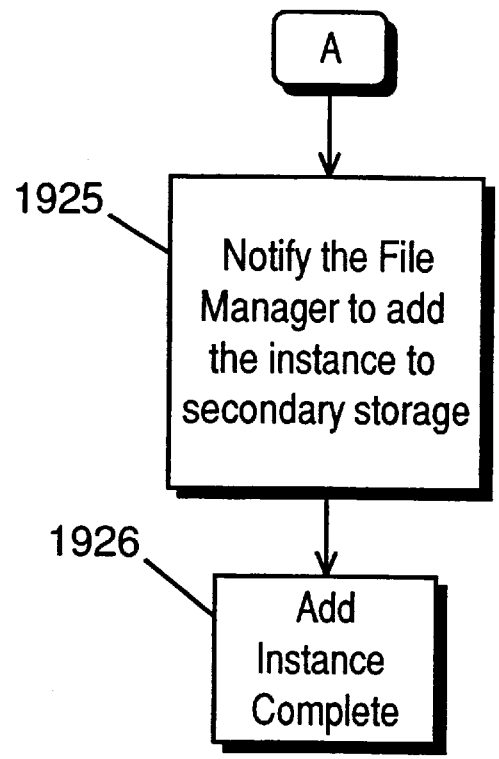
FIG. 70 is a continuation of the flow chart in FIG. 69.

The addition of an instance is shown in FIG. 69. Adding an instance requires a class handle. The class handle must be converted into a class pointer in 1918. The class pointer is tested in 1919 to determine if it is a valid class pointer. If it is not valid, then the procedure terminates in 1920. If the class pointer is determined to be valid, then the procedure continues in 1921 with the generation of a new instance handle and a new instance object. The handle for the new instance is inserted into the handle table in 1922. The instance is added to the parents list of instances in 1923. The subtree instance count is incremented to reflect the presence of the new instance in 1924. The instance has now been created in memory, and needs to be added to secondary storage 103, which is done in step 1925 of FIG. 70. The procedure is complete in step 1926.

Figure 71:
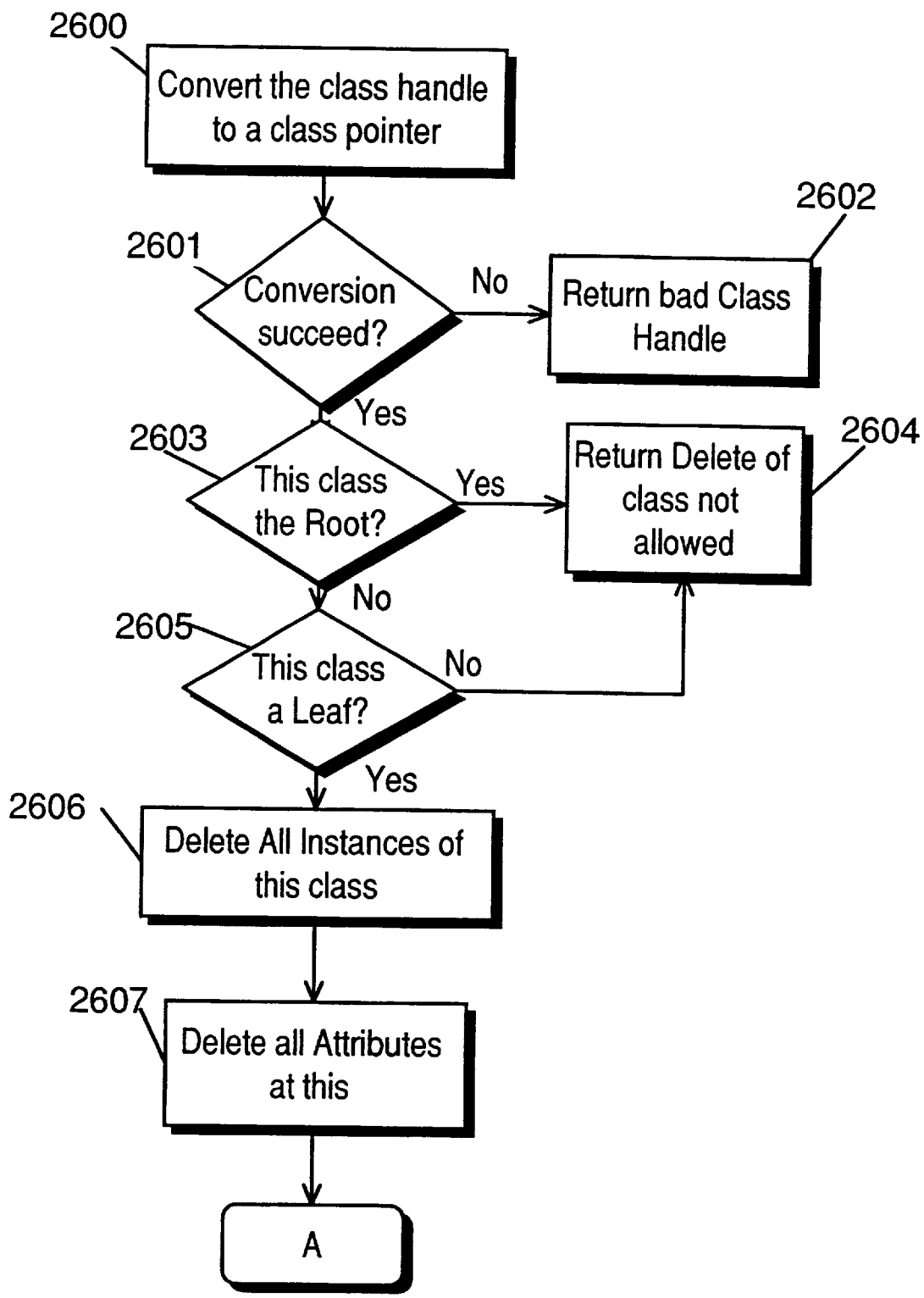
FIG. 71 is a flow chart depicting the deletion of a class.
Figure 72:
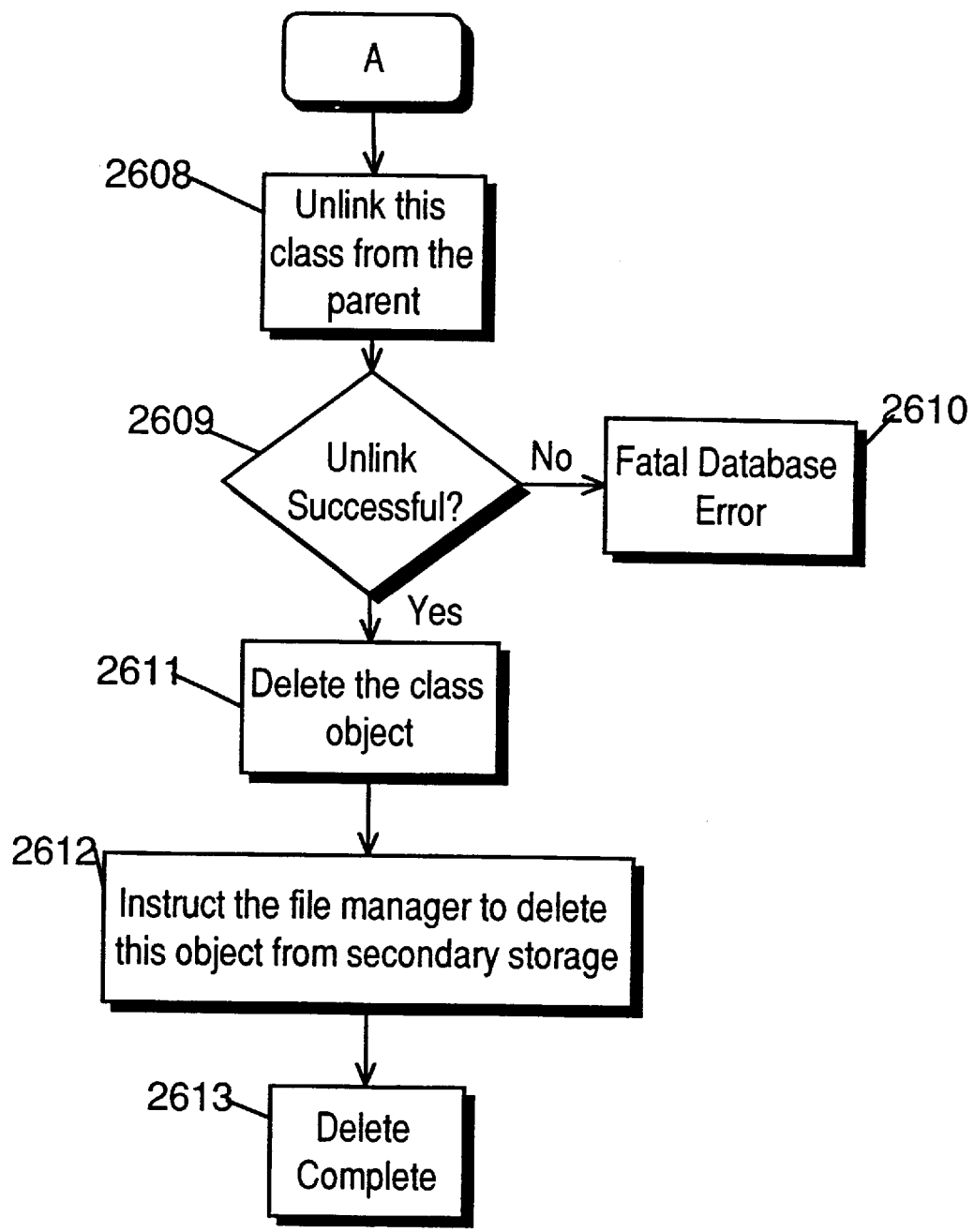
FIG. 72 is a continuation of the flow chart in FIG. 71.

The deletion of a class is shown in FIG. 71. To remove a class from the database structure, the current class handle must be identified. The class handle is first decoded into a class pointer in step 2600. The class pointer is then checked to determine if it is a valid class pointer in 2601. If the class pointer is invalid, the procedure is terminated in 2602. If the class pointer is valid, then it is checked to determine if it is the root class in 2603. If the class pointer represents the root class, then the procedure terminates in 2604, because the root class cannot be deleted. If the class pointer does not represent the root class, it is checked to determine if the class represents a leaf class in 2605. If the class pointer does not represent a leaf class, the procedure terminates in 2604. If the class pointer is found to point to a leaf class, then operation continues in 2906 where all of the instances of this class are deleted. The process of deleting instances is described below with reference to FIG. 75. In step 2607 all of the attributes which are local to the class being deleted are deleted. In FIG. 72 The class is then unlinked from its parent class in step 2608. The system checks to determine if the unlink was successful, and that the data structures which contain the class list are intact in 2609. If the unlink failed, then operation stops in 2610. If the unlink succeeded, then operation continues in 2611 where the class object is actually deleted. In step 2612, the file manager 140 is instructed to remove the class object from secondary storage 103, and the operation completes in step 2613.

Figure 73:
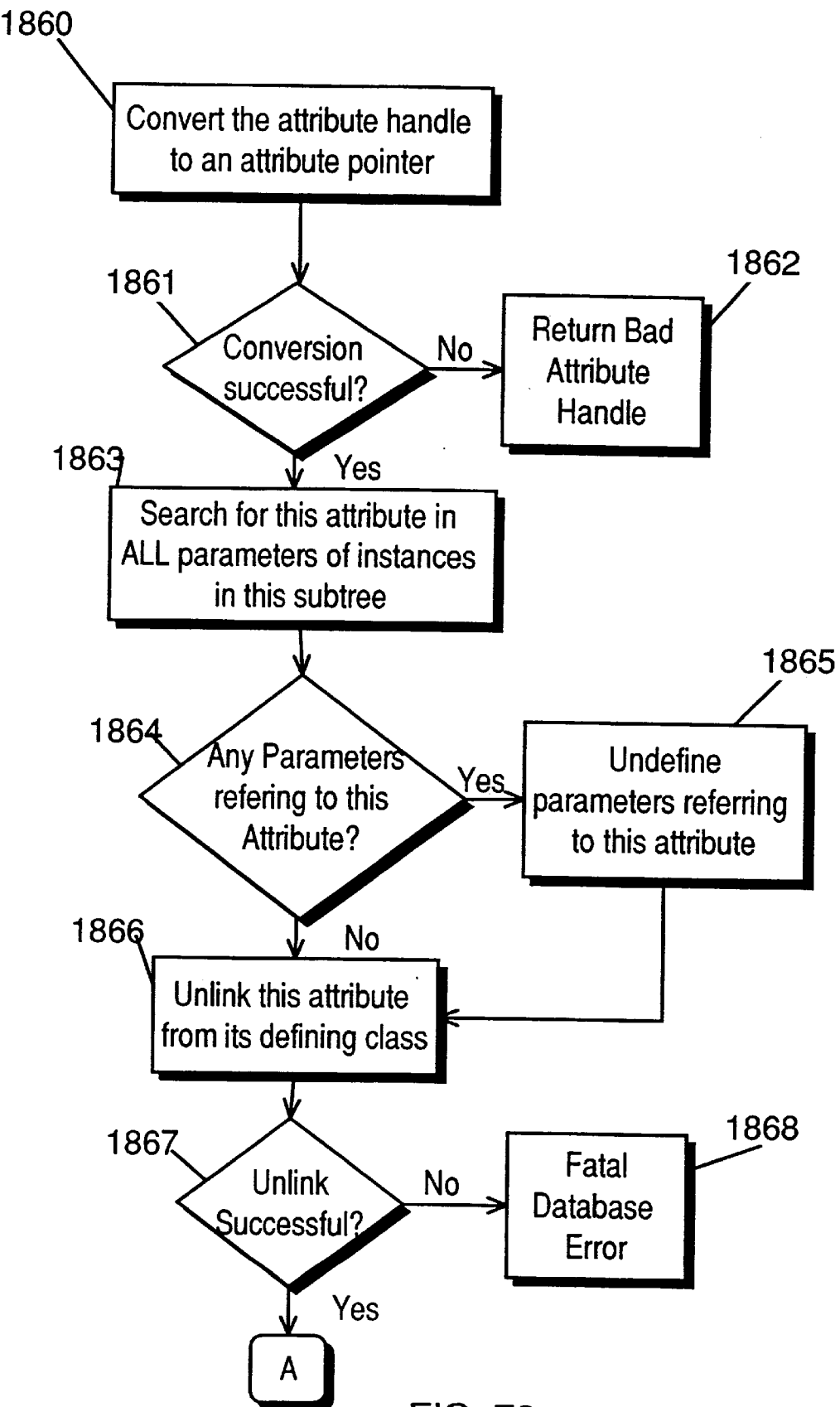
FIG. 73 is a flow chart depicting the deletion of an attribute.
Figure 74:
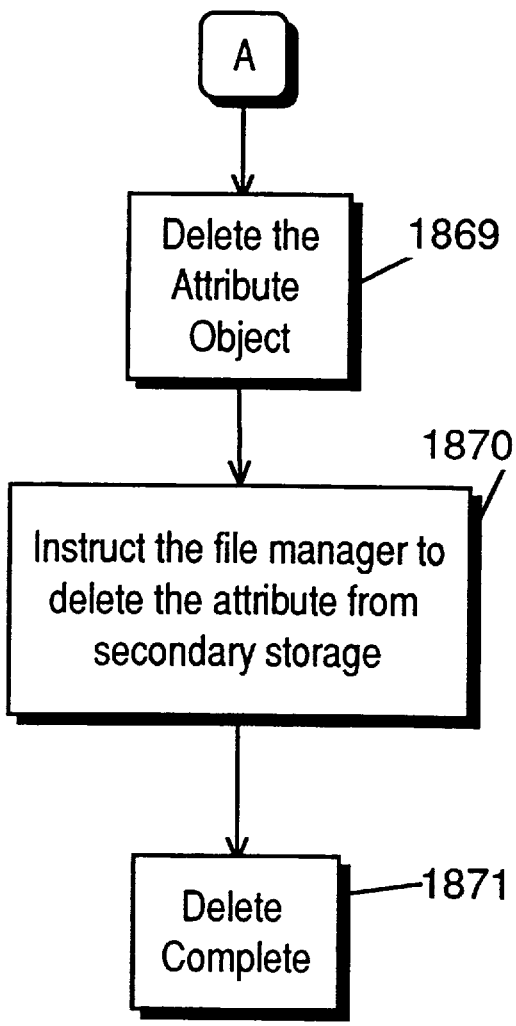
FIG. 74 is a continuation of the flow chart in FIG. 73.

The deletion of an attribute is shown in FIG. 73. To remove an attribute, the attribute handle must be decoded into an attribute pointer in step 1860. Step 1861 checks to see if the attribute pointer obtained from step 1860 is valid. If the attribute pointer is invalid, the procedure stops in 1862. If the attribute pointer is valid, the procedure continues in step 1863 by searching the entire subtree for all of the parameters in all of the subtree instances that are derived from this attribute. After searching, in step 1864 the system determines how many parameters were derived from this attribute. If there were parameters derived from this attribute, the operation proceeds to 1865, where the parameters are undefined. If there were no parameters derived from this attribute, then the procedure continues to step 1866. Likewise, after the parameters have been undefined in 1865, the operation continues to 1866. In step 1866, the attribute is unlinked from the defining class. In 1867 the procedure checks to determine if the unlink operation succeeded. If the unlink failed, then the procedure stops at 1868. If the unlink was successful, then the attribute object is deleted in 1869 in FIG. 74. The file manager 140 is then instructed to remove the attribute from secondary storage 103 in step 1870. The operation is complete in step 1871.

Figure 75:
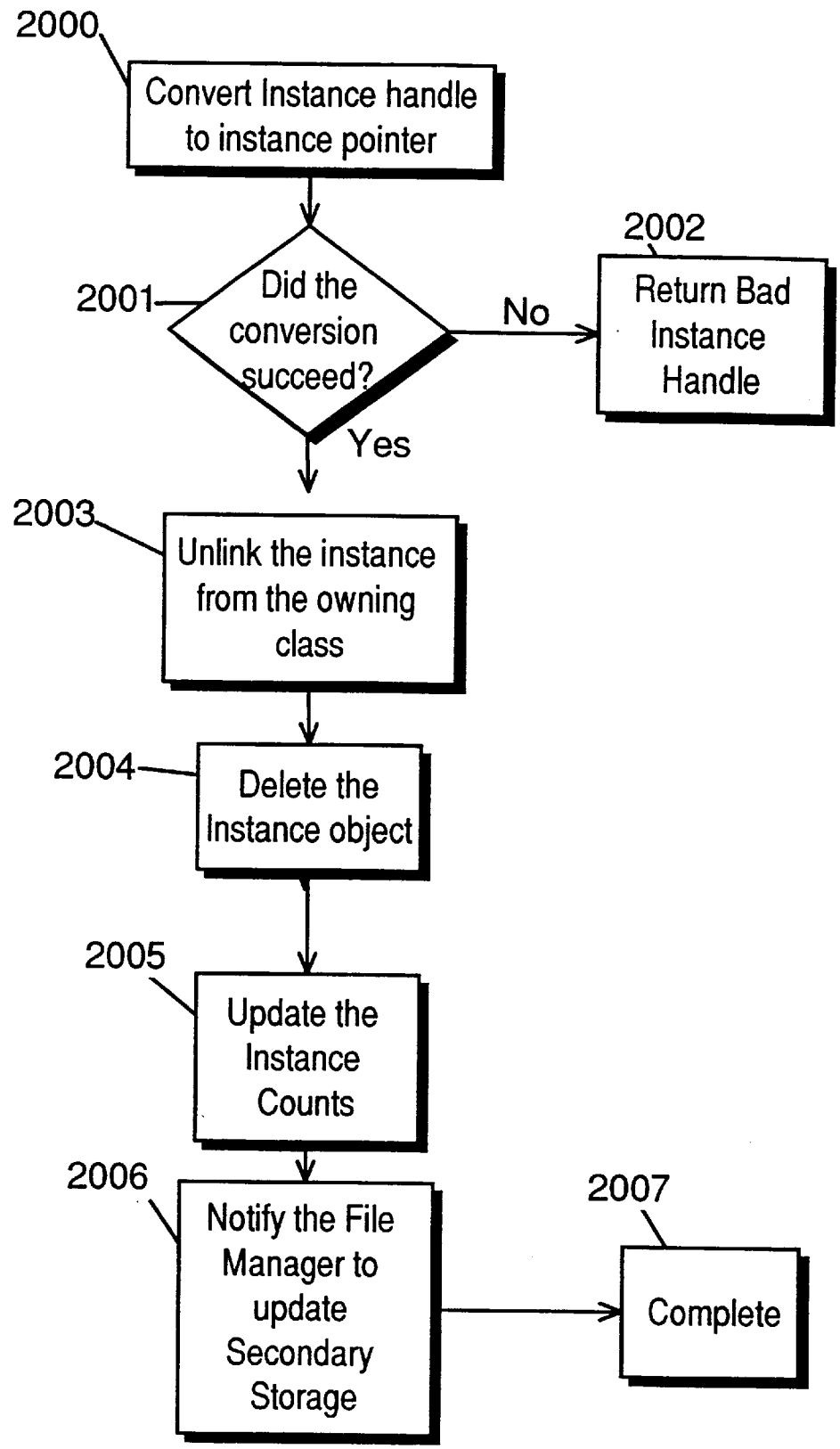
FIG. 75 is a flow chart depicting the deletion of an instance.

The deletion of an instance is shown in FIG. 75. An instance is deleted from the database by first converting the instance handle in step 2000 to an instance pointer. The instance pointer is checked to determine that it is indeed a valid instance pointer in 2001. If the instance pointer is invalid then the operation terminates in 2002. If the instance pointer is valid, then the instance is unlinked from its owning class in 2003. The instance object is itself deleted in 2004. The subtree instance counts is then decremented to indicate that one instance has been deleted from the subtree in 2005. The file manager 140 is then instructed to update the secondary storage 103 to reflect the deletion of the instance in 2006. The operation is complete in step 2007.

Figure 76:
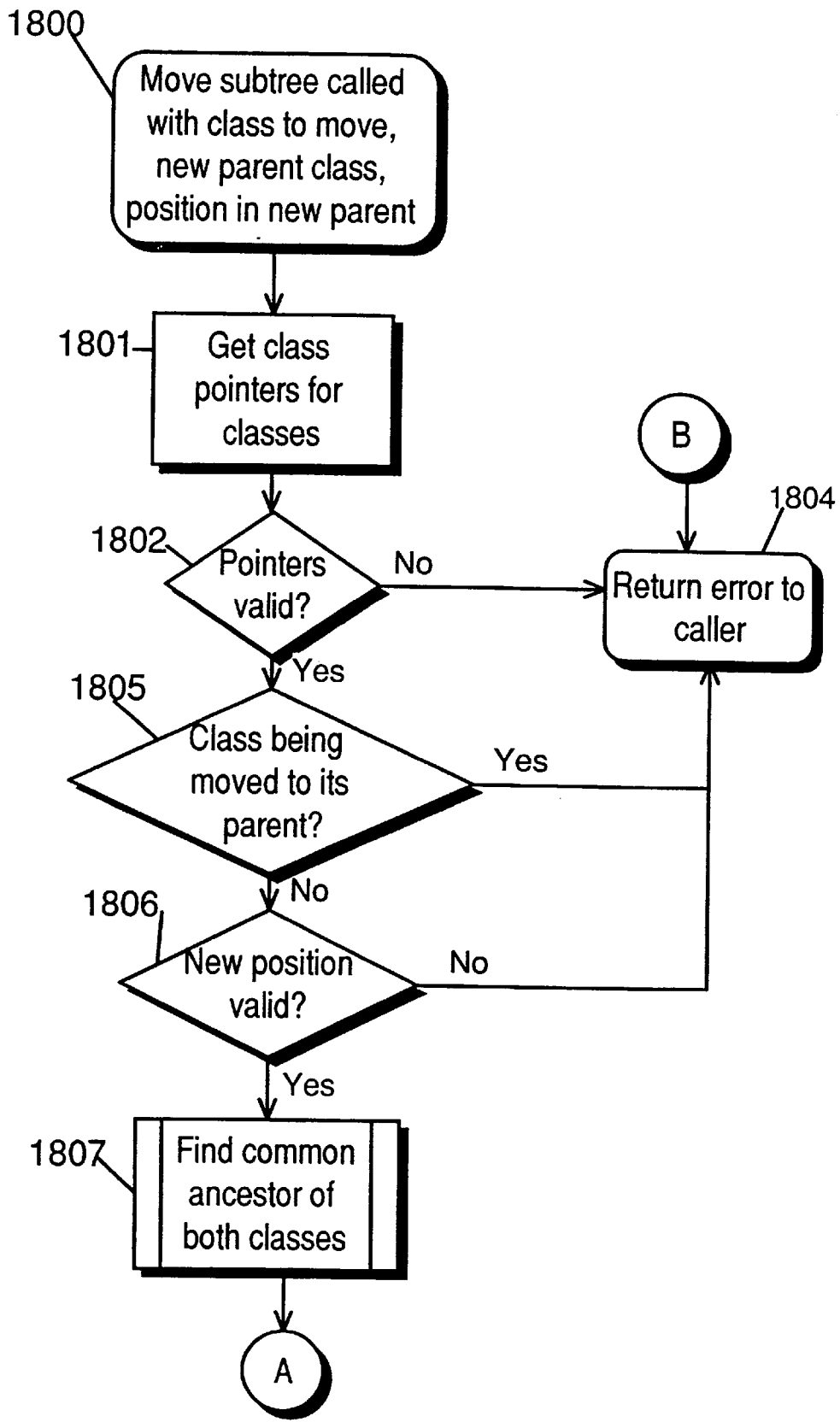
FIG. 76 is a flow chart depicting the steps involved in moving a subtree.

In FIG. 76, moving a subtree to a new position in the class hierarchy is described. In step 1800, the move subtree procedure is called with a class to move, the destination parent class, and the position among its sibling classes at the destination specified. In step 1801, the class pointers for the class to be moved and the destination parent class are obtained. If the test for all valid pointers in step 1802 fails, step 1804 returns an error, else test 1805 is made to prevent the class from being trivially moved to its own parent. Step 1806 insures that the position among the subclasses of the destination parent class is within a valid range, with an error returned by step 1804 upon error. In step 1807, the class hierarchy above both the class to be moved and the destination class is analyzed to identify the nearest common ancestor class.

Figure 77:
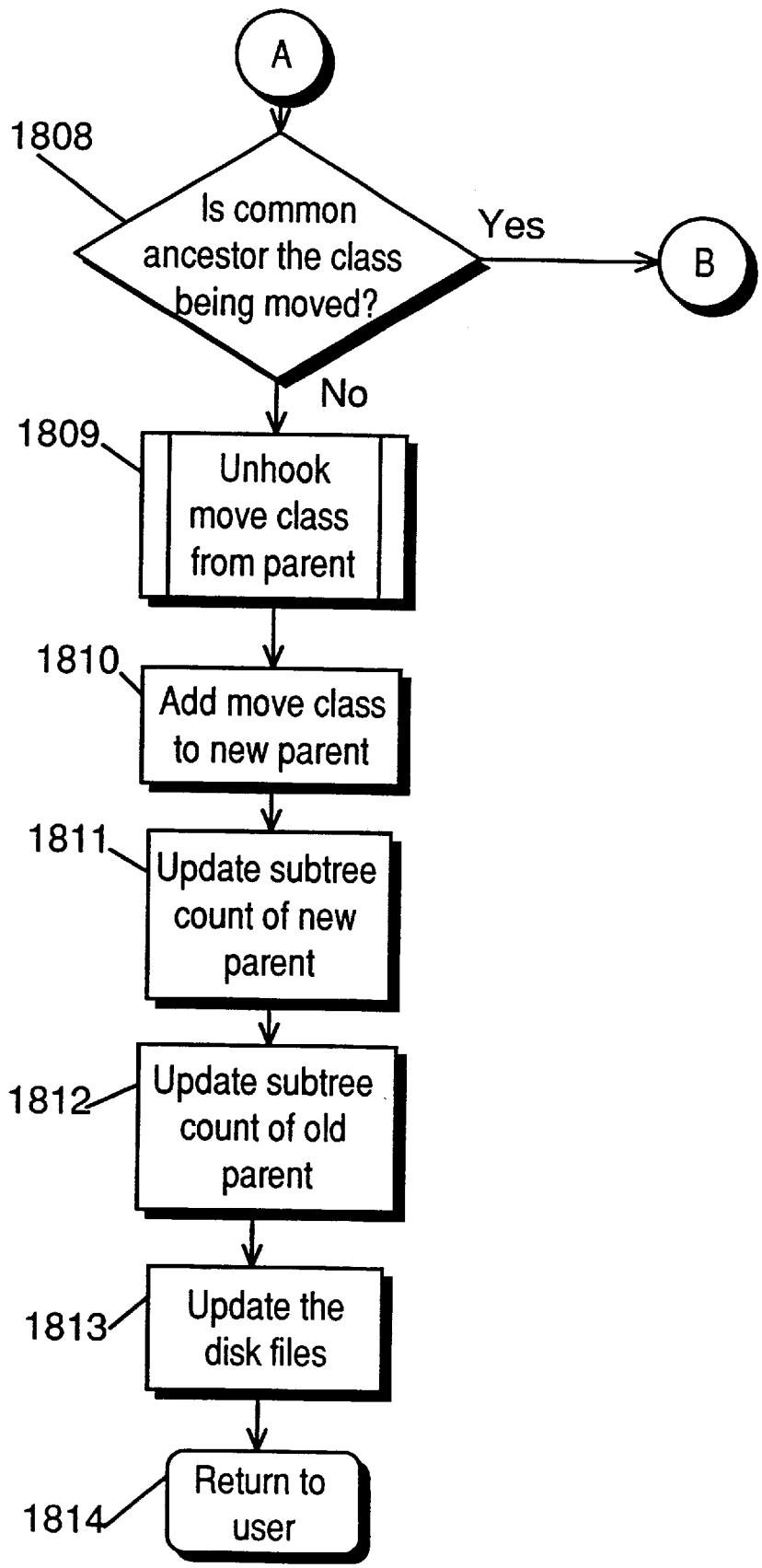
FIG. 77 is a continuation of the flow chart in FIG. 76.

In step 1808 of FIG. 77, the common ancestor is tested to see if it is identical to the class being moved. If it is, given that a test has already been performed to insure that the class is not being moved to its parent, then this is determined to be an attempt to move a class to a subclass of itself, and an error is returned. All other moves are legal, so the class is unhooked from its parent class in step 1809 and added to the list of subclasses for the destination class in step 1810. The destination class subtree instance count is incremented by the number of instances in the moved class in step 1811, and the subtree count of the original parent class of the moved class is decremented by the moved class instance count in step 1812. In step 1813 the permanent image of the knowledge base is updated through the file manager 140, with step 1814 returning successfully to the caller.

Figure 78:
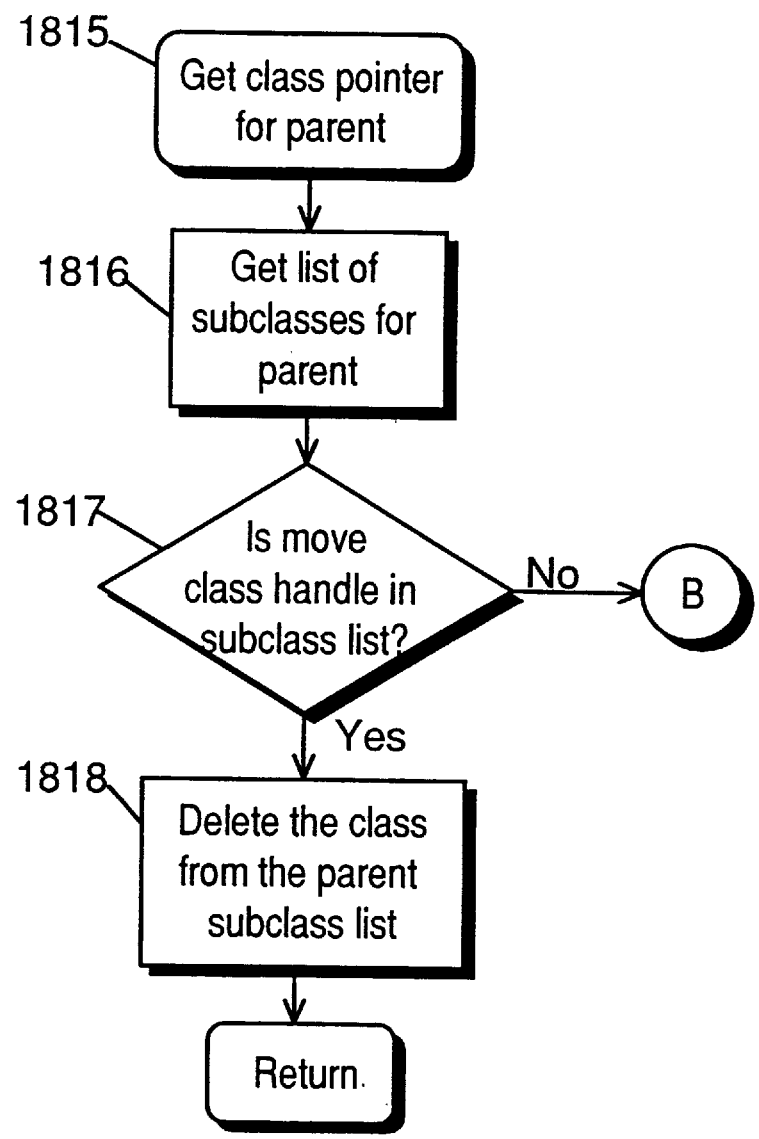
FIG. 78 is a flow chart depicting unhooking a moved class from the original parent.

FIG. 78 describes unhooking the moved class from its original parent class. In step 1815 the class pointer for the parent is obtained and used in step 1816 to get a list of subclasses for the parent class. If the class handle of the class to be moved is not in the resulting subclass list as tested in step 1817, the knowledge base is internally inconsistent and an error is returned to the caller, else the class is deleted from the parent class subclass list in step 1818 before a successful return in step 1819.

Figure 79:
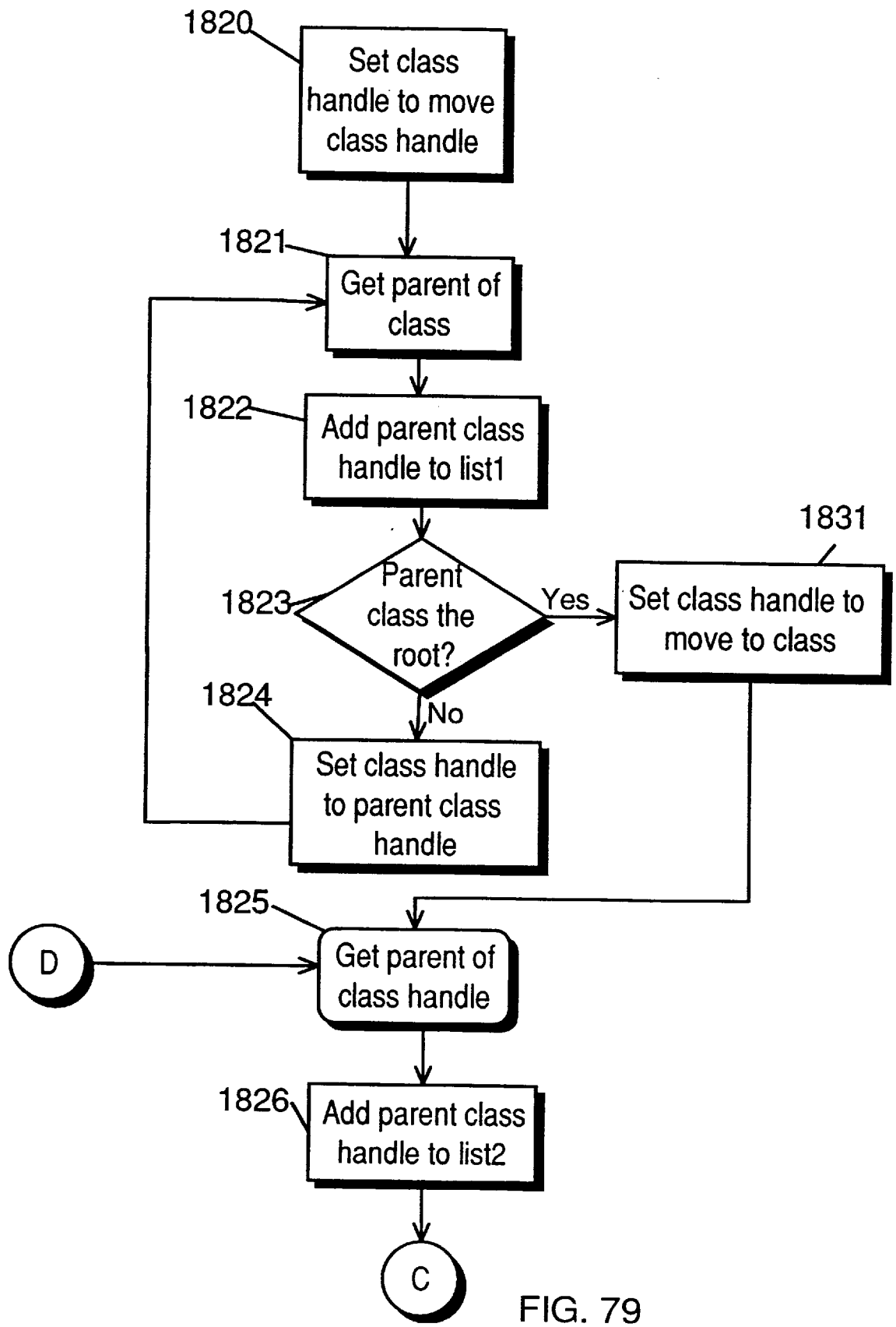
FIG. 79 is a flow chart describing the process for finding the common ancestor of the class to be moved.

FIG. 79 describes the process of finding the nearest common ancestor of the class to be moved and the destination class. In step 1820, a temporary class handle is set to the handle of the class to be moved. Step 1821 gets the parent of the temporary class, initiating a loop that creates a list of classes in order from the class to move to the root. Each class encountered is added to a list in step 1822, with iteration being terminated if step 1823 shows that the root has been encountered. If the test in step 1823 fails, the temporary class handle is set to the handle of its parent class in step 1824 and iteration continues.

Figure 80:
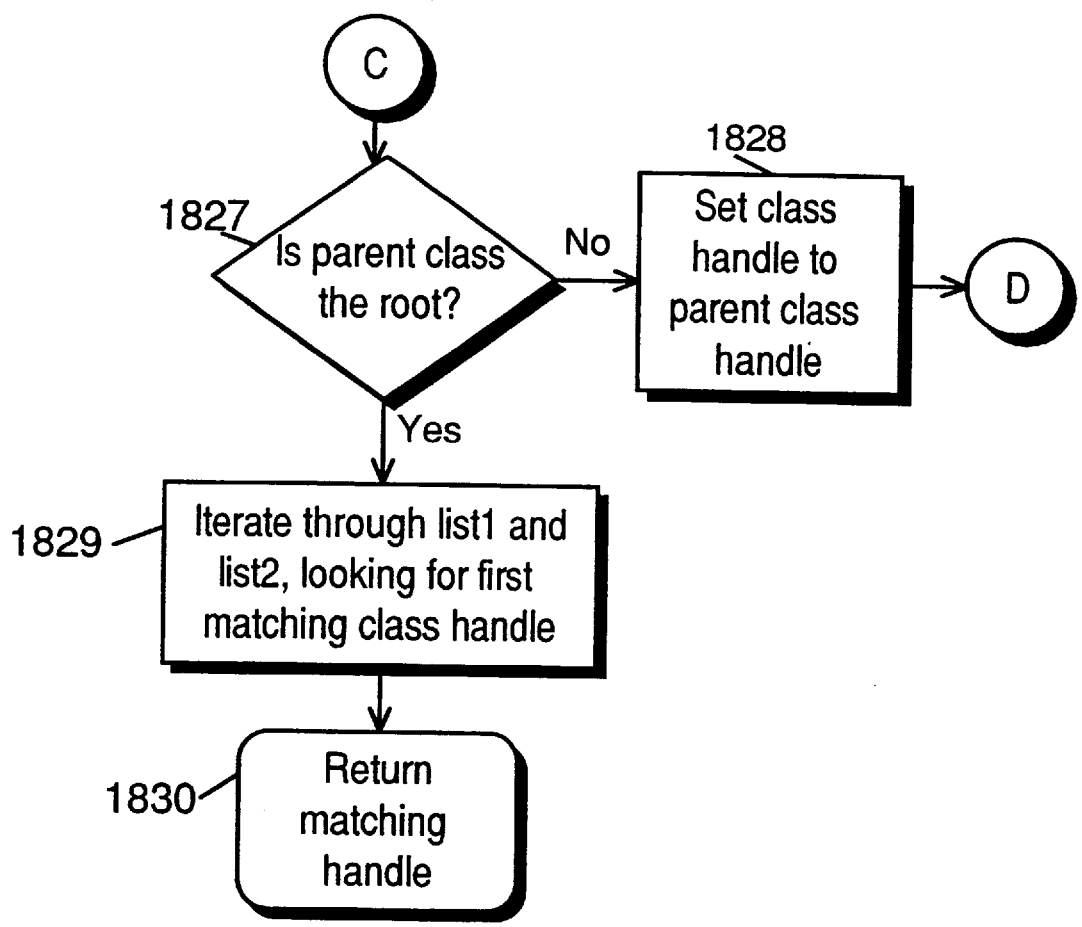
FIG. 80 is a continuation of the flow chart in FIG. 79.

A similar list is created for the destination class in steps 1831 through 1828, moving to FIG. 80. In step 1831, a temporary class handle is set to the handle of the destination class. Step 1832 gets the parent of the temporary class, initiating a loop that creates a list of classes in order from the class to move to the root. Each class encountered is added to a list in step 1826, with iteration being terminated if step 1827 shows that the root has been encountered. If the test in step 1827 fails, the temporary class handle is set to the handle of its parent class in step 1828 and iteration continues.

The final step 1829 iterates through the two resulting lists until a matching class handle is found. This is the handle of the nearest common ancestor, which is returned in step 1830.

Additional information is contained in the CADIS-PMX User's Guide-Windows Schema Editor, Version 2.0 (August 1994), the entirety of which is incorporated herein by reference.

2. Connection Manager

The connection manager 135 is a subsystem of the knowledge base server 132 that manages information about the current client connections. The connection manager 135 is responsible for creating, maintaining, and closing client 130, 133, or 144 connections to the knowledge base server 132. The connection manager 135 will create an instance of query manager 136 for each client 130, 133 or 144 connection. The connection manager 135 maintains a linked list of entries about these client connections. A graphical representation of the data maintained by the connection manager is shown in FIG. 81.

Figure 81:
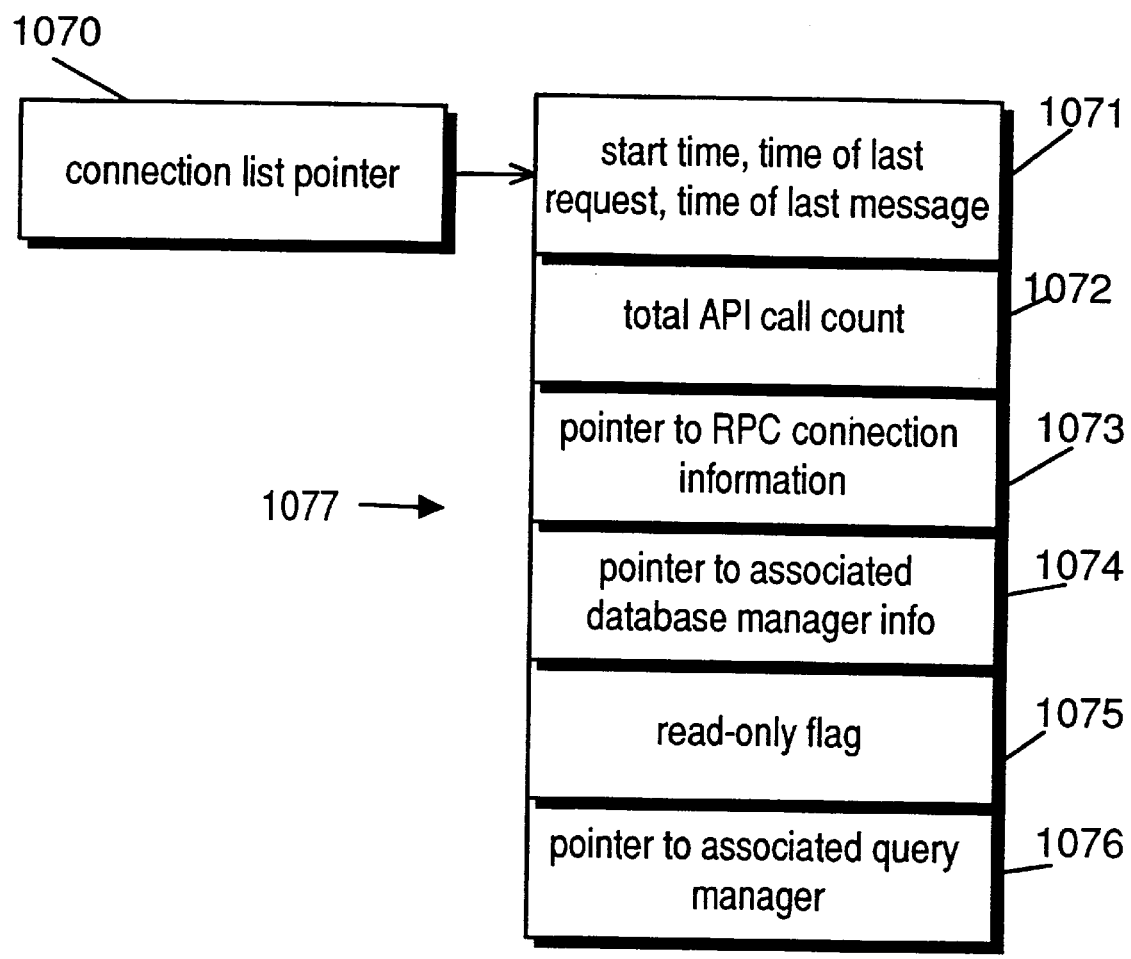
FIG. 81 is a graphical representation of the data maintained by the connection manager.

Referring to FIG. 81, the connection manager 135 maintains a connection list pointer 1070 for each connection which points to a connection list 1077. The connection list 1077 includes data concerning the start time, time of last request, and time of last message 1071 for a client 130, 133 or 144. A total count 1072 for calls to the API 143 is maintained. A pointer to remote procedure call connection information 1073 is also maintained. A pointer to information concerning the associated database manager 139 is also maintained. The connection manager 135 also retains a read-only flag 1075 to control access, and a pointer is maintained to the associated query manager 136.

3. Query Manager

The query manager 136 is a subsystem of the knowledge base server 132 that interacts with the dynamic class manager 134 to provide query operations on the knowledge base 123. The query manager 136 is responsible for managing the query data structures, matching selectors to parameters, and building and managing lists of instances or classes that matched the query.

The following discussion references the data structures described in FIGS. 158–163. When the query manager 136 is instantiated, a query manager class 700 is created. Each instance of this class 700 contains a query handle manager for queries 711, a query handle manager for query results 712, and a query handle manager for search results 713. In general a query handle manager class 701 is a list of base query classes 702. This list 701 is the mapping between a handle and a base query class 702 or one of the derived classes, query class 703, search result class 704, and query result class 705. The offset into the list represents the handle of the object.

A "query" is an object created through the API 143 that can be used to select instances in the knowledge base 123 based on parametric criterion. A query is always tied to a class when it is created.

To create a query, query class 703 is created as a derived class of base query class 702. There is one of these classes 703 for every query created. The base query class 702 is the base class for queries (query class 703), query results (query result class 705), and search results (search result class 704). Base query 702 contains the query class handle 714 that is the class handle of the class on which a query was created. Since the query manager 136 needs to access the dynamic class manager 134, a reference 715 to the dynamic class manager 134 is kept.

Once created, a query class 702 continues to exist until it is explicitly deleted.

A query consists of zero or more "selectors". A "query selector" is associated with one of the attributes defined for the class for which the query was created. Setting a selector will cause the query to return only those instances that match the selector. Setting multiple selectors causes the query to return the conjunction of the instances matching the selectors. i.e., only instances matching all selectors will be returned.

The exact form and semantics of the query attribute class 706 selector depends on the type of the associated attribute.

Each attribute can have at most one associated selector class 706 or derived classes 707, 708, 709, or 710 for any given query. For any attribute type, the selector class 706 or derived classes 707, 708, 709, or 710 can be set to include instances for which the associated parameter is in the "undefined" state 731. Setting a selector class 706 without requesting the undefined parameters will cause the instances that have that parameter set to undefined to be excluded. Requesting that undefined parameters be included without otherwise setting the selector class 706 will cause only the instances for which the parameter is undefined to be returned.

The attribute selector classes 707, 708, 709, and 710 are added to the query class 702 attribute selector class list 716 as a result of an API 143 call to set the specified attribute selector class 706.

The attribute selector class list 716 is destroyed when the query class 702 is destroyed.

Actually performing a query is referred to as "applying a query." Applying a query will return a query result handle. A query result handle is a reference to a query result class 705. A query result class 705 is an object that contains the list of instances 723 returned by the query. Given a query result handle, the user can retrieve the actual instances represented by list 723. The query result continues to exist until explicitly deleted. Subsequent changes to the query class 702 will not affect an existing query result class 705. Subsequent applications of the query class 702 will return additional query results class 705.

The query may be applied either locally or on a subtree. When a query is applied locally, the query manager 136 retrieves the class pointer associated with the class handle 714 using the class manager 134 reference 715. The list of instances associated with the class pointer is retrieved and a list iterator is used to evaluate each instance against the attribute selector list 716 in the query class 703. A query class 703 with no selectors will simply return all instances of class 714.

Figure 82:
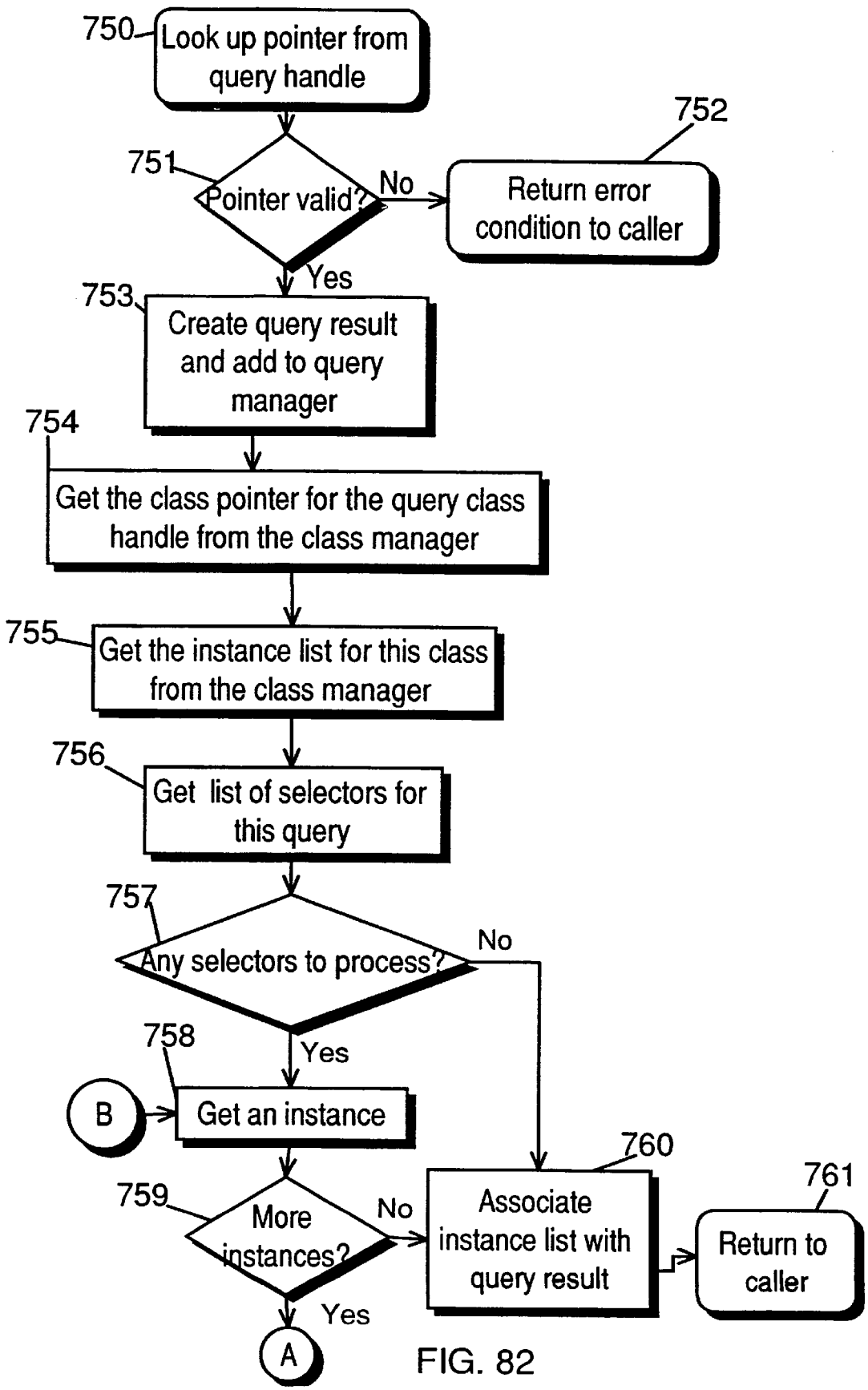
FIG. 82 is a flow chart describing applying a local query.
Figure 83:
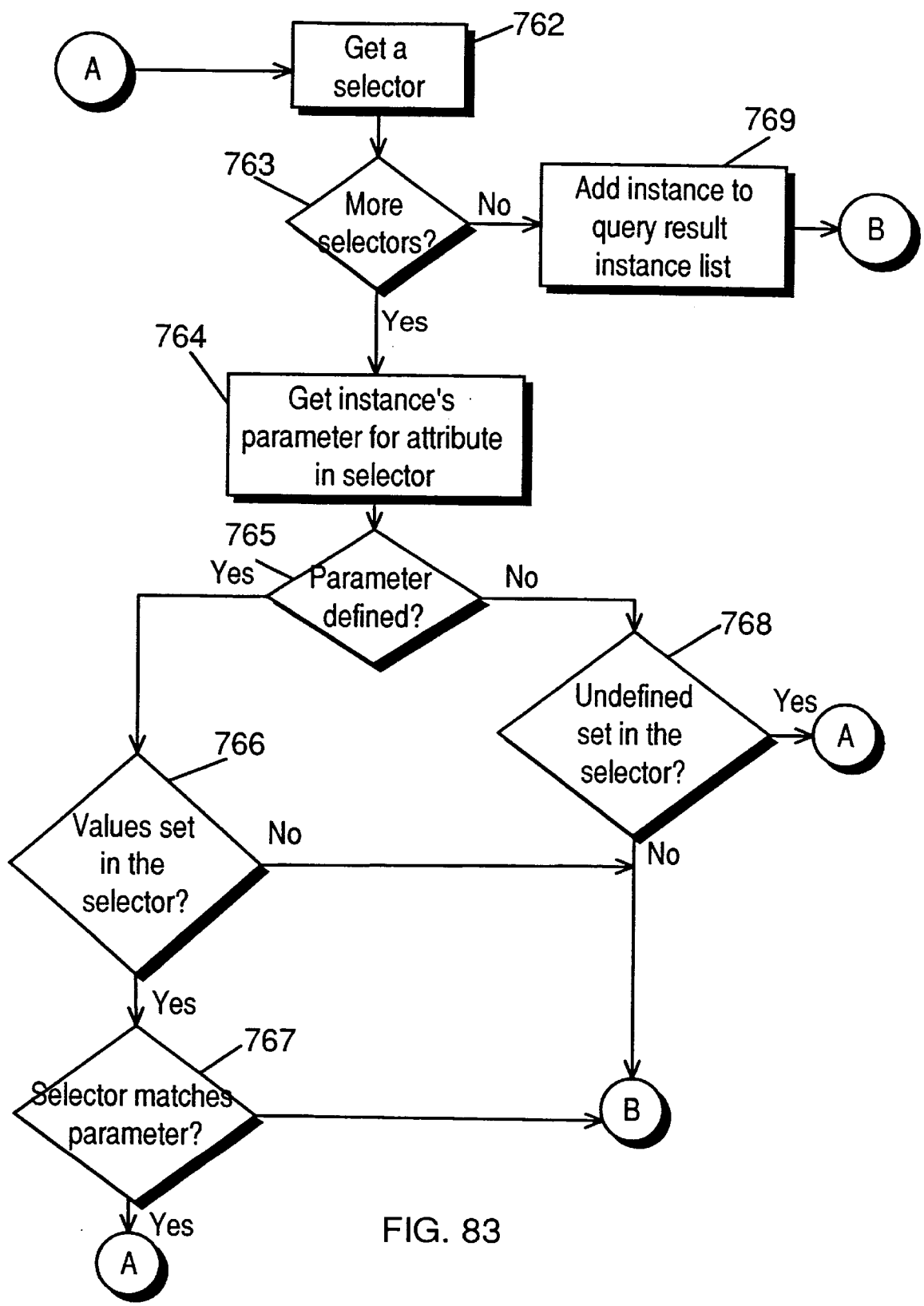
FIG. 83 is a continuation of the flow chart in FIG. 82.

In FIG. 82 and FIG. 83 a local query is applied. The query handle is converted to a query class 702 pointer in step 750. In step 751, the pointer is validated. If the pointer is invalid, an error is returned in step 752.

In step 753, the query result class 705 is created and added to the query result handle manager 712.

In step 754, the class manager 134 is called using reference 715 to get the class pointer for the class handle 714 that was set in the query class 702. This pointer is used in step 755 to call the class manager 134 function to get the list of instances for the class handle in 714.

The query class 702 class pointer from step 750 is used to retrieve the selector class list 716 associated with the query class 702 class in step 756.

A significant performance optimization of this invention is checking in step 757 to see if any selector classes 706 and derived classes are set. If no selector classes 706 and derived classes are set, step 760 is performed which associates the class instance list with the query result class 705 and a normal return is done in step 761.

If selector classes 706 and derived classes are set, then step 758 requires an instance in the class instance list to be examined. If no more instances are available in step 759, the instance list of matches is associated with the query result class 705 in step 760 in list 723 and a normal return is done in step 731.

A selector class 706 and derived classes are retrieved from the query class 702 attribute selector class list 716 in step 762. In step 763, if there are no more selector classes 706 and derived classes to evaluate, the process returns to step 758 to get the next instance in the class after saving the instance handle in the query result class 705 instance list 716 in step 769.

If there are selector classes 706 and one of its derived classes to evaluate, step 764 is performed. This step retrieves the parameter value for the attribute handle 763.

Another significant performance optimization of this invention is the process that starts in step 765 to check if the parameter is defined. This step makes processing of empty or null values extremely efficient. If the parameter is not defined, the undefined selector flag 731 is checked in step 768. If the undefined flag 731 is not set, the instance handle is discarded as a possible match and the next instance is processed starting in step 758. If the undefined flag 731 is set, the instance matches and the next selector list 716 item is processed in step 762.

If parameter values existed in step 765, the selector list 716 item is checked in step 766 to see if criteria are set. If they are not, the next instance is processed in step 758. Based on the attribute type, the selector 706 and derived classes are used for evaluating the parameter and selection criteria in step 767. If the selection criteria matched, the next selector class list 716 item is processed in step 762.

Figure 84:
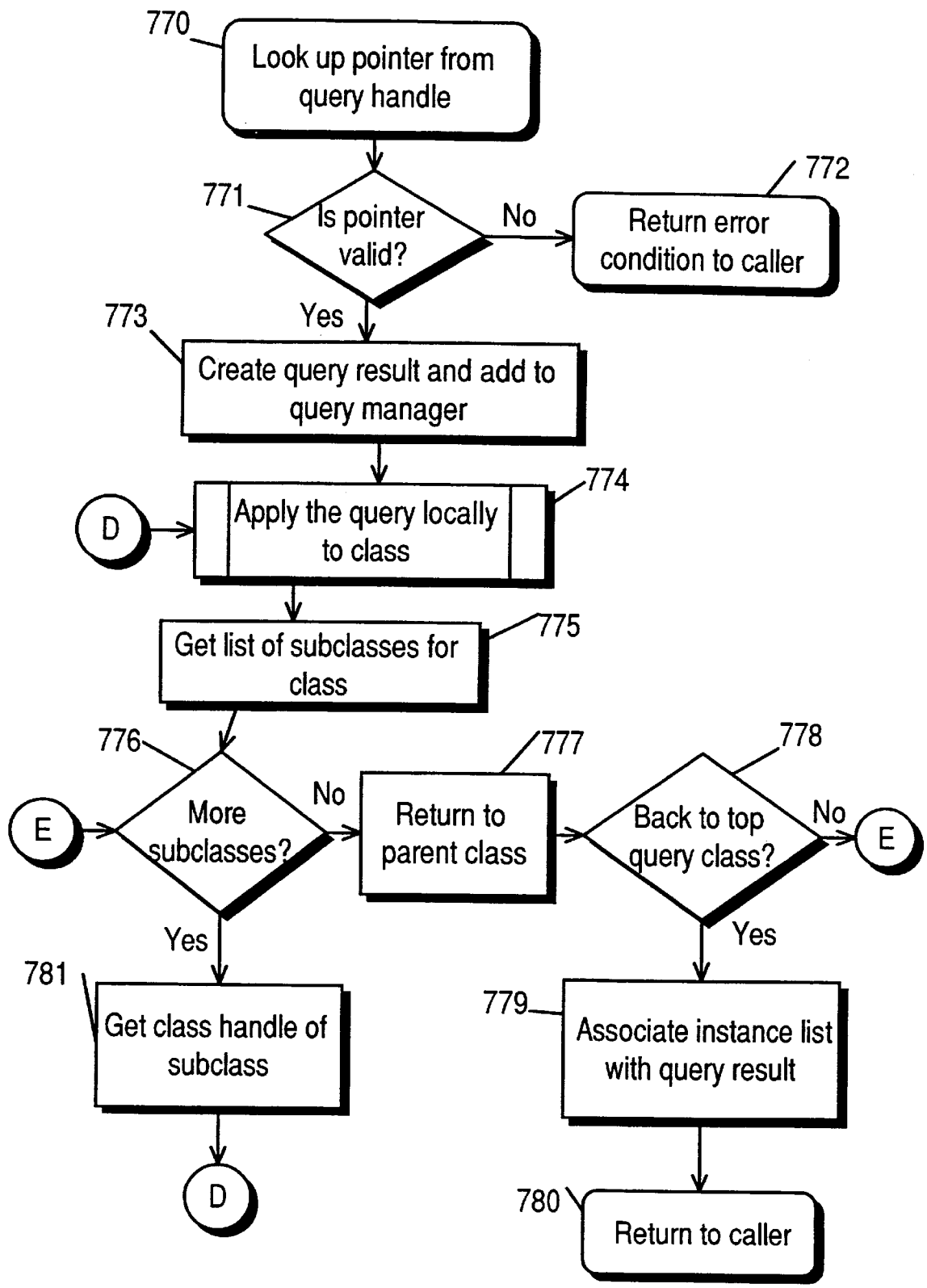
FIG. 84 is a flow chart depicting the process for performing a query on a subtree.

In FIG. 84, the process for performing a query on a subtree is shown. The query handle is converted to a query class 702 pointer in step 770. In 771, the pointer is validated. If the pointer is invalid, an error is returned in step 772.

In step 773, the query result class 705 is created and added to the query handle manager 712.

The next step 774 performs the apply local query function described in FIG. 82 and FIG. 83. This step 774 will be applied recursively for each subclass of the class handle 714. The subclasses for this class handle 714 are retrieved from the class manager 134 reference 715 in step 775.

If there are more subclasses to process as determined in step 776, the class handle for the subclass is retrieved from the class manager 134 reference 715 in step 781 and the local query procedure in FIG. 82 and FIG. 83 is called in step 774.

From step 776, if all the subclasses were processed, the procedure returns to the parent class in step 777. Step 778 checks to see if the recursive algorithm has returned back to the top query class 714. If it hasn't, the remaining subclasses of the current class are processed in step 776. If the procedure has returned to the top query class 714, the instance list 723 is associated with the query result class 705 in step 779 and the procedure returns to the caller in step 780.

The data structures that are created when a query is created and applied are shown in FIGS. 164, FIG. 157, FIG. 156, and FIG. 155. In these figures assume the root class of a particular knowledge base has a boolean attribute "discontinued" and a numeric attribute "length" with a base unit of "inches". The user does a query of all discontinued parts with a length>3 inches.

In FIG. 164 a query on the root class (class handle 0) is created using the API 143 function "pmx_createquery". A query handle of 2 is returned to the caller. The user then retrieves the handles for the boolean attribute "discontinued" (attribute handle 10) and for the numeric attribute "length" (attribute handle 19 and unit handle 5) using API 143 function get "pmx_getattributedescriptorset".

In FIG. 157, the results of setting the boolean selector using API 143 function "pmx_setbooleanselector" with query handle 2 is shown.

In FIG. 156, the results of setting the numeric selector using API 143 function "pmx_setnumericselector" with query handle 2 is depicted.

After applying the query handle 2, instances 3,300, and 30000 are found. The results of applying the query are shown in FIG. 155. A query results handle of 0 is returned since there are no other query results in this example.

Figure 85:
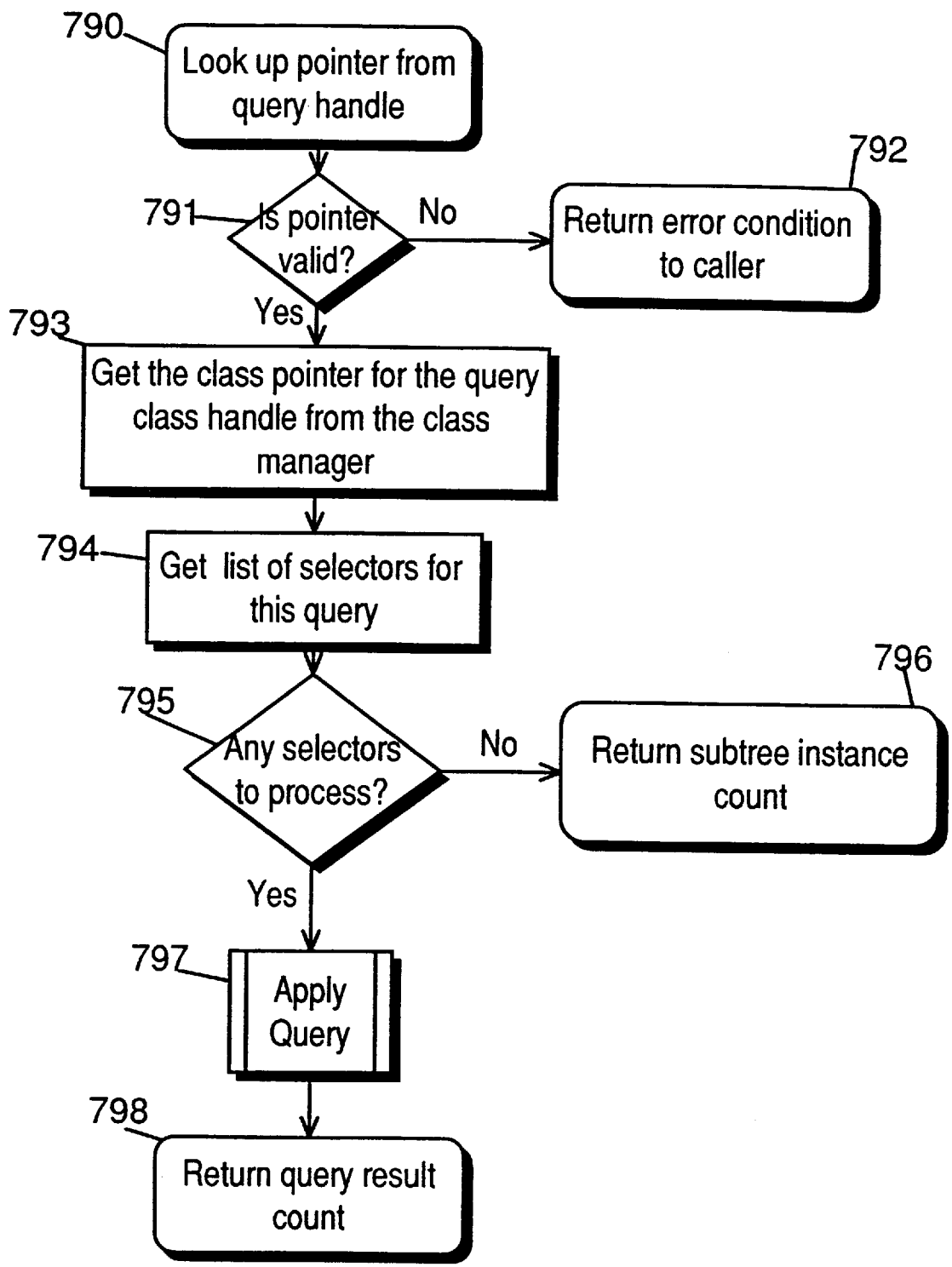
FIG. 85 is a flow chart depicting the application of a query count.

Another significant performance optimization of this invention is described in FIG. 85 applying a query count. This procedure is used to return quickly and efficiently the number of parts available in a schema class tree to the retriever 130. The process starts in step 790 when the query class 702 pointer is converted from the query handle. Step 791 checks this pointer for validity, and returns in step 792 if an error occurred. Step 793 accesses the dynamic class manager 134 using reference 715 to get the class pointer for the query class 714. The list of selectors 716 described by the base attribute selector class 706 is retrieved in step 794. If a selection list 716 item exists as determined in step 795, the procedure for applying a query described in FIG. 84 must be executed and the resulting instance count returned in step 798. The significant invention occurs in step 796. The dynamic class manager 134 directly maintains a count of instances local to a class, as well as a count of all instances in the subtree parented by that class. This value is maintained when instances are moved, deleted, or added to a class. When the apply query count procedure is applied, the value is simply looked up in the class and returned to the user in 796. This step results in high performance tree traversal feedback in the retriever 130, item 172.

The initial order of instances within a query result 705 is random. The query result instances 723 can be reordered using an API 143 function for sorting the instances. The retrieval functions will then return the instances in sorted order. A query result class 705 can be resorted multiple times.

In FIG. 161, a sorting request consists of an ordered list of attributes 719 and an indication of whether the order is to be ascending or descending in sort order list 720. The descending order is precisely the reverse of the normal order which is ascending order.

The instances will be ordered first by the first attribute in the ordering list 719. Within a group of instances that have equal settings for the first attribute, the second attribute will be used, and so on until the list is exhausted. Any order not uniquely determined by the list will be essentially random.

The ascending order for boolean attributes is (TRUE, FALSE, UNDEFINED). The ascending order for enumerated attributes is the order of the enumerators as defined in the schema followed by undefined. The ascending order for string attributes is the normal ASCII collating sequence followed by undefined. The ascending order for numeric attributes is first sorted by base units in the order defined by the schema. Within a base unit, the instances are in numeric sequence. Undefined parameters will be last.

Additional file manager 140 derivations are possible. The interface provided by the file manager 140 to the dynamic class manager 134 and the handle manager 137 is an agreement to maintain a copy of the dynamic class manager schema and instance data on secondary persistent storage 103. Changes, as they are made to the schema and instances are also made in secondary storage. The dynamic class manager 134 is initialized by reading the data, via the file manager 140, from secondary storage 103. Other secondary storage mechanisms could be implemented which follow the interface specification. Other implementations could use commercial data bases including relational database management systems such as an Informix database, Oracle database, Raima database, etc. Other implementations could also be built using other proprietary file formats.

A query result is instantiated and populated with instance handles. The order of the instances is random within the query result. Instances within a query result may be sorted according to specified criteria. Multiple sort criteria may be specified. Sort criteria is specified by indicating a list of one or more attributes and a sort order (ascending or descending) for each attribute. Instances in a query result are ordered by sorting the parameters indicated by the attributes according to the specified order.

A query result is not sorted immediately upon receiving sort message containing the sort criteria. Rather a query result merely remembers the sort criteria and waits to perform the sort when an instance handle is requested from a query result. (From the PMX Retriever, a request for an instance handle is eminent.)

When an instance handle is requested from a query result, the query result will sort itself at this point. However, the entire query result is not sorted; only the portion of the query result containing the instance of interest is sorted. The sorting method used is incremental, only sorting those portions of the query result that contain instances of interest. The other portions of the query result are left unsorted. Incremental sorting is done to improve response time: sorting a portion of the query result usually takes less time than sorting the entire query result.

Incremental sorting requires tracking which instance handles in a query result have been sorted and which have not. To accomplish this, the query result is sub-divided in to ranges. There are two types of ranges: sorted and unsorted. Every instance handle in a query result resides in either a sorted or unsorted range. The Range Manager is responsible for managing these ranges.

Initially, prior to any sorting, the entire query result is contained in a single unsorted range. The act of incrementally sorting the query result will sub-divide the query result into several ranges, some which are sorted, some which are not. As more and more portions of the query result are sorted, the number of unsorted ranges become fewer; eventually the entire query result becomes a single sorted range.

The range manager is aware of the meaning of sorted and unsorted ranges and uses this information to join ranges together to avoid range fragmentation, which would decrease performance speed. The range manager uses two rules to join ranges: 1) two adjacent ranges of the same type (sorted or unsorted) may be joined together to make a single larger range, 2) an unsorted range containing only a single instance handle may be joined with an adjacent sorted range to make a larger sorted range.

Prior to sorting, a query result consists mainly of a list of instances, 0 through N, in an unsorted state step 1350 of FIG. 144. The receipt of a sort message, changes the state of the query result to sorted and provides it sorting criteria step 1351 of FIG. 1444.

The query result will eventually receive a message to return the Ith instance handle from the list of instance handles in step 1352 of FIG. 188. At this point the query result must sort the list to correctly order the Ith instance. This is done by first selecting a random index, R, between 0 (lower bound of range) and N (upper bound of range) (step 1353). The entire list is ordered such that all instances greater than the instance at R are placed above R in the list and all instances less than the instance at R are placed below R in the list (step 1354). The instance at R is now ordinally sorted within the list. At this point there are three ranges: 0 to R−1 (unsorted), R (sorted), and R+1 to N (unsorted).

If Ith and R coincide, sorting is complete and the Ith instance handle is returned. Otherwise sorting must continue. Sorting continues based on the location of Ith in relation to R. If Ith is less than R, then the range between 0 (lower bound) and R-1 (upper bound) will be ordered. If Ith is greater than R, then the range between R+1 (lower bound) and N (upper bound) will be ordered. With the appropriate range determined, a new random R is selected within the new range, and all instances in the new range will be partially ordered with respect to the instance at R.

The list is iteratively sub-divided into ranges and partially ordered until Ith and R coincide, at which time the sorting discontinues and Ith instance handle is returned.

Sometime later when a another Ith instance is requested, if this Ith instance is found within a range that has already been sorted, no sorted need be done, and the Ith instance handle is immediately returned. If this Ith instance is not found within a sorted range, the sorting continues by iteratively ordering the ranges until Ith is found.

Each time a range is ordered and new ranges are identified, the range manger is provided with this information. The range manager keeps track of all ranges. At beginning of each iteration range manager is asked if Ith exists in sorted range. If it is, then no further sorting is required. If Ith is not found within a sorted range, then the range manager provides the lower and upper bound of the range that Ith exists in and the algorithm orders that range and creates new ranges.

At the end of a sorting session, just prior to returning the Ith instance, the range manager is provided the opportunity to join fragmented ranges based on the rules previously mentioned. At the end of a sorting session, the range manager may be tracking the step shown in 1355 of FIG. 189. Any adjacent ranges of the same type may be joined together. Also, unsorted ranges of size one, may be joined to adjacent sorted ranges.

The range manager will be tracking the ranges shown in 1356 when the range joining is complete.

A class pattern search is similar to a query but is applied to all of the classes in a subtree. A search result is represented by search result class 704.

A class pattern search performs a pattern match on the class names and returns a list of classes 717 whose names match the pattern. Unlike a query, there is no separation of creating a search and performing it, since a search isn't complicated enough to need to be built up a piece at a time. The search returns a "search result" handle which is an item that continues to exist until the user deallocates it. There is no defined order in which the classes are returned.

4. Handle Manager

The handle manager 137 is a component of the dynamic class manager 134 that provides services for creation, deletion, and disk-to-memory mapping of handles for all objects. The handle manager 137 comprises two lists of virtual memory addresses which are shown in FIG. 42. The first list 810 contains the virtual memory addresses 810–814 of schema objects (classes, attributes, enumerators, units, and unit families). The second list 811 contains the virtual memory addresses 815–826 of instances. A handle is an index into a list. Thus, given a schema object handle or an instance handle, the handle manager 137 can return to the dynamic class manager 134 the virtual memory address of the desired object.

Figure 52:
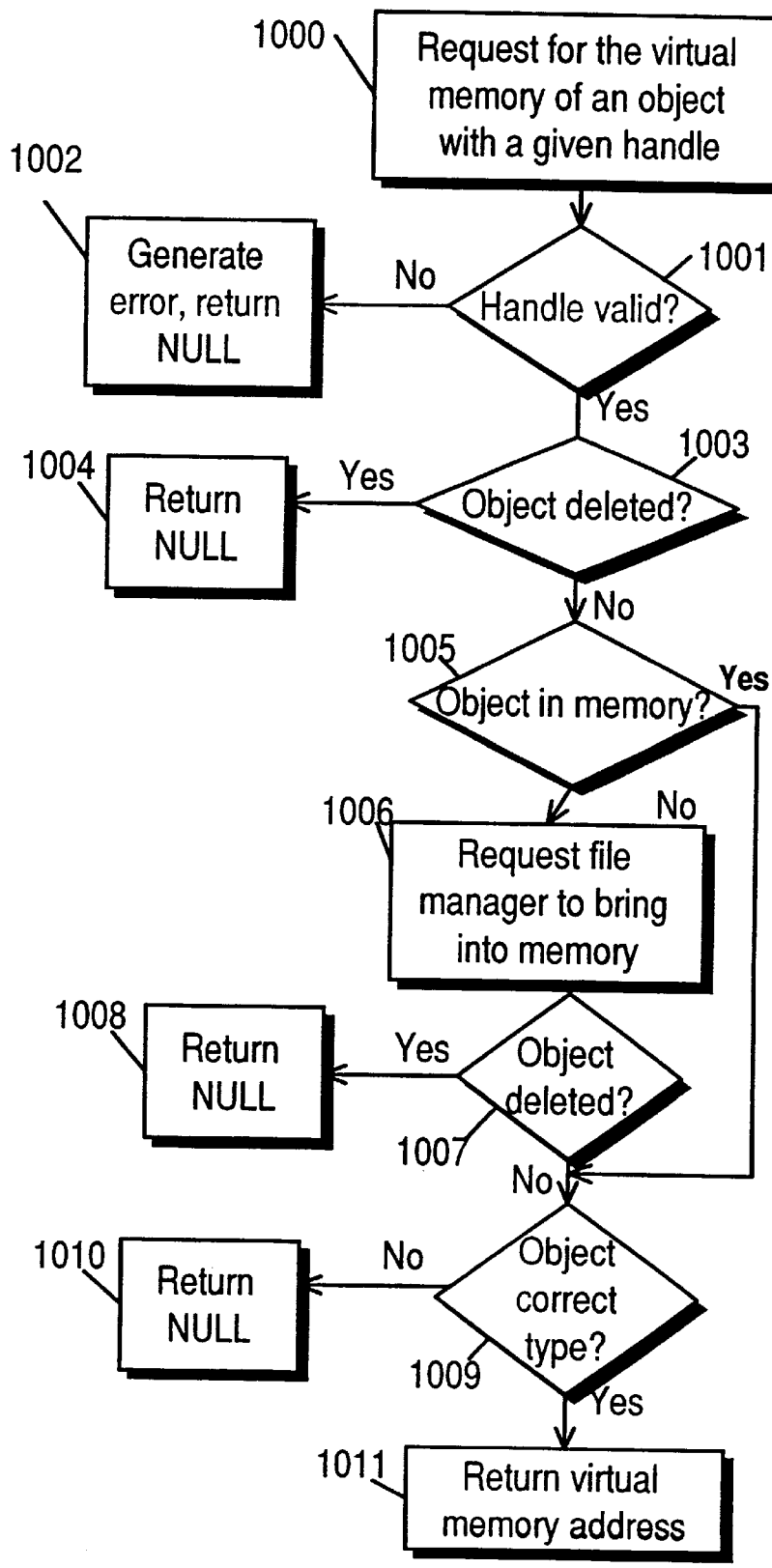
FIG. 52 is a flow chart depicting how the handle manager responds to a request for the virtual memory address of an object.

When the dynamic class manager 134 needs to examine the data for some object for which it has a handle, the handle manager 137 responds to a request for the virtual memory address of the object as shown in FIG. 52. The procedure begins at step 1000 with a request from the dynamic class manager 134. The handle is checked for validity at step 1001 (i.e., that the handle is one that was created by the handle manager 137). If the handle is not valid, an error condition is generated and the handle manager returns a NULL virtual memory address to the dynamic class manager 134 to indicate the error in step 1002. Otherwise, the handle manager 137 continues with step 1003.

If the handle is valid, then the address stored in the appropriate list (schema object or instance) is examined at step 1003. One special virtual memory address is reserved to indicate that an object with the given handle is deleted. Only objects which are deleted are allowed to have this special memory address. If the address found from the handle look up in step 1003 is the deleted object address, then an error condition is generated and the handle manager 137 returns a NULL virtual memory address in step 1004 to the dynamic class manager 134.

Otherwise, the handle manager 137 continues with step 1005. If the virtual memory address found in the list at step 1005 is not a NULL pointer, then processing continues at step 1009. If the virtual memory address found at step 1005 is NULL, then the requested object is not present in memory. The handle manager 137 makes a request to the file manager 140 to read the object with the given handle from secondary storage 103, create the object in the virtual address space, and return the virtual memory address to the handle manager 137 in step 1006.

At step 1007, the virtual memory address of the object which has been created by the file manager 140 is tested against the special deleted virtual memory address. If file manager 140 has determined that the object is deleted, then an error condition is generated and a NULL pointer is returned in step 1008. Otherwise, processing continues at step 1009.

At step 1009, the handle manager 137 has identified a valid virtual memory address for the object with the given handle. The type of the object is tested to insure it is of the same type as the type of the handle. If the type is not correct, then an error condition is generated and a NULL pointer is returned in step 1010. Otherwise, the address of the requested object has been identified and this address is returned in step 1011 to the dynamic class manager 134.

When the dynamic class manager 134 creates a new schema object or instance on behalf of a function of the API 143, the handle manager 137 is invoked to generate a new handle for the new object. The handle manager 137 returns an unused handle, which is the next list index sequentially following the most previously generated handle. In other words, it returns oldmax+1. The handle manager 137 is informed of the address of the new object so it can be entered into the list.

The handle manager 137 is also invoked by the dynamic class manager 134 whenever an object is deleted on behalf of a function of the API 143. The virtual memory address stored in the list which is indexed by the given handle is set to the special deleted object address.

5. Units Manager

The units manager 138 is an integral component of the dynamic class manager 134 that provides services for creation, maintenance, and deletion of base and derived units for numeric attributes. The data structures provided are discussed in detail as part of the description of the dynamic class manager 154. The presence of the units manager 138 and its ability to relate numeric quantities to the units in which they are measured and to perform automatic conversions among compatible units when updating, searching and sorting the numeric values in the database 123 has significant advantages compared to storing the numeric values devoid of units.

6. File Manager

The file manager 140 is a subsystem of the knowledge base server 132 that provides access to a secondary storage mechanism 103 for the schema objects and instances. The file manager 140 provides an access method independent set of services for reading, writing, updating, creating, and locking knowledge bases 123.

The file manager 140 provides to the dynamic class manager 134 and handle manager 137 an abstract interface to the persistent storage 103 of knowledge base objects. In other words, the file manager 140 is a C++ abstract base class which is intended to be fully defined by derived classes. The interface functions or methods provided by the file manager 140 are shown in Table 5 and Table 6. The functions provided by the file manager 140 may be separated into groups depending on their usage.

Functions for opening and closing secondary storage are used by the class manager 134 when the class manager 134 is created to service a knowledge base 123 when a knowledge base server 132 is started or when the knowledge base server 132 terminates. The class manager 134 uses a warm start function to initialize the knowledge base server 132 in the desired configuration. A factory creation function is used by a file manager factory. Those skilled in the art are familiar with the use of factories for object instantiations, and such functions will not be described in detail. See *Coplien, Advanced C++*.

Other file manager 140 functions are used by the dynamic class manager 134 whenever it performs some operation which modifies the knowledge base 123. These functions correspond nearly one-to-one for the API 134 and dynamic class manager 134 functions which make modifications to the knowledge base 123. The file manager 140 is responsible for insuring that the data in secondary storage 103 models exactly the data in the dynamic class manager 134.

Additional file manager functions are used by the handle manager 137 when the dynamic class manager 134 uses the handle of some object which is not in virtual memory (see FIG. 52, step 1006). These functions construct the object in virtual memory by reading the object from secondary storage 103. The address of the created object is returned to the handle manager 137.

TABLE 5

Functions used by the class manager for API actions:

virtual long getDBFeatureCode
virtual const cd_stringList CD_FAR & getDBCopyright
virtual cd_boolean addLeafClass
virtual cd_boolean addInstance
virtual cd_boolean addAttribute
virtual cd_boolean addEnumerator
virtual cd_boolean addStringArrayElement
virtual cd_boolean changeSubclassOrder
virtual cd_boolean changeAttributeOrder
virtual cd_boolean changeEnumeratorOrder
virtual cd_boolean deleteLeafClass
virtual cd_boolean deleteInstance
virtual cd_boolean deleteAttribute
virtual cd_boolean deleteEnumerator
virtual cd_boolean deleteStringArrayElement
virtual cd_boolean moveInstance
virtual cd_boolean moveAttribute
virtual cd_boolean moveSubtree
virtual cd_boolean setParameter
virtual cd_boolean setStringArrayElement
virtual cd_boolean setParameterUndefined
virtual cd_boolean setClassName
virtual cd_boolean setAttributeName
virtual cd_boolean setEnumeratorName

TABLE 5-continued virtual cd_boolean setClassCode
virtual cd_boolean setAttributeRequired
virtual cd_boolean setAttributeProtected
virtual cd_boolean addUnitFamily
virtual cd_boolean addUnit
virtual cd_boolean setEnumeratedUnitRows
virtual cd_boolean setClassMetaParameters
virtual cd_boolean setAttributeMetaParameters
virtual cd_boolean setEnumeratorMetaParameters
virtual cd_boolean setUnitMetaParameters
virtual cd_boolean setEnumeratedUnitTable
virtual cd_boolean setUnitFamilyName
virtual cd_boolean setUnitName
virtual cd_boolean setUnitConversionValues
vjrtual cd_boolean deleteDerivedUnit
virtual cd_boolean setAttributeUnits

TABLE 6

Functions for opening and closing secondary storage:

cd_fileManager
virtual~cd_fileManager
A function for warm starting:
virtual cd_class CD_FAR * warmStart
A function for factory creation of a derived file manager:
static cd_fileManager * make
Functions used by the handle manager for faulting objects into memory:

virtual void getClass
virtual void getAttribute
virtual void getEnumerator
virtual void getUnit
virtual void getUnitFamily
virtual void getSchemaObject
virtual void getInstance The presently preferred embodiment comprises two derivations of file managers 140 from a base file manager class. A null file manager 140 (called "nullmgr.hxx") defines all of the file manager 140 functions, but the effect of any of these functions is null. The null file manager 140 provides no secondary storage for the dynamic class manager 134. The purpose for this type of file manager 140 is primarily for testing.

A second derivation of the file manager 140 is the Cadis File Manager (called "cdsdbmgr.hxx"). The Cadis File Manager interacts with secondary storage for persistent storage of the schema objects and instance objects. The formats of the files as stored on secondary storage are shown in FIGS. 53–64. The Cadis File Manager also manages the details of the mapped I/O, the standard I/O, and the raw I/O access methods.

The Cadis File Manager maintains a copy of the current state of the knowledge base 123 in simple files on secondary storage 103. Although the secondary storage copy can be thought of as a single knowledge base 123, for convenience it is mapped to three files on secondary storage. These three files are known as the schema file, the instance file and the dynamic file 2400. The schema file and instance file contain fixed size data about schema objects and instance objects respectively. The dynamic file contains data, such as lists of items and character strings, which by their nature are of varying length.

Figure 53:
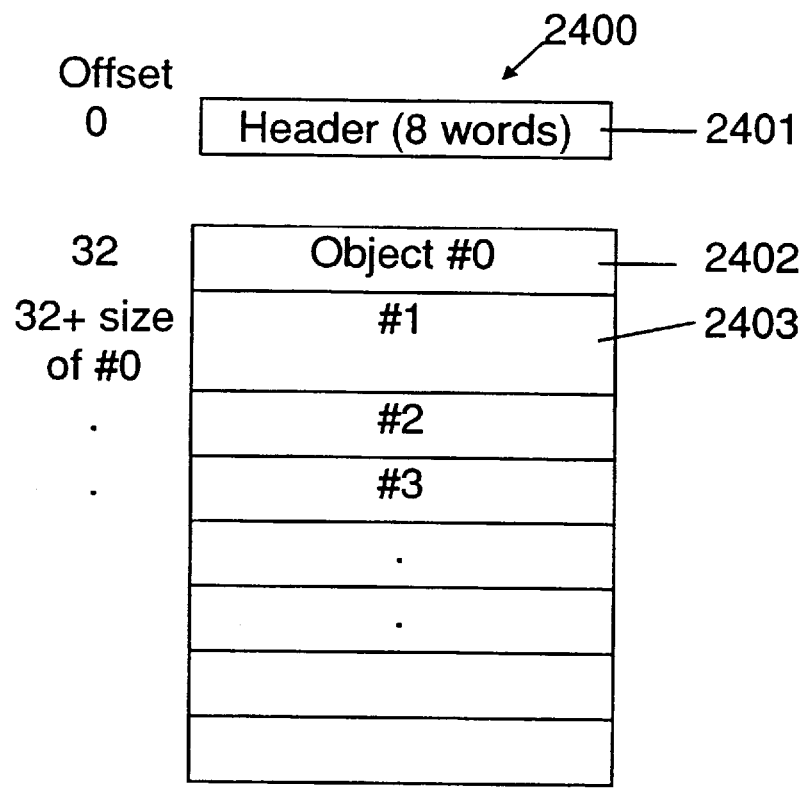
FIG. 53 depicts the sequential layout of the dynamic file.
Figure 54:
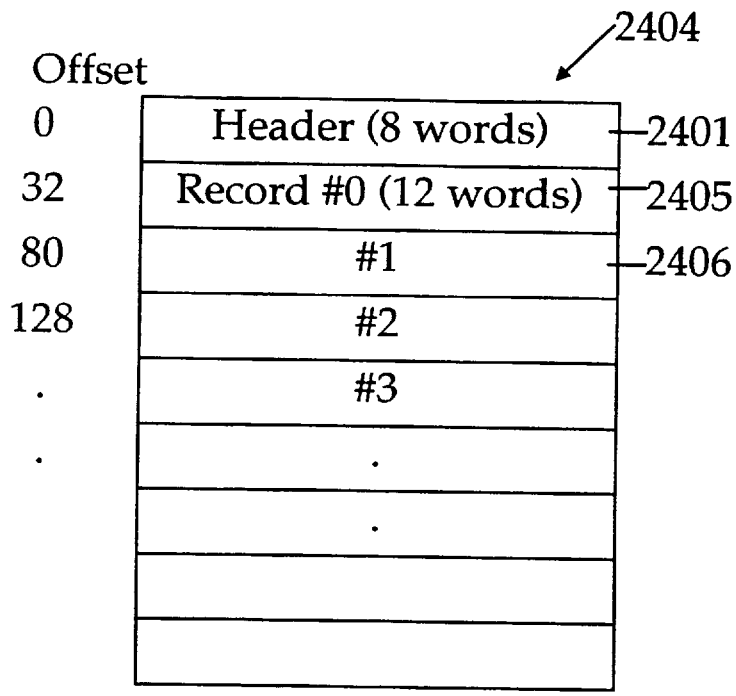
FIG. 54 shows the general layout of the schema and instance files.

Referring to FIG. 53, the sequential layout of the dynamic file 2400 is shown. The dynamic file 2400 contains a header 2401 (described below) and, following sequentially, a plurality of variable length objects. The first variable length object is 2402, the second 2403. These objects continue down through the file. FIG. 54 shows the general layout of the schema and instance files 2404. Here the format is essentially the same with a header 2401 and a series of objects 2405, 2406 etc. In each of the schema and instance files, however, the objects are of known size. This means that they can be located quickly in the file knowing only their ordinal position amongst the objects. In the current implementation, this ordinal position is always exactly equal to the value of the handle assigned to the object.

Figure 55:
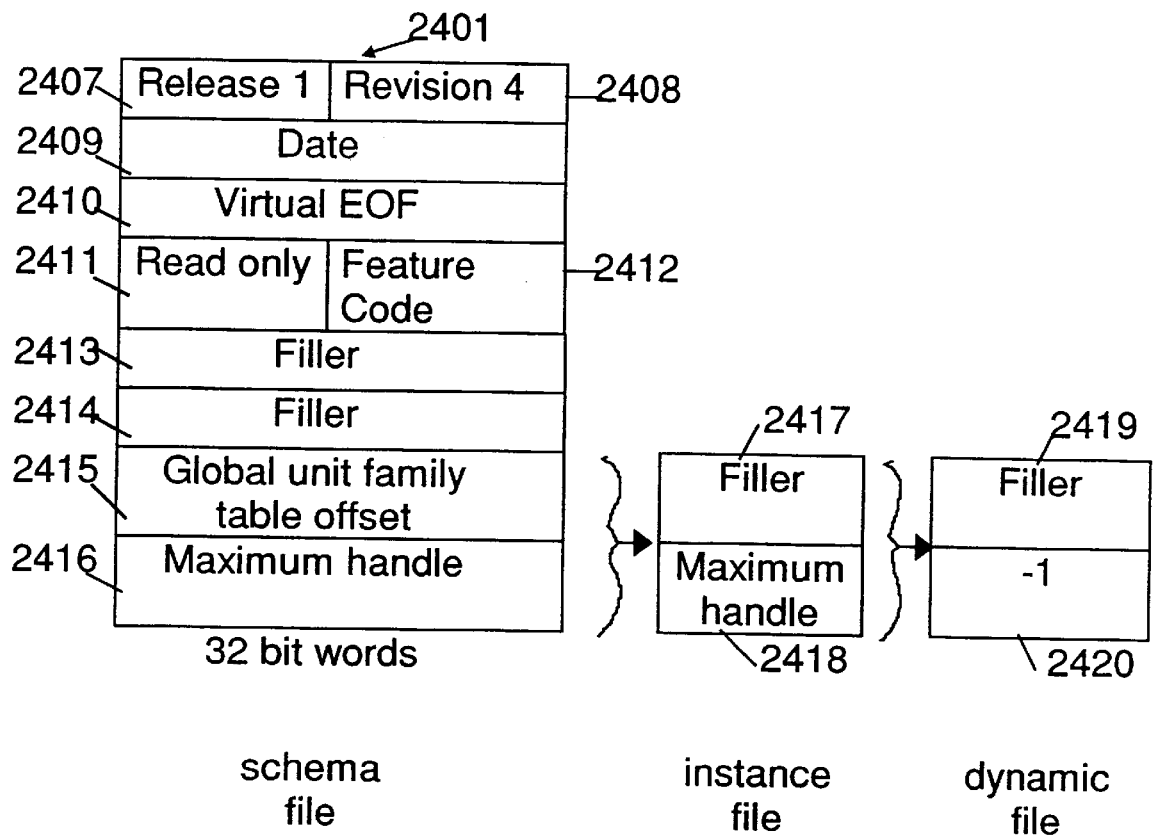
FIG. 55 shows the layout of a file header.

FIG. 55 shows the layout of the file header 2401 which is present in all three files. The first six computer storage words in the headers of the three files follow the same format across files. These six words contain the release number 2407 and revision number 2408 of the knowledge base 123, the date 2409 when the knowledge base was created, the file offset 2410 of the last location in the file which contains data, a boolean flag 2411 indicating whether the knowledge base 123 can be updated, a feature code 2412 optionally indicating the source of the data present in the file, and two filler words 2413 and 2414. The headers of all three file types will then contain two additional words. The contents of these words will vary among the files. The schema file 2404 will contain an offset into the dynamic file 2400 where a list of global units is present 2415 and the value of the maximum handle used in the schema file 2416. The instance file will contain an additional filler word 2417 and the value of the maximum handle used in the instance file 2418. The dynamic file will contain an additional filler word 2419 and a word containing the value "−1" 2420.

The objects 2405, 2406 etc. present in the schema file will be objects of various types corresponding to the various types in the schema. In most cases, the values stored in the knowledge base for a particular type of object correspond in a very straightforward fashion with the values kept in memory by the dynamic class manager 134. FIGS. 56, 57, 58, 59 and 60 show the layouts of these various objects. Each of these object types is comprised of twelve computer storage words.

Figure 56:
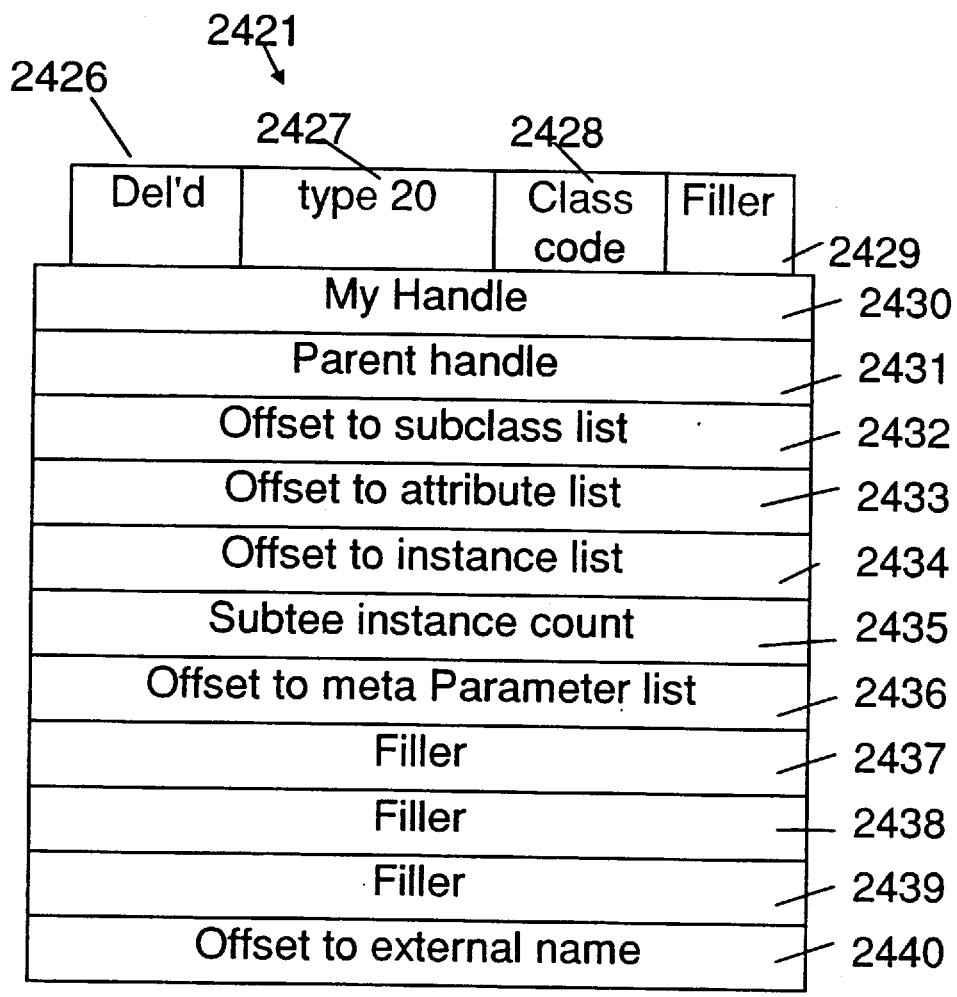
FIG. 56 shows the layout of a schema file object which represents a class in the knowledge base.

FIG. 56 shows the layout of a schema file object 2421 which represents a class in the knowledge base 123. The class object contains a flag indicating if the class has been deleted 2426, a type code which is always "20" 2427, an indicator of whether the class is a "primary", "secondary" or "collection" class 2428, an empty filler byte 2429, the handle of the class 2430, the handle of its parent class 2431, an offset into the dynamic file where the list of subclasses belonging to the class can be found 2432, an offset into the dynamic file where the list of local attributes of the class can be found 2433, an offset into the dynamic file where the list of instances belonging to the class can be found 2434, the number of instances currently located in the subtree rooted at the class 2435, an offset into the dynamic file where the list of metaparameters which belong to the class can be found 2436, three filler words 2437, 2438 and 2439 and an offset into the dynamic file where the name of the class can be found 2440.

Figure 57:
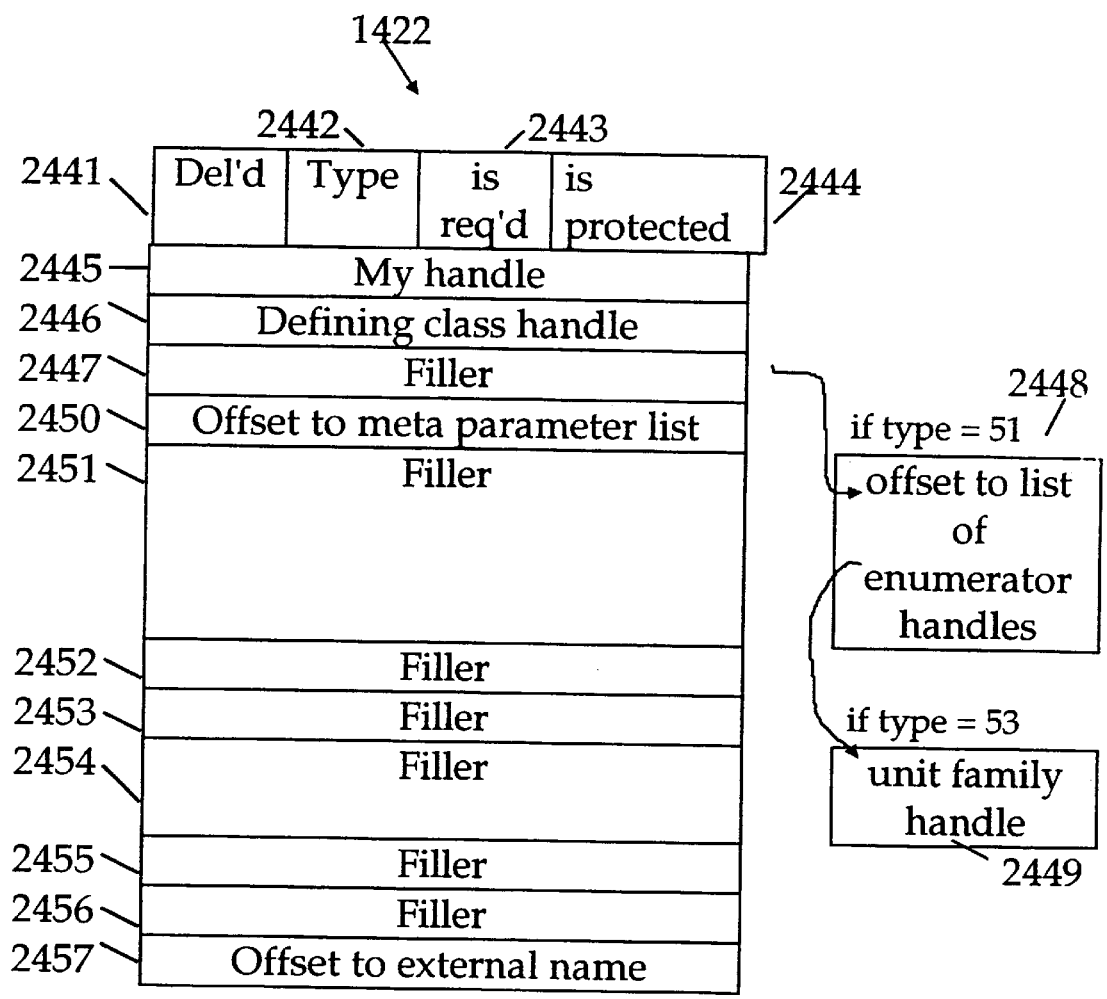
FIG. 57 shows the layout of a schema file object which represents an attribute in the knowledge base.

FIG. 57 shows the layout of a schema file object 2422 which represents an attribute in the knowledge base. The attribute object contains a flag indicating if the object has been deleted 2441, a type code 2442 which is 51 for an enumerated attribute, 52 for a boolean attribute, 53 for a numeric attribute, 54 for a string attribute and 55 for a string array attribute. It also contains a field indicating if the attribute is "required" 2443, a field indicating if it is "protected" 2444, the handle of the attribute 2445, and the handle of the class which defines the attribute 2446. If the attribute is an enumerated attribute, there will be an offset into the dynamic file where the list of enumerator handles belonging to the attribute will be found 2448. If the attribute is a numeric attribute, there will be the unit family handle 2449 for the unit family which contains the units which the numeric attribute uses. If the attribute is not of one of these two types, a filler word 2447 will be present. The attribute will contain the offset into the dynamic file where the meta-parameters for this attribute are listed 2450 and filler words 2451, 2452, 2453, 2454, 2455 and 2456. Finally, the attribute will contain the offset into the dynamic file where the attributes name is given 2457.

Figure 58:
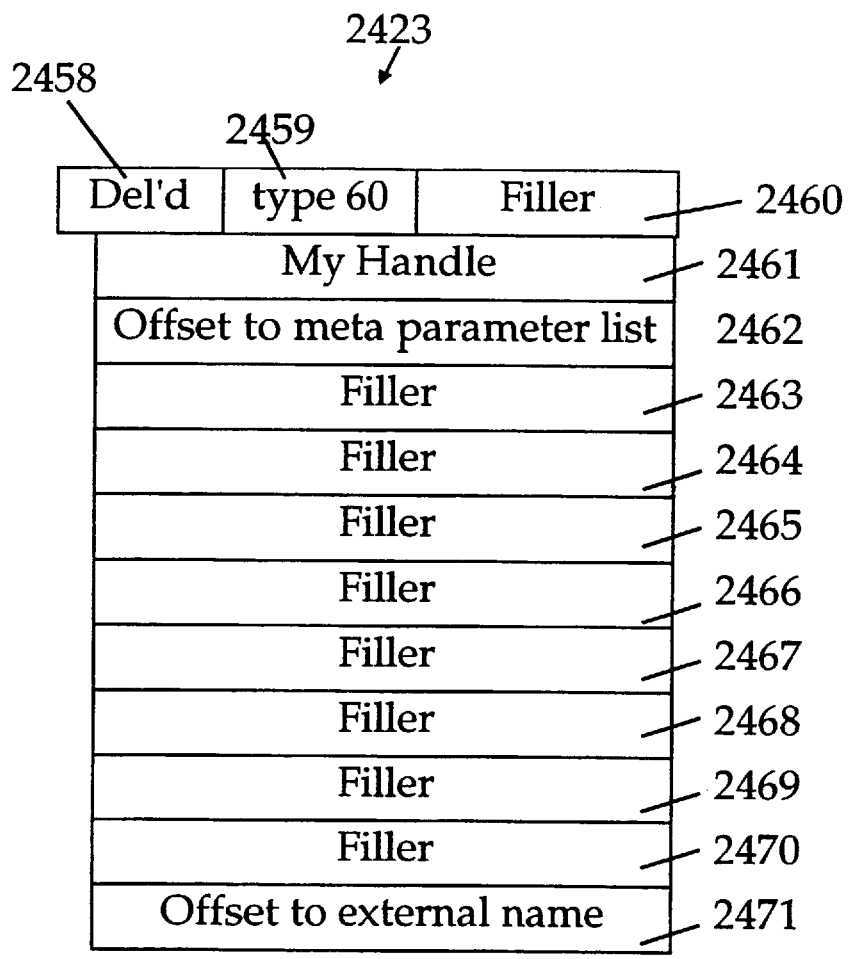
FIG. 58 shows the layout of a schema file object which represents an enumerator in the knowledge base.

FIG. 58 shows the layout of a schema file object 2423 which represents an enumerator in the knowledge base 123. The enumerator object contains a flag indicating if the object has been deleted 2458, a type code 2459 which always contains the number "60", two filler bytes 2460, the handle of the enumerator 2461, the offset into the dynamic file where the meta-parameters for the enumerator can be found 2462, filler words 2463 through 2470 and the offset into the dynamic file where the name of the enumerator is located 2471.

Figure 59:
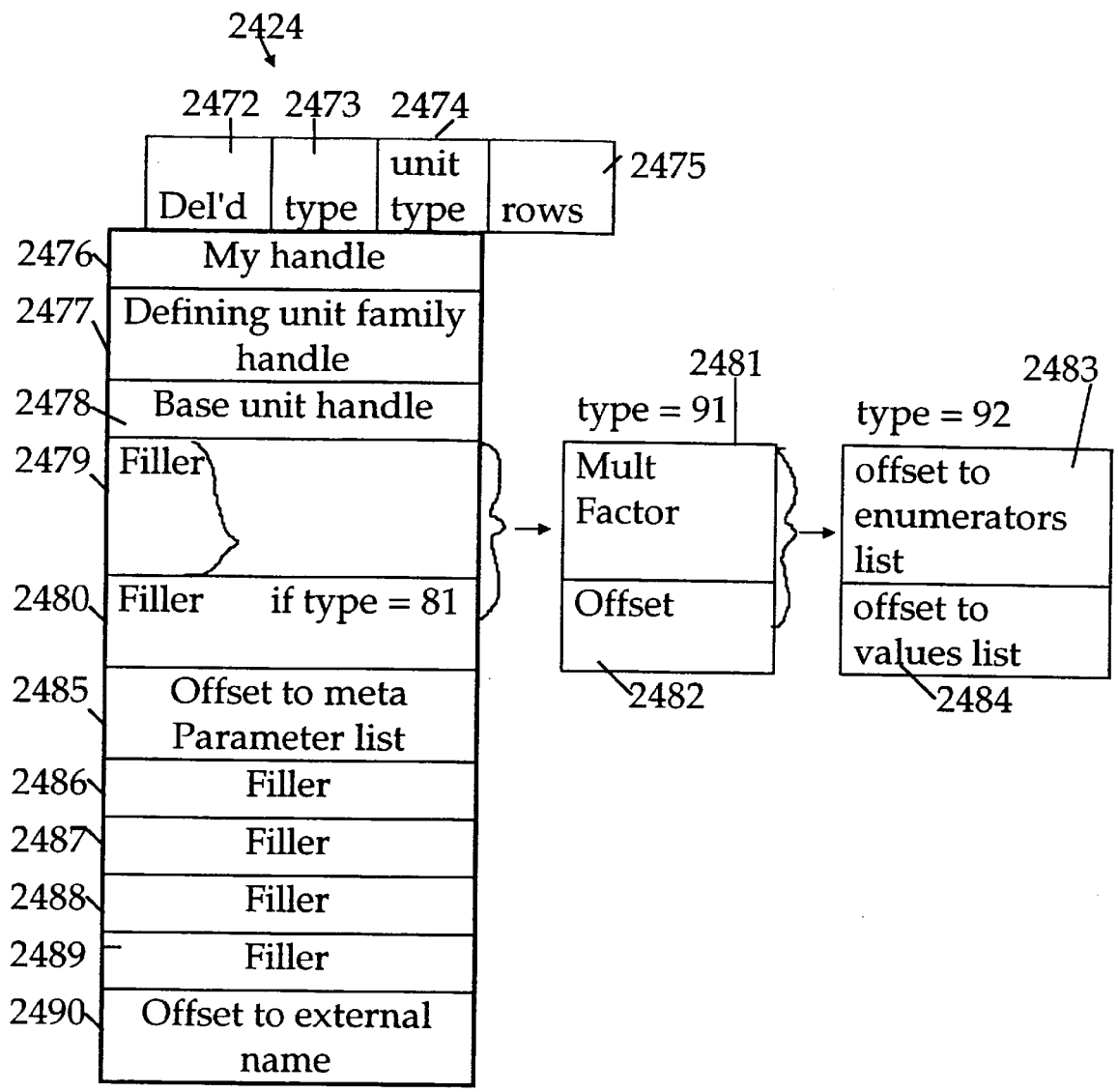
FIG. 59 shows the layout of a schema file object which represents a unit in the knowledge base.

FIG. 59 shows the layout of a schema file object 2424 which represents a unit in the knowledge base. The unit object contains a flag indicating if the object has been deleted 2472, a type code 2473 which is "81" for a base unit, "91" for a real derived unit and "92" for an enumerated table, a unit type flag indicating whether the unit is integer, real or enumerated 2474, a field which, for an enumerated unit, contains the number of rows to be displayed in the table 2475, the unit's handle 2476, the handle of the unit family which defines this unit 2477 and the handle of the base unit from which this unit is derived 2478 (or NULL if this is unit is a base unit). For a base unit, there will then be two filler words 2479 and 2480. A real derived unit has a multiplication factor 2481 and an offset 2482. An enumerated table has an offset into the dynamic file where the list of enumerator strings is located 2483 and an offset into the dynamic file where the list of real values is located 2484. All unit types then have an offset into the dynamic file where the meta-parameter list can be found 2485, four filler words 2486–2489 and an offset into the dynamic file for the unit name 2490.

Figure 60:
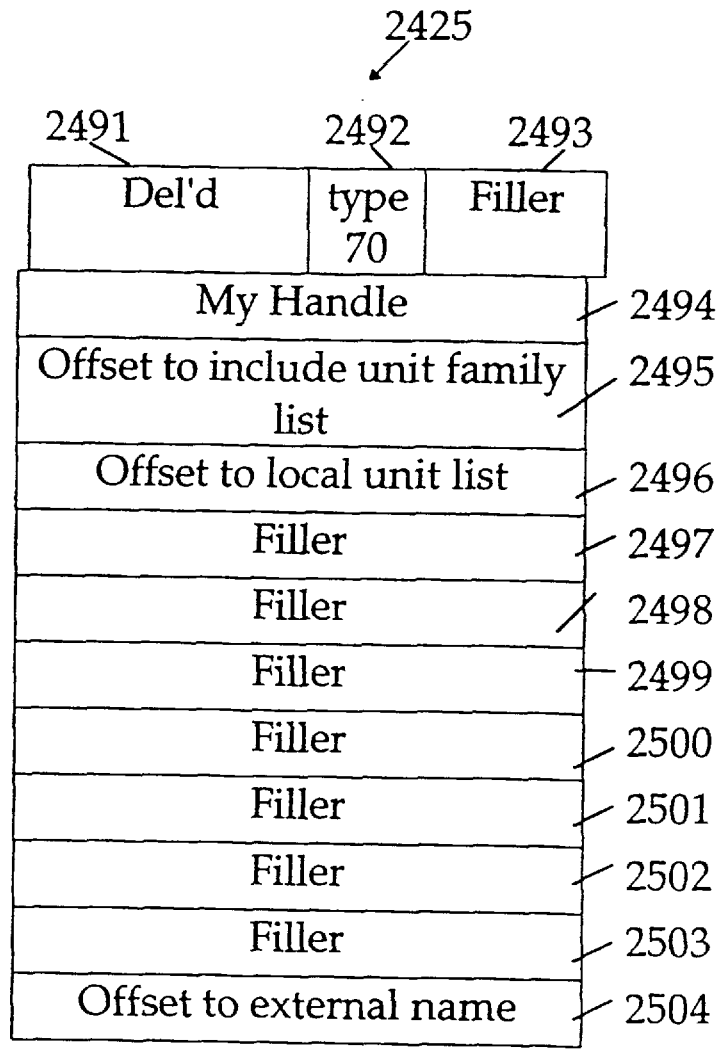
FIG. 60 shows the layout of a schema file object which represents a unit family in the knowledge base.

FIG. 60 shows the layout of a schema file object which represents a unit family in the knowledge base 2425. The unit family object contains a flag indicating if the object has been deleted 2491, a type code which is always "70", 2492, a two byte filler field 2493, the handle of the unit family 2494, the offset into the dynamic file where a list of unit family handles which are included in this unit family can be found 2495, and offset into the dynamic file where a list of unit handles defined by this family can be found 2496, seven filler words 2497–2503, and an offset into the dynamic file where the name of the unit family can be found 2504.

Figure 61:
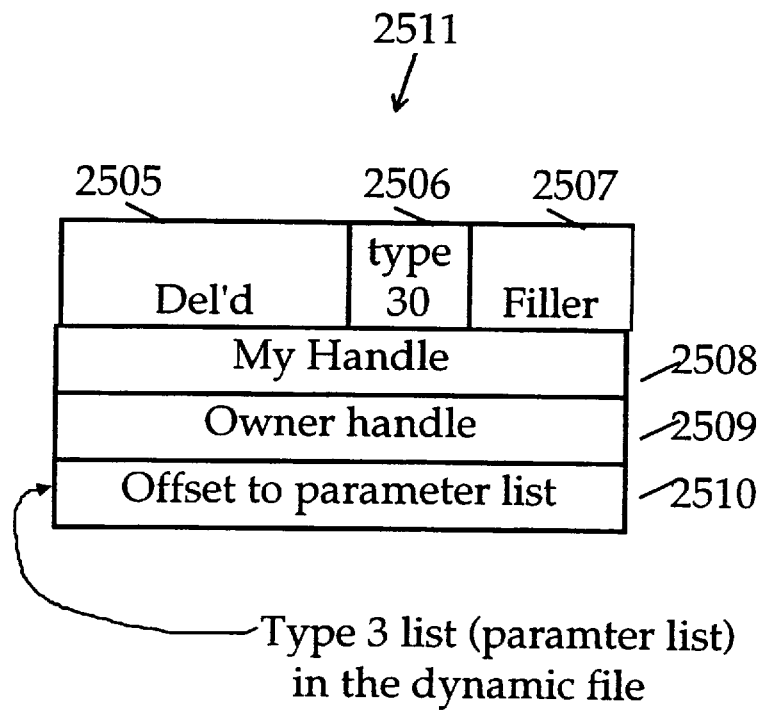
FIG. 61 shows the layout of an instance file object.

The objects 2405, 2406 etc. present in the instance file will all be instance objects. Each instance object is comprised of four computer storage words. FIG. 61 shows the layout of an instance file object 2511. The instance object contains a flag indicating if the instance has been deleted 2505, a type code which is always "30", a two-byte filler field 2507, the handle of the instance 2508, the handle of the class which owns the instance 2509, and an offset into the dynamic file where the list of parameters belonging to the instance can be found 2510.

Figure 62:
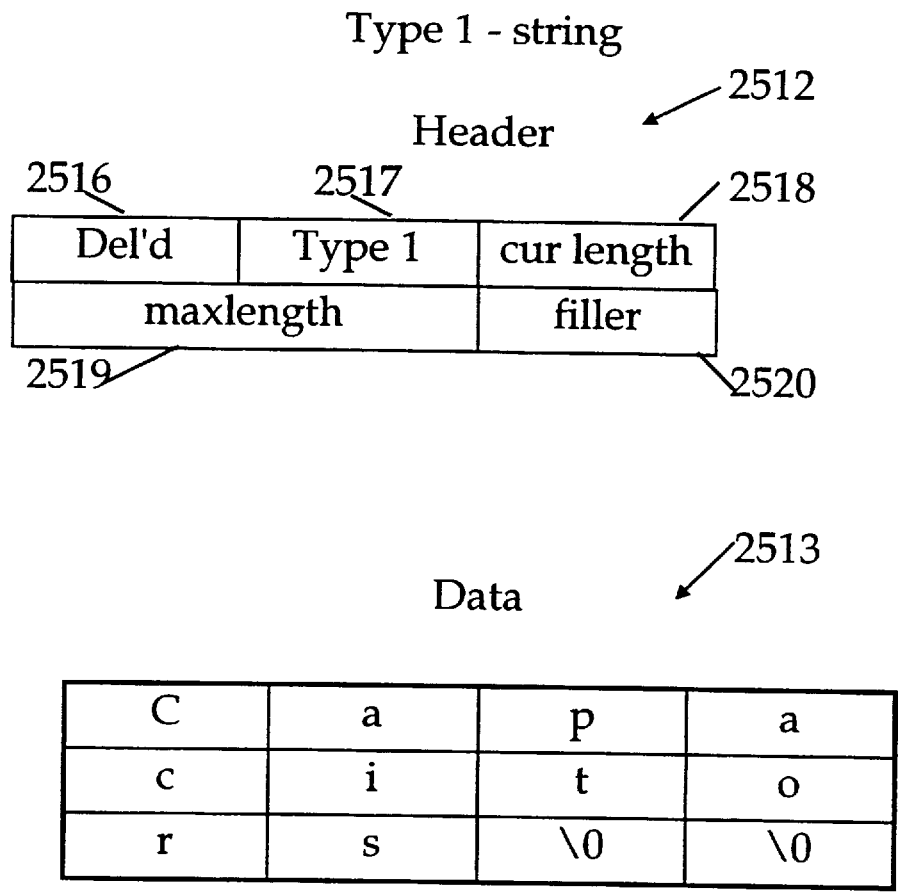
FIG. 62 shows the layout of a Type 1 dynamic object used to store a character string.
Figure 63:
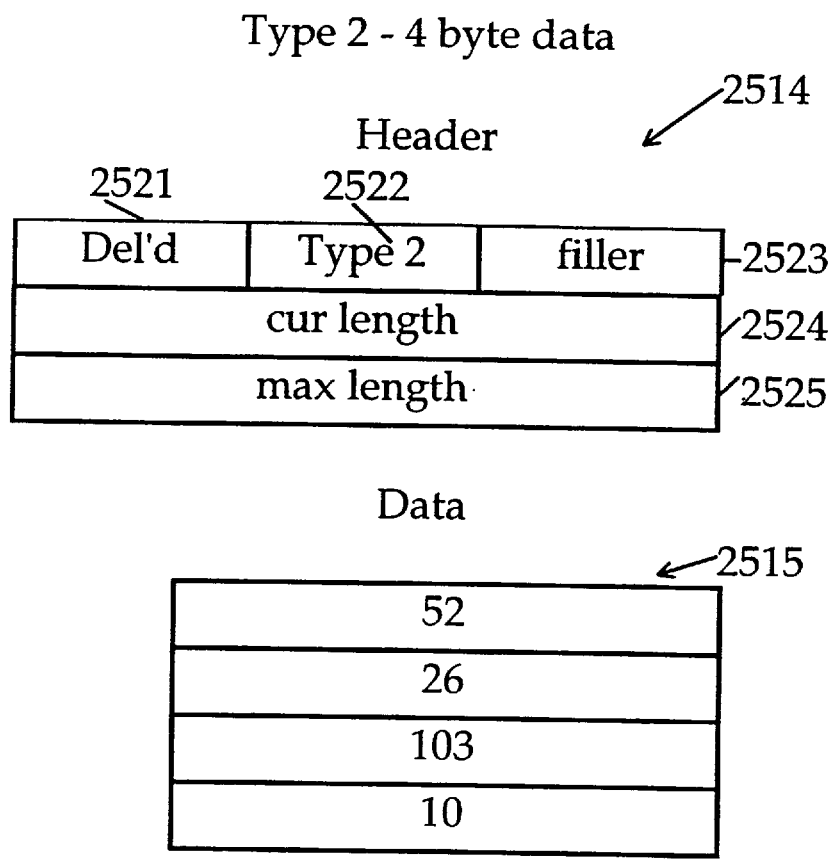
FIG. 63 shows the layout of a Type 2 dynamic object used to store data items which are four bytes in length.
Figure 64:
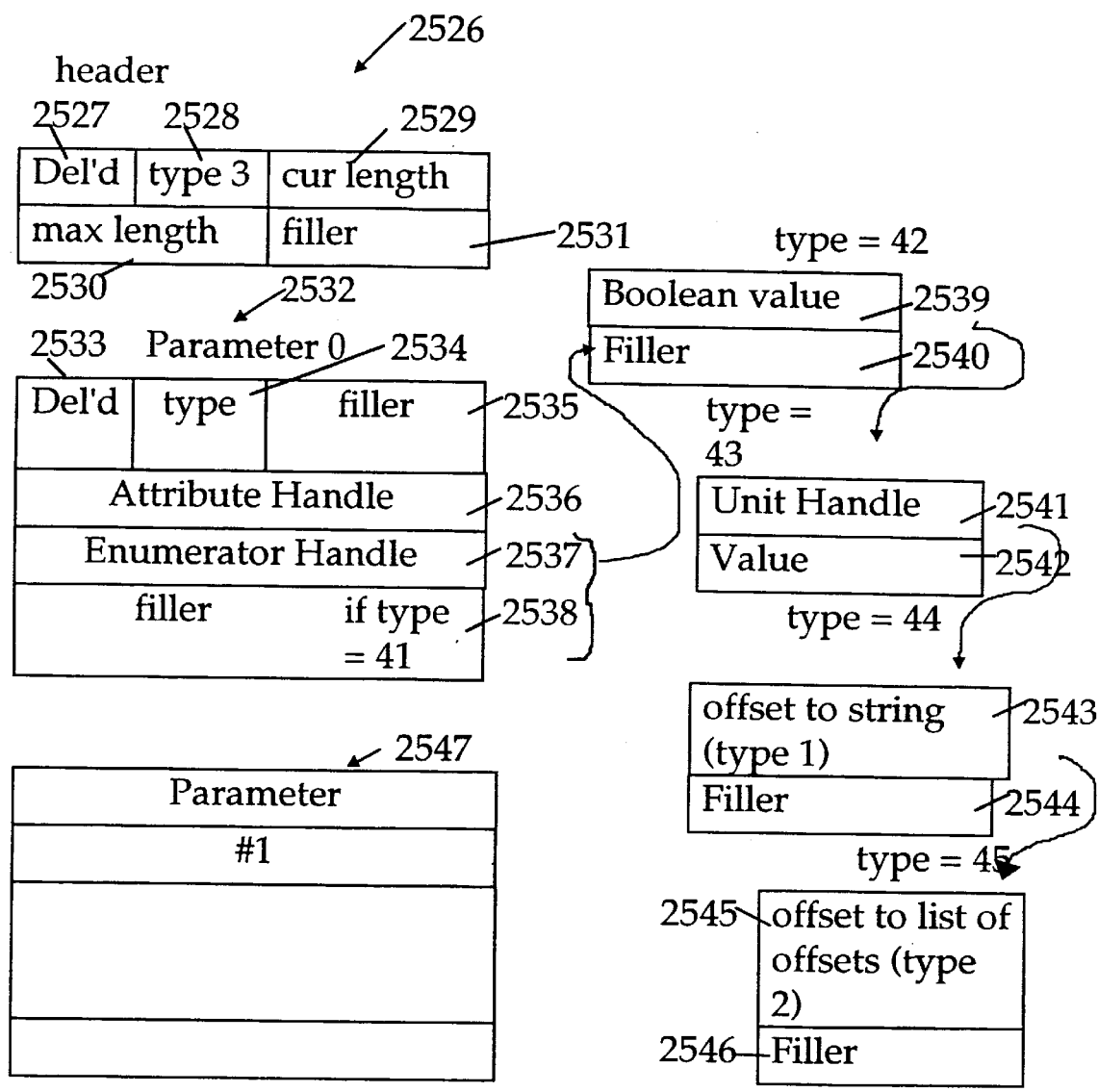
FIG. 64 shows the layout of a Type 3 dynamic object used to store parameter data.

The objects 2402, 2403 etc. present in the dynamic file are variable length objects which have various types based on the size of the components which are stored therein. FIG. 62 shows the layout of a type 1 dynamic object 2512 which is used to store a character string. A type 1 dynamic object contains a flag to indicated if it has been deleted 2516, a type code which is "1" 2517, the length of the character string stored 2518, the amount of space actually allocated in the file for the character string 2519, a two-byte filler 2520, and a block of characters which contain the stored string 2513. FIG. 63 shows the layout of a type 2 dynamic object 2514 which is used to store data items which are four bytes in length, such as handles, integers, reals, offsets, etc. A type 2 dynamic object contains a flag to indicate if it has been deleted 2521, a type code which is "2" 2522, a two-byte filler 2523, the length of the stored data 2524, the amount of space actually allocated in the file for the data 2525, and a block of data which contains the actual stored values 2515. FIG. 64 shows the layout of a type 3 dynamic object 2526 which is used to store parameter data. Each stored parameter takes 4 computer words. A type 3 dynamic object contains a flag to indicated if the object has been deleted 2527, a type code which is "3" 2528, the length of the stored data 2529, the amount of space actually allocated for the data 2530, a two-byte filler 2531, and then a succession of parameter objects 2532, 2547 and so forth. Each parameter object 2532 contains a flag indicating if the parameter has been deleted 2533, a type code which indicates if the parameter is enumerated, Boolean, numeric, string or string array 2534, a two-byte filler 2535 and the attribute handle of the attribute to which this parameter refers 2536. If the parameter is of enumerated type, the parameter object will also contain the handle of the enumerator to which the parameter is set 2537 and a filler word 2538. If the parameter is of Boolean type, the parameter object will also contain the actual Boolean value stored 2539 and a filler word 2540. If the parameter is of numeric type, the parameter object will also contain the handle of unit in which the value is expressed 2541 and the actual numeric value 2542 expressed in those units. If the parameter is of string type, the parameter will also contain an offset into the dynamic file where the string value is located 2543 and a filler word 2544. If the parameter is of string array type, the parameter will contain an offset into the dynamic file where a list of offsets to the stored character strings can be found 2545 and a filler word 2546.

7. DataBase Manager

The database manager 139 is a subsystem of the knowledge base server 132 that stores and manages high-level information about knowledge bases 123 being managed by the knowledge base server 132. A graphical representation of the data maintained by the database manager 139 is shown in FIG. 152. The database manager 139 maintains a linked list of entries about knowledge bases 123 managed by the knowledge base server 132.

The database manager 139 is responsible for concurrency control on database objects. For concurrency control, write locks are maintained on classes. A write lock has the property that read or retrieval operations may be performed on the locked class, but update operations may only be performed by the lock holder. Locks are set by the schema editor 500 and by legacy 133 to allow concurrent updaters and privacy in legacy work areas.

Only one lock holder is allowed per class. Lock holders are identified by their connection, not by user name. Locks are maintained for the length of a connection. Once a connection is destroyed by either closing the knowledge base 123 or because the connection timed out, all locks held by that connection are released.

Locking a class locks all attributes defined by that class. Locks are required for modifying attributes and classes. Locks are advisory for editing instances.

The granularity of locking is at the knowledge base, tree and class level. Locks may be set locally to a class or inherited. Local class locks are set using a class lock mechanism. These are local locks which are not inherited by subclasses of the locked class. For example, the root class of a knowledge base 123 may be class locked to prevent updates, but the subclasses may still be locked by another user.

Locks may be inherited by locking the knowledge base 123, which implicitly locks all classes in the knowledge base 123. Locks may also be inherited by locking a subtree. A subtree is locked by applying a tree lock to a class. All descendent classes of the tree locked class are locked by implication. Physically, any class locks in the subtree are subsumed by the subtree or knowledge base lock. For a user to get a tree lock, no nodes in that tree can be locked by another user.

For a more detailed discussion of lock object granularity, see Won Kim, "Object Oriented Databases", or Won Kim, "Object-Oriented Concepts, Databases, and Applications", (1989) published by ACM Press.

Figure 86:
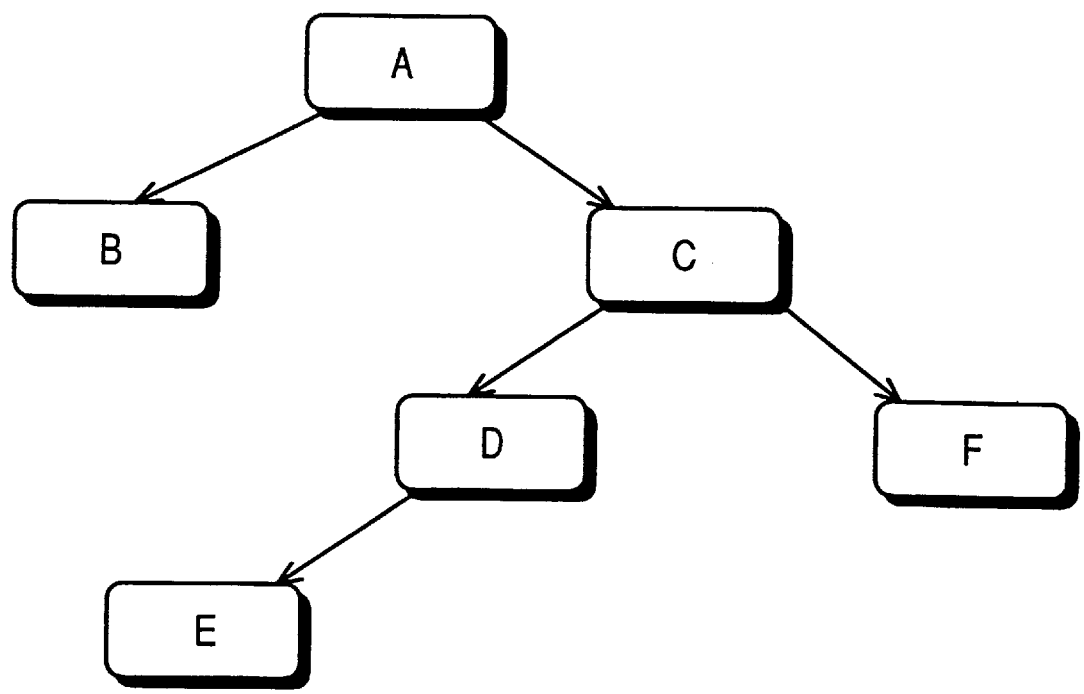
FIG. 86 is a graphical representation of the locking function.

In FIG. 86, let class B be locked by User 1. User 1 could be granted a tree lock on class A since there are no locks held in the tree by other users. In another example, let class B be locked by user 1. Locks can be granted to User 2 for classes C, D, E, and F since there are no other lock holders for those classes. User 2 can be given a local tree lock on class A, but a tree lock would be denied user 2 since class B is locked by user 1.

One feature of the invention is the ability to specify that an interface requires a lock on an attribute or class that is a parameter to the interface. The database manager 139 will check for a lock at the database manager level, and this relieves the class manager 134 from subsequent lock conflict resolution.

D. API

The application programming interface or API 143 refers to the external C or C++ language functions that provide access to the functions provided by the knowledge base server 132, registry server 141, and license manager 142 functions to client applications 130, 133, and 144.

E. Registry Server

The registry server 141 is a UNIX process that provides administration and security functions for users and knowledge bases. User administration functions include name and password management and mapping user access rights to knowledge bases 123. Knowledge base administration provided by the registry server includes RPC service mapping, host CPU mapping, and logical to physical name mapping.

F. License Manager

The license manager 142 is a UNIX server process (which in the illustrated example is called "pmxlm") that provides software license control for the software and for licensed knowledge bases 123. Satisfactory operation of the license manager 142 may be achieved using a conventional Elan License Manager available from Elan Computer Group, Inc.

G. Schema Editor

The schema editor 144 is an application that provides a graphical interface for creating, editing, and deleting schema objects. Objects may be renamed, reordered, and moved. The schema editor 144 communicates with the knowledge base client 131 using the API 143. The schema editor 144 provides an object oriented graphical user interface. A user interacts with schema editor 144 providing input through a keyboard 115 and a mouse 114. The schema editor 144 displays information on the display 116.

Figure 88:
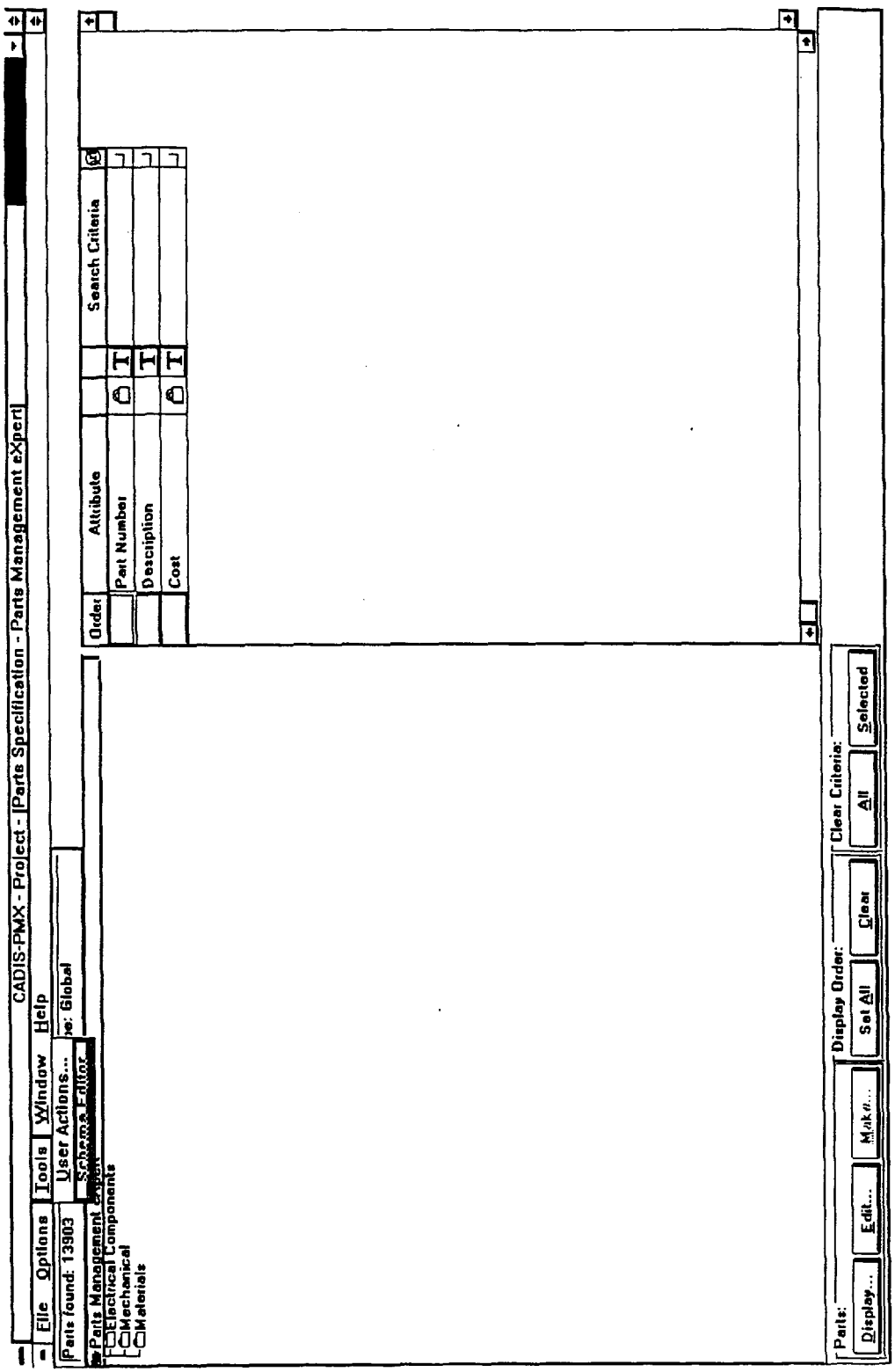
FIG. 88 depicts a display screen showing information displayed in the schema editor window.

FIG. 87 depicts a typical display that appears on the screen of the display 116 after a user successfully logs on to the system and selects schema editor from the e tools pull down menu 146 from the parts specification window 170 shown in FIG. 88. The particular example described herein is described in a Windows environment, it being understood that the invention is not limited to implementation in Windows. Those skilled in the art are familiar with Windows techniques and instructions, including how to click, double click, drag, point and select with a mouse 114. Additional information may be obtained from the Microsoft Window's User's Guide (1992), available from Microsoft Corporation, One Microsoft Way, Redmond, Wash., 98052–6399, part number 21669.

Figure 89:
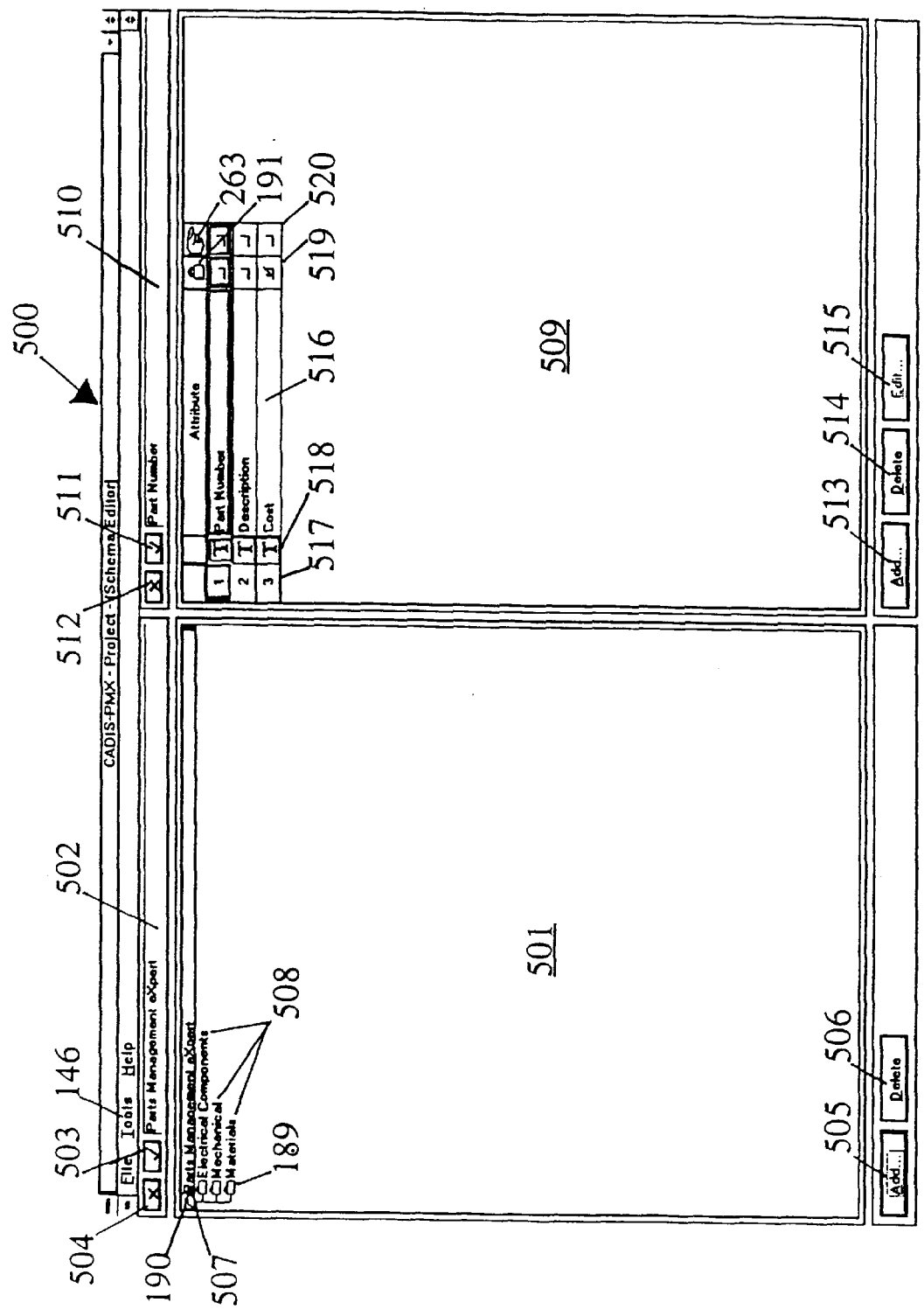
FIG. 89 depicts a display screen showing information displayed in the schema editor window.

When a user first opens the schema editor 144, a schema editing window 500 appears, as shown in FIG. 89. Initially, the left hand portion of the screen 501 displays the class title edit box 502, which is used to change the title of the selected class. The class title OK button 503 and cancel button 504 are used to accept or reject class title changes. The class add button 505 and delete button 506 are used to add or delete classes. Also displayed on the left-hand portion of the screen 501 is the root class 507 and the root subclasses 508. In the illustrated examples, the root subclasses 508 are "electrical components", "mechanical", and "materials". The root class 507 is the upper most class that has no parent. In this example, it is the name of the knowledge base 123, or the very beginning of the schema. A subclass 508 is a class that has a parent. When a class 507 is chosen, any subclasses 508 that belong to that class 507 will appear on the display 501. Subclasses are the children of the parents. For example, the parent of the mechanical subclass 508 is the root class 507, and the mechanical subclass 508 is a child of the parent root class 507. In the example shown in FIG. 89, there are three subclasses 508.

The right hand portion of the screen 509 displays the root attributes 516. In the illustrated example, the attributes are "part number", "description", and "cost". Attributes 516 are the characteristics of a class or subclass 507. Attribute number column 517 is used to display the total attributes both local and inherited for the selected class represented on the class side of the screen 501. The locks column 519 and the required column 520 are used to set locked (protected) or required attributes. The user clicks on the row of the desired attribute in the lock column 519 or the required column 520, a check mark will appear in the selected row/column if the lock or required is turned on. Locked and required attributes are used for make part described above in connection with the description of the retriever 130. Also displayed in the right hand portion of the screen 509 is attribute title edit box 510, which is used to change the title of the selected attribute. The attribute title OK button 511 and cancel button 512 are used to accept or reject attribute title changes. The attribute add button 513, delete button 514 and edit button 515 are used to add, delete, or edit certain attributes. The command name in these buttons is dimmed when the user has selected an attribute that is not owned by the selected class in area 501. The edit button is also dimmed if the attribute type is not either numeric or enumerated.

Figure 90:
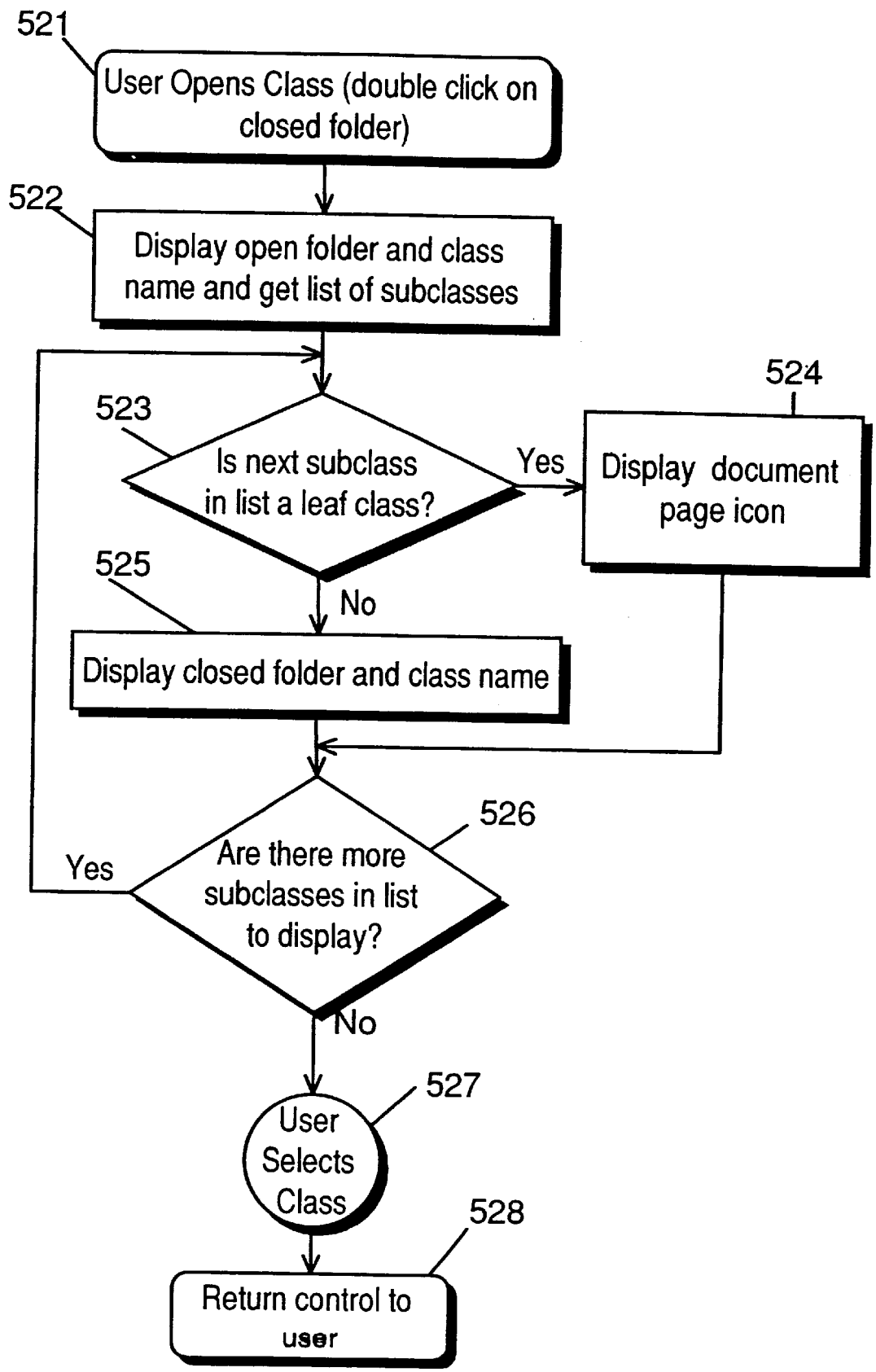
FIG. 90 is a flow chart depicting navigation of the class tree.
Figure 91:
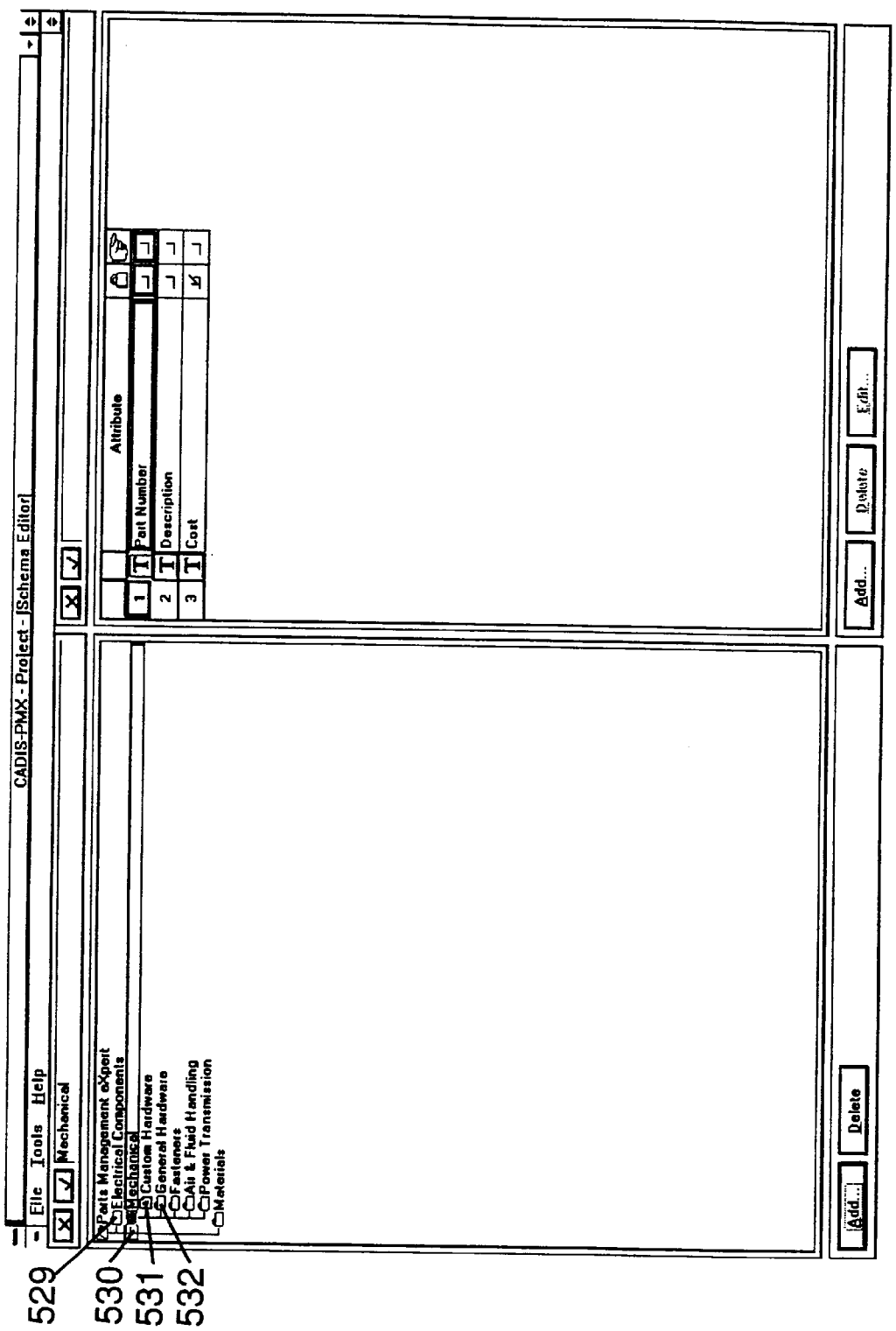
FIG. 91 depicts a display screen showing information displayed in the schema editor window.

Class tree 508 is navigated by double clicking on the closed folder icon 189 as described in the flow chart in FIG. 90 and in connection with FIG. 91. The user double clicks on a closed folder icon 529 in step 521, an open folder is displayed and a list of subclasses is obtained in step 522. For each subclass that was obtained, an icon 531, 532 is displayed to represent a leaf class 531 in step 524 or a subclass 532 in step 525. Attributes are displayed for the selected class in area 509 and control is returned back to the user in step 528. Classes are closed by double clicking on an open folder icon 190, this displays a closed folder icon 529 and collapses all subclasses of the selected class. Leaf classes do not have any subclasses and are displayed as document icons 531. Leaf classes 531 cannot be opened or closed.

Figure 92:
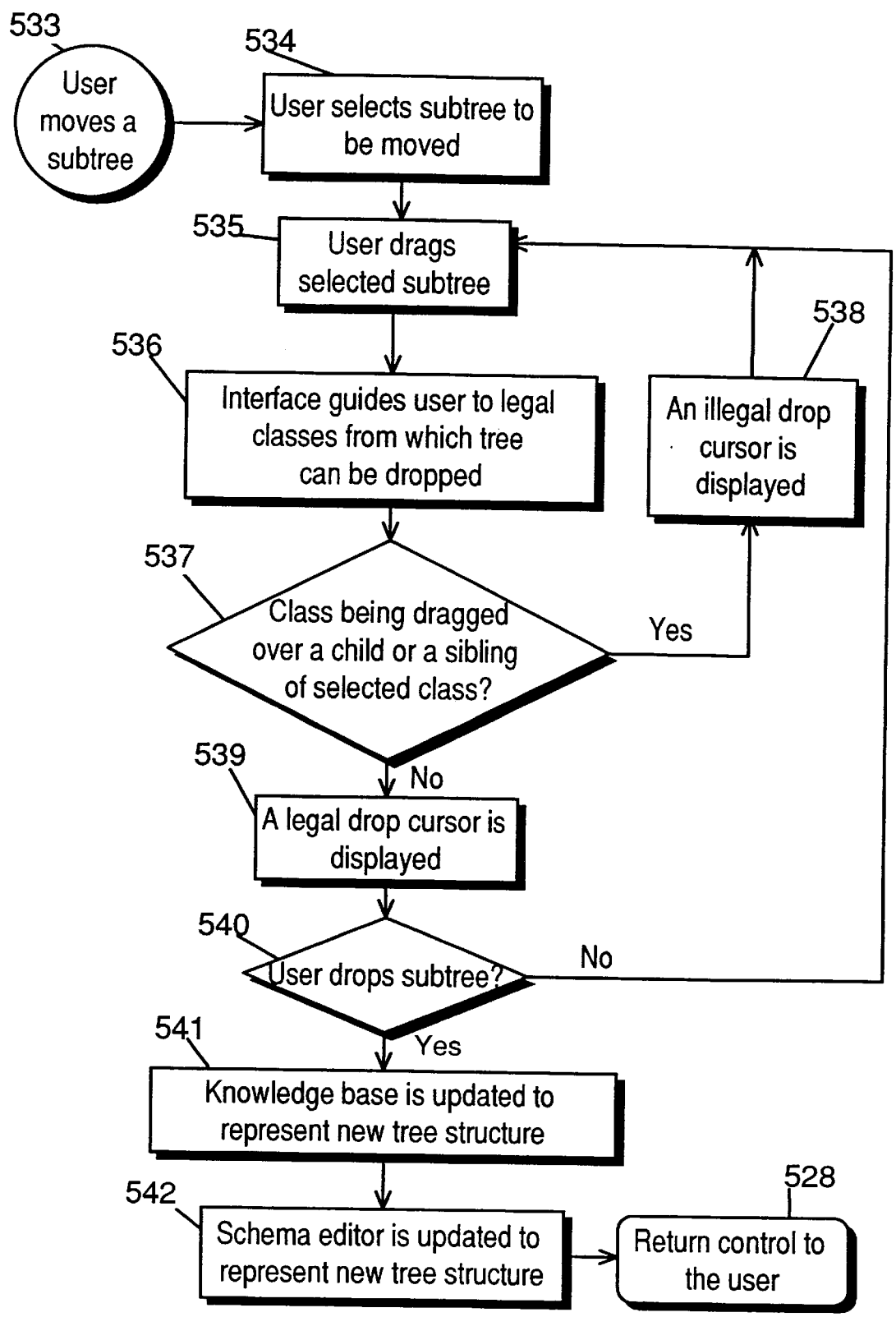
FIG. 92 is a flow chart depicting reparenting a class to a new subclass.
Figure 93:
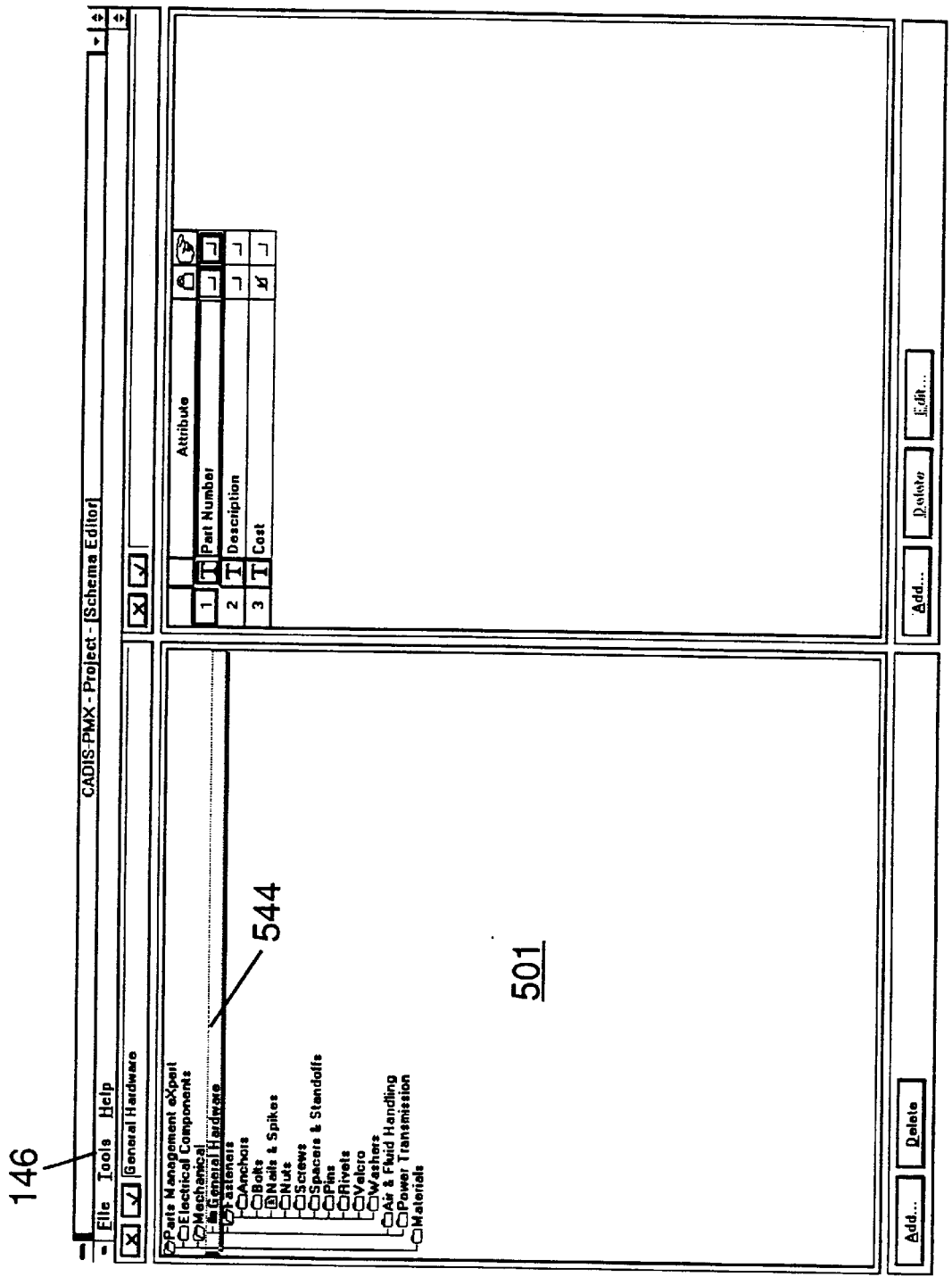
FIG. 93 depicts a display screen showing information displayed in the schema editor window.
Figure 94:
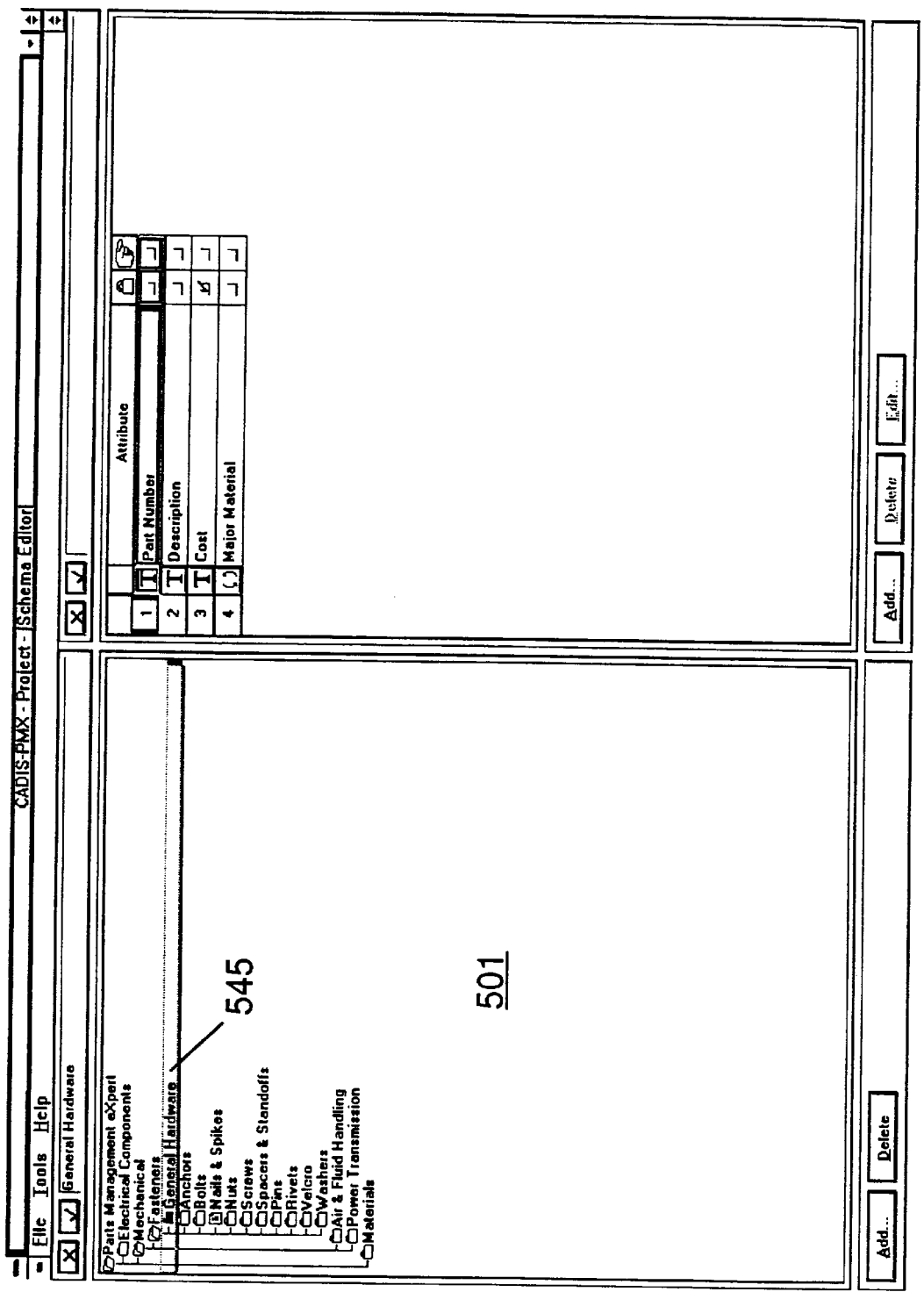
FIG. 94 depicts a display screen showing information displayed in the schema editor window.

A class can be reparented to a new subclass as described in the flow chart of FIG. 92 and in connection with FIGS. 93–94. The user selects the subtree to be moved in step 534 which is highlighted 544 in screen area 501. In step 535, the user holds the mouse button down 117 and the control key on the keyboard 122 and drags the class in area 501 onto the class that is to become the new parent of the selected class being dragged 544. As the user is dragging the selected class, the class being dragged over is highlighted and the mouse cursor is changed to a no drop icon in step 538 if the class is a sibling of the selected class being dragged in step 535. If the class being dragged over is not a sibling of the selected class 544 being dragged, the cursor is changed to a drop icon in step 539. When the user drops the selected class being dragged in step 540 on a legal drop class, the knowledge base 123 is updated to represent the new class structure in step 541. The class tree 501 is also updated to represent the new class tree 542 and 545. Control is then returned to the user 528.

Figure 95:
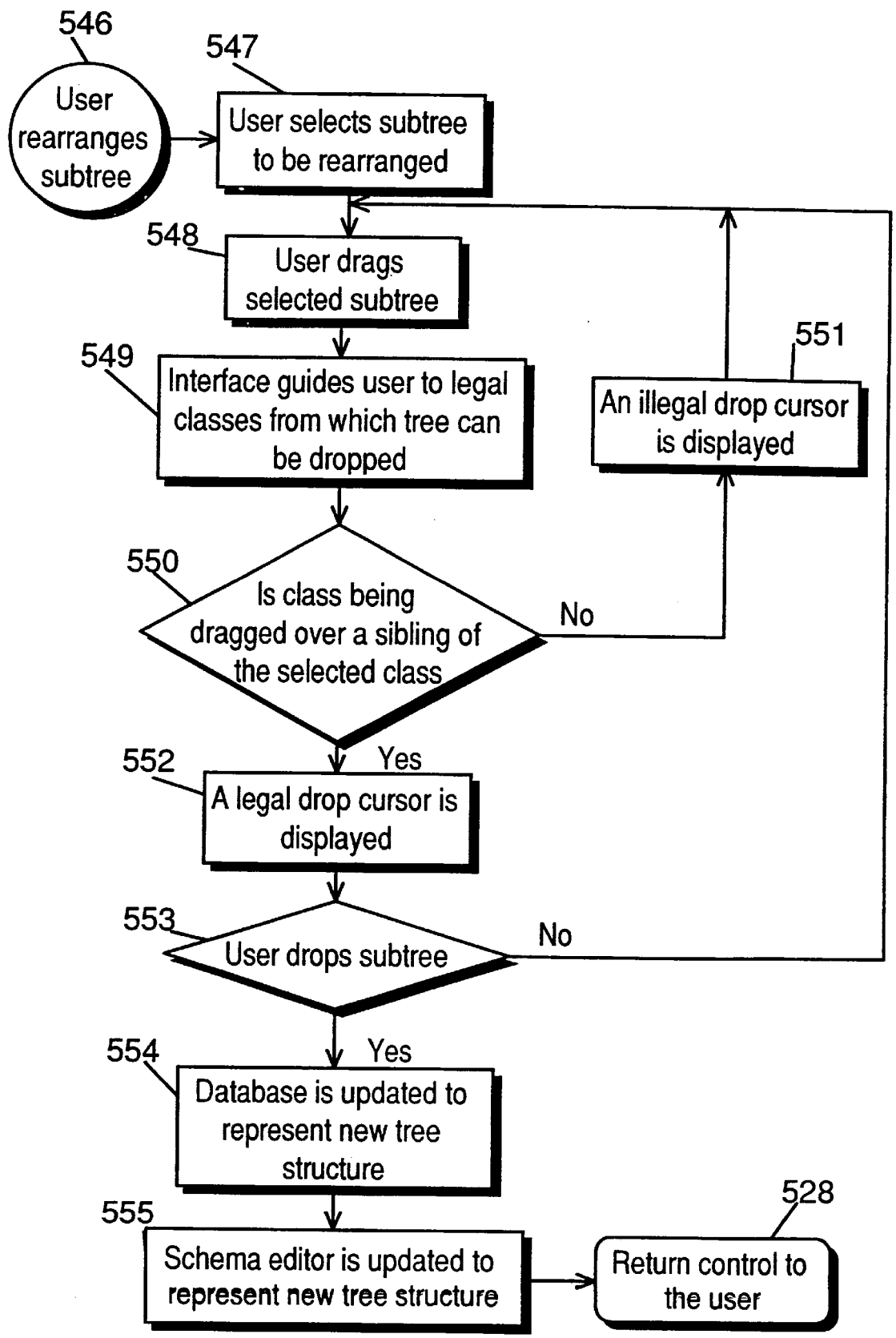
FIG. 95 is a flow chart depicting rearranging a class in the schema editor.
Figure 96:
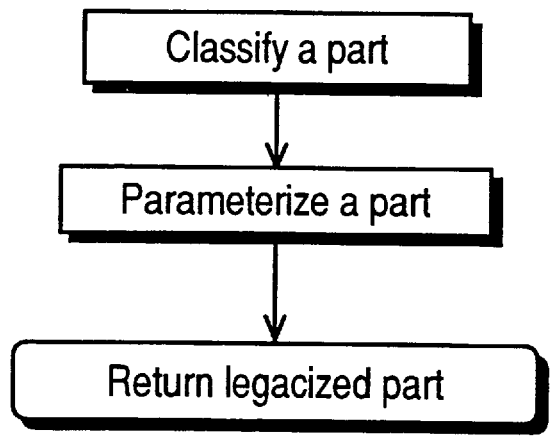
FIG. 96 is the flow chart for the overall legacy procedures in the class manager.
Figure 97:
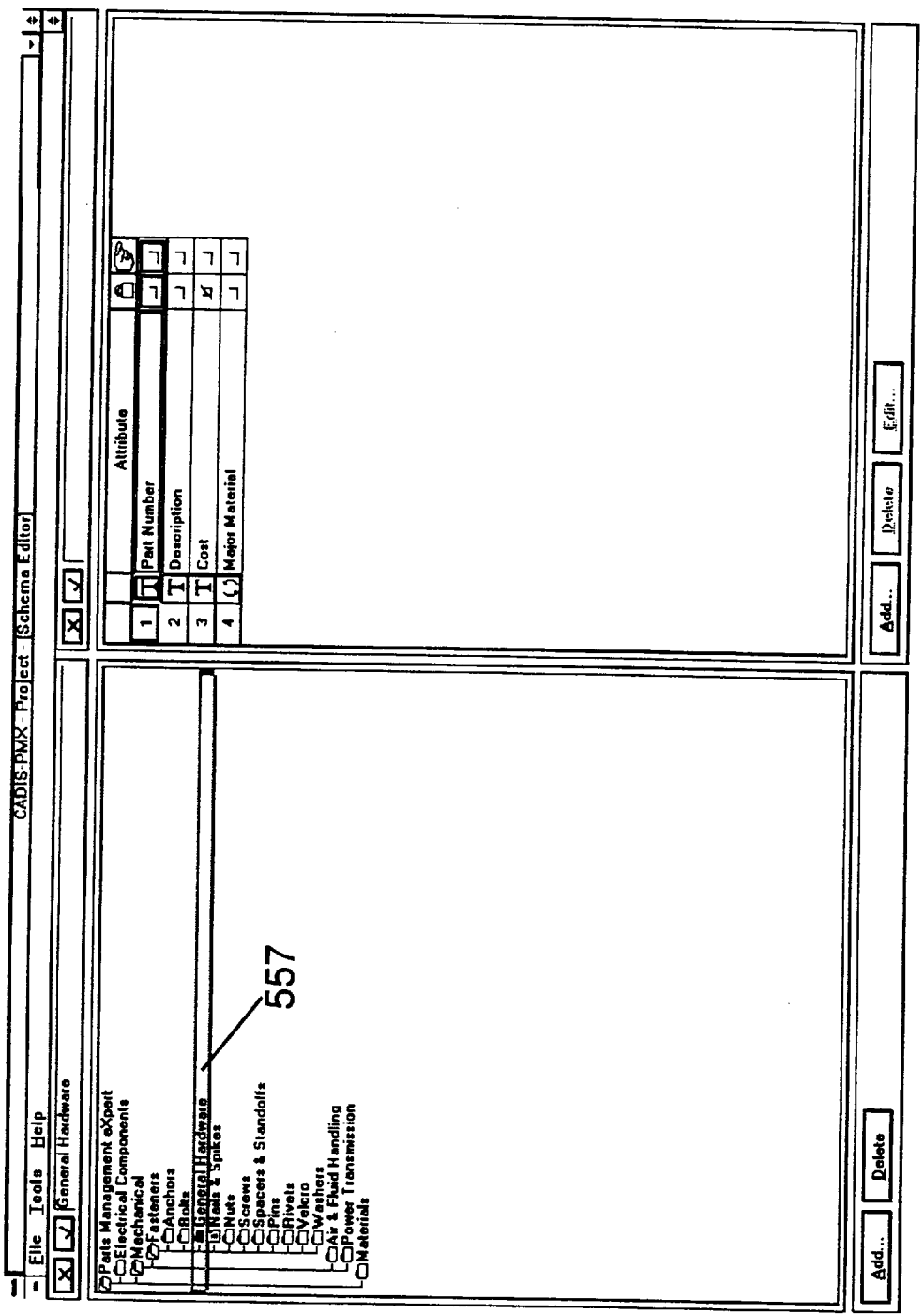
FIG. 97 depicts a display screen showing information displayed in the schema editor window.

A class can be rearranged within a subclass with sibling classes as described in the flow chart of FIG. 95 and in connection with FIGS. 96–97. The user selects the subtree 545 to be rearranged in step 547 from screen area 501. The user holds the mouse button down 117 and drags the class in area 501 onto the class that is to become the new location of the selected class being dragged in step 547. As the user is dragging the selected class, the class being dragged over is highlighted and the mouse cursor is changed to a no drop icon in step 551 if the class is not a sibling of the selected class being dragged in step 547. If the class being dragged over is a sibling of the selected class being dragged in step 547 the cursor is changed to a drop icon in step 552. When the user drops the selected class being dragged in step 553 on a legal drop class, the knowledge base 123 is updated to represent the new class structure in step 554. The class tree 501 is also updated to represent the new class tree 557 in step 555. Control is then returned to the user in step 528.

Figure 98:
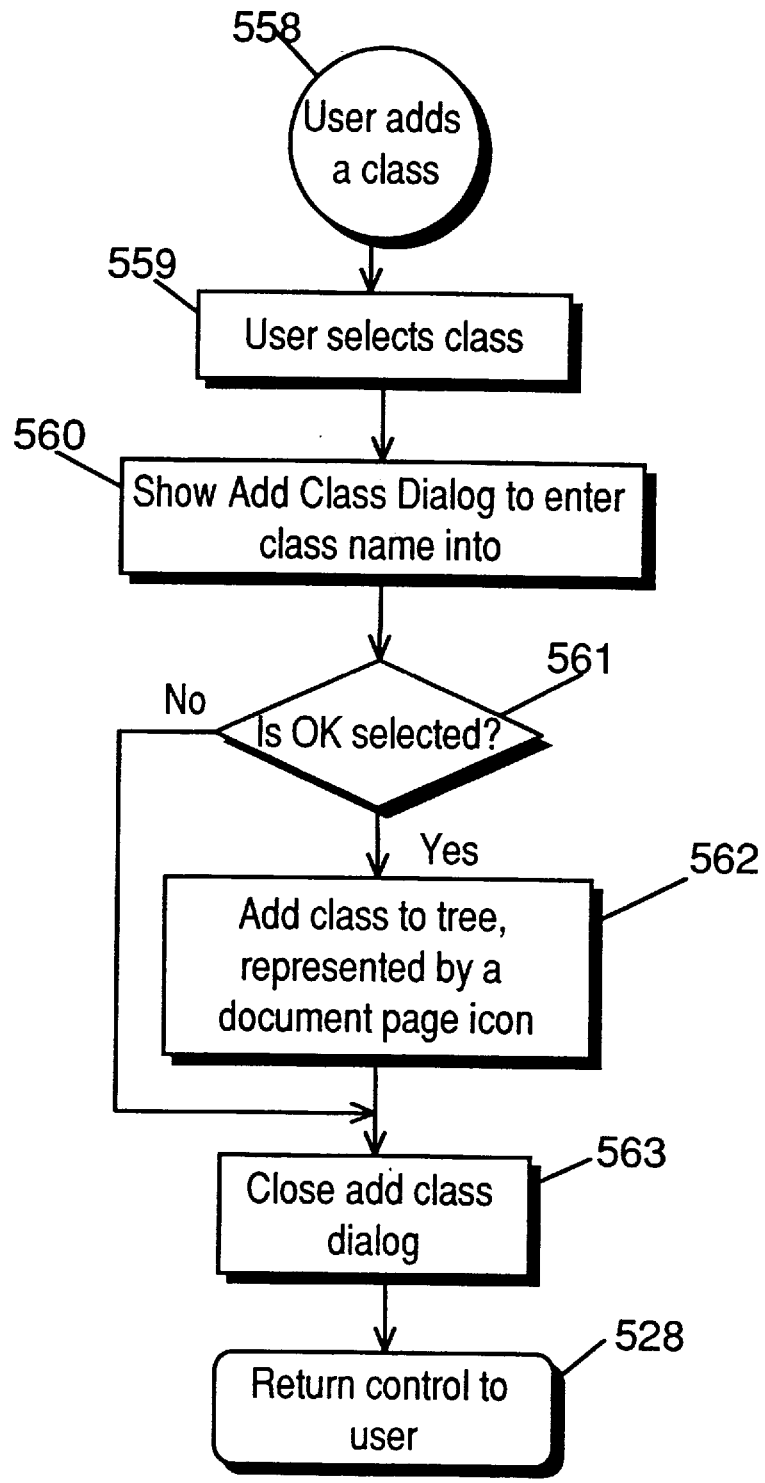
FIG. 98 depicts adding new classes in the schema editor window.
Figure 99:
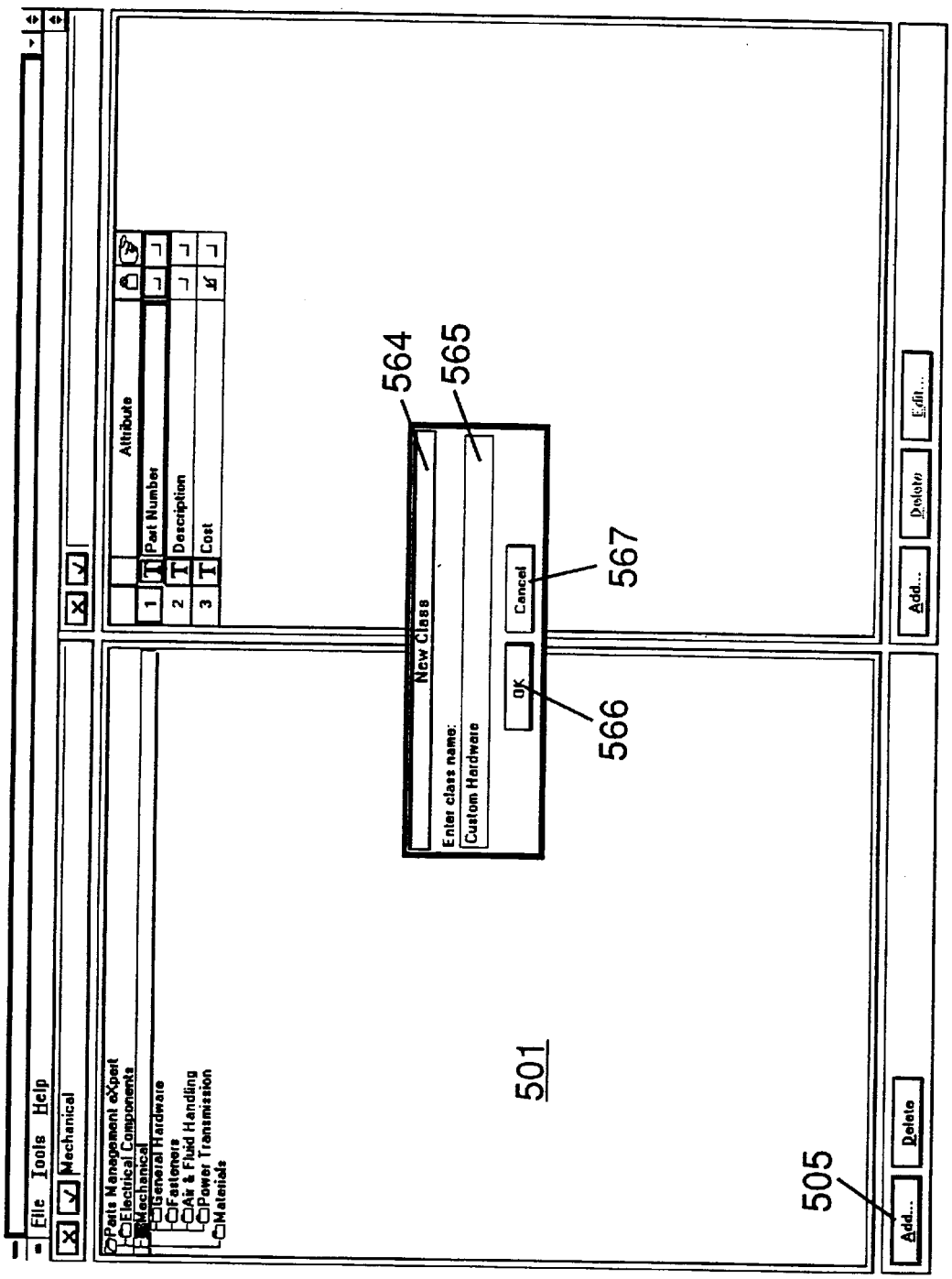
FIG. 99 depicts a display screen showing information displayed in the schema editor window.
Figure 100:
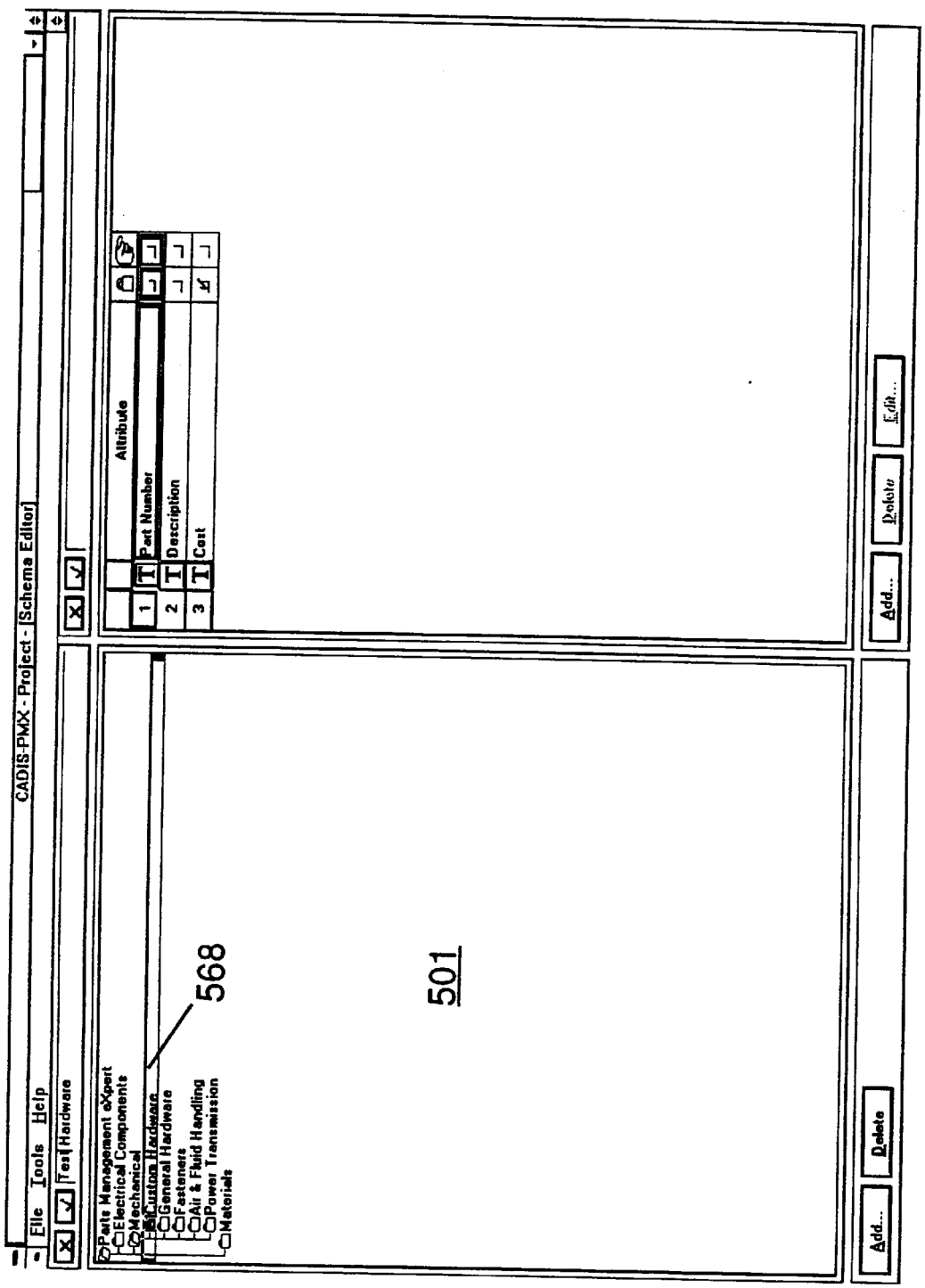
FIG. 100 depicts a display screen showing information displayed in the schema editor window.

New classes are added using the add button 505 as described in flow chart FIG. 98 and in connection with FIG. 99–100. The user selects a class in the class tree area 501 that will be used as the parent of the class to be added. The user selects the add button 505 and the add class dialog 564 appears in step 560. The new class title is entered into the dialog box in step 560. In this example "custom hardware" has been entered in text entry field 565. The user then selects either the OK button 566 or the cancel button 567. If the OK button 566 is selected in step 561 the new class is added to the knowledge base. The screen 501 is updated to show the new class tree 568 in step 562, as shown in FIG. 100. The new class is a leaf class and is represented as a document icon 531. If the parent class was a leaf class the parent class icon will be changed to a open folder icon 530. The add class dialog 564 is closed in step 563 and control is returned to the user in step 528. If the cancel button is selected the add class dialog box 564 is closed in step 563 and control is returned to the user in step 528.

Figure 101:
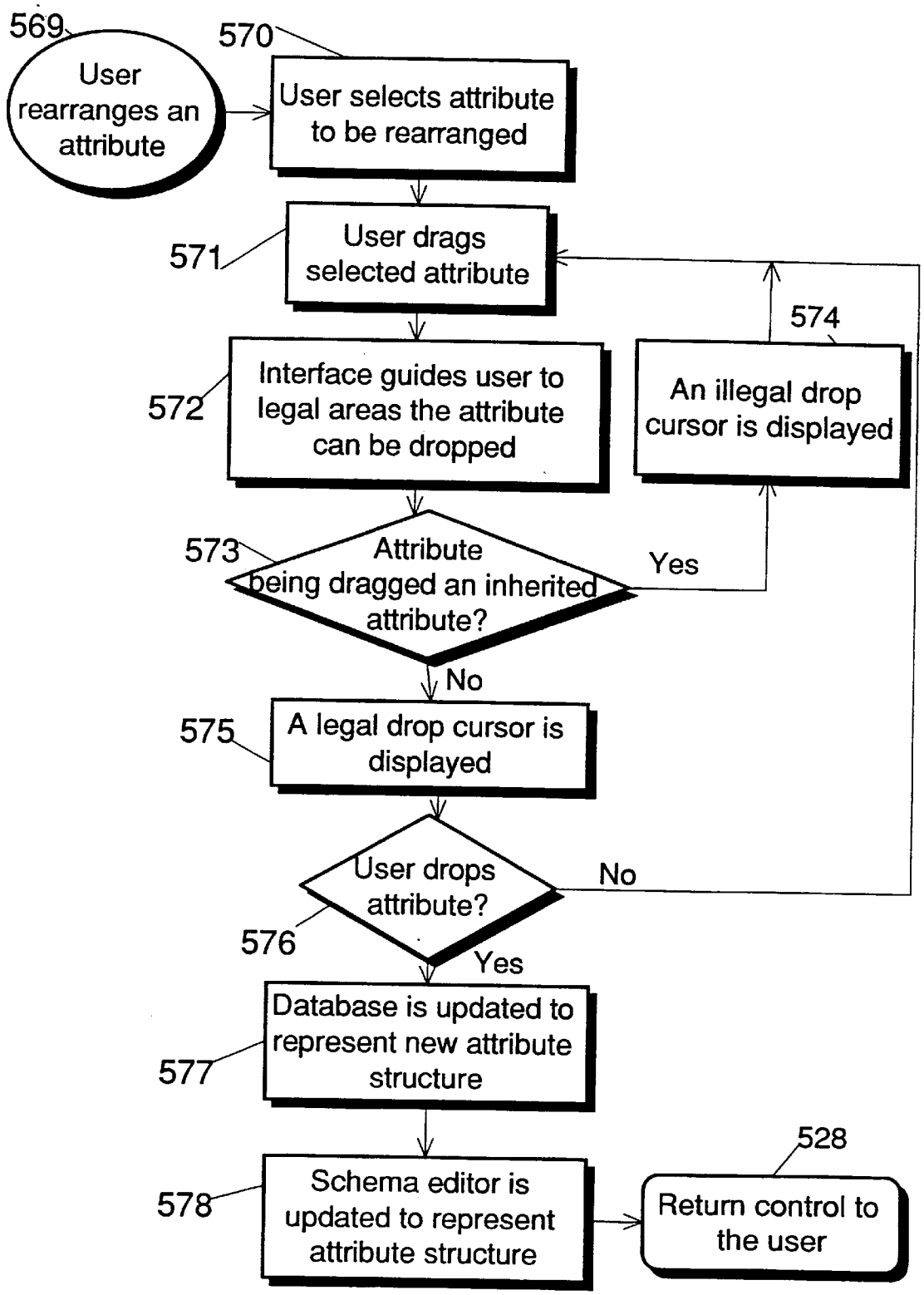
FIG. 101 is a flow chart depicting rearranging attributes in the schema editor.
Figure 102:
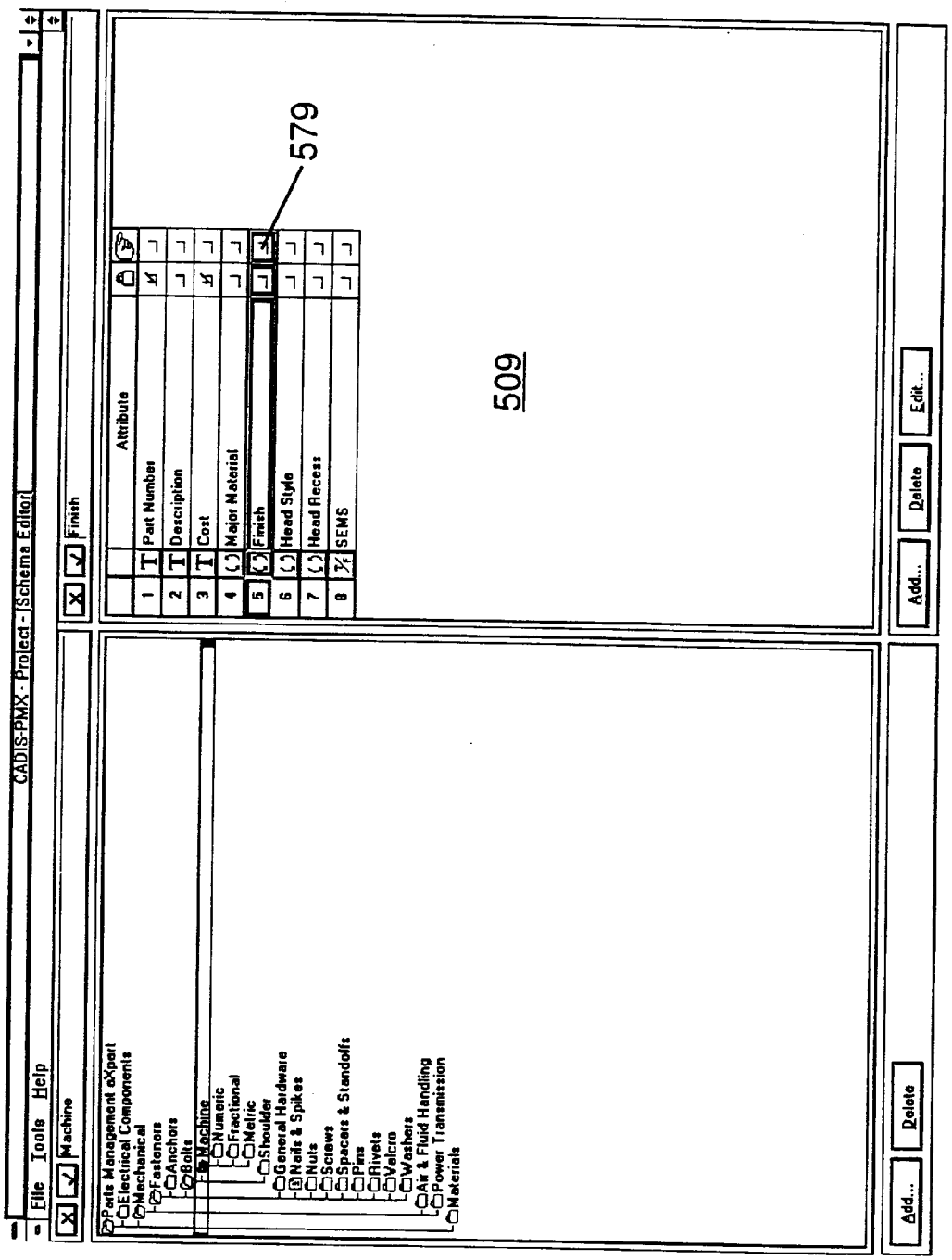
FIG. 102 depicts a display screen showing information displayed in the schema editor window.
Figure 103:
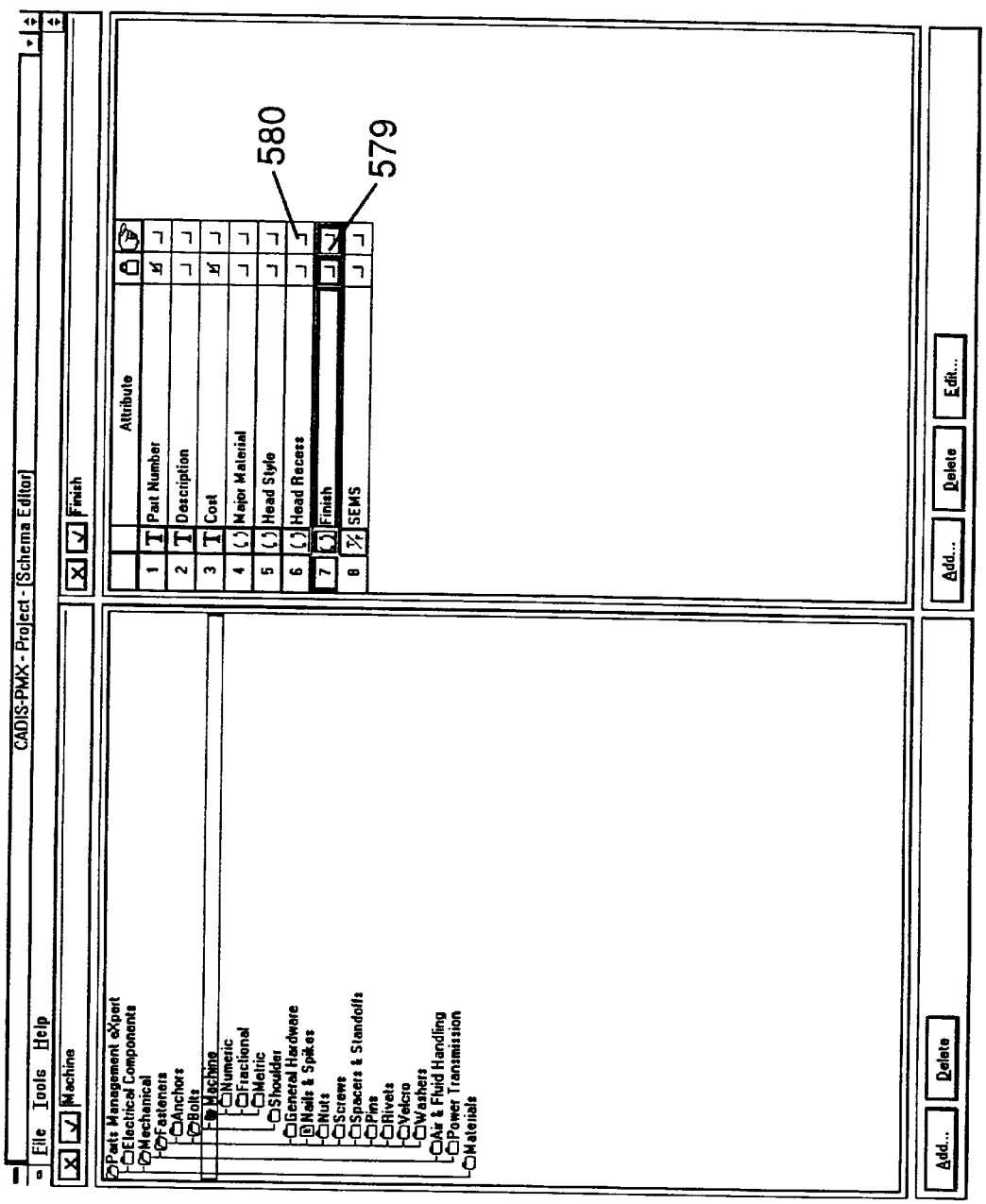
FIG. 103 depicts a display screen showing information displayed in the schema editor window.

An attribute can be rearranged as described in the flow chart of FIG. 101 and in connection with FIGS. 102 and 103. In this example "finish" 579 will be rearranged under "head recess" 580. The user selects the attribute 579 to be rearranged in step 570 from screen area 509. The user holds the mouse button down 117 and drags attribute 579 in the attribute area 509 onto the attribute 580 that is to become the new location of the selected attribute being dragged in step 576. As the user is dragging the selected attribute in step 570, the attribute being dragged over is highlighted in step 572 and the mouse cursor is changed to a no drop icon in step 574 if the class is an inherited attribute. See step 573. If the attribute being dragged over is not an inherited attribute the cursor is changed to a drop icon 575. When the user drops the selected attribute being dragged in step 576 on a legal drop attribute, the knowledge base 123 is updated to represent the new attribute structure in step 577. The attribute area 509 is also updated to represent the new attribute structure 579 in step 578 as shown in FIG. 103. Control is then returned to the user in step 528.

Figure 104:
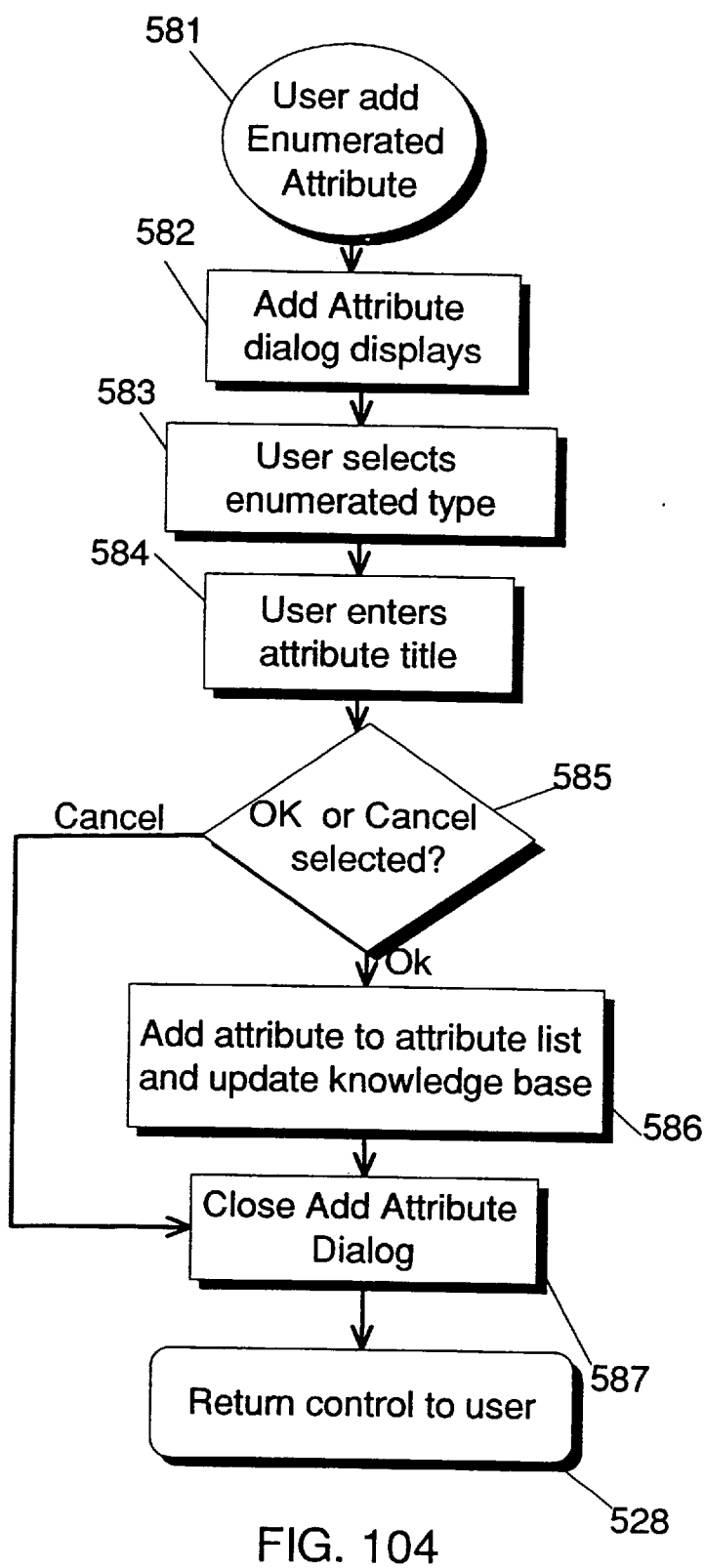
FIG. 104 is a flow chart depicting the addition of a new enumerated attribute in the schema editor window.
Figure 105:
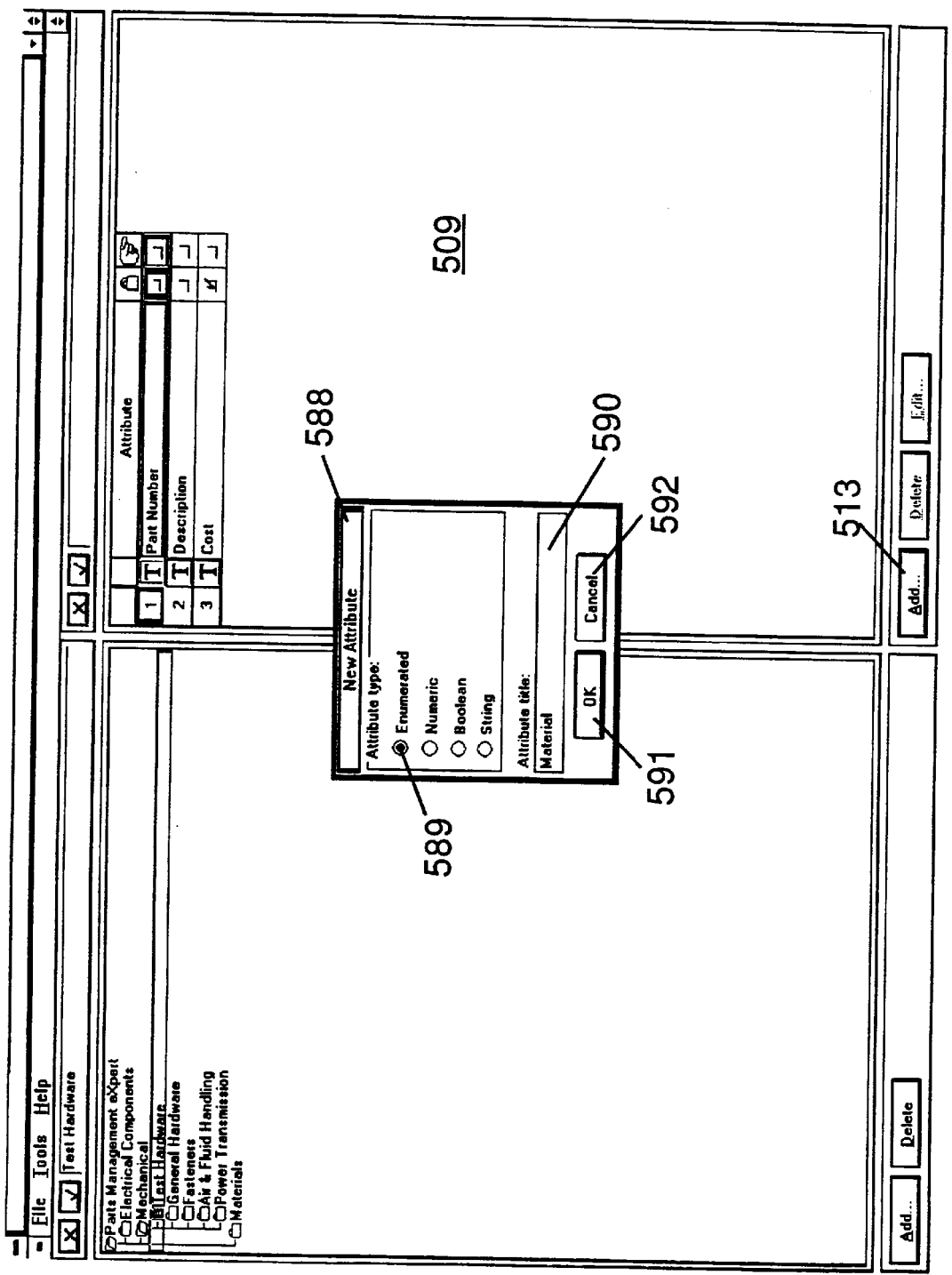
FIG. 105 depicts a display screen showing information displayed in the schema editor window.

A new enumerated attribute can be added as described in the flow chart of FIG. 104 as shown in FIG. 105. In this example a new enumerated attribute titled "material" is added. The user selects the add button 513 from screen area 509. The add attribute dialog 588 is displayed in step 582. The user selects the type of attribute to add, in this example enumerated 589 is selected in step 583. In step 584, the user then enters an attribute title to represent the enumerated attribute, in this example the user entered "material" 590. The user can then select either the OK button or the cancel button in step 585. If OK is selected, the knowledge base is updated and the attribute list in area 509 is updated to include the added attribute in step 586 and the add attribute dialog is closed in step 587. Control is then returned to the user in step 528. If the cancel button is selected, the add attribute dialog is closed in step 587 and control is returned to the user in step 528.

Figure 106:
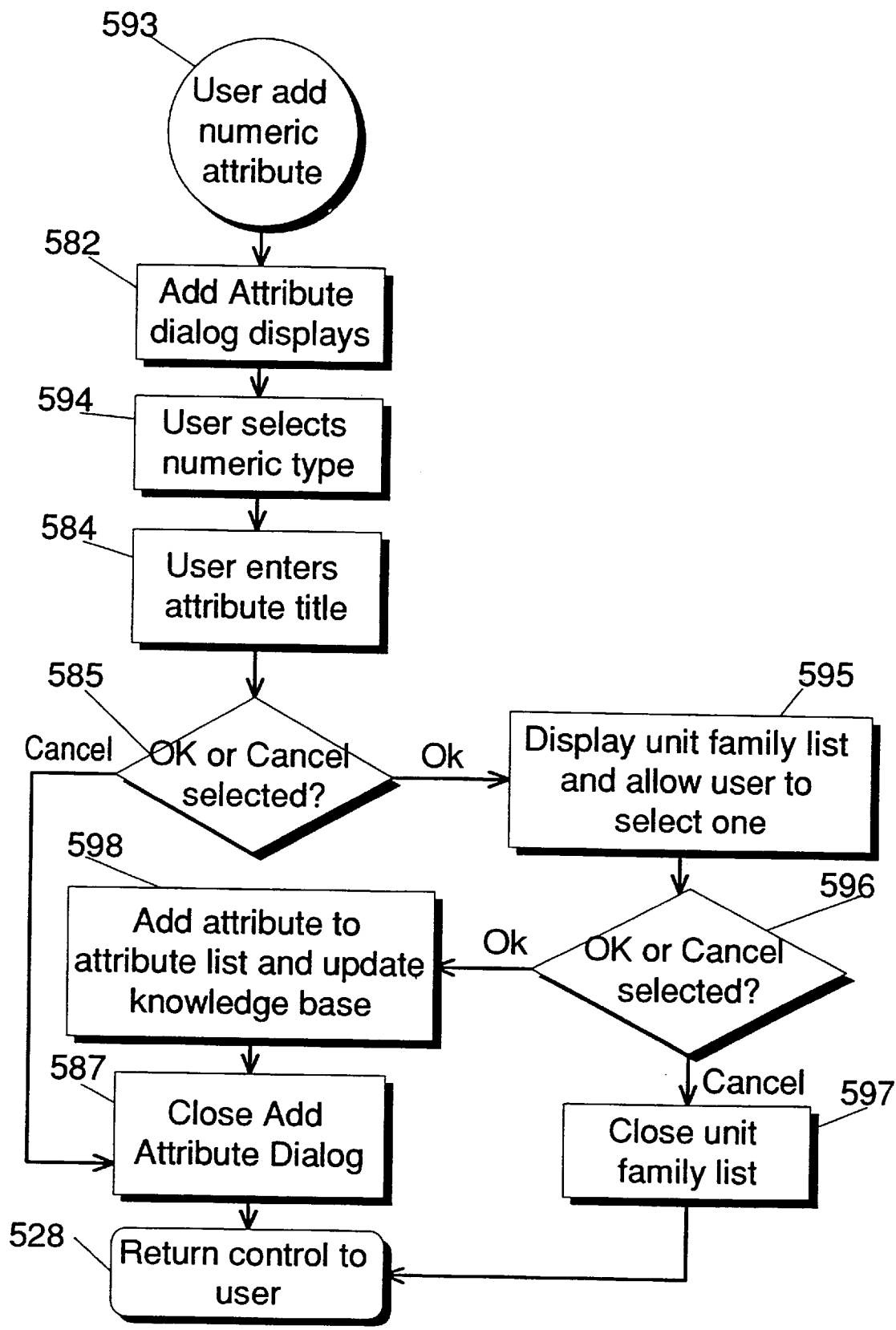
FIG. 106 is a flow chart depicting the addition of a numeric attribute.
Figure 107:
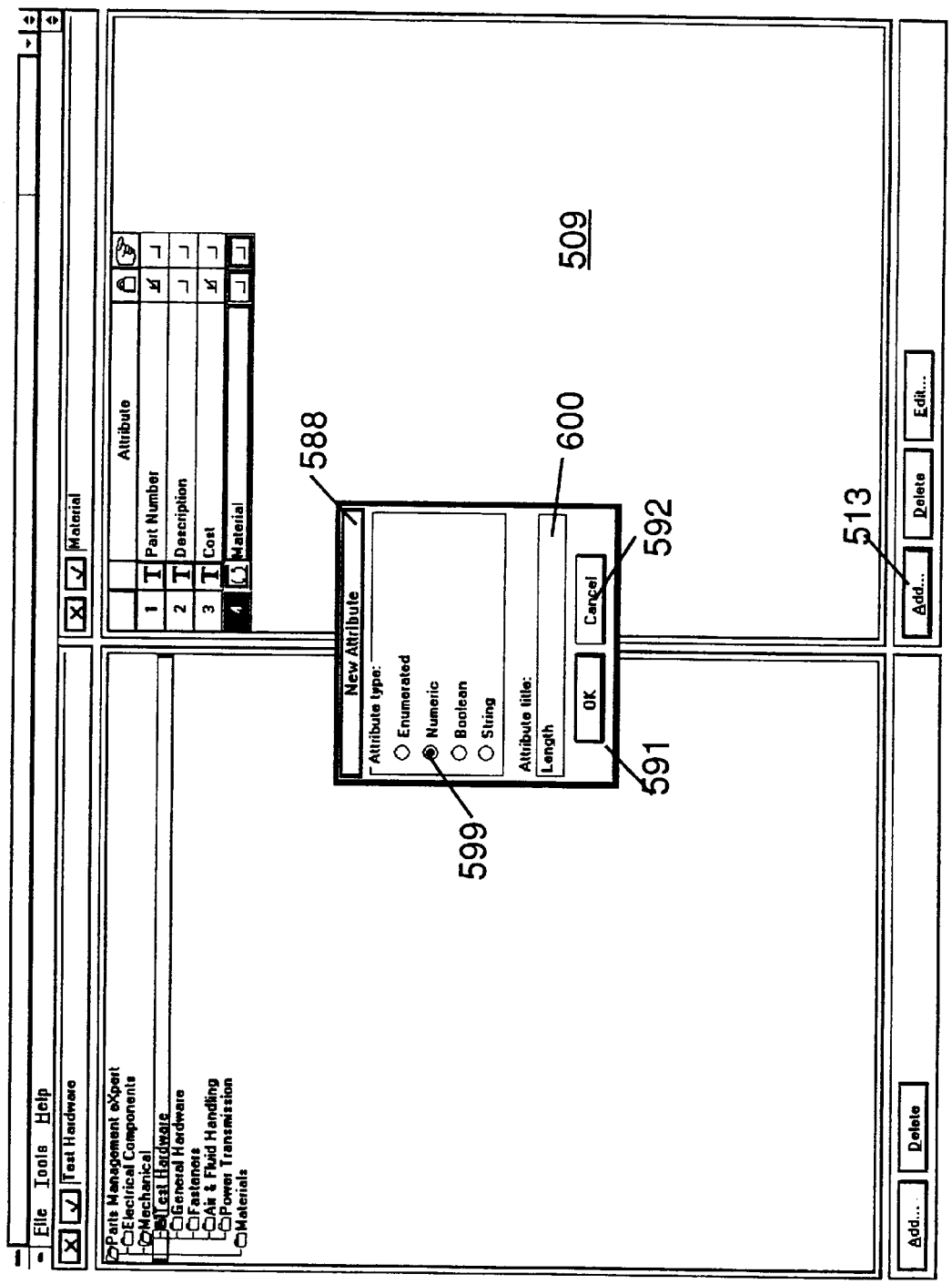
FIG. 107 depicts a display screen showing information displayed in the schema editor window.
Figure 108:
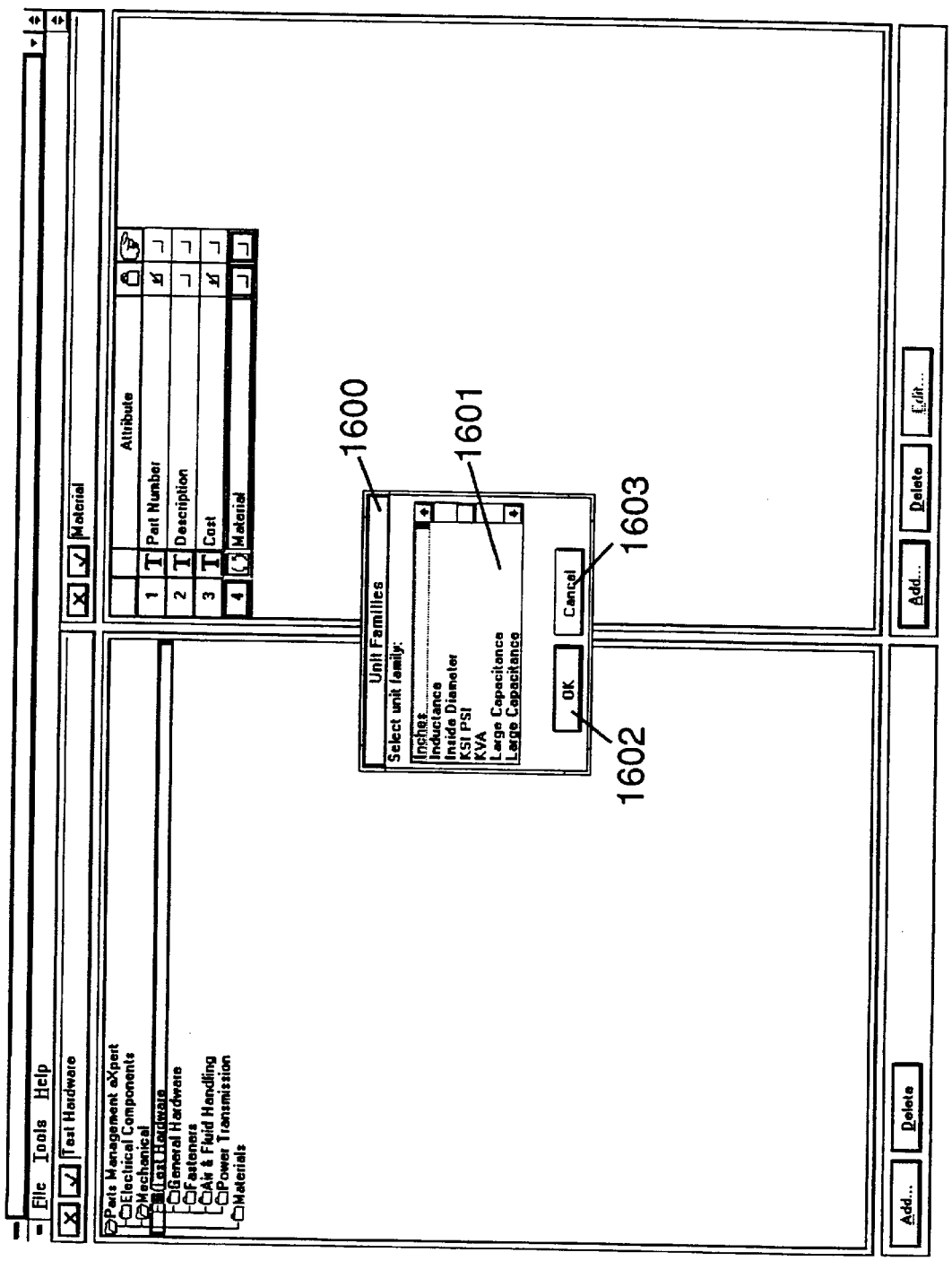
FIG. 108 depicts a display screen showing information displayed in the schema editor window.

A new numeric attribute can be added as described in the flow chart of FIG. 106 as shown in FIGS. 107–108. In this example a new numeric attribute titled "length" is added using unit family inches. The user selects the add button 513 from screen area 509. The add attribute dialog 588 is displayed in step 582. The user selects the type of attribute to add, in this example numeric 599 is selected in step 594. In step 584, the user then enters an attribute title 600 to represent the numeric attribute, in this example the user entered "length" 600. The user can then select either OK or cancel in step 585. If OK is selected, the unit family dialog 1600 is displayed in step 595. The unit family dialog 1600 contains a list of all available units 1601 for the entire knowledge base 123. If the OK button 1602 is selected from this dialog box 1600, a new numeric attribute of unit type length is knowledge base and the attribute list is updated in step 598. Control is then returned to the user in step 528. If the cancel button 1603 is selected, the add attribute dialog 588 is closed in step 587 and control is returned to the user in step 528.

Figure 109:
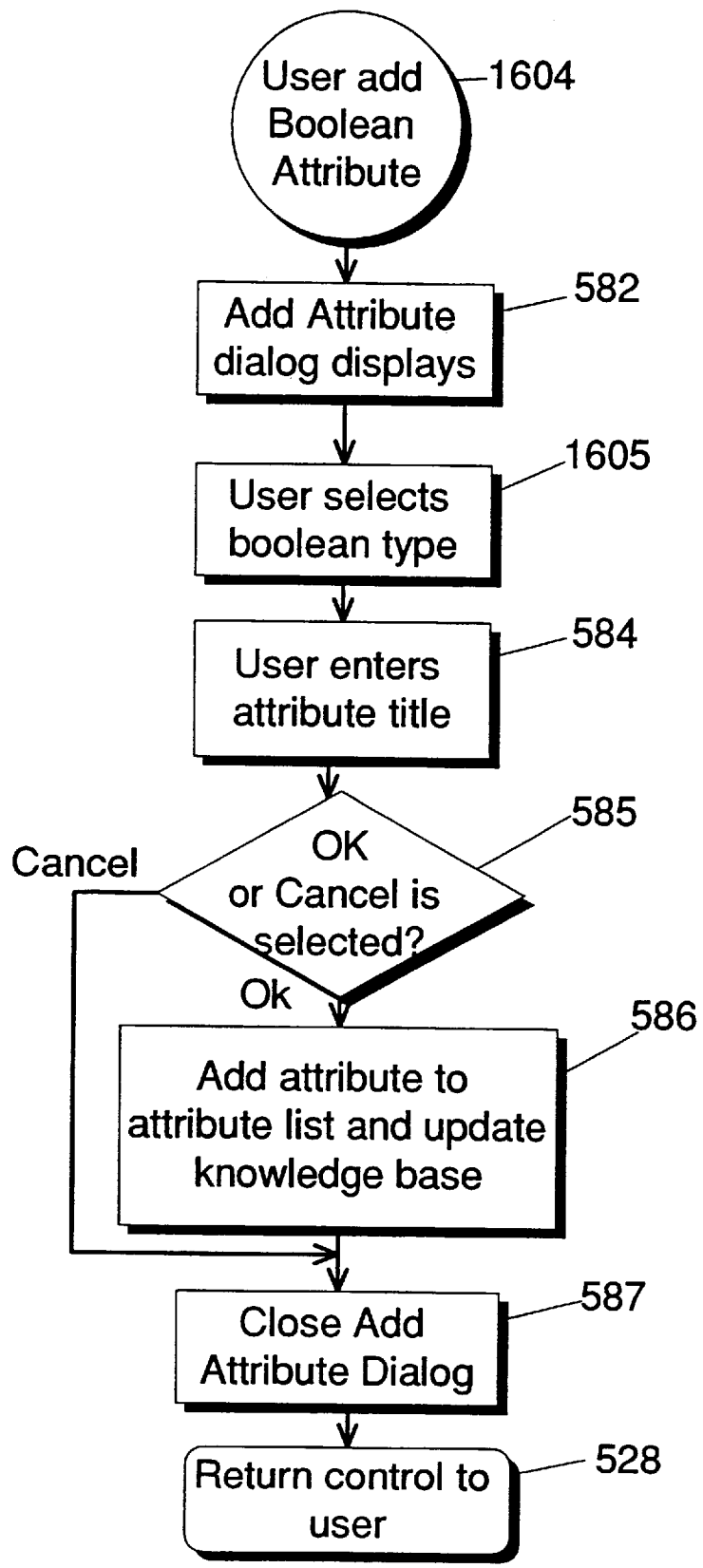
FIG. 109 is a flow chart depicting the addition of a Boolean attribute.
Figure 110:
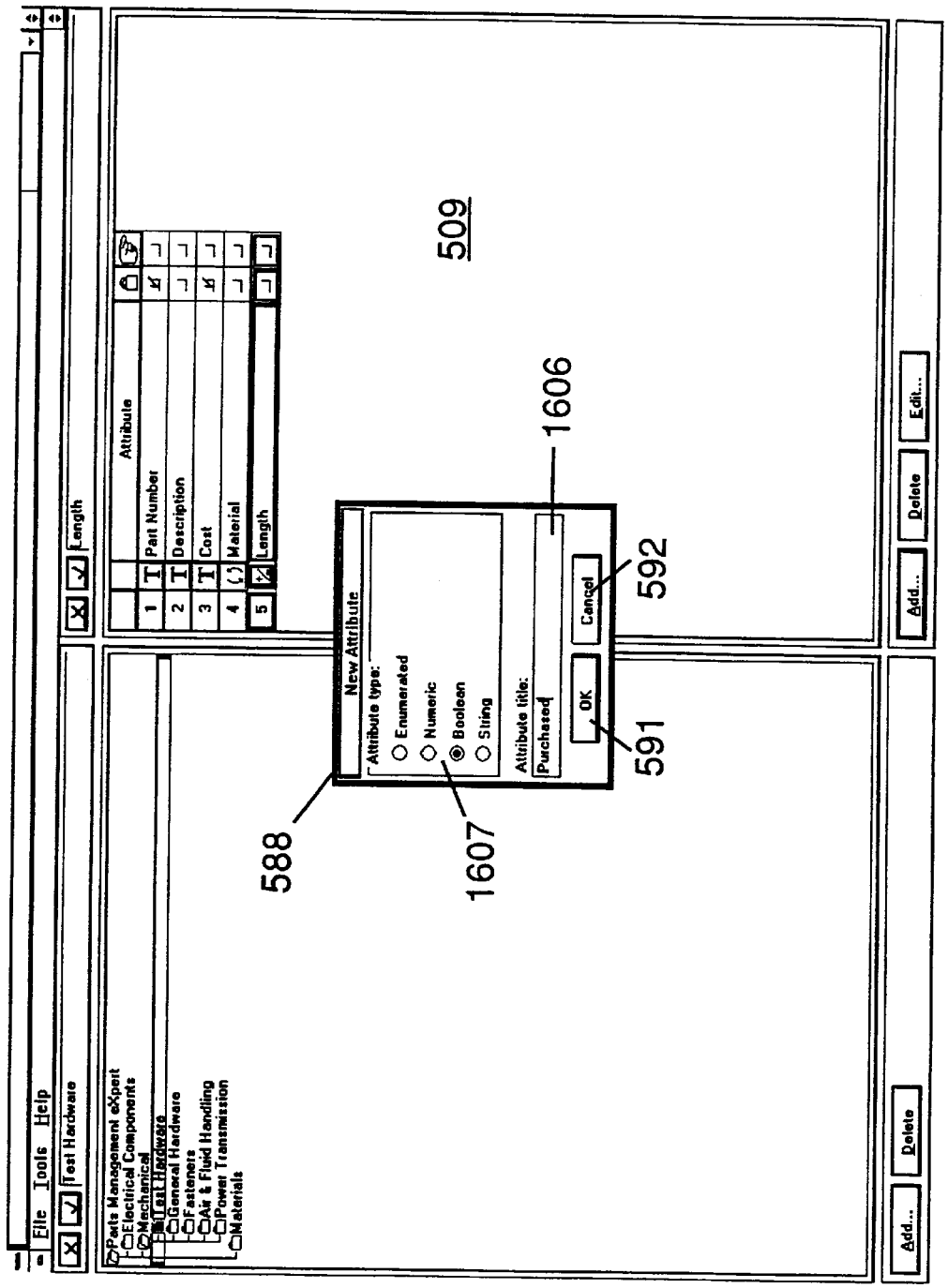
FIG. 110 depicts a display screen showing information displayed in the schema editor window.

A new Boolean attribute can be added as described in the flow chart of FIG. 109 and as shown in FIG. 110. In this example a new Boolean attribute titled "purchased" is added. The user selects the add button 513 from screen area 509. The add attribute dialog 588 is displayed in step 582. The user selects the type of attribute to add, in this example Boolean is selected 1605 and 1607. The user then enters an attribute title to represent the Boolean attribute, in this example the user entered Purchased 584 and 1606. The user can then select either OK or cancel 585. If OK is selected, the knowledge base is updated and the attribute list is updated to include the added attribute 586 and 509 and the add attribute dialog is closed 587. Control is then returned to the user 528. If the cancel button is selected, the add attribute dialog is closed 587 and control is returned to the user 528.

Figure 111:
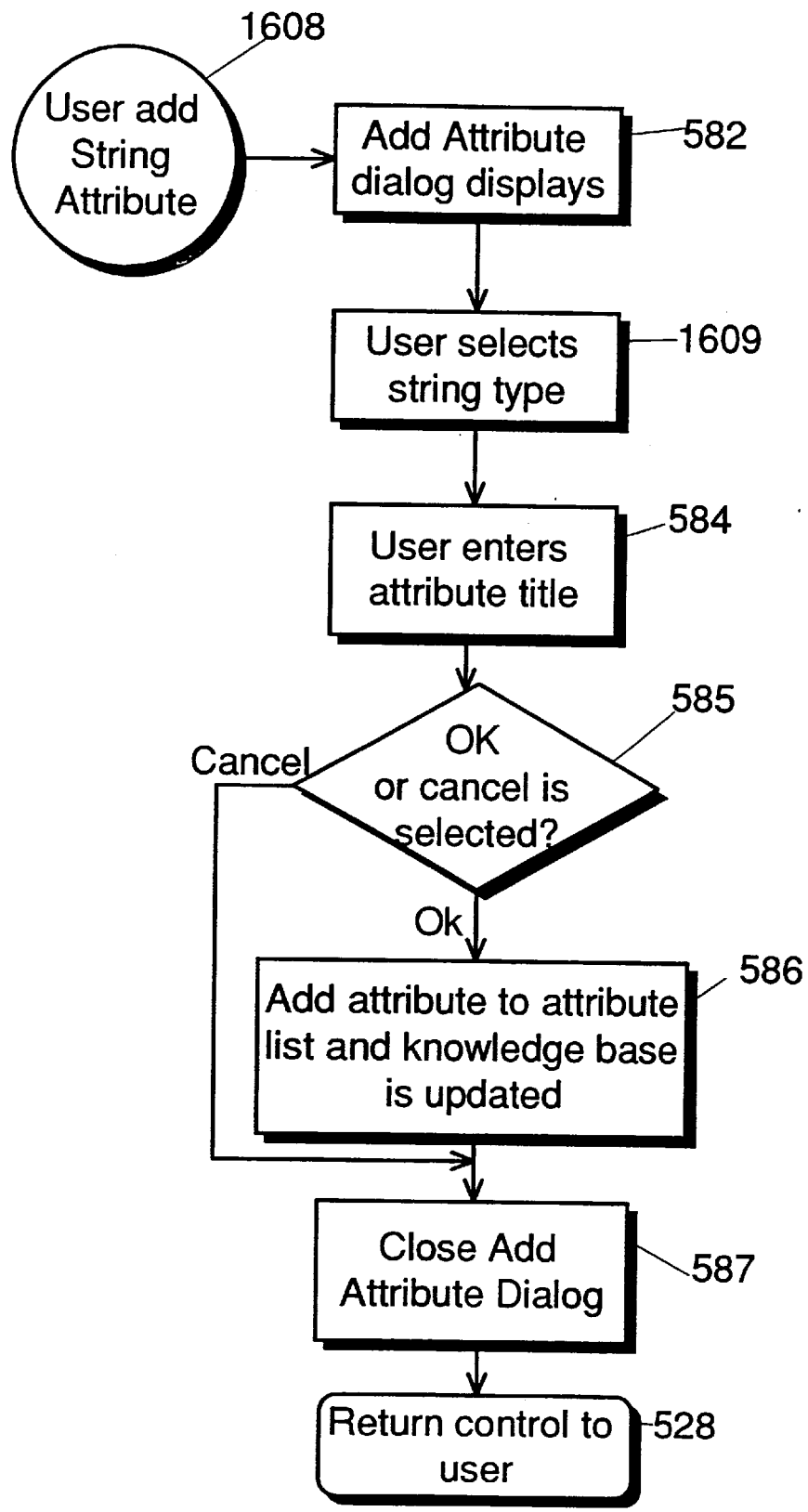
FIG. 111 is a flow chart depicting the addition of a new string attribute.
Figure 112:
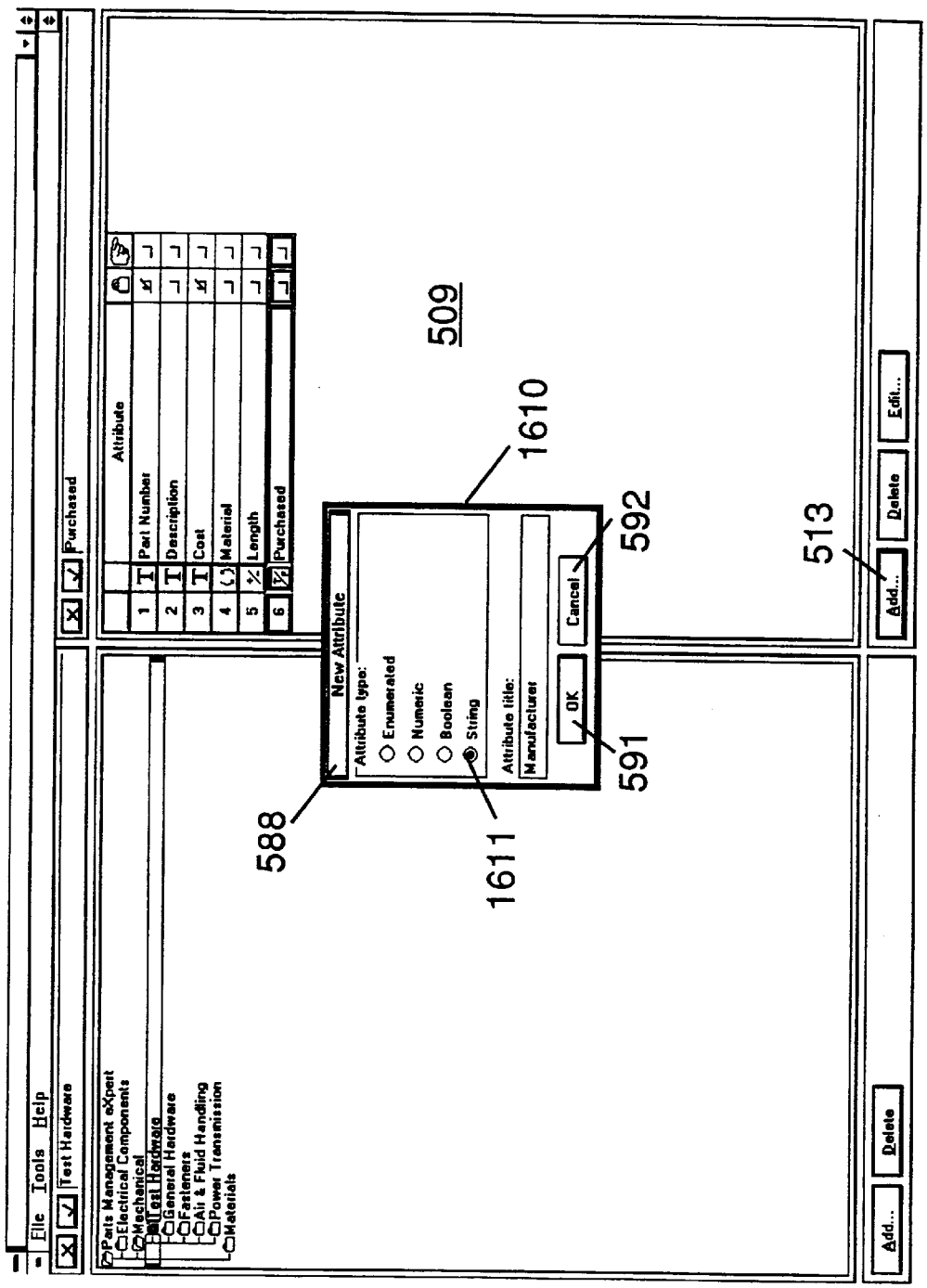
FIG. 112 depicts a display screen showing information displayed in the schema editor window.

A new string attribute can be added as described in the flow chart in FIG. 111 and screen shot FIG. 112. In this example a new string attribute titled Manufacturer is added. The user selects the add button 513 from screen area 509. The add attribute dialog is displayed 582 and 588. The user selects the type of attribute to add, in this example string is selected 1609 and 1611. The user then enters a attribute title to represent the string attribute, in this example the user entered Manufacturer 584 and 1610. The user can then select either OK or cancel 585. If OK is selected, the knowledge base is updated and the attribute list is updated to include the added attribute 586 and 509 and the add attribute dialog is closed 587. Control is then returned to the user 528. If the cancel button is selected, the add attribute dialog is closed 587 and control is returned to the user 528.

Figure 113:
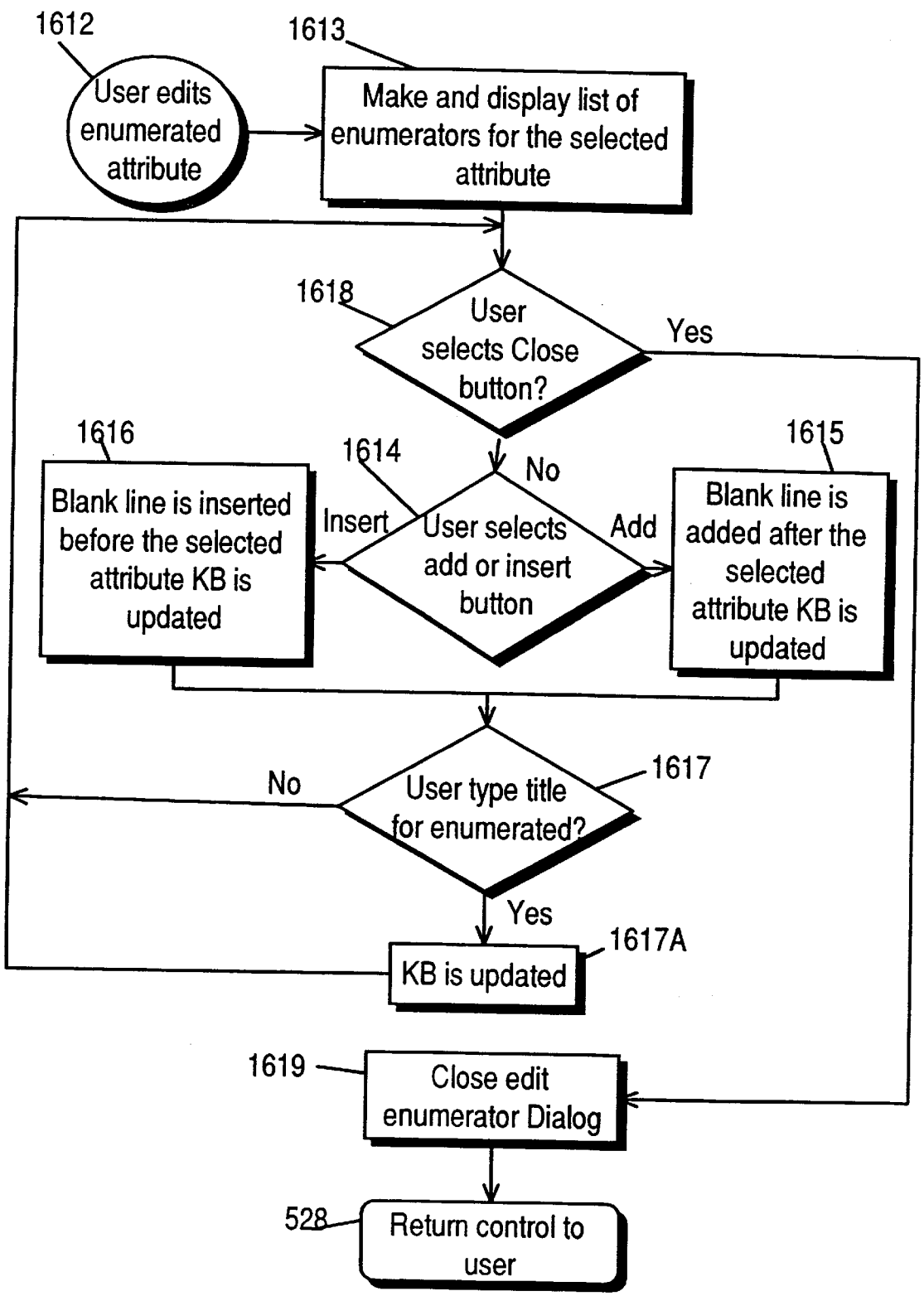
FIG. 113 is a flow chart depicting the addition and insertion of enumerators.
Figure 114:
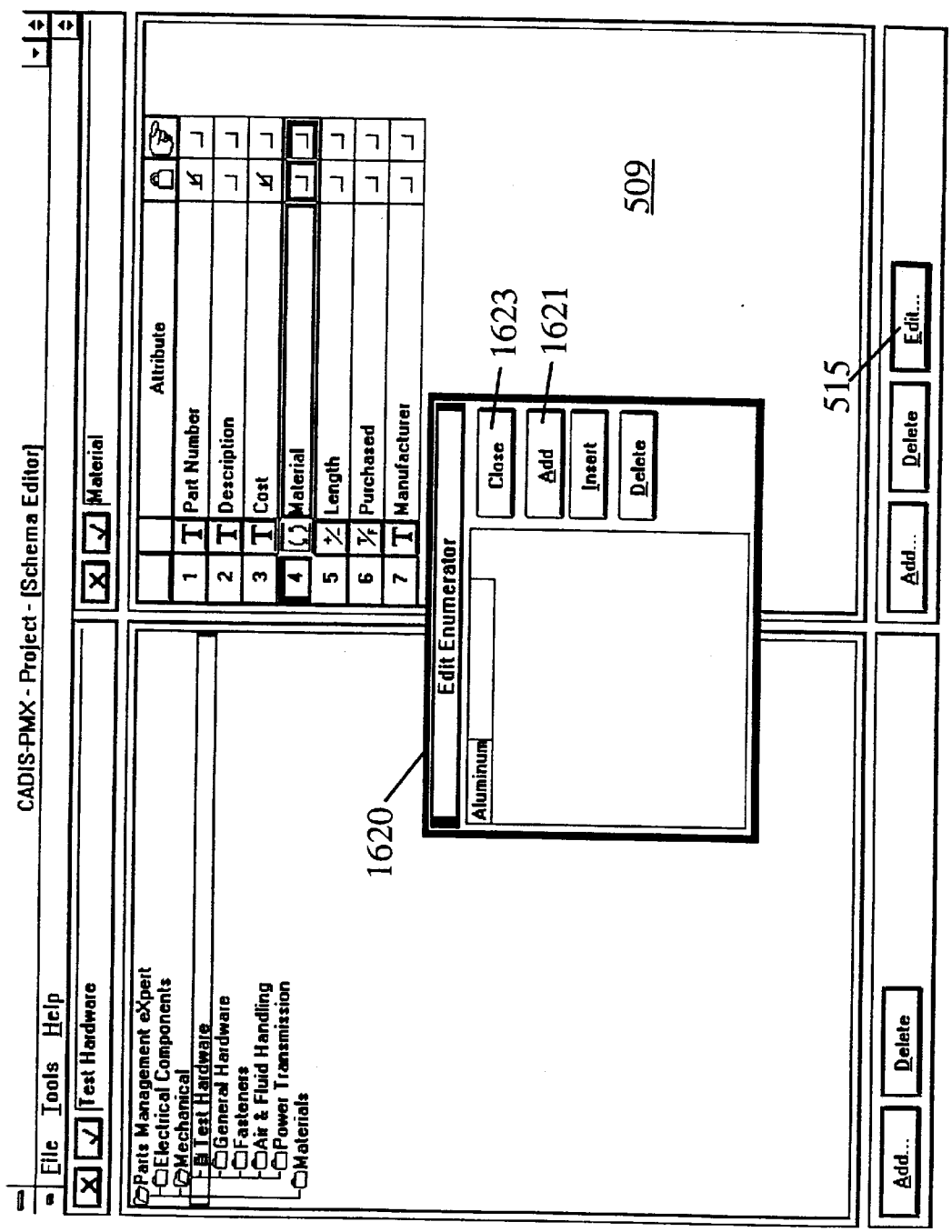
FIG. 114 depicts a display screen showing information displayed in the schema editor window.
Figure 115:
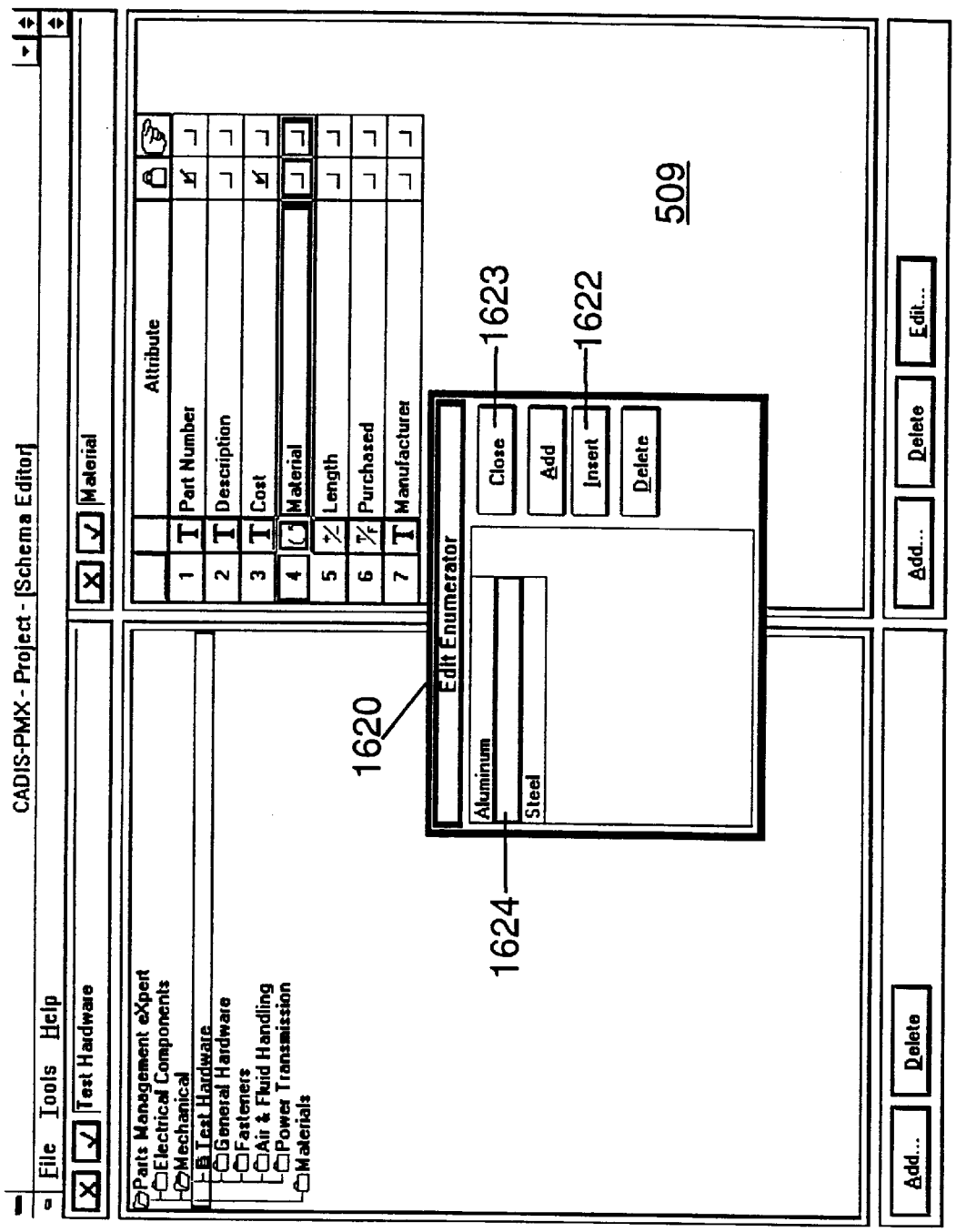
FIG. 115 depicts a display screen showing information displayed in the schema editor window.

Enumerators for enumerated type attributes can be added and inserted as described in the flow chart FIG. 113 and as shown in FIG. 114 and FIG. 115. When an enumerated attribute is active in screen area 509 the edit button 515 is activated. When the edit button 515 is selected, the edit enumerator dialog box 1620 is displayed with a list of enumerators for the selected enumerated attribute 1613. The user can either select the add button 1621 or the insert button 1622. If the add button 1621 is selected in step 1615, a blank line is added after the active enumerator in the dialog box 1620 and the knowledge base 123 is updated. If the insert button 1622 is selected in step 1616, a blank line is added before the active enumerator in the dialog box 1620 and the knowledge base 123 is updated. The enumerator title is typed into the blank line in dialog box 1620 in step 1617, in this example "aluminum" is entered and the knowledge base is updated in step 1617A. In the example on FIG. 115, "steel" has been added and the insert button 1622 was selected to add a blank line above the enumerator "steel." When the user has completed adding/inserting enumerators, the close button 1623 is selected in step 1619, and the edit enumerators dialog box 1620 is closed. The control is then returned to the user in step 528.

Figure 116:
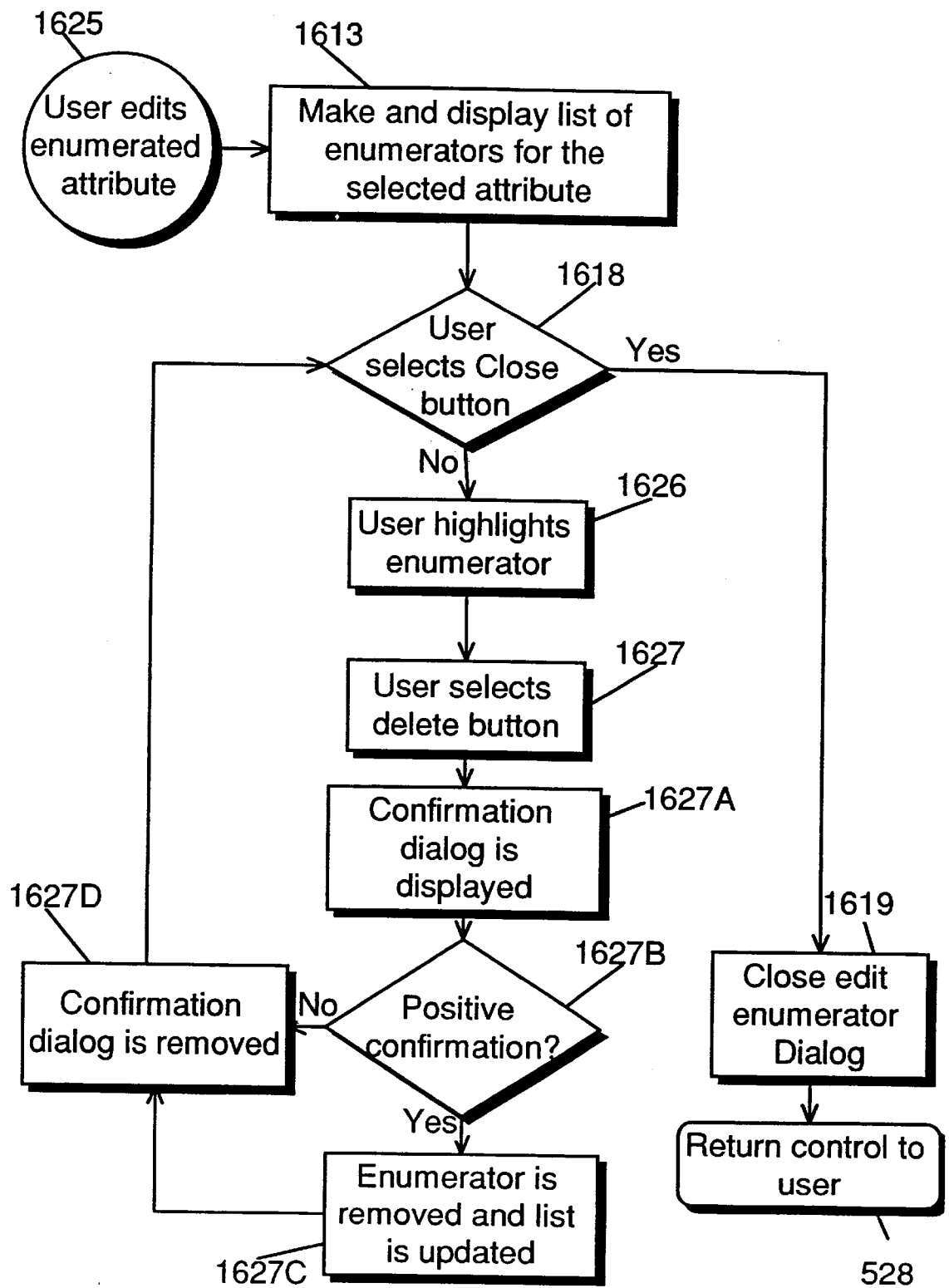
FIG. 116 is a flow chart depicting the deletion of enumerator type attributes.
Figure 117:
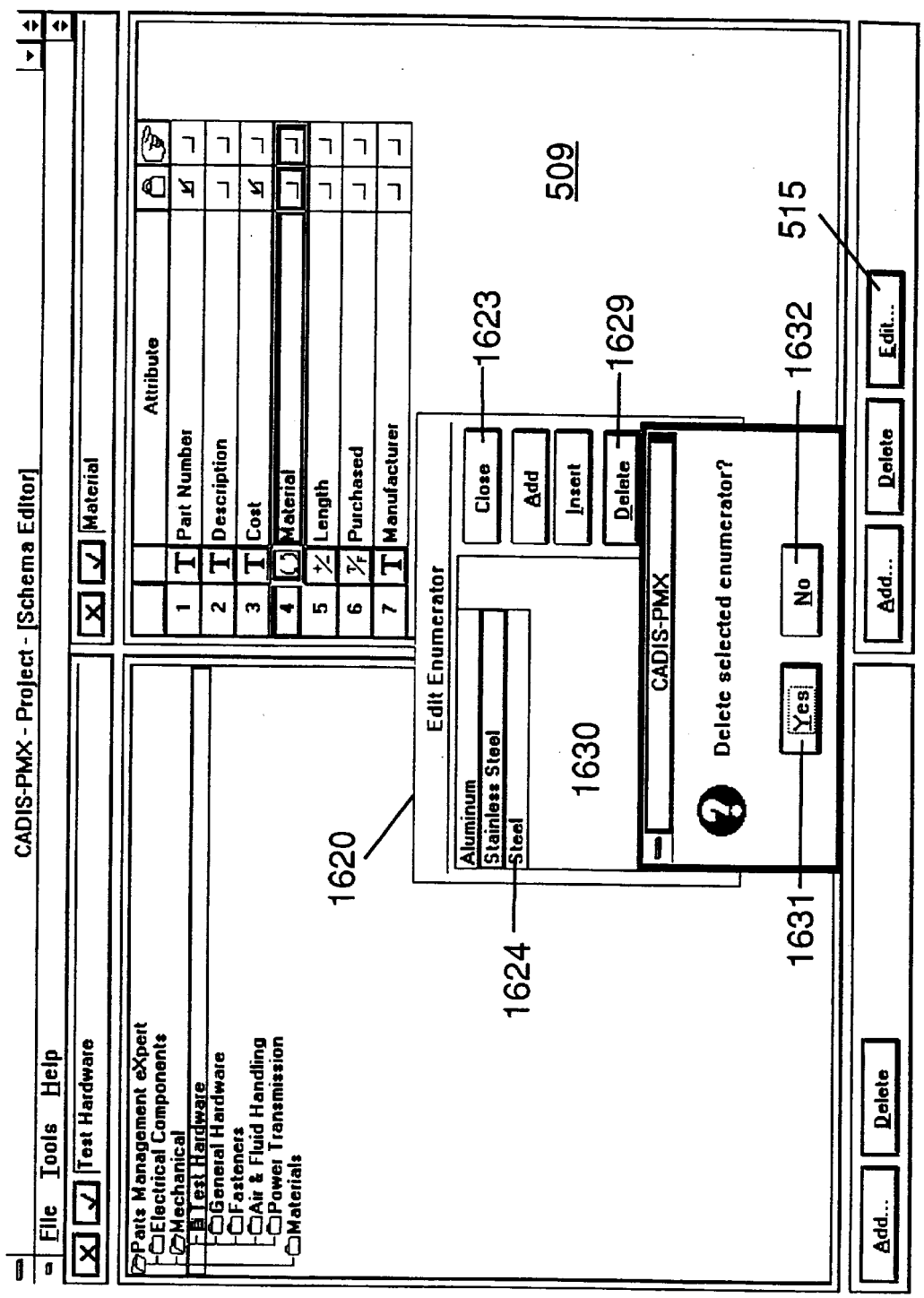
FIG. 117 depicts a display screen showing information displayed in the schema editor window.

Enumerators for enumerated type attributes can be deleted as described in the flow chart of FIG. 116 and as shown in FIG. 117. When an enumerated attribute is active in screen area 509 the edit button 515 is activated. When the edit button 515 is selected, the edit enumerator dialog box 1620 is displayed with a list of enumerators 1624 for the selected enumerated attribute 1613. The user selects an enumerator in step 1626 then selects the delete button 1629 in step 1627. In step 1627A, a confirmation dialog box 1630 displays allowing the user to select either the "yes" button 1631 in step 1627C or the "no" button 1632 in step 1627D. If "yes" is selected, the enumerator is removed from the edit enumerator list 1624 and the knowledge base is updated in step 1627C and the confirmation dialog is closed in step 1627D. If the user selects "no" in step 1627D, the confirmation dialog is closed. When the user has completed deleting enumerators, the close button 1623 is selected in step 1619 and the edit enumerators dialog 1620 is closed. The control is then returned to the user in step 528.

Figure 118:
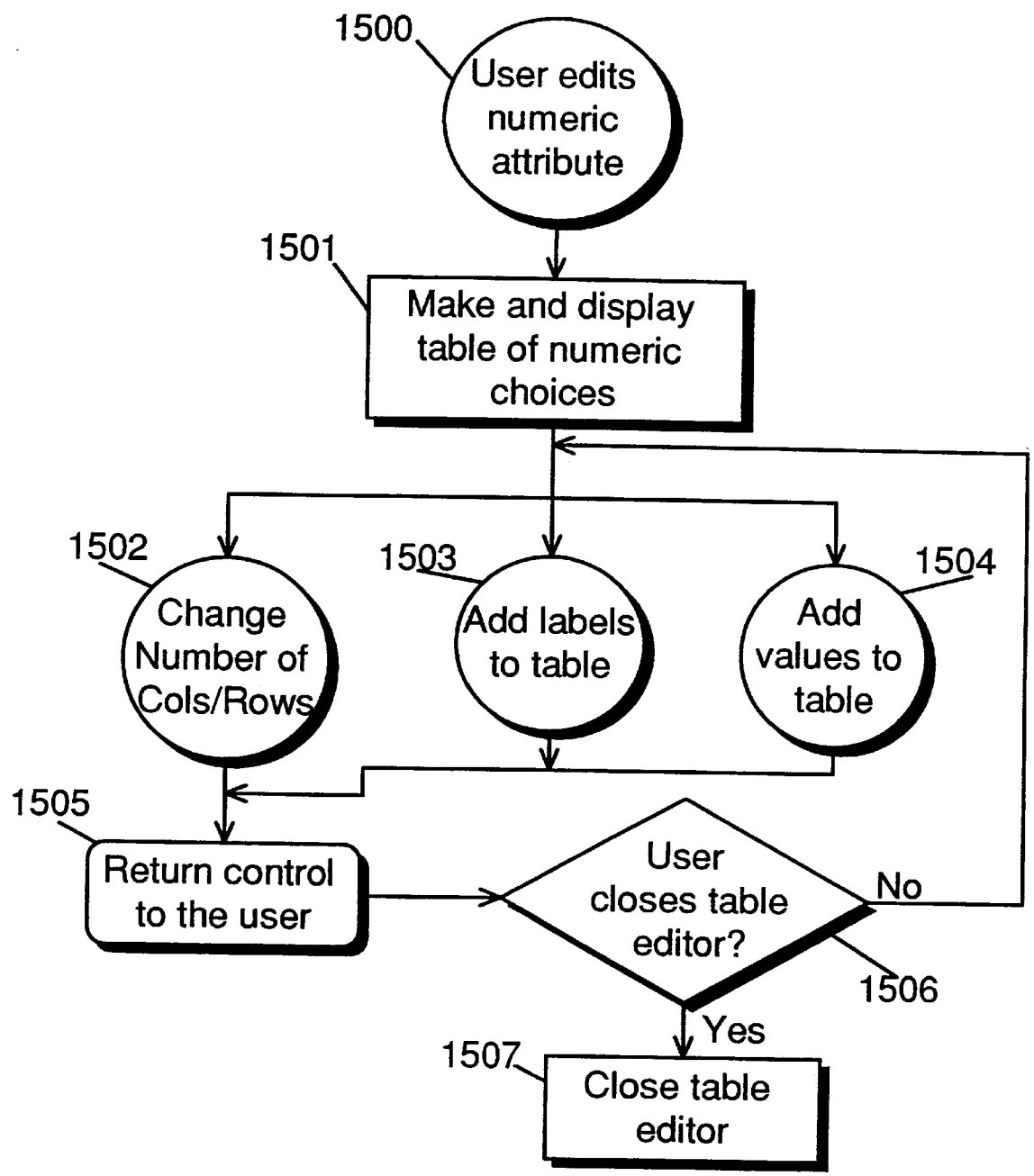
FIG. 118 depicts the flow chart for editing a numeric attribute in the schema editor.
Figure 119:
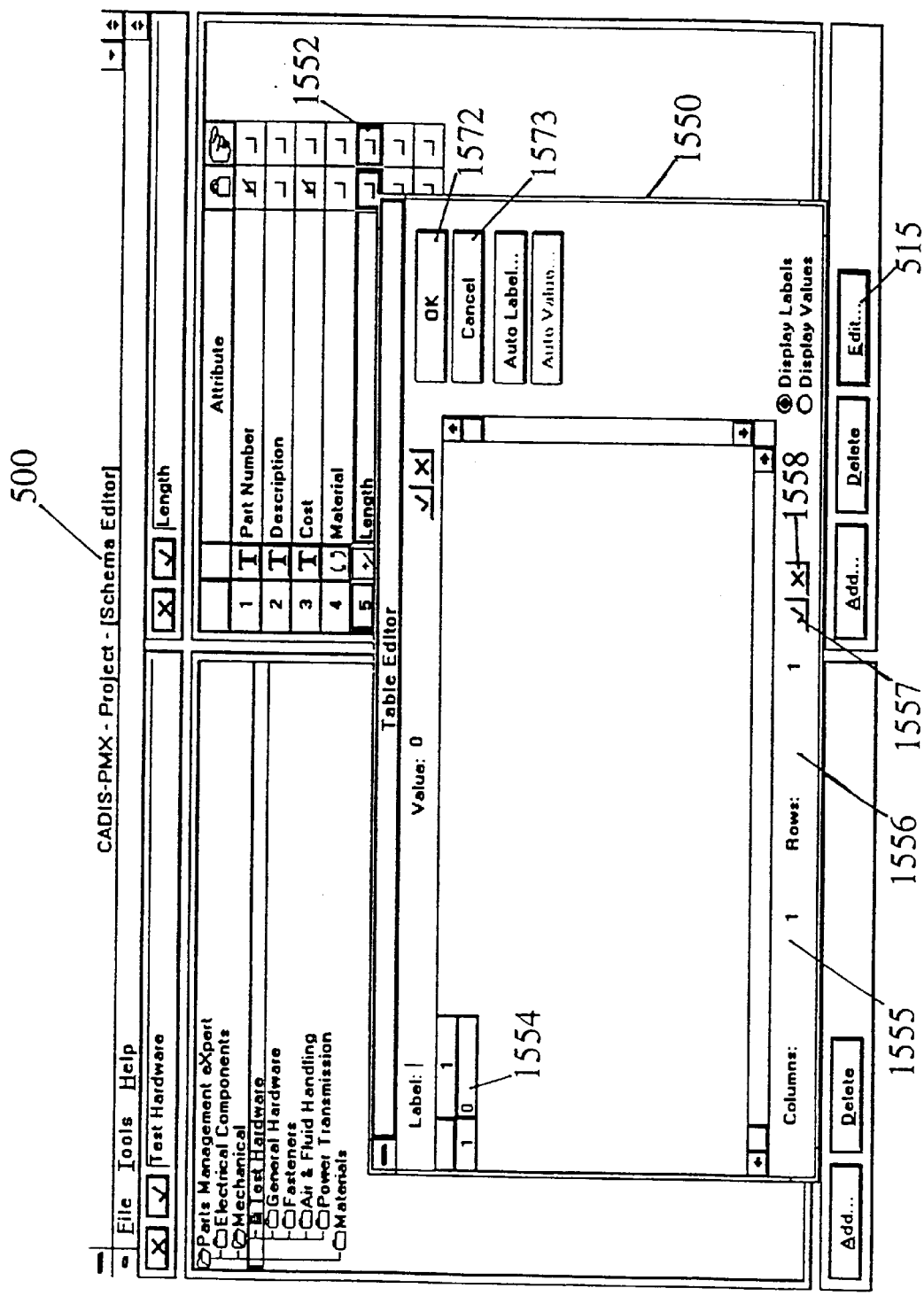
FIG. 119 depicts a display screen showing information displayed in the schema editor window.

FIG. 118 describes the functions that can be performed from the numeric table editor dialog box 1550 in FIG. 119. This dialog box 1550 allows the user to build tables of numeric values for a numeric attribute. The numeric table editor dialog 1550 is invoked in step 1500 from the schema editor 500 after selecting a numeric attribute such as 1552. The edit button 515 invokes the table editor dialog 1551.

In step 1501, calls are made through the API 143 to display existing table data. If no table data exists, a table 1554 with 1 row and 1 column is constructed and displayed as shown in FIG. 119.

Tables 1554 consist of cells which have numeric values and labels associated with them. A label is distinct from a value, and is used as a textual description or representation of the underlying values. Table cells 1554 must contain ascending numeric values. Labels may be in any collating order.

Figure 120:
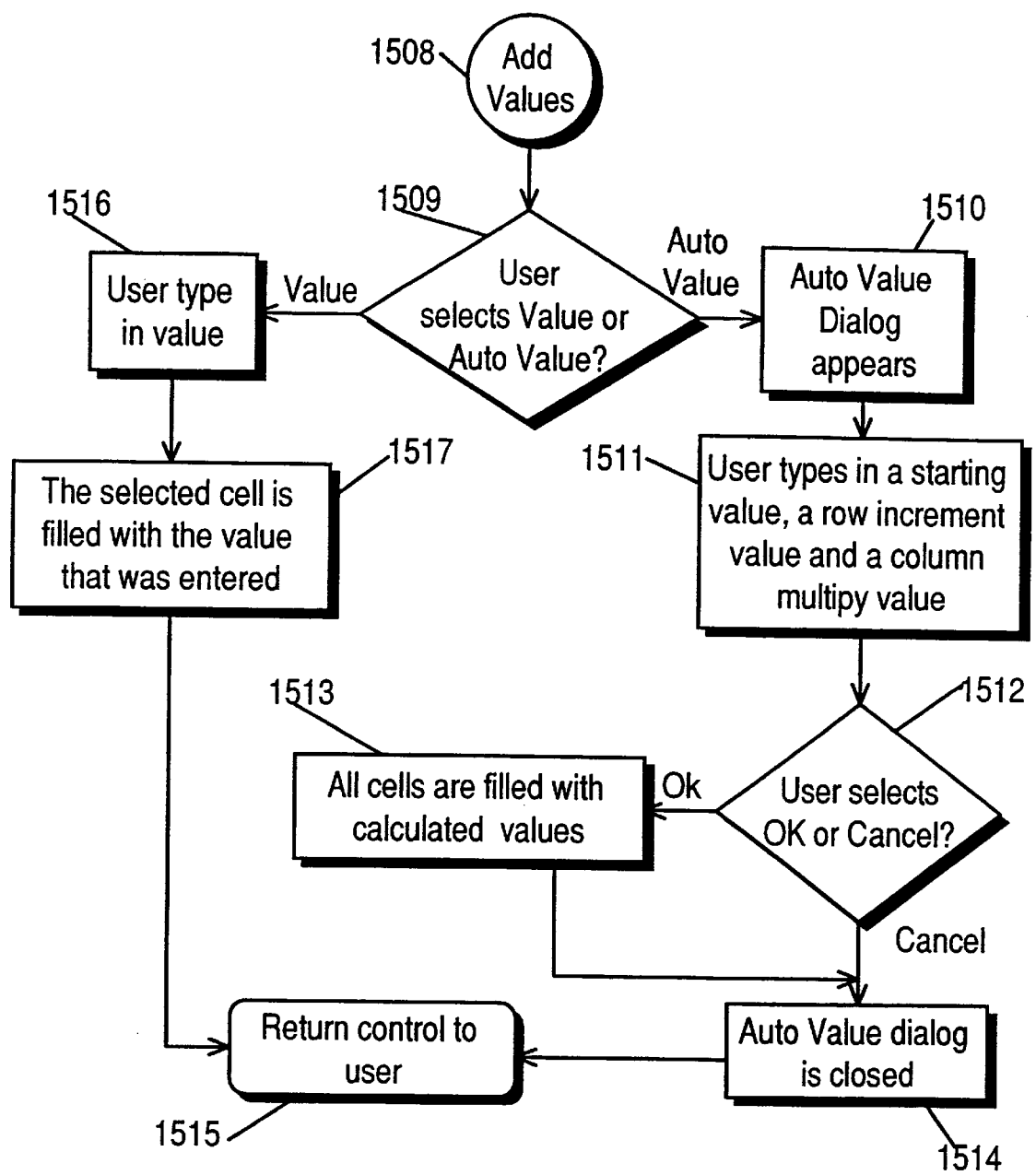
Figure 121:
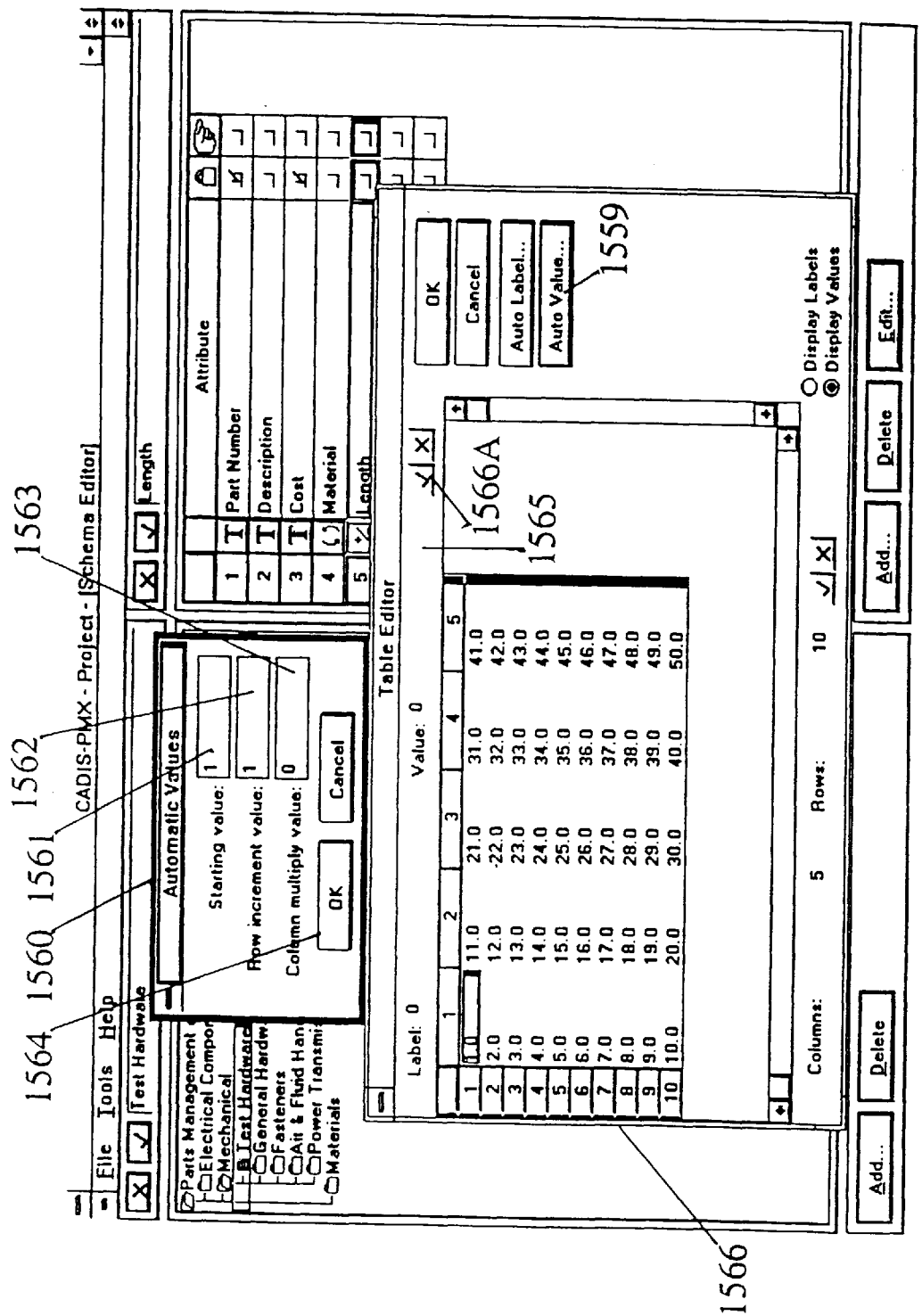

In FIG. 118, the user adds values to a table in step 1504 by executing the procedure described in FIG. 120. The user may optionally label a table manually in FIG. 120, step 1509, or use the auto-label feature in step 1510 by selecting item 1559 in FIG. 121. The auto label button 1559 invokes the automatic values dialog box 1560 in step 1510. In step 1511, the user fills in values for items 1561, 1562, and 1563 and selects the OK button 1564. In step 1513, the values for the cells are calculated and set in the table. In step 1514, the automatic values dialog 1560 is closed, and control is returned to the user in step 1515.

In FIG. 120, if the user chose to label the table cells manually in step 1509, the user selects item 1565 and enters a value, accepted by selected check box 1566A. Any cells the user had selected in item 1566 are filled with the value in step 1517. Control is returned to the user in step 1515.

Figure 122:
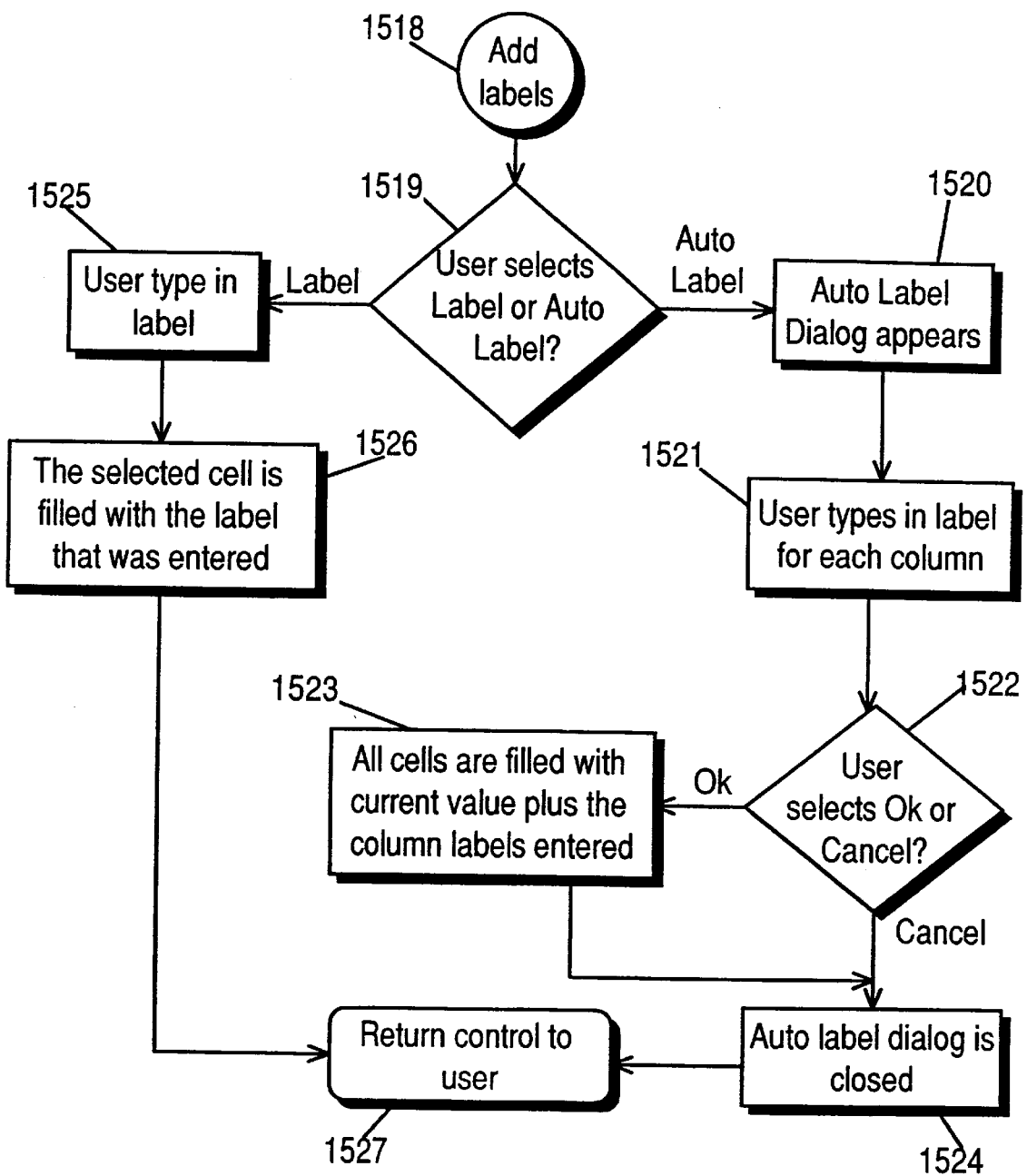
Figure 123:
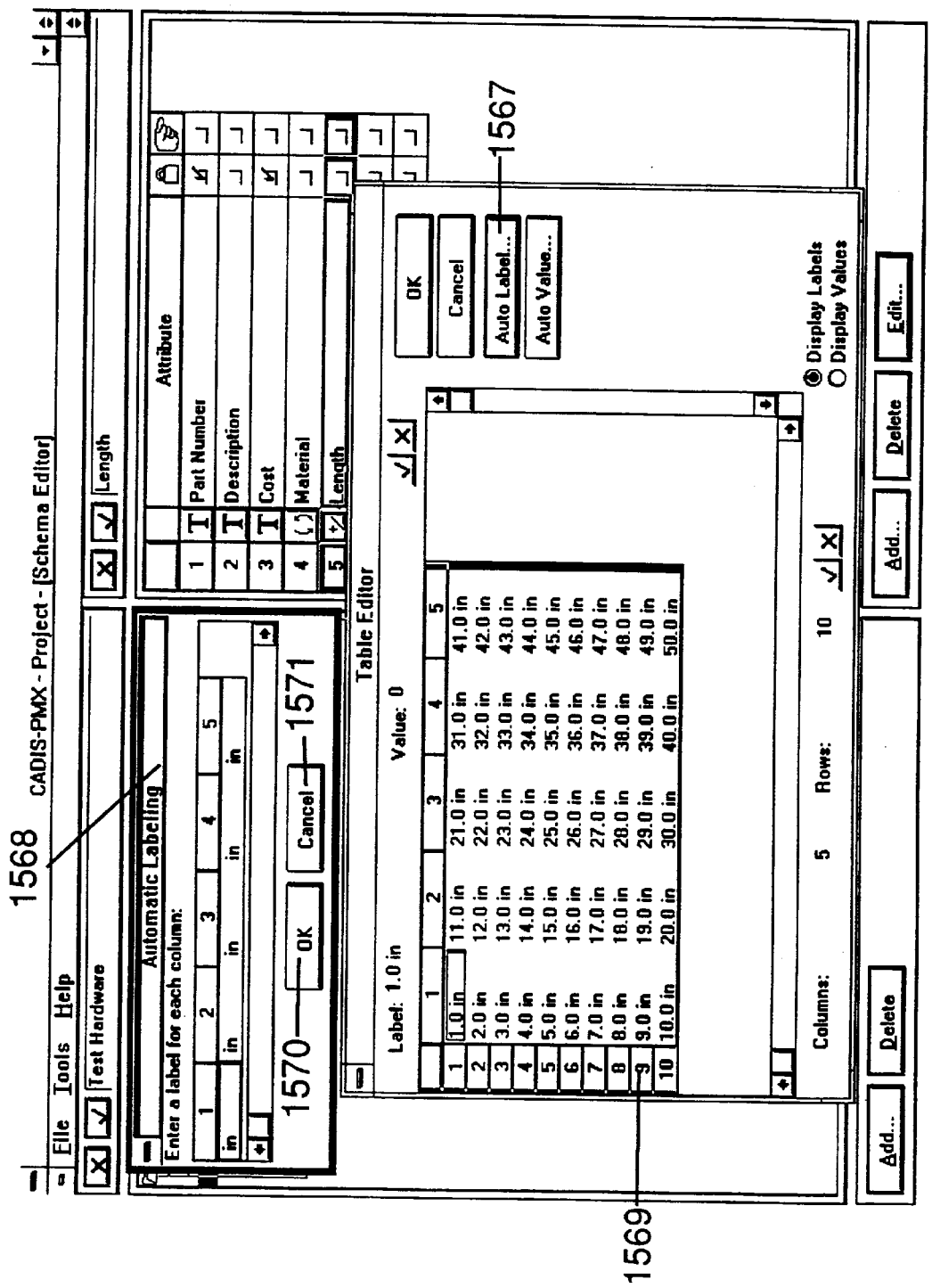

In FIG. 118, the user performs step 1503 to add labels to the table. The process for adding labels to the table is described in FIG. 122. In step 1519, the user may select auto label or manual labeling. If auto label item 1567 in FIG. 123 is selected, the automatic labeling dialog 1568 is invoked in step 1520. For each column in the table 1569, the user may type in a label. In step 1522 the user may select the OK button 1570 or the cancel button 1571. If the user selects the OK button 1570, step 1523 sets the cell labels to the current cell value concatenated with the label values from the automatic labeling dialog 1568. Dialog 1568 is dismissed, and control is returned to the user in step 1524.

Tables are structured as rows and columns. The user may wish to change the number of columns and rows in a table by executing step 1502. Rows and columns are entered by using the edit boxes 1555 or 1556 and the check mark button 1557. To not accept a value, the "x" button 1558 may be selected. The procedure for changing the number of columns and rows is described in FIG. 124.

Figure 124:
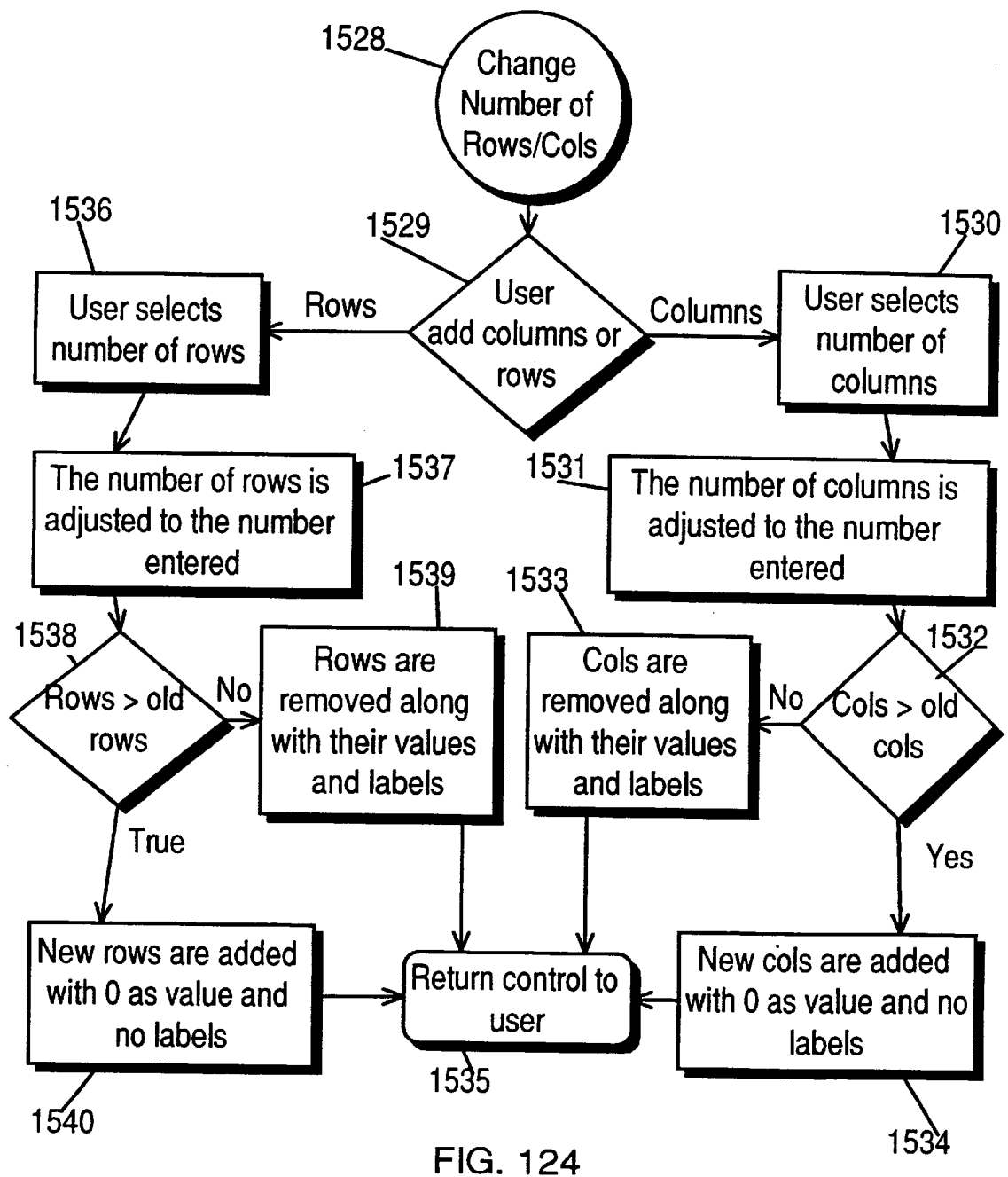

In FIG. 124, the user may select rows in step 1536 by selecting item 1556 in the table editor dialog 1550. The user enters the number of rows in item 1556 and selects item 1557 to accept the item. In step 1537, the number of rows kept internally is adjusted to the number of rows entered in step 1536. The number of rows is checked in step 1538. If the number of rows is greater than the number of rows previously in the table, the new rows are added with the default value of "0" and no labels in step 1540 and control is returned to the user in step 1535. If no new rows are needed, "0" or more rows are deleted from the table along with their labels in step 1539 before returning control to the user in step 1535.

In FIG. 124, the user may have selected columns to change in step 1530 by selecting item 1555 and entering a numeric value and selecting item 1557 to accept the item. This new number is set internally in step 1531. If new columns need to be added as determined in step 1532, step 1534 adds new columns to the table with the default value of "0" and no labels. If no new columns are needed as determined in step 1532, "0" or more columns are removed from the table along with their labels.

Back in FIG. 118, the user closes the table editor in step 1506 by selecting the OK button 1572 in FIG. 119 or by canceling changes by selecting cancel button 1573 in FIG. 119. The table editor dialog box 1550 is dismissed in step 1507 and control is returned to the user in step 528.

Figure 127:
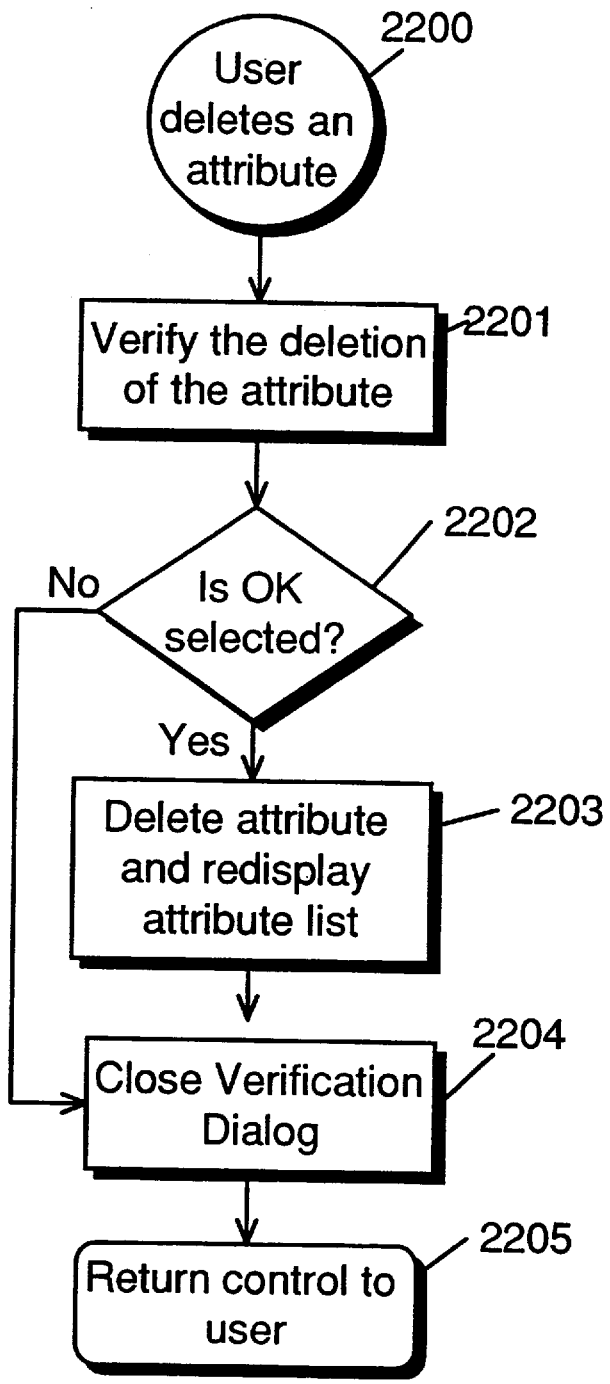
Figure 128:
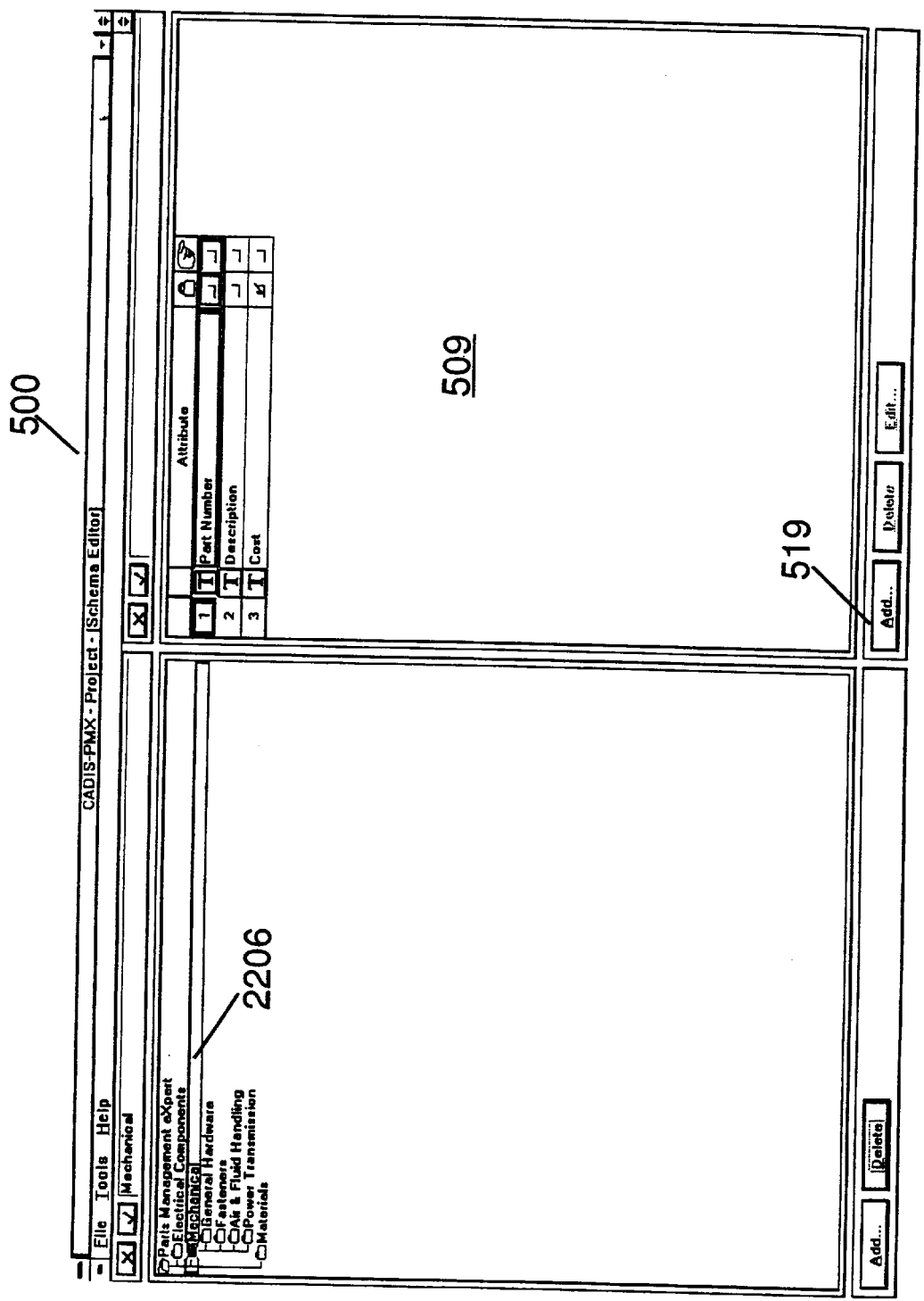

In FIG. 127, the process for deleting an attribute from schema editor 500 is shown. In FIG. 128, the user selects the mechanical class 2206. Note that all the cells in area 509 are dimmed, and the delete button 519 is not active. The schema editor 500 only allows the attributes defined by mechanical class 2206 to be edited, and there are no locally defined attributes.

Figure 129:
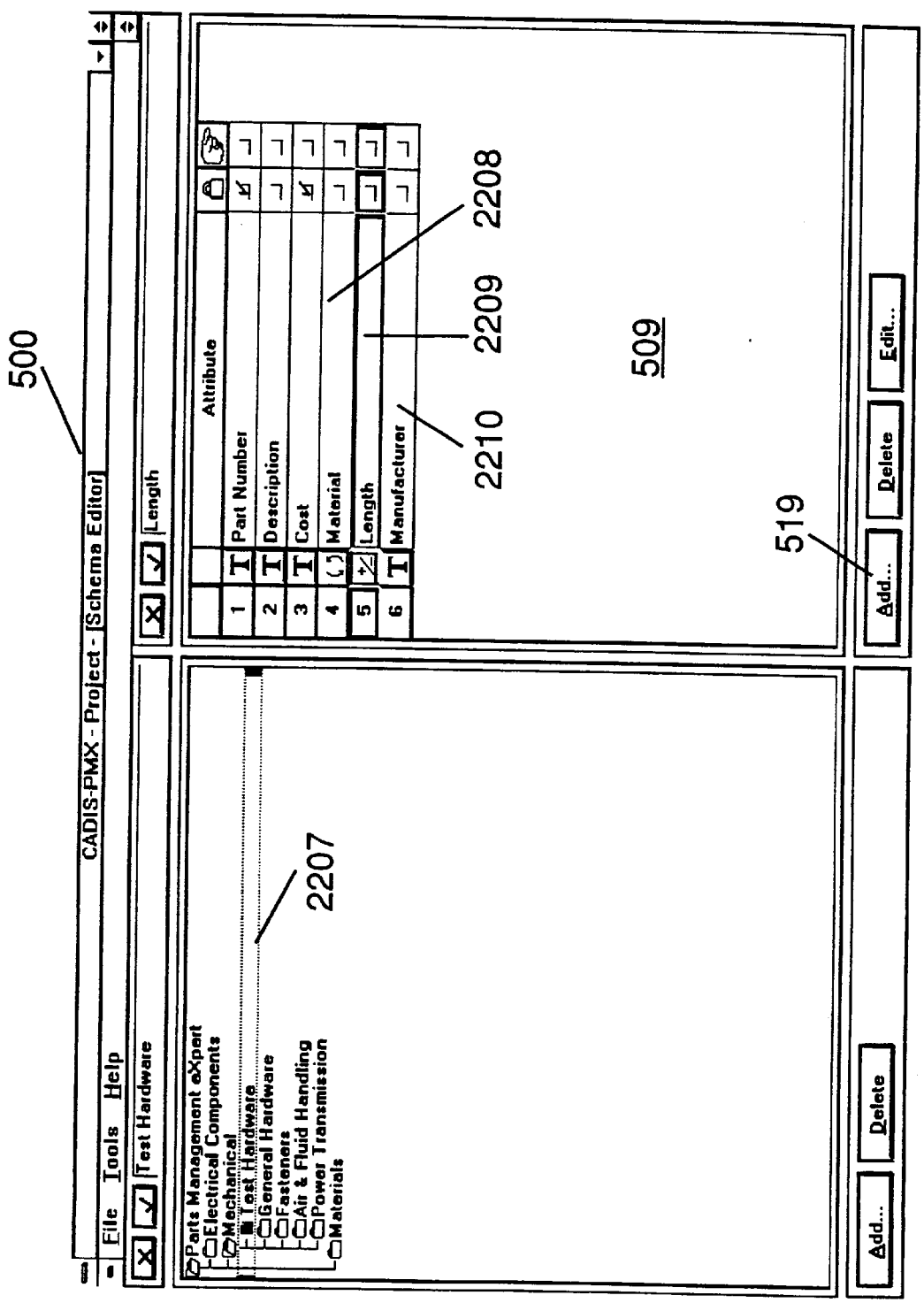

In FIG. 129, the user selects test hardware item 2207. Attributes are defined at this class and in area 509, the local attributes in items 2208, 2209, and 2210 are not dimmed and are available for editing. The user selects item 2214 in FIG. 130 and it is highlighted.

Figure 130:
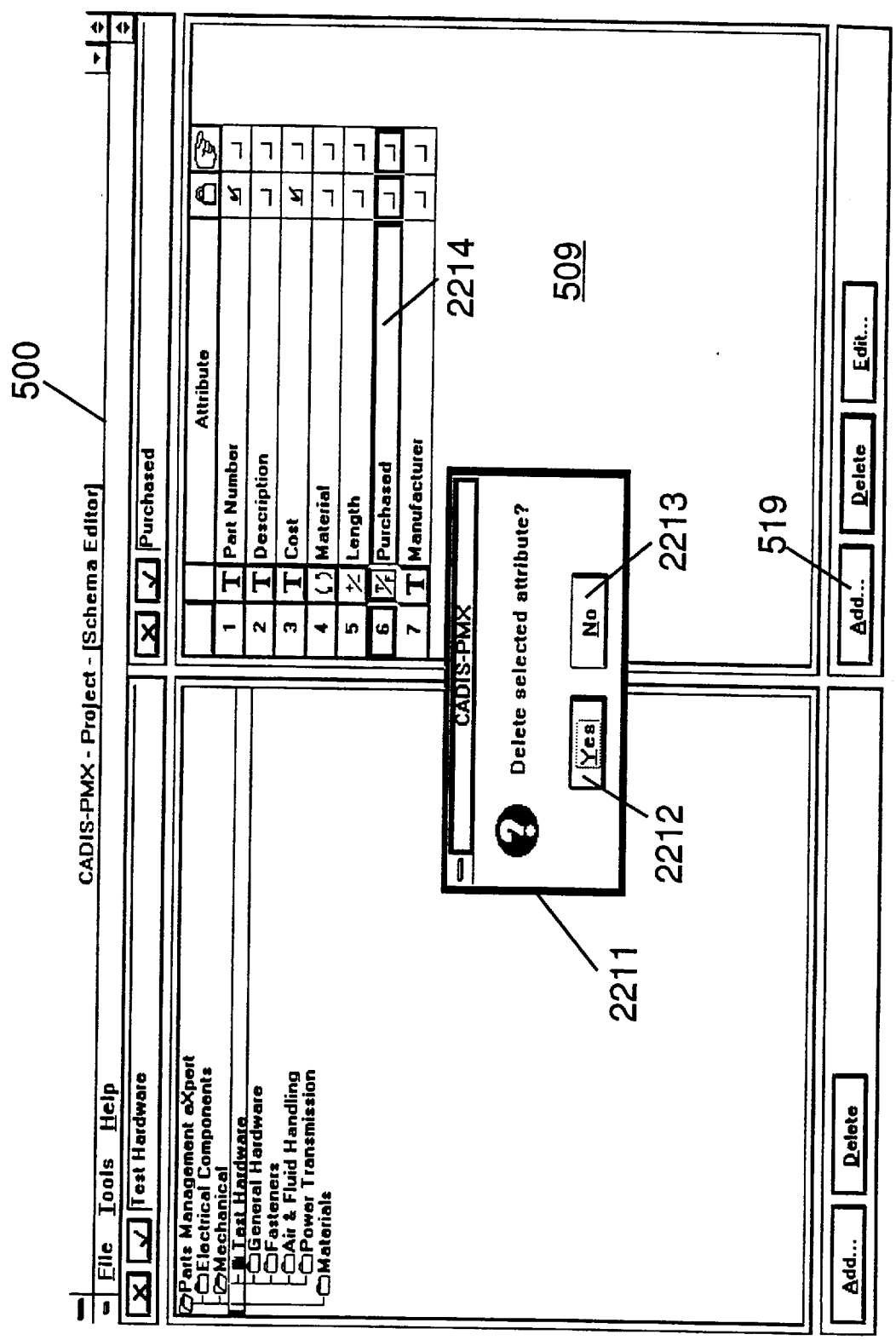

In step 2200 of FIG. 127, the user selects the delete button 519 in FIG. 130.

In step 2201 of FIG. 127, the dialog box 2211 in FIG. 130 is displayed to allow the user to verify the deletion of the attribute 2214. If the user selects button 2213 in FIG. 130, the dialog box 2211 is dismissed in step 2204 and control is returned to step 528 from step 2205.

If the user selects button 2212 in FIG. 130, the attribute is deleted from the knowledge base in step 2203 and item 2214 of FIG. 130 is deleted from the display area 509 FIG. 130.

Step 2204 is executed to dismiss dialog 2211, and control is returned to step 528 from step 2205.

Additional disclosure is contained in CADIS-PMX User's Guide—Windows Schema Editor, Version 2.0 (August 1994), the entirety of which is incorporated herein by reference.

H. Legacy and the Legacy Manager

The legacy manager 145 is a component of the dynamic class manager 134 that provides services for classifying, and parameterizing data. Legacy 133 is an application that provides a graphical interface and tools for classifying, parameterizing, moving, importing, and editing parts, a process also known as "legacizing". Legacy 133 communicates with the knowledge base client 131 using the API 143.

FIG. 132 shows a preferred process for performing the transformation of customer legacy parts data into a parts knowledge base in a form usable by the dynamic class manager 134, thereby providing access to users through a retriever 130.

In step 600, customer parts data sources, which may include data from material requirements planning systems, part master systems, bill of material systems, purchasing systems, engineering drawing systems, part catalogs, crib sheets, intelligent part numbering systems in files 601 are analyzed for possible complete or partial inclusion in the input files that serve as input to legacy 133. Parts data sources to be used in legacy processing are segregated into legacy input files 602. These original parts data sources may be in a variety of formats, including fixed length records, delimited records, COBOL file formats, or others which are converted in step 603 to importable legacy data files 604, which consist of text identified by part identifier with fields separated by a standard delimiter, usually an ASCII tab character.

In step 605 the legacy input files are analyzed to determine if data augmentation would be appropriate. For example, classification and parametric information about integrated circuit parts is available referenced by manufacturer and device number and may be used to augment or replace any other descriptions of these parts by use of genic 3000. Similarly, classification and parametric information is available from government and industry standards, or customer supplied engineering tables, which may then be automatically merged with other descriptions of these parts. The resulting optionally augmented part legacy data is stored in files 607.

Step 608 includes running the classify program to perform initial classification of the optionally augmented legacy data 607. In addition, if parts data is to be imported to classes based on patterns identified in the parts data, import maps are generated describing the relationship of the patterns to their associated classes. Finally in step 608, any required custom schema development is performed by a combination of manual means and use of the schemagen program. The result of step 608 is the creation of a preliminary knowledge base accessible by the dynamic class manager 134 and therefore legacy 133.

In step 610 the graphical user interface of legacy 133 is used by subject matter knowledgeable users who are assigned to perform further part classification and parameterization on parts within identified subtrees of the class hierarchy. By iterative application of legacy 133, the preliminary customer parts knowledge base 611 is produced. In step 612 a combination of random sampling, use of the ability of retriever 130 to query on parts at a non-leaf class in the schema to identify partially classified parts, querying on undefined attributes to identify incomplete parameterization, and sorting and inspection of parameter minimum, maximum, and standard values is used for quality inspections and correction of part classification and parameterization. The final result of the quality assurance activities performed in step 612 is a customer parts knowledge base ready for delivery to the customer. In step 613, this knowledge base is delivered to the customer by means of computer tape, disks, or other computer-readable means, with the delivered knowledge base 614 being further maintained and enhanced by the customer through retriever 130.

In the present invention, legacy 133 provides graphical user interface to the classify a part function 1101, parameterize a part function 1102 of the legacy manager 145, along with software programs for performing initial part classification 3001, a schema generation program 3002 for custom schema generation from data, and genic 3000, a data augmentation through analysis, lookup, classification and parameter generation for integrated circuit type parts based on manufacturer and device identifiers.

Legacy 133 includes the query formulation and part display and editing functions of retriever 130 as a means of querying, displaying and modifying the parameters of parts, including selecting those parts to be classified and parameterized, and as a means of navigating the class hierarchy and associated attributes to select classes, attributes and enumerators for thesaurus editing.

Legacy 133 also provides a graphical user interface for the creation, modification and deletion of thesaurus entries stored as metadata associated with classes, numeric attributes, boolean attributes, enumerators of enumerated attributes, and units within unit families. Legacy 133 also includes a means for setting and modifying the class types collection, primary, and secondary which are used to control the classify a part function 1101 in its use of the class hierarchy.

It provides a means for selecting the source attribute 1266, a text attribute from which the text parameter to be analyzed by the legacy manager 145. It also provides a means for selecting the destination attribute 1267, the text parameter of is set to return to the user the text resulting from application of thesaurus entries when a part is classified or parameterized.

The user may specify a list of attributes to parameterize 1277 which is defined by the legacy manager as a superset of the parameters that may be set during parameterization. Legacy 133 provides a graphical user interface for adding and deleteing parameters from the list of attributes to parameterize 1277.

The user may also specify a virtual root 1269 which is defined by the legacy manager as the class from which legacize ancestor classes 1112. By this means, the user may effectively control which superclass thesaurus entries are applied to legacizing one or a group of parts.

FIG. 170 shows how the user accesses knowledge bases for legacy processing by step 615, selecting Open from the drop down menu choice File 1201 in FIG. 171.

The registry server 141 is queried for a list of knowledge bases and rights available to the user in step 616. The results are displayed to the user in step 617 as a selectable, scrolled list 1200 specifying the knowledge base name 1202, with rights to retrieve parts 1203, edit parts 1204, edit schema 1205, and make parts 1206 shown for each knowledge base known to the registry server 141. When a user selects a knowledge base, such as the example "fifi" 1202 shown with retriever 1203, edit parts 1204, and edit schema 1205 rights and with make part rights 1206 denied, the legacy button 1207 will be dimmed if the user does not have legacy rights to the selected knowledge base 1202. If the user has legacy rights to the selected knowledge base, the legacy 1207 button may be used in step 618 to continue with legacy 133, displaying the work area selection window 1212 shown in FIG. 172.

In step 619 the user selects and locks the work area or cancels and does not select a work area. As shown in FIGS. 172 and 173, the class hierarchy is presented starting with the root of the knowledge base 1216 step 624. By manipulating the class hierarchy in step 625 as in retriever 130, selecting a class 1213 as the root of the work area, and using the work in area button 1214 to request the work area or cancel button 1215 in step 625. If the user canceled the request as tested in step 626, the work area 1217 window is removed and the initial legacy window 1199 is displayed. If the user did not cancel the request as tested in step 626, a subtree lock is requested for the selected class in step 627. If the lock is not granted as tested by step 628, an error dialog informs the user that another user is working in the requested subtree in step 631. If the lock is granted, a retriever 130 with additional legacy functions is invoked in step 629 with the class hierarchy rooted at the class selected by the user 1216. Control is returned to the user in step 630.

Legacy 133, with part specification window 1224 shown in FIG. 174 includes the functions of retriever 130 as discussed above, except for the following differences. The available parts in a the subtree of a selected class 1218 are shown, with the value independent of any query selectors set as search criteria. An update count button 1220 is provided to allow the user to explicitly request a query to be performed with the matching part count updated as parts found. This function is provided separately in legacy because the processing of legacy knowledge bases begins with parts either unclassified or roughly classified to high levels in the parts hierarchy, resulting in possible performance penalties for some queries. By allowing the user control over when a query other than the query that returns the part count for a subclass is performed, significant additional efficiencies may be achieved, especially during the early part of a legacy processing project.

The class hierarchy 1223 displayed by legacy includes additional icons 1222 that show classes with locks that may have been applied by other users. These locks may be refreshed at the user's request, providing feedback concerning the work areas of other legacy and schema editor users and allowing class access conflicts to be more easily resolved.

Legacy 133 also provides a user interface for class thesaurus editing as shown in FIG. 175. The process of editing a class thesaurus is shown in the flowchart in FIG. 176. In step 631, the user navigates to and selects a class 1225 and chooses thesaurus entry editing 1226 from a drop down menu available by use of the right mouse button. In step 632, the thesaurus list is obtained from metadata for the class 1225 through the dynamic class manager 134. In step 633 the user edits the thesaurus using the thesaurus editor 1227 shown in FIG. 177 before returning to the retrieve parts window 1228. In the example shown in FIG. 177, the thesaurus currently has one entry 1229, which contains a regular expression suitable for matching many of the common text forms for describing ¼ inch 20 threads per inch pitch machine bolts. In the editing example, the user adds a thesaurus entry for the same size machine bolts where "¼ inch" is described as "0.25-" or some variant thereof.

Thesaurus editing consists of modifying the list of text strings in a thesaurus using the controls provided by the thesaurus editor 1227 as shown in the flow chart in FIG. 178.

The user selects one of seven thesaurus editor actions in step 635. If the test at step 636 determines that the user selected the cancel button 1230, control is returned to the invoking window without updating the thesaurus being edited. If the OK button is chosen, the thesaurus for the schema object is replaced with the text in the thesaurus editor in step 642. The add button 1233 is used in step 639 to open a blank line 1237 below the currently selected thesaurus entry as shown in FIG. 179. The copy button is used to store the contents of the currently selected thesaurus entry 1229 in step 637 so that it may be used to replace a selected thesaurus entry 1237 as shown in FIG. 179. In the example shown, the user replaces "¼" 1238 in the new thesaurus entry 1237 with "\0.250*" in FIG. 181. In this way, the user can easily reuse thesaurus entries to create patterns that match similar forms of text that may be found in part descriptions for parts of a class.

In FIG. 182 a blank thesaurus entry 1240 has been created by using the insert button 1234 and step 640 with thesaurus entry 1237 selected. Deleting thesaurus entry 1240 using the delete button 1235 and step 641 would result in the thesaurus entries shown in FIG. 181.

FIG. 183 shows a thesaurus entry of a type that is likely to be found at a nonleaf class in the class hierarchy. It matches the portion of a standard form of text description of a fractional sized machine bolt, transforming the portion of a string such as "0.25–20×2.5 L, CAP HD, STLNPHEX SKT" into "0.25–30 length={0.75 inch}L,CAP HD,STLNPHEX SKT", from which it is significantly easier and more reliable to automatically extract the length parameter with the correct unit of inches. FIG. 183 also shows that the thesaurus editor 1227 can be invoked by selecting the thesaurus drop down menu for a class in the class hierarchy accessible from either the part specification window 1224 or the part editing window 1243.

The flowchart in FIG. 184 shows the process of editing thesauruses for the enumerators of an enumerated attribute. In the example shown in FIG. 185, the enumerated attribute Finish 1244 is selected and the drop down menu including the thesaurus entry choice is selected as step 648. The result is shown in FIG. 186. The enumerator list 1247 is obtained for the selected attribute 1244 and displayed in step 649. Selecting an enumerator such as the example "Cadmium Plate" 1248 invokes the thesaurus editor 1227 for that enumerator's thesaurus, which functions as described in the flowchart in FIG. 178. The thesaurus editor for enumerator thesauruses may also be invoked from the column heading of the edit parts window 1243 as shown in the example in FIG. 187 where a thesaurus entry 1251 for the enumerator "Black Oxide" 1250 for attribute Finish 1244 is being displayed and edited.

The flowchart in FIG. 203 shows the process of editing a thesaurus entry for a numeric, text or boolean attribute. In the example shown in FIG. 189 the thesaurus 1252 for a numeric attribute, Length, 1253 is edited. The user selects the attribute from either the part specification window 1224 or the part editing window 1243 as shown in FIG. 190 by using the drop down menu 1246. The thesaurus for the selected attribute is obtained in step 656 and edited by the thesaurus editor 1227 as shown in FIG. 191, with control return to the user in step 658. The example thesaurus entry is a regular expression that will match some standard forms of machine bolt length descriptions as transformed by class thesaurus entry 1241 in FIG. 183.

FIG. 192 shows thesaurus entry editing for units within a unit family. In the associated flow chart in FIG. 193, the user selects the unit thesaurus editing button 1254 from the legacy tools toolbar 1255 in step 659. The list of all unit families is obtained and presented to the user in a drop down list 1256 in step 660. In step 661, the user may return from the unit thesaurus editor by choosing the OK button 1258 or cancel button 1259 through step 666. If instead the user selects a unit family from the drop down list 1256, step 662 obtains a list of derived units for the unit family 1260. The user selects a derived unit 1260 in step 663 and step 664 obtains the thesaurus for the unit 1261, which is then edited with the thesaurus editor 1227.

FIG. 96 shows the processing of queried parts by the legacy functions classify a part 1101 and parameterize a part 1102. FIG. 195 is a flowchart describing the process by which parts selected 1262 from the part editing window 1243. In step 667 the user selects part 1262 from the attribute display and chooses the legacy processing window from the tools menu 1264. In step 668 the legacy processing window displays the class path from the root of the user's work space to the class of the current query. Also displayed are drop down lists of available source attributes 1266 and destination attributes 1267. A list of available target attributes for parameterizing are displayed if the parameter setup button 1268 is chosen. The user may also select a virtual root 1269 for controlling the application of ancestor class thesaurus entries during classify a part 1101.

If the user chooses the legacize button 1270, the selected parts are both classified 1101 and parameterized 1102, with resulting part parameter values displayed in the part display window 1262. FIG. 196 shows the result of legacizing the selected parts 1279. In the first line of the parts display 1281 after legacizing, the finish parameter is set to "Cadmium Plate" due to matching the thesaurus entry 1249 "CAD [MIUM PLATE]* from FIG. 186. The length 1282 is set to 0.5625 inches due to matching a combination of the class thesaurus entry at the class Fractional, the numeric attribute thesaurus entry for length, and the unit thesaurus entry for the unit "inches".

If the user chooses the classify button 1271, the selected parts are classified 1101. The results of classifying a part may be inspected by using the part information button 1273.

If the user chooses the parameter setup button 1268, the process described in the flow chart in FIG. 197 displays attributes for the class of the current query in step 678. In response to choosing the insert button 1274, step 680 inserts the selected available attribute 1276 into the list of attributes to parameterize 1277 above the current selection. In response to choosing the add button 1275, step 681 adds the selected available attribute 1276 into the list of attributes to parameterize 1277 below the current selection. In response to choosing the remove button 1278, step 682 removes the selected attribute to parameterize 1277. The result of editing the attributes to parameterize 1277 are shown in FIG. 198.

The legacy manager 145 is a component of the dynamic class manager 134 which automatically subclassifies and parameterizes an instance based on a combination of text data in a source attribute 1266 and thesaurus entries that may be available as metaparameters to classes, text attributes, enumerators or enumerated attributes, boolean attributes, numeric attributes, and units. Classification by the legacy manager 145 is accomplished by the classify a part function 1101, a non-parsing method employing matching of thesaurus entries interpreted as regular expressions against source attribute 1266. Each successful match increases the score for the class at which the matching class, attribute, or enumerator thesaurus entry was found. The thesaurus entry matches are performed recursively down the class hierarchy, beginning with the class at which the part instance is currently defined, with scores being compared in the style of a single-elimination tournament as the recursive calls return. If there is a clear winner among sibling classes, the winner is passed up in the recursive call return to compete at the next level. If a class achieves a score equal to the current winner within a sibling group, the winning score is stored and the current winner is marked as tainted and may not be declared the winner for the sibling class group. However, a sibling class that achieves a superior matching score to the tainted winner score will be declared the winner of the sibling group. If there is no winner within a sibling group, the superclass of that group is declared the winner and competes with its siblings in the next round of competition. When the recursive descent of the class hierarchy is completed, if a winner has been chosen among the classes in the subtree, the part instance being classified has its owner set to the winner class. The part instance is then analyzed again, first by having the thesaurus entries between its owner and either the root of the class hierarchy, or a virtual root class supplied when invoking the classify part function 1101, applied to the text parameter defined by source attribute 1266, which may result in eliding portions of the text. This modified text is used to set the text parameter defined by destination attribute 1267, providing feedback to the user concerning the combination of thesaurus entry matches that were used to classify the part instance.

Turning to FIG. 133, the automatic part classification function of the legacy manager begins by insuring that the source and destination attributes chosen by the user are text attributes and are either local to the part instance's owner class, or are inherited at that class in step 1104. If an illegal attribute is detected in step 1105, the part instance is returned with its classification unchanged, else initialization is performed by creating a local copy of the source attribute text parameter and initializing the legacy attribute in step 1106, a local copy of which contains the score of the class at each node of the class tree as the classification tournament progresses. The instance is then classified in step 1107, following the method outlined above. If the resulting working string is determined to be of zero length in step 1108 due to the application of thesaurus entries throughout the subtree in step 1107, the destination attribute's parameter is set to undefined for this part instance in step 1109, else it is set to the value of the working string in step 1110. The classified instance is returned to the caller in step 1111.

In FIG. 134, the method for classifying a part referred to in step 1107 is displayed. In step 1112, ancestors of the current class are legacized, with thesaurus entries being applied in order from the root class or a virtual root class supplied by the user. Then the subtree of the owner class of the instance is recursively descended to legacize the instance for the purpose of finding the class that provides the best overall match to the source attribute 1266 in step 1113. If the winner class differs from the current owner class for the part as determined by step 1114, the owner for the class is set to the winner class in step 1115, after which the classified part instance is returned in step 1116.

Legacizing ancestor classes is shown in FIG. 135, with step 1113 ascending the class hierarchy from the owner class of the part to and including the root or virtual root class, creating a list which is ordered from root to owner class of the part. The first class in this list, which is the root or virtual root class, is obtained in step 1114. If step 1114 successfully obtained a class to process as determined by step 1115, the thesaurus entries for that class are processed in step 1116. This processing may result in modifications to the working string. The next class in the list is obtained in step 1117, with control then returned to step 1115, providing for a loop that processes each class in the list. When the loop terminates by encountering the end of the class list, the legacy attribute with updated scores and the modified working string are returned to the caller.

The method for legacizing an instance to determine the best matching class in the subtree is shown in FIG. 136. First the working string is checked for zero length in step 1117, with step 1118 setting the winner class to the current class and returning if the working string does not contain any characters which could influence the further choice of a matching class. If the working string has one or more characters, the thesaurus entries for the current class are processed in step 1119. If none of the thesaurus entries applied in step 1119 matched the working string, the class type is tested in step 1122. If the class type is marked as primary and the owner class of the instance is not the same as the current class as tested in step 1123, processing continues through step 1125 and the current class is returned as the winner of this subtree. This is done to insure that subtrees for primary classes are not descended unless the primary class has at least one matching thesaurus entry, preventing unnecessary processing. If the class type is marked as collection, thesaurus entries only must be matched if they are found in step 1124—a collection class with zero thesaurus entries of the type that are intended to match and elide parts of the working string will always have its subclasses explored for a better match. If not, processing continues through step 1125 with the current class being declared with winner for the subtree. Classes marked as secondary are descended whether or not any thesaurus entries matched the working string.

In the cases where the rules as described above for continue the descent of the subtree are met, thesaurus entries for local attributes of the current class are processed in step 1126. In step 1127, the winner for the tournament over the subtree rooted at the current class is provisionally declared to be the current class. Processing then continues through step 1128 to FIG. 137, where the subtree will be explored for a better match. This is accomplished by recursive descent of the subtree, which begins with getting the list of subclasses for the current class in step 1129. As long as this list is not fully processed, as tested in step 1130, a loop is executed in which the next class in the list is obtained in step 1131 and the legacize instance function 1113 is recursively called. This function always returns with a winner class set, which may be the same as the current class in the case that a superior match was not found in the subtree. The score for the winner class so returned is compared to the current winner in step 1114. The count of primary class matches is weighted most heavily, followed by secondary and collection class matches, non-numeric attribute matches, numeric attribute matches, and finally, as a tie breaker, the class with the shorter length of working string after processing is preferred. If the returned winner class has a lower score than the current winner, it is rejected and the loop continues with step 1130. If the returned winner score is identical to the current winner, the current winner is marked as tainted in step 1115 and will not be allowed to be declared the winner for this subtree. This is to prevent an equal match across all subclasses from favoring the first subclass processed. If the returned winner has a higher score than the current winner, it is stored as the current winner in step 1116 and further competition within this subtree is with this new winner class.

When the list of subclasses has been processed as indicated by the test in step 1130 failing, processing continues through step 1125. In FIG. 138, the tainted winner flag is tested in step 1186, with the current winner being rejected if the flag is set, resulting in the current class being declared as the winner of its subtree in step 1187. If any of the processing resulted in a new winner being declared as tested in step 1188, the current working string is replaced with the working string returned from the competition in the subtree in step 119. The current score is updated with the new winner score in step 1190, with this score being used to compete with classes in the next level of the tournament. Regardless of whether a new winner was declared, the final winner class for the subtree is returned to the caller in step 1121.

In FIG. 139, the processing of attributes for the purpose of classification is shown starting with obtaining the list of local attributes for the class in step 1131. These attributes are all processed in a loop controlled by the test in step 1132, with step 1133 getting the next attribute in the list for analysis. The details of the matching of an attribute's thesaurus entries to the working string are controlled be the test for attribute type in step 1134.

Enumerated attributes do not themselves carry thesaurus entries. The terms associated with enumerated attributes that are likely to be found in a part description are the possible value of the attribute, the enumerators. Each enumerator may have a list of thesaurus entries, any one of which may match a part of the working string. In order to test each enumerator, a list of enumerators is created in step 1135. As long as the test for another enumerator in step 1136 succeeds, the thesaurus, consisting of a list of thesaurus entries, is obtained in step 1137, and processed against the working string in step 1138. If an entry in the thesaurus matched, the non-numeric attribute score is incremented for the class in step 1140, improving its degree of match against the working string. If no thesaurus entry matched, the loop continues, processing each enumerator in order.

If the attribute is a text string or boolean type, it may have a thesaurus containing thesaurus entries describing both how to transform the working string locally before further processing, and what patterns constitute a match for the text string or boolean attribute if matched in the working string. This thesaurus is obtained in step 1141 and processed in step 1138, using the general function for processing any thesaurus for any schema element. If the thesaurus entry matched, the non-numeric attribute score is incremented for the class in step 1140.

Numeric attributes must be evaluated both in terms of the numeric thesaurus itself, and any associated unit thesaurus. The numeric thesaurus entries attempt to match a combination of digits and other numeric symbols, along with patterns that would indicate an appropriate context for finding the numeric information in a text string. The unit thesauruses for the base and derived units of the unit family for the attribute may contain patterns that discriminate among the different convertible units that might be found in the working string, such as "in" for inch or "ft" for feet, allowing the legacy manager to correctly interpret and convert such information. The thesaurus for the numeric attribute is obtained in step 1141 and processed in step 1138. If no thesaurus entry matched as tested in step 1139, no further processing is done, else the list of units for the unit family for the numeric attribute are obtained in step 1142. A loop controlled by the test for another unit in the list in step 1143 gets the thesaurus for the next unit in step 1144, processes that thesaurus against the working string in step 1138, and tests for a match in step 1139. A match indicates that a number and unit in correct combination have been found in the working string, increasing the numeric attribute score for the class in step 1145.

FIG. 140 shows the generalized mechanism for processing a thesaurus against the working string for all types of schema objects that may have thesauruses defined: classes, numeric attributes, enumerators, boolean attributes, and text attributes. It is invoked with a flag to indicated whether a successful match of a thesaurus entry should result in modification of the working string. Processing beings by getting a list of all the strings, or thesaurus entries, that make up the thesaurus provided by the caller in step 1146. These entries are processed in a loop that is controlled both by the test for another thesaurus entry in the list in step 1147, and the test for a successful pattern match in step 1157. In each iteration through the loop, the next thesaurus entry is processed against the working string.

There are two general types of thesaurus entries used to match the text in the working string. The first, called a modifying or editing thesaurus entry, begins with either a "v/" or a "g/". These thesaurus entries behave essentially like editing commands in the UNIX vi editor. For example, a thesaurus entry "g/X .*([0–9.][0–9.\/][0–9.\/]*)/s//length={\1 inch}" would only act on a string that matched regular expression pattern between the first pair of slashes, and would substitute for that string the text "length=", followed by the text in the working string matching the captured portion of the pattern (between the open and closed parentheses), followed by the word "inch". For example, this thesaurus entry applied to the working string "¼–20× 1.25" would produce the resulting working string "¼–20 length={1.25 inch}". Providing this type of thesaurus entry, employing full regular expressions with the ability to capture and reuse portions of the working string, allows for the reliable evaluation of standard form text fragments common to a particular class or attribute without requiring that all of the text conform to a correct or canonical form, thereby allowing legacy to successfully exploit a wide variety of data of the sort commonly found in legacy parts data sources.

The "v/" form of this type of thesaurus entry works identically to the "g/" form, with the exception that the filter, or first pattern, is considered to match if the regular expression it contains is not matched in the working string. This allows the selective modification of working strings that are discovered to be missing data that, if provided, would allow for simpler processing by later thesaurus entries.

The processing for editing style thesaurus entries begins by extracting the filter between the first pair of slashes in step 1148. The pattern to be matched is then extracted in step 1149. If the pattern is missing, it is defaulted to be identical to the filter, as in the example above. A flag is set to avoid later modification of the working string other than the transformation defined by the thesaurus entry itself in step 1151. If the filter matches the working string, keeping in mind the opposite sense this has for "v/" thesaurus entries, as tested in step 1152, then the modify flag is set and the pattern is tested against the working string in step 1157. If it matches, and the caller requested that the working string be modified and the modify flag is set, as tested in step 1158, the text in the working string matched by the pattern is replaced with the replacement text, with appropriate expansion of captured text, in step 1159. If a thesaurus entry matched, a boolean value of true is returned to the caller in step 1160.

Non-editing, or simple, thesaurus entries are intended to match and optionally result in eliding matched text from the working string. They are distinguished by not starting with "v/" or "g/". The pattern is set to the thesaurus entry in step 1154, and the flag is set to modify the working string in step 1155. The replacement text is set to a single character "!" in step 1156 that can be detected in later thesaurus entries, providing a simple means for determining either by inspection of the destination attribute 1267 or by a thesaurus entry matching "!". In this way, the effect of matching a thesaurus entry can be made conditional upon the successful application of an earlier thesaurus entry. From this point, processing continues as for the editing thesaurus entries, with a test for the pattern being matched in the working string in step 1157, followed by optional replacement of the matched text by the character "!", defined as the current replacement text in step 1159 as controlled by the test in step 1158.

If the entire list of thesaurus entries is processed without a match as indicated by the test in step 1147 failing, a boolean false is returned to indicate that no matches occurred.

Processing the thesaurus for a class is shown in FIG. 141, where step 1116 first determines if the class is a collection class or not. Collection classes may contain a thesaurus, which may be used to avoid descending a subtree in order to tune performance or improve reliability by limiting the scope of matches. However, while editing thesaurus entries may always result in the modification of the working string, simple thesaurus entries are not so used for a collection class, so a flag is set to avoid processing of the working string in step 1164. Conversely, for primary or secondary classes, simple thesaurus entry matches should always result in eliding the matched pattern from the working string, and the flag to process the string is set accordingly in step 1163. In either case, the function to process the thesaurus for a schema object is called for the class in step 1165, with the result returned in step 1166.

In addition to automatically subclassifying by matching both class and attribute thesaurus entries within a subtree to the text parameter defined by the source attribute 1266, one or more specified attributes may be automatically parameterized using thesaurus entries.

Parameterize a part 102 is shown in FIG. 142. Like classify a part 1101, it begins by checking that source and destination attributes are local or inheritable to the owner class of the instance being parameterized in step 1104. If an illegal attribute is detected in step 1105, the instance is simply returned in step 1169. The text parameter for the source attribute is copied to the working string and the legacy attribute is initialized in step 1106. In order to preserve the effect of any thesaurus entries in classes between the owner class of the instance and the root, legacize ancestor classes is performed in step 1112, and the thesaurus entries for the owner class are also processed in step 1119. Non-numeric parameters are legacized first in step 1167, followed by numeric parameters in step 1168. This order allows simpler definitions of collections of thesaurus entries with less conflict between the numeric thesaurus entries and numeric data that is often found within enumerators or other non-numeric attributes. For example, the ceramic capacitor dielectric "X7R" contains a digit that might be inadvertently elided by applying a simple numeric thesaurus entry, but would be protected by allowing the non-numeric attributes to be processed first. After all parameters have been legacized, the parameterized instance is returned in step 1169.

To legacize non-numeric parameters, step 1167, the process in FIG. 143 is followed. In step 1170, the list of all inherited and local non-numeric attributes for the owner class of the part instance is obtained. The list may be further limited to those target attributes selected by the user using FIG. 194, dialog 1263. Iteration through this list is controlled by the test for another attribute in the list by step 1132 in FIG. 145, and successful thesaurus entry matches that may occur in step 1139. In this loop, the next attribute from the list is obtained in step 1133 and its type is determined in step 1134.

If the attribute type is enumerated, the same procedure of evaluating thesaurus entries for each enumerator is performed identically to that in FIG. 139, with a list of enumerators being created in step 1135, then looped through until list is exhausted as tested by step 1136. For each enumerator, a thesaurus is obtained in step 1137 and processed in step 1138. If a thesaurus entry matches as tested by step 1139, the enumerated parameter for the attribute may be set to the enumerator for which the thesaurus entry matched. However, the parameter will only be set if it is currently undefined. Parameters which currently are set to a value are presumed to have been set by a more trusted prior process, either in the form of directly imported data, or a value entered by a human through either retriever or the part editing capability of the legacy interface.

A similar method is used for text string and boolean attributes as detected by the test in step 1134. The thesaurus for the attribute is obtained in step 1141, and the thesaurus is processed against the working string in step 1138. If a thesaurus entry matched and the parameter is currently undefined, it is set as appropriate, either to true if boolean, or to the matched result if a string attribute.

Legacizing numeric parameters, step 1168, is shown in FIG. 145, starting with assembling a list of inherited and local attributes in the order of their definition in the schema in step 1175. The list may be further limited to those target attributes selected by the user using FIG. 194, dialog 1263. While there remain attributes to be processed, the next attribute is obtained in step 1133, its thesaurus is extracted from its metaparameters in step 1141, and processed in step 1138. If a thesaurus entry matched, the list of units for the unit family for the attribute is created in step 1142. Each unit is processed in a loop controlled by test 1143, with the unit obtained in step 1176 and the unit thesaurus obtained in step 1144 and processed in step 1138. A matching unit thesaurus entry as indicated by the test in step 1139 results in setting a the associated numeric parameter in step 1177. As in the case of nonnumeric attributes, a currently set parameter value will not be overwritten by this step. When the list of numeric attributes is exhausted, the instance is returned in step 1178.

Legacy 133 also includes a classify program 3001 and a schema generator 3002.

The classify program as shown in FIG. 200 is used to match formal object names with human entered textual descriptions that contain abbreviations and spelling errors. The purpose of the classify program is to use the knowledge accumulated in the names of the schema objects in 2154 (class names, attribute names, unit families, etc.) to suggest locations that one might place a new part, or where one might go to look for a set of parts with a given description obtained in 2153. The classify program generates output which is a set of potential locations in the schema that the part description may be classified in 2157. The set of potential locations is reviewed by a human in 2158. The selected classification is then placed in an import map in 2159.

The classify program operates by using two word matching techniques. The first matching technique is referred to as the "Bickel Algorithm", and the other matching technique is referred to as the "Soundex" Algorithm. These algorithms use different approaches to locate candidate word matches with the target word.

In the Bickel Algorithm, a mask describes the characters which are common to the target word, and the candidate word is scored based upon the frequency of the use of each character. The higher the aggregate score, the better the match. The Bickel Algorithm is known to those skilled in the art, and is further described in Bickel, M. A., "Automatic Correction to Misspelled Names: A Fourth-Generation Language Approach," 30 Communications of the ACM 224 (March 1987), and Howell, J., "An Alternative to Soundex", Dr. Dobbs Journal (Nov. 1987), both of which are incorporated herein by reference.

In the Soundex Algorithm, a mask which describes the sounds of the characters used in both the target and candidate word is checked for an exact match, or a match up to a certain location in the mask. The Soundex Algorithm is known to those skilled in the art, and will not be described in detail. The Soundex Algorithm is described in U.S. Pat. No. 1,261,167 and in U.S. Pat. No. 1,435,863, both of which are incorporated herein by reference.

The classify program extracts all of the schema object names from the object oriented database in step 925 of FIG. 146. As the names are extracted they are separated into distinct words in 926. Encoding of each of the distinct words into representative forms using the Bickel mask, and the Soundex mask occurs in 927. The process of steps 925 through 928 inclusive continues until all schema object names have been extracted, separated into distinct words and encoded. In addition to the extraction, separation, and encoding performed in 925, the program also remembers where in the schema tree structure that each word was used. Since the same word may be used in different locations of the tree, it is important to remember which one was used where.

User input is obtained in step 929. The user input is data which is obtained from a customer, and describes a part that is to be classified using the schema name data obtained in 925 through 928 inclusive. The user data is text data which can be broken into distinct words for the purposes of matching against schema words. Step 930 decomposes the user input string into distinct words. These words can be abbreviations of the intended words, can contain misspellings, or can be malformed in other ways.

The words obtained from the user description in step 930 are then encoded by both the Bickel algorithm, and the Soundex algorithm in step 931 of FIG. 147. The Bickel character mask is applied to each schema word to determine which of the schema words are the best candidate matches in steps 932 through 935. Step 932 selects a schema word. Step 933 tests the score yielded by the Bickel Algorithm, to determine if it is the highest score match. If so, the result is saved in a list of potential matches in 934. The search continues until all schema words have been examined for matches in 935.

Step 936 in FIG. 148 examines the results of the previous search loop, and selects the words which exactly match the highest score seen by the loop from 932 to 935 from the list created of potential matches in 934. These soundex masks, created in 927, is used to test how well the refined set of candidates matches the original input word in 937. If a word fails the Soundex test, then the word is discarded from the candidate list in 938. If the Soundex test succeeds in 937, the word is retained for further use, in 939, and the search continued to 940 to determine if any more candidate words remain. At 940 If there are still words in the candidate list, the program continues at 936. Otherwise, the program continues at 941.

At this point, there may still be too many options to be useful as a search tool, and only the use of single words have been discussed so far. The Description of parts in many cases involves multiple words. Each word bears meaning in itself, but collectively as a set of words mean more in this context than they do individually. In other words, the group is more meaningful than the sum of the component parts. This can be exploited by remembering where in the class structure each of the candidate words came from. By comparing the ancestry of the words that are found by the matching technique previously described, common threads can be found that are used more than other threads through the tree. These popular threads describe the likely places in the tree that a given part description can either be found, or could be placed. This process of finding common ancestor threads is performed in 941. FIG. 149 step 942 looks at the result of this process to determine if there are any words which did not gain any strength through the combination of ancestors. These words are discarded, unless they are the only ones. (In other words, no common ancestors were found.)

The output of these algorithms can then be presented to a user either through a text based interface, or a graphical user interface in step 943. The user can then make a selection from the small set to find what the user is looking for. This process is repeated for each description that is presented to the classify program either interactively, or through a batch interface.

The schema generator is used to generate object database structure from human entered text descriptions that contain abbreviations and spelling errors. There are three purposes of the schema generation program. The first is to generate schema class structure for an object oriented database from human generated text descriptions. The second is to determine the class density of each of the generated classes. In other words, to determine how many user descriptions could be described by each generated class. The third is to combine erroneous spellings of the input data, to further populate existing classes, and to avoid creating additional variant classes.

The schema generation tool 3002 as shown in FIG. 199 is used to create schema using customer or user part descriptions as input. Since this part description data is entered by humans in 2150, the data tends to contain misspellings, and typographical errors. The schema generator reduces the user descriptions to schema structure in 2151. The output is a schema structure and a part mapping density that indicates how many of the part descriptions would be placed at each schema class in 2152.

The schema generator reads a description of an arbitrary part in step 960 of FIG. 150. If a description was obtained, step 962 allows execution to continue at 963. If a input was not found, step 962 prints the output to a disk file and terminates. The part is decomposed into words in 963. Each word is compared against all other words that exist at that level in 964, to determine if this word needs to be added to the list at this level. If a the current word failed to match any previously used word, then the program proceeds to 971 of FIG. 151 to add the word to the internal word list at this level.

Regardless of how the match occurred (whether by adding a new word, or matching an existing word), then the next word in the string is examined against the subordinates of the matched word in a recursive fashion. This process continues until the input is exhausted, both in the case of each description, then until all descriptions are exhausted.

The techniques used for matching are the Bickel Algorithm in step 964 of FIG. 150, a typographical error matcher in 968 of FIG. 151, and an abbreviation matcher in step 966. In the Bickel Algorithm, a mask describes the characters which are common to the target word, and the candidate word is scored based upon the frequency of the use of each character. The higher the aggregate score, the better the match. This algorithm is used for finding the broadest set of potential matches and is used in 964 of FIG. 150.

Since humans are not particularly consistent in the entering of part descriptions, additional techniques must be employed to refine the output of the search by the Bickel Algorithm. In some cases, humans use abbreviations in place of full word descriptions. Abbreviations are typically formed by either truncating the word, or deleting characters from the word.

In step 966 the abbreviation matcher attempts to stretch the target word when errors in comparison are encountered. Each time that a comparison fails, the target is stretched by 1 character. The comparison then resumes at the next character. If the target word gets longer than the candidate word, then the comparison fails. If the target is exhausted prior to completing the comparison with the candidate, then a match is declared if a certain percentage of the word has been covered by the suspected abbreviation. The required coverage is adjustable, and is tuned to each data set. Some examples would be:

| | | |
|---|---|---|
| Bit —> | B*lt | The comparison covers 100%. |
| Bolt | Bolt | |
| Rgstr —> | R*g*st*r | The comparison covers 100% |
| Register | Register | |
| Microproc | Microproc | The comparison covers 75%. |
| Microprocessor | Microprossor | |

The * characters here represent a character inserted into the string in the locations where the string is stretched. The value of the character is irrelevant to the process. Any character could be used. If the result of step 966 is to produce only 1 match, then the schema generator at step 967 will decide to combine the current word with a word that is currently in use in step 970.

The typographical error matcher in step 968 is used to combine words which are intended to be the same, and can be detected by a human as the same word, but computers can not.

Typographical errors occur when a human entering data on a standard "qwerty" keyboard, misses the intended key, and instead uses one of the adjacent keys. An example would be the word "Adhesive".

Adhesive—The intended word.
Ashesive—s used in place of the d.
Ashesive—n used in place of the h.

In both of these typos, the intended key can be found physically adjacent to the character that was used.

To match the words which contain typographical errors, two things must be done. A map must be made of all the adjacent keys for each character on the keyboard. Second, when comparing words which are suspected of containing typographical errors, the comparison must look at the keys adjacent to the character in the target word that does not match. If the key can be found as an adjacent key in the key map, then the comparison can continue. Each error is counted, and in the end, a match can be returned, with a particular number of errors. If there are still several candidates, the one with the fewest errors is selected.

In addition to the typographical errors described, there is a special case that involves transposed characters. This problem is not detected by the method described. However, by performing a subtraction on a character by character basis, and taking the absolute value of any number that is not zero, Transposed characters can be detected by adjacent characters which have the same non-zero difference value. Transpositions are not counted as errors for the purposes of error grading. An example would be the word "Positive".

Positive
Positive

When combined with the matching process that uses adjacent keys, the word Positive could be matched as follows:

Positive
Psoitice

If the result of the typo matching process in step 968 of FIG. 151 yields a single match, then the decision will be made in step 969 to combine the current part description with an existing part description in step 970.

Once a matching has been deduced by the combination of these techniques, selecting the correct spelling of the word is the next problem. Each time that a new spelling is detected, and matched with a particular candidate word, the misspelled is combined with the candidate in step 970. If the candidate word is treated as an intelligent object, which can perform some actions when the replacement is made, then the number of times that any given spelling is observed can be recorded. The object can reflect its current state as the most popular spelling seen. Since humans tend to spell correctly most of the time, the misspellings still get matched, counted, and so forth, but they disappear in to the correctly spelled word. The object when asked what it spells responds with the most used spelling.

If a word is habitually misspelled by a particular user in their parts description, all of the misspellings congregate around the most popular one, which is suggested as a class entity in the object schema in one place. The misspelling can be corrected in one place rather than hundreds or thousands.

From 970, the program proceeds to 972 to determine if any more words remain in the current description. If there are more words, the program returns to 964 to begin evaluating the next word. This process continues for each word in a given description, and for each description, until all words and descriptions are exhausted.

Genic 3000 is a tool that is used as part of the legacy process. Genic 3000 is used for data augmentation and parameter specification for customer data that contains integrated circuits. The output of genic 3000 can be subsequently imported into a knowledge base 123 for additional legacy processing.

FIG. 201 shows a typical data flow for processing data using Genic 3000. Genic 3000 accomplishes data augmentation by using vendor part numbers and vendor names found in customer data shown in item 2162. The vendor part number and name is looked up programmatically in a published database of vendor parts as depicted by item 2160. Database 21620 and 2162 are read by genic 3000 in steps 2161 and 2163 respectively. In step 2164, information found in the published database is then translated to ASCII text in a format 2165 that can be imported in step 2166 into a knowledge base 123.

The process for matching vendor part numbers found in customer data with published vendor part numbers may be a direct match or may involve several heuristics. If the part number does not directly match, the manufacturer name or code is needed and the vendor part number from the customer data must be decoded. The decoding is done by stripping off the prefix, suffix, and extracting a base device number.

The match algorithm scans the published database file, building a list of published candidate parts that match on at least the base number. In addition, matches of the manufacturer name, part number prefix, and part number suffix are noted. The number of different classifications of a base number (i.e. kinds of parts represented by the base number) is also determined. After these determinations have been made, the quality of the match can be determined.

The quality of a candidate match is based on a rating table shown in Table 7. The rating table is a Karnaugh map (see An Engineering Approach to Digital Design, William I. Fletcher, (1980), pg 134) reduction table shown in Table 7. The Karnaugh map is used in this case to guarantee that all possible combinations of the problem are considered, and to make it easier to express the relationships among the matches of manufacturer, number of classifications, prefix, and suffix. Each cell of the table contains a rating value.

The row and column indices are boolean values indicating whether or not the value that is represented by that variable position is true or false. These boolean values indicate whether or not the associated condition is true which in turn indicates whether a match was made on this portion of the part number. The contents of the map are integer values representing the grade of that particular cell. In this map lower cell values (1) are preferred over larger cell values (12).

TABLE 7

| Prefix/1 Class | Suffix/Manufacturer | | | |
|---|---|---|---|---|
| | 00 | 01 | 11 | 10 |
| 00 | 12 | 11 | 10 | 11 |
| 01 | 9 | 7 | 6 | 8 |
| 11 | 4 | 3 | 1 | 2 |
| 10 | 5 | 4 | 2 | 3 |

Table 7. A Karnaugh map which identifies relationships between match grades.

A table representation of the Karnaugh map in Table 7 is described in Table 8. Table 8 is an english conversion table from match conditions to match grade. The grade of any given match can be determined by identifying which of the components match. It is assumed that the base number portion must match before any subsequent matching tests are made. Empty locations in the table indicate no match.

TABLE 8

| Rating | Manufacturer Match | Suffix Match | Only One Class | Prefix Match |
|---|---|---|---|---|
| 12 | | | | |
| 11 | Yes | | | |
| 11 | | Yes | | |
| 10 | Yes | Yes | | |
| 9 | | | Yes | |
| 7 | Yes | | Yes | |
| 8 | | Yes | Yes | |
| 6 | Yes | Yes | Yes | |
| 5 | | | | Yes |
| 4 | Yes | | | Yes |
| 3 | | Yes | | Yes |
| 2 | Yes | Yes | | Yes |
| 4 | | | Yes | Yes |
| 3 | Yes | | Yes | Yes |
| 2 | | Yes | Yes | Yes |
| 1 | Yes | Yes | Yes | Yes |

Beyond this representation, the table is reduced in yet a third representation programmatically. In a program, the each match variable is assigned as a number, that when added to its peers, provides a unique index into an array of predefined values. The predefined values are the grade values themselves.

If numerical values are assigned, component match values are used for indexing grading for a match of each of the components, as follows:

TABLE 9

| mnemonic | Value |
|---|---|
| Manufacturer | 1 |
| Suffix | 2 |
| 1 Class | 4 |
| Prefix | 8 |

The combination of these match values will yield an index with the range of 0–15 inclusive. The contents of the grading array are shown in Table 10 which is a lookup table which converts grade index to actual grade value.

TABLE 10

| Index | Grade Value |
|---|---|
| 0 | 12 |
| 1 | 11 |
| 2 | 11 |
| 3 | 10 |
| 4 | 9 |
| 5 | 7 |
| 6 | 8 |
| 7 | 6 |
| 8 | 5 |
| 9 | 4 |
| 10 | 3 |
| 11 | 2 |
| 12 | 4 |
| 13 | 3 |
| 14 | 2 |
| 15 | 1 |

The following is an example which works through this system, using a vendor (manufacturer) and a vendor (manufacturer) part number.

A list of candidate vendor part numbers for matching the vendor part number of Intel 2901B might look as follows:

Candidate #1: Manufacturer=AMD , Part Number= LM2901B

Candidate #2: Manufacturer=Intel, Part Number=2901A

Assume that the base number 2901 was only found under one classification, micorprocessors, in the published database.

Candidate #1 would be decoded to the example shown in FIG. 87.

Using the match criteria described earlier, this part matches the Suffix, and was found in 1 Class. From Table 7, 8, or 10, this part match would be graded as an 8.

Similarly, candidate #2 would decode to the example shown in FIG. 131

Again using the match criteria described earlier, this part matches the Manufacturer, the Prefix, and was found in 1 Class. In this case, the prefix was match, due to the absence of any prefix information in either description. From Table 7, 8, or 10 this part match would be graded as a 3.

Since the lower rating is better, the candidate #2 will be selected as a match for "Intel 2901B".

The output would contain parameter information from the published database put into an import map and import file that maps to a knowledge base.

The operation of this software is described in the flow diagram FIGS. 165–167. Operation begins when the commercial database is read. The contents of this database is read, and indexed by base number in step 900 of FIG. 165. After the database has been read, the program begins reading the input part data in step 901. In step 902, the part number that was received by 901 is decomposed into its component parts, namely a base number, a prefix, a suffix, and a manufacturer.

In step 903, the base number found in 902 is used to find matching database entries in the data read in 900. Item 904 determines if any base number matches were found in the commercial database data. If there were no base number matches, the program continues at 901 by looking for another vendor name and vendor part number as input. If one or more base number matches were found, the program continues at 905. At 905 the program proceeds for each of the matching entries found in 904, processing each matching item individually with a single pass through the loop for each matched item. In 905, one of the entries found in 903 is searched to determine if the item contains a match on the prefix portion of the part number that was identified in 902. If a match is found in 905, then the program continues at step 906 in FIG. 166 by setting the flag indicating a prefix match. The value of the prefix match is indicated in Table 8. If a prefix match was not found, then 906 gets skipped, and the program continues at 907. Item 907 searches the matching item being tested in this iteration, found in 903, for a match on the suffix portion found in 902. If a suffix match is found, operation continues at 908, by setting suffix match flag. The value of the suffix match flag is indicated in Table 8. If a suffix match is not found, program operation continues at 909.

In 909, the program searches the part being tested in this iteration, which was found in 903, for a match on the manufacturer portion found in 902. If a manufacturer match is found, then program operation continues at 910 where the match flag is set indicating a manufacturer match. The value of the manufacturer match is indicated in Table 8. If a manufacturer match is not found, then 910 is skipped, and the program continues at 911. In 911, the program attempts to determine if all of the parts which matched the base number found in 902, and actually matched in 904 are of the same kind of part, or, in other words, do all of the parts found in 904 perform the same function. If they are determined to be the same, the program continues at step 912 of FIG. 167.

In step 912, the program sets the flag indicating that 1 class of parts was found for the part number requested in step 901. The value of the one class flag is indicated in Table 8. If the set of parts which matched in 904 are determined to represent multiple classes of parts, or parts which perform different functions, then the program continues at 913.

In 913 the program combines the match flags set in 906, 908, 910, and 912 into a single variable which constitutes the index into the grading table shown in Table 9. The index is used in 914 to lookup the grade in the internal array representation of Table 9. The grade found in 914 is assigned the part which matched in 904, and is the current part being used for this iteration, which began at 905. In 915, the program determines if there are more matches, which were found in 904, which need to be tested by this process. If more items remain, operation continues at 905 with the next item in the match list found in 903. If no more items remain to be examined, the program continues at 916. In 916, the program examines the results of the iterative process beginning at 905, and ending at 915 for the entries which have been scored the highest by 914. The highest grade is then selected by 916, and presented to the user as the best match. The best match contains all of the data associated with that entry. The data associated with that entry is obtained from the database which was read in 900.

Import

To facilitate the legacy process, it is necessary automatically populate a knowledge base with as much information necessary to uniquely identify a part and place the part in a class as close as possible to the part's actual class. This is achieved by importing customer data into a knowledge base with a set of import utilities.

The import utilities may modify a knowledge base in a number of ways. The most obvious way is by importing of new data into the knowledge base to create instances. Import utilities may add or modify data (parameters) on existing instances. Import utilities may also add enumerators that are missing from the schema, delete instances, translate text to other attribute types, and map unknown parameter values to known good values and numeric units, and dynamically change the destination class based information from a class map and customer data.

There are presently five import utilities: Import, Classmap Import, Simple Import, ImportA and ImportB. Though they are functionally similar, however, each one has unique features necessary to solve various scenarios associated with user data.

Simple Import, Classmap Import and ImportB importing customer part information into a knowledge base by creating new instances.

Import and ImportA allow importing part information into existing, selected instances, thus augmenting them.

Classmap Import dynamically changes the destination class through the use of a class map and a selected field in the user data.

Primary to the import utilities is the import file. The import file consists mainly of customer part data that is most useful for classifying parts. The import file must be formatted in a way acceptable to the import utilities. An import file has three sections: class path section, attribute name section and the customer data section.

The class path section is the first section in an import file. It is a single line of data, composed of tab separated names. The names are class names that specify the path from the root to the import destination class. Importing will generally be done at the destination class.

The attribute name section is the second section in an import file. It is a single line of data, composed of tab separated attribute names. The attribute names specify the attributes into which the customer data will be imported. The attribute names specified in this section must be valid at the destination class specified the class path section.

The customer data section is the third section in an import file. It is one or more lines composed of tab separated values. There is value for each attribute named in the attribute section. There is a one-to-one correspondence between the columns in the attribute section and the columns of data in the customer data section. Two adjacent tabs represent an empty field.

The following figure illustrates the format of an import file. The first line is the class path section. The second line is the attribute name section. Lines 3 and 4 are the user data section. When imported, two instances will be created. The parameters for the Part Number and Description attributes will be set to 123321 and 1/4×11/2 20 UNF for the first instance, and will be set to 123322 and 1/4×13/4 20UNF for the second instance.

```
root    Mechanical Components Fasteners           Bolts
Part Number Description
123321              1/4 x 11/2 20UNF
123322              1/4 x 13/4 20UNF
```

To allow modifying existing instances, certain attributes in the attribute section may be specified as "key" attributes. Key attributes are used to search and select certain instances. Only those instances whose parameters match those the values in the "key" attributes column in the import file are operated on during the import. Only string type attributes may be specified as key attributes. One or more attributes may be selected as key attributes. Key attributes may occur anywhere at any location in the attribute name section. An attribute name can be used both as a key name and as an attribute to be imported into. A key attribute is specified in the attribute section of the import file by prefixing the name with "key">  (e.g., key>Partno). The following figure illustrates an attribute name section of an import file that contains key attributes.

```
Key > Part Number   Description key > Vendor Code   Ven Descript
```

To allow importing of numeric attributes a default unit must be specified in the attribute name section. A default unit is a unit name from the unit family associated to the attribute. Default unit specifier follows the "|" symbol, which is appended to the attribute name (e.g., Length|Inches). The following figure illustrates an attribute name section of an import file that contains numeric attributes with unit specifiers.

```
Part Number Description   Length|Inches   Diameter|Feet
```

Attribute values may be replicated to other attributes without adding an extra column of data to the customer data section in an import file. This is accomplished by specifying the two attribute names separated by a "!" symbol (e.g., Description!Description2). The following figure illustrates an attribute name section of an import file that contains an attribute that is replicated.

```
Part Number Description!Description2
```

Comments may be placed in an import file by beginning a line with "#" symbol. Blank lines are also allowed in an import file.

There are four phases performed during an import. After initialization, parsing command-line options, logging in, and opening the database, the first import phase is started.

The first phase is to read the first non-comment line of the import file step 1300 of FIG. 153. This line is the class path section. The class path is read and parsed into class names. The class path is validated following the class path to the destination class. If the destination class exists, the second phase begins.

The second phase reads the second non-comment line of the import file (1302). This is the attribute name section. The line is read and the attribute names are parsed. The attribute names are validated by verifying that they exist at the destination class. For Simple Import and ImportA, all the attributes must be of type string. For Import, Classmap Import, and ImportB, all specified numeric attributes must also specify a valid default unit (special symbol "|"). In addition, attribute names are parsed for special other symbols like "key>" and "!".

The third phase only occurs when importing into existing instances. During this phase, a lookup table is created (1307). The lookup table contains instance handle for each instance at the destination class and the parameter values for the key attributes (i.e., attributes prefixed by "key>" in the attribute name section). The lookup table is used to quickly locate instances that will be augmented by data in the customer data section of the import file.

The fourth phase reads the data from the customer data section of the import file and performs the import (1308). This is done by reading each line, parsing the line into fields, and then importing the value by setting the parameter for the appropriate attribute.

In the case when the destination class is automatically selected, a selected field from the customer data is used to attempt matching a class from the class map file (1327). If a destination class can be identified, the new instance will be created in that class (1328) (1323).

In the case when new instances are being created, the instance is created prior to setting the parameters (1323).

In the case where data is being imported into existing instances, the key values are first extracted from the data, then a binary search is performed on the lookup table to identify all matching, existing instances (1324). Once all the matching instances are found, parameters are set from the remaining data.

In the case where enumerated attributes are imported step 1311 of FIG. 154, if the attribute data from the import file does not match any existing enumerators associated to the attribute, then either the data is used automatically add a new enumerator to the schema, or the import utility will present a menu of existing enumerators to choose from (1317). If the menu is presented, the user may either choose map the data read from the file to an existing enumerator, or to use the data to add a new enumerator, or to ignore the data and leave the parameter undefined. If the user chooses to map the data to an existing enumerator, this information is retained by the import utility and is used if subsequent occurrences of the same data is encountered, at which time the utility automatically maps the data to the existing enumerator.

In the case where numeric attributes are imported (1312), if the attribute data from the import file is simply numeric characters (1318), the parameter is set using the default unit for the attribute specified in the attribute name section of the import file. If the attribute data from the import file contains data that is both numeric and not numeric, it is assumed a unit specifier is included with the data and will be used to over-ride the default unit mentioned in the attribute name section. The utility will parse the data to location the unit specifier and see if the specifier names a known unit name (1319). If it does not, the import utility will present a menu of existing unit names to choose from (1320). When the menu is presented, the user may either choose map the data read from the file to an existing unit name or to ignore the data and leave the parameter undefined. If the user chooses to map the data to an existing unit name, this information is retained by the import utility and is used if subsequent occurrences of the same data is encountered, at which time the utility automatically maps the data to the existing unit name.

In the case where boolean attributes are imported (1310), if the attribute data from the import file is one of True, Yes, T, Y, or 1, the value of TRUE is assumed. If the data is one of False, No, N, F, or 0, the value of FALSE is assumed. If the attribute data from the import file contains data that cannot be recognized as either TRUE or FALSE (1314), the import utility will present a menu to choose from (1316). When the menu is presented, the user may either choose map the data read from the file to a TRUE value, or map the data to a FALSE value, or to ignore the data and leave the parameter undefined. If the user chooses to map the data to a TRUE or FALSE value, this information is retained by the import utility and is used if subsequent occurrences of the same data is encountered, at which time the utility automatically maps the data to the appropriate boolean value.

The following sections describes each of the five import utilities and how its features deviate from the general description of these utilities.

The usage and syntax of the import utility is shown in FIG. 125.

Different operations may be performed depending on which options were set. If the -r option is set, the matching instances are deleted from the knowledge base rather than imported. If the -M option is set, if no matching instances were found, a new instance is created from all the data on the line, including the key attribute fields. If the -U option is used, information is imported only when there is one matching instance. Nothing is imported if more that one instance is matched. If the -X option is used, information is imported only when there is no matching instance. This must be used with the -M option, otherwise there is a null effect.

Classmap Import adds new instances to a knowledge base. Instances are added to a particular class based on a map that describes a pattern to match in data that class.

The usage of this command is shown in FIG. 126.

After initialization the import map file is read. The import map file's first field is the pattern to match in the data and the second is the CADIS-PMX class to which an instance is imported. An exception file specified by the -o option is created. The exception file contains instances which could not be imported because the parameters did not match any of the map patterns.

The class path in the class path section of the import file, must name a class that all the attributes named in the attribute name section are valid.

When the customer data is read from the file, the field specified with the -f option is used to match patterns in the map file. If there is no match, the instance is output to the instance exception file specified with the -o option.

If the -f option field matches a pattern in the class map, the instance is added to that class and the parameters are set.

If an attribute for a parameter is an enumerated, the enumerator will be added to the schema if it does not exist This means that import must acquire a DBXLock.

If the replacement attribute for an instance parameter is a boolean, the parameter is set to TRUE if the text is an 'x', 'X', 'T', 't', 'TRUE', 'true', or a '1'. A FALSE value is set for '0', 'F', 'f', 'FALSE', or 'false'.

The format of an import map is shown below. For example, suppose the import were performed on the first data field on the first line in the import file which has a value of "10 inch spike". That data field would be compared first against the pattern "Thyristor". This pattern does not match, so the data field is then compared against the pattern "*spike*" which contains regular expression meta-characters. This does match, so the first line would be imported to the class "Spikes" under the class "Mechanical" under the root "PMX_Root".

| Thyristor | PMX_Root | Electrical | Discrete | Thryistor |
| *spike* | PMX_Root | Mechanical | Spikes | |

Simple Import is the most basic import utility. It can only be used to create instances, and only string attributes may be specified. The command usage is shown in the following Table 11.

TABLE 11 simple_import [-u user] [-p password] -d kdbname [-P] [-v] import_file

| | |
|---|---|
| -u | use user name 'username' when doing login, if none given login id is used |
| -p | use specified password with login, |
| -d | the logical database name to connect to |
| -v | turn on overbose mode |
| import_file | name of the file containing the import info. |

No "key>" attributes allowed in attribute name section of import file. Only string type attributes may be imported.

This utility is used to update existing instances if and only if the attribute's parameter is currently undefined.

importA [-u user] [-p password] -d kdbname [-P] [-v] import_file

| | |
|---|---|
| -u | use user name 'username' when doing login, if none given login id is used |
| -p | use specified password with login, |
| -d | the logical database name to connect to |
| -v | turn on overbose mode |
| import_file | name of the file containing the import info. |

This utility is used to create new instances and allows the importation of all attribute types.

```
importB [-u user] [-p password] -d kdbname [-P] [-v]-o
nogoparts import_file -u          use user name 'username' when doing login, if
                none given login id is used
    -p          use specified password with login,
    -d          the logical database name to connect to
    -v          turn on overbose mode
    -0          the name of the file to write part data of parts
                that could not be imported due to
                difficulty with setting parameters.
    import_file name of the file containing the import info.
```

II. Software Listings

Additional disclosure is set forth in the software listings attached hereto as Appendix J, Appendix K, Appendix L and Appendix M, the entirety of which is incorporated herein by reference.

III. Additional Embodiments and Modifications

Although the invention has been described herein with reference to an application to the problem of parts management, those skilled in the art, after having the benefit of this disclosure, will appreciate that the invention is useful in other applications as well. For example, the invention will be particularly useful in any application where an organization places value on reliably finding one of many instances of objects having variable descriptions. The dynamic class manager described herein will be particularly useful in any application where it is desirable to restructure a classification or schema.

Although the invention has been described herein with reference to a local area network, those skilled in the art, after having the benefit of this disclosure, will appreciate that other embodiments and implementations are possible. For example, the system could be implemented on a main frame or single computer having multiple user stations. The system could also be implemented over a network other than a LAN, such as a wide area network or the InterNet.

Additional file manager 140 derivations are possible. The interface provided by the file manager 140 to the dynamic class manager 134 and the handle manager 137 is an agreement to maintain a copy of the dynamic class manager schema and instance data on secondary persistent storage 103. Changes, as they are made to the schema and instances are also made in secondary storage. The dynamic class manager 134 is initialized by reading the data, via the file manager 140, from secondary storage 103. Other secondary storage mechanisms could be implemented which follow the interface specification. Other implementations could use commercial data bases including relational database management systems such as an Informix database, Oracle database, Raima database, etc. Other implementations could also be built using other proprietary file formats.

The above description is intended to be only an example of the invention, setting forth a presently preferred embodiment. Modifications and alternative embodiments will be apparent to those skilled in the art after having the benefit of this disclosure. The scope of the invention should not be limited to the particular example described herein. Instead, the scope of the invention is intended to be defined by the claims.

What is claimed is:

1. A database system for management of information relating to component parts, comprising:

an object oriented representation of information describing the characteristics of existing instances of component parts that are logically organized in a parent-child/class-subclass structure, wherein attributes of an instance are dependent upon information concerning attributes of a component part that corresponds to that instance that is locally available from a class to which that instance belongs plus information concerning inherited attributes from a parent class;

programmed computer circuits for querying said information in a guided and iterative manner to locate component parts having attributes that are compatible with attributes that are desired by a searcher querying the information; and, a display coupled to said computer circuits for displaying search results, the display being operative to display a window showing a graphical representation of said structure, the display being operative to simultaneously display a window showing attributes of a selected class.

2. The database management system according to claim 1, wherein:

said instances are represented internally as an instance object the instance object including information identifying an owning class to which the instance object belongs, the instance object including a list of information identifying characteristics of the instance with no additional storage allocated for undefined characteristics.

3. The database management system according to claim 2, wherein:

said window showing attribute information includes fields located in proximate relation to individual attributes in which search criteria for an attribute may be entered.

4. The database management system according to claim 3, wherein:

said display is operative to display a numeric value corresponding to a subtree instance count providing a numeric indication of the total number of instances that are present in a class that a searcher selects while navigating said structure plus the total number of all descendants of said class, the subtree instance count providing the searcher with feedback as to how many component parts correspond to a currently selected set of query criteria, the display being operative to display the subtree instance count simultaneously with the window showing a graphical representation of said structure and the window showing attributes of the selected class.

5. The database management system according to claim 2, wherein:

said display is operative to display a numeric value corresponding to a subtree instance count providing a numeric indication of the total number of instances that are present in a class that a searcher selects while navigating said structure plus the total number of all descendants of said class, the subtree instance count providing the searcher with feedback as to how many component parts correspond to a currently selected set of query criteria, the display being operative to display the subtree instance count simultaneously with the window showing a graphical representation of said structure and the window showing attributes of the selected class.

6. The database management system according to claim 1, wherein:

said window showing attribute information includes fields located in proximate relation to individual attributes in which search criteria for an attribute may be entered.

7. The database management system according to claim 6, wherein:

said display is operative to display a numeric value corresponding to a subtree instance count providing a numeric indication of the total number of instances that are present in a class that a searcher selects while navigating said structure plus the total number of all descendants of said class, the subtree instance count providing the searcher with feedback as to how many component parts correspond to a currently selected set of query criteria, the display being operative to display the subtree instance count simultaneously with the window showing a graphical representation of said structure and the window showing attributes of the selected class.

8. The database management system according to claim 1, wherein:

said display is operative to display a numeric value corresponding to a subtree instance count providing a numeric indication of the total number of instances that are present in a class that a searcher selects while navigating said structure plus the total number of all descendants of said class, the subtree instance count providing the searcher with feedback as to how many component parts correspond to a currently selected set of query criteria, the display being operative to display the subtree instance count simultaneously with the window showing a graphical representation of said structure and the window showing attributes of the selected class.

9. The database management system according to claim 1, wherein:

said window showing attributes of a selected class has a format comprising rows and columns, a first column is displayed having descriptive information describing individual attributes displayed in individual rows, a second column is displayed which provides a field for individual rows in which an attribute is displayed that permits a searcher to enter search criteria for the attribute displayed in the same row as the field in which the entry is made, such that a plurality of rows are displayed where each such row has descriptive information describing that attribute and a field for the entry of search criteria for that attribute.

10. The database management system according to claim 9, wherein:

said window showing attributes of a selected class includes a third column in which attribute type icons are displayed, whereby a selected attribute type icon is displayed in a row corresponding to an attribute and the appearance of the attribute type icon indicates the type of values that the attribute described in that row may have.

11. The database management system according to claim 10, wherein:

said display is operative to display a search results window displaying in a rows and columns format information for instances that correspond to a currently selected set of query criteria, whereby a row contains information for an individual instance and columns are provided for the attributes that are displayed for the instances.

12. The database management system according to claim 11, further comprising:

a pointing device coupled to said display operable to allow the searcher to point and click on items displayed on said display; and, wherein said window showing attributes of a selected class includes a fourth column which determines the order in which instances having such attributes are sorted when the instances are displayed in the search results window, whereby the searcher may selectively click on the row in the fourth column corresponding to a first attribute to select the first attribute to be used as a basis for sorting instances corresponding to current search criteria, and a symbol will be displayed in that row of the fourth column indicating the sort order thereby selected.

13. The database management system, comprising:

an object oriented representation of information describing the characteristics of existing instances organized in a parent-child/class-subclass structure, wherein the internal representation of an instance is dependent upon the information that is locally available from a class to which that instance belongs plus inherited attributes from a parent class;

means for querying said object oriented representation in a guided and iterative manner;

means for displaying search results, means for selecting particular information pertaining to the characteristics which are to be displayed by the means for displaying; and, wherein at least one class in said object oriented representation of information is represented as a class object having a handle, said class object having a parent handle identifying the parent class of said class object, said class object having a subclass list, said subclass list comprising an array of class handles identifying the subclasses of said class object, said class object including an attribute list comprising a list of handles which may be used to identify attributes of said class object, said class object including a subtree instance count, said subtree instance count comprising a numeric indication of the total number of instances that belong to said class object and that are present in all descendants of said class object.

14. The database management system according to claim 13, wherein:

at least one class in said object oriented representation of information is represented as a second class object having a handle, said second class object having a parent handle identifying the parent class of said second class object, said second class object having a local instance list, said local instance list comprising an array of handles which can be used to identify the instances that belong to said second class object, said second class object including an attribute list comprising a list of handles which may be used to identify attributes of said second class object, said second class object including a subtree instance count, said subtree instance count comprising a numeric indication of the total number of instances that belong to said second class object and that are present in all descendants of said class object.

15. The database management system according to claim 14, further comprising:

means for performing parametric attribute searches on a hierarchical, object-oriented schema.

16. The database management system according to claim 14, further comprising:

means for searching said object oriented representation of information to retrieve all instances that exactly correspond to a predetermined set of search criteria, as well as instances that closely match said predetermined set of search criteria.

17. The database management system according to claim 14, further comprising:
   means for searching said object oriented representation of information to retrieve all instances that exactly correspond to a predetermined set of search criteria, as well as instances that correspond to a subset of said predetermined set of search criteria.

18. The database management system according to claim 13, further comprising:
   means for searching said object oriented representation of information to retrieve all instances that exactly correspond to a predetermined set of search criteria, as well as instances that correspond to a subset of said predetermined set of search criteria.

19. A database management system, comprising:
   an object oriented representation of information describing the characteristics of existing instances organized in a parent-child/class-subclass structure wherein the internal representation of an instance is dependent upon the information that is locally available from a class to which that instance belongs plus inherited attributes from a parent class,
   means for querying said object oriented representation in a guided and iterative manner;
   means for displaying search results, said means for displaying search results includes means for displaying a numeric value corresponding to a subtree instance count providing a numeric indication of the total number of instances that are present in a class that a user is navigating in a search and all descendants of said class; and
   means for selecting particular information pertaining to the characteristics which are to be displayed by the means for displaying.

20. The database management system according to claim 19, further comprising:
   legacy means to facilitate organization of existing data into a hierarchical, object-oriented schema having an object oriented representation of information describing the characteristics of existing instances organized in a parent-child/class-subclass structure.

21. The database management system according to claim 20, wherein:
   said legacy means is operative to standardize descriptions of instances in content and format as a function of the type of instance and having variable field length descriptions that are not subject to arbitrary predetermined field length limitations.

22. The database management system according to claim 20, wherein:
   said legacy means includes a rule system for unit measure conversion, providing that units of first user specified families of parts are automatically converted to a predetermined unit of measure, and providing that units of second user specified families of parts are not automatically converted to another unit of measure.

23. The database management system according to claim 20, wherein:
   said legacy means includes means for transforming existing textual information about an instance into parametric values for said instance within a schema, and means for automatically estimating the class to which said instance should be placed in a schema.

24. A network having a client/server architecture, comprising:
   a knowledge base server, the knowledge base server including a dynamic class manager, a connection manager, a query manager, a handle manager, a units manager, a database manager, and a file manager;
   an object oriented hierarchical schema representing classes of instances as objects arranged in a hierarchy, said schema being fully connected with each class object including information as to any class object that is a parent in the hierarchy, and class objects that are descendants in the hierarchy, said class objects being managed by said dynamic class manager; and,
   an application programming interface to permit a client application to access the object oriented hierarchical schema.

25. The network according to claim 24, wherein:
   at least one class in said object oriented hierarchical schema is represented as a class object having a handle, said class object having a parent handle identifying the parent class of said class object, said class object having a subclass list, said subclass list comprising an array of class handles identifying the subclasses of said class object, said class object including an attribute list comprising a list of handles which may be used to identify attributes of said class object, said class object including a subtree instance count, said subtree instance count comprising a numeric indication of the total number of instances that belong to said class object and that are present in all descendants of said class object.

26. The network according to claim 25, wherein:
   at least one class in said object oriented representation of information is represented as a second class object having a handle, said second class object having a parent handle identifying the parent class of said second class object, said second class object having a local instance list, said local instance list comprising an array of handles which can be used to identify the instances that belong to said second class object, said second class object including an attribute list comprising a list of handles which may be used to identify attributes of said second class object, said second class object including a subtree instance count, said subtree instance count comprising a numeric indication of the total number of instances that belong to said second class object and that are present in all descendants of said class object.

27. The network according to claim 26, further comprising:
   an object oriented lock manager, said object oriented lock manager being operable to allow modification of a first portion of said object oriented hierarchical schema by one client application while a plurality of other client applications are navigating or searching a second portion of said object oriented hierarchical schema.

28. A parts management system, comprising:
   a processor;
   a display having a screen, the display being coupled to the processor;
   a mouse coupled to the processor;
   a knowledge base accessible by the processor, the knowledge base having descriptive information for a plurality of parts corresponding to products of an organization, the knowledge base comprising a hierarchical schema of parts information representing classes of instances, the hierarchical schema of parts information having a root class, the hierarchical schema of parts information having a plurality of levels of descendant classes, the root class being a parent of a plurality of first level descendant classes, at least some of the first level descendant classes being first level parent classes of respective second level descendent classes, at least some of the second level descendant classes being second level parent classes of respective third level descendant classes, the classes and instances having a plurality of attributes, wherein a class at a level "n" in the hierarchical schema of parts information inherits attributes from its parent class at a level "n–1" in the hierarchical schema;

means for displaying a graphical tree hierarchy in a tree display area of the screen, the graphical tree hierarchy representing classes in a currently selected portion of the hierarchical schema of parts information, said classes having individually associated icons for individual classes displayed in the tree display area of the screen;

means for navigating the graphical tree hierarchy by clicking with the mouse on selected locations in the tree display area representing a portion of the hierarchical schema of parts information; and, means for displaying attributes in an attribute display area of the screen, the attribute display area being distinct from the tree display area, the means for displaying attributes being coordinated with the means for displaying classes such that the attributes displayed in the attribute display area are the corresponding attributes for a currently selected location in the hierarchical schema of parts information.

29. The parts management system according to claim 28, wherein:

at least one class in said object oriented hierarchical schema is represented as a class object having a handle, said class object having a parent handle identifying the parent class of said class object, said class object having a subclass list, said subclass list comprising an array of class handles identifying the subclasses of said class object, said class object including an attribute list comprising a list of handles which may be used to identify attributes of said class object, said class object including a subtree instance count, said subtree instance count comprising a numeric indication of the total number of instances that belong to said class object and that are present in all descendants of said class object.

30. The parts management system according to claim 29, wherein:

at least one class in said object oriented representation of information is represented as a second class object having a handle, said second class object having a parent handle identifying the parent class of said second class object, said second class object having a local instance list, said local instance list comprising an array of handles which can be used to identify the instances that belong to said second class object, said second class object including an attribute list comprising a list of handles which may be used to identify attributes of said second class object, said second class object including a subtree instance count, said subtree instance count comprising a numeric indication of the total number of instances that belong to said second class object and that are present in all descendants of said class object.

31. A database system for management of information relating to component parts, comprising:

a knowledge base of information describing characteristics of instances of component parts, where an instance belongs to a class and classes are logically associated in a class-subclass structure, wherein attributes of an instance include attributes that are associated with the class to which that instance belongs, and when the class to which that instance belongs is a subclass of another class, the attributes of the instance include inherited attributes associated with said another class;

programmed computer circuits for querying the information in a guided and iterative manner to locate component parts having attributes that are compatible with attributes that are desired by a searcher querying the information;

a display coupled to said computer circuits for displaying query results, the display being operative to display a window showing a graphical representation of the class-subclass structure, the display being operative to simultaneously display a window showing attributes of a class that has been selected by a searcher, the window showing attributes of a class including fields which are displayed in proximate relation to individual attributes that are displayed, the fields providing an area in which search criteria for an attribute may be entered by the searcher; and, said display is operative to display a numeric value corresponding to a subtree instance count providing a numeric indication of the total number of instances that satisfy any search criteria for attributes entered by the searcher which belong to a class that the searcher has selected plus the total number of instances that belong to all direct and indirect subclasses of the class that the searcher selected which satisfy any search criteria for attributes entered by the searcher, the subtree instance count providing the searcher with feedback as to how many component parts correspond to a currently selected set of query criteria, the display being operative to display the subtree instance count simultaneously with the window showing a graphical representation of the class-subclass structure and the window showing attributes of the class that the searcher has selected.

32. In a parts management system having a knowledge base server, and having a client connectable to the knowledge base server, wherein the client has a display and a pointing device operatively associated with the display so that a user can use the pointing device to point and click on items displayed on the display, a method of providing user interaction with the knowledge base server comprising the steps of:

providing a knowledge base on the knowledge base server, the knowledge base having descriptive information for a plurality of parts, at least a portion of the knowledge base being logically organized as classes of parts information, and a plurality of classes are logically organized as subclasses of another class, the knowledge base having instances wherein a instance represents information about a part, and instances in the knowledge base being logically associated with classes such that an instance is a member of a class;

connecting the client to the knowledge base server via a network;

displaying a graphical representation of the logical organization of classes in a tree display area of the display; and, displaying in an attribute display area of the display information relating to attributes corresponding to a currently selected location in the graphical representation of the logical organization of classes, the attribute display area being distinct from the tree display area, the attribute display area and the tree display area being viewable simultaneously.

33. The method according to claim 32, further comprising the step of:

navigating the graphical representation of the logical organization of the classes in the knowledge base by clicking with the pointing device on selected locations in the tree display area representing a class of parts information.

34. The method according to claim 33, further comprising the step of:

displaying a numeric value representing the total number of instances that correspond to user selected query criteria at a selected region of the graphical representation of the logical organization of the classes in the knowledge base, said numeric value being viewable simultaneously with the tree display area of the display and the attribute display area of the display.

35. The method according to claim 34, further comprising the step of:

selectively displaying a search results window showing information for instances that correspond to user selected query criteria at a selected region of the graphical representation of the logical organization of the classes in the knowledge base.

36. The method according to claim 35, further comprising the step of:

internally representing a class in the knowledge base as a class object, said class object having a handle, said class object having a parent handle identifying a parent class of said class object, said class object having a subclass list, said subclass list comprising a list of class handles identifying classes which are subclasses of said class object.

37. The method according to claim 36, further comprising the step of:

internally representing said class object to include an attribute list comprising a list of handles which may be used to identify attributes of said class object.

38. The method according to claim 37, further comprising the step of:

internally representing said class object to include a subtree instance count, said subtree instance count comprising a numeric indication of the total number of instances that belong to said class object and that are present in all descendants of said class object, wherein said step of displaying a numeric value comprises displaying said subtree instance count to provide rapid feedback to the user as to how many parts belong to a selected class and its descendants at a selected region of the graphical representation of the logical organization of the classes in the knowledge base.

39. The method according to claim 38, further comprising the step of:

providing a units manager for the knowledge base.

40. The method according to claim 39, wherein:

in the step of connecting the client to the knowledge base server, the client is connected to the knowledge base server via the Internet.

41. The method according to claim 38, wherein:

in the step of connecting the client to the knowledge base server, the client is connected to the knowledge base server via the Internet.

42. The method according to claim 37, wherein:

in the step of connecting the client to the knowledge base server, the client is connected to the knowledge base server via the Internet.

43. The method according to claim 36, wherein:

in the step of connecting the client to the knowledge base server the client is connected to the knowledge base server via the Internet.

44. The method according to claim 35, wherein:

in the step of connecting the client to the knowledge base server, the client is connected to the knowledge base server via the Internet.

45. The method according to claim 34, wherein:

in the step of connecting the client to the knowledge base server, the client is connected to the knowledge base server via the Internet.

46. The method according to claim 33, wherein:

in the step of connecting the client to the knowledge base server, the client is connected to the knowledge base server via the Internet.

47. The method according to claim 32, wherein:

in the step of connecting the client to the knowledge base server, the client is connected to the knowledge base server via the Internet.

* * * * *